(12) United States Patent
Becker et al.

(10) Patent No.: US 8,592,872 B2
(45) Date of Patent: *Nov. 26, 2013

(54) INTEGRATED CIRCUIT INCLUDING CROSS-COUPLED TRANSISTORS WITH TWO TRANSISTORS OF DIFFERENT TYPE HAVING GATE ELECTRODES FORMED BY COMMON GATE LEVEL FEATURE WITH SHARED DIFFUSION REGIONS ON OPPOSITE SIDES OF COMMON GATE LEVEL FEATURE

(75) Inventors: Scott T. Becker, Scotts Valley, CA (US); Jim Mali, Morgan Hill, CA (US); Carole Lambert, Campbell, CA (US)

(73) Assignee: Tela Innovations, Inc., Los Gatos, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/589,028

(22) Filed: Aug. 17, 2012

(65) Prior Publication Data

US 2012/0306025 A1 Dec. 6, 2012

Related U.S. Application Data

(63) Continuation of application No. 12/753,766, filed on Apr. 2, 2010, now Pat. No. 8,264,049, which is a continuation of application No. 12/402,465, filed on Mar. 11, 2009, now Pat. No. 7,956,421.

(60) Provisional application No. 61/036,460, filed on Mar. 13, 2008, provisional application No. 61/042,709, filed on Apr. 4, 2008, provisional application No. 61/045,953, filed on Apr. 17, 2008, provisional application No. 61/050,136, filed on May 2, 2008.

(51) Int. Cl.
*H01L 27/07* (2006.01)

(52) U.S. Cl.
USPC .............. 257/206; 257/E27.011; 257/E25.01; 438/213

(58) Field of Classification Search
USPC ...................... 257/206, 401, E27.011, E25.01
See application file for complete search history.

(56) References Cited

U.S. PATENT DOCUMENTS

| 4,197,555 A | 4/1980 | Uehara et al. |
| 4,417,161 A | 11/1983 | Uya |

(Continued)

FOREIGN PATENT DOCUMENTS

| EP | 0102644 | 7/1989 |
| EP | 0788166 | 8/1997 |

(Continued)

OTHER PUBLICATIONS

Acar, et al., "A Linear-Centric Simulation Framework for Parametric Fluctuations", 2002, IEEE, Carnegie Mellon University USA, pp. 1-8.

(Continued)

*Primary Examiner* — Wensing Kuo
(74) *Attorney, Agent, or Firm* — Martine Penilla Group, LLP

(57) ABSTRACT

A semiconductor device includes first and second p-type diffusion regions, and first and second n-type diffusion regions that are each electrically connected to a common node. Each of a number of conductive features within a gate electrode level region is fabricated from a respective originating rectangular-shaped layout feature, with a centerline of each originating rectangular-shaped layout feature aligned in a parallel manner. The conductive features respectively form gate electrodes of first and second PMOS transistor devices, and first and second NMOS transistor devices. Widths of the first and second p-type diffusion regions are substantially equal, such that the first and second PMOS transistor devices have substantially equal widths. Widths of the first and second n-type diffusion regions are substantially equal, such that the first and second NMOS transistor devices have substantially equal widths. The first and second PMOS and first and second NMOS transistor devices form a cross-coupled transistor configuration.

26 Claims, 211 Drawing Sheets

(56) References Cited

U.S. PATENT DOCUMENTS

| | | |
|---|---|---|
| 4,424,460 A | 1/1984 | Best |
| 4,613,940 A | 9/1986 | Shenton et al. |
| 4,657,628 A | 4/1987 | Holloway et al. |
| 4,682,202 A | 7/1987 | Tanizawa |
| 4,745,084 A | 5/1988 | Rowson et al. |
| 4,780,753 A | 10/1988 | Ohkura et al. |
| 4,801,986 A | 1/1989 | Chang et al. |
| 4,804,636 A | 2/1989 | Groover, III et al. |
| 4,812,688 A | 3/1989 | Chu et al. |
| 4,884,115 A | 11/1989 | Michel et al. |
| 4,928,160 A | 5/1990 | Crafts |
| 4,975,756 A | 12/1990 | Haken et al. |
| 5,068,603 A | 11/1991 | Mahoney |
| 5,079,614 A | 1/1992 | Khatakhotan |
| 5,097,422 A | 3/1992 | Corbin et al. |
| 5,117,277 A | 5/1992 | Yuyama et al. |
| 5,121,186 A | 6/1992 | Wong et al. |
| 5,208,765 A | 5/1993 | Turnbull |
| 5,224,057 A | 6/1993 | Igarashi et al. |
| 5,242,770 A | 9/1993 | Chen et al. |
| 5,268,319 A | 12/1993 | Harari |
| 5,298,774 A | 3/1994 | Ueda et al. |
| 5,313,426 A | 5/1994 | Sakuma et al. |
| 5,351,197 A | 9/1994 | Upton et al. |
| 5,359,226 A | 10/1994 | DeJong |
| 5,365,454 A | 11/1994 | Nakagawa et al. |
| 5,367,187 A * | 11/1994 | Yuen .............................. 257/401 |
| 5,378,649 A | 1/1995 | Huang |
| 5,396,128 A | 3/1995 | Dunning et al. |
| 5,420,447 A | 5/1995 | Waggoner |
| 5,461,577 A | 10/1995 | Shaw et al. |
| 5,471,403 A | 11/1995 | Fujimaga |
| 5,497,334 A | 3/1996 | Russell et al. |
| 5,497,337 A | 3/1996 | Ponnapalli et al. |
| 5,526,307 A | 6/1996 | Yiu et al. |
| 5,536,955 A | 7/1996 | Ali |
| 5,545,904 A | 8/1996 | Orbach |
| 5,581,098 A | 12/1996 | Chang |
| 5,581,202 A | 12/1996 | Yano et al. |
| 5,612,893 A | 3/1997 | Hao et al. |
| 5,636,002 A | 6/1997 | Garofalo |
| 5,656,861 A | 8/1997 | Godinho et al. |
| 5,682,323 A | 10/1997 | Pasch et al. |
| 5,684,311 A | 11/1997 | Shaw |
| 5,684,733 A | 11/1997 | Wu et al. |
| 5,698,873 A | 12/1997 | Colwell et al. |
| 5,705,301 A | 1/1998 | Garza et al. |
| 5,723,883 A | 3/1998 | Gheewalla |
| 5,723,908 A | 3/1998 | Fuchida et al. |
| 5,740,068 A | 4/1998 | Liebmann et al. |
| 5,745,374 A | 4/1998 | Matsumoto |
| 5,764,533 A | 6/1998 | deDood |
| 5,774,367 A | 6/1998 | Reyes et al. |
| 5,780,909 A | 7/1998 | Hayashi |
| 5,789,776 A | 8/1998 | Lancaster et al. |
| 5,790,417 A | 8/1998 | Chao et al. |
| 5,796,128 A | 8/1998 | Tran et al. |
| 5,796,624 A | 8/1998 | Sridhar et al. |
| 5,814,844 A | 9/1998 | Nagata et al. |
| 5,825,203 A | 10/1998 | Kusunoki et al. |
| 5,834,851 A | 11/1998 | Ikeda et al. |
| 5,838,594 A | 11/1998 | Kojima |
| 5,841,663 A | 11/1998 | Sharma et al. |
| 5,847,421 A | 12/1998 | Yamaguchi |
| 5,850,362 A | 12/1998 | Sakuma et al. |
| 5,852,562 A | 12/1998 | Shinomiya et al. |
| 5,858,580 A | 1/1999 | Wang et al. |
| 5,898,194 A | 4/1999 | Gheewala |
| 5,900,340 A | 5/1999 | Reich et al. |
| 5,908,827 A | 6/1999 | Sirna |
| 5,915,199 A | 6/1999 | Hsu |
| 5,917,207 A | 6/1999 | Colwell et al. |
| 5,920,486 A | 7/1999 | Beahm et al. |
| 5,923,059 A | 7/1999 | Gheewala |
| 5,923,060 A | 7/1999 | Gheewala |
| 5,929,469 A | 7/1999 | Mimoto et al. |
| 5,930,163 A | 7/1999 | Hara et al. |
| 5,935,763 A | 8/1999 | Caterer et al. |
| 5,949,101 A | 9/1999 | Aritome |
| 5,973,507 A | 10/1999 | Yamazaki |
| 5,977,305 A | 11/1999 | Wigler et al. |
| 5,977,574 A | 11/1999 | Schmitt et al. |
| 5,998,879 A | 12/1999 | Iwaki et al. |
| 6,009,251 A | 12/1999 | Ho et al. |
| 6,026,223 A | 2/2000 | Scepanovic et al. |
| 6,037,613 A | 3/2000 | Mariyama |
| 6,037,617 A | 3/2000 | Kumagai |
| 6,044,007 A | 3/2000 | Capodieci |
| 6,054,872 A | 4/2000 | Fudanuki et al. |
| 6,063,132 A | 5/2000 | DeCamp et al. |
| 6,077,310 A | 6/2000 | Yamamoto et al. |
| 6,080,206 A | 6/2000 | Tadokoro et al. |
| 6,084,437 A | 7/2000 | Sako |
| 6,091,845 A | 7/2000 | Pierrat et al. |
| 6,099,584 A | 8/2000 | Arnold et al. |
| 6,100,025 A | 8/2000 | Wigler et al. |
| 6,114,071 A | 9/2000 | Chen et al. |
| 6,144,227 A | 11/2000 | Sato |
| 6,166,415 A | 12/2000 | Sakemi et al. |
| 6,166,560 A | 12/2000 | Ogura et al. |
| 6,174,742 B1 | 1/2001 | Sudhindranath et al. |
| 6,182,272 B1 | 1/2001 | Andreev et al. |
| 6,194,104 B1 | 2/2001 | Hsu |
| 6,194,252 B1 | 2/2001 | Yamaguchi |
| 6,194,912 B1 | 2/2001 | Or-Bach |
| 6,209,123 B1 | 3/2001 | Maziasz et al. |
| 6,230,299 B1 | 5/2001 | McSherry et al. |
| 6,232,173 B1 | 5/2001 | Hsu et al. |
| 6,240,542 B1 | 5/2001 | Kapur |
| 6,249,902 B1 | 6/2001 | Igusa et al. |
| 6,255,600 B1 | 7/2001 | Schaper |
| 6,255,845 B1 | 7/2001 | Wong et al. |
| 6,262,487 B1 | 7/2001 | Igarashi et al. |
| 6,269,472 B1 | 7/2001 | Garza et al. |
| 6,275,973 B1 | 8/2001 | Wein |
| 6,282,696 B1 | 8/2001 | Garza et al. |
| 6,291,276 B1 | 9/2001 | Gonzalez |
| 6,297,668 B1 | 10/2001 | Schober |
| 6,297,674 B1 | 10/2001 | Kono et al. |
| 6,303,252 B1 | 10/2001 | Lin |
| 6,331,733 B1 | 12/2001 | Or-Bach et al. |
| 6,331,791 B1 | 12/2001 | Huang |
| 6,335,250 B1 | 1/2002 | Egi |
| 6,338,972 B1 | 1/2002 | Sudhindranath et al. |
| 6,347,062 B2 | 2/2002 | Nii et al. |
| 6,356,112 B1 | 3/2002 | Tran et al. |
| 6,359,804 B2 | 3/2002 | Kuriyama et al. |
| 6,370,679 B1 | 4/2002 | Chang et al. |
| 6,378,110 B1 | 4/2002 | Ho |
| 6,380,592 B2 | 4/2002 | Tooher et al. |
| 6,388,296 B1 | 5/2002 | Hsu |
| 6,393,601 B1 | 5/2002 | Tanaka et al. |
| 6,399,972 B1 | 6/2002 | Masuda et al. |
| 6,400,183 B2 | 6/2002 | Yamashita et al. |
| 6,415,421 B2 | 7/2002 | Anderson et al. |
| 6,416,907 B1 | 7/2002 | Winder et al. |
| 6,417,549 B1 | 7/2002 | Oh |
| 6,421,820 B1 | 7/2002 | Mansfield et al. |
| 6,425,112 B1 | 7/2002 | Bula et al. |
| 6,425,117 B1 | 7/2002 | Pasch et al. |
| 6,426,269 B1 | 7/2002 | Haffner et al. |
| 6,436,805 B1 | 8/2002 | Trivedi |
| 6,445,049 B1 | 9/2002 | Iranmanesh |
| 6,445,065 B1 | 9/2002 | Gheewala et al. |
| 6,467,072 B1 | 10/2002 | Yang et al. |
| 6,469,328 B2 | 10/2002 | Yanai et al. |
| 6,470,489 B1 | 10/2002 | Chang et al. |
| 6,476,493 B2 | 11/2002 | Or-Bach et al. |
| 6,477,695 B1 | 11/2002 | Gandhi |
| 6,480,032 B1 | 11/2002 | Aksamit |
| 6,480,989 B2 | 11/2002 | Chan et al. |
| 6,492,066 B1 | 12/2002 | Capodieci et al. |
| 6,496,965 B1 | 12/2002 | van Ginneken et al. |
| 6,504,186 B2 | 1/2003 | Kanamoto et al. |

(56) References Cited

U.S. PATENT DOCUMENTS

| | | |
|---|---|---|
| 6,505,327 B2 | 1/2003 | Lin |
| 6,505,328 B1 | 1/2003 | van Ginneken et al. |
| 6,507,941 B1 | 1/2003 | Leung et al. |
| 6,509,952 B1 | 1/2003 | Govil et al. |
| 6,514,849 B1 | 2/2003 | Hui et al. |
| 6,516,459 B1 | 2/2003 | Sahouria |
| 6,523,156 B2 | 2/2003 | Cirit |
| 6,525,350 B1 | 2/2003 | Kinoshita et al. |
| 6,536,028 B1 | 3/2003 | Katsioulas et al. |
| 6,543,039 B1 | 4/2003 | Watanabe |
| 6,553,544 B2 | 4/2003 | Tanaka et al. |
| 6,553,559 B2 | 4/2003 | Liebmann et al. |
| 6,553,562 B2 | 4/2003 | Capodieci et al. |
| 6,566,720 B2 | 5/2003 | Aldrich |
| 6,570,234 B1 | 5/2003 | Gardner |
| 6,571,140 B1 | 5/2003 | Wewalaarachchi et al. |
| 6,571,379 B2 | 5/2003 | Takayama |
| 6,578,190 B2 | 6/2003 | Ferguson et al. |
| 6,588,005 B1 | 7/2003 | Kobayashi et al. |
| 6,590,289 B2 | 7/2003 | Shively |
| 6,591,207 B2 | 7/2003 | Naya et al. |
| 6,609,235 B2 | 8/2003 | Ramaswamy et al. |
| 6,610,607 B1 | 8/2003 | Armbrust et al. |
| 6,617,621 B1 | 9/2003 | Gheewala et al. |
| 6,620,561 B2 | 9/2003 | Winder et al. |
| 6,633,182 B2 | 10/2003 | Pileggi et al. |
| 6,635,935 B2 | 10/2003 | Makino |
| 6,642,744 B2 | 11/2003 | Or-Bach et al. |
| 6,643,831 B2 | 11/2003 | Chang et al. |
| 6,650,014 B2 | 11/2003 | Kariyazaki |
| 6,661,041 B2 | 12/2003 | Keeth |
| 6,662,350 B2 | 12/2003 | Fried et al. |
| 6,664,587 B2 | 12/2003 | Guterman et al. |
| 6,673,638 B1 | 1/2004 | Bendik et al. |
| 6,677,649 B2 | 1/2004 | Osada et al. |
| 6,687,895 B2 | 2/2004 | Zhang |
| 6,691,297 B1 | 2/2004 | Misaka et al. |
| 6,700,405 B1 | 3/2004 | Hirairi |
| 6,703,170 B1 | 3/2004 | Pindo |
| 6,709,880 B2 | 3/2004 | Yamamoto et al. |
| 6,714,903 B1 | 3/2004 | Chu et al. |
| 6,732,338 B2 | 5/2004 | Crouse et al. |
| 6,732,344 B2 | 5/2004 | Sakamoto et al. |
| 6,737,199 B1 | 5/2004 | Hsieh |
| 6,737,318 B2 | 5/2004 | Murata et al. |
| 6,737,347 B1 | 5/2004 | Houston et al. |
| 6,745,372 B2 | 6/2004 | Cote et al. |
| 6,745,380 B2 | 6/2004 | Bodendorf et al. |
| 6,749,972 B2 | 6/2004 | Yu |
| 6,750,555 B2 | 6/2004 | Satomi et al. |
| 6,760,269 B2 | 7/2004 | Nakase et al. |
| 6,765,245 B2 | 7/2004 | Bansal |
| 6,777,138 B2 | 8/2004 | Pierrat et al. |
| 6,777,146 B2 | 8/2004 | Samuels |
| 6,787,823 B2 | 9/2004 | Shibutani |
| 6,789,244 B1 | 9/2004 | Dasasathyan et al. |
| 6,789,246 B1 | 9/2004 | Mohan et al. |
| 6,792,591 B2 | 9/2004 | Shi et al. |
| 6,792,593 B2 | 9/2004 | Takashima et al. |
| 6,794,677 B2 | 9/2004 | Tamaki et al. |
| 6,794,914 B2 | 9/2004 | Sani et al. |
| 6,795,332 B2 | 9/2004 | Yamaoka et al. |
| 6,795,358 B2 | 9/2004 | Tanaka et al. |
| 6,795,952 B1 | 9/2004 | Stine et al. |
| 6,795,953 B2 | 9/2004 | Bakarian et al. |
| 6,800,883 B2 | 10/2004 | Furuya et al. |
| 6,807,663 B2 | 10/2004 | Cote et al. |
| 6,809,399 B2 | 10/2004 | Shimizu et al. |
| 6,812,574 B2 | 11/2004 | Tomita et al. |
| 6,818,389 B2 | 11/2004 | Fritze et al. |
| 6,818,929 B2 | 11/2004 | Tsutsumi et al. |
| 6,819,136 B2 | 11/2004 | Or-Bach |
| 6,826,738 B2 | 11/2004 | Cadouri |
| 6,834,375 B1 | 12/2004 | Stine et al. |
| 6,841,880 B2 | 1/2005 | Matsumoto et al. |
| 6,850,854 B2 | 2/2005 | Naya et al. |
| 6,854,096 B2 | 2/2005 | Eaton et al. |
| 6,854,100 B1 | 2/2005 | Chuang et al. |
| 6,871,338 B2 | 3/2005 | Yamauchi |
| 6,872,990 B1 | 3/2005 | Kang |
| 6,877,144 B1 | 4/2005 | Rittman et al. |
| 6,881,523 B2 | 4/2005 | Smith |
| 6,884,712 B2 | 4/2005 | Yelehanka et al. |
| 6,885,045 B2 | 4/2005 | Hidaka |
| 6,889,370 B1 | 5/2005 | Kerzman et al. |
| 6,897,517 B2 | 5/2005 | Van Houdt et al. |
| 6,897,536 B2 | 5/2005 | Nomura et al. |
| 6,898,770 B2 | 5/2005 | Boluki et al. |
| 6,904,582 B1 | 6/2005 | Rittman et al. |
| 6,918,104 B2 | 7/2005 | Pierrat et al. |
| 6,920,079 B2 | 7/2005 | Shibayama |
| 6,922,354 B2 | 7/2005 | Ishikura et al. |
| 6,928,635 B2 | 8/2005 | Pramanik et al. |
| 6,931,617 B2 | 8/2005 | Sanie et al. |
| 6,953,956 B2 | 10/2005 | Or-Bach et al. |
| 6,954,918 B2 | 10/2005 | Houston |
| 6,957,402 B2 | 10/2005 | Templeton et al. |
| 6,968,527 B2 | 11/2005 | Pierrat |
| 6,974,978 B1 | 12/2005 | Possley |
| 6,977,856 B2 | 12/2005 | Tanaka et al. |
| 6,978,436 B2 | 12/2005 | Cote et al. |
| 6,978,437 B1 | 12/2005 | Rittman et al. |
| 6,980,211 B2 | 12/2005 | Lin et al. |
| 6,992,394 B2 | 1/2006 | Park |
| 6,992,925 B2 | 1/2006 | Peng |
| 6,993,741 B2 | 1/2006 | Liebmann et al. |
| 6,994,939 B1 | 2/2006 | Ghandehari et al. |
| 7,003,068 B2 | 2/2006 | Kushner et al. |
| 7,009,862 B2 | 3/2006 | Higeta et al. |
| 7,016,214 B2 | 3/2006 | Kawamata |
| 7,022,559 B2 | 4/2006 | Barnak et al. |
| 7,028,285 B2 | 4/2006 | Cote et al. |
| 7,041,568 B2 | 5/2006 | Goldbach et al. |
| 7,052,972 B2 | 5/2006 | Sandhu et al. |
| 7,053,424 B2 | 5/2006 | Ono |
| 7,063,920 B2 | 6/2006 | Baba-Ali |
| 7,064,068 B2 | 6/2006 | Chou et al. |
| 7,065,731 B2 | 6/2006 | Jacques et al. |
| 7,079,989 B2 | 7/2006 | Wimer |
| 7,093,208 B2 | 8/2006 | Williams et al. |
| 7,093,228 B2 | 8/2006 | Andreev et al. |
| 7,103,870 B2 | 9/2006 | Misaka et al. |
| 7,105,871 B2 | 9/2006 | Or-Bach et al. |
| 7,107,551 B1 | 9/2006 | de Dood et al. |
| 7,115,343 B2 | 10/2006 | Gordon et al. |
| 7,115,920 B2 | 10/2006 | Bernstein et al. |
| 7,120,882 B2 | 10/2006 | Kotani et al. |
| 7,124,386 B2 | 10/2006 | Smith et al. |
| 7,126,837 B1 | 10/2006 | Banachowicz et al. |
| 7,132,203 B2 | 11/2006 | Pierrat |
| 7,137,092 B2 | 11/2006 | Maeda |
| 7,141,853 B2 | 11/2006 | Campbell et al. |
| 7,149,999 B2 | 12/2006 | Kahng et al. |
| 7,152,215 B2 | 12/2006 | Smith et al. |
| 7,155,685 B2 | 12/2006 | Mori et al. |
| 7,155,689 B2 | 12/2006 | Pierrat et al. |
| 7,159,197 B2 | 1/2007 | Falbo et al. |
| 7,174,520 B2 | 2/2007 | White et al. |
| 7,175,940 B2 | 2/2007 | Laidig et al. |
| 7,176,508 B2 | 2/2007 | Joshi et al. |
| 7,177,215 B2 | 2/2007 | Tanaka et al. |
| 7,185,294 B2 | 2/2007 | Zhang |
| 7,188,322 B2 | 3/2007 | Cohn et al. |
| 7,194,712 B2 | 3/2007 | Wu |
| 7,200,835 B2 | 4/2007 | Zhang et al. |
| 7,202,517 B2 | 4/2007 | Dixit et al. |
| 7,214,579 B2 | 5/2007 | Widdershoven et al. |
| 7,219,326 B2 | 5/2007 | Reed et al. |
| 7,221,031 B2 | 5/2007 | Ryoo et al. |
| 7,225,423 B2 | 5/2007 | Bhattacharya et al. |
| 7,227,183 B2 | 6/2007 | Donze et al. |
| 7,228,510 B2 | 6/2007 | Ono |
| 7,231,628 B2 | 6/2007 | Pack et al. |
| 7,235,424 B2 | 6/2007 | Chen et al. |

(56) References Cited

U.S. PATENT DOCUMENTS

| | | |
|---|---|---|
| 7,243,316 B2 | 7/2007 | White et al. |
| 7,252,909 B2 | 8/2007 | Shin et al. |
| 7,264,990 B2 | 9/2007 | Rueckes et al. |
| 7,269,803 B2 | 9/2007 | Khakzadi et al. |
| 7,278,118 B2 | 10/2007 | Pileggi et al. |
| 7,279,727 B2 | 10/2007 | Ikoma et al. |
| 7,287,320 B2 | 10/2007 | Wang et al. |
| 7,294,534 B2 | 11/2007 | Iwaki |
| 7,302,651 B2 | 11/2007 | Allen et al. |
| 7,308,669 B2 | 12/2007 | Buehler et al. |
| 7,312,003 B2 | 12/2007 | Cote et al. |
| 7,329,938 B2 | 2/2008 | Kinoshita |
| 7,335,966 B2 | 2/2008 | Ihme et al. |
| 7,337,421 B2 | 2/2008 | Kamat |
| 7,338,896 B2 | 3/2008 | Vanhaelemeersch et al. |
| 7,345,909 B2 | 3/2008 | Chang et al. |
| 7,346,885 B2 | 3/2008 | Semmler |
| 7,350,183 B2 | 3/2008 | Cui et al. |
| 7,353,492 B2 | 4/2008 | Gupta et al. |
| 7,360,179 B2 | 4/2008 | Smith et al. |
| 7,360,198 B2 | 4/2008 | Rana et al. |
| 7,366,997 B1 | 4/2008 | Rahmat et al. |
| 7,367,008 B2 | 4/2008 | White et al. |
| 7,376,931 B2 | 5/2008 | Kokubun |
| 7,383,521 B2 | 6/2008 | Smith et al. |
| 7,397,260 B2 | 7/2008 | Chanda et al. |
| 7,400,627 B2 | 7/2008 | Wu et al. |
| 7,402,848 B2 | 7/2008 | Chang et al. |
| 7,404,154 B1 | 7/2008 | Venkatraman et al. |
| 7,404,173 B2 | 7/2008 | Wu et al. |
| 7,411,252 B2 | 8/2008 | Anderson et al. |
| 7,421,678 B2 | 9/2008 | Barnes et al. |
| 7,423,298 B2 | 9/2008 | Mariyama et al. |
| 7,424,694 B2 | 9/2008 | Ikeda |
| 7,424,695 B2 | 9/2008 | Tamura et al. |
| 7,426,710 B2 | 9/2008 | Zhang et al. |
| 7,432,562 B2 | 10/2008 | Bhattacharyya |
| 7,434,185 B2 | 10/2008 | Dooling et al. |
| 7,441,211 B1 | 10/2008 | Gupta et al. |
| 7,442,630 B2 | 10/2008 | Kelberlau et al. |
| 7,444,609 B2 | 10/2008 | Charlebois et al. |
| 7,446,352 B2 | 11/2008 | Becker et al. |
| 7,449,371 B2 | 11/2008 | Kemerling et al. |
| 7,458,045 B2 | 11/2008 | Cote et al. |
| 7,459,792 B2 | 12/2008 | Chen |
| 7,465,973 B2 | 12/2008 | Chang et al. |
| 7,466,607 B2 | 12/2008 | Hollis et al. |
| 7,469,396 B2 | 12/2008 | Hayashi et al. |
| 7,480,880 B2 | 1/2009 | Visweswariah et al. |
| 7,480,891 B2 | 1/2009 | Sezginer |
| 7,484,197 B2 | 1/2009 | Allen et al. |
| 7,485,934 B2 | 2/2009 | Liaw |
| 7,487,475 B1 | 2/2009 | Kriplani et al. |
| 7,500,211 B2 | 3/2009 | Komaki |
| 7,502,275 B2 | 3/2009 | Nii et al. |
| 7,503,026 B2 | 3/2009 | Ichiryu et al. |
| 7,504,184 B2 | 3/2009 | Hung et al. |
| 7,506,300 B2 | 3/2009 | Sezginer et al. |
| 7,509,621 B2 | 3/2009 | Melvin, III |
| 7,509,622 B2 | 3/2009 | Sinha et al. |
| 7,512,017 B2 | 3/2009 | Chang |
| 7,512,921 B2 | 3/2009 | Shibuya |
| 7,514,959 B2 | 4/2009 | Or-Bach et al. |
| 7,523,429 B2 | 4/2009 | Kroyan et al. |
| 7,527,900 B2 | 5/2009 | Zhou et al. |
| 7,538,368 B2 | 5/2009 | Yano |
| 7,543,262 B2 | 6/2009 | Wang et al. |
| 7,563,701 B2 | 7/2009 | Chang et al. |
| 7,564,134 B2 | 7/2009 | Yang et al. |
| 7,568,174 B2 | 7/2009 | Sezginer et al. |
| 7,569,309 B2 | 8/2009 | Blatchford et al. |
| 7,569,310 B2 | 8/2009 | Wallace et al. |
| 7,569,894 B2 | 8/2009 | Suzuki |
| 7,575,973 B2 | 8/2009 | Mokhlesi et al. |
| 7,598,541 B2 | 10/2009 | Okamoto et al. |
| 7,598,558 B2 | 10/2009 | Hashimoto et al. |
| 7,614,030 B2 | 11/2009 | Hsu |
| 7,632,610 B2 | 12/2009 | Wallace et al. |
| 7,640,522 B2 | 12/2009 | Gupta et al. |
| 7,646,651 B2 | 1/2010 | Lee et al. |
| 7,653,884 B2 | 1/2010 | Furnish et al. |
| 7,665,051 B2 | 2/2010 | Ludwig et al. |
| 7,700,466 B2 | 4/2010 | Booth, Jr. et al. |
| 7,712,056 B2 | 5/2010 | White et al. |
| 7,739,627 B2 | 6/2010 | Chew et al. |
| 7,749,662 B2 | 7/2010 | Matthew et al. |
| 7,755,110 B2 | 7/2010 | Gliese et al. |
| 7,770,144 B2 | 8/2010 | Dellinger |
| 7,791,109 B2 | 9/2010 | Wann et al. |
| 7,802,219 B2 | 9/2010 | Tomar et al. |
| 7,825,437 B2 | 11/2010 | Pillarisetty et al. |
| 7,842,975 B2 | 11/2010 | Becker et al. |
| 7,873,929 B2 | 1/2011 | Kahng et al. |
| 7,882,456 B2 | 2/2011 | Zach |
| 7,888,705 B2 | 2/2011 | Becker et al. |
| 7,898,040 B2 | 3/2011 | Nawaz |
| 7,908,578 B2 | 3/2011 | Becker et al. |
| 7,910,958 B2 | 3/2011 | Becker et al. |
| 7,917,877 B2 | 3/2011 | Singh et al. |
| 7,917,879 B2 | 3/2011 | Becker et al. |
| 7,923,266 B2 | 4/2011 | Thijs et al. |
| 7,923,337 B2 | 4/2011 | Chang et al. |
| 7,932,545 B2 | 4/2011 | Becker et al. |
| 7,934,184 B2 | 4/2011 | Zhang |
| 7,958,465 B2 | 6/2011 | Lu et al. |
| 7,962,867 B2 | 6/2011 | White et al. |
| 7,962,879 B2 | 6/2011 | Tang et al. |
| 7,964,267 B1 | 6/2011 | Lyons et al. |
| 7,971,160 B2 | 6/2011 | Osawa et al. |
| 7,992,122 B1 | 8/2011 | Burstein et al. |
| 7,994,583 B2 | 8/2011 | Inaba |
| 8,004,042 B2 | 8/2011 | Yang et al. |
| 8,044,437 B1 | 10/2011 | Venkatraman et al. |
| 8,058,671 B2 | 11/2011 | Becker et al. |
| 8,058,690 B2 | 11/2011 | Chang |
| 8,072,053 B2 | 12/2011 | Li |
| 8,130,529 B2 | 3/2012 | Tanaka |
| 8,161,427 B2 | 4/2012 | Morgenshtein et al. |
| 8,178,905 B2 | 5/2012 | Toubou |
| 8,178,909 B2 | 5/2012 | Venkatraman et al. |
| 8,225,239 B2 | 7/2012 | Reed et al. |
| 8,378,407 B2 | 2/2013 | Audzeyeu et al. |
| 8,422,274 B2 | 4/2013 | Tomita et al. |
| 2002/0003270 A1 | 1/2002 | Makino |
| 2002/0015899 A1 | 2/2002 | Chen et al. |
| 2002/0030510 A1 | 3/2002 | Kono et al. |
| 2002/0079927 A1 | 6/2002 | Katoh et al. |
| 2002/0149392 A1 | 10/2002 | Cho |
| 2002/0166107 A1 | 11/2002 | Capodieci et al. |
| 2002/0194575 A1 | 12/2002 | Allen et al. |
| 2003/0042930 A1 | 3/2003 | Pileggi et al. |
| 2003/0046653 A1 | 3/2003 | Liu |
| 2003/0061592 A1 | 3/2003 | Agrawal et al. |
| 2003/0088839 A1 | 5/2003 | Watanabe |
| 2003/0088842 A1 | 5/2003 | Cirit |
| 2003/0106037 A1 | 6/2003 | Moniwa et al. |
| 2003/0117168 A1 | 6/2003 | Uneme et al. |
| 2003/0126569 A1 | 7/2003 | Rich et al. |
| 2003/0145288 A1 | 7/2003 | Wang et al. |
| 2003/0145299 A1 | 7/2003 | Fried et al. |
| 2003/0177465 A1 | 9/2003 | MacLean et al. |
| 2003/0185076 A1 | 10/2003 | Worley |
| 2003/0229868 A1 | 12/2003 | White et al. |
| 2003/0229875 A1 | 12/2003 | Smith et al. |
| 2004/0049754 A1 | 3/2004 | Liao et al. |
| 2004/0063038 A1 | 4/2004 | Shin et al. |
| 2004/0115539 A1 | 6/2004 | Broeke et al. |
| 2004/0139412 A1 | 7/2004 | Ito et al. |
| 2004/0145028 A1 | 7/2004 | Matsumoto et al. |
| 2004/0153979 A1 | 8/2004 | Chang |
| 2004/0161878 A1 | 8/2004 | Or-Bach et al. |
| 2004/0169201 A1 | 9/2004 | Hidaka |
| 2004/0194050 A1 | 9/2004 | Hwang et al. |
| 2004/0196705 A1 | 10/2004 | Ishikura et al. |

(56) References Cited

U.S. PATENT DOCUMENTS

| | | |
|---|---|---|
| 2004/0229135 A1 | 11/2004 | Wang et al. |
| 2004/0232444 A1 | 11/2004 | Shimizu |
| 2004/0243966 A1 | 12/2004 | Dellinger |
| 2004/0262640 A1 | 12/2004 | Suga |
| 2005/0009312 A1 | 1/2005 | Butt et al. |
| 2005/0009344 A1 | 1/2005 | Hwang et al. |
| 2005/0012157 A1 | 1/2005 | Ryoo et al. |
| 2005/0055828 A1 | 3/2005 | Wang et al. |
| 2005/0076320 A1 | 4/2005 | Maeda |
| 2005/0087806 A1 | 4/2005 | Hokazono |
| 2005/0093147 A1 | 5/2005 | Tu |
| 2005/0101112 A1 | 5/2005 | Rueckes et al. |
| 2005/0110130 A1 | 5/2005 | Kitabayashi et al. |
| 2005/0135134 A1 | 6/2005 | Yen et al. |
| 2005/0136340 A1 | 6/2005 | Baselmans et al. |
| 2005/0138598 A1 | 6/2005 | Kokubun |
| 2005/0156200 A1 | 7/2005 | Kinoshita |
| 2005/0185325 A1 | 8/2005 | Hur |
| 2005/0189604 A1 | 9/2005 | Gupta et al. |
| 2005/0189614 A1 | 9/2005 | Ihme et al. |
| 2005/0196685 A1 | 9/2005 | Wang et al. |
| 2005/0205894 A1 | 9/2005 | Sumikawa et al. |
| 2005/0212018 A1 | 9/2005 | Schoellkopf et al. |
| 2005/0224982 A1 | 10/2005 | Kemerling et al. |
| 2005/0229130 A1 | 10/2005 | Wu et al. |
| 2005/0251771 A1 | 11/2005 | Robles |
| 2005/0264320 A1 | 12/2005 | Chan et al. |
| 2005/0264324 A1 | 12/2005 | Nakazato et al. |
| 2005/0266621 A1 | 12/2005 | Kim |
| 2005/0268256 A1 | 12/2005 | Tsai et al. |
| 2005/0280031 A1 | 12/2005 | Yano |
| 2006/0038234 A1 | 2/2006 | Liaw |
| 2006/0063334 A1 | 3/2006 | Donze et al. |
| 2006/0070018 A1 | 3/2006 | Semmler |
| 2006/0084261 A1 | 4/2006 | Iwaki |
| 2006/0091550 A1 | 5/2006 | Shimazaki et al. |
| 2006/0095872 A1 | 5/2006 | McElvain et al. |
| 2006/0101370 A1 | 5/2006 | Cui et al. |
| 2006/0112355 A1 | 5/2006 | Pileggi et al. |
| 2006/0113567 A1 | 6/2006 | Ohmori et al. |
| 2006/0120143 A1 | 6/2006 | Liaw |
| 2006/0121715 A1 | 6/2006 | Chang et al. |
| 2006/0123376 A1 | 6/2006 | Vogel et al. |
| 2006/0125024 A1 | 6/2006 | Ishigaki |
| 2006/0131609 A1 | 6/2006 | Kinoshita et al. |
| 2006/0136848 A1 | 6/2006 | Ichiryu et al. |
| 2006/0146638 A1 | 7/2006 | Chang et al. |
| 2006/0151810 A1 | 7/2006 | Ohshige |
| 2006/0158270 A1 | 7/2006 | Gibet et al. |
| 2006/0177744 A1 | 8/2006 | Bodendorf et al. |
| 2006/0181310 A1 | 8/2006 | Rhee |
| 2006/0195809 A1 | 8/2006 | Cohn et al. |
| 2006/0197557 A1 | 9/2006 | Chung |
| 2006/0206854 A1 | 9/2006 | Barnes et al. |
| 2006/0223302 A1 | 10/2006 | Chang et al. |
| 2006/0248495 A1 | 11/2006 | Sezginer |
| 2007/0001304 A1 | 1/2007 | Liaw |
| 2007/0002617 A1 | 1/2007 | Houston et al. |
| 2007/0038973 A1 | 2/2007 | Li et al. |
| 2007/0074145 A1 | 3/2007 | Tanaka |
| 2007/0094634 A1 | 4/2007 | Seizginer et al. |
| 2007/0101305 A1 | 5/2007 | Smith et al. |
| 2007/0105023 A1 | 5/2007 | Zhou et al. |
| 2007/0106971 A1 | 5/2007 | Lien et al. |
| 2007/0113216 A1 | 5/2007 | Zhang |
| 2007/0172770 A1 | 7/2007 | Witters et al. |
| 2007/0196958 A1 | 8/2007 | Bhattacharya et al. |
| 2007/0209029 A1 | 9/2007 | Ivonin et al. |
| 2007/0210391 A1 | 9/2007 | Becker et al. |
| 2007/0234252 A1 | 10/2007 | Visweswariah et al. |
| 2007/0251771 A1 | 11/2007 | Huang |
| 2007/0256039 A1 | 11/2007 | White |
| 2007/0257277 A1 | 11/2007 | Takeda et al. |
| 2007/0274140 A1 | 11/2007 | Joshi et al. |
| 2007/0277129 A1 | 11/2007 | Allen et al. |
| 2007/0288882 A1 | 12/2007 | Kniffin et al. |
| 2007/0290361 A1 | 12/2007 | Chen |
| 2007/0294652 A1 | 12/2007 | Bowen |
| 2007/0297249 A1 | 12/2007 | Chang et al. |
| 2008/0005712 A1 | 1/2008 | Charlebois et al. |
| 2008/0046846 A1 | 2/2008 | Chew et al. |
| 2008/0082952 A1 | 4/2008 | O'Brien |
| 2008/0086712 A1 | 4/2008 | Fujimoto |
| 2008/0097641 A1 | 4/2008 | Miyashita et al. |
| 2008/0098334 A1 | 4/2008 | Pileggi et al. |
| 2008/0099795 A1 | 5/2008 | Bernstein et al. |
| 2008/0127000 A1 | 5/2008 | Majumder et al. |
| 2008/0127029 A1 | 5/2008 | Graur et al. |
| 2008/0134128 A1 | 6/2008 | Blatchford et al. |
| 2008/0144361 A1 | 6/2008 | Wong |
| 2008/0148216 A1 | 6/2008 | Chan et al. |
| 2008/0163141 A1 | 7/2008 | Scheffer et al. |
| 2008/0168406 A1 | 7/2008 | Rahmat et al. |
| 2008/0211028 A1 | 9/2008 | Suzuki |
| 2008/0216207 A1 | 9/2008 | Tsai |
| 2008/0244494 A1 | 10/2008 | McCullen |
| 2008/0265290 A1 | 10/2008 | Nielsen et al. |
| 2008/0276105 A1 | 11/2008 | Hoberman et al. |
| 2008/0283910 A1 | 11/2008 | Dreeskornfeld et al. |
| 2008/0285331 A1 | 11/2008 | Torok et al. |
| 2008/0308848 A1 | 12/2008 | Inaba |
| 2008/0315258 A1 | 12/2008 | Masuda et al. |
| 2009/0014811 A1 | 1/2009 | Becker et al. |
| 2009/0024974 A1 | 1/2009 | Yamada |
| 2009/0031261 A1 | 1/2009 | Smith et al. |
| 2009/0032898 A1 | 2/2009 | Becker et al. |
| 2009/0032967 A1 | 2/2009 | Becker et al. |
| 2009/0037864 A1 | 2/2009 | Becker et al. |
| 2009/0075485 A1 | 3/2009 | Ban et al. |
| 2009/0077524 A1 | 3/2009 | Nagamura et al. |
| 2009/0085067 A1 | 4/2009 | Hayashi et al. |
| 2009/0087991 A1 | 4/2009 | Yatsuda et al. |
| 2009/0101940 A1 | 4/2009 | Barrows et al. |
| 2009/0106714 A1 | 4/2009 | Culp et al. |
| 2009/0155990 A1 | 6/2009 | Yanagidaira et al. |
| 2009/0181314 A1 | 7/2009 | Shyu et al. |
| 2009/0187871 A1 | 7/2009 | Cork |
| 2009/0206443 A1 | 8/2009 | Juengling |
| 2009/0224408 A1 | 9/2009 | Fox |
| 2009/0228853 A1 | 9/2009 | Hong et al. |
| 2009/0273100 A1 | 11/2009 | Aton et al. |
| 2009/0280582 A1 | 11/2009 | Thijs et al. |
| 2009/0302372 A1 | 12/2009 | Chang et al. |
| 2009/0319977 A1 | 12/2009 | Saxena et al. |
| 2010/0001321 A1 | 1/2010 | Becker et al. |
| 2010/0006897 A1 | 1/2010 | Becker et al. |
| 2010/0006898 A1 | 1/2010 | Becker et al. |
| 2010/0006899 A1 | 1/2010 | Becker et al. |
| 2010/0006900 A1 | 1/2010 | Becker et al. |
| 2010/0006901 A1 | 1/2010 | Becker et al. |
| 2010/0006902 A1 | 1/2010 | Becker et al. |
| 2010/0006903 A1 | 1/2010 | Becker et al. |
| 2010/0006947 A1 | 1/2010 | Becker et al. |
| 2010/0006948 A1 | 1/2010 | Becker et al. |
| 2010/0006950 A1 | 1/2010 | Becker et al. |
| 2010/0006951 A1 | 1/2010 | Becker et al. |
| 2010/0006986 A1 | 1/2010 | Becker et al. |
| 2010/0011327 A1 | 1/2010 | Becker et al. |
| 2010/0011328 A1 | 1/2010 | Becker et al. |
| 2010/0011329 A1 | 1/2010 | Becker et al. |
| 2010/0011330 A1 | 1/2010 | Becker et al. |
| 2010/0011331 A1 | 1/2010 | Becker et al. |
| 2010/0011332 A1 | 1/2010 | Becker et al. |
| 2010/0011333 A1 | 1/2010 | Becker et al. |
| 2010/0012981 A1 | 1/2010 | Becker et al. |
| 2010/0012982 A1 | 1/2010 | Becker et al. |
| 2010/0012983 A1 | 1/2010 | Becker et al. |
| 2010/0012984 A1 | 1/2010 | Becker et al. |
| 2010/0012985 A1 | 1/2010 | Becker et al. |
| 2010/0012986 A1 | 1/2010 | Becker et al. |
| 2010/0017766 A1 | 1/2010 | Becker et al. |
| 2010/0017767 A1 | 1/2010 | Becker et al. |
| 2010/0017768 A1 | 1/2010 | Becker et al. |
| 2010/0017769 A1 | 1/2010 | Becker et al. |

(56) References Cited

U.S. PATENT DOCUMENTS

| | | |
|---|---|---|
| 2010/0017770 A1 | 1/2010 | Becker et al. |
| 2010/0017771 A1 | 1/2010 | Becker et al. |
| 2010/0017772 A1 | 1/2010 | Becker et al. |
| 2010/0019280 A1 | 1/2010 | Becker et al. |
| 2010/0019281 A1 | 1/2010 | Becker et al. |
| 2010/0019282 A1 | 1/2010 | Becker et al. |
| 2010/0019283 A1 | 1/2010 | Becker et al. |
| 2010/0019284 A1 | 1/2010 | Becker et al. |
| 2010/0019285 A1 | 1/2010 | Becker et al. |
| 2010/0019286 A1 | 1/2010 | Becker et al. |
| 2010/0019287 A1 | 1/2010 | Becker et al. |
| 2010/0019288 A1 | 1/2010 | Becker et al. |
| 2010/0019308 A1 | 1/2010 | Chan et al. |
| 2010/0023906 A1 | 1/2010 | Becker et al. |
| 2010/0023907 A1 | 1/2010 | Becker et al. |
| 2010/0023908 A1 | 1/2010 | Becker et al. |
| 2010/0023911 A1 | 1/2010 | Becker et al. |
| 2010/0025731 A1 | 2/2010 | Becker et al. |
| 2010/0025732 A1 | 2/2010 | Becker et al. |
| 2010/0025733 A1 | 2/2010 | Becker et al. |
| 2010/0025734 A1 | 2/2010 | Becker et al. |
| 2010/0025735 A1 | 2/2010 | Becker et al. |
| 2010/0025736 A1 | 2/2010 | Becker et al. |
| 2010/0032722 A1 | 2/2010 | Becker et al. |
| 2010/0032723 A1 | 2/2010 | Becker et al. |
| 2010/0032724 A1 | 2/2010 | Becker et al. |
| 2010/0032726 A1 | 2/2010 | Becker et al. |
| 2010/0037194 A1 | 2/2010 | Becker et al. |
| 2010/0037195 A1 | 2/2010 | Becker et al. |
| 2010/0096671 A1 | 4/2010 | Becker et al. |
| 2010/0203689 A1 | 8/2010 | Bernstein et al. |
| 2010/0224943 A1 | 9/2010 | Kawasaki |
| 2010/0229140 A1 | 9/2010 | Strolenberg et al. |
| 2010/0232212 A1 | 9/2010 | Anderson et al. |
| 2010/0264468 A1 | 10/2010 | Xu |
| 2010/0270681 A1 | 10/2010 | Bird et al. |
| 2010/0287518 A1 | 11/2010 | Becker |
| 2011/0016909 A1 | 1/2011 | Mirza et al. |
| 2011/0108890 A1 | 5/2011 | Becker et al. |
| 2011/0108891 A1 | 5/2011 | Becker et al. |
| 2011/0154281 A1 | 6/2011 | Zach |
| 2011/0207298 A1 | 8/2011 | Anderson et al. |
| 2011/0260253 A1 | 10/2011 | Inaba |
| 2011/0298025 A1 | 12/2011 | Haensch et al. |
| 2012/0012932 A1 | 1/2012 | Perng et al. |

FOREIGN PATENT DOCUMENTS

| | | |
|---|---|---|
| EP | 1394858 | 3/2004 |
| EP | 1670062 | 6/2006 |
| EP | 1833091 | 8/2007 |
| EP | 1730777 | 9/2007 |
| EP | 2251901 | 11/2010 |
| FR | 2860920 | 4/2005 |
| JP | 2684980 | 7/1995 |
| JP | 1995-302706 | 11/1995 |
| JP | 1997-09289251 A | 11/1997 |
| JP | 10-116911 | 5/1998 |
| JP | 1999-045948 | 2/1999 |
| JP | 2001-068558 | 3/2001 |
| JP | 2002-026125 | 1/2002 |
| JP | 2002-184870 A | 6/2002 |
| JP | 2001-056463 | 9/2002 |
| JP | 2002-258463 | 9/2002 |
| JP | 2002-289703 | 10/2002 |
| JP | 2001-272228 | 3/2003 |
| JP | 2004-013920 | 1/2004 |
| JP | 2004-200300 | 7/2004 |
| JP | 2005-020008 | 1/2005 |
| JP | 2003-359375 | 5/2005 |
| JP | 2005-135971 A | 5/2005 |
| JP | 2005-149265 | 6/2005 |
| JP | 2005-203447 | 7/2005 |
| JP | 2005-114752 | 10/2006 |
| JP | 2006-303022 A | 11/2006 |
| KR | 10-0417093 | 6/1997 |
| KR | 10-1998-087485 | 12/1998 |
| KR | 1998-0084215 A | 12/1998 |
| KR | 10-1999-0057943 A | 7/1999 |
| KR | 10-2000-0028830 A | 5/2000 |
| KR | 10-2002-0034313 | 5/2002 |
| KR | 10-2002-0070777 | 9/2002 |
| KR | 2003-0022006 | 3/2003 |
| KR | 10-2005-0030347 A | 3/2005 |
| KR | 2005-0037965 A | 4/2005 |
| KR | 2006-0108233 A | 10/2006 |
| TW | 386288 | 4/2000 |
| WO | WO 2005/104356 | 11/2005 |
| WO | WO 2006/014849 | 2/2006 |
| WO | WO 2006/052738 | 5/2006 |
| WO | WO 2007/014053 | 2/2007 |
| WO | WO 2007/103587 | 9/2007 |

OTHER PUBLICATIONS

Amazawa, et al., "Fully Planarized Four-Level Interconnection with Stacked VLAS Using CMP of Selective CVD-A1 and Insulator and its Application to Quarter Micron Gate Array LSIs", 1995, IEEE, Japan, pp. 473-476.

Axelrad et al. "Efficient Full-Chip Yield Analysis Methodology for OPC-Corrected VLSI Design", 2000, International Symposium on Quality Electronic Design (ISQED).

Balasinski et al. "Impact of Subwavelength CD Tolerance on Device Performance", 2002, SPIE.

Burkhardt, et al., "Dark Field Double Dipole Lithography (DDL) for Back-End-Of-Line Processes", 2007, SPIE Proceeding Series, vol. 6520; 65200K.

Capetti, et al., "Sub k1=0.25 Lithography with Double Patterning Technique for 45nm Technology Node Flash Memory Devices at λ=193nm", 2007, SPIE Proceeding Series, vol. 6520; 65202K.

Capodieci, L., et al., "Toward a Methodology for Manufacturability-Driven Design Rule Exploration," DAC 2004, Jun. 7-11, 2004, San Diego, CA.

Chandra, et al., "An Interconnect Channel Design Methodology for High Performance Integrated Circuits", 2004, IEEE, Carnegie Mellon University, pp. 1-6.

Cheng, et al., "Feasibility Study of Splitting Pitch Technology on 45nm Contact Patterning with 0.93 NA", 2007, SPIE Proceeding Series, vol. 6520; 65202N.

Chow, et al., "The Design of a SRAM-Based Field-Programmable Gate Array—Part II: Circuit Design and Layout", 1999, IEEE, vol. 7 # 3 pp. 321-330.

Clark et al. "Managing Standby and Active Mode Leakage Power in Deep Sub-Micron Design", Aug. 9-11, 2004, ACM.

Cobb et al. "Using OPC to Optimize for Image Slope and Improve Process Window", 2003, SPIE.

Devgan "Leakage Issues in IC Design: Part 3", 2003, CCAD.

DeVor, et al., "Statistical Quality Design and Control", 1992, Macmillan Publishing Company, pp. 264-267.

Dictionary.com, "channel," in Collins English Dictionary—Complete & Unabridged 10th Edition. Source location: HarperCollins Publishers. http://dictionary.reference.com/browse/channel. Available: http://dictionary.reference.com.

Dusa, et al. "Pitch Doubling Through Dual Patterning Lithography Challenges in Integration and Litho Budgets", 2007, SPIE Proceeding Series, vol. 6520; 65200G.

El-Gamal, "Fast, Cheap and Under Control: The Next Implementation Fabric", Jun. 2-6, 2003, ACM Press, pp. 354-355.

Firedberg, et al., "Modeling Within-Field Gate Length Spatial Variation for Process-Design Co-Optimization," 2005 Proc. of SPIE vol. 5756, pp. 178-188.

Frankel, "Quantum State Control Interference Lithography and Trim Double Patterning for 32-16nm Lithography", 2007, SPIE Proceeding Series, vol. 6520; 65202L.

Garg, et al. " Lithography Driven Layout Design", 2005, IEEE.

Grobman et al. "Reticle Enhancement Technology Trends: Resource and Manufacturability Implications for the Implementation of Physical Designs" Apr. 1-4, 2001, ACM.

(56) References Cited

OTHER PUBLICATIONS

Grobman et al. "Reticle Enhancement Technology: Implications and Challenges for Physical Design" Jun. 18-22, 2001, ACM.

Gupta et al. "Enhanced Resist and Etch CD Control by Design Perturbation", Oct. 4-7, 2006, Society of Photo-Optical Instrumentation Engineers.

Gupta et al. "A Practical Transistor-Level Dual Threshold Voltage Assignment Methodology", 2005, Sixth International Symposium on Quality Electronic Design (ISQED).

Gupta et al. "Detailed Placement for Improved Depth of Focus and CD Control", 2005, ACM.

Gupta et al. "Joining the Design and Mask Flows for Better and Cheaper Masks", Oct. 14-17, 2004, Society of Photo-Optical Instrumentation Engineers.

Gupta et al. "Manufacturing-Aware Physical Design", 2003, ACM.

Gupta et al. "Selective Gate-Length Biasing for Cost-Effective Runtime Leakage Control", Jun. 7-11, 2004, ACM.

Gupta et al. "Wafer Topography-Aware Optical Proximity Correction for Better DOF Margin and CD Control", Apr. 13-15, 2005, SPIE.

Gupta, Puneet, et al., "Manufacturing-aware Design Methodology for Assist Feature Correctness," 2005.

Ha et al., "Reduction in the Mask Error Factor by Optimizing the Diffraction Order of a Scattering Bar in Lithography," Journal of the Korean Physical Society, vol. 46, No. 5, May 2005, pp. 1213-1217.

Hakko, et al., "Extension of the 2D-TCC Technique to Optimize Mask Pattern Layouts," 2008 Proc. of SPIE vol. 7028, 11 pages.

Halpin et al., "Detailed Placement with Net Length Constraints," Publication Year 2003, Proceedings of the 3rd IEEE International Workshop on System-on-Chip for Real-Time Applications, pp. 22-27.

Hayashida, et al., "Manufacturable Local Interconnect technology Fully Compatible with Titanium Salicide Process", Jun. 11-12, 1991, VMIC Conference.

Heng, et al., "A VLSI Artwork Legalization Technique Base on a New Criterion of Minimum Layout Perturbation", 1997, ACM Press, pp. 116-121.

Heng, et al., "Toward Through-Process Layout Quality Metrics", Mar. 3-4, 2005, Society of Photo-Optical Instrumentation Engineers.

Hu, et al., "Synthesis and Placement Flow for Gain-Based Programmable Regular Fabrics", Apr. 6-9, 2003, ACM Press, pp. 197-203.

Hur et al., "Mongrel: Hybrid Techniques for Standard Cell Placement," Publication Year 2000, IEEE/ACM International Conference on Computer Aided Design, ICCAD-2000, pp. 165-170.

Hutton, et al., "A Methodology for FPGA to Structured-ASIC Synthesis and Verification", 2006, EDAA, pp. 64-69.

Intel Core Microarchitecture White Paper "Introducing the 45 um Next-Generation Intel Core Microarchitecture," 2007, Intel Corporation.

Jayakumar, et al., "A Metal and VIA Maskset Programmable VLSI Design Methodology using PLAs", 2004, IEEE, pp. 590-594.

Jhaveri, T. et al., Maximization of Layout Printability/Manufacturability by Extreme Layout Regularity, Proc. of the SPIE, Apr. 2006.

Kang, S.M., Metal-Metal Matrix (M3) for High-Speed MOS VLSI Layout, IEEE Trans. on CAD, vol. CAD-6, No. 5, Sep. 1987.

Kawashima, et al., "Mask Optimization for Arbitrary Patterns with 2D-TCC Resolution Enhancement Technique," 2008 Proc. of SPIE vol. 6924, 12 pages.

Kheterpal, et al., "Design Methodology for IC Manufacturability Based on Regular Logic-Bricks", DAC, Jun. 13-17, 2005, IEEE/AMC, vol. 6520.

Kheterpal, et al., "Routing Architecture Exploration for Regular Fabrics", DAC, Jun. 7-11, 2004, ACM Press, pp. 204-207.

Kim, et al., "Double Exposure Using 193nm Negative Tone Photoresist", 2007, SPIE Proceeding Series, vol. 6520; 65202M.

Kim, et al., "Issues and Challenges of Double Patterning Lithography in DRAM", 2007, SPIE Proceeding Series, vol. 6520; 65200H.

Koorapaty, et al., "Exploring Logic Block Granularity for Regular Fabrics", 2004, IEEE, pp. 1-6.

Koorapaty, et al., "Heterogeneous Logic Block Architectures for Via-Patterned Programmable Fabric", 13th International Conference on Field Programmable Logic and Applications (FPL) 2003, Lecture Notes in Computer Science (LNCS), Sep. 2003, Springer-Verlag, vol. 2778, pp. 426-436.

Koorapaty, et al., "Modular, Fabric-Specific Synthesis for Programmable Architectures", 12th International Conference on Field Programmable Logic and Applications (FPL_2002, Lecture Notes in Computer Science (LNCS)), Sep. 2002, Springer-Verlag, vol. 2438 pp. 132-141.

Kuh et al., "Recent Advances in VLSI Layout," Publication Year 1990, Proceedings of the IEEE, vol. 78, Issue 2, pp. 237-263.

Lavin et al. "Backend DAC Flows for "Restrictive Design Rules"", 2004, IEEE.

Li, et al., "A Linear-Centric Modeling Approach to Harmonic Balance Analysis", 2002, IEEE, pp. 1-6.

Li, et al., "Nonlinear Distortion Analysis Via Linear-Centric Models", 2003, IEEE, pp. 897-903.

Liebmann et al., "Integrating DfM Components Into a Cohesive Design-To-Silicon Solution", IBM Systems and Technology Group, b IBM Research, pp. 1-12.

Liebmann et al., "Optimizing Style Options for Sub-Resolution Assist Features," Proc. of SPIE vol. 4346, 2001, pp. 141-152.

Liebmann, et al., "High-Performance Circuit Design for the RET-Enabled 65nm Technology Node", Feb. 26-27, 2004, SPIE Proceeding Series, vol. 5379 pp. 20-29.

Liebmann, L. W., Layout Impact of Resolution Enhancement Techniques: Impediment or Opportunity?, International Symposium on Physical Design, 2003.

Liu, et al., "Double Patterning with Multilayer Hard Mask Shrinkage for Sub-0.25 k1 Lithography", 200, SPIE Proceeding Series, vol. 6520; 65202J.

Mansfield et al., "Lithographic Comparison of Assist Feature Design Strategies," Proc. of SPIE vol. 4000, 2000, pp. 63-76.

Miller, "Manufacturing-Aware Design Helps Boost IC Yield", Sep. 9, 2004, http://www.eetimes.com/showArticle.jhtml?articleID=47102054.

Mishra, P., et al., "FinFET Circuit Design," Nanoelectronic Circuit Design, pp. 23-54, 2011.

Mo, et al., "Checkerboard: A Regular Structure and its Synthesis, International Workshop on Logic and Synthesis", 2003, Department of Electrical Engineering and Computer Sciences, UC Berkeley, California, pp. 1-7.

Mo, et al., "PLA-Based Regular Structures and Their Synthesis", 2003, Department of Electrical Engineering and Computer Sciences, IEEE, pp. 723-729.

Mo, et al., "Regular Fabrics in Deep Sub-Micron Integrated-Circuit Design", 2004, Kluwer Academic Publishers, Entire Book.

Moore, Samuel K., "Intel 45-nanometer Penryn Processors Arrive," Nov. 13, 2007, IEEE Spectrum, http://spectrum-ieee.org/semiconductors/design/intel-45nanometer-penryn-processors-arrive.

Mutoh et al. "1-V Power Supply High-Speed Digital Circuit Technology with Multithreshold-Voltage CMOS", 1995, IEEE.

Op de Beek, et al., "Manufacturability issues with Double Patterning for 50nm half pitch damascene applications, using RELACS® shrink and corresponding OPC", 2007, SPIE Proceeding Series, vol. 6520; 65200I.

Or-Bach, "Programmable Circuit Fabrics", Sep. 18, 2001, e-Asic, pp. 1-36.

Otten, et al., "Planning for Performance", DAC 1998, ACM Inc., pp. 122-127.

Pack et al. "Physical & Timing Verification of Subwavelength-Scale Designs—Part I: Lithography Impact on MOSFETs", 2003, SPIE.

Pandini, et al., "Congestion-Aware Logic Synthesis", 2002, IEEE, pp. 1-8.

Pandini, et al., "Understanding and Addressing the Impact of Wiring Congestion During Technology Mapping", ISPD Apr. 7-10, 2002, ACM Press, pp. 131-136.

Patel, et al., "An Architectural Exploration of Via Patterned Gate Arrays, ISPD 2003", Apr. 6, 2003, pp. 184-189.

Pham, D., et al., "FINFET Device Junction Formation Challenges," 2006 International Workshop on Junction Technology, pp. 73-77, Aug. 2006.

(56) References Cited

OTHER PUBLICATIONS

Pileggi, et al., "Exploring Regular Fabrics to Optimize the Performance-Cost Trade-Offs, Proceedings of the 40th ACM/IEEE Design Automation Conference (DAC) 2003", Jun. 2003, ACM Press, pp. 782-787.
Poonawala, et al., "ILT for Double Exposure Lithography with Conventional and Novel Materials", 2007, SPIE Proceeding Series, vol. 6520; 65202Q.
Qian et al. "Advanced Physical Models for Mask Data Verification and Impacts on Physical Layout Synthesis" 2003. IEEE.
Ran, et al., "An Integrated Design Flow for a Via-Configurable Gate Array", 2004, IEEE, pp. 582-589.
Ran, et al., "Designing a Via-Configurable Regular Fabric", Custom Integrated Circuits Conference (CICC). Proceedings of the IEEE, Oct. 2004, Oct. 1, 2004, pp. 423-426.
Ran, et al., "On Designing Via-Configurable Cell Blocks for Regular Fabrics" Proceedings of the Design Automation Conference (DAC) 2004, Jun. 2004, ACM Press, s 198-203.
Ran, et al., "The Magic of a Via-Configurable Regular Fabric", Proceedings of the IEEE International Conference on Computer Design (ICCD) Oct. 2004.
Ran, et al., "Via-Configurable Routing Architectures and Fast Design Mappability Estimation for Regular Fabrics", 2005, IEEE, pp. 25-32.
Reis, et al., "Physical Design Methodologies for Performance Predictability and Manufacturability", Apr. 14-16, 2004, ACM Press, pp. 390-397.
Robertson, et al., "The Modeling of Double Patterning Lithographic Processes", 2007, SPIE Proceeding Series, vol. 6520; 65200J.
Rosenbluth, et al., "Optimum Mask and Source Patterns to Print a Given Shape," 2001 Proc. of SPIE vol. 4346, pp. 486-502.
Rovner, "Design for Manufacturability in Via Programmable Gate Arrays", May 2003, Graduate School of Carnegie Mellon University.
Sengupta, "An Integrated CAD Framework Linking VLSI Layout Editors and Process Simulators", 1998, Thesis for Rice University, pp. l-101.
Sengupta, et al., "An Integrated CAD Framework Linking VLSI Layout Editors and Process Simulators", 1996, SPIE Proceeding Series, vol. 2726; pp. 244-252.
Sherlekar, "Design Considerations for Regular Fabrics", Apr. 18-21, 2004, ACM Press, pp. 97-102.
Shi et al., "Understanding the Forbidden Pitch and Assist Feature Placement," Proc. of SPIE vol. 4562, 2002, pp. 968-979.
Smayling et al., "APF Pitch Halving for 22 nm Logic Cells Using Gridded Design Rules," Proceedings of SPIE, USA, vol. 6925, Jan. 1, 2008, pp. 69251E-1-69251E-7.
Socha, et al., "Simultaneous Source Mask Optimization (SMO)," 2005 Proc. of SPIE vol. 5853, pp. 180-193.
Sreedhar et al. "Statistical Yield Modeling for Sub-Wavelength Lithography", 2008, IEEE.
Stapper, "Modeling of Defects in Integrated Circuit Photolithographic Patterns", Jul. 1, 1984, IBM, vol. 28 # 4, pp. 461-475.
Taylor, et al., "Enabling Energy Efficiency in Via-Patterned Gate Array Devices", Jun. 7-11, 2004, ACM Press, pp. 874-877.
Tian et al. "Model-Based Dummy Feature Placement for Oxide Chemical_Mechanical Polishing Manufacturability" 2000, ACM.
Tong, et al., "Regular Logic Fabrics for a Via Patterned Gate Array (VPGA), Custom Integrated Circuits Conference", Sep. 2003, Proceedings of the IEEE, pp. 53-56.
Vanleenhove, et al., "A Litho-Only Approach to Double Patterning", 2007, SPIE Proceeding Series, vol. 6520; 65202F.
Wang, et al., "Performance Optimization for Gridded-Layout Standard Cells", 2004, vol. 5567 SPIE.
Wang, J. et al., "Standard Cell Layout with Regular Contact Placement, IEEE Trans. on Semicon. Mfg., vol. 17, No. 3, Aug. 2004.
Webb, Clair, "45nm Design for Manufacturing," Intel Technology Journal, vol. 12, Issue 02, Jun. 17, 2008, ISSN 1535-864X, pp. 121-130.
Webb, Clair, "Layout Rule Trends and Affect upon CPU Design", 2006, vol. 6156 SPIE.
Wenren, et al., "The Improvement of Photolithographic Fidelity of Two-dimensional Structures Though Double Exposure Method", 2007, SPIE Proceeding Series, vol. 6520; 65202I.
Wilcox, et al., "Design for Manufacturability: A Key to Semiconductor Manufacturing Excellence", 1998, IEEE, pp. 308-313.
Wong, et al., "Resolution Enhancement Techniques and Design for Manufacturability: Containing and Accounting for Variabilities in Integrated Circuit Creation," J. Micro/Nanolith. MEMS MOEMS, Jul.-Sep. 2007, vol. 6(3), 2 pages.
Wu, et al., "A Study of Process Window Capabilities for Two-dimensional Structures under Double Exposure Condition", 2007, SPIE; Proceeding Series, vol. 6520; 652020.
Xiong, et al., "The Constrained Via Minimization Problem for PCB and VLSI Design", 1988, ACM Press/IEEE, pp. 573-578.
Yamamaoto, et al., "New Double Exposure Technique without Alternating Phase Shift Mask", 2007, SPIE Proceeding Series, vol. 6520; 652052P.
Yamazoe, et al., "Resolution Enhancement by Aerial Image Approximation with 2D-TCC," 2007 Proc. of SPIE vol. 6730, 12 pages.
Yang, et al., "Interconnection Driven VLSI Module Placement Based on Quadratic Programming and Considering Congestion Using LFF Principles", 2004, IEEE, pp. 1243-1247.
Yao, et al., "Multilevel Routing With Redundant Via Insertion", Oct. 2006, IEEE, pp. 1148-1152.
Yu, et al., "True Process Variation Aware Optical Proximity Correction with Variational Lithography Modeling and Model Calibration," J. Micro/Nanolith. MEMS MOEMS, Jul.-Sep 2007, vol. 6(3), 16 pages.
Zheng, et al."Modeling and Analysis of Regular Symmetrically Structured Power/Ground Distribution Networks", DAC, Jun. 10-14, 2002, ACM Press, pp. 395-398.
Zhu, et al., "A Stochastic Integral Equation Method for Modeling the Rough Surface Effect on Interconnect Capacitance", 2004, IEEE.
Zhu, et al., "A Study of Double Exposure Process Design with Balanced Performance Parameters for Line/Space Applications", 2007, SPIE Proceeding Series, vol. 6520; 65202H.
Zuchowski, et al., "A Hybrid ASIC and FPGA Architecture", 2003, IEEE, pp. 187-194.
Alam, Syed M. et al., "A Comprehensive Layout Methodology and Layout-Specific Circuit Analyses for Three-Dimensional Integrated Circuits," Mar. 21, 2002.
Alam, Syed M. et al., "Layout-Specific Circuit Evaluation in 3-D Integrated Circuits," May 2003.
Aubusson, Russel, "Wafer-Scale Integration of Semiconductor Memory," Apr. 1979.
Bachtold, "Logic Circuits with Carbon," Nov. 9, 2001.
Baker, R. Jacob, "CMOS: Circuit Design, Layout, and Simulation (2nd Edition)," Nov. 1, 2004.
Baldi et al., "A Scalable Single Poly EEPROM Cell for Embedded Memory Applications," pp. 1-4, Fig. 1, Sep. 1997.
Cao, Ke, "Design for Manufacturing (DFM) in Submicron VLSI Design," Aug. 2007.
Capodieci, Luigi, "From Optical Proximity Correction to Lithography-Driven Physical Design (1996-2006): 10 years of Resolution Enhancement Technology and the roadmap enablers for the next decade," Proc. SPIE 6154, Optical Microlithography XIX, 615401, Mar. 20, 2006.
Chang, Leland et al., "Stable SRAM Cell Design for the 32 nm Node and Beyond," Jun. 16, 2005.
Cheung, Peter, "Layout Design," Apr. 4, 2004.
Chinnery, David, "Closing the Gap Between ASIC & Custom: Tools and Techniques for High-Performance ASIC Design," Jun. 30, 2002.
Chou, Dyiann et al., "Line End Optimization through Optical Proximity Correction (OPC): A Case Study," Feb. 19, 2006.
Clein, Dan, "CMOS IC Layout: Concepts, Methodologies, and Tools," Dec. 22, 1999.
Cowell, "Exploiting Non-Uniform Access Time," Jul. 2003.
Das, Shamik, "Design Automation and Analysis of Three-Dimensional Integrated Circuits," May 1, 2004.
Dehaene, W. et al., "Technology-Aware Design of SRAM Memory Circuits," Mar. 2007.
Deng, Liang et al., "Coupling-aware Dummy Metal Insertion for Lithography," p. 1, col. 2, 2007.
Devoivre et al., "Validated 90nm CMOS Technology Platform with Low-k Copper Interconnects for Advanced System-on-Chip (SoC)," 2002.
Enbody, R. J., "Near-Optimal n-Layer Channel Routing," 1986.
Ferretti, Marcos et al., "High Performance Asynchronous ASIC Back-End Design Flow Using Single-Track Full-Buffer Standard Cells," Apr. 23, 2004.
Garg, Manish et al., "Litho-driven Layouts for Reducing Performance Variability," p. 2, Figs. 2b-2c, May 23, 2005.
Greenway, Robert et al., "32nm 1-D Regular Pitch Sram Bitcell Design for Interference-Assisted Lithography," 2008.

(56) References Cited

OTHER PUBLICATIONS

Gupta et al., "Modeling Edge Placement Error Distribution in Standard Cell Library," Feb. 23-24, 2006.
Grad, Johannes et al., "A standard cell library for student projects," Proceedings of the 2003 IEEE International Conference on Microelectronic Systems Education, Jun. 2, 2003.
Hartono, Roy et al., "Active Device Generation for Automatic Analog Layout Retargeting Tool," May 13, 2004.
Hartono, Roy et al., "IPRAIL—Intellectual Property Reuse-based Analog IC Layout Automation," Mar. 17, 2003.
Hastings, Alan, "The Art of Analog Layout (2nd Edition)," Jul. 4, 2005.
Hurata et al., "A Genuine Design Manufacturability Check for Designers," 2006.
Institute of Microelectronic Systems, "Digital Subsystem Design," Oct. 13, 2006.
Ishida, M. et al., "A Novel 6T-SRAM Cell Technology Designed with Rectangular Patterns Scalable beyond 0.18 pm Generation and Desirable for Ultra High Speed Operation," 1998.
Jakusovszky, "Linear IC Parasitic Element Simulation Methodology," Oct. 1, 1993.
Jangkrajarng, Nuttorn et al., "Template-Based Parasitic-Aware Optimization and Retargeting of Analog and RF Integrated Circuit Layouts," Nov. 5, 2006.
Kahng, Andrew B., "Design Optimizations DAC-2006 DFM Tutorial, part V)," 2006.
Kang, Sung-Mo et al., "CMOS Digital Integrated Circuits Analysis & Design," Oct. 29, 2002.
Kottoor, Mathew Francis, "Development of a Standard Cell Library based on Deep Sub-Micron SCMOS Design Rules using Open Source Software (MS Thesis)," Aug. 1, 2005.
Kubicki, "Intel 65nm and Beyond (or Below): IDF Day 2 Coverage (available at http://www.anandtech.com/show/1468/4)," Sep. 9, 2004.
Kuhn, Kelin J., "Reducing Variation in Advanced Logic Technologies: Approaches to Process and Design for Manufacturability of Nanoscale CMOS," p. 27, Dec. 12, 2007.
Kurokawa, Atsushi et al., "Dummy Filling Methods for Reducing Interconnect Capacitance and Number of Fills, Proc. of Isqed," pp. 586-591, 2005.
Lavin, Mark, "Open Access Requirements from Rdr Design Flows," Nov. 11, 2004.
Liebmann, Lars et al., "Layout Methodology Impact of Resolution Enhancement Techniques," pp. 5-6, 2003.
Liebmann, Lars et al., "TCAD development for lithography resolution enhancement," Sep. 2001.
Lin, Chung-Wei et al., "Recent Research and Emerging Challenges in Physical Design for Manufacturability/Reliability," Jan. 26, 2007.
McCullen, Kevin W., "Layout Techniques for Phase Correct and Gridded Wiring," pp. 13, 17, Fig. 5, 2006.
MOSIS, "Design Rules MOSIS Scalable CMOS (SCMOS) (Revision 8.00)," Oct. 4, 2004.
MOSIS, "MOSIS Scalable CMOS (SCMOS) Design Rules (Revision 7.2).".
Muta et al., "Manufacturability-Aware Design of Standard Cells," pp. 2686-2690, Figs. 3, 12, Dec. 2007.
Na, Kee-Yeol et al., "A Novel Single Polysilicon Eeprom Cell With a Polyfinger Capacitor," Nov. 30, 2007.
Pan et al., "Redundant Via Enahnced Maze Routing for Yield Improvement," 2005.
Park, Tae Hong, "Characterization and Modeling of Pattern Dependencies in Copper Interconnects for Integrated Circuits," Ph.D. Thesis, MIT, 2002.
Patel, Chetan, "An Architectural Exploration of Via Patterned Gate Arrays (CMU Master's Project)," May 2003.
Pease, R. Fabian et al., "Lithography and Other Patterning Techniques for Future Electronics," 2008.
Serrano, Diego Emilio, Pontificia Universidad Javeriana Facultad De Ingenieria, Departamento De Electronica, "Diseño De Multiplicador 4 X 8 en VLSI, Introduccion al VLSI," 2006.
Pramanik, "Impact of layout on variability of devices for sub 90nm technologies," 2004.
Pramanik, Dipankar et al., "Lithography-driven layout of logic cells for 65-nm node (SPIE Proceedings vol. 5042)," Jul. 10, 2003.
Roy et al., "Extending Aggressive Low-K1 Design Rule Requirements for 90 and 65 Nm Nodes Via Simultaneous Optimization Of Numerical Aperture, Illumination and Optical Proximity Correction," J.Micro/Nanolith, MEMS MOEMS, 4(2), 023003, Apr. 26, 2005.
Saint, Christopher et al., "IC Layout Basics: A Practical Guide," Chapter 3, Nov. 5, 2001.
Saint, Christopher et al., "IC Mask Design: Essential Layout Techniques," 2002.
Scheffer, "Physical CAD Changes to Incorporate Design for Lithography and Manufacturability," Feb. 4, 2004.
Smayling, Michael C., "Part 3: Test Structures, Test Chips, In-Line Metrology & Inspection," 2006.
Spence, Chris, "Full-Chip Lithography Simulation and Design Analysis: How OPC is changing IC Design, Emerging Lithographic Technologies IX," May 6, 2005.
Subramaniam, Anupama R., "Design Rule Optimization of Regular layout for Leakage Reduction in Nanoscalc Design," pp. 474-478, Mar. 24, 2008.
Tang, C. W. et al., "A compact large signal model of LDMOS," 2002.
Taylor, Brian et al., "Exact Combinatorial Optimization Methods for Physical Design of Regular Logic Bricks," Jun. 8, 2007.
Tian, Ruiqi et al., "Dummy Feature Placement for Chemical-Mechanical Uniformity in a Shallow Trench Isolation Process," IEEE Trans. on Computer-Aided Design of Integrated Circuits and Systems, vol. 21, No. 1, pp. 63-71, Jan. 2002.
Tian, Ruiqi et al., "Proximity Dummy Feature Placement and Selective Via Sizing for Process Uniformity in a Trench-First-Via-Last Dual-Inlaid Metal Process," Proc. of IITC, pp. 48-50, 2001.
Torres, J. A. et al., "RET Compliant Cell Generation for sub-130nm Processes," 2002.
Uyemura, John P., "Introduction to VLSI Circuits and Systems," Chapters 2, 3, 5, and Part 3, 2002.
Uyemura, John, "Chip Design for Submicron VLSI: CMOS Layout and Simulation," Chapters 2-5, 7-9, Feb. 8, 2005.
Verhaegen et al., "Litho Enhancements for 45nm-nod MuGFETs," Aug. 1, 2005.
Wong, Ban P., "Bridging the Gap between Dreams and Nano-Scale Reality (DAC-2006 DFM Tutorial)," 2006.
Wang, Dunwei et al., "Complementary Symmetry Silicon Nanowire Logic: Power-Efficient Inverters with Gain," 2006.
Wang, Jun et al., "Effects of grid-placed contacts on circuit performance," pp. 135-139, Figs. 2, 4-8, Feb. 28, 2003.
Wang, Jun et al., "Standard cell design with regularly placed contacts and gates (SPIE vol. 5379)," 2004.
Wang, Jun et al., "Standard cell design with resolution-enhancement-techniquedriven regularly placed contacts and gates," J. Micro/Nanolith, MEMS MOEMS, 4(1), 013001, Mar. 16, 2005.
Watson, Bruce, "Challenges and Automata Applications in Chip-Design Software," pp. 38-40, 2007.
Weste, Neil et al., "CMOS VLSI Design: A Circuits and Systems Perspective, 3rd Edition," May 21, 2004.
Wingerden, Johannes van, "Experimental verification of improved printability for litho-driven designs," Mar. 14, 2005.
Wong, Alfred K., "Microlithography: Trends, Challenges, Solutions and Their Impact on Design," 2003.
Xu, Gang, "Redundant-Via Enhanced Maze Routing for Yield Improvement," 2005.
Yang, Jie, "Manufacturability Aware Design," pp. 93, 102, Fig. 5.2, 2007.
Yongshun, Wang et al., "Static Induction Devices with Planar Type Buried Gate," 2004.
Zobrist, George (editor), "Progress in Computer Aided VLSI Design: Implementations (Ch. 5)," 1990.

\* cited by examiner

INTEGRATED CIRCUIT INCLUDING CROSS-COUPLED TRANSISTORS WITH TWO TRANSISTORS OF DIFFERENT TYPE HAVING GATE ELECTRODES FORMED BY COMMON GATE LEVEL FEATURE WITH SHARED DIFFUSION REGIONS ON OPPOSITE SIDES OF COMMON GATE LEVEL FEATURE

CLAIM OF PRIORITY

This application is a continuation application under 35 U.S.C. 120 of prior U.S. application Ser. No. 12/753,766, filed Apr. 2, 2010, and entitled "Integrated Circuit Including Cross-Coupled Transistors With Two Transistors Of Different Type Having Gate Electrodes Formed By Common Gate Level Feature With Shared Diffusion Regions On Opposite Sides Of Common Gate Level Feature," which claims priority under 35 U.S.C. 120 to prior U.S. application Ser. No. 12/402,465, filed Mar. 11, 2009, and entitled "Cross-Coupled Transistor Layouts in Restricted Gate Level Layout Architecture," which claims priority under 35 U.S.C. 119(e) to U.S. Provisional Patent Application No. 61/036,460, filed Mar. 13, 2008, entitled "Cross-Coupled Transistor Layouts Using Linear Gate Level Features," and to U.S. Provisional Patent Application No. 61/042,709, filed Apr. 4, 2008, entitled "Cross-Coupled Transistor Layouts Using Linear Gate Level Features," and to U.S. Provisional Patent Application No. 61/045,953, filed Apr. 17, 2008, entitled "Cross-Coupled Transistor Layouts Using Linear Gate Level Features," and to U.S. Provisional Patent Application No. 61/050,136, filed May 2, 2008, entitled "Cross-Coupled Transistor Layouts Using Linear Gate Level Features." The disclosure of each above-identified patent application is incorporated in its entirety herein by reference.

CROSS-REFERENCE TO RELATED APPLICATIONS

This application is related to each application identified in the table below. The disclosure of each application identified in the table below is incorporated herein by reference in its entirety.

| application Ser. No. | Filing Date |
| --- | --- |
| 12/753,711 | Apr. 2, 2010 |
| 12/753,727 | Apr. 2, 2010 |
| 12/753,733 | Apr. 2, 2010 |
| 12/753,740 | Apr. 2, 2010 |
| 12/753,753 | Apr. 2, 2010 |
| 12/753,758 | Apr. 2, 2010 |
| 12/753,776 | Apr. 2, 2010 |
| 12/753,789 | Apr. 2, 2010 |
| 12/753,793 | Apr. 2, 2010 |
| 12/753,795 | Apr. 2, 2010 |
| 12/753,798 | Apr. 2, 2010 |
| 12/753,805 | Apr. 2, 2010 |
| 12/753,810 | Apr. 2, 2010 |
| 12/753,817 | Apr. 2, 2010 |
| 12/754,050 | Apr. 5, 2010 |
| 12/754,061 | Apr. 5, 2010 |
| 12/754,078 | Apr. 5, 2010 |
| 12/754,091 | Apr. 5, 2010 |
| 12/754,103 | Apr. 5, 2010 |
| 12/754,114 | Apr. 5, 2010 |
| 12/754,129 | Apr. 5, 2010 |
| 12/754,147 | Apr. 5, 2010 |
| 12/754,168 | Apr. 5, 2010 |
| 12/754,215 | Apr. 5, 2010 |
| 12/754,233 | Apr. 5, 2010 |
| 12/754,351 | Apr. 5, 2010 |
| 12/754,384 | Apr. 5, 2010 |
| 12/754,563 | Apr. 5, 2010 |
| 12/754,566 | Apr. 5, 2010 |

BACKGROUND

A push for higher performance and smaller die size drives the semiconductor industry to reduce circuit chip area by approximately 50% every two years. The chip area reduction provides an economic benefit for migrating to newer technologies. The 50% chip area reduction is achieved by reducing the feature sizes between 25% and 30%. The reduction in feature size is enabled by improvements in manufacturing equipment and materials. For example, improvement in the lithographic process has enabled smaller feature sizes to be achieved, while improvement in chemical mechanical polishing (CMP) has in-part enabled a higher number of interconnect layers.

In the evolution of lithography, as the minimum feature size approached the wavelength of the light source used to expose the feature shapes, unintended interactions occurred between neighboring features. Today minimum feature sizes are approaching 45 nm (nanometers), while the wavelength of the light source used in the photolithography process remains at 193 nm. The difference between the minimum feature size and the wavelength of light used in the photolithography process is defined as the lithographic gap. As the lithographic gap grows, the resolution capability of the lithographic process decreases.

An interference pattern occurs as each shape on the mask interacts with the light. The interference patterns from neighboring shapes can create constructive or destructive interference. In the case of constructive interference, unwanted shapes may be inadvertently created. In the case of destructive interference, desired shapes may be inadvertently removed. In either case, a particular shape is printed in a different manner than intended, possibly causing a device failure. Correction methodologies, such as optical proximity correction (OPC), attempt to predict the impact from neighboring shapes and modify the mask such that the printed shape is fabricated as desired. The quality of the light interaction prediction is declining as process geometries shrink and as the light interactions become more complex.

In view of the foregoing, a solution is needed for managing lithographic gap issues as technology continues to progress toward smaller semiconductor device features sizes.

SUMMARY

In one embodiment, a semiconductor device is disclosed. The semiconductor device includes a substrate having a portion of the substrate formed to include a plurality of diffusion regions. The plurality of diffusion regions respectively correspond to active areas of the portion of the substrate within which one or more processes are applied to modify one or more electrical characteristics of the active areas of the portion of the substrate. The plurality of diffusion regions include a first p-type diffusion region, a second p-type diffusion region, a first n-type diffusion region, and a second n-type diffusion region. The first p-type diffusion region includes a first p-type active area electrically connected to a common node. The second p-type diffusion region includes a second p-type active area electrically connected to the common node. The first n-type diffusion region includes a first n-type active area electrically connected to the common node. The second n-type diffusion region includes a second n-type active area electrically connected to the common node.

The semiconductor device also includes a gate electrode level region formed above the portion of the substrate. The gate electrode level region includes a number of conductive features defined to extend over the substrate in only a first parallel direction. Each of the number of conductive features within the gate electrode level region is fabricated from a respective originating rectangular-shaped layout feature, such that a centerline of each respective originating rectangular-shaped layout feature is aligned with the first parallel direction. The number of conductive features include conductive features that respectively form a first PMOS transistor device gate electrode, a second PMOS transistor device gate electrode, a first NMOS transistor device gate electrode, and a second NMOS transistor device gate electrode.

The first PMOS transistor device gate electrode is formed to extend over the first p-type diffusion region to electrically interface with the first p-type active area and thereby form a first PMOS transistor device. The second PMOS transistor device gate electrode is formed to extend over the second p-type diffusion region to electrically interface with the second p-type active area and thereby form a second PMOS transistor device. A width of the first p-type diffusion region as measured in the first parallel direction is substantially equal to a width of the second p-type diffusion region as measured in the first parallel direction, such that the first PMOS transistor device and the second PMOS transistor device have substantially equal widths as measured in the first parallel direction.

The first NMOS transistor device gate electrode is formed to extend over the first n-type diffusion region to electrically interface with the first n-type active area and thereby form a first NMOS transistor device. The second NMOS transistor device gate electrode is formed to extend over the second n-type diffusion region to electrically interface with the second n-type active area and thereby form a second NMOS transistor device. A width of the first n-type diffusion region as measured in the first parallel direction is substantially equal to a width of the second n-type diffusion region as measured in the first parallel direction, such that the first NMOS transistor device and the second NMOS transistor device have substantially equal widths as measured in the first parallel direction.

The first PMOS transistor device gate electrode is electrically connected to the second NMOS transistor device gate electrode. The second PMOS transistor device gate electrode is electrically connected to the first NMOS transistor device gate electrode. The first PMOS transistor device, the second PMOS transistor device, the first NMOS transistor device, and the second NMOS transistor device define a cross-coupled transistor configuration having commonly oriented gate electrodes formed from respective rectangular-shaped layout features.

Other aspects and advantages of the invention will become more apparent from the following detailed description, taken in conjunction with the accompanying drawings, illustrating by way of example the present invention.

BRIEF DESCRIPTION OF THE DRAWINGS

FIGS. 100-111 show exemplary cross-coupled transistor layouts in which the n-type and p-type diffusion regions of the cross-coupled transistors are shown to be electrically connected to a common node.

DETAILED DESCRIPTION

In the following description, numerous specific details are set forth in order to provide a thorough understanding of the present invention. It will be apparent, however, to one skilled in the art that the present invention may be practiced without some or all of these specific details. In other instances, well known process operations have not been described in detail in order not to unnecessarily obscure the present invention.

SRAM Bit Cell Configuration

Figure 1A:
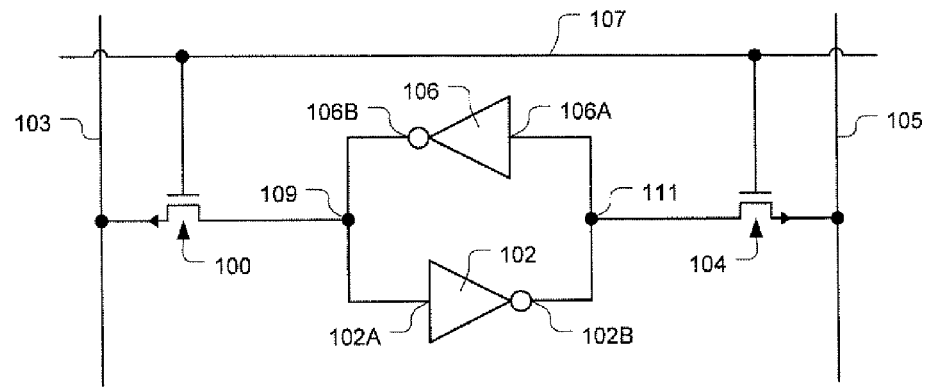
FIG. 1A shows an SRAM bit cell circuit, in accordance with the prior art.

FIG. 1A shows an SRAM (Static Random Access Memory) bit cell circuit, in accordance with the prior art. The SRAM bit cell includes two cross-coupled inverters 106 and 102. Specifically, an output 106B of inverter 106 is connected to an input 102A of inverter 102, and an output 102B of inverter 102 is connected to an input 106A of inverter 106. The SRAM bit cell further includes two NMOS pass transistors 100 and 104. The NMOS pass transistor 100 is connected between a bit-line 103 and a node 109 corresponding to both the output 106B of inverter 106 and the input 102A of inverter 102. The NMOS pass transistor 104 is connected between a bit-line 105 and a node 111 corresponding to both the output 102B of inverter 102 and the input 106A of inverter 106. Also, the respective gates of NMOS pass transistors 100 and 104 are each connected to a word line 107, which controls access to the SRAM bit cell through the NMOS pass transistors 100 and 104. The SRAM bit cell requires bi-directional write, which means that when bit-line 103 is driven high, bit-line 105 is driven low, vice-versa. It should be understood by those skilled in the art that a logic state stored in the SRAM bit cell is maintained in a complementary manner by nodes 109 and 111.

Figure 1B:
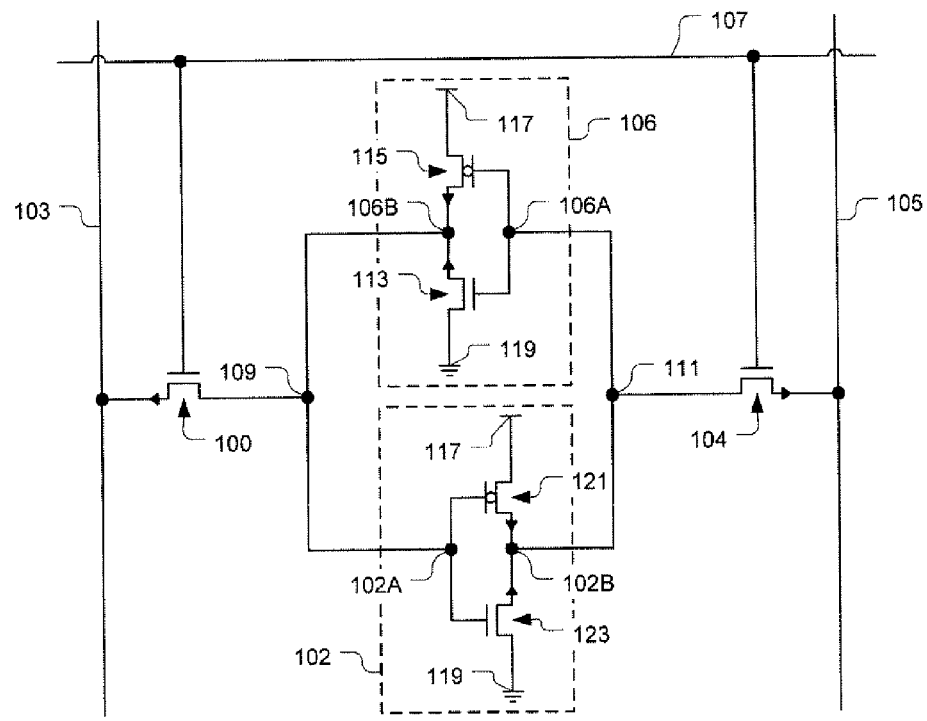
FIG. 1B shows the SRAM bit cell of FIG. 1A with the inverters expanded to reveal their respective internal transistor configurations, in accordance with the prior art.

FIG. 1B shows the SRAM bit cell of FIG. 1A with the inverters 106 and 102 expanded to reveal their respective internal transistor configurations, in accordance with the prior art. The inverter 106 include a PMOS transistor 115 and an NMOS transistor 113. The respective gates of the PMOS and NMOS transistors 115, 113 are connected together to form the input 106A of inverter 106. Also, each of PMOS and NMOS transistors 115, 113 have one of their respective terminals connected together to form the output 106B of inverter 106. A remaining terminal of PMOS transistor 115 is connected to a power supply 117. A remaining terminal of NMOS transistor 113 is connected to a ground potential 119. Therefore, PMOS and NMOS transistors 115, 113 are activated in a complementary manner. When a high logic state is present at the input 106A of the inverter 106, the NMOS transistor 113 is turned on and the PMOS transistor 115 is turned off, thereby causing a low logic state to be generated at output 106B of the inverter 106. When a low logic state is present at the input 106A of the inverter 106, the NMOS transistor 113 is turned off and the PMOS transistor 115 is turned on, thereby causing a high logic state to be generated at output 106B of the inverter 106.

The inverter 102 is defined in an identical manner to inverter 106. The inverter 102 include a PMOS transistor 121 and an NMOS transistor 123. The respective gates of the PMOS and NMOS transistors 121, 123 are connected together to form the input 102A of inverter 102. Also, each of PMOS and NMOS transistors 121, 123 have one of their respective terminals connected together to form the output 102B of inverter 102. A remaining terminal of PMOS transistor 121 is connected to the power supply 117. A remaining terminal of NMOS transistor 123 is connected to the ground potential 119. Therefore, PMOS and NMOS transistors 121, 123 are activated in a complementary manner. When a high logic state is present at the input 102A of the inverter 102, the NMOS transistor 123 is turned on and the PMOS transistor 121 is turned off, thereby causing a low logic state to be generated at output 102B of the inverter 102. When a low logic state is present at the input 102A of the inverter 102, the NMOS transistor 123 is turned off and the PMOS transistor 121 is turned on, thereby causing a high logic state to be generated at output 102B of the inverter 102.

Cross-Coupled Transistor Configuration

Figure 2:
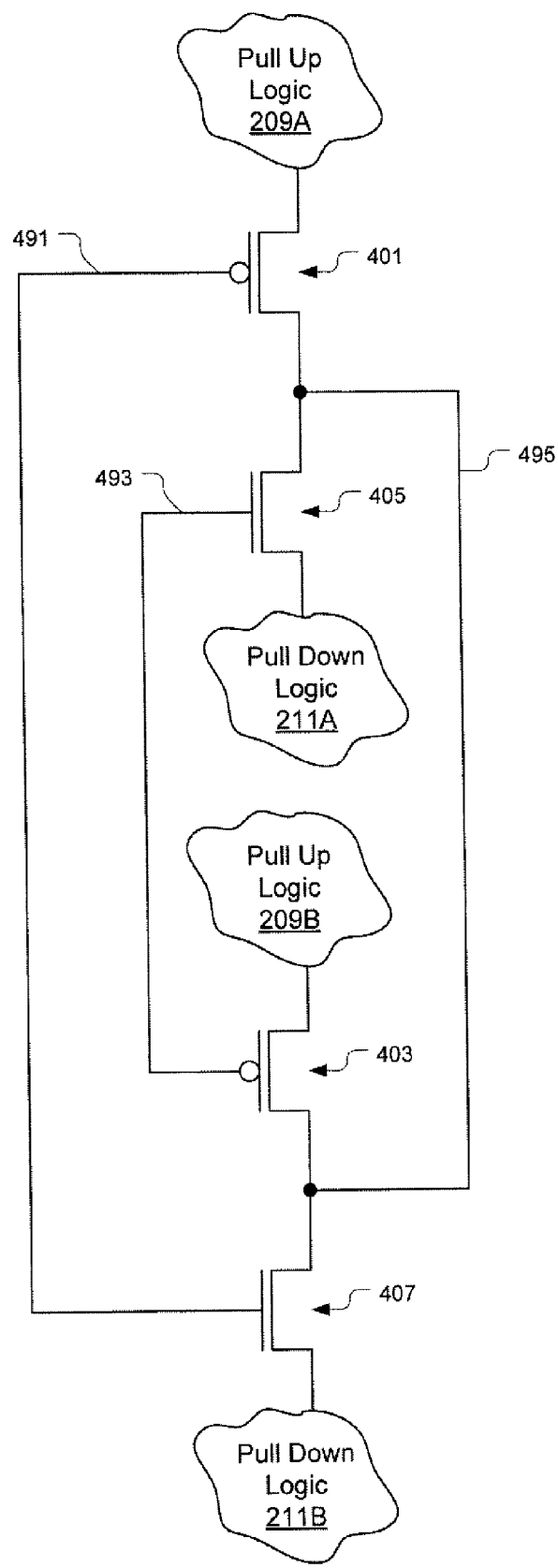
FIG. 2 shows a cross-coupled transistor configuration, in accordance with one embodiment of the present invention.

FIG. 2 shows a cross-coupled transistor configuration, in accordance with one embodiment of the present invention. The cross-coupled transistor configuration includes four transistors: a PMOS transistor 401, an NMOS transistor 405, a PMOS transistor 403, and an NMOS transistor 407. The PMOS transistor 401 has one terminal connected to pull up logic 209A, and its other terminal connected to a common node 495. The NMOS transistor 405 has one terminal connected to pull down logic 211A, and its other terminal connected to the common node 495. The PMOS transistor 403 has one terminal connected to pull up logic 209B, and its other terminal connected to the common node 495. The NMOS transistor 407 has one terminal connected to pull down logic 211B, and its other terminal connected to the common node 495. Respective gates of the PMOS transistor 401 and the NMOS transistor 407 are both connected to a gate node 491. Respective gates of the NMOS transistor 405 and the PMOS transistor 403 are both connected to a gate node 493. The gate nodes 491 and 493 are also referred to as control nodes 491 and 493, respectively. Moreover, each of the common node 495, the gate node 491, and the gate node 493 can be referred to as an electrical connection 495, 491, 493, respectively.

Based on the foregoing, the cross-coupled transistor configuration includes four transistors: 1) a first PMOS transistor, 2) a first NMOS transistor, 3) a second PMOS transistor, and 4) a second NMOS transistor. Furthermore, the cross-coupled transistor configuration includes three required electrical connections: 1) each of the four transistors has one of its terminals connected to a same common node, 2) gates of one PMOS transistor and one NMOS transistor are both connected to a first gate node, and 3) gates of the other PMOS transistor and the other NMOS transistor are both connected to a second gate node.

It should be understood that the cross-coupled transistor configuration of FIG. 2 represents a basic configuration of cross-coupled transistors. In other embodiments, additional circuitry components can be connected to any node within the cross-coupled transistor configuration of FIG. 2. Moreover, in other embodiments, additional circuitry components can be inserted between any one or more of the cross-coupled transistors (401, 405, 403, 407) and the common node 495, without departing from the cross-coupled transistor configuration of FIG. 2.

Difference Between SRAM Bit Cell and Cross-Coupled Transistor Configurations

It should be understood that the SRAM bit cell of FIGS. 1A-1B does not include a cross-coupled transistor configuration. In particular, it should be understood that the cross-coupled "inverters" 106 and 102 within the SRAM bit cell neither represent nor infer a cross-coupled "transistor" configuration. As discussed above, the cross-coupled transistor configuration requires that each of the four transistors has one of its terminals electrically connected to the same common node. This does not occur in the SRAM bit cell.

With reference to the SRAM bit cell in FIG. 1B, the terminals of PMOS transistor 115 and NMOS transistor 113 are connected together at node 109, but the terminals of PMOS transistor 121 and NMOS transistor 123 are connected together at node 111. More specifically, the terminals of PMOS transistor 115 and NMOS transistor 113 that are connected together at the output 106B of the inverter are connected to the gates of each of PMOS transistor 121 and NMOS transistor 123, and therefore are not connected to both of the terminals of PMOS transistor 121 and NMOS transistor 123. Therefore, the SRAM bit cell does not include four transistors (two PMOS and two NMOS) that each have one of its terminals connected together at a same common node. Consequently, the SRAM bit cell does represent or include a cross-coupled transistor configuration, such as described with regard to FIG. 2.

Restricted Gate Level Layout Architecture

The present invention implements a restricted gate level layout architecture within a portion of a semiconductor chip. For the gate level, a number of parallel virtual lines are defined to extend across the layout. These parallel virtual lines are referred to as gate electrode tracks, as they are used to index placement of gate electrodes of various transistors within the layout. In one embodiment, the parallel virtual lines which form the gate electrode tracks are defined by a perpendicular spacing therebetween equal to a specified gate electrode pitch. Therefore, placement of gate electrode segments on the gate electrode tracks corresponds to the specified gate electrode pitch. In another embodiment the gate electrode tracks are spaced at variable pitches greater than or equal to a specified gate electrode pitch.

Figure 3A:
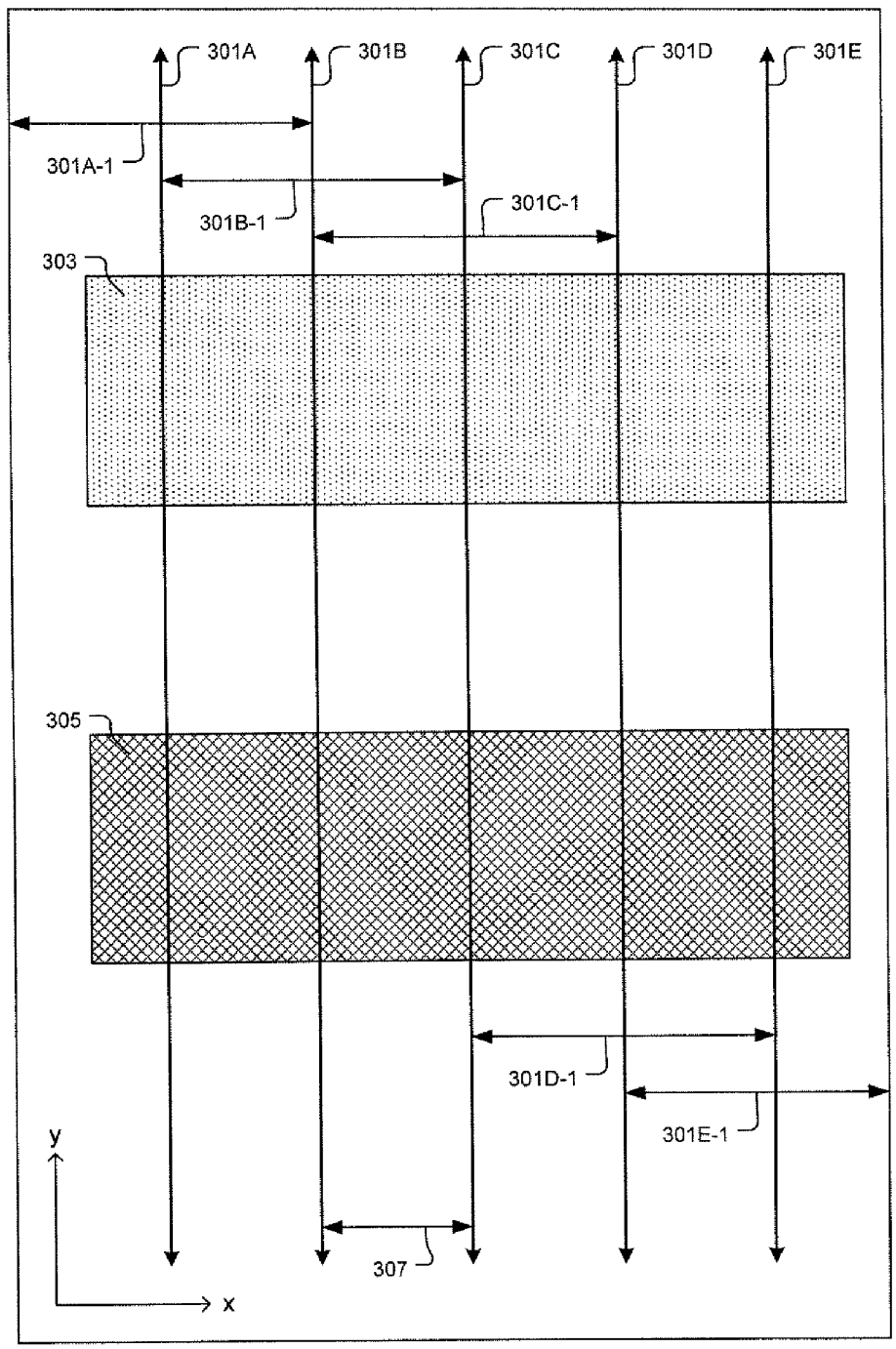
FIG. 3A shows an example of gate electrode tracks defined within the restricted gate level layout architecture, in accordance with one embodiment of the present invention.

FIG. 3A shows an example of gate electrode tracks 301A-301E defined within the restricted gate level layout architecture, in accordance with one embodiment of the present invention. Gate electrode tracks 301A-301E are formed by parallel virtual lines that extend across the gate level layout of the chip, with a perpendicular spacing therebetween equal to a specified gate electrode pitch 307. For illustrative purposes, complementary diffusion regions 303 and 305 are shown in FIG. 3A. It should be understood that the diffusion regions 303 and 305 are defined in the diffusion level below the gate level. Also, it should be understood that the diffusion regions 303 and 305 are provided by way of example and in no way represent any limitation on diffusion region size, shape, and/or placement within the diffusion level relative to the restricted gate level layout architecture.

Within the restricted gate level layout architecture, a gate level feature layout channel is defined about a given gate electrode track so as to extend between gate electrode tracks adjacent to the given gate electrode track. For example, gate level feature layout channels 301A-1 through 301E-1 are defined about gate electrode tracks 301A through 301E, respectively. It should be understood that each gate electrode track has a corresponding gate level feature layout channel. Also, for gate electrode tracks positioned adjacent to an edge of a prescribed layout space, e.g., adjacent to a cell boundary, the corresponding gate level feature layout channel extends as if there were a virtual gate electrode track outside the prescribed layout space, as illustrated by gate level feature layout channels 301A-1 and 301E-1. It should be further understood that each gate level feature layout channel is defined to extend along an entire length of its corresponding gate electrode track. Thus, each gate level feature layout channel is defined to extend across the gate level layout within the portion of the chip to which the gate level layout is associated.

Within the restricted gate level layout architecture, gate level features associated with a given gate electrode track are defined within the gate level feature layout channel associated with the given gate electrode track. A contiguous gate level feature can include both a portion which defines a gate electrode of a transistor, and a portion that does not define a gate electrode of a transistor. Thus, a contiguous gate level feature can extend over both a diffusion region and a dielectric region of an underlying chip level. In one embodiment, each portion of a gate level feature that forms a gate electrode of a transistor is positioned to be substantially centered upon a given gate electrode track. Furthermore, in this embodiment, portions of the gate level feature that do not form a gate electrode of a transistor can be positioned within the gate level feature layout channel associated with the given gate electrode track. Therefore, a given gate level feature can be defined essentially anywhere within a given gate level feature layout channel, so long as gate electrode portions of the given gate level feature are centered upon the gate electrode track corresponding to the given gate level feature layout channel, and so long as the given gate level feature complies with design rule spacing requirements relative to other gate level features in adjacent gate level layout channels. Additionally, physical contact is prohibited between gate level features defined in gate level feature layout channels that are associated with adjacent gate electrode tracks.

Figure 3B:
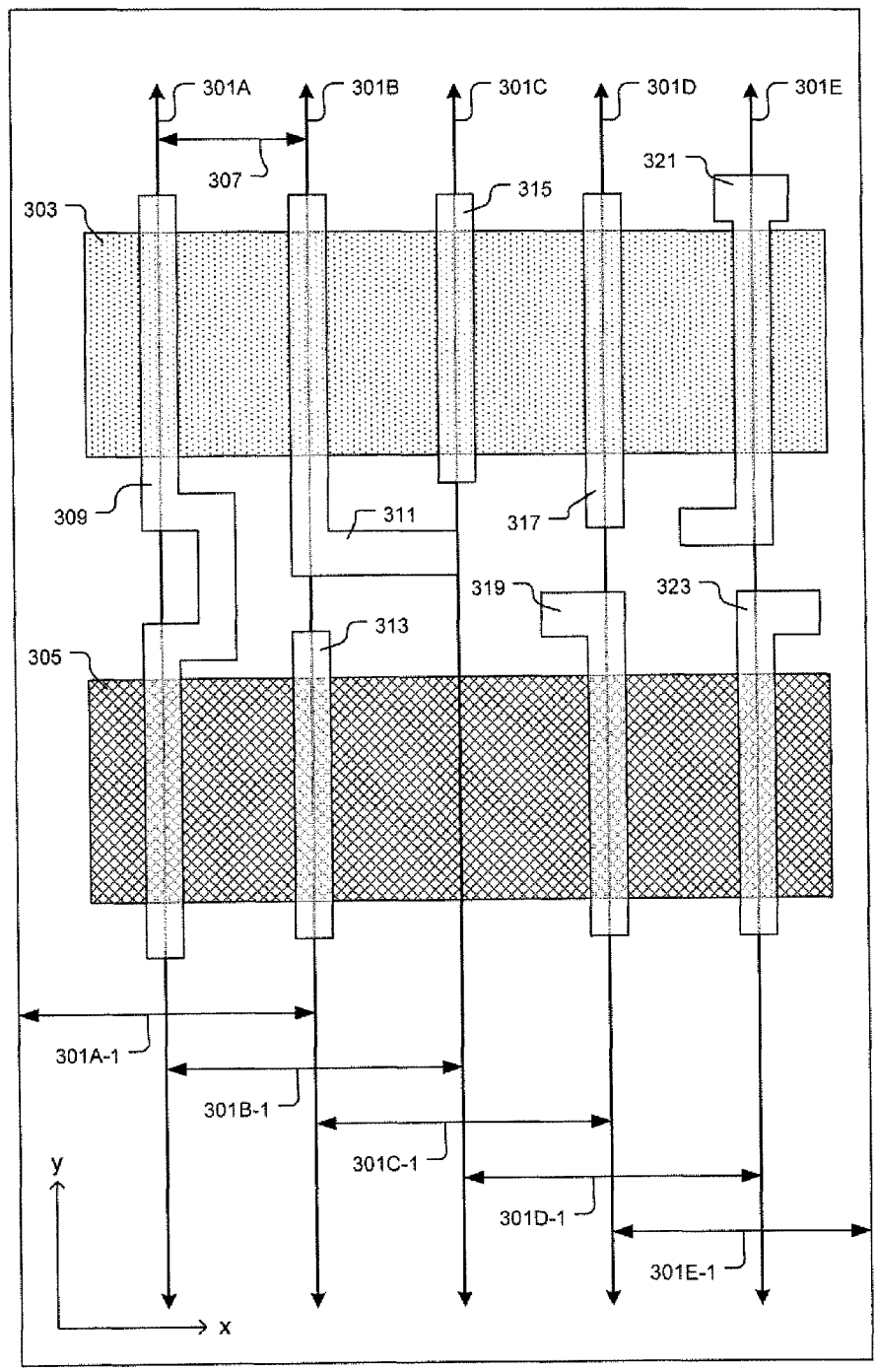
FIG. 3B shows the exemplary restricted gate level layout architecture of FIG. 3A with a number of exemplary gate level features defined therein, in accordance with one embodiment of the present invention.

FIG. 3B shows the exemplary restricted gate level layout architecture of FIG. 3A with a number of exemplary gate level features 309-323 defined therein, in accordance with one embodiment of the present invention. The gate level feature 309 is defined within the gate level feature layout channel 301A-1 associated with gate electrode track 301A. The gate electrode portions of gate level feature 309 are substantially centered upon the gate electrode track 301A. Also, the non-gate electrode portions of gate level feature 309 maintain design rule spacing requirements with gate level features 311 and 313 defined within adjacent gate level feature layout channel 301B-1. Similarly, gate level features 311-323 are defined within their respective gate level feature layout channel, and have their gate electrode portions substantially centered upon the gate electrode track corresponding to their respective gate level feature layout channel. Also, it should be appreciated that each of gate level features 311-323 maintains design rule spacing requirements with gate level features defined within adjacent gate level feature layout channels, and avoids physical contact with any another gate level feature defined within adjacent gate level feature layout channels.

A gate electrode corresponds to a portion of a respective gate level feature that extends over a diffusion region, wherein the respective gate level feature is defined in its entirety within a gate level feature layout channel. Each gate level feature is defined within its gate level feature layout channel without physically contacting another gate level feature defined within an adjoining gate level feature layout channel. As illustrated by the example gate level feature layout channels 301A-1 through 301E-1 of FIG. 3B, each gate level feature layout channel is associated with a given gate electrode track and corresponds to a layout region that extends along the given gate electrode track and perpendicularly outward in each opposing direction from the given gate electrode track to a closest of either an adjacent gate electrode track or a virtual gate electrode track outside a layout boundary.

Some gate level features may have one or more contact head portions defined at any number of locations along their length. A contact head portion of a given gate level feature is defined as a segment of the gate level feature having a height and a width of sufficient size to receive a gate contact structure, wherein "width" is defined across the substrate in a direction perpendicular to the gate electrode track of the given gate level feature, and wherein "height" is defined across the substrate in a direction parallel to the gate electrode track of the given gate level feature. It should be appreciated that a contact head of a gate level feature, when viewed from above, can be defined by essentially any layout shape, including a square or a rectangle. Also, depending on layout requirements and circuit design, a given contact head portion of a gate level feature may or may not have a gate contact defined thereabove.

A gate level of the various embodiments disclosed herein is defined as a restricted gate level, as discussed above. Some of the gate level features form gate electrodes of transistor devices. Others of the gate level features can form conductive segments extending between two points within the gate level. Also, others of the gate level features may be non-functional with respect to integrated circuit operation. It should be understood that the each of the gate level features, regardless of function, is defined to extend across the gate level within their respective gate level feature layout channels without physically contacting other gate level features defined with adjacent gate level feature layout channels.

In one embodiment, the gate level features are defined to provide a finite number of controlled layout shape-to-shape lithographic interactions which can be accurately predicted and optimized for in manufacturing and design processes. In this embodiment, the gate level features are defined to avoid layout shape-to-shape spatial relationships which would introduce adverse lithographic interaction within the layout that cannot be accurately predicted and mitigated with high probability. However, it should be understood that changes in direction of gate level features within their gate level layout channels are acceptable when corresponding lithographic interactions are predictable and manageable.

It should be understood that each of the gate level features, regardless of function, is defined such that no gate level feature along a given gate electrode track is configured to connect directly within the gate level to another gate level feature defined along a different gate electrode track without utilizing a non-gate level feature. Moreover, each connection between gate level features that are placed within different gate level layout channels associated with different gate electrode tracks is made through one or more non-gate level features, which may be defined in higher interconnect levels, i.e., through one or more interconnect levels above the gate level, or by way of local interconnect features at or below the gate level.

Cross-Coupled Transistor Layouts

Figure 4:
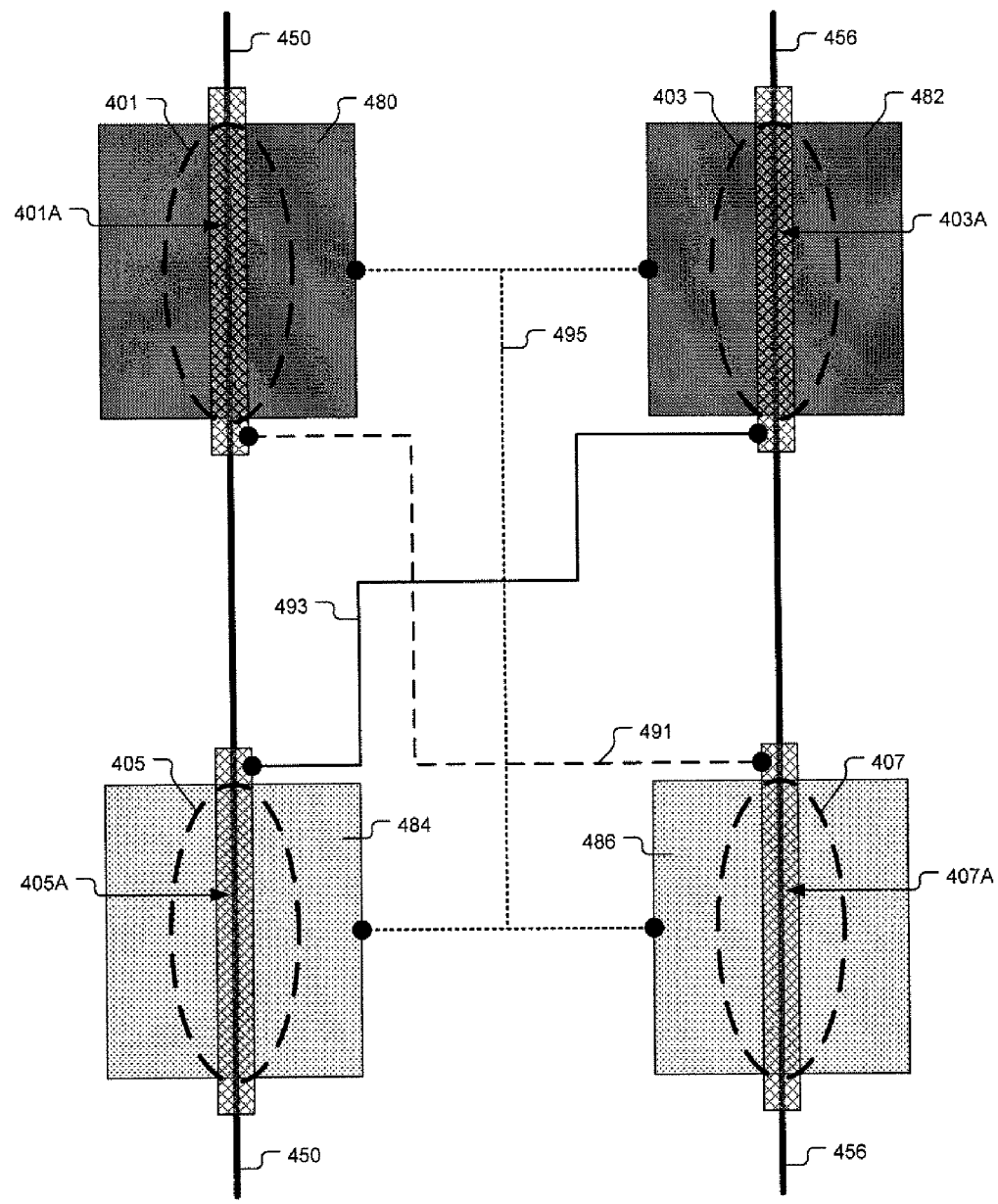
FIG. 4 shows diffusion and gate level layouts of a cross-coupled transistor configuration, in accordance with one embodiment of the present invention.

As discussed above, the cross-coupled transistor configuration includes four transistors (2 PMOS transistors and 2 NMOS transistors). In various embodiments of the present invention, gate electrodes defined in accordance with the restricted gate level layout architecture are respectively used to form the four transistors of a cross-coupled transistor configuration layout. FIG. 4 shows diffusion and gate level layouts of a cross-coupled transistor configuration, in accordance with one embodiment of the present invention. The cross-coupled transistor layout of FIG. 4 includes the first PMOS transistor 401 defined by a gate electrode 401A extending along a gate electrode track 450 and over a p-type diffusion region 480. The first NMOS transistor 407 is defined by a gate electrode 407A extending along a gate electrode track 456 and over an n-type diffusion region 486. The second PMOS transistor 403 is defined by a gate electrode 403A extending along the gate electrode track 456 and over a p-type diffusion region 482. The second NMOS transistor 405 is defined by a gate electrode 405A extending along the gate electrode track 450 and over an n-type diffusion region 484.

The gate electrodes 401A and 407A of the first PMOS transistor 401 and first NMOS transistor 407, respectively, are electrically connected to the first gate node 491 so as to be exposed to a substantially equivalent gate electrode voltage. Similarly, the gate electrodes 403A and 405A of the second PMOS transistor 403 and second NMOS transistor 405, respectively, are electrically connected to the second gate node 493 so as to be exposed to a substantially equivalent gate electrode voltage. Also, each of the four transistors 401, 403, 405, 407 has a respective diffusion terminal electrically connected to the common output node 495.

The cross-coupled transistor layout can be implemented in a number of different ways within the restricted gate level layout architecture. In the exemplary embodiment of FIG. 4, the gate electrodes 401A and 405A of the first PMOS transistor 401 and second NMOS transistor 405 are positioned along the same gate electrode track 450. Similarly, the gate electrodes 403A and 407A of the second PMOS transistor 403 and second NMOS transistor 407 are positioned along the same gate electrode track 456. Thus, the particular embodiment of FIG. 4 can be characterized as a cross-coupled transistor configuration defined on two gate electrode tracks with crossing gate electrode connections.

Figure 5:
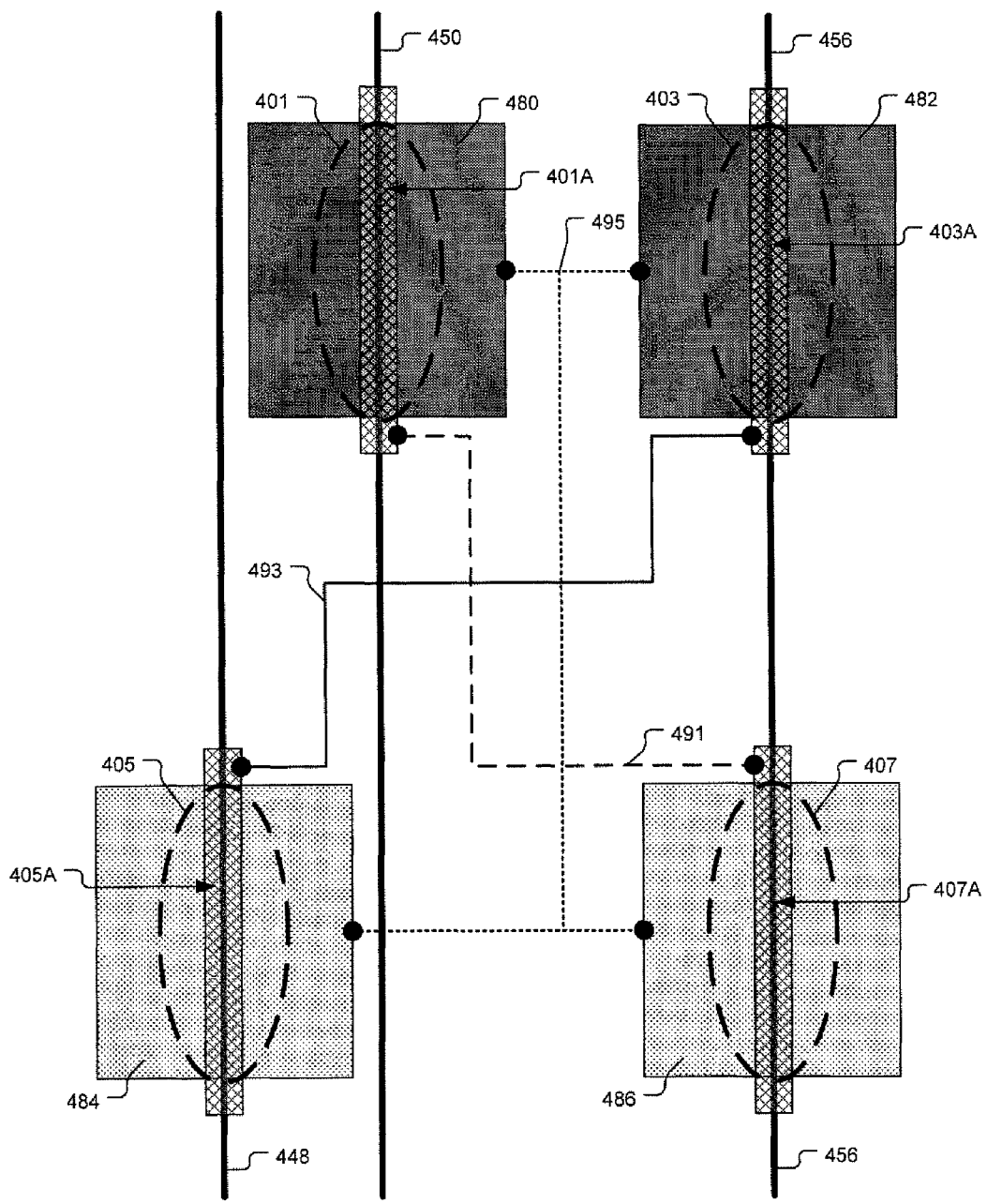
FIG. 5 shows a variation of the cross-coupled transistor configuration of FIG. 4 in which the cross-coupled transistor configuration is defined on three gate electrode tracks with crossing gate electrode connections.

FIG. 5 shows a variation of the cross-coupled transistor configuration of FIG. 4 in which the cross-coupled transistor configuration is defined on three gate electrode tracks with crossing gate electrode connections. Specifically, the gate electrode 401A of the first PMOS transistor 401 is defined on the gate electrode track 450. The gate electrode 403A of the second PMOS transistor 403 is defined on the gate electrode track 456. The gate electrode 407A of the first NMOS transistor 407 is defined on a gate electrode track 456. And, the gate electrode 405A of the second NMOS transistor 405 is defined on a gate electrode track 448. Thus, the particular embodiment of FIG. 5 can be characterized as a cross-coupled transistor configuration defined on three gate electrode tracks with crossing gate electrode connections.

Figure 6:
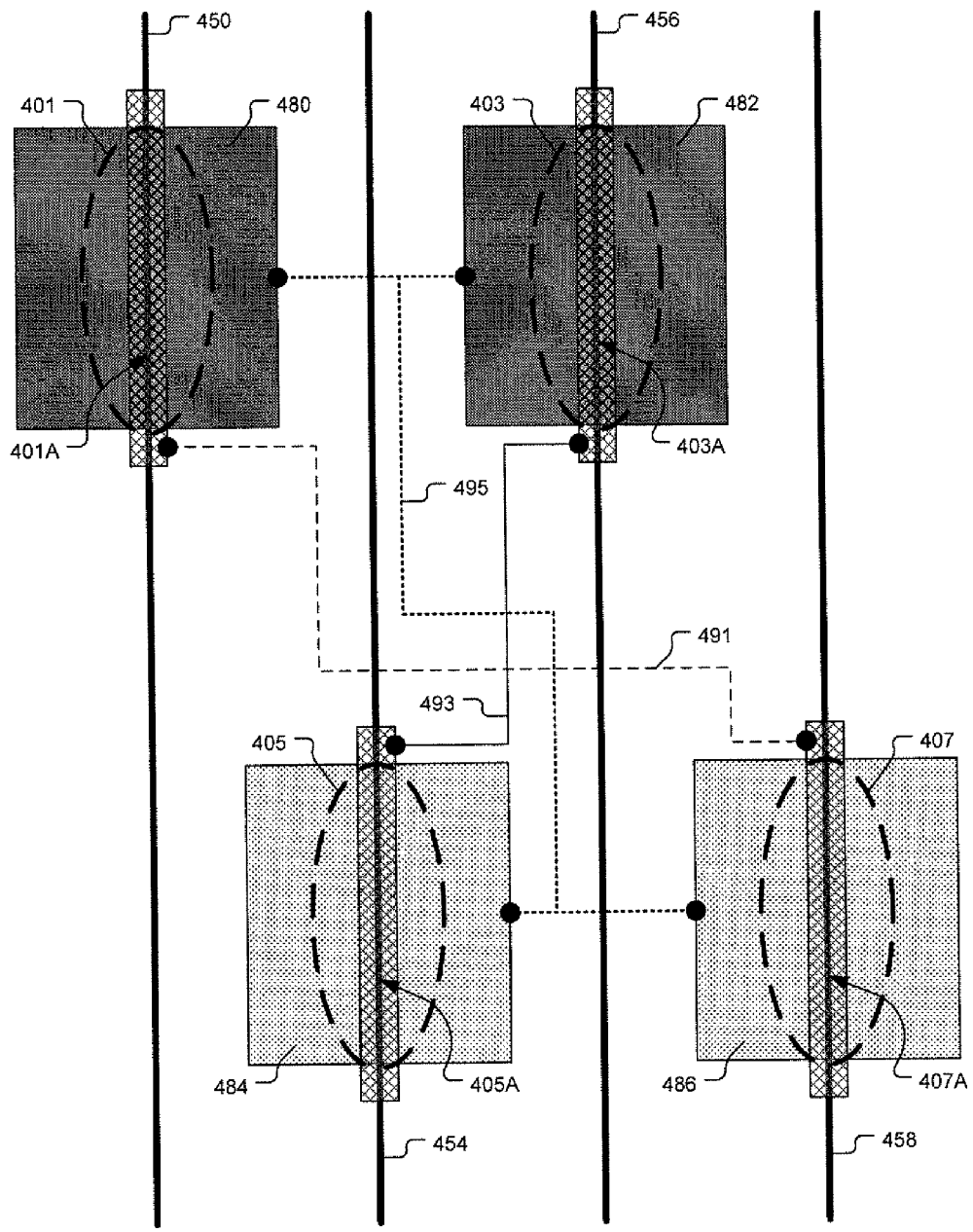
FIG. 6 shows a variation of the cross-coupled transistor configuration of FIG. 4 in which the cross-coupled transistor configuration is defined on four gate electrode tracks with crossing gate electrode connections.

FIG. 6 shows a variation of the cross-coupled transistor configuration of FIG. 4 in which the cross-coupled transistor configuration is defined on four gate electrode tracks with crossing gate electrode connections. Specifically, the gate electrode 401A of the first PMOS transistor 401 is defined on the gate electrode track 450. The gate electrode 403A of the second PMOS transistor 403 is defined on the gate electrode track 456. The gate electrode 407A of the first NMOS transistor 407 is defined on a gate electrode track 458. And, the gate electrode 405A of the second NMOS transistor 405 is defined on a gate electrode track 454. Thus, the particular embodiment of FIG. 6 can be characterized as a cross-coupled transistor configuration defined on four gate electrode tracks with crossing gate electrode connections.

Figure 7:
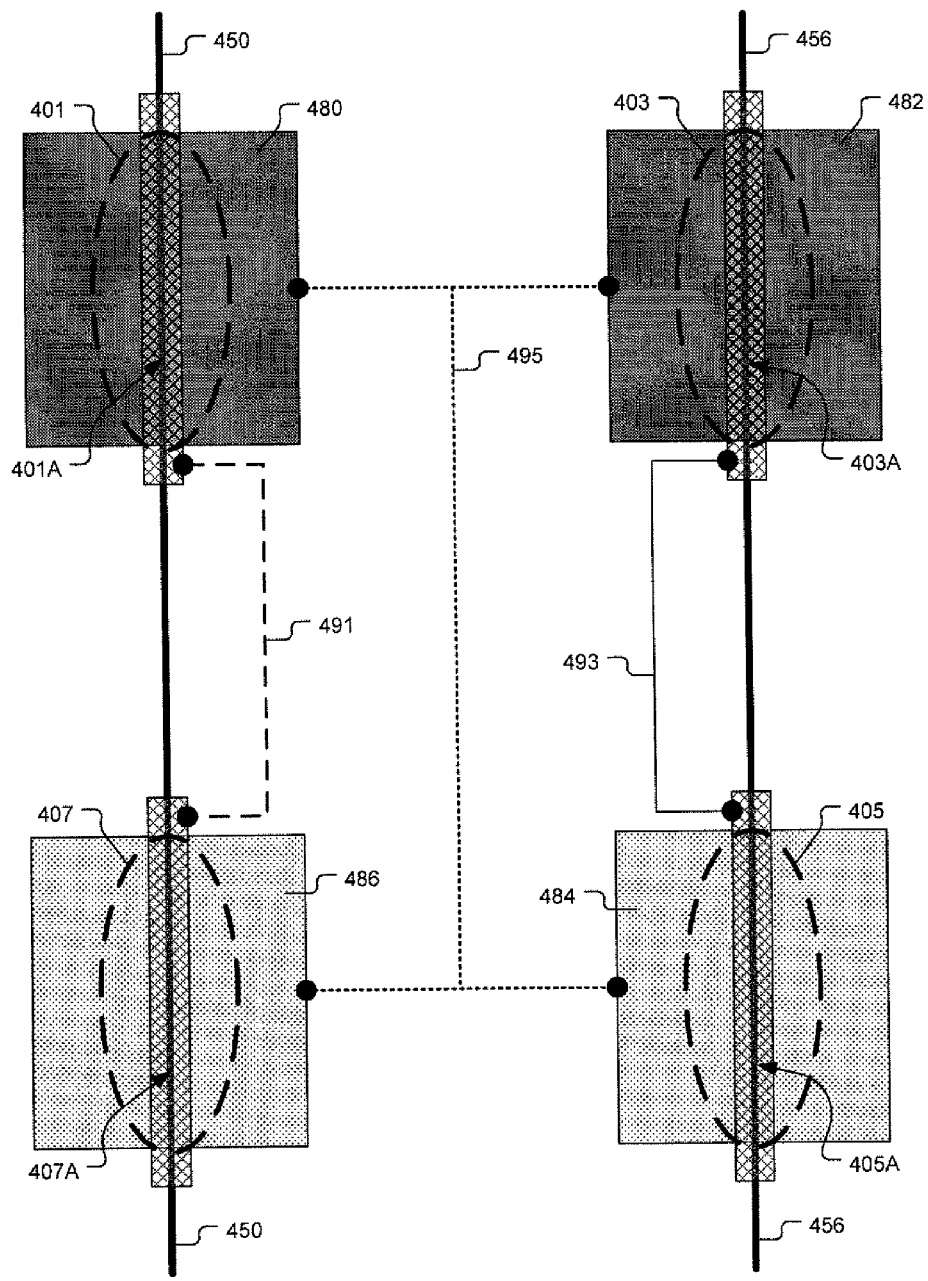
FIG. 7 shows a variation of the cross-coupled transistor configuration of FIG. 4 in which the cross-coupled transistor configuration is defined on two gate electrode tracks without crossing gate electrode connections.

FIG. 7 shows a variation of the cross-coupled transistor configuration of FIG. 4 in which the cross-coupled transistor configuration is defined on two gate electrode tracks without crossing gate electrode connections. Specifically, the gate electrode 401A of the first PMOS transistor 401 is defined on the gate electrode track 450. The gate electrode 407A of the first NMOS transistor 407 is also defined on a gate electrode track 450. The gate electrode 403A of the second PMOS transistor 403 is defined on the gate electrode track 456. And, the gate electrode 405A of the second NMOS transistor 405 is also defined on a gate electrode track 456. Thus, the particular embodiment of FIG. 7 can be characterized as a cross-coupled transistor configuration defined on two gate electrode tracks without crossing gate electrode connections.

Figure 8:
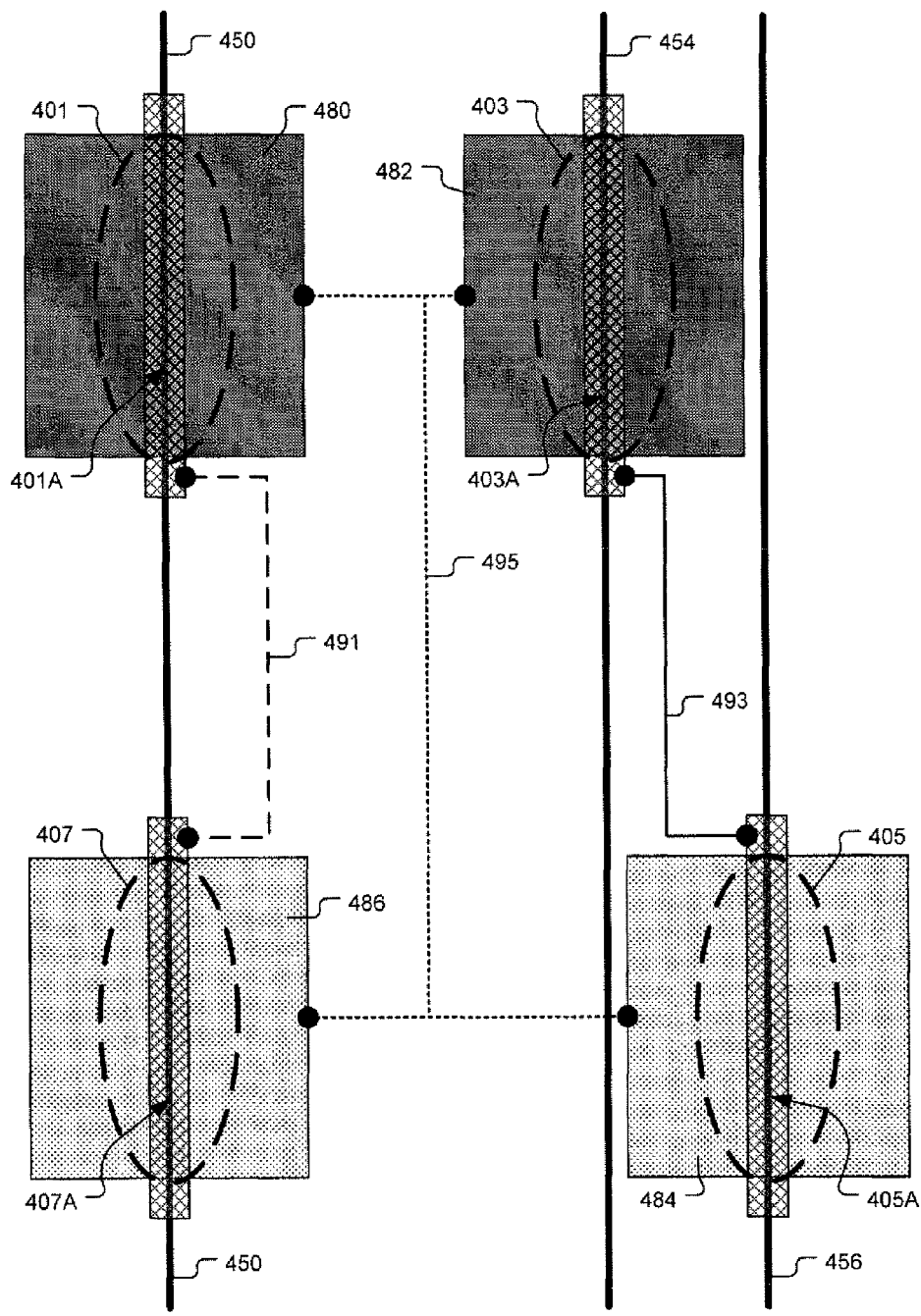
FIG. 8 shows a variation of the cross-coupled transistor configuration of FIG. 4 in which the cross-coupled transistor configuration is defined on three gate electrode tracks without crossing gate electrode connections.

FIG. 8 shows a variation of the cross-coupled transistor configuration of FIG. 4 in which the cross-coupled transistor configuration is defined on three gate electrode tracks without crossing gate electrode connections. Specifically, the gate electrode 401A of the first PMOS transistor 401 is defined on the gate electrode track 450. The gate electrode 407A of the first NMOS transistor 407 is also defined on a gate electrode track 450. The gate electrode 403A of the second PMOS transistor 403 is defined on the gate electrode track 454. And, the gate electrode 405A of the second NMOS transistor 405 is defined on a gate electrode track 456. Thus, the particular embodiment of FIG. 8 can be characterized as a cross-coupled transistor configuration defined on three gate electrode tracks without crossing gate electrode connections.

Figure 9:
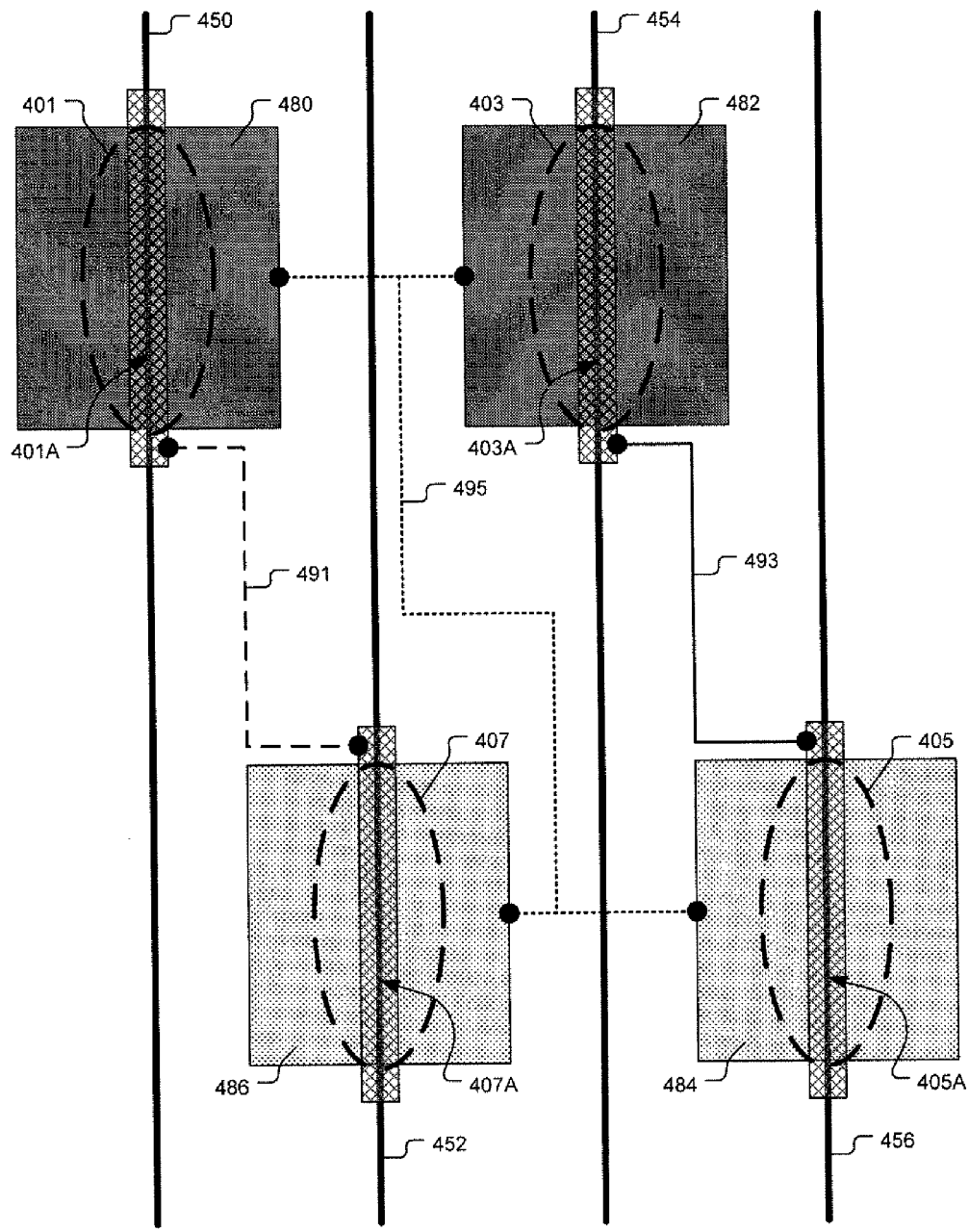
FIG. 9 shows a variation of the cross-coupled transistor configuration of FIG. 4 in which the cross-coupled transistor configuration is defined on four gate electrode tracks without crossing gate electrode connections.

FIG. 9 shows a variation of the cross-coupled transistor configuration of FIG. 4 in which the cross-coupled transistor configuration is defined on four gate electrode tracks without crossing gate electrode connections. Specifically, the gate electrode 401A of the first PMOS transistor 401 is defined on the gate electrode track 450. The gate electrode 403A of the second PMOS transistor 403 is defined on the gate electrode track 454. The gate electrode 407A of the first NMOS transistor 407 is defined on a gate electrode track 452. And, the gate electrode 405A of the second NMOS transistor 405 is defined on a gate electrode track 456. Thus, the particular embodiment of FIG. 9 can be characterized as a cross-coupled transistor configuration defined on four gate electrode tracks without crossing gate electrode connections.

It should be appreciated that although the cross-coupled transistors 401, 403, 405, 407 of FIGS. 4-9 are depicted as having their own respective diffusion region 480, 482, 484, 486, respectively, other embodiments may utilize a contiguous p-type diffusion region for PMOS transistors 401 and 403, and/or utilize a contiguous n-type diffusion region for NMOS transistors 405 and 407. Moreover, although the example layouts of FIGS. 4-9 depict the p-type diffusion regions 480 and 482 in a vertically aligned position, it should be understood that the p-type diffusion regions 480 and 482 may not be vertically aligned in other embodiments. Similarly, although the example layouts of FIGS. 4-9 depict the n-type diffusion regions 484 and 486 in a vertically aligned position, it should be understood that the n-type diffusion regions 484 and 486 may not be vertically aligned in other embodiments.

For example, the cross-coupled transistor layout of FIG. 4 includes the first PMOS transistor 401 defined by the gate electrode 401A extending along the gate electrode track 450 and over a first p-type diffusion region 480. And, the second PMOS transistor 403 is defined by the gate electrode 403A extending along the gate electrode track 456 and over a second p-type diffusion region 482. The first NMOS transistor 407 is defined by the gate electrode 407A extending along the gate electrode track 456 and over a first n-type diffusion region 486. And, the second NMOS transistor 405 is defined by the gate electrode 405A extending along the gate electrode track 450 and over a second n-type diffusion region 484.

The gate electrode tracks 450 and 456 extend in a first parallel direction. At least a portion of the first p-type diffusion region 480 and at least a portion of the second p-type diffusion region 482 are formed over a first common line of extent that extends across the substrate perpendicular to the first parallel direction of the gate electrode tracks 450 and 456. Additionally, at least a portion of the first n-type diffusion region 486 and at least a portion of the second n-type diffusion region 484 are formed over a second common line of extent that extends across the substrate perpendicular to the first parallel direction of the gate electrode tracks 450 and 456.

Figure 14A:
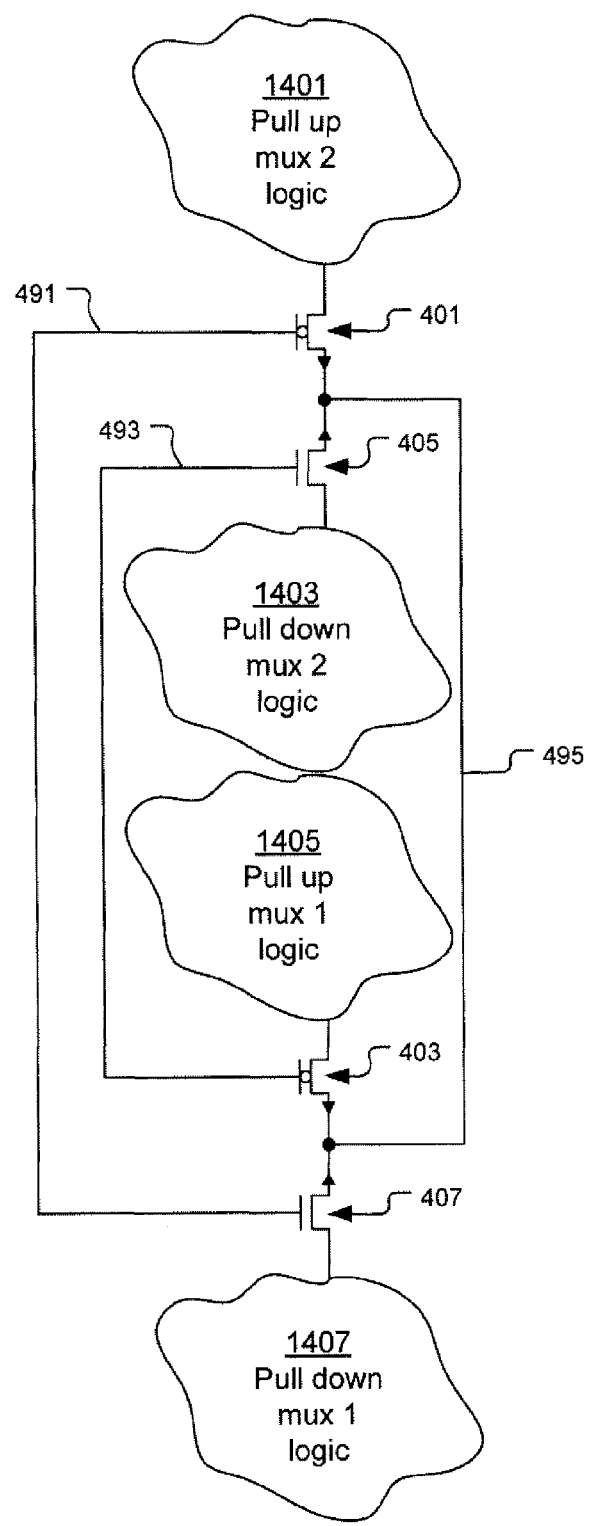
FIG. 14A shows a generalized multiplexer circuit in which all four cross-coupled transistors are directly connected to the common node, in accordance with one embodiment of the present invention.
Figure 14B:
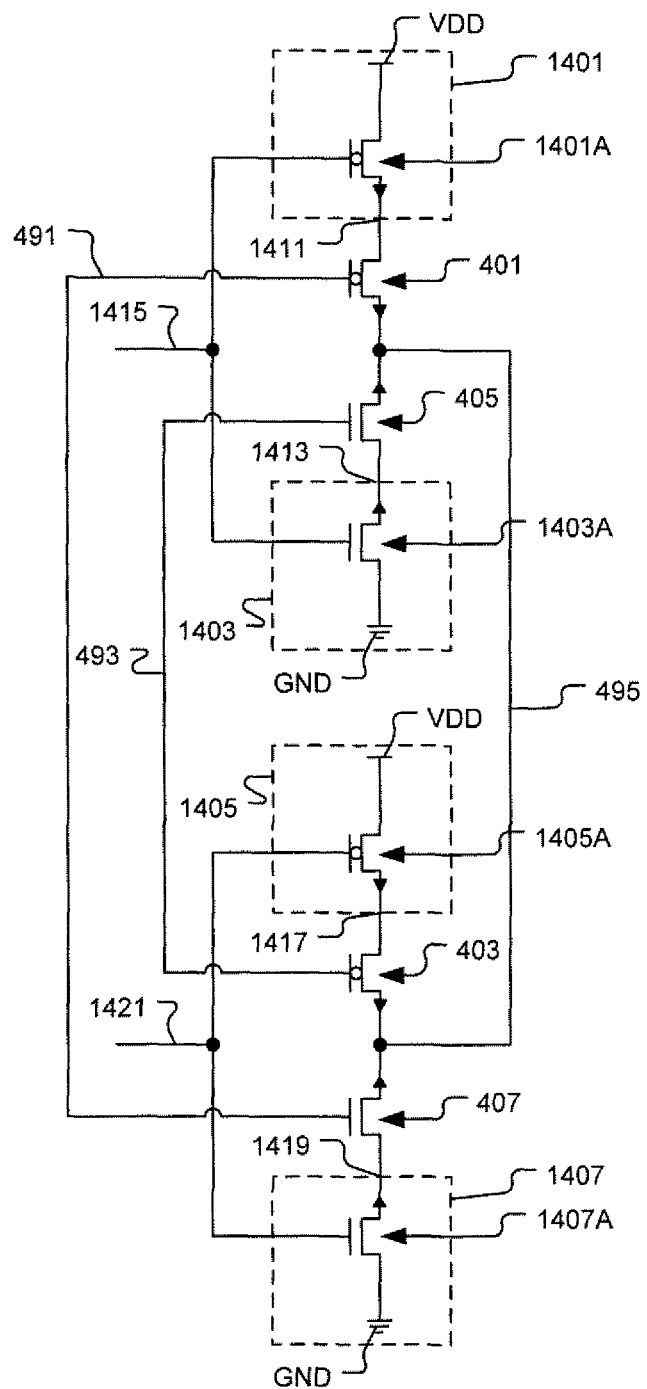
FIG. 14B shows an exemplary implementation of the multiplexer circuit of FIG. 14A with a detailed view of the pull up logic, and the pull down logic, in accordance with one embodiment of the present invention.
Figure 14C:
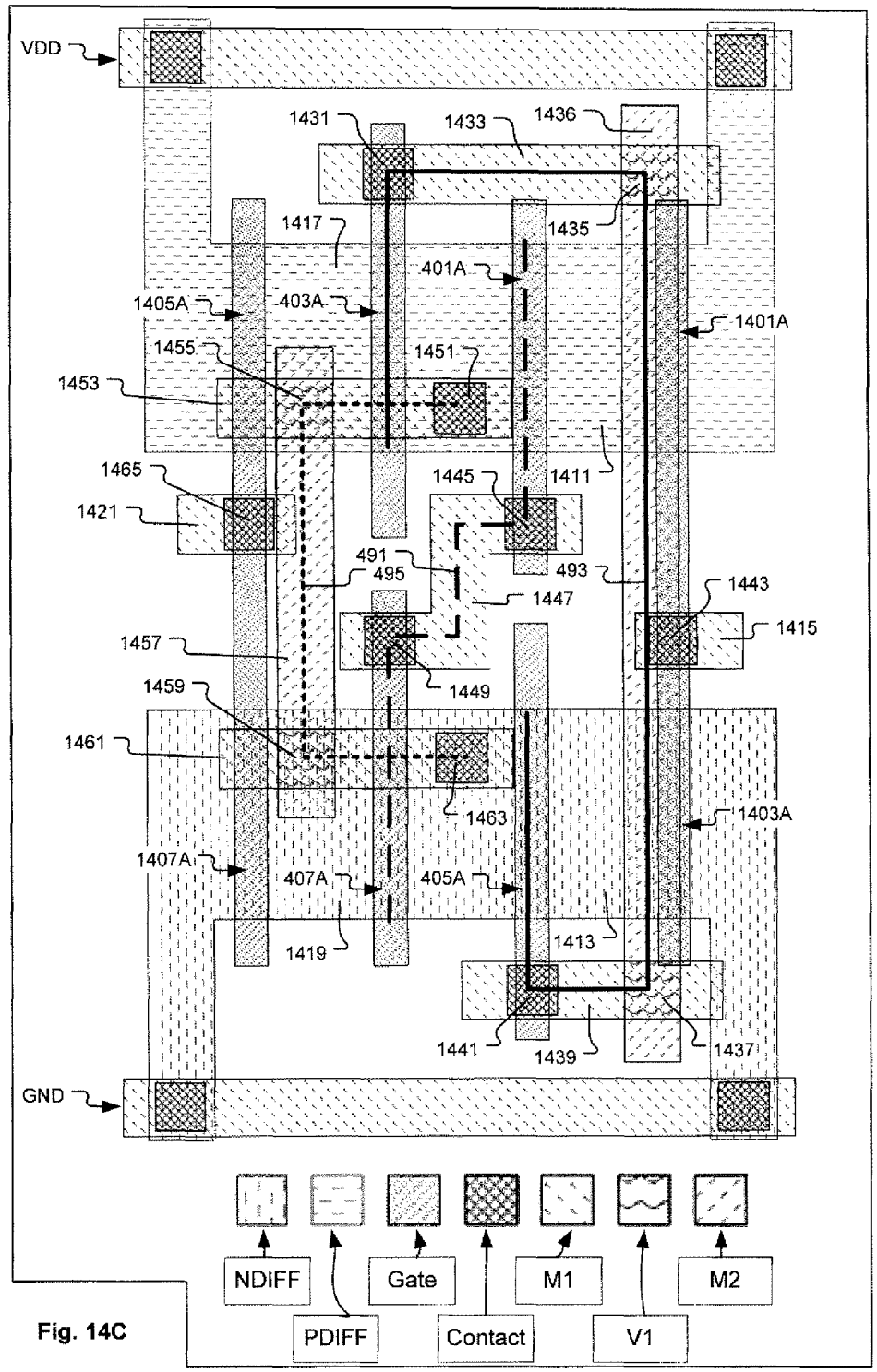
FIG. 14C shows a multi-level layout of the multiplexer circuit of FIG. 14B implemented using a restricted gate level layout architecture cross-coupled transistor layout, in accordance with one embodiment of the present invention.

FIG. 14C shows that two PMOS transistors (401A and 403A) of the cross-coupled transistors are disposed over a common p-type diffusion region (PDIFF), two NMOS transistors (405A and 407A) of the cross-coupled transistors are disposed over a common n-type diffusion region (NDIFF), and the p-type (PDIFF) and n-type (NDIFF) diffusion regions associated with the cross-coupled transistors are electrically connected to a common node 495. The gate electrodes of the cross-coupled transistors (401A, 403A, 405A, 407A) extend in a first parallel direction. At least a portion of a first p-type diffusion region associated with the first PMOS transistor 401A and at least a portion of a second p-type diffusion region associated with the second PMOS transistor 403A are formed over a first common line of extent that extends across the substrate perpendicular to the first parallel direction of the gate electrodes. Additionally, at least a portion of a first n-type diffusion region associated with the first NMOS transistor 405A and at least a portion of a second n-type diffusion region associated with the second NMOS transistor 407A are formed over a second common line of extent that extends across the substrate perpendicular to the first parallel direction of the gate electrodes.

Figure 23:
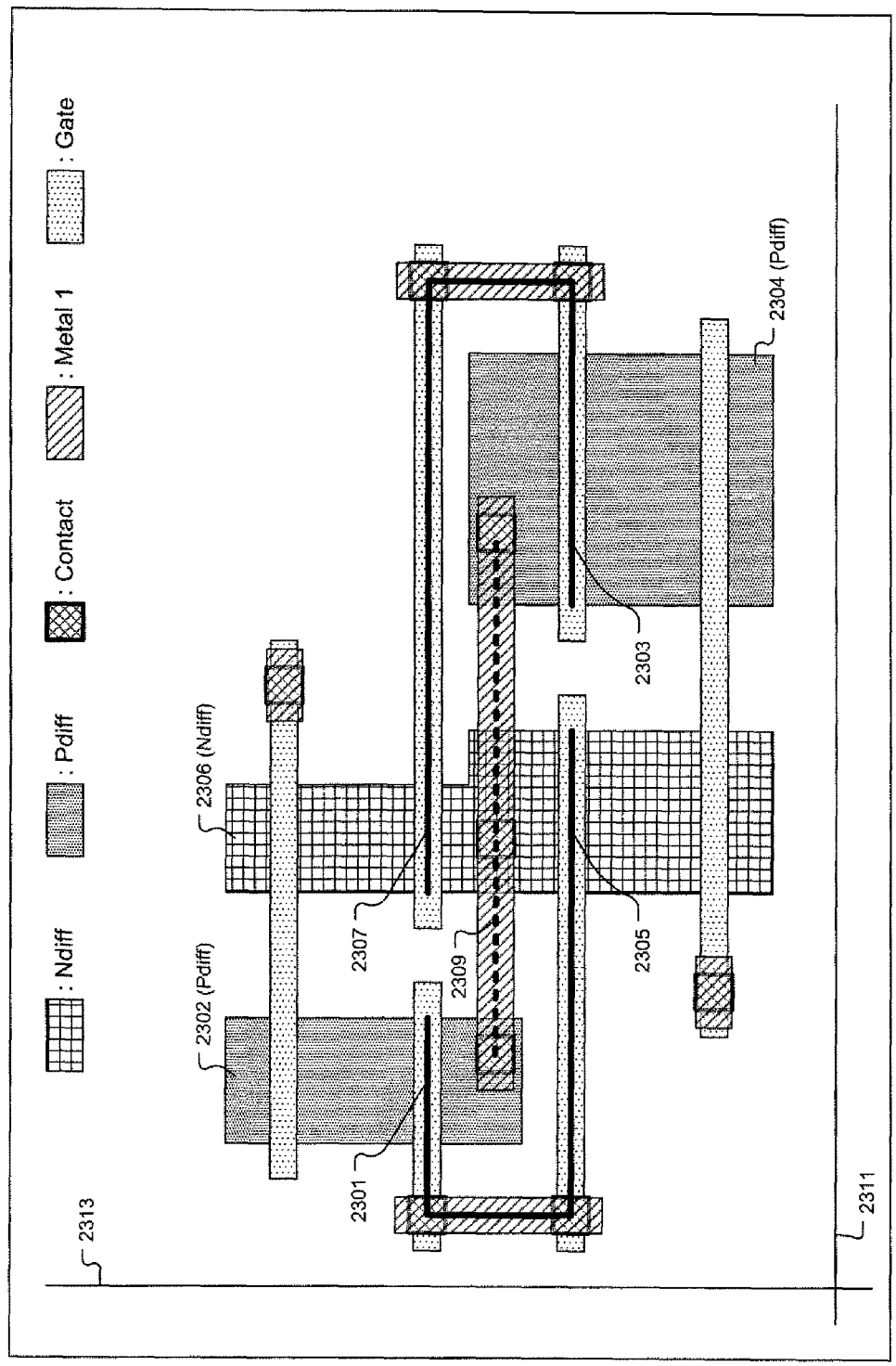
FIG. 23 shows an embodiment in which two PMOS transistors of the cross-coupled transistors are respectively disposed over physically separated p-type diffusion regions, two NMOS transistors of the cross-coupled transistors are disposed over a common n-type diffusion region, and the p-type and n-type diffusion regions associated with the cross-coupled transistors are electrically connected to a common node.

In another embodiment, two PMOS transistors of the cross-coupled transistors are respectively disposed over physically separated p-type diffusion regions, two NMOS transistors of the cross-coupled transistors are disposed over a common n-type diffusion region, and the p-type and n-type diffusion regions associated with the cross-coupled transistors are electrically connected to a common node. FIG. 23 illustrates a cross-coupled transistor layout embodiment in which two PMOS transistors (2301 and 2303) of the cross-coupled transistors are respectively disposed over physically separated p-type diffusion regions (2302 and 2304), two NMOS transistors (2305 and 2307) of the cross-coupled transistors are disposed over a common n-type diffusion region 2306, and the p-type (2302, 2304) and n-type 2306 diffusion regions associated with the cross-coupled transistors are electrically connected to a common node 2309.

FIG. 23 shows that the gate electrodes of the cross-coupled transistors (2301, 2303, 2305, 2307) extend in a first parallel direction 2311. FIG. 23 also shows that the first 2302 and second 2304 p-type diffusion regions are formed in a spaced apart manner relative to the first parallel direction 2311 of the gate electrodes, such that no single line of extent that extends across the substrate in a direction 2313 perpendicular to the first parallel direction 2311 of the gate electrodes intersects both the first 2302 and second 2304 p-type diffusion regions. Also, FIG. 23 shows that at least a portion of a first n-type diffusion region (part of 2306) associated with a first NMOS transistor 2305 and at least a portion of a second n-type diffusion region (part of 2306) associated with a second NMOS transistor 2307 are formed over a common-line of extent that extends across the substrate in the direction 2313 perpendicular to the first parallel direction 2311 of the gate electrodes.

Figure 24:
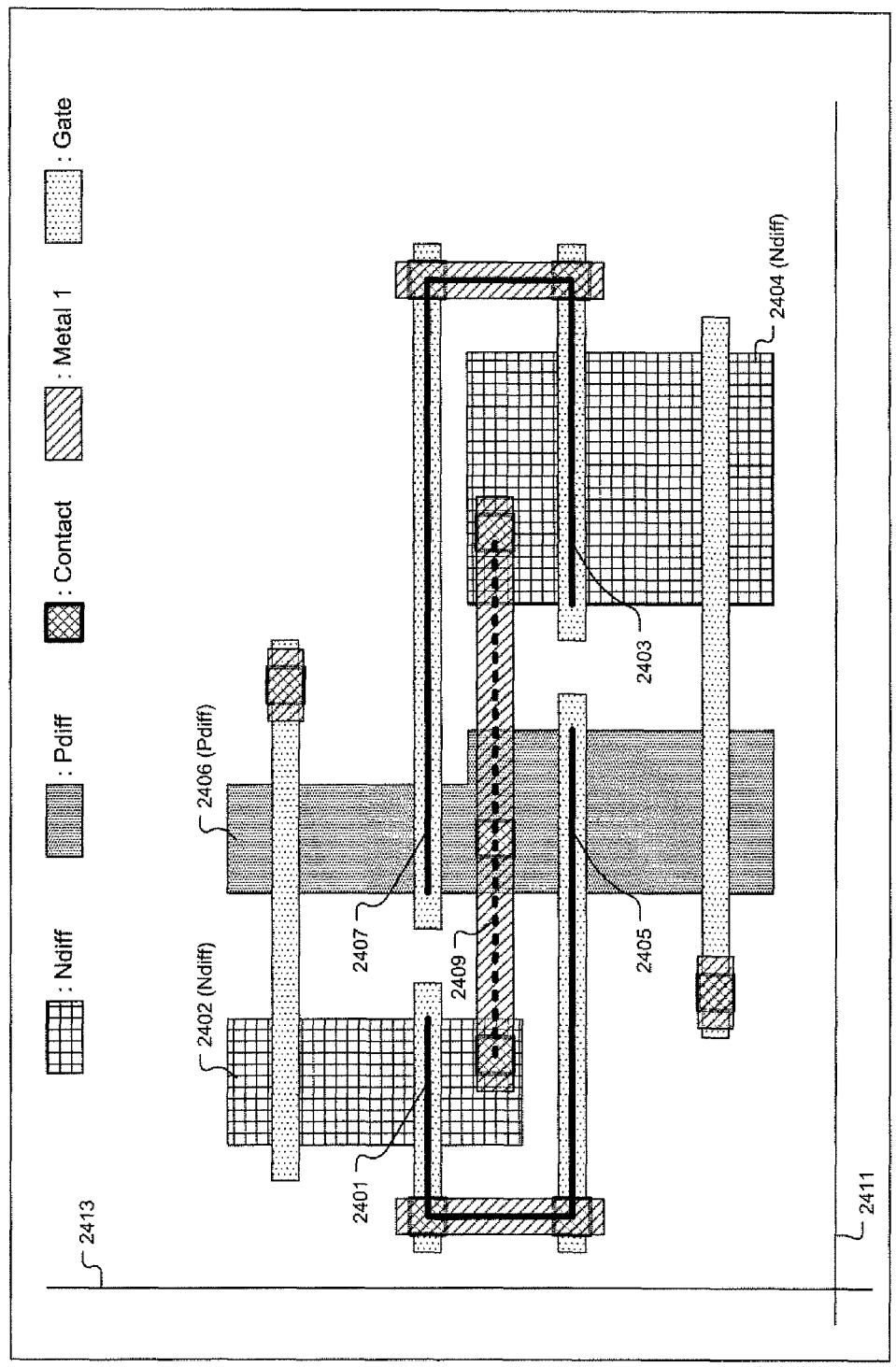
FIG. 24 shows an embodiment in which two PMOS transistors of the cross-coupled transistors are disposed over a common p-type diffusion region, two NMOS transistors of the cross-coupled transistors are respectively disposed over physically separated n-type diffusion regions, and the p-type and n-type diffusion regions associated with the cross-coupled transistors are electrically connected to a common node.

In another embodiment, two PMOS transistors of the cross-coupled transistors are disposed over a common p-type diffusion region, two NMOS transistors of the cross-coupled transistors are respectively disposed over physically separated n-type diffusion regions, and the p-type and n-type diffusion regions associated with the cross-coupled transistors are electrically connected to a common node. FIG. 24 shows the cross-coupled transistor embodiment of FIG. 23, with the p-type (2302 and 2304) and n-type 2306 diffusion regions of FIG. 23 reversed to n-type (2402 and 2404) and p-type 2406 diffusion regions, respectively. FIG. 24 illustrates a cross-coupled transistor layout embodiment in which two PMOS transistors (2405 and 2407) of the cross-coupled transistors are disposed over a common p-type diffusion region 2406, two NMOS transistors (2401 and 2403) of the cross-coupled transistors are respectively disposed over physically separated n-type diffusion regions (2402 and 2404), and the p-type 2406 and n-type (2402 and 2404) diffusion regions associated with the cross-coupled transistors are electrically connected to a common node 2409.

FIG. 24 shows that the gate electrodes of the cross-coupled transistors (2401, 2403, 2405, 2407) extend in a first parallel direction 2411. FIG. 24 also shows that at least a portion of a first p-type diffusion region (part of 2406) associated with a first PMOS transistor 2405 and at least a portion of a second p-type diffusion region (part of 2406) associated with a second PMOS transistor 2407 are formed over a common line of extent that extends across the substrate in a direction 2413 perpendicular to the first parallel direction 2411 of the gate electrodes. Also, FIG. 24 shows that the first 2402 and second 2404 n-type diffusion regions are formed in a spaced apart manner relative to the first parallel direction 2411, such that no single line of extent that extends across the substrate in the direction 2413 perpendicular to the first parallel direction 2411 of the gate electrodes intersects both the first 2402 and second 2404 n-type diffusion regions.

Figure 25:
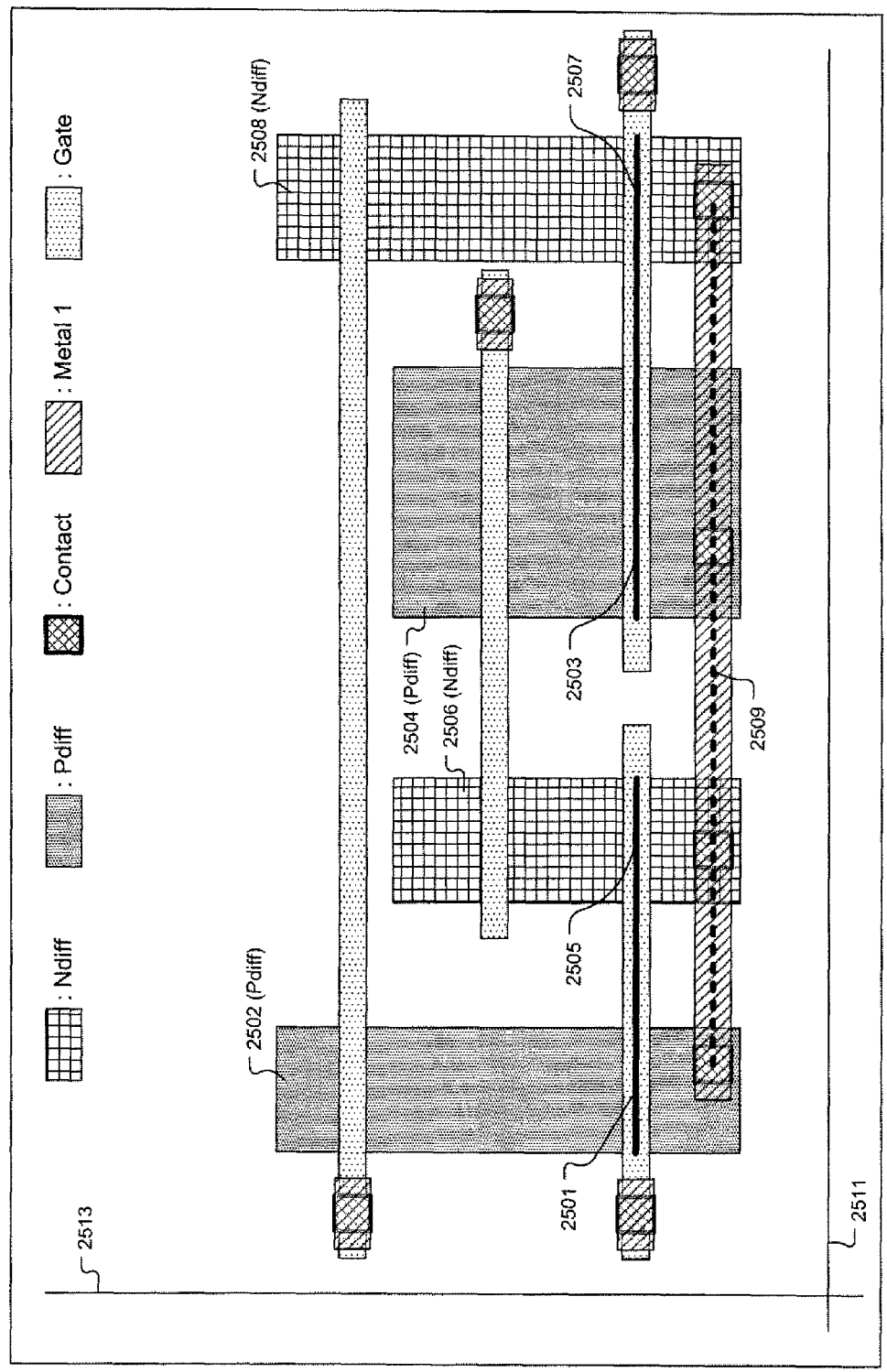
FIG. 25 shows an embodiment in which two PMOS transistors of the cross-coupled transistors are respectively disposed over physically separated p-type diffusion regions, two NMOS transistors of the cross-coupled transistors are respectively disposed over physically separated n-type diffusion regions, and the p-type and n-type diffusion regions associated with the cross-coupled transistors are electrically connected to a common node.

In yet another embodiment, two PMOS transistors of the cross-coupled transistors are respectively disposed over physically separated p-type diffusion regions, two NMOS transistors of the cross-coupled transistors are respectively disposed over physically separated n-type diffusion regions, and the p-type and n-type diffusion regions associated with the cross-coupled transistors are electrically connected to a common node. FIG. 25 shows a cross-coupled transistor layout embodiment in which two PMOS transistors (2501 and 2503) of the cross-coupled transistors are respectively disposed over physically separated p-type diffusion regions (2502 and 2504), two NMOS transistors (2505 and 2507) of the cross-coupled transistors are respectively disposed over physically separated n-type diffusion regions (2506 and 2508), and the p-type (2502 and 2504) and n-type (2506 and 2508) diffusion regions associated with the cross-coupled transistors are electrically connected to a common node 2509.

FIG. 25 shows that the gate electrodes of the cross-coupled transistors (2501, 2503, 2505, 2507) extend in a first parallel direction 2511. FIG. 25 also shows that the first 2502 and second 2504 p-type diffusion regions are formed in a spaced apart manner relative to the first parallel direction 2511, such that no single line of extent that extends across the substrate in a direction 2513 perpendicular to the first parallel direction 2511 of the gate electrodes intersects both the first 2502 and second 2504 p-type diffusion regions. Also, FIG. 25 shows that the first 2506 and second 2508 n-type diffusion regions are formed in a spaced apart manner relative to the first parallel direction 2511, such that no single line of extent that extends across the substrate in the direction 2513 perpendicular to the first parallel direction 2511 of the gate electrodes intersects both the first 2506 and second 2508 n-type diffusion regions.

In FIGS. 4-9, the gate electrode connections are electrically represented by lines 491 and 493, and the common node electrical connection is represented by line 495. It should be understood that in layout space each of the gate electrode electrical connections 491, 493, and the common node electrical connection 495 can be structurally defined by a number of layout shapes extending through multiple chip levels. FIGS. 10-13 show examples of how the gate electrode electrical connections 491, 493, and the common node electrical connection 495 can be defined in different embodiments. It should be understood that the example layouts of FIGS. 10-13 are provided by way of example and in no way represent an exhaustive set of possible multi-level connections that can be utilized for the gate electrode electrical connections 491, 493, and the common node electrical connection 495.

Figure 10:
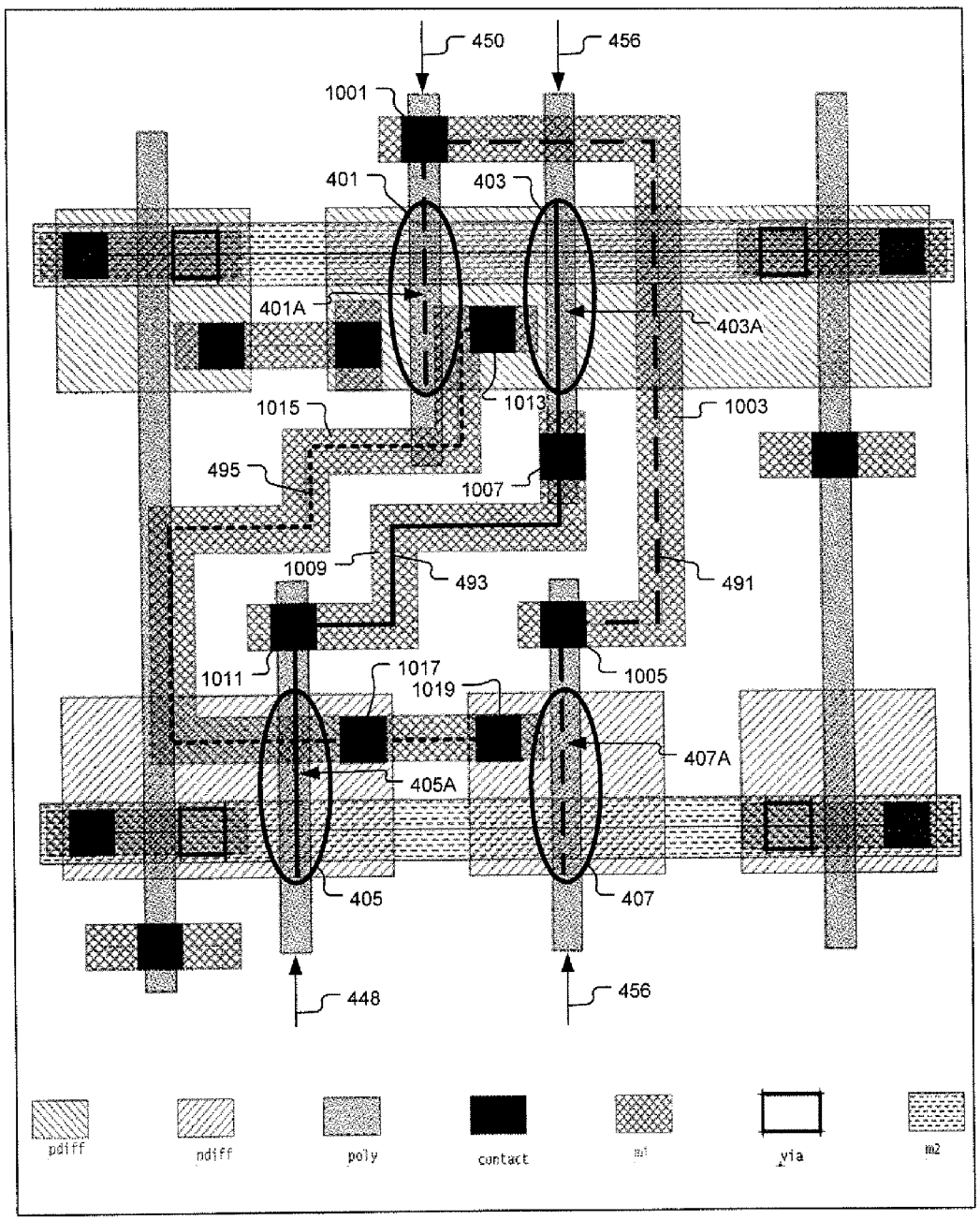
FIG. 10 shows a multi-level layout including a cross-coupled transistor configuration defined on three gate electrode tracks with crossing gate electrode connections, in accordance with one embodiment of the present invention.

FIG. 10 shows a multi-level layout including a cross-coupled transistor configuration defined on three gate electrode tracks with crossing gate electrode connections, in accordance with one embodiment of the present invention. The layout of FIG. 10 represents an exemplary implementation of the cross-coupled transistor embodiment of FIG. 5. The electrical connection 491 between the gate electrode 401A of the first PMOS transistor 401 and the gate electrode 407A of the first NMOS transistor 407 is formed by a multi-level connection that includes a gate contact 1001, a (two-dimensional) metal-1 structure 1003, and a gate contact 1005. The electrical connection 493 between the gate electrode 403A of the second PMOS transistor 403 and the gate electrode 405A of the second NMOS transistor 405 is formed by a multi-level connection that includes a gate contact 1007, a (two-dimensional) metal-1 structure 1009, and a gate contact 1011. The output node electrical connection 495 is formed by a multi-level connection that includes a diffusion contact 1013, a (two-dimensional) metal-1 structure 1015, a diffusion contact 1017, and a diffusion contact 1019.

Figure 11:
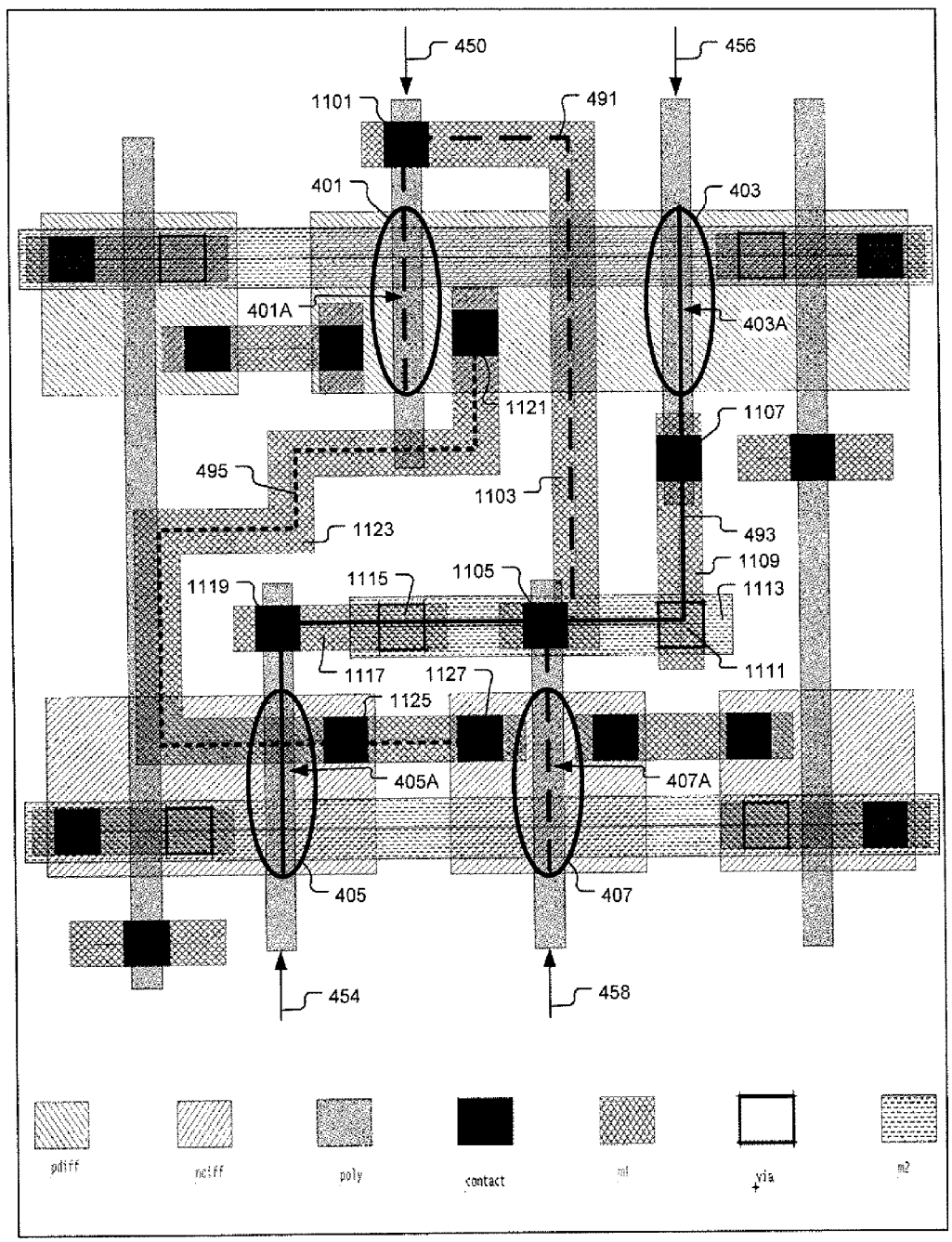
FIG. 11 shows a multi-level layout including a cross-coupled transistor configuration defined on four gate electrode tracks with crossing gate electrode connections, in accordance with one embodiment of the present invention.

FIG. 11 shows a multi-level layout including a cross-coupled transistor configuration defined on four gate electrode tracks with crossing gate electrode connections, in accordance with one embodiment of the present invention. The layout of FIG. 11 represents an exemplary implementation of the cross-coupled transistor embodiment of FIG. 6. The electrical connection 491 between the gate electrode 401A of the first PMOS transistor 401 and the gate electrode 407A of the first NMOS transistor 407 is formed by a multi-level connection that includes a gate contact 1101, a (two-dimensional) metal-1 structure 1103, and a gate contact 1105. The electrical connection 493 between the gate electrode 403A of the second PMOS transistor 403 and the gate electrode 405A of the second NMOS transistor 405 is formed by a multi-level connection that includes a gate contact 1107, a (one-dimensional) metal-1 structure 1109, a via 1111, a (one-dimensional) metal-2 structure 1113, a via 1115, a (one-dimensional) metal-1 structure 1117, and a gate contact 1119.

The output node electrical connection 495 is formed by a multi-level connection that includes a diffusion contact 1121, a (two-dimensional) metal-1 structure 1123, a diffusion contact 1125, and a diffusion contact 1127.

Figure 12:
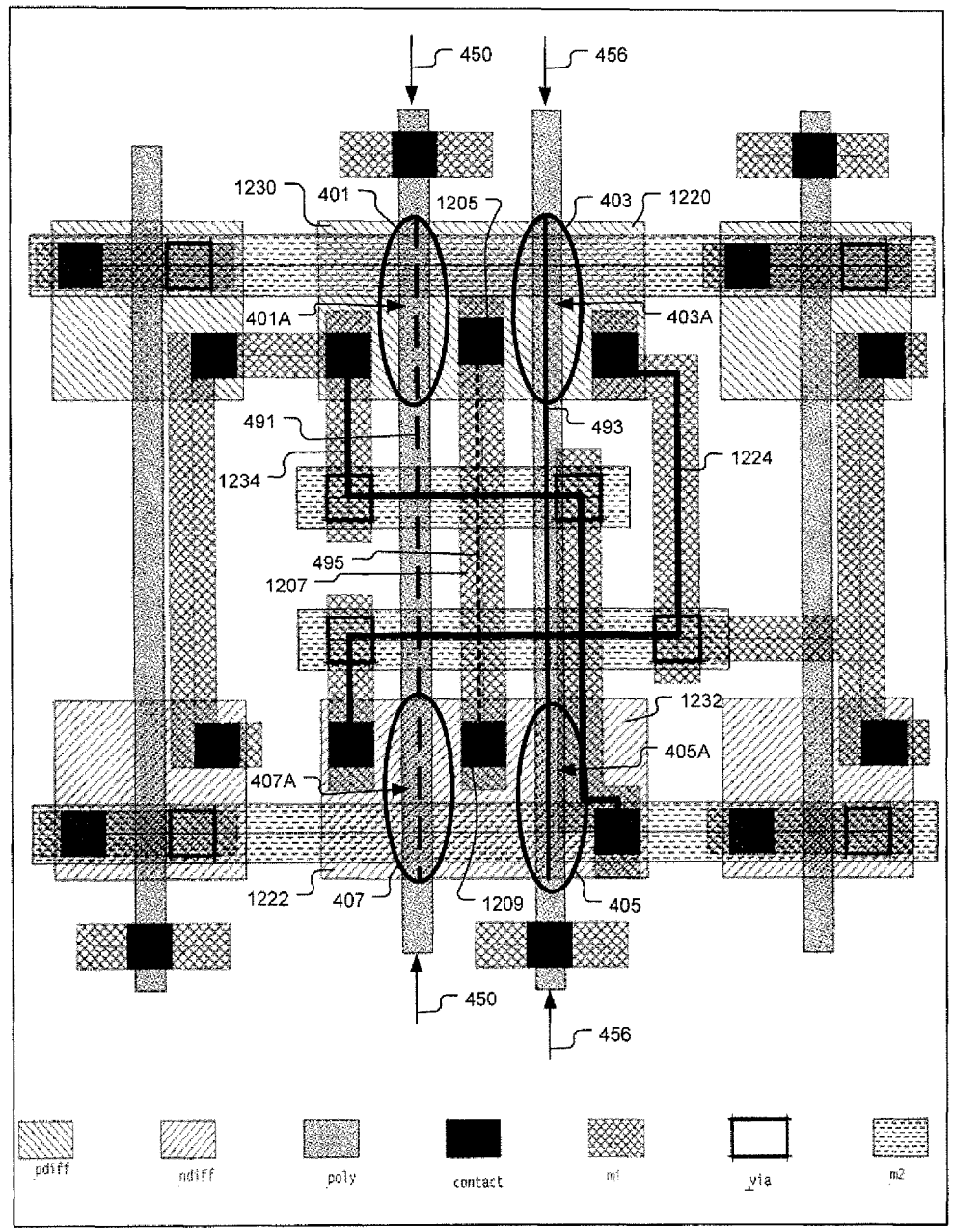
FIG. 12 shows a multi-level layout including a cross-coupled transistor configuration defined on two gate electrode tracks without crossing gate electrode connections, in accordance with one embodiment of the present invention.

FIG. 12 shows a multi-level layout including a cross-coupled transistor configuration defined on two gate electrode tracks without crossing gate electrode connections, in accordance with one embodiment of the present invention. The layout of FIG. 12 represents an exemplary implementation of the cross-coupled transistor embodiment of FIG. 7. The gate electrodes 401A and 407A of the first PMOS transistor 401 and first NMOS transistor 407, respectively, are formed by a contiguous gate level structure placed on the gate electrode track 450. Therefore, the electrical connection 491 between the gate electrodes 401A and 407A is made directly within the gate level along the single gate electrode track 450. Similarly, the gate electrodes 403A and 405A of the second PMOS transistor 403 and second NMOS transistor 405, respectively, are formed by a contiguous gate level structure placed on the gate electrode track 456. Therefore, the electrical connection 493 between the gate electrodes 403A and 405A is made directly within the gate level along the single gate electrode track 456. The output node electrical connection 495 is formed by a multi-level connection that includes a diffusion contact 1205, a (one-dimensional) metal-1 structure 1207, and a diffusion contact 1209.

Further with regard to FIG. 12, it should be noted that when the gate electrodes 401A and 407A of the first PMOS transistor 401 and first NMOS transistor 407, respectively, are formed by a contiguous gate level structure, and when the gate electrodes 403A and 405A of the second PMOS transistor 403 and second NMOS transistor 405, respectively, are formed by a contiguous gate level structure, the corresponding cross-coupled transistor layout may include electrical connections between diffusion regions associated with the four cross-coupled transistors 401, 407, 403, 405, that cross in layout space without electrical communication therebetween. For example, diffusion region 1220 of PMOS transistor 403 is electrically connected to diffusion region 1222 of NMOS transistor 407 as indicated by electrical connection 1224, and diffusion region 1230 of PMOS transistor 401 is electrically connected to diffusion region 1232 of NMOS transistor 405 as indicated by electrical connection 1234, wherein electrical connections 1224 and 1234 cross in layout space without electrical communication therebetween.

Figure 13:
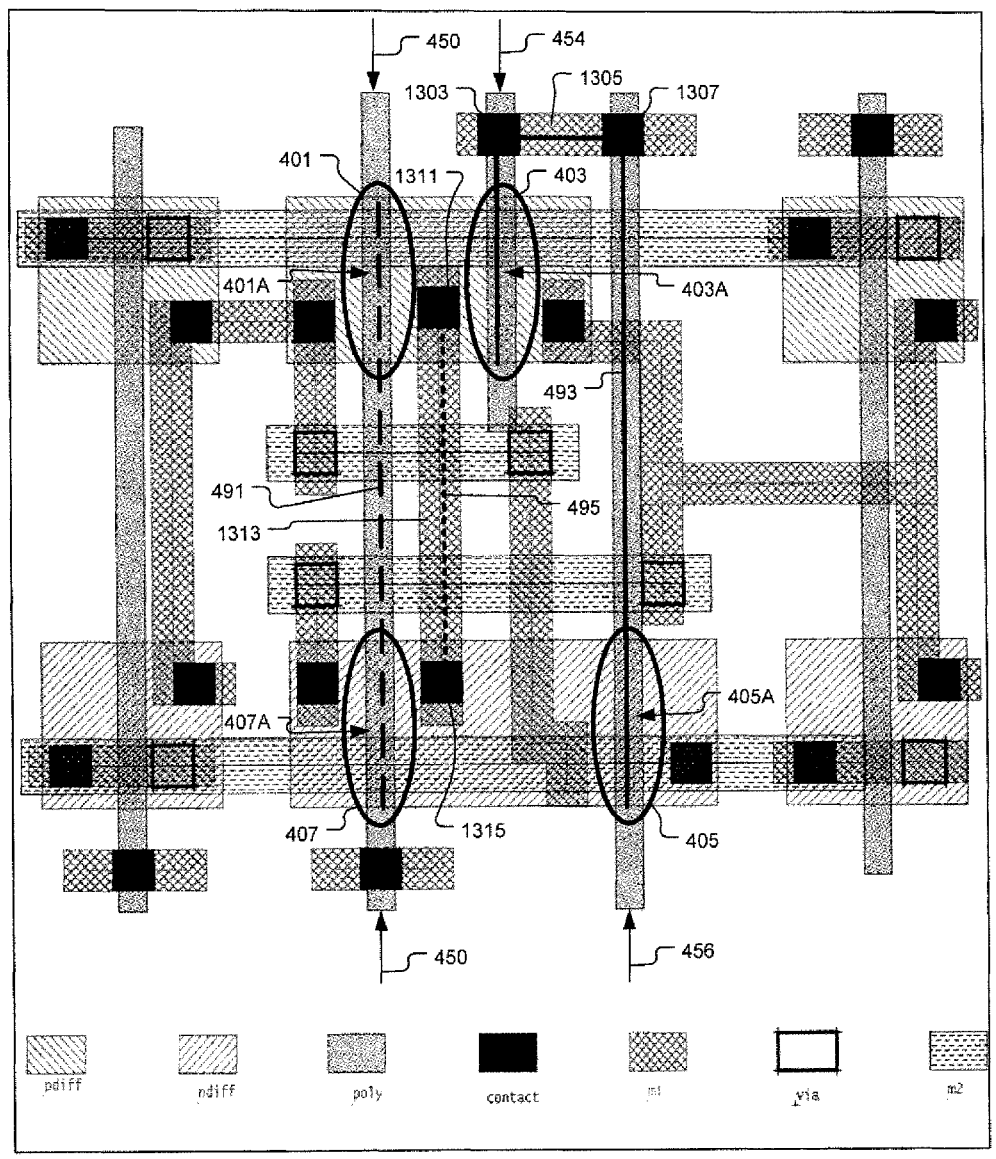
FIG. 13 shows a multi-level layout including a cross-coupled transistor configuration defined on three gate electrode tracks without crossing gate electrode connections, in accordance with one embodiment of the present invention.

FIG. 13 shows a multi-level layout including a cross-coupled transistor configuration defined on three gate electrode tracks without crossing gate electrode connections, in accordance with one embodiment of the present invention. The layout of FIG. 13 represents an exemplary implementation of the cross-coupled transistor embodiment of FIG. 8. The gate electrodes 401A and 407A of the first PMOS transistor 401 and first NMOS transistor 407, respectively, are formed by a contiguous gate level structure placed on the gate electrode track 450. Therefore, the electrical connection 491 between the gate electrodes 401A and 407A is made directly within the gate level along the single gate electrode track 450. The electrical connection 493 between the gate electrode 403A of the second PMOS transistor 403 and the gate electrode 405A of the second NMOS transistor 405 is formed by a multi-level connection that includes a gate contact 1303, a (one-dimensional) metal-1 structure 1305, and a gate contact 1307. The output node electrical connection 495 is formed by a multi-level connection that includes a diffusion contact 1311, a (one-dimensional) metal-1 structure 1313, and a diffusion contact 1315.

In one embodiment, electrical connection of the diffusion regions of the cross-coupled transistors to the common node 495 can be made using one or more local interconnect conductors defined at or below the gate level itself. This embodiment may also combine local interconnect conductors with conductors in higher levels (above the gate level) by way of contacts and/or vias to make the electrical connection of the diffusion regions of the cross-coupled transistors to the common node 495. Additionally, in various embodiments, conductive paths used to electrically connect the diffusion regions of the cross-coupled transistors to the common node 495 can be defined to traverse over essentially any area of the chip as required to accommodate a routing solution for the chip.

Also, it should be appreciated that because the n-type and p-type diffusion regions are physically separate, and because the p-type diffusion regions for the two PMOS transistors of the cross-coupled transistors can be physically separate, and because the n-type diffusion regions for the two NMOS transistors of the cross-coupled transistors can be physically separate, it is possible in various embodiments to have each of the four cross-coupled transistors disposed at arbitrary locations in the layout relative to each other. Therefore, unless necessitated by electrical performance or other layout influencing conditions, it is not required that the four cross-coupled transistors be located within a prescribed proximity to each other in the layout. Although, location of the cross-coupled transistors within a prescribed proximity to each other is not precluded, and may be desirable in certain circuit layouts.

In the exemplary embodiments disclosed herein, it should be understood that diffusion regions are not restricted in size. In other words, any given diffusion region can be sized in an arbitrary manner as required to satisfy electrical and/or layout requirements. Additionally, any given diffusion region can be shaped in an arbitrary manner as required to satisfy electrical and/or layout requirements. Also, it should be understood that the four transistors of the cross-coupled transistor configuration, as defined in accordance with the restricted gate level layout architecture, are not required to be the same size. In different embodiments, the four transistors of the cross-coupled transistor configuration can either vary in size (transistor width or transistor gate length) or have the same size, depending on the applicable electrical and/or layout requirements.

Additionally, it should be understood that the four transistors of the cross-coupled transistor configuration are not required to be placed in close proximity to each, although they may be closely placed in some embodiments. More specifically, because connections between the transistors of the cross-coupled transistor configuration can be made by routing through as least one higher interconnect level, there is freedom in placement of the four transistors of the cross-coupled transistor configuration relative to each other. Although, it should be understood that a proximity of the four transistors of the cross-coupled transistor configuration may be governed in certain embodiments by electrical and/or layout optimization requirements.

It should be appreciated that the cross-coupled transistor configurations and corresponding layouts implemented using the restricted gate level layout architecture, as described with regard to FIGS. 2-13, and/or variants thereof, can be used to form many different electrical circuits. For example, a portion of a modern semiconductor chip is likely to include a number of multiplexer circuits and/or latch circuits. Such multiplexer and/or latch circuits can be defined using cross-coupled transistor configurations and corresponding layouts based on the restricted gate level layout architecture, as disclosed herein. Example multiplexer embodiments implemented using the restricted gate level layout architecture and corresponding cross-coupled transistor configurations are described with regard to FIGS. 14A-17C. Example latch embodiments implemented using the restricted gate level layout architecture and corresponding cross-coupled transistor configurations are described with regard to FIGS. 18A-22C. It should be understood that the multiplexer and latch embodiments described with regard to FIGS. 14A-22C are provided by way of example and do not represent an exhaustive set of possible multiplexer and latch embodiments.

Example Multiplexer Embodiments

FIG. 14A shows a generalized multiplexer circuit in which all four cross-coupled transistors 401, 405, 403, 407 are directly connected to the common node 495, in accordance with one embodiment of the present invention. As previously discussed, gates of the first PMOS transistor 401 and first NMOS transistor 407 are electrically connected, as shown by electrical connection 491. Also, gates of the second PMOS transistor 403 and second NMOS transistor 405 are electrically connected, as shown by electrical connection 493. Pull up logic 1401 is electrically connected to the first PMOS transistor 401 at a terminal opposite the common node 495. Pull down logic 1403 is electrically connected to the second NMOS transistor 405 at a terminal opposite the common node 495. Also, pull up logic 1405 is electrically connected to the second PMOS transistor 403 at a terminal opposite the common node 495. Pull down logic 1407 is electrically connected to the first NMOS transistor 407 at a terminal opposite the common node 495.

FIG. 14B shows an exemplary implementation of the multiplexer circuit of FIG. 14A with a detailed view of the pull up logic 1401 and 1405, and the pull down logic 1403 and 1407, in accordance with one embodiment of the present invention. The pull up logic 1401 is defined by a PMOS transistor 1401A connected between a power supply (VDD) and a terminal 1411 of the first PMOS transistor 401 opposite the common node 495. The pull down logic 1403 is defined by an NMOS transistor 1403A connected between a ground potential (GND) and a terminal 1413 of the second NMOS transistor 405 opposite the common node 495. Respective gates of the PMOS transistor 1401A and NMOS transistor 1403A are connected together at a node 1415. The pull up logic 1405 is defined by a PMOS transistor 1405A connected between the power supply (VDD) and a terminal 1417 of the second PMOS transistor 403 opposite the common node 495. The pull down logic 1407 is defined by an NMOS transistor 1407A connected between a ground potential (GND) and a terminal 1419 of the first NMOS transistor 407 opposite the common node 495. Respective gates of the PMOS transistor 1405A and NMOS transistor 1407A are connected together at a node 1421. It should be understood that the implementations of pull up logic 1401, 1405 and pull down logic 1403, 1407 as shown in FIG. 14B are exemplary. In other embodiments, logic different than that shown in FIG. 14B can be used to implement the pull up logic 1401, 1405 and the pull down logic 1403, 1407.

FIG. 14C shows a multi-level layout of the multiplexer circuit of FIG. 14B implemented using a restricted gate level layout architecture cross-coupled transistor layout, in accordance with one embodiment of the present invention. The electrical connection 491 between the gate electrode 401A of the first PMOS transistor 401 and the gate electrode 407A of the first NMOS transistor 407 is formed by a multi-level connection that includes a gate contact 1445, a (two-dimensional) metal-1 structure 1447, and a gate contact 1449. The electrical connection 493 between the gate electrode 403A of the second PMOS transistor 403 and the gate electrode 405A of the second NMOS transistor 405 is formed by a multi-level connection that includes a gate contact 1431, a (one-dimensional) metal-1 structure 1433, a via 1435, a (one-dimensional) metal-2 structure 1436, a via 1437, a (one-dimensional) metal-1 structure 1439, and a gate contact 1441. The common node electrical connection 495 is formed by a multi-level connection that includes a diffusion contact 1451, a (one-dimensional) metal-1 structure 1453, a via 1455, a (one-dimensional) metal-2 structure 1457, a via 1459, a (one-dimensional) metal-1 structure 1461, and a diffusion contact 1463. Respective gates of the PMOS transistor 1401A and NMOS transistor 1403A are connected to the node 1415 by a gate contact 1443. Also, respective gates of the PMOS transistor 1405A and NMOS transistor 1407A are connected to the node 1421 by a gate contact 1465.

Figure 15A:
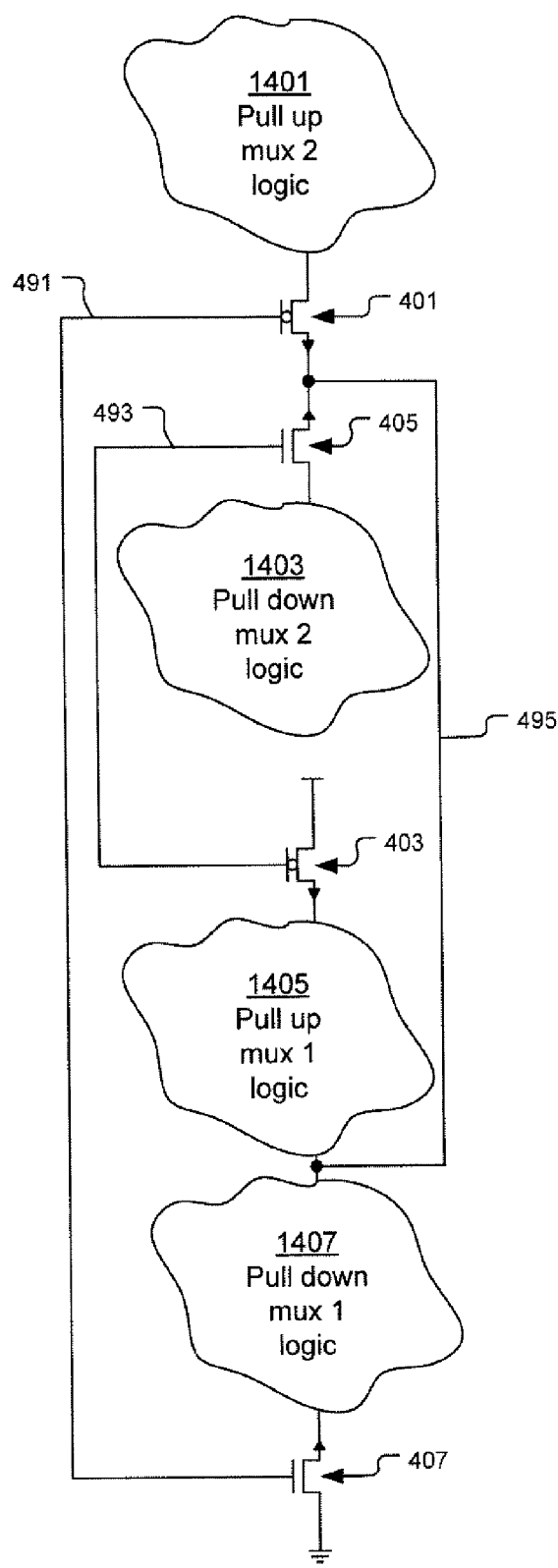
FIG. 15A shows the multiplexer circuit of FIG. 14A in which two cross-coupled transistors remain directly connected to the common node, and in which two cross-coupled transistors are positioned outside the pull up logic and pull down logic, respectively, relative to the common node, in accordance with one embodiment of the present invention.

FIG. 15A shows the multiplexer circuit of FIG. 14A in which the two cross-coupled transistors 401 and 405 remain directly connected to the common node 495, and in which the two cross-coupled transistors 403 and 407 are positioned outside the pull up logic 1405 and pull down logic 1407, respectively, relative to the common node 495, in accordance with one embodiment of the present invention. Pull up logic 1405 is electrically connected between the second PMOS transistor 403 and the common node 495. Pull down logic 1407 is electrically connected between the first NMOS transistor 407 and the common node 495. With the exception of repositioning the PMOS/NMOS transistors 403/407 outside of their pull up/down logic 1405/1407 relative to the common node 495, the circuit of FIG. 15A is the same as the circuit of FIG. 14A.

Figure 15B:
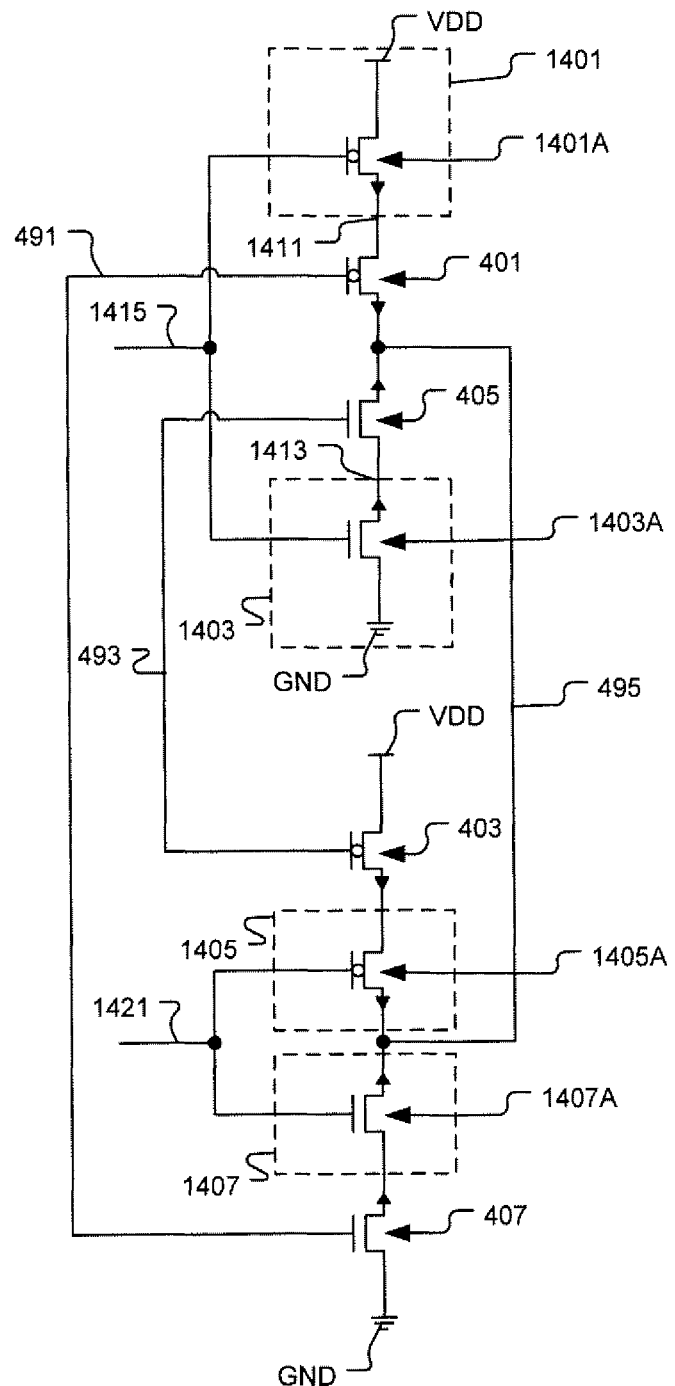
FIG. 15B shows an exemplary implementation of the multiplexer circuit of FIG. 15A with a detailed view of the pull up logic and the pull down logic, in accordance with one embodiment of the present invention.

FIG. 15B shows an exemplary implementation of the multiplexer circuit of FIG. 15A with a detailed view of the pull up logic 1401 and 1405, and the pull down logic 1403 and 1407, in accordance with one embodiment of the present invention. As previously discussed with regard to FIG. 14B, the pull up logic 1401 is defined by the PMOS transistor 1401A connected between VDD and the terminal 1411 of the first PMOS transistor 401 opposite the common node 495. Also, the pull down logic 1403 is defined by NMOS transistor 1403A connected between GND and the terminal 1413 of the second NMOS transistor 405 opposite the common node 495. Respective gates of the PMOS transistor 1401A and NMOS transistor 1403A are connected together at the node 1415. The pull up logic 1405 is defined by the PMOS transistor 1405A connected between the second PMOS transistor 403 and the common node 495. The pull down logic 1407 is defined by the NMOS transistor 1407A connected between the first NMOS transistor 407 and the common node 495. Respective gates of the PMOS transistor 1405A and NMOS transistor 1407A are connected together at the node 1421. It should be understood that the implementations of pull up logic 1401, 1405 and pull down logic 1403, 1407 as shown in FIG. 15B are exemplary. In other embodiments, logic different than that shown in FIG. 15B can be used to implement the pull up logic 1401, 1405 and the pull down logic 1403, 1407.

Figure 15C:
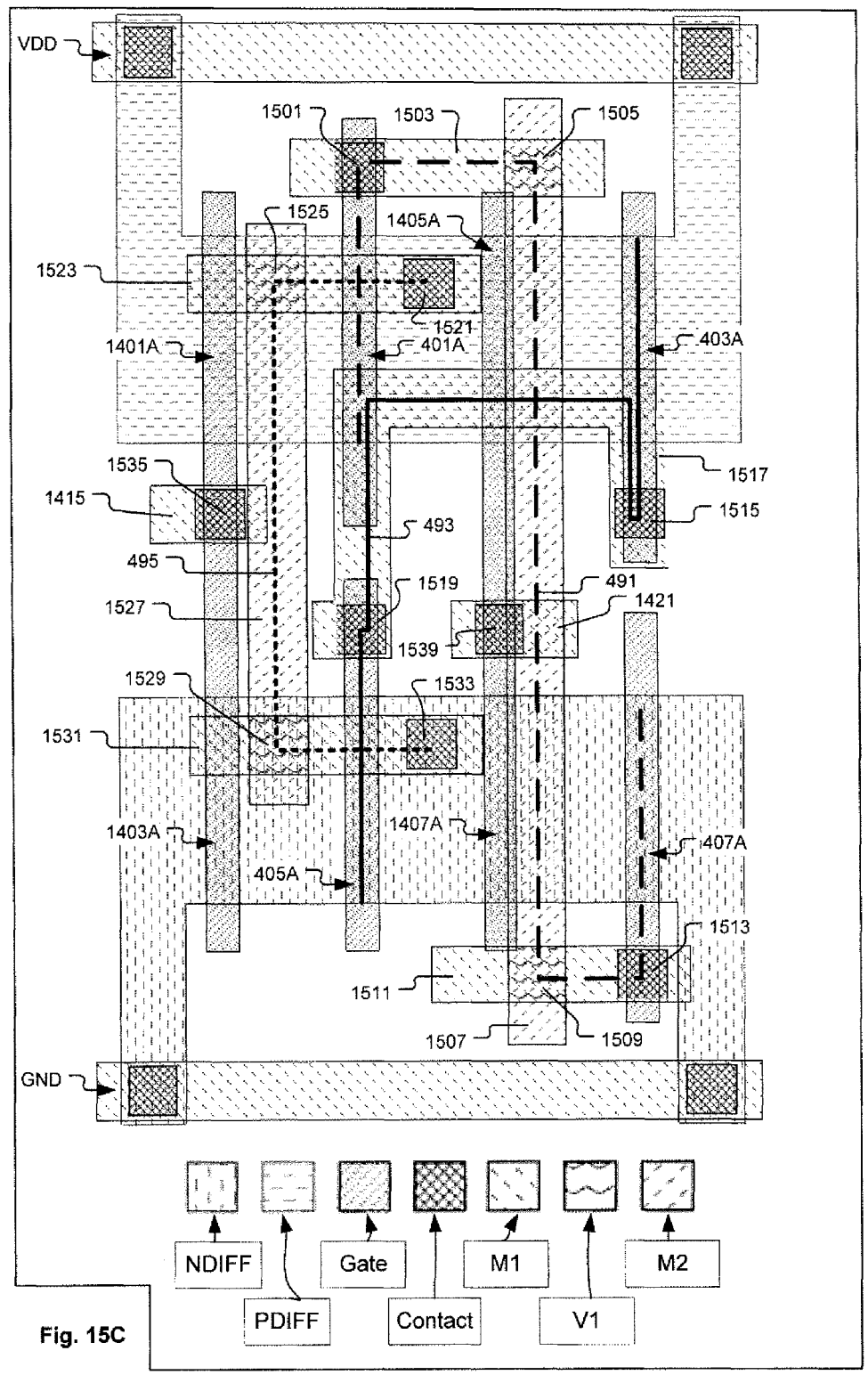
FIG. 15C shows a multi-level layout of the multiplexer circuit of FIG. 15B implemented using a restricted gate level layout architecture cross-coupled transistor layout, in accordance with one embodiment of the present invention.

FIG. 15C shows a multi-level layout of the multiplexer circuit of FIG. 15B implemented using a restricted gate level layout architecture cross-coupled transistor layout, in accordance with one embodiment of the present invention. The electrical connection 491 between the gate electrode 401A of the first PMOS transistor 401 and the gate electrode 407A of the first NMOS transistor 407 is formed by a multi-level connection that includes a gate contact 1501, a (one-dimensional) metal-1 structure 1503, a via 1505, a (one-dimensional) metal-2 structure 1507, a via 1509, a (one-dimensional) metal-1 structure 1511, and a gate contact 1513. The electrical connection 493 between the gate electrode 403A of the second PMOS transistor 403 and the gate electrode 405A of the second NMOS transistor 405 is formed by a multi-level connection that includes a gate contact 1515, a (two-dimensional) metal-1 structure 1517, and a gate contact 1519. The common node electrical connection 495 is formed by a multi-level connection that includes a diffusion contact 1521, a (one-dimensional) metal-1 structure 1523, a via 1525, a (one-dimensional) metal-2 structure 1527, a via 1529, a (one-dimensional) metal-1 structure 1531, and a diffusion contact 1533. Respective gates of the PMOS transistor 1401A and NMOS transistor 1403A are connected to the node 1415 by a gate contact 1535. Also, respective gates of the PMOS transistor 1405A and NMOS transistor 1407A are connected to the node 1421 by a gate contact 1539.

Figure 16A:
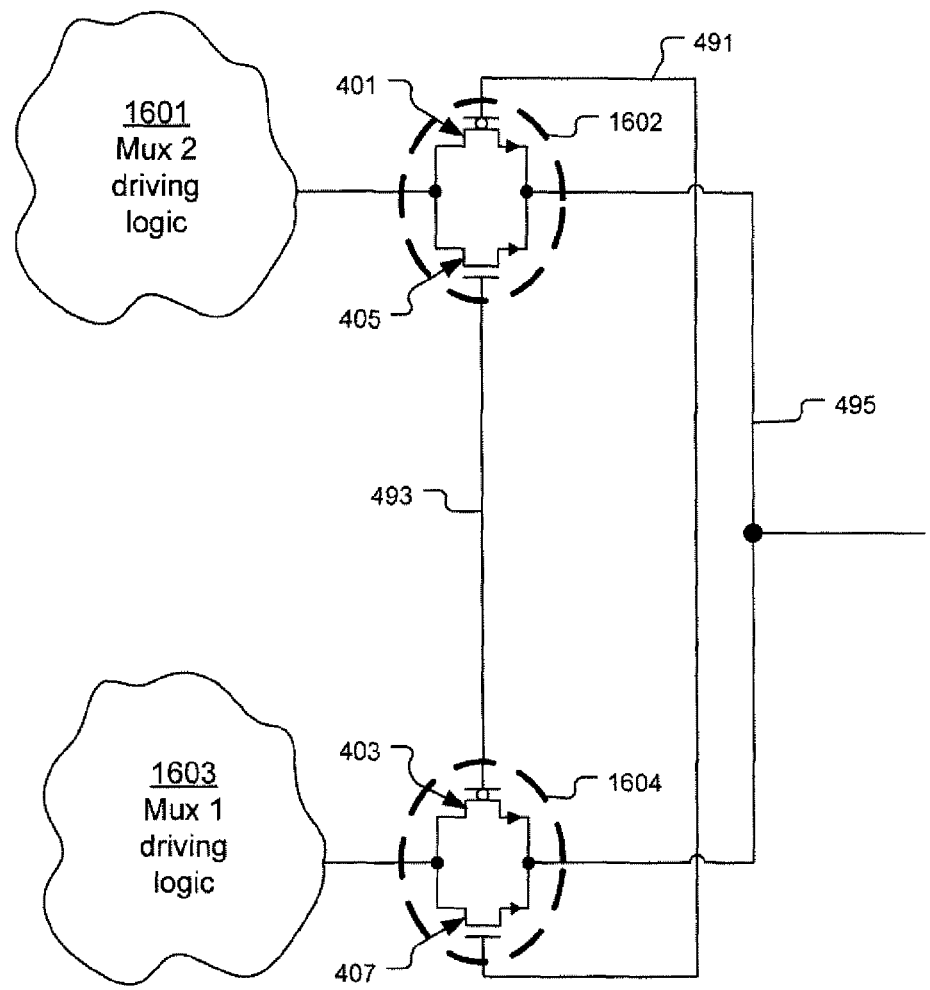
FIG. 16A shows a generalized multiplexer circuit in which the cross-coupled transistors are connected to form two transmission gates to the common node, in accordance with one embodiment of the present invention.

FIG. 16A shows a generalized multiplexer circuit in which the cross-coupled transistors (401, 403, 405, 407) are connected to form two transmission gates 1602, 1604 to the common node 495, in accordance with one embodiment of the present invention. As previously discussed, gates of the first PMOS transistor 401 and first NMOS transistor 407 are electrically connected, as shown by electrical connection 491. Also, gates of the second PMOS transistor 403 and second NMOS transistor 405 are electrically connected, as shown by electrical connection 493. The first PMOS transistor 401 and second NMOS transistor 405 are connected to form a first transmission gate 1602 to the common node 495. The second PMOS transistor 403 and first NMOS transistor 407 are connected to form a second transmission gate 1604 to the common node 495. Driving logic 1601 is electrically connected to both the first PMOS transistor 401 and second NMOS transistor 405 at a terminal opposite the common node 495. Driving logic 1603 is electrically connected to both the second PMOS transistor 403 and first NMOS transistor 407 at a terminal opposite the common node 495.

Figure 16B:
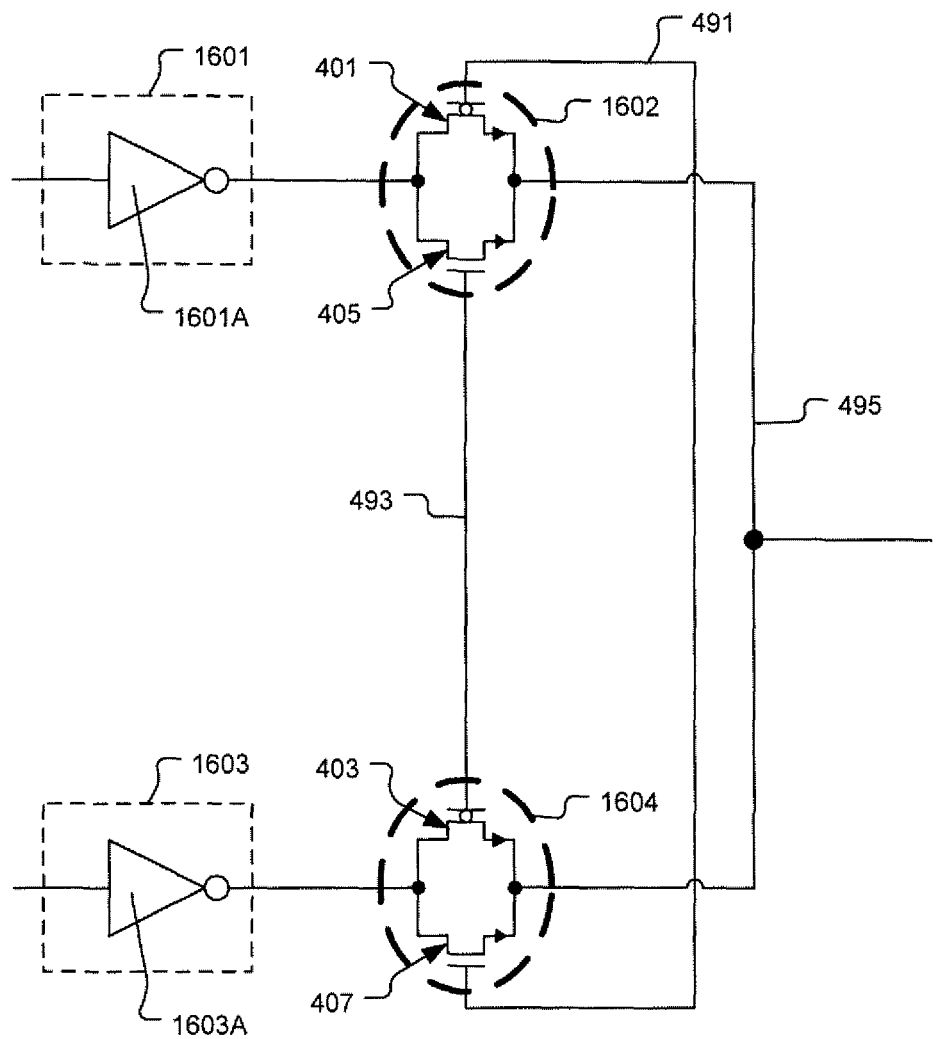
FIG. 16B shows an exemplary implementation of the multiplexer circuit of FIG. 16A with a detailed view of the driving logic, in accordance with one embodiment of the present invention.

FIG. 16B shows an exemplary implementation of the multiplexer circuit of FIG. 16A with a detailed view of the driving logic 1601 and 1603, in accordance with one embodiment of the present invention. In the embodiment of FIG. 16B, the driving logic 1601 is defined by an inverter 1601A and, the driving logic 1603 is defined by an inverter 1603A. However, it should be understood that in other embodiments, the driving logic 1601 and 1603 can be defined by any logic function, such as a two input NOR gate, a two input NAND gate, AND-OR logic, OR-AND logic, among others, by way of example.

Figure 16C:
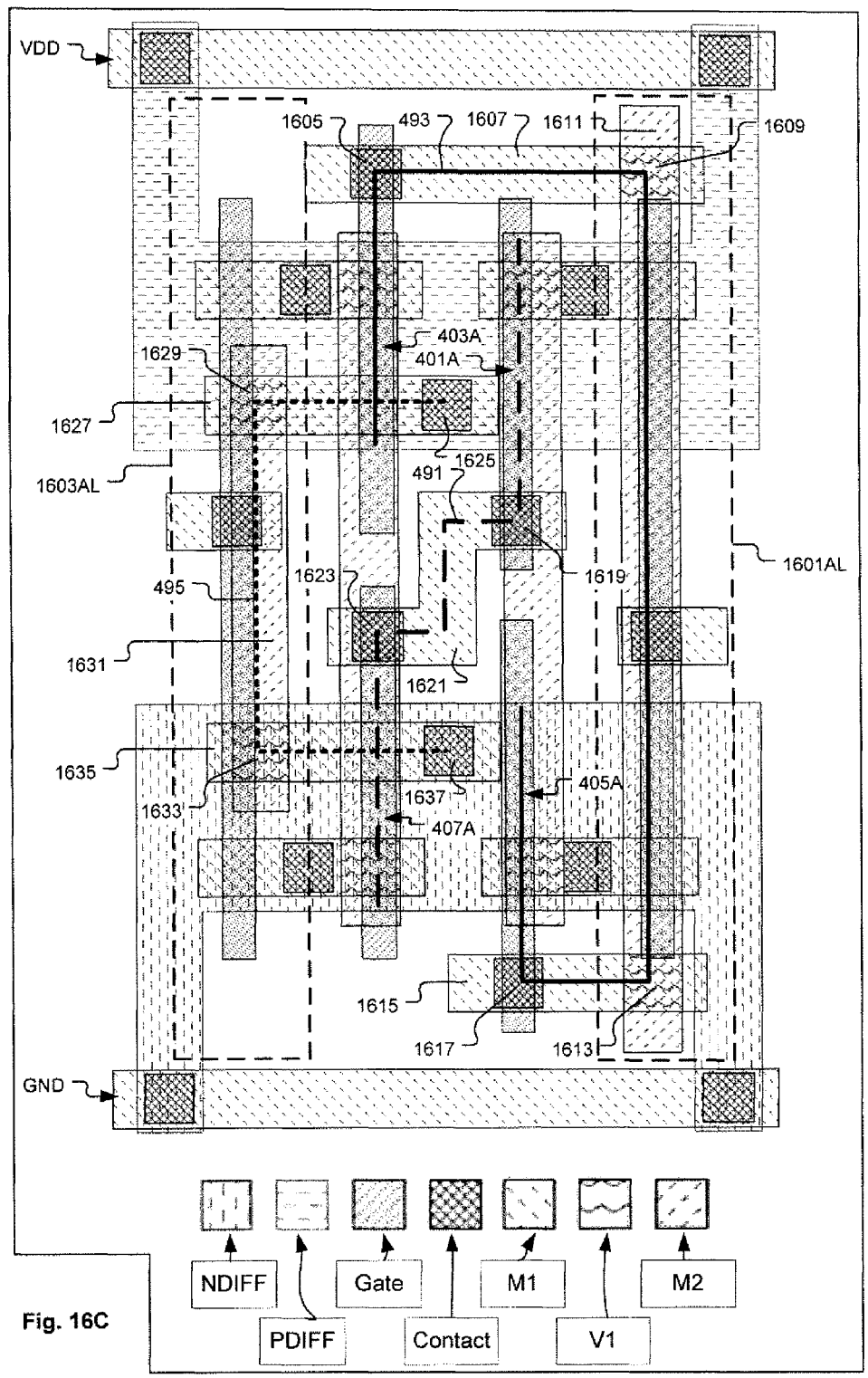
FIG. 16C shows a multi-level layout of the multiplexer circuit of FIG. 16B implemented using a restricted gate level layout architecture cross-coupled transistor layout, in accordance with one embodiment of the present invention.

FIG. 16C shows a multi-level layout of the multiplexer circuit of FIG. 16B implemented using a restricted gate level layout architecture cross-coupled transistor layout, in accordance with one embodiment of the present invention. The electrical connection 491 between the gate electrode 401A of the first PMOS transistor 401 and the gate electrode 407A of the first NMOS transistor 407 is formed by a multi-level connection that includes a gate contact 1619, a (two-dimensional) metal-1 structure 1621, and a gate contact 1623. The electrical connection 493 between the gate electrode 403A of the second PMOS transistor 403 and the gate electrode 405A of the second NMOS transistor 405 is formed by a multi-level connection that includes a gate contact 1605, a (one-dimensional) metal-1 structure 1607, a via 1609, a (one-dimensional) metal-2 structure 1611, a via 1613, a (one-dimensional) metal-1 structure 1615, and a gate contact 1617. The common node electrical connection 495 is formed by a multi-level connection that includes a diffusion contact 1625, a (one-dimensional) metal-1 structure 1627, a via 1629, a (one-dimensional) metal-2 structure 1631, a via 1633, a (one-dimensional) metal-1 structure 1635, and a diffusion contact 1637. Transistors which form the inverter 1601A are shown within the region bounded by the dashed line 1601AL. Transistors which form the inverter 1603A are shown within the region bounded by the dashed line 1603AL.

Figure 17A:
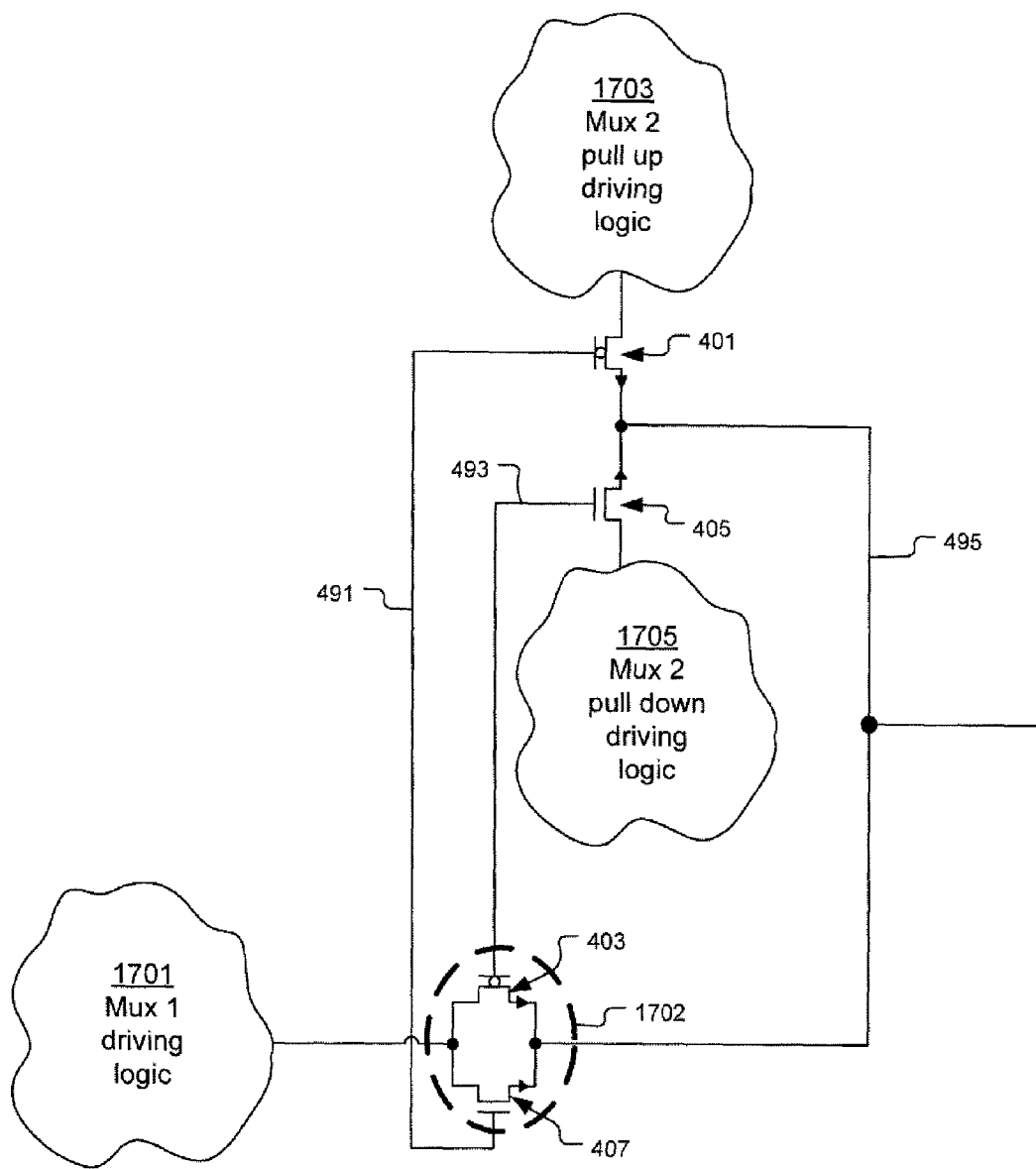
FIG. 17A shows a generalized multiplexer circuit in which two transistors of the four cross-coupled transistors are connected to form a transmission gate to the common node, in accordance with one embodiment of the present invention.

FIG. 17A shows a generalized multiplexer circuit in which two transistors (403, 407) of the four cross-coupled transistors are connected to form a transmission gate 1702 to the common node 495, in accordance with one embodiment of the present invention. As previously discussed, gates of the first PMOS transistor 401 and first NMOS transistor 407 are electrically connected, as shown by electrical connection 491. Also, gates of the second PMOS transistor 403 and second NMOS transistor 405 are electrically connected, as shown by electrical connection 493. The second PMOS transistor 403 and first NMOS transistor 407 are connected to form the transmission gate 1702 to the common node 495. Driving logic 1701 is electrically connected to both the second PMOS transistor 403 and first NMOS transistor 407 at a terminal opposite the common node 495. Pull up driving logic 1703 is electrically connected to the first PMOS transistor 401 at a terminal opposite the common node 495. Also, pull down driving logic 1705 is electrically connected to the second NMOS transistor 405 at a terminal opposite the common node 495.

Figure 17B:
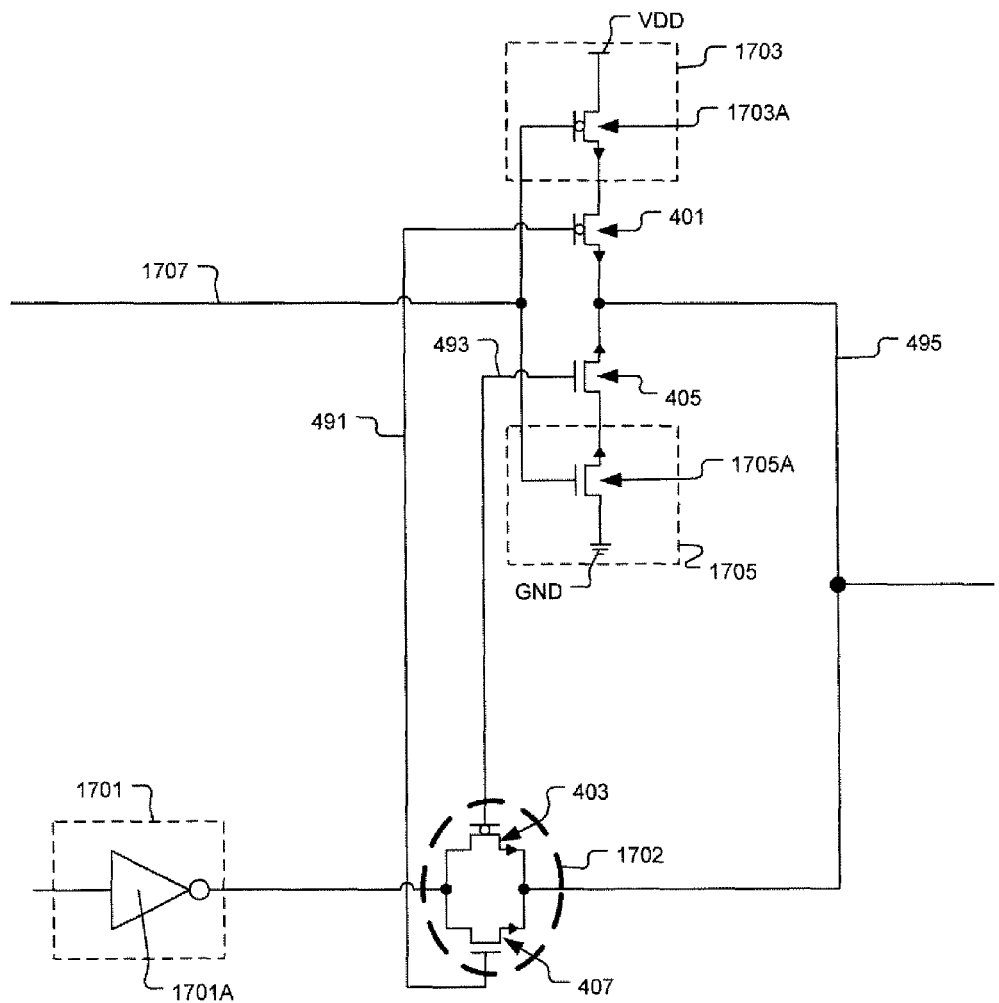
FIG. 17B shows an exemplary implementation of the multiplexer circuit of FIG. 17A with a detailed view of the driving logic, in accordance with one embodiment of the present invention.

FIG. 17B shows an exemplary implementation of the multiplexer circuit of FIG. 17A with a detailed view of the driving logic 1701, 1703, and 1705, in accordance with one embodiment of the present invention. The driving logic 1701 is defined by an inverter 1701A. The pull up driving logic 1703 is defined by a PMOS transistor 1703A connected between VDD and the first PMOS transistor 401. The pull down driving logic 1705 is defined by an NMOS transistor 1705A connected between GND and the second NMOS transistor 405. Respective gates of the PMOS transistor 1703A and NMOS transistor 1705A are connected together at the node 1707. It should be understood that the implementations of driving logic 1701, 1703, and 1705, as shown in FIG. 17B are exemplary. In other embodiments, logic different than that shown in FIG. 17B can be used to implement the driving logic 1701, 1703, and 1705.

Figure 17C:
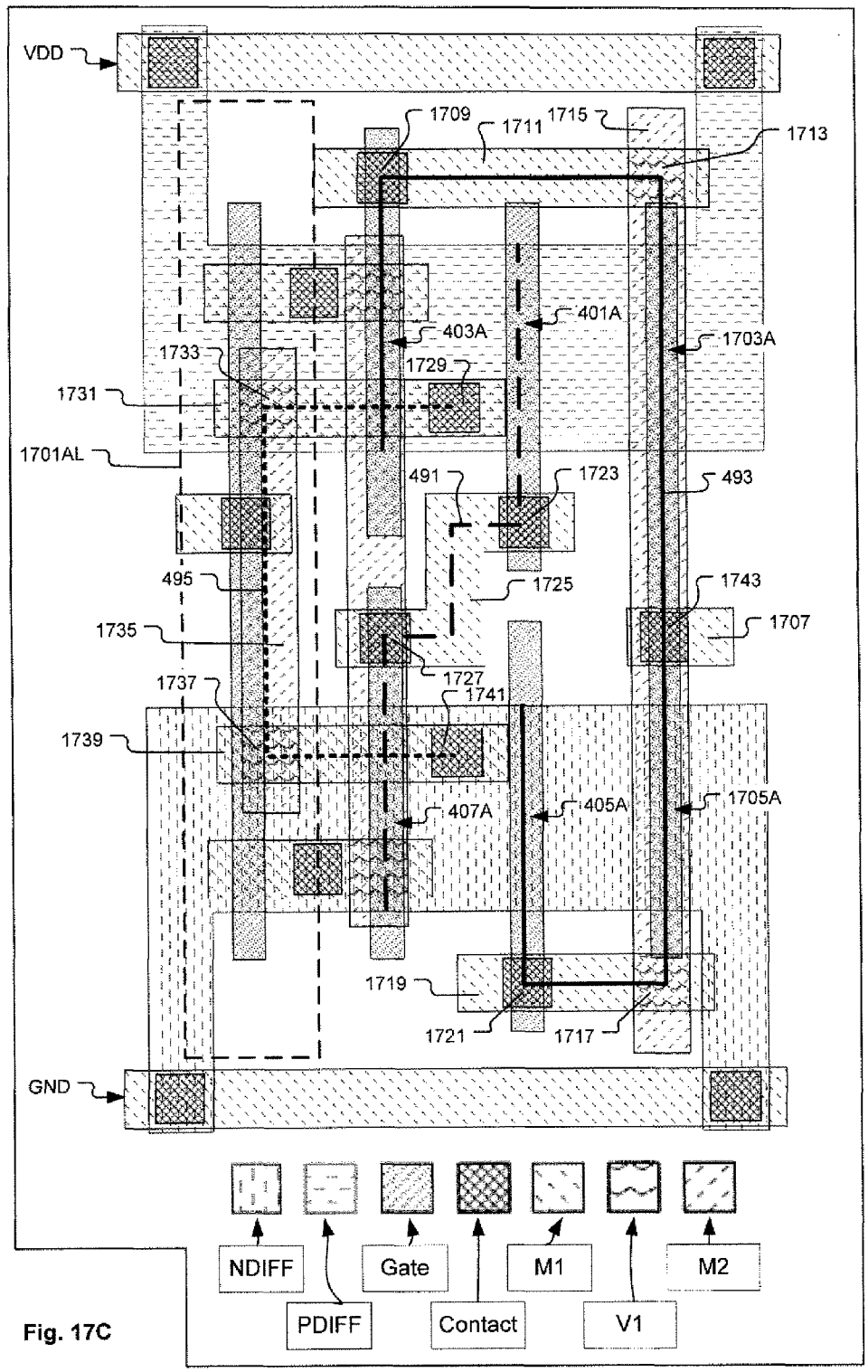
FIG. 17C shows a multi-level layout of the multiplexer circuit of FIG. 17B implemented using a restricted gate level layout architecture cross-coupled transistor layout, in accordance with one embodiment of the present invention.

FIG. 17C shows a multi-level layout of the multiplexer circuit of FIG. 17B implemented using a restricted gate level layout architecture cross-coupled transistor layout, in accordance with one embodiment of the present invention. The electrical connection 491 between the gate electrode 401A of the first PMOS transistor 401 and the gate electrode 407A of the first NMOS transistor 407 is formed by a multi-level connection that includes a gate contact 1723, a (two-dimensional) metal-1 structure 1725, and a gate contact 1727. The electrical connection 493 between the gate electrode 403A of the second PMOS transistor 403 and the gate electrode 405A of the second NMOS transistor 405 is formed by a multi-level connection that includes a gate contact 1709, a (one-dimensional) metal-1 structure 1711, a via 1713, a (one-dimensional) metal-2 structure 1715, a via 1717, a (one-dimensional) metal-1 structure 1719, and a gate contact 1721. The common node electrical connection 495 is formed by a multi-level connection that includes a diffusion contact 1729, a (one-dimensional) metal-1 structure 1731, a via 1733, a (one-dimensional) metal-2 structure 1735, a via 1737, a (one-dimensional) metal-1 structure 1739, and a diffusion contact 1741. Transistors which form the inverter 1701A are shown within the region bounded by the dashed line 1701AL. Respective gates of the PMOS transistor 1703A and NMOS transistor 1705A are connected to the node 1707 by a gate contact 1743.

Example Latch Embodiments

Figure 18A:
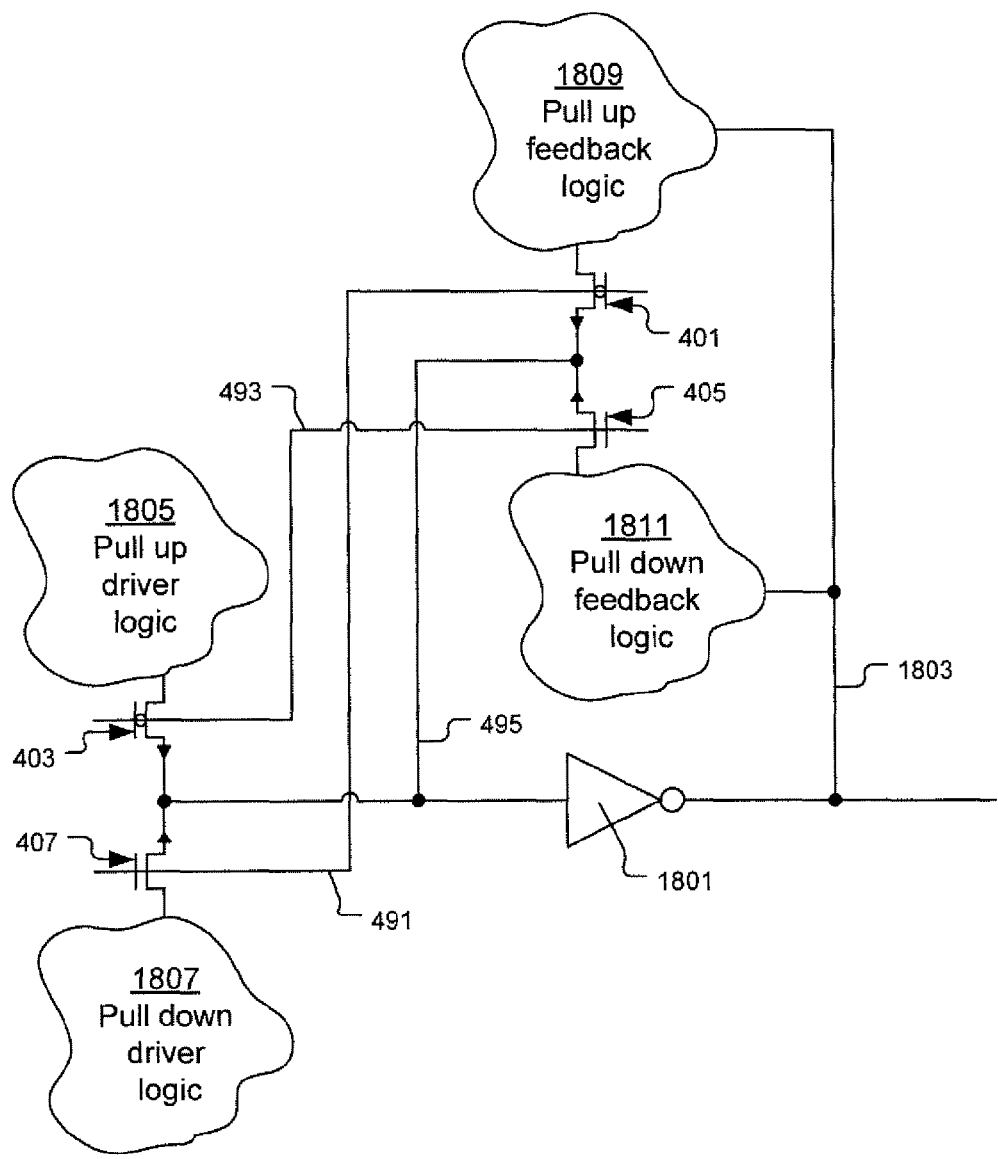
FIG. 18A shows a generalized latch circuit implemented using the cross-coupled transistor configuration, in accordance with one embodiment of the present invention.

FIG. 18A shows a generalized latch circuit implemented using the cross-coupled transistor configuration, in accordance with one embodiment of the present invention. The gates of the first PMOS transistor 401 and first NMOS transistor 407 are electrically connected, as shown by electrical connection 491. The gates of the second PMOS transistor 403 and second NMOS transistor 405 are electrically connected, as shown by electrical connection 493. Each of the four cross-coupled transistors are electrically connected to the common node 495. It should be understood that the common node 495 serves as a storage node in the latch circuit. Pull up driver logic 1805 is electrically connected to the second PMOS transistor 403 at a terminal opposite the common node 495. Pull down driver logic 1807 is electrically connected to the first NMOS transistor 407 at a terminal opposite the common node 495. Pull up feedback logic 1809 is electrically connected to the first PMOS transistor 401 at a terminal opposite the common node 495. Pull down feedback logic 1811 is electrically connected to the second NMOS transistor 405 at a terminal opposite the common node 495. Additionally, the common node 495 is connected to an input of an inverter 1801. An output of the inverter 1801 is electrically connected to a feedback node 1803. It should be understood that in other embodiments the inverter 1801 can be replaced by any logic function, such as a two input NOR gate, a two input NAND gate, among others, or any complex logic function.

Figure 18B:
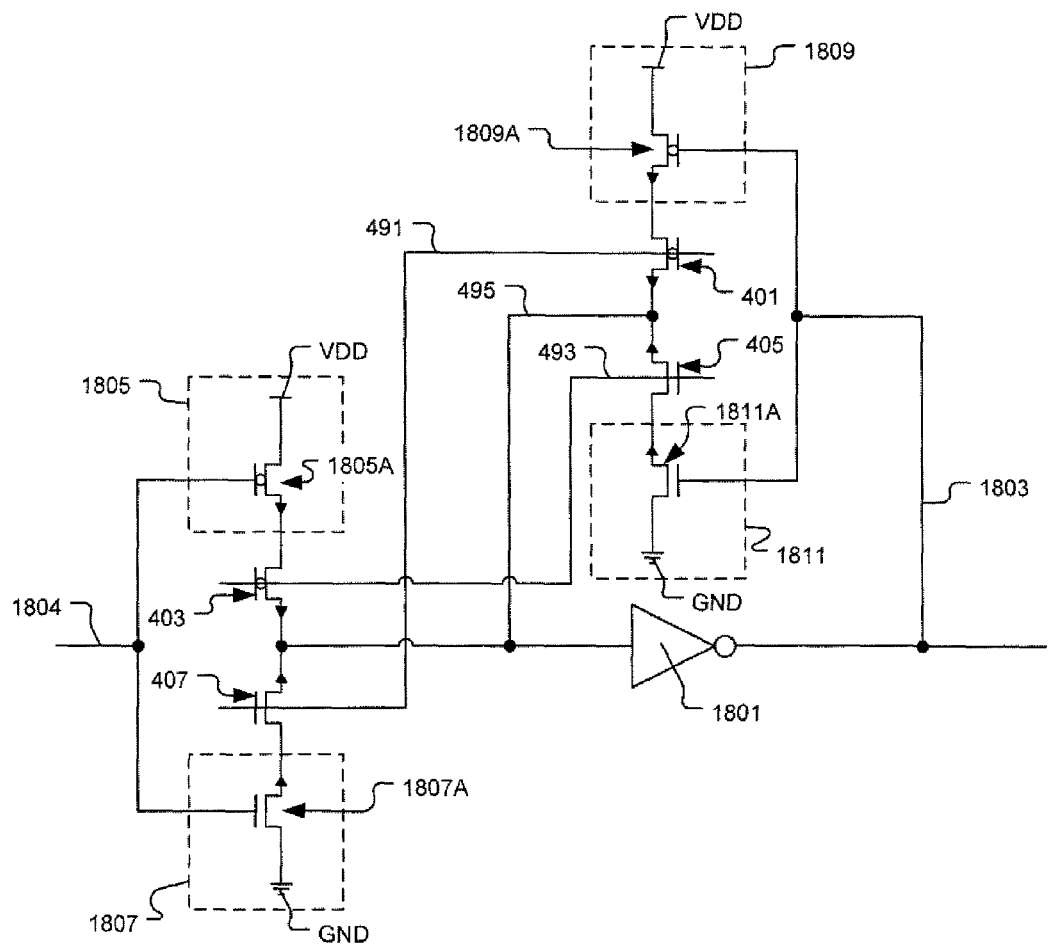
FIG. 18B shows an exemplary implementation of the latch circuit of FIG. 18A with a detailed view of the pull up driver logic, the pull down driver logic, the pull up feedback logic, and the pull down feedback logic, in accordance with one embodiment of the present invention.

FIG. 18B shows an exemplary implementation of the latch circuit of FIG. 18A with a detailed view of the pull up driver logic 1805, the pull down driver logic 1807, the pull up feedback logic 1809, and the pull down feedback logic 1811, in accordance with one embodiment of the present invention. The pull up driver logic 1805 is defined by a PMOS transistor 1805A connected between VDD and the second PMOS transistor 403 opposite the common node 495. The pull down driver logic 1807 is defined by an NMOS transistor 1807A connected between GND and the first NMOS transistor 407 opposite the common node 495. Respective gates of the PMOS transistor 1805A and NMOS transistor 1807A are connected together at a node 1804. The pull up feedback logic 1809 is defined by a PMOS transistor 1809A connected between VDD and the first PMOS transistor 401 opposite the common node 495. The pull down feedback logic 1811 is defined by an NMOS transistor 1811A connected between GND and the second NMOS transistor 405 opposite the common node 495. Respective gates of the PMOS transistor 1809A and NMOS transistor 1811A are connected together at the feedback node 1803. It should be understood that the implementations of pull up driver logic 1805, pull down driver logic 1807, pull up feedback logic 1809, and pull down feedback logic 1811 as shown in FIG. 18B are exemplary. In other embodiments, logic different than that shown in FIG. 18B can be used to implement the pull up driver logic 1805, the pull down driver logic 1807, the pull up feedback logic 1809, and the pull down feedback logic 1811.

Figure 18C:
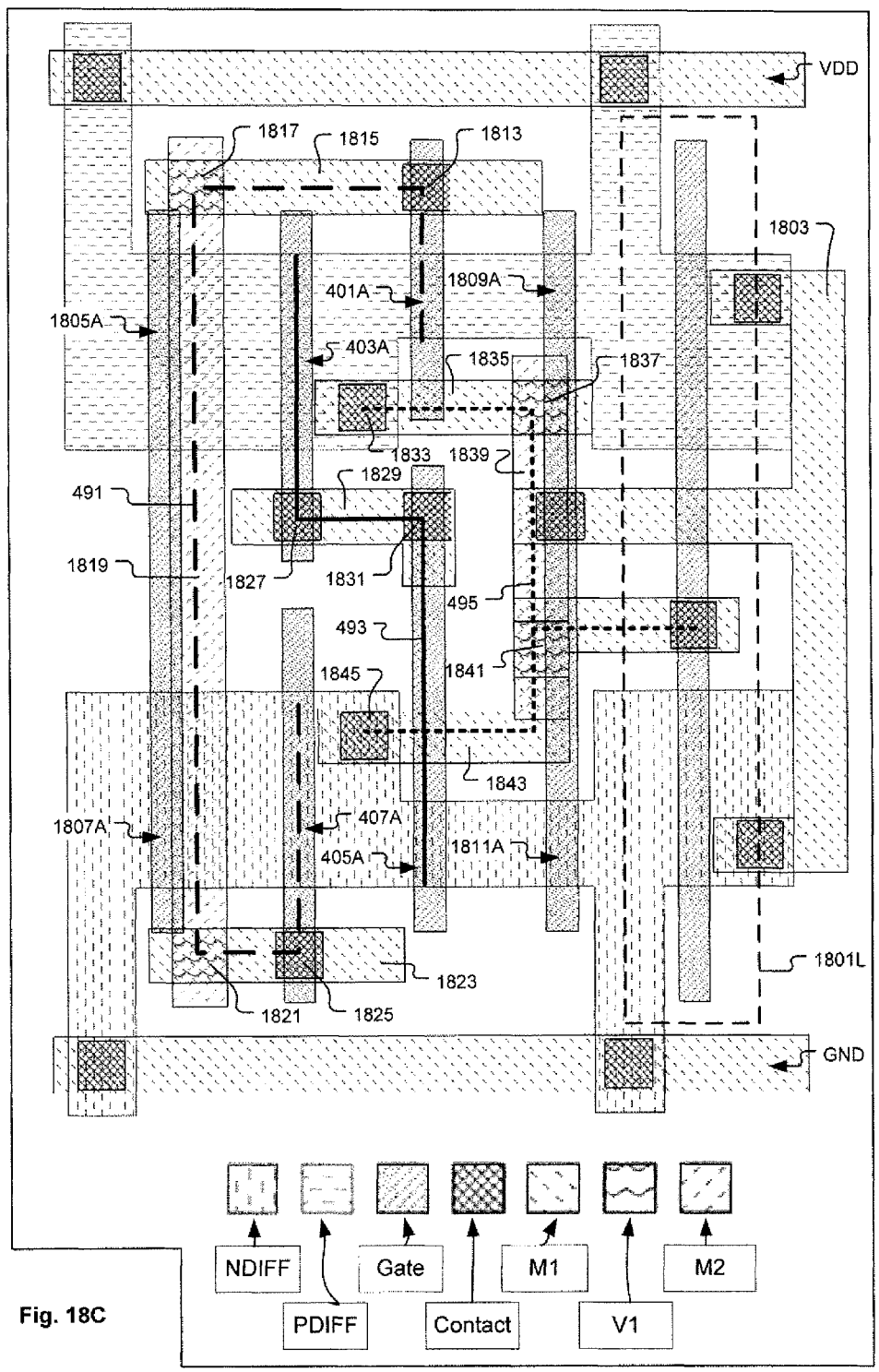
FIG. 18C shows a multi-level layout of the latch circuit of FIG. 18B implemented using a restricted gate level layout architecture cross-coupled transistor layout, in accordance with one embodiment of the present invention.

FIG. 18C shows a multi-level layout of the latch circuit of FIG. 18B implemented using a restricted gate level layout architecture cross-coupled transistor layout, in accordance with one embodiment of the present invention. The electrical connection 491 between the gate electrode 401A of the first PMOS transistor 401 and the gate electrode 407A of the first NMOS transistor 407 is formed by a multi-level connection that includes a gate contact 1813, a (one-dimensional) metal-1 structure 1815, a via 1817, a (one-dimensional) metal-2 structure 1819, a via 1821, a (one-dimensional) metal-1 structure 1823, and a gate contact 1825. The electrical connection 493 between the gate electrode 403A of the second PMOS transistor 403 and the gate electrode 405A of the second NMOS transistor 405 is formed by a multi-level connection that includes a gate contact 1827, a (two-dimensional) metal-1 structure 1829, and a gate contact 1831. The common node electrical connection 495 is formed by a multi-level connection that includes a diffusion contact 1833, a (one-dimensional) metal-1 structure 1835, a via 1837, a (one-dimensional) metal-2 structure 1839, a via 1841, a (two-dimensional) metal-1 structure 1843, and a diffusion contact 1845. Transistors which form the inverter 1801 are shown within the region bounded by the dashed line 1801L.

Figure 19A:
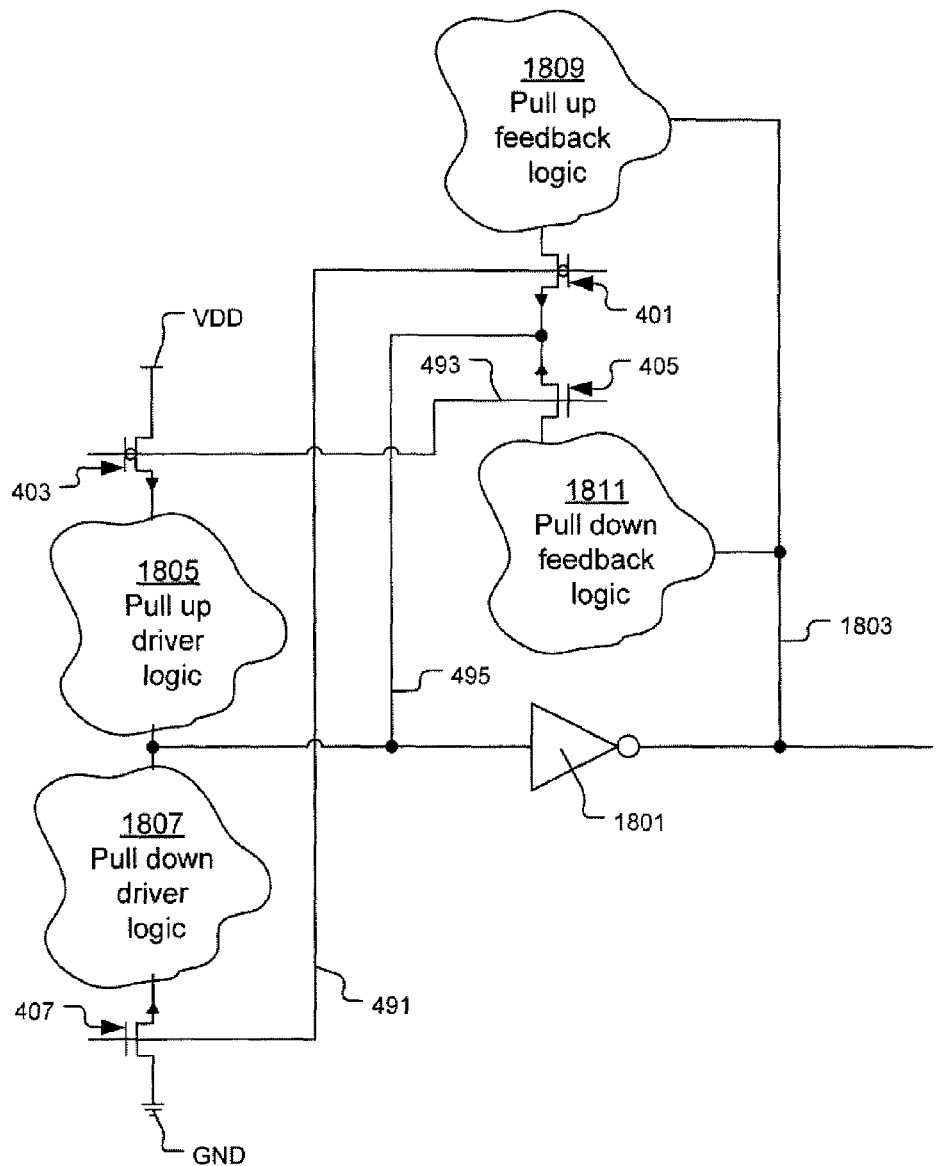
FIG. 19A shows the latch circuit of FIG. 18A in which two cross-coupled transistors remain directly connected to the common node, and in which two cross-coupled transistors are positioned outside the pull up driver logic and pull down driver logic, respectively, relative to the common node, in accordance with one embodiment of the present invention.

FIG. 19A shows the latch circuit of FIG. 18A in which the two cross-coupled transistors 401 and 405 remain directly connected to the output node 495, and in which the two cross-coupled transistors 403 and 407 are positioned outside the pull up driver logic 1805 and pull down driver logic 1807, respectively, relative to the common node 495, in accordance with one embodiment of the present invention. Pull up driver logic 1805 is electrically connected between the second PMOS transistor 403 and the common node 495. Pull down driver logic 1807 is electrically connected between the first NMOS transistor 407 and the common node 495. With the exception of repositioning the PMOS/NMOS transistors 403/407 outside of their pull up/down driver logic 1805/1807 relative to the common node 495, the circuit of FIG. 19A is the same as the circuit of FIG. 18A.

Figure 19B:
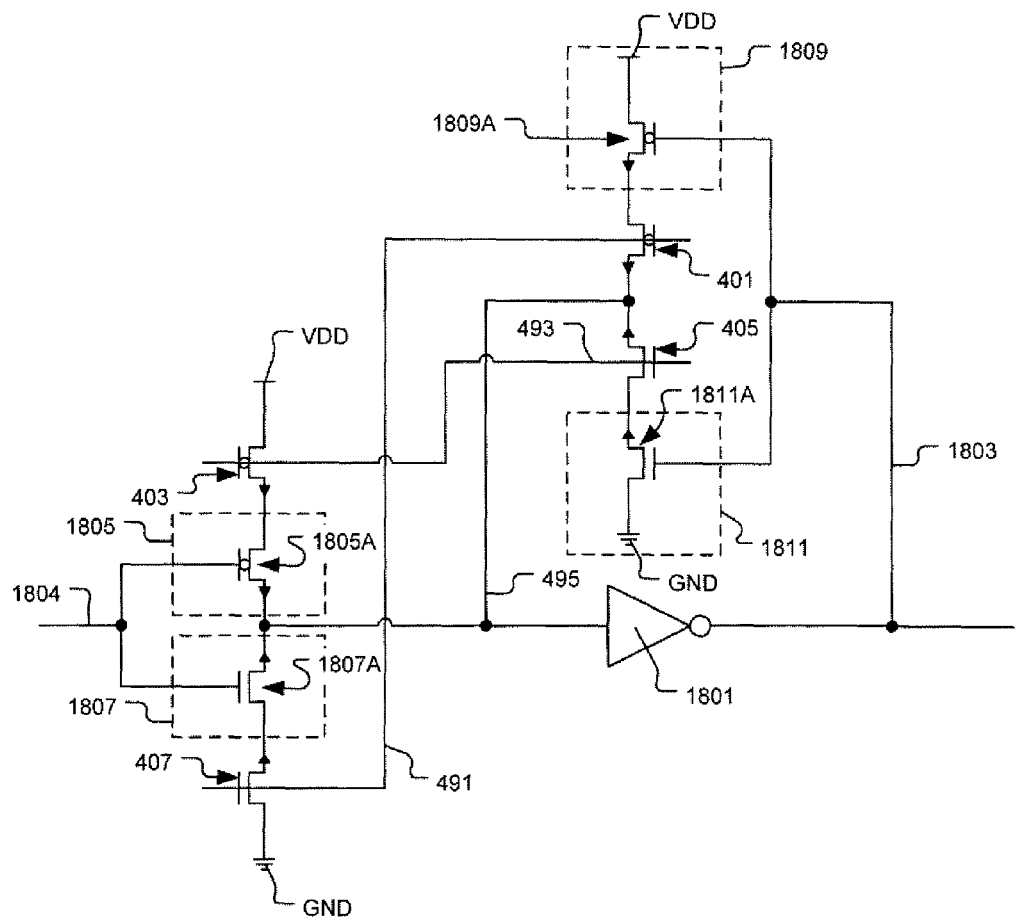
FIG. 19B shows an exemplary implementation of the latch circuit of FIG. 19A with a detailed view of the pull up driver logic, the pull down driver logic, the pull up feedback logic, and the pull down feedback logic, in accordance with one embodiment of the present invention.

FIG. 19B shows an exemplary implementation of the latch circuit of FIG. 19A with a detailed view of the pull up driver logic 1805, pull down driver logic 1807, pull up feedback logic 1809, and pull down feedback logic 1811, in accordance with one embodiment of the present invention. As previously discussed with regard to FIG. 18B, the pull up feedback logic 1809 is defined by the PMOS transistor 1809A connected between VDD and the first PMOS transistor 401 opposite the common node 495. Also, the pull down feedback logic 1811 is defined by NMOS transistor 1811A connected between GND and the second NMOS transistor 405 opposite the common node 495. Respective gates of the PMOS transistor 1809A and NMOS transistor 1811A are connected together at the feedback node 1803. The pull up driver logic 1805 is defined by the PMOS transistor 1805A connected between the second PMOS transistor 403 and the common node 495. The pull down driver logic 1807 is defined by the NMOS transistor 1807A connected between the first NMOS transistor 407 and the common node 495. Respective gates of the PMOS transistor 1805A and NMOS transistor 1807A are connected together at the node 1804. It should be understood that the implementations of pull up driver logic 1805, pull down driver logic 1807, pull up feedback logic 1809, and pull down feedback logic 1811 as shown in FIG. 19B are exemplary. In other embodiments, logic different than that shown in FIG. 19B can be used to implement the pull up driver logic 1805, the pull down driver logic 1807, the pull up feedback logic 1809, and the pull down feedback logic 1811.

Figure 19C:
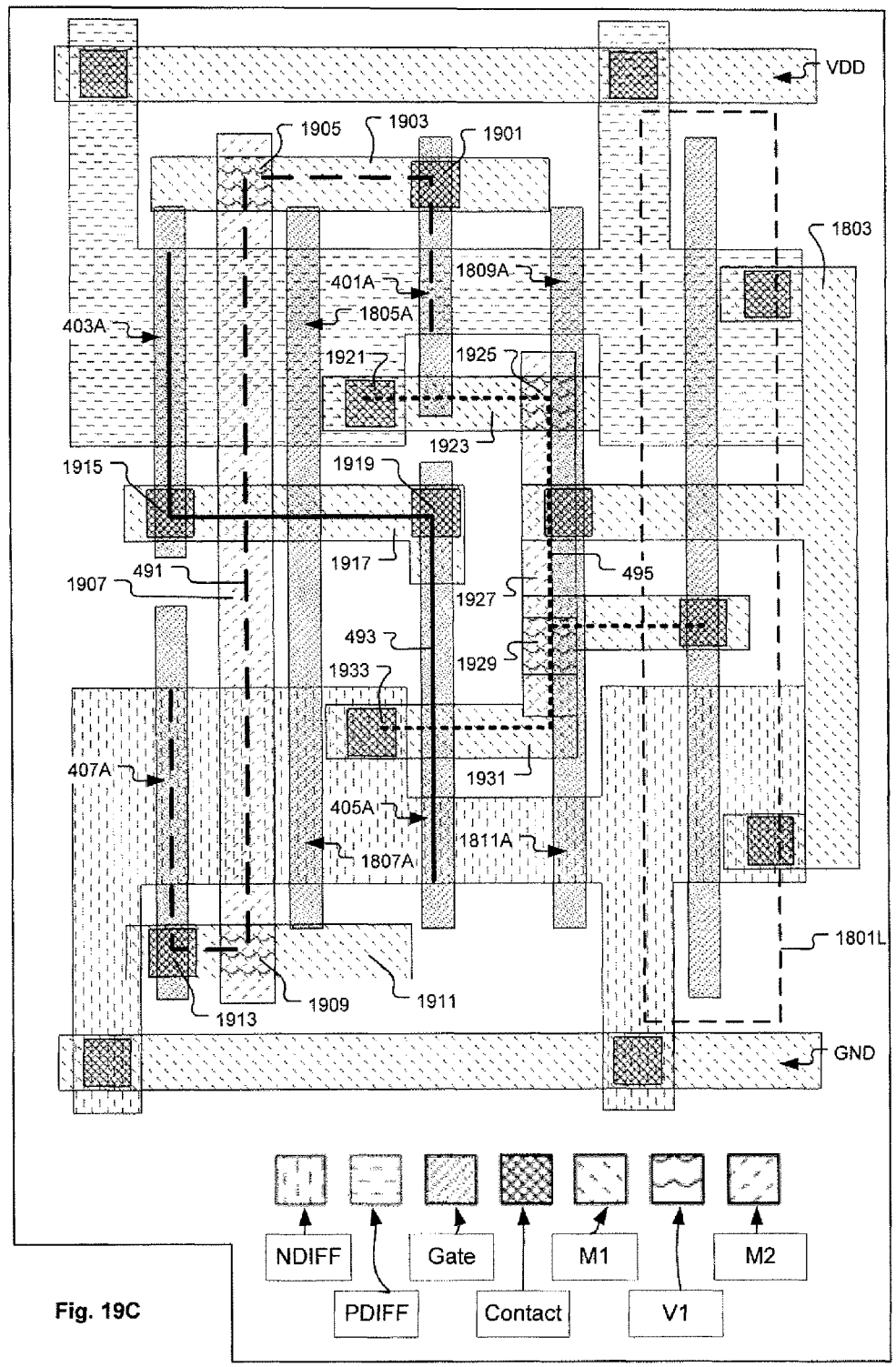
FIG. 19C shows a multi-level layout of the latch circuit of FIG. 19B implemented using a restricted gate level layout architecture cross-coupled transistor layout, in accordance with one embodiment of the present invention.

FIG. 19C shows a multi-level layout of the latch circuit of FIG. 19B implemented using a restricted gate level layout architecture cross-coupled transistor layout, in accordance with one embodiment of the present invention. The electrical connection 491 between the gate electrode 401A of the first PMOS transistor 401 and the gate electrode 407A of the first NMOS transistor 407 is formed by a multi-level connection that includes a gate contact 1901, a (one-dimensional) metal-1 structure 1903, a via 1905, a (one-dimensional) metal-2 structure 1907, a via 1909, a (one-dimensional) metal-1 structure 1911, and a gate contact 1913. The electrical connection 493 between the gate electrode 403A of the second PMOS transistor 403 and the gate electrode 405A of the second NMOS transistor 405 is formed by a multi-level connection that includes a gate contact 1915, a (two-dimensional) metal-1 structure 1917, and a gate contact 1919. The common node electrical connection 495 is formed by a multi-level connection that includes a diffusion contact 1921, a (one-dimensional) metal-1 structure 1923, a via 1925, a (one-dimensional) metal-2 structure 1927, a via 1929, a (two-dimensional) metal-1 structure 1931, and a diffusion contact 1933. Transistors which form the inverter 1801 are shown within the region bounded by the dashed line 1801L.

Figure 20A:
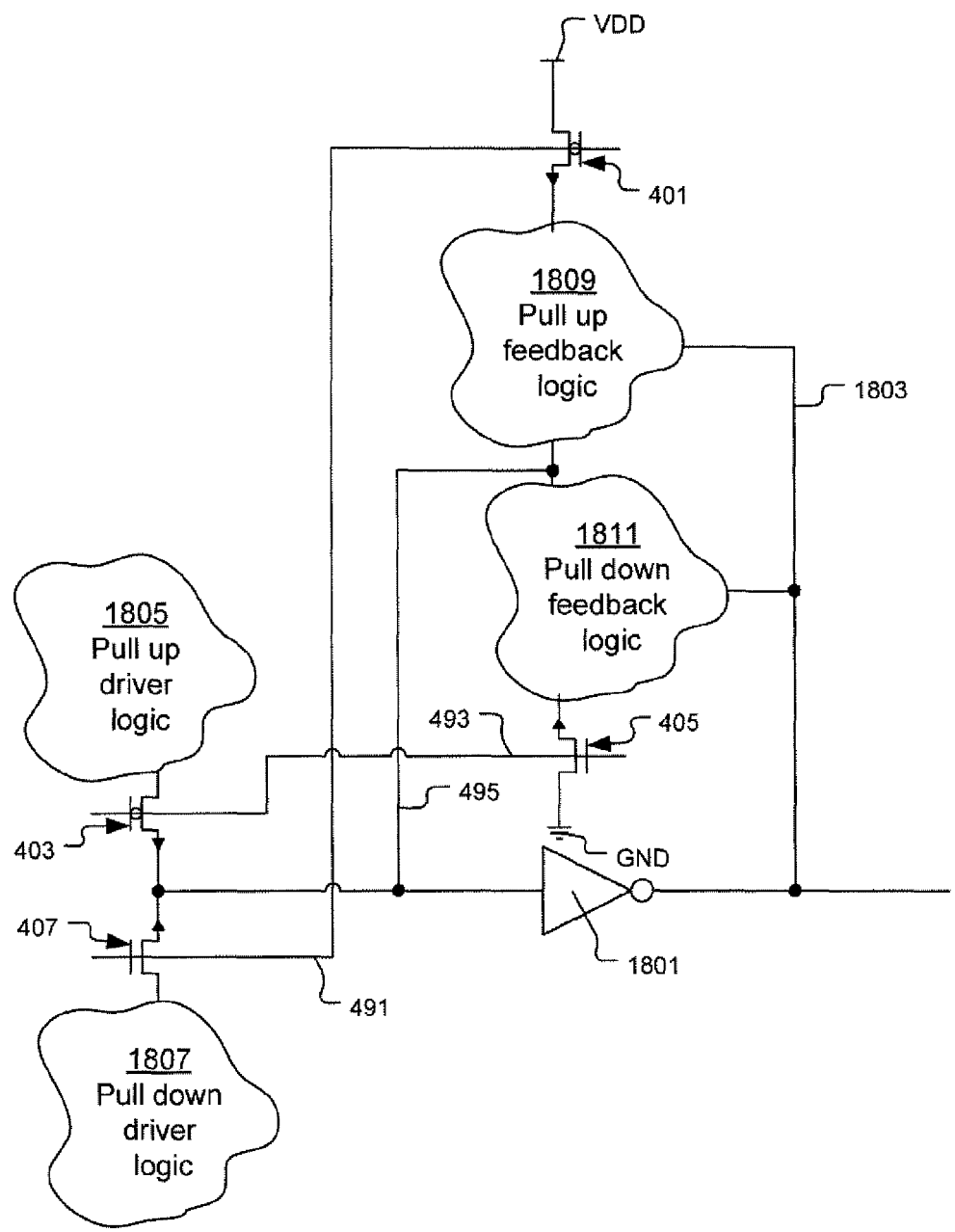
FIG. 20A shows the latch circuit of FIG. 18A in which two cross-coupled transistors remain directly connected to the common node, and in which two cross-coupled transistors are positioned outside the pull up feedback logic and pull down feedback logic, respectively, relative to the common node, in accordance with one embodiment of the present invention.

FIG. 20A shows the latch circuit of FIG. 18A in which the two cross-coupled transistors 403 and 407 remain directly connected to the output node 495, and in which the two cross-coupled transistors 401 and 405 are positioned outside the pull up feedback logic 1809 and pull down feedback logic 1811, respectively, relative to the common node 495, in accordance with one embodiment of the present invention. Pull up feedback logic 1809 is electrically connected between the first PMOS transistor 401 and the common node 495. Pull down feedback logic 1811 is electrically connected between the second NMOS transistor 405 and the common node 495. With the exception of repositioning the PMOS/NMOS transistors 401/405 outside of their pull up/down feedback logic 1809/1811 relative to the common node 495, the circuit of FIG. 20A is the same as the circuit of FIG. 18A.

Figure 20B:
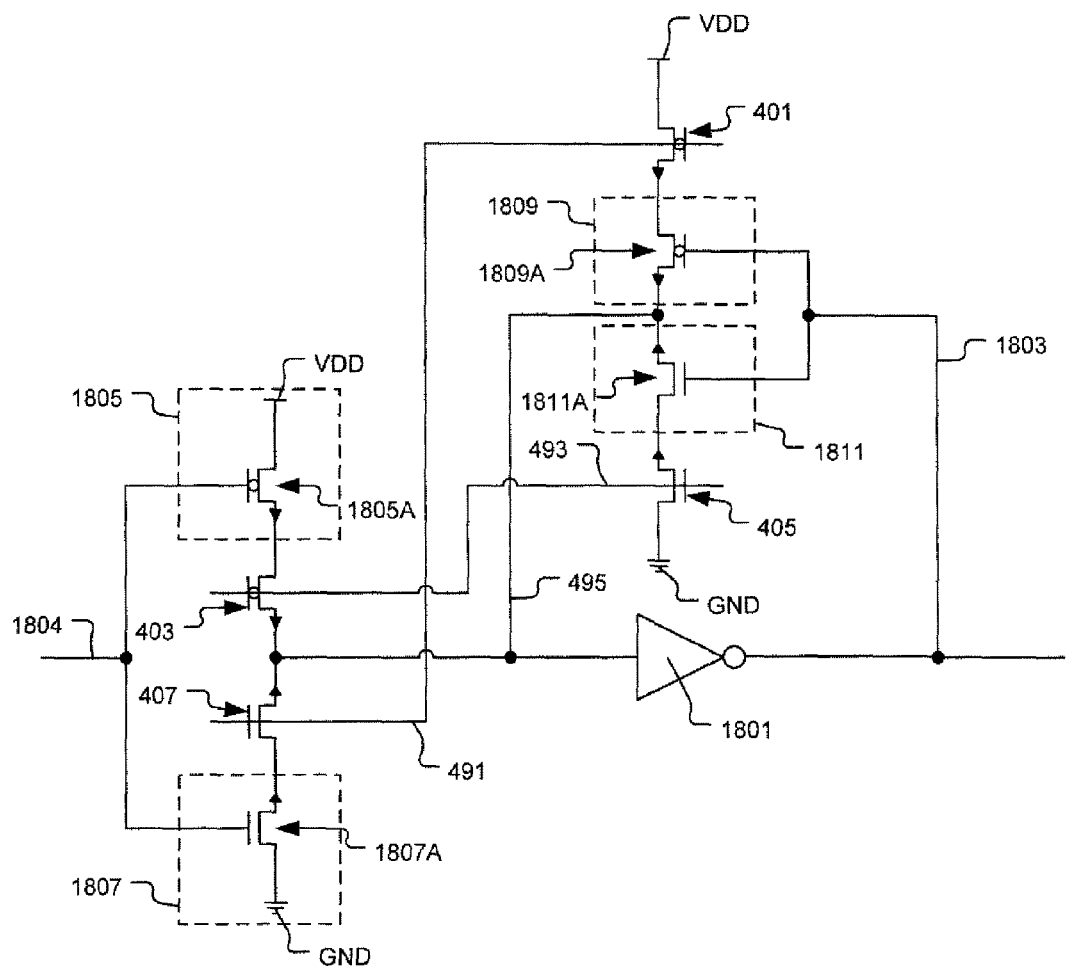
FIG. 20B shows an exemplary implementation of the latch circuit of FIG. 20A with a detailed view of the pull up driver logic, the pull down driver logic, the pull up feedback logic, and the pull down feedback logic, in accordance with one embodiment of the present invention.

FIG. 20B shows an exemplary implementation of the latch circuit of FIG. 20A with a detailed view of the pull up driver logic 1805, pull down driver logic 1807, pull up feedback logic 1809, and pull down feedback logic 1811, in accordance with one embodiment of the present invention. The pull up feedback logic 1809 is defined by the PMOS transistor 1809A connected between the first PMOS transistor 401 and the common node 495. Also, the pull down feedback logic 1811 is defined by NMOS transistor 1811A connected between the second NMOS transistor 405 and the common node 495. Respective gates of the PMOS transistor 1809A and NMOS transistor 1811A are connected together at the feedback node 1803. The pull up driver logic 1805 is defined by the PMOS transistor 1805A connected between VDD and the second PMOS transistor 403. The pull down driver logic 1807 is defined by the NMOS transistor 1807A connected between GND and the first NMOS transistor 407. Respective gates of the PMOS transistor 1805A and NMOS transistor 1807A are connected together at the node 1804. It should be understood that the implementations of pull up driver logic 1805, pull down driver logic 1807, pull up feedback logic 1809, and pull down feedback logic 1811 as shown in FIG. 20B are exemplary. In other embodiments, logic different than that shown in FIG. 20B can be used to implement the pull up driver logic 1805, the pull down driver logic 1807, the pull up feedback logic 1809, and the pull down feedback logic 1811.

Figure 20C:
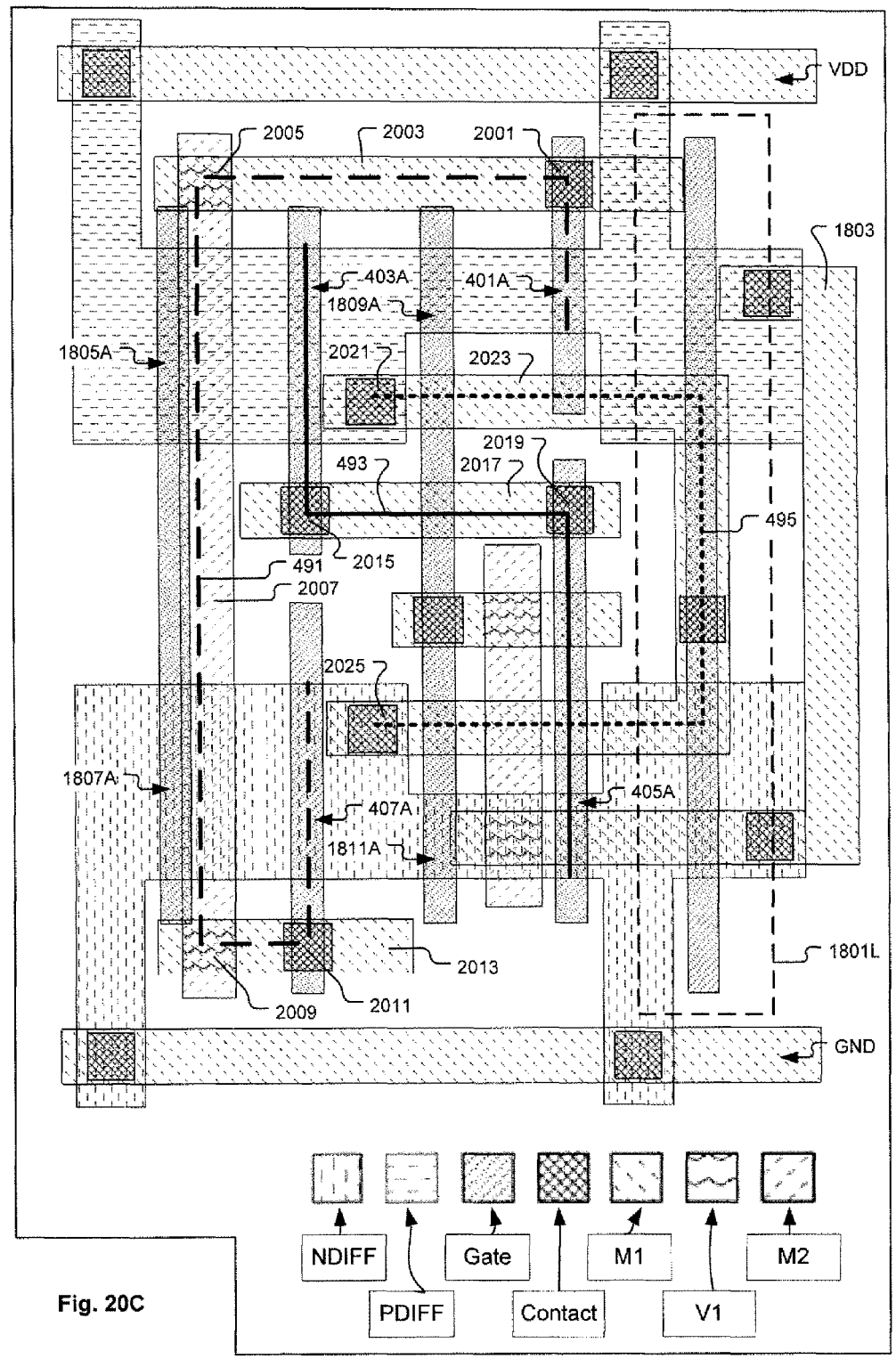
FIG. 20C shows a multi-level layout of the latch circuit of FIG. 20B implemented using a restricted gate level layout architecture cross-coupled transistor layout, in accordance with one embodiment of the present invention.

FIG. 20C shows a multi-level layout of the latch circuit of FIG. 20B implemented using a restricted gate level layout architecture cross-coupled transistor layout, in accordance with one embodiment of the present invention. The electrical connection 491 between the gate electrode 401A of the first PMOS transistor 401 and the gate electrode 407A of the first NMOS transistor 407 is formed by a multi-level connection that includes a gate contact 2001, a (one-dimensional) metal-1 structure 2003, a via 2005, a (one-dimensional) metal-2 structure 2007, a via 2009, a (one-dimensional) metal-1 structure 2011, and a gate contact 2013. The electrical connection 493 between the gate electrode 403A of the second PMOS transistor 403 and the gate electrode 405A of the second NMOS transistor 405 is formed by a multi-level connection that includes a gate contact 2015, a (one-dimensional) metal-1 structure 2017, and a gate contact 2019. The common node electrical connection 495 is formed by a multi-level connection that includes a diffusion contact 2021, a (two-dimensional) metal-1 structure 2023, and a diffusion contact 2025. Transistors which form the inverter 1801 are shown within the region bounded by the dashed line 1801L.

Figure 21A:
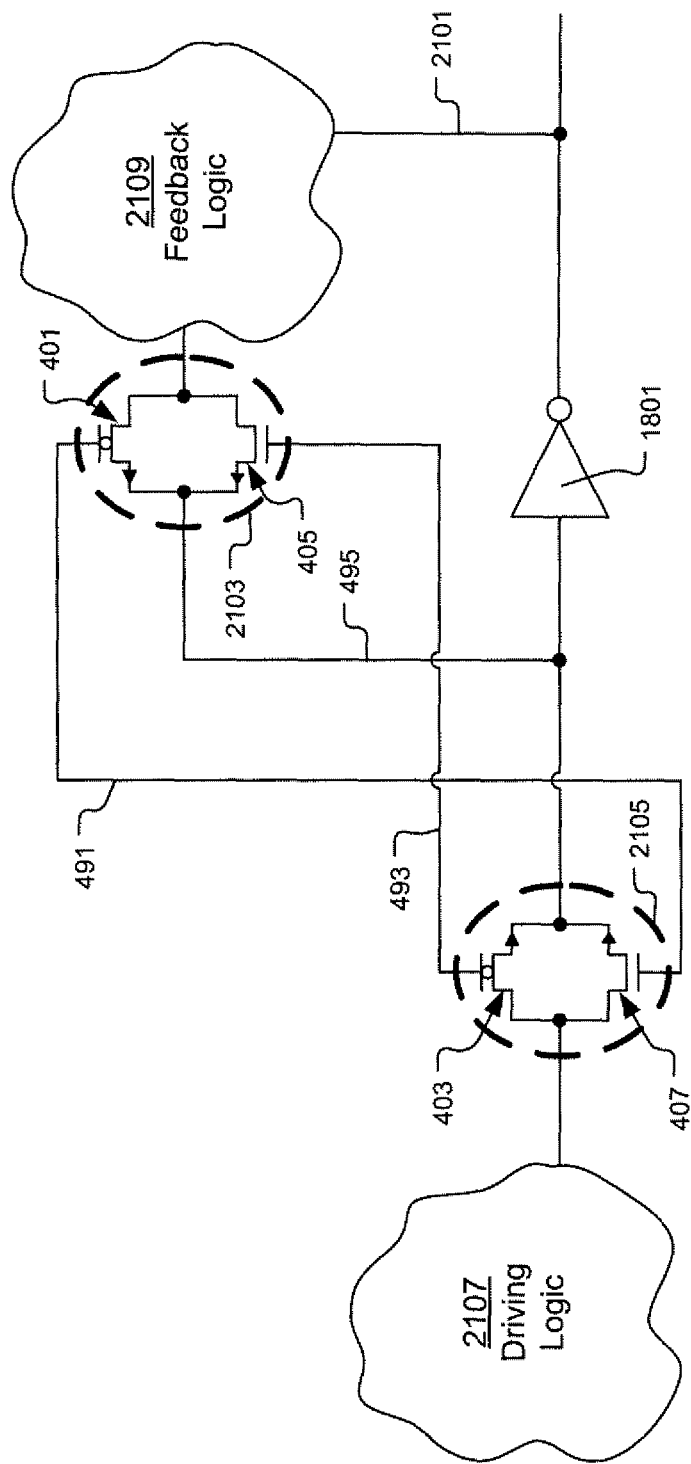
FIG. 21A shows a generalized latch circuit in which cross-coupled transistors are connected to form two transmission gates to the common node, in accordance with one embodiment of the present invention.

FIG. 21A shows a generalized latch circuit in which the cross-coupled transistors (401, 403, 405, 407) are connected to form two transmission gates 2103, 2105 to the common node 495, in accordance with one embodiment of the present invention. As previously discussed, gates of the first PMOS transistor 401 and first NMOS transistor 407 are electrically connected, as shown by electrical connection 491. Also, gates of the second PMOS transistor 403 and second NMOS transistor 405 are electrically connected, as shown by electrical connection 493. The first PMOS transistor 401 and second NMOS transistor 405 are connected to form a first transmission gate 2103 to the common node 495. The second PMOS transistor 403 and first NMOS transistor 407 are connected to form a second transmission gate 2105 to the common node 495. Feedback logic 2109 is electrically connected to both the first PMOS transistor 401 and second NMOS transistor 405 at a terminal opposite the common node 495. Driving logic 2107 is electrically connected to both the second PMOS transistor 403 and first NMOS transistor 407 at a terminal opposite the common node 495. Additionally, the common node 495 is connected to the input of the inverter 1801. The output of the inverter 1801 is electrically connected to a feedback node 2101. It should be understood that in other embodiments the inverter 1801 can be replaced by any logic function, such as a two input NOR gate, a two input NAND gate, among others, or any complex logic function.

Figure 21B:
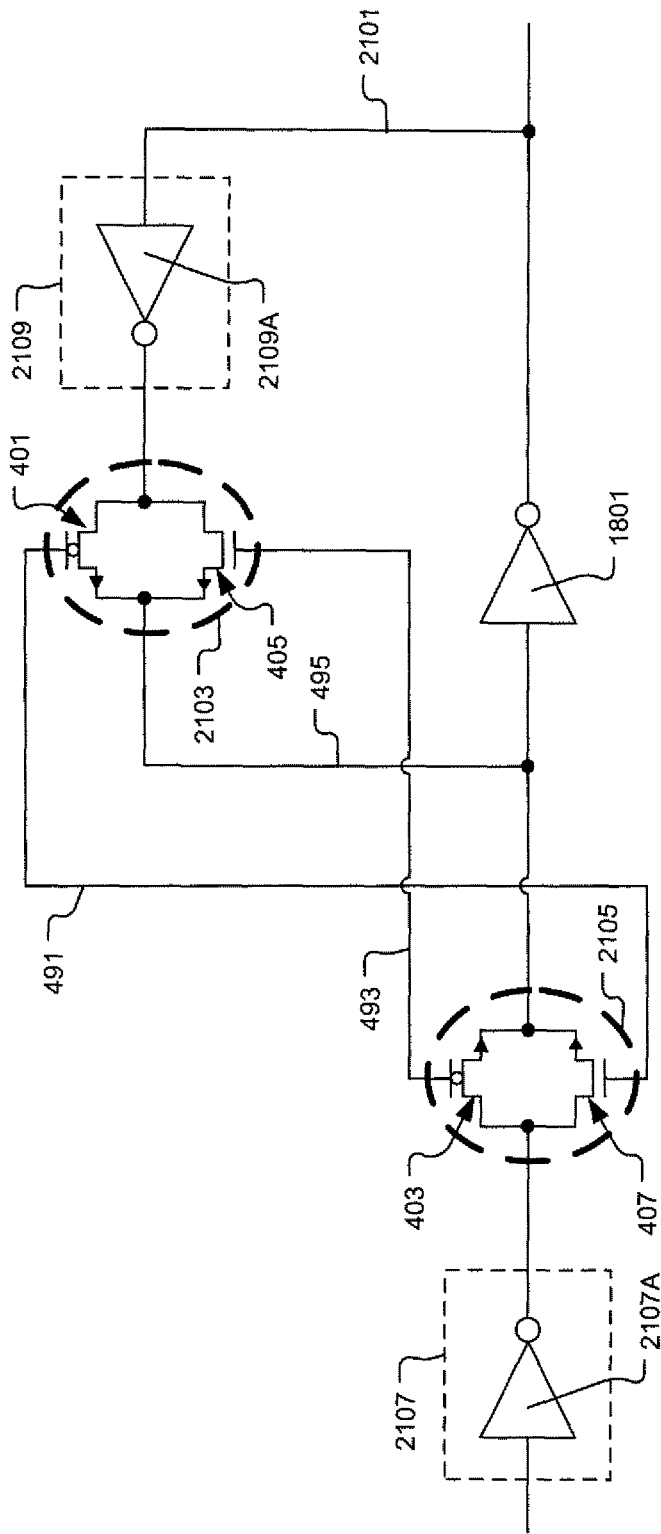
FIG. 21B shows an exemplary implementation of the latch circuit of FIG. 21A with a detailed view of the driving logic and the feedback logic, in accordance with one embodiment of the present invention.

FIG. 21B shows an exemplary implementation of the latch circuit of FIG. 21A with a detailed view of the driving logic 2107 and feedback logic 2109, in accordance with one embodiment of the present invention. The driving logic 2107 is defined by an inverter 2107A. Similarly, the feedback logic 2109 is defined by an inverter 2109A. It should be understood that in other embodiments, the driving logic 2107 and/or 2109 can be defined by logic other than an inverter.

Figure 21C:
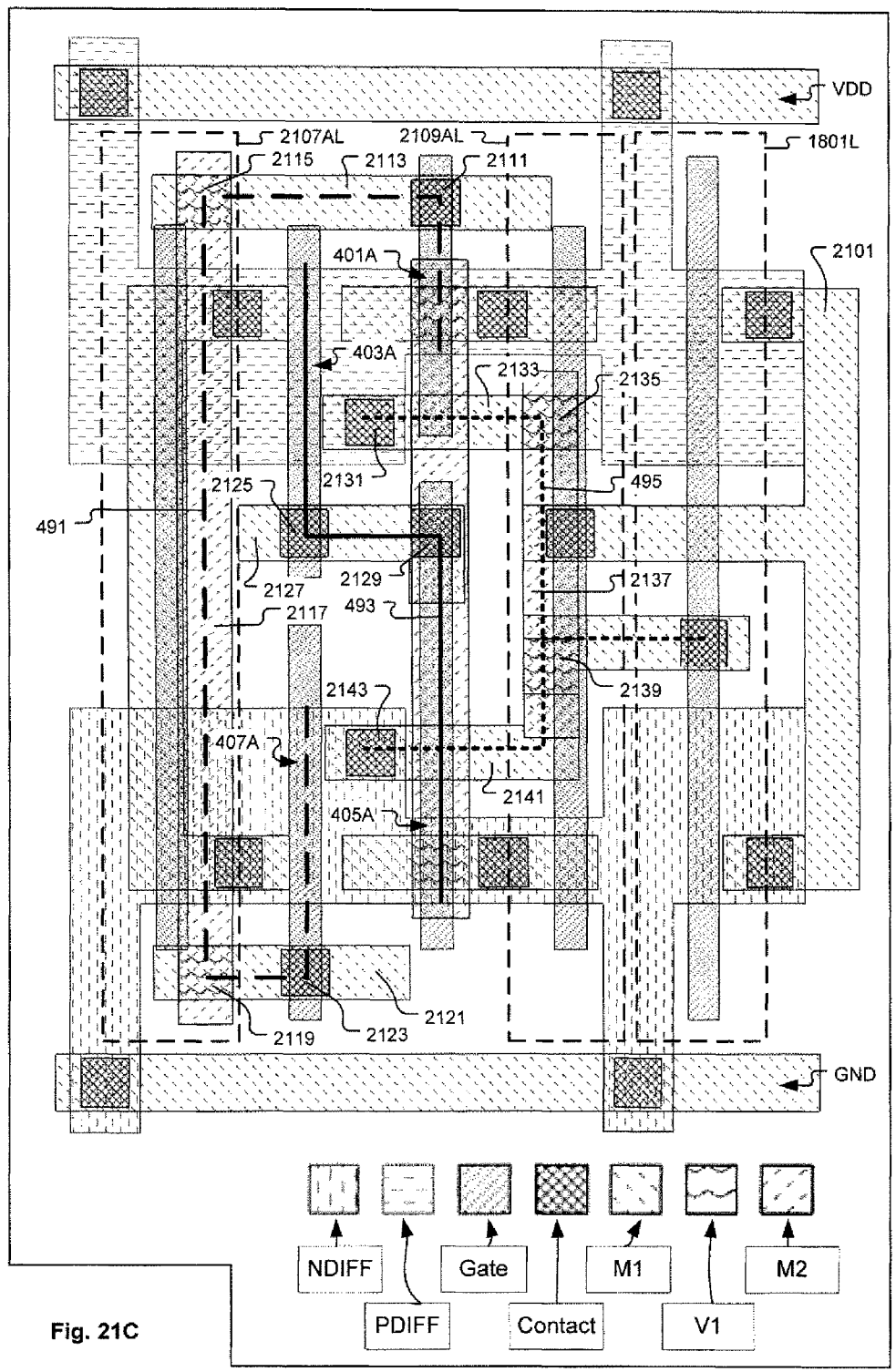
FIG. 21C shows a multi-level layout of the latch circuit of FIG. 21B implemented using a restricted gate level layout architecture cross-coupled transistor layout, in accordance with one embodiment of the present invention.

FIG. 21C shows a multi-level layout of the latch circuit of FIG. 21B implemented using a restricted gate level layout architecture cross-coupled transistor layout, in accordance with one embodiment of the present invention. The electrical connection 491 between the gate electrode 401A of the first PMOS transistor 401 and the gate electrode 407A of the first NMOS transistor 407 is formed by a multi-level connection that includes a gate contact 2111, a (one-dimensional) metal-1 structure 2113, a via 2115, a (one-dimensional) metal-2 structure 2117, a via 2119, a (one-dimensional) metal-1 structure 2121, and a gate contact 2123. The electrical connection 493 between the gate electrode 403A of the second PMOS transistor 403 and the gate electrode 405A of the second NMOS transistor 405 is formed by a multi-level connection that includes a gate contact 2125, a (two-dimensional) metal-1 structure 2127, and a gate contact 2129. The common node electrical connection 495 is formed by a multi-level connection that includes a diffusion contact 2131, a (one-dimensional) metal-1 structure 2133, a via 2135, a (one-dimensional) metal-2 structure 2137, a via 2139, a (two-dimensional) metal-1 structure 2141, and a diffusion contact 2143. Transistors which form the inverter 2107A are shown within the region bounded by the dashed line 2107AL. Transistors which form the inverter 2109A are shown within the region bounded by the dashed line 2109AL. Transistors which form the inverter 1801 are shown within the region bounded by the dashed line 1801L.

Figure 22A:
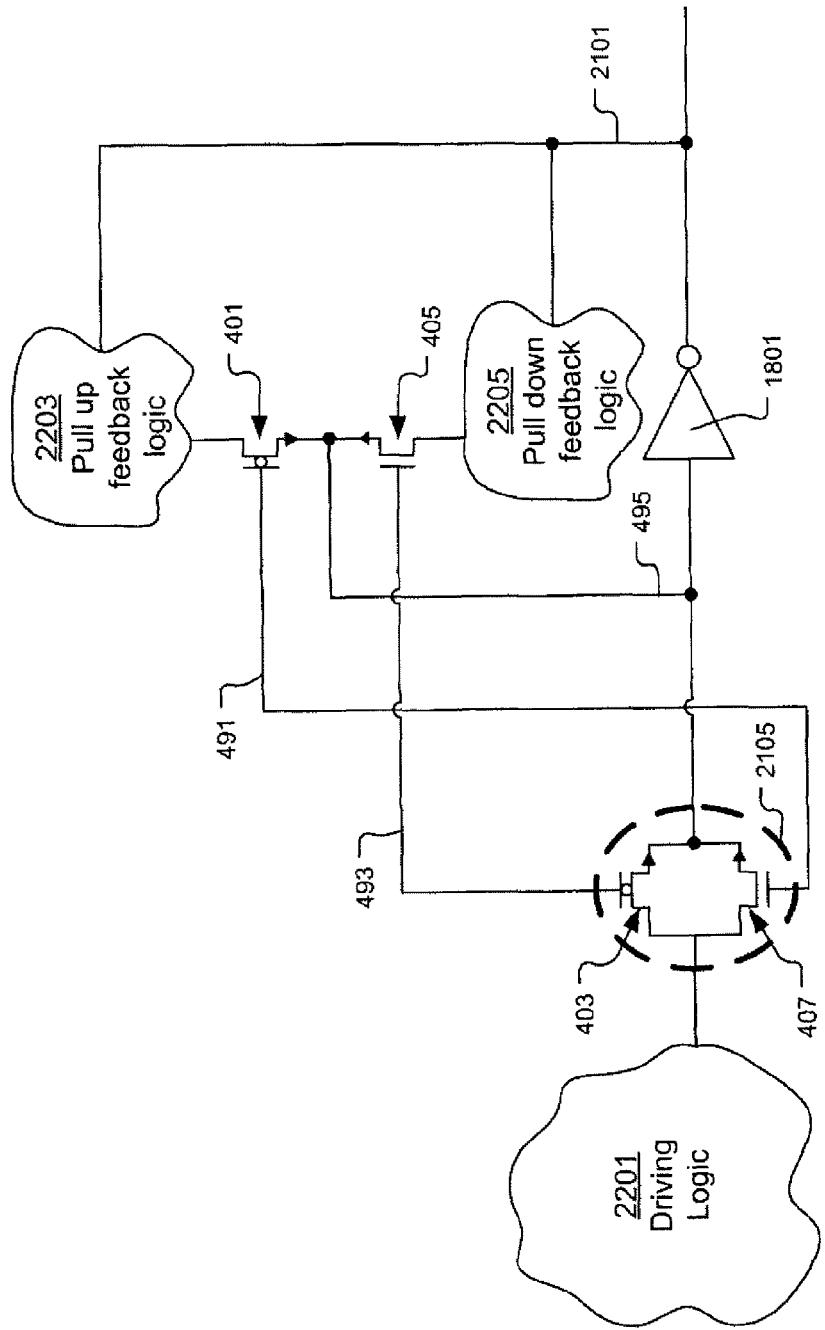
FIG. 22A shows a generalized latch circuit in which two transistors of the four cross-coupled transistors are connected to form a transmission gate to the common node, in accordance with one embodiment of the present invention.

FIG. 22A shows a generalized latch circuit in which two transistors (403, 407) of the four cross-coupled transistors are connected to form a transmission gate 2105 to the common node 495, in accordance with one embodiment of the present invention. As previously discussed, gates of the first PMOS transistor 401 and first NMOS transistor 407 are electrically connected, as shown by electrical connection 491. Also, gates of the second PMOS transistor 403 and second NMOS transistor 405 are electrically connected, as shown by electrical connection 493. The second PMOS transistor 403 and first NMOS transistor 407 are connected to form the transmission gate 2105 to the common node 495. Driving logic 2201 is electrically connected to both the second PMOS transistor 403 and first NMOS transistor 407 at a terminal opposite the common node 495. Pull up feedback logic 2203 is electrically connected to the first PMOS transistor 401 at a terminal opposite the common node 495. Also, pull down feedback logic 2205 is electrically connected to the second NMOS transistor 405 at a terminal opposite the common node 495.

Figure 22B:
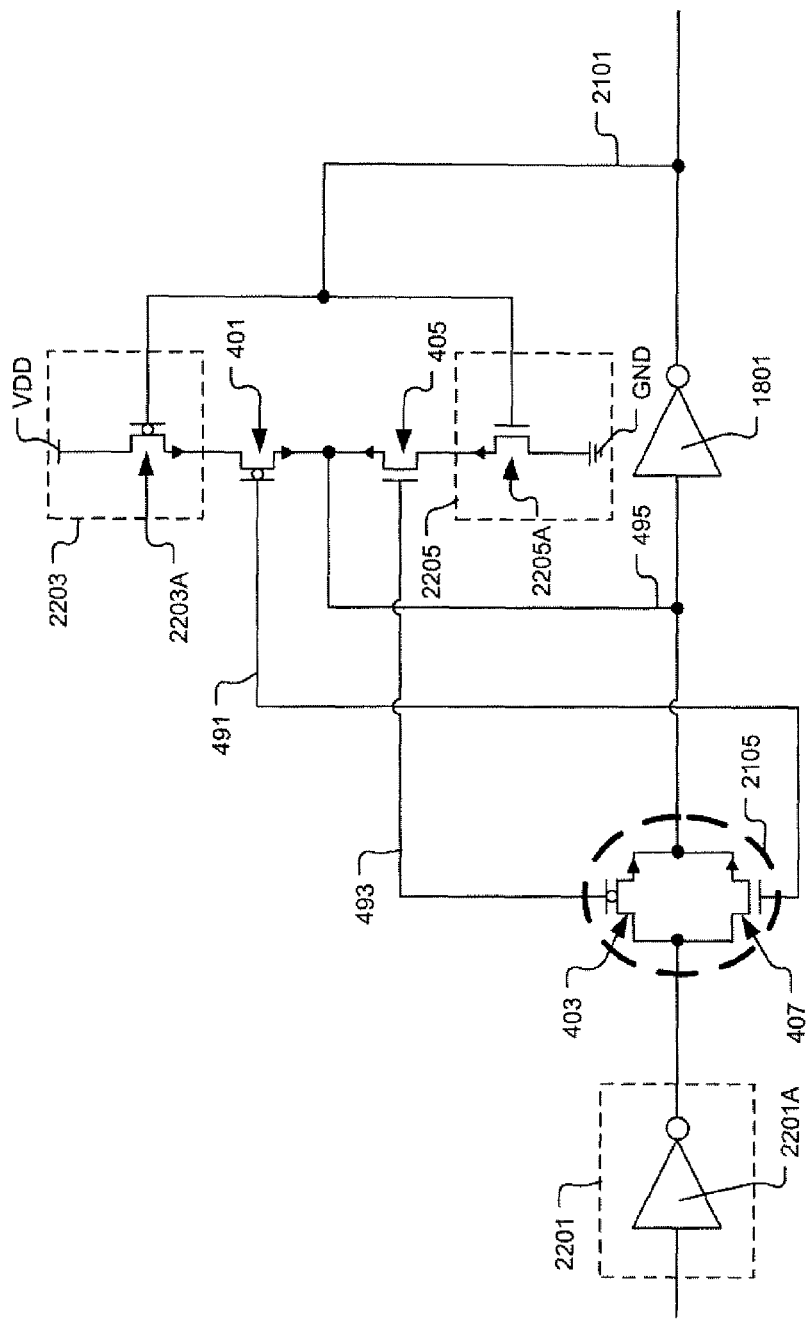
FIG. 22B shows an exemplary implementation of the latch circuit of FIG. 22A with a detailed view of the driving logic, the pull up feedback logic, and the pull down feedback logic, in accordance with one embodiment of the present invention.

FIG. 22B shows an exemplary implementation of the latch circuit of FIG. 22A with a detailed view of the driving logic 2201, the pull up feedback logic 2203, and the pull down feedback logic 2205, in accordance with one embodiment of the present invention. The driving logic 2201 is defined by an inverter 2201A. The pull up feedback logic 2203 is defined by a PMOS transistor 2203A connected between VDD and the first PMOS transistor 401. The pull down feedback logic 2205 is defined by an NMOS transistor 2205A connected between GND and the second NMOS transistor 405. Respective gates of the PMOS transistor 2203A and NMOS transistor 2205A are connected together at the feedback node 2101. It should be understood that in other embodiments, the driving logic 2201 can be defined by logic other than an inverter. Also, it should be understood that in other embodiments, the pull up feedback logic 2203 and/or pull down feedback logic 2205 can be defined logic different than what is shown in FIG. 22B.

Figure 22C:
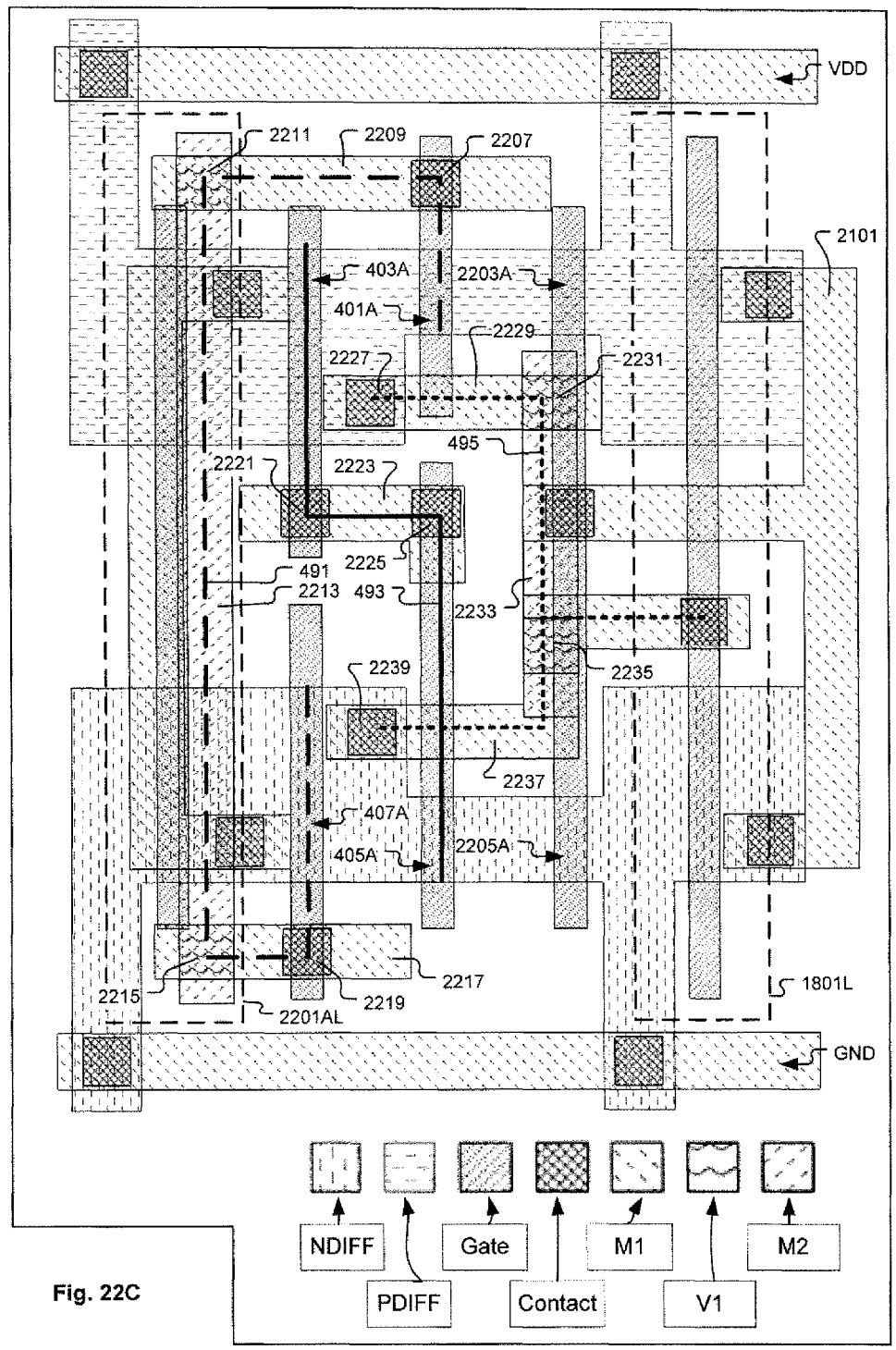
FIG. 22C shows a multi-level layout of the latch circuit of FIG. 22B implemented using a restricted gate level layout architecture cross-coupled transistor layout, in accordance with one embodiment of the present invention.

FIG. 22C shows a multi-level layout of the latch circuit of FIG. 22B implemented using a restricted gate level layout architecture cross-coupled transistor layout, in accordance with one embodiment of the present invention. The electrical connection 491 between the gate electrode 401A of the first PMOS transistor 401 and the gate electrode 407A of the first NMOS transistor 407 is formed by a multi-level connection that includes a gate contact 2207, a (one-dimensional) metal-1 structure 2209, a via 2211, a (one-dimensional) metal-2 structure 2213, a via 2215, a (one-dimensional) metal-1 structure 2217, and a gate contact 2219. The electrical connection 493 between the gate electrode 403A of the second PMOS transistor 403 and the gate electrode 405A of the second NMOS transistor 405 is formed by a multi-level connection that includes a gate contact 2221, a (two-dimensional) metal-1 structure 2223, and a gate contact 2225. The common node electrical connection 495 is formed by a multi-level connection that includes a diffusion contact 2227, a (one-dimensional) metal-1 structure 2229, a via 2231, a (one-dimensional) metal-2 structure 2233, a via 2235, a (two-dimensional) metal-1 structure 2237, and a diffusion contact 2239. Transistors which form the inverter 2201A are shown within the region bounded by the dashed line 2201AL. Transistors which form the inverter 1801 are shown within the region bounded by the dashed line 1801L.

Exemplary Embodiments

In one embodiment, a cross-coupled transistor configuration is defined within a semiconductor chip. This embodiment is illustrated in part with regard to FIG. 2. In this embodiment, a first P channel transistor (401) is defined to include a first gate electrode (401A) defined in a gate level of the chip. Also, a first N channel transistor (407) is defined to include a second gate electrode (407A) defined in the gate level of the chip. The second gate electrode (407A) of the first N channel transistor (407) is electrically connected to the first gate electrode (401A) of the first P channel transistor (401). Further, a second P channel transistor (403) is defined to include a third gate electrode (403A) defined in the gate level of a chip. Also, a second N channel transistor (405) is defined to include a fourth gate electrode (405A) defined in the gate level of the chip. The fourth gate electrode (405A) of the second N channel transistor (405) is electrically connected to the third gate electrode (403A) of the second P channel transistor (403). Additionally, each of the first P channel transistor (401), first N channel transistor (407), second P channel transistor (403), and second N channel transistor (405) has a respective diffusion terminal electrically connected to a common node (495).

It should be understood that in some embodiments, one or more of the first P channel transistor (401), the first N channel transistor (407), the second P channel transistor (403), and the second N channel transistor (405) can be respectively implemented by a number of transistors electrically connected in parallel. In this instance, the transistors that are electrically connected in parallel can be considered as one device corresponding to either of the first P channel transistor (401), the first N channel transistor (407), the second P channel transistor (403), and the second N channel transistor (405). It should be understood that electrical connection of multiple transistors in parallel to form a given transistor of the cross-coupled transistor configuration can be utilized to achieve a desired drive strength for the given transistor.

In one embodiment, each of the first (401A), second (407A), third (403A), and fourth (405A) gate electrodes is defined to extend along any of a number of gate electrode tracks, such as described with regard to FIG. 3. The number of gate electrode tracks extend across the gate level of the chip in a parallel orientation with respect to each other. Also, it should be understood that each of the first (401A), second (407A), third (403A), and fourth (405A) gate electrodes corresponds to a portion of a respective gate level feature defined within a gate level feature layout channel. Each gate level feature is defined within its gate level feature layout channel without physically contacting another gate level feature defined within an adjoining gate level feature layout channel. Each gate level feature layout channel is associated with a given gate electrode track and corresponds to a layout region that extends along the given gate electrode track and perpendicularly outward in each opposing direction from the given gate electrode track to a closest of either an adjacent gate electrode track or a virtual gate electrode track outside a layout boundary, such as described with regard to FIG. 3B.

In various implementations of the above-described embodiment, such as in the exemplary layouts of FIGS. 10, 11, 14C, 15C, 16C, 17C, 18C, 19C, 20C, 21C, 22C, the second gate electrode (407A) is electrically connected to the first gate electrode (401A) through at least one electrical conductor defined within any chip level other than the gate level. And, the fourth gate electrode (405A) is electrically connected to the third gate electrode (403A) through at least one electrical conductor defined within any chip level other than the gate level.

In various implementations of the above-described embodiment, such as in the exemplary layout of FIG. 13, both the second gate electrode (407A) and the first gate electrode (401A) are formed from a single gate level feature that is defined within a same gate level feature layout channel that extends along a single gate electrode track over both a p type diffusion region and an n type diffusion region. And, the fourth gate electrode (405A) is electrically connected to the third gate electrode (403A) through at least one electrical conductor defined within any chip level other than the gate level.

In various implementations of the above-described embodiment, such as in the exemplary layouts of FIG. 12, both the second gate electrode (407A) and the first gate electrode (401A) are formed from a first gate level feature that is defined within a first gate level feature layout channel that extends along a first gate electrode track over both a p type diffusion region and an n type diffusion region. And, both the fourth gate electrode (405A) and the third gate electrode (403A) are formed from a second gate level feature that is defined within a second gate level feature layout channel that extends along a second gate electrode track over both a p type diffusion region and an n type diffusion region.

In one embodiment, the above-described gate electrode cross-coupled transistor configuration is used to implement a multiplexer having no transmission gates. This embodiment is illustrated in part with regard to FIGS. 14-15. In this embodiment, a first configuration of pull-up logic (1401) is electrically connected to the first P channel transistor (401), a first configuration of pull-down logic (1407) electrically connected to the first N channel transistor (407), a second configuration of pull-up logic (1405) electrically connected to the second P channel transistor (403), and a second configuration of pull-down logic (1403) electrically connected to the second N channel transistor (405).

In the particular embodiments of FIGS. 14B and 15B, the first configuration of pull-up logic (1401) is defined by a third P channel transistor (1401A), and the second configuration of pull-down logic (1403) is defined by a third N channel transistor (1403A). Respective gates of the third P channel transistor (1401A) and third N channel transistor (1403A) are electrically connected together so as to receive a substantially equivalent electrical signal. Moreover, the first configuration of pull-down logic (1407) is defined by a fourth N channel transistor (1407A), and the second configuration of pull-up logic (1405) is defined by a fourth P channel transistor (1405A). Respective gates of the fourth P channel transistor (1405A) and fourth N channel transistor (1407A) are electrically connected together so as to receive a substantially equivalent electrical signal.

In one embodiment, the above-described gate electrode cross-coupled transistor configuration is used to implement a multiplexer having one transmission gate. This embodiment is illustrated in part with regard to FIG. 17. In this embodiment, a first configuration of pull-up logic (1703) is electrically connected to the first P channel transistor (401), a first configuration of pull-down logic (1705) electrically connected to the second N channel transistor (405), and mux driving logic (1701) is electrically connected to both the second P channel transistor (403) and the first N channel transistor (407).

In the exemplary embodiment of FIG. 17B, the first configuration of pull-up logic (1703) is defined by a third P channel transistor (1703A), and the first configuration of pull-down logic (1705) is defined by a third N channel transistor (1705A). Respective gates of the third P channel transistor (1703A) and third N channel transistor (1705A) are electrically connected together so as to receive a substantially equivalent electrical signal. Also, the mux driving logic (1701) is defined by an inverter (1701A).

In one embodiment, the above-described gate electrode cross-coupled transistor configuration is used to implement a latch having no transmission gates. This embodiment is illustrated in part with regard to FIGS. 18-20. In this embodiment, pull-up driver logic (1805) is electrically connected to the second P channel transistor (403), pull-down driver logic (1807) is electrically connected to the first N channel transistor (407), pull-up feedback logic (1809) is electrically connected to the first P channel transistor (401), and pull-down feedback logic (1811) is electrically connected to the second N channel transistor (405). Also, the latch includes an inverter (1801) having an input connected to the common node (495) and an output connected to a feedback node (1803). Each of the pull-up feedback logic (1809) and pull-down feedback logic (1811) is connected to the feedback node (1803).

In the exemplary embodiments of FIGS. 18B, 19B, and 20B, the pull-up driver logic (1805) is defined by a third P channel transistor (1805A), and the pull-down driver logic (1807) is defined by a third N channel transistor (1807A). Respective gates of the third P channel transistor (1805A) and third N channel transistor (1807A) are electrically connected together so as to receive a substantially equivalent electrical signal. Additionally, the pull-up feedback logic (1809) is defined by a fourth P channel transistor (1809A), and the pull-down feedback logic (1811) is defined by a fourth N channel transistor (1811A). Respective gates of the fourth P channel transistor (1809A) and fourth N channel transistor (1811A) are electrically connected together at the feedback node (1803).

In one embodiment, the above-described gate electrode cross-coupled transistor configuration is used to implement a latch having two transmission gates. This embodiment is illustrated in part with regard to FIG. 21. In this embodiment, driving logic (2107) is electrically connected to both the second P channel transistor (403) and the first N channel transistor (407). Also, feedback logic (2109) is electrically connected to both the first P channel transistor (401) and the second N channel transistor (405). The latch further includes a first inverter (1801) having an input connected to the common node (495) and an output connected to a feedback node (2101). The feedback logic (2109) is electrically connected to the feedback node (2101). In the exemplary embodiment of FIG. 21B, the driving logic (2107) is defined by a second inverter (2107A), and the feedback logic (2109) is defined by a third inverter (2109A).

In one embodiment, the above-described gate electrode cross-coupled transistor configuration is used to implement a latch having one transmission gate. This embodiment is illustrated in part with regard to FIG. 22. In this embodiment, driving logic (2201) is electrically connected to both the second P channel transistor (403) and the first N channel transistor (407). Also, pull up feedback logic (2203) is electrically connected to the first P channel transistor (401), and pull down feedback logic (2205) electrically connected to the second N channel transistor (405). The latch further includes a first inverter (1801) having an input connected to the common node (495) and an output connected to a feedback node (2101). Both the pull up feedback logic (2203) and pull down feedback logic (2205) are electrically connected to the feedback node (2101). In the exemplary embodiment of FIG. 22B, the driving logic (2201) is defined by a second inverter (2201A). Also, the pull up feedback logic (2203) is defined by a third P channel transistor (2203A) electrically connected between the first P channel transistor (401) and the feedback node (2101). The pull down feedback logic (2205) is defined by a third N channel transistor (2205A) electrically connected between the second N channel transistor (405) and the feedback node (2101).

In one embodiment, cross-coupled transistors devices are defined and connected to form part of an integrated circuit within a semiconductor chip ("chip" hereafter). The chip includes a number of levels within which different features are defined to form the integrated circuit and cross-coupled transistors therein. The chip includes a substrate within which a number of diffusion regions are formed. The chip also includes a gate level in which a number of gate electrodes are formed. The chip further includes a number of interconnect levels successively defined above the gate level. A dielectric material is used to electrically separate a given level from its vertically adjacent levels. A number of contact features are defined to extend vertically through the chip to connect gate electrode features and diffusion regions, respectively, to various interconnect level features. Also, a number of via features are defined to extend vertically through the chip to connect various interconnect level features.

The gate level of the various embodiments disclosed herein is defined as a linear gate level and includes a number of commonly oriented linear gate level features. Some of the linear gate level features form gate electrodes of transistor devices. Others of the linear gate level features can form conductive segments extending between two points within the gate level. Also, others of the linear gate level features may be non-functional with respect to integrated circuit operation. It should be understood that the each of the linear gate level features, regardless of function, is defined to extend across the gate level in a common direction and to be devoid of a substantial change in direction along its length. Therefore, each of the gate level features is defined to be parallel to each other when viewed from a perspective perpendicular to the gate level.

It should be understood that each of the linear gate electrode features, regardless of function, is defined such that no linear gate electrode feature along a given line of extent is configured to connect directly within the gate electrode level to another linear gate electrode feature defined along another parallel line of extent, without utilizing a non-gate electrode feature. Moreover, each connection between linear gate electrode features that are placed on different, yet parallel, lines of extent is made through one or more non-gate electrode features, which may be defined in higher interconnect level(s), i.e., through one or more interconnect level(s) above the gate electrode level, or by way of local interconnect features within the linear gate level. In one embodiment, the linear gate electrode features are placed according to a virtual grid or virtual grate. However, it should be understood that in other embodiments the linear gate electrode features, although oriented to have a common direction of extent, are placed without regard to a virtual grid or virtual grate.

Additionally, it should be understood that while each linear gate electrode feature is defined to be devoid of a substantial change in direction along its line of extent, each linear gate electrode feature may have one or more contact head portion(s) defined at any number of location(s) along its length. A contact head portion of a given linear gate electrode feature is defined as a segment of the linear gate electrode feature having a different width than a gate portion of the linear gate electrode feature, i.e., than a portion of the linear gate electrode feature that extends over a diffusion region, wherein "width" is defined across the substrate in a direction perpendicular to the line of extent of the given linear gate electrode feature. It should be appreciated that a contact head of linear gate electrode feature, when viewed from above, can be defined by essentially any rectangular layout shape, including a square and a rectangle. Also, depending on layout requirements and circuit design, a given contact head portion of a linear gate electrode feature may or may not have a gate contact defined thereabove.

In one embodiment, a substantial change in direction of a linear gate level feature exists when the width of the linear gate level feature at any point thereon changes by more than 50% of the nominal width of the linear gate level feature along its entire length. In another embodiment, a substantial change in direction of a linear gate level feature exists when the width of the linear gate level feature changes from any first location on the linear gate level feature to any second location on the linear gate level feature by more that 50% of the linear gate level feature width at the first location. Therefore, it should be appreciated that the use of non-linear-shaped gate level features is specifically avoided, wherein a non-linear-shaped gate level feature includes one or more significant bends within a plane of the gate level.

Each of the linear gate level features has a width defined perpendicular to its direction of extent across the gate level. In one embodiment, the various gate level features can be defined to have different widths. In another embodiment, the various gate level features can be defined to have the same width. Also, a center-to-center spacing between adjacent linear gate level features, as measured perpendicular to their direction of extent across the gate level, is referred to as gate pitch. In one embodiment, a uniform gate pitch is used. However, in another embodiment, the gate pitch can vary across the gate level. It should be understood that linear gate level feature width and pitch specifications can be established for a portion of the chip and can be different for separate portions of the chip, wherein the portion of the chip may be of any size and shape.

Various embodiments are disclosed herein for cross-coupled transistor layouts defined using the linear gate level as described above. Each cross-coupled transistor layout embodiment includes four cross-coupled transistors, wherein each of these four cross-coupled transistors is defined in part by a respective linear gate electrode feature, and wherein the linear gate electrode features of the cross-coupled transistors are oriented to extend across the layout in a parallel relationship to each other.

Also, in each cross-coupled transistor layout, each of the gate electrodes of the four cross-coupled transistors is associated with, i.e., electrically interfaced with, a respective diffusion region. The diffusion regions associated with the gate electrodes of the cross-coupled transistors are electrically connected to a common node. In various embodiments, connection of the cross-coupled transistor's diffusion regions to the common node can be made in many different ways.

For example, in one embodiment, two PMOS transistors of the cross-coupled transistors are disposed over a common p-type diffusion region, two NMOS transistors of the cross-coupled transistors are disposed over a common n-type diffusion region, and the p-type and n-type diffusion regions associated with the cross-coupled transistors are electrically connected to a common node. FIGS. 26-99, 150-157, and 168-172 illustrate various cross-coupled transistor layout embodiments in which two PMOS transistors of the cross-coupled transistors are disposed over a common p-type diffusion region, two NMOS transistors of the cross-coupled transistors are disposed over a common n-type diffusion region, and the p-type and n-type diffusion regions associated with the cross-coupled transistors are electrically connected to a common node. It should be understood that although FIGS. 26-99 do not explicitly show an electrical connection of the n-type and p-type diffusion regions of the cross-coupled transistors to a common node, this common node connection between the n-type and p-type diffusion regions of the cross-coupled transistors is present in a full version of the exemplary layouts.

In another embodiment, two PMOS transistors of the cross-coupled transistors are respectively disposed over physically separated p-type diffusion regions, two NMOS transistors of the cross-coupled transistors are disposed over a common n-type diffusion region, and the p-type and n-type diffusion regions associated with the cross-coupled transistors are electrically connected to a common node. FIGS. 103, 105, 112-149, 167, 184, and 186 illustrate various cross-coupled transistor layout embodiments in which two PMOS transistors of the cross-coupled transistors are respectively disposed over physically separated p-type diffusion regions, two NMOS transistors of the cross-coupled transistors are disposed over a common n-type diffusion region, and the p-type and n-type diffusion regions associated with the cross-coupled transistors are electrically connected to a common node.

Figure 100:
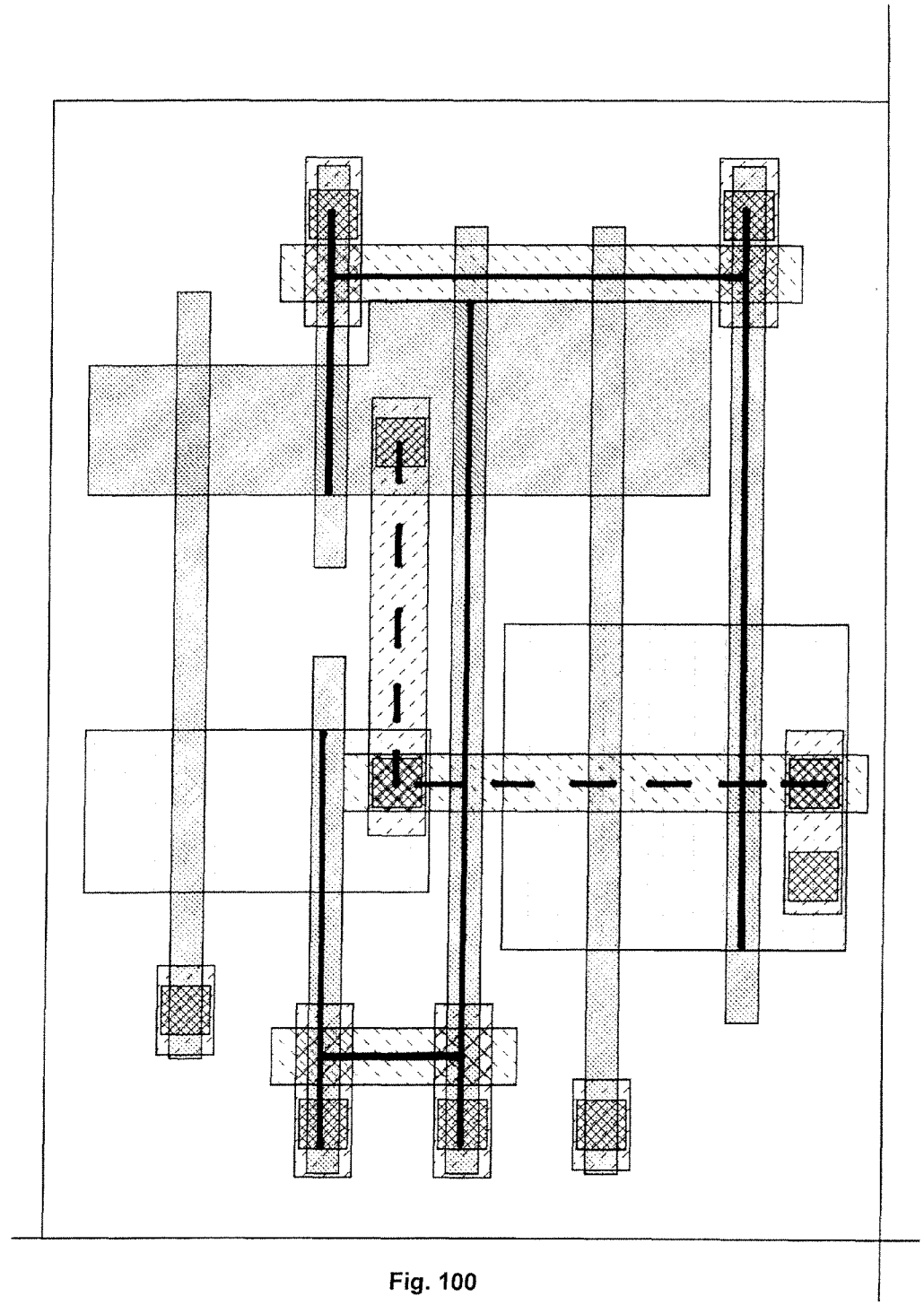
Figure 101:
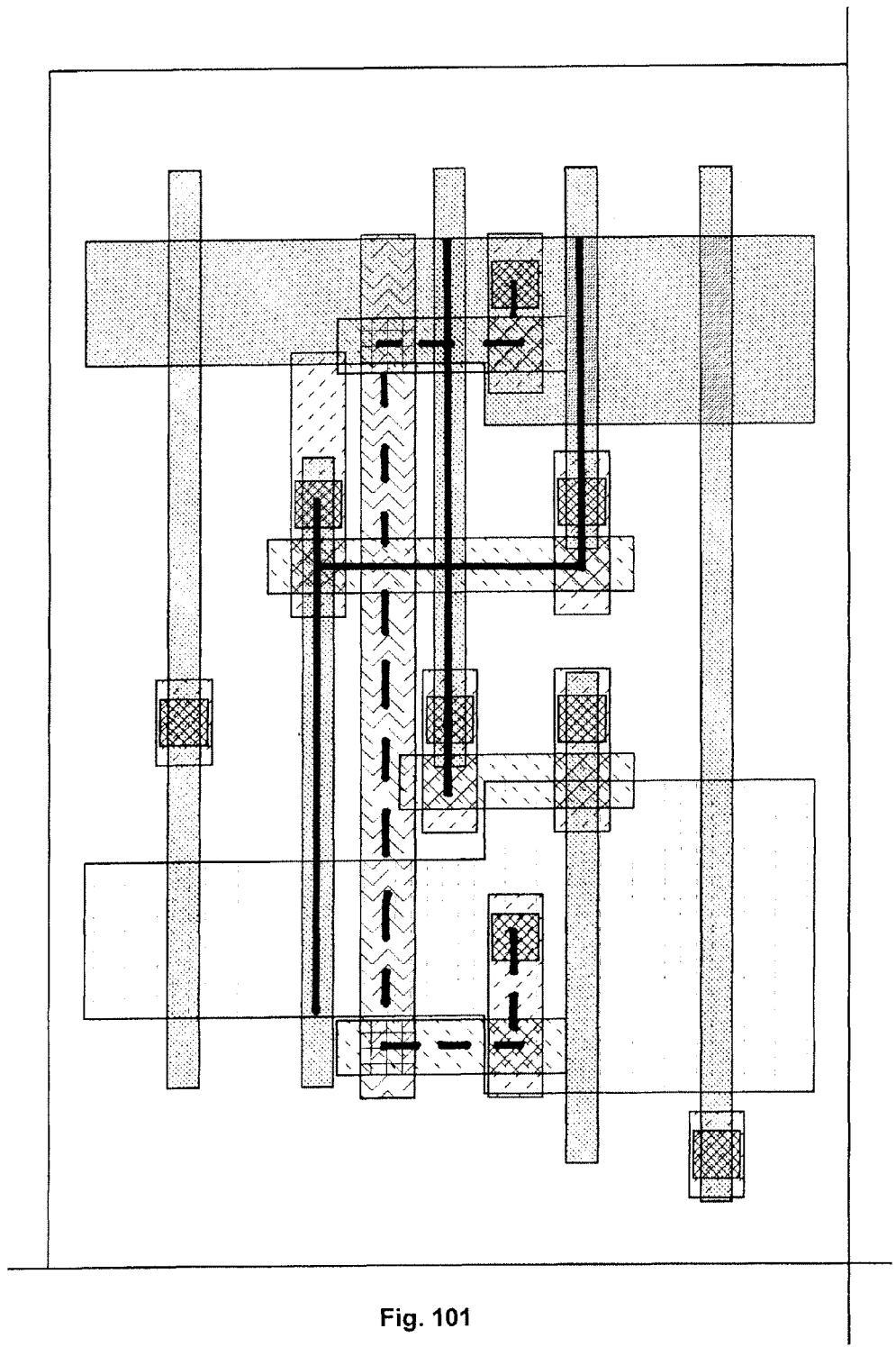
Figure 102:
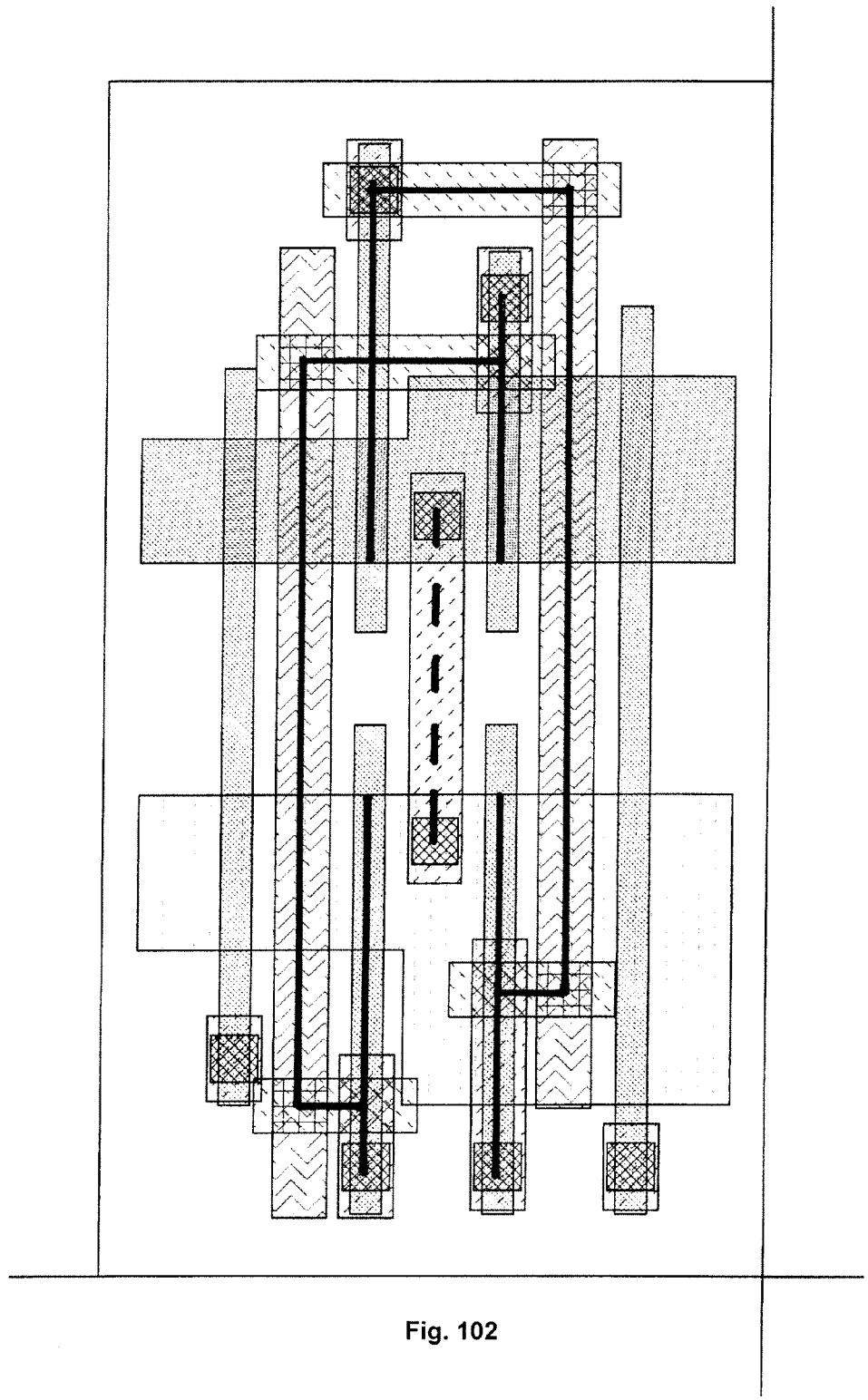
Figure 103:
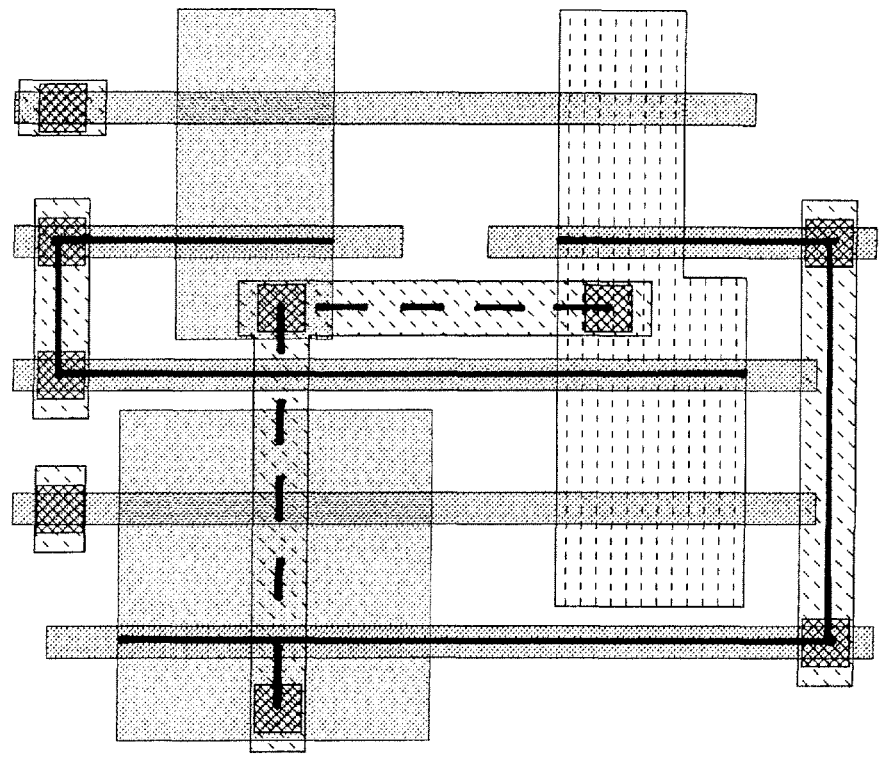
FIGS. 103, 105, 112-149, 167, 184, and 186 illustrate various cross-coupled transistor layout embodiments in which two PMOS transistors of the cross-coupled transistors are respectively disposed over physically separated p-type diffusion regions, two NMOS transistors of the cross-coupled transistors are disposed over a common n-type diffusion region, and the p-type and n-type diffusion regions associated with the cross-coupled transistors are electrically connected to a common node.
Figure 104:
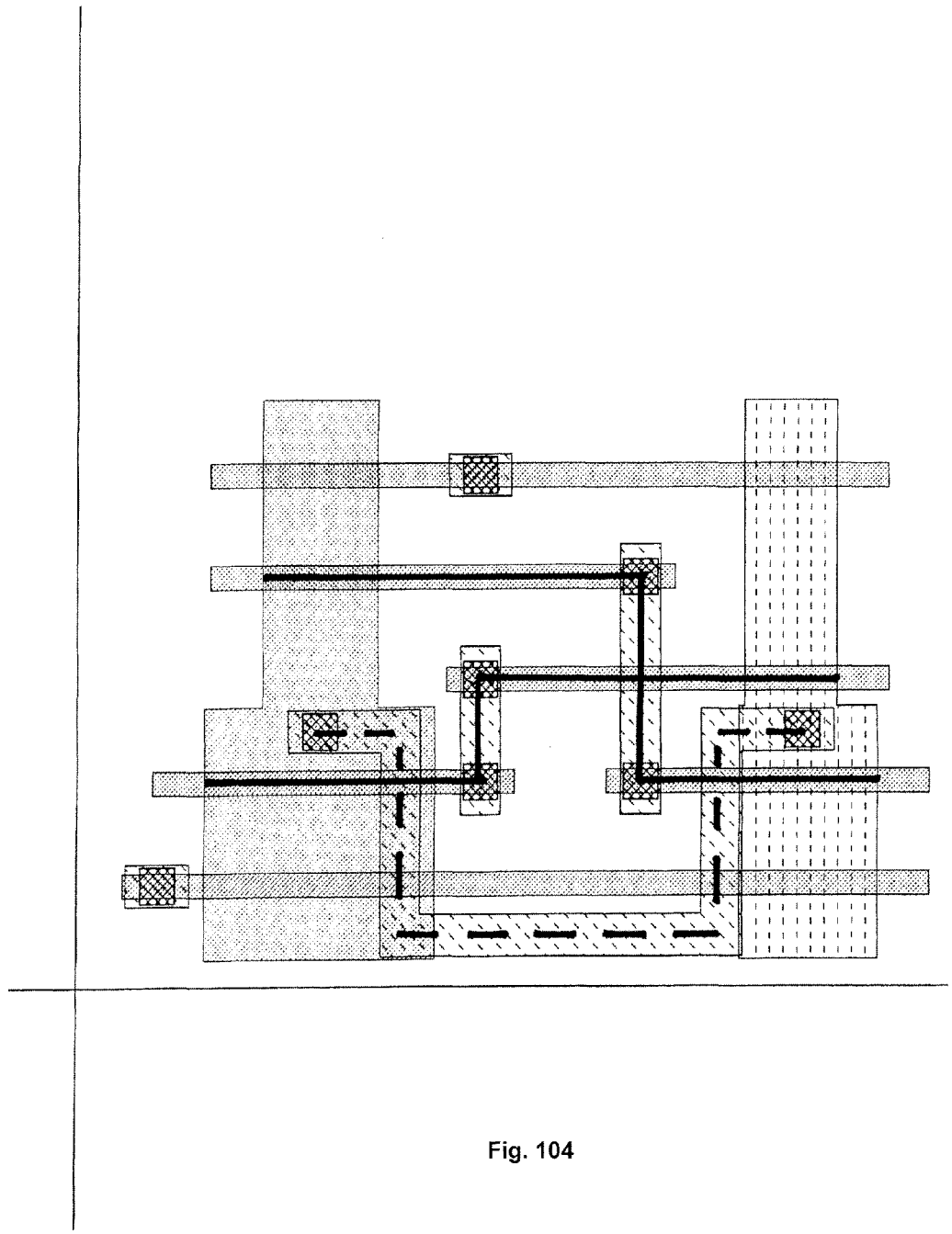
Figure 105:
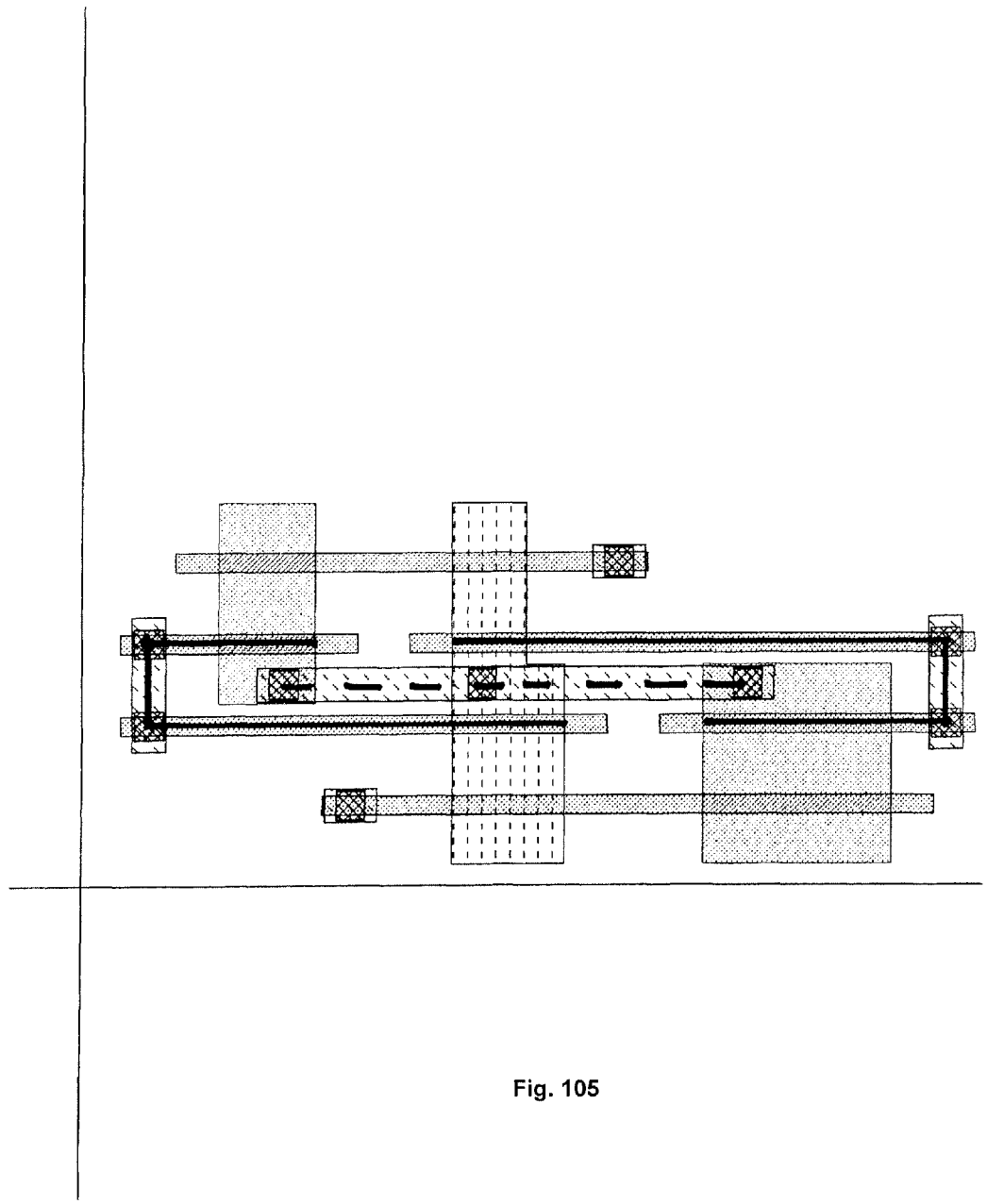
Figure 106:
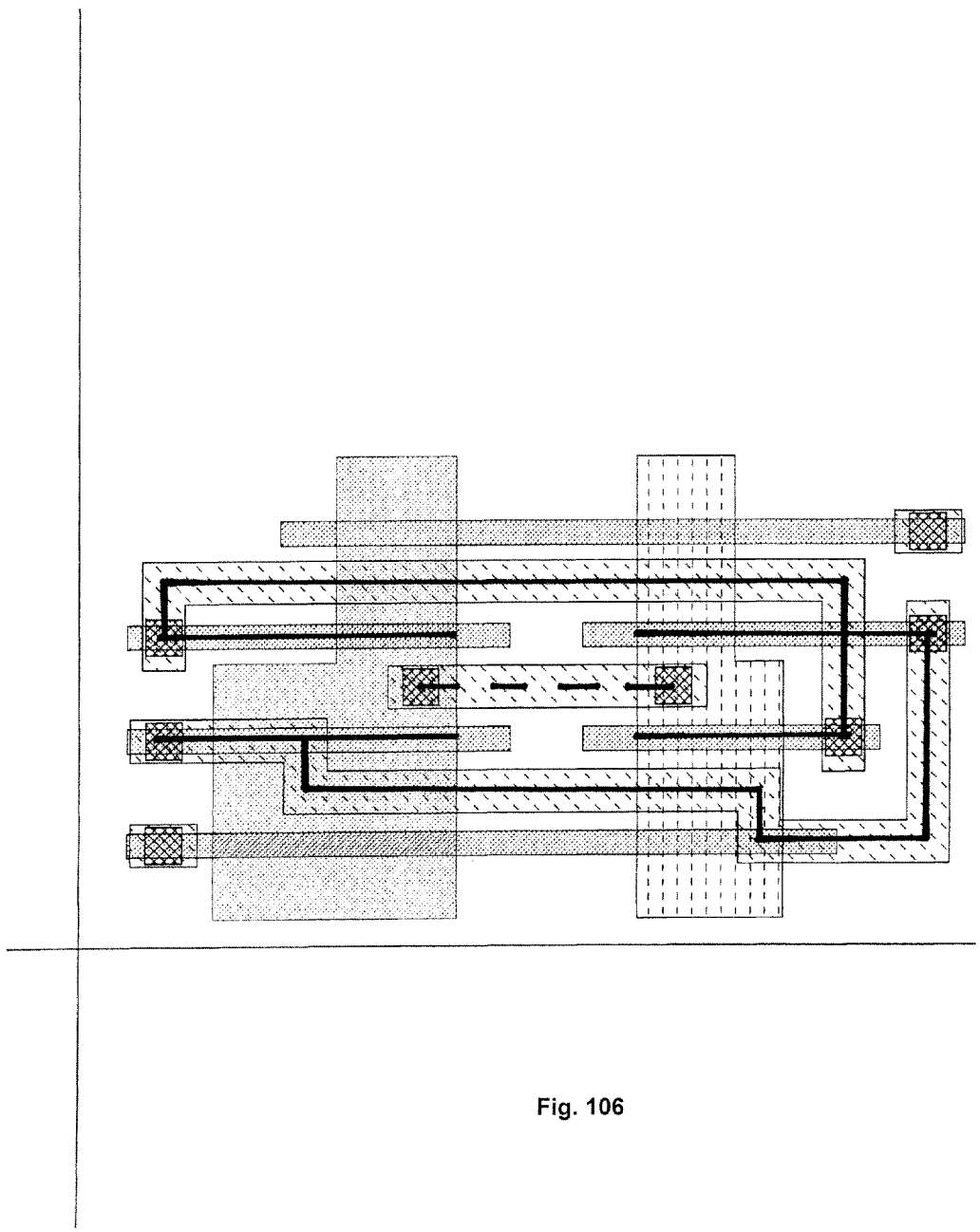
Figure 107:
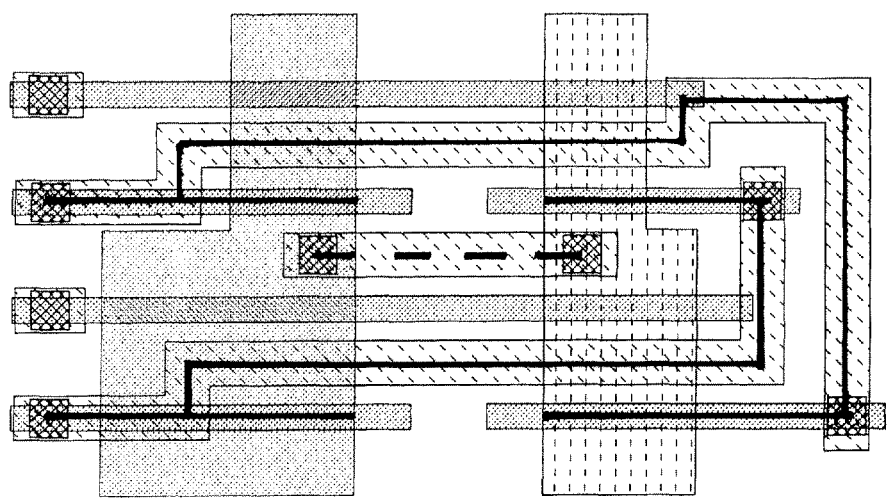
Figure 108:
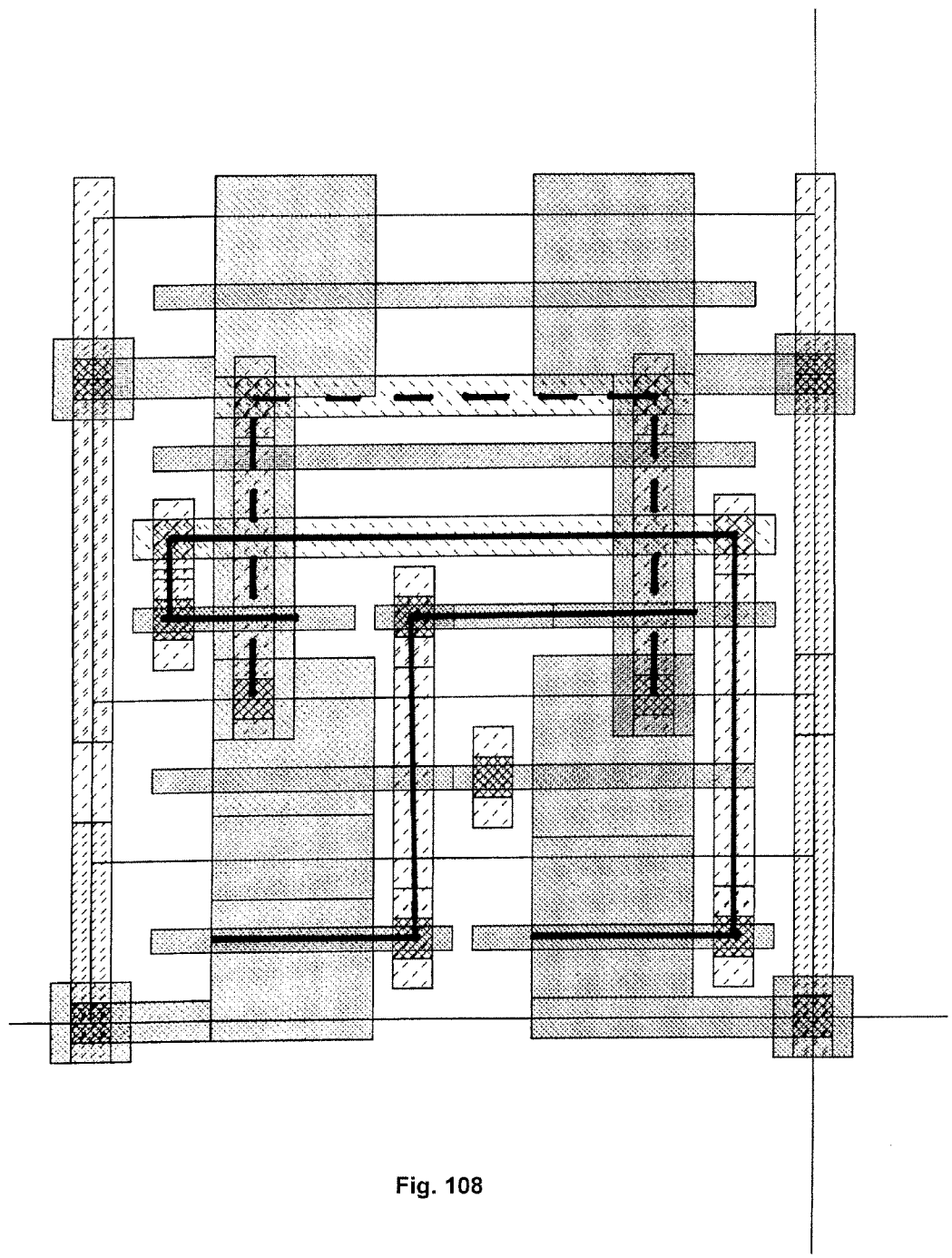
Figure 109:
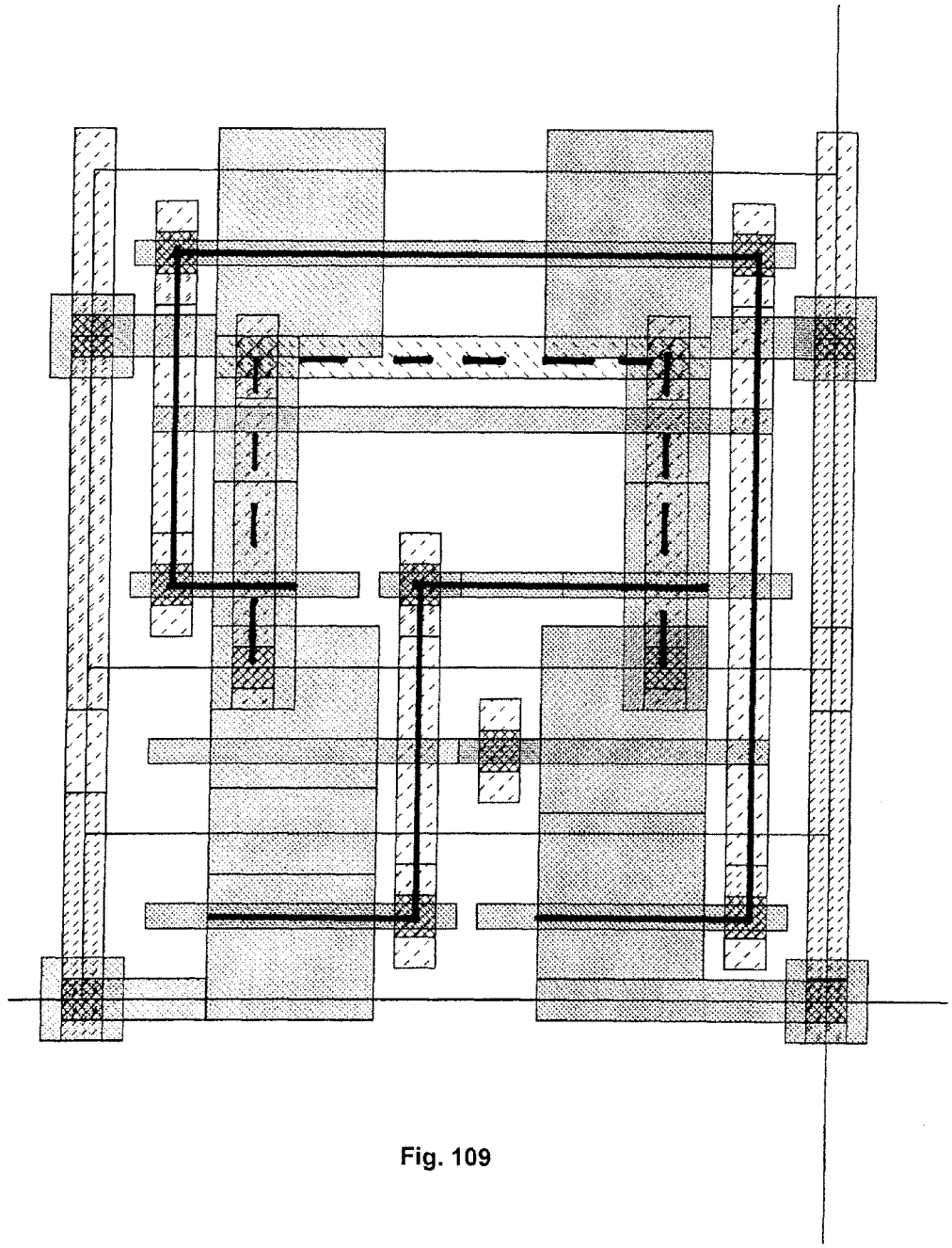
Figure 110:
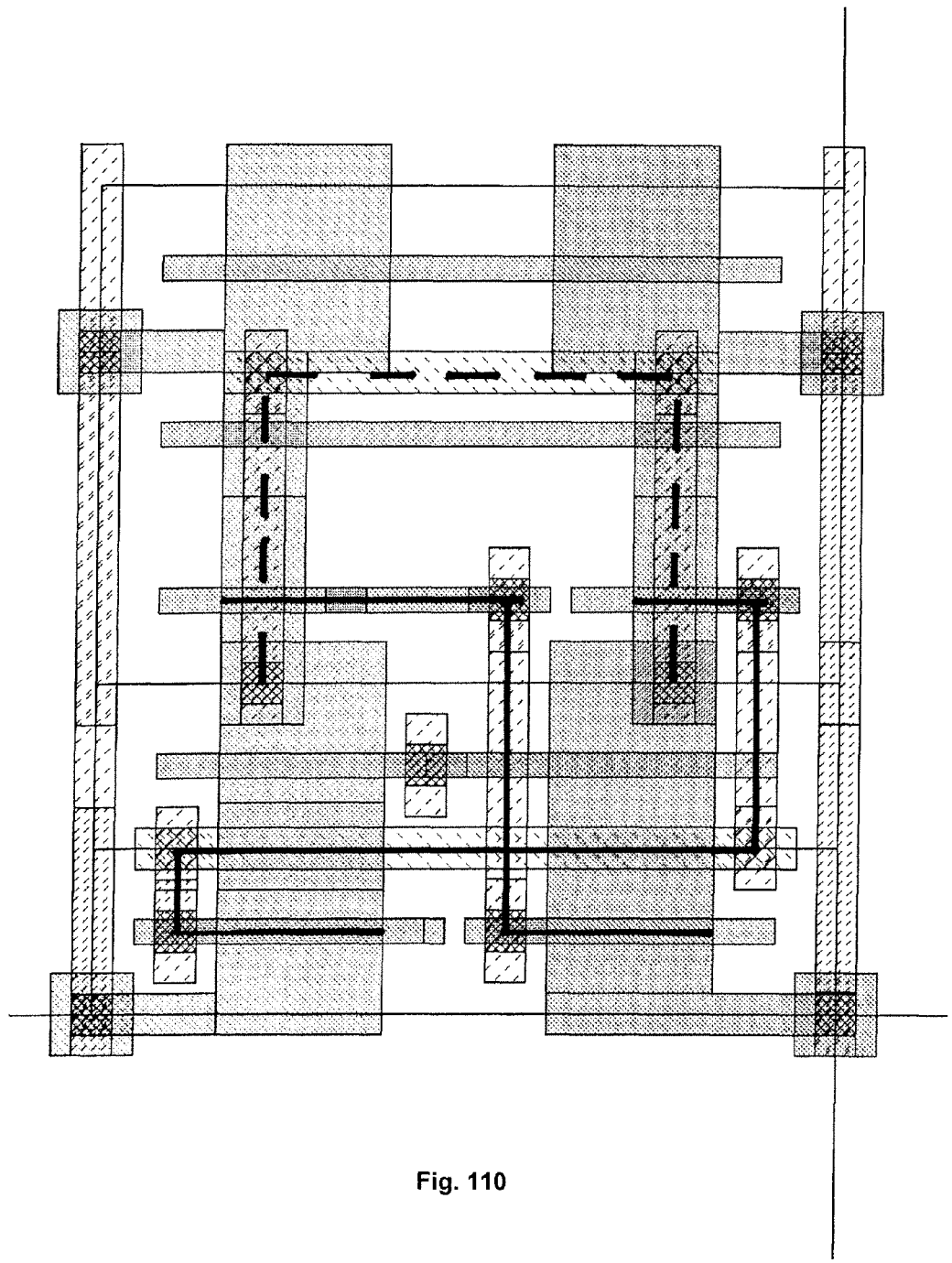
Figure 111:
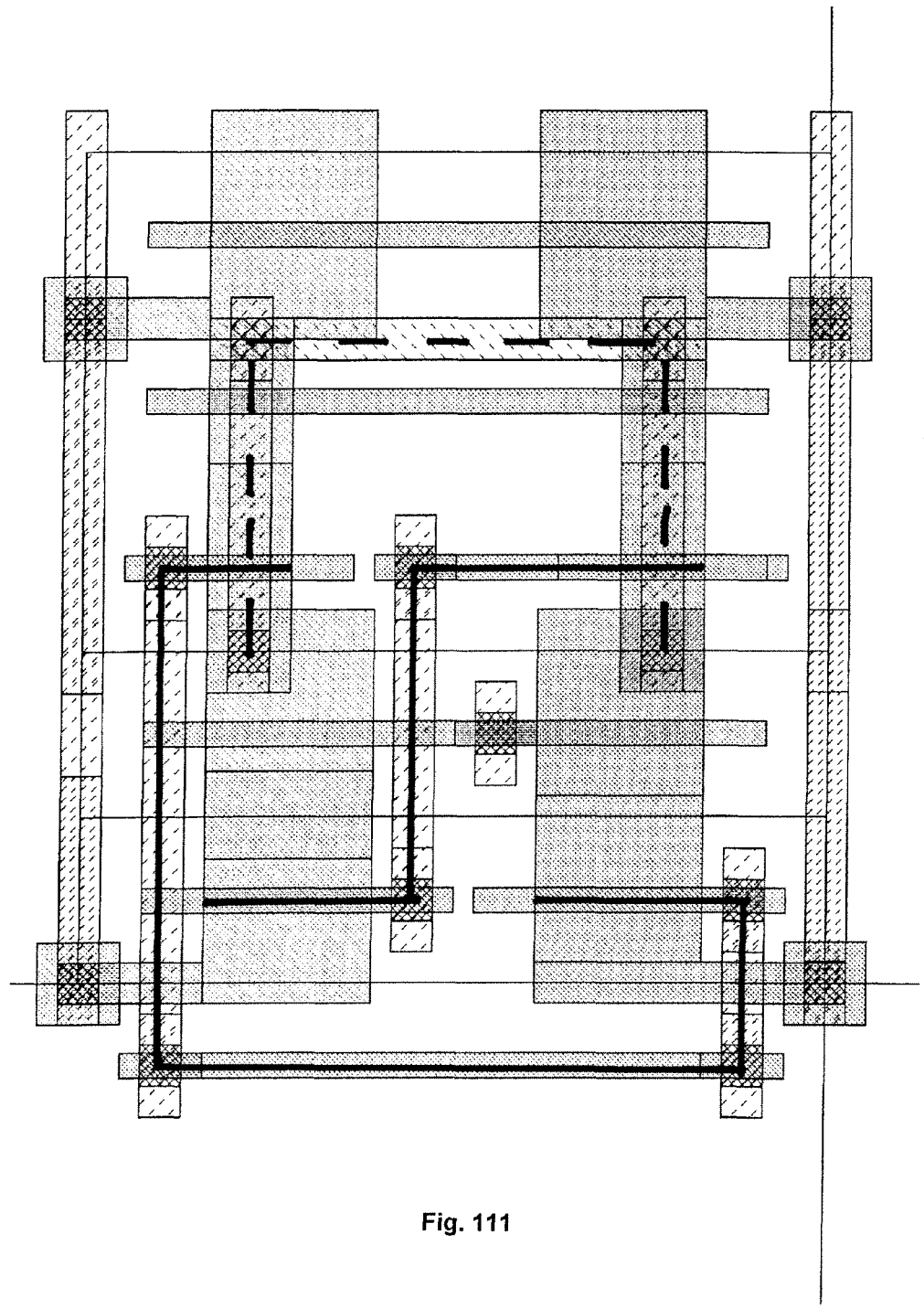
Figure 112:
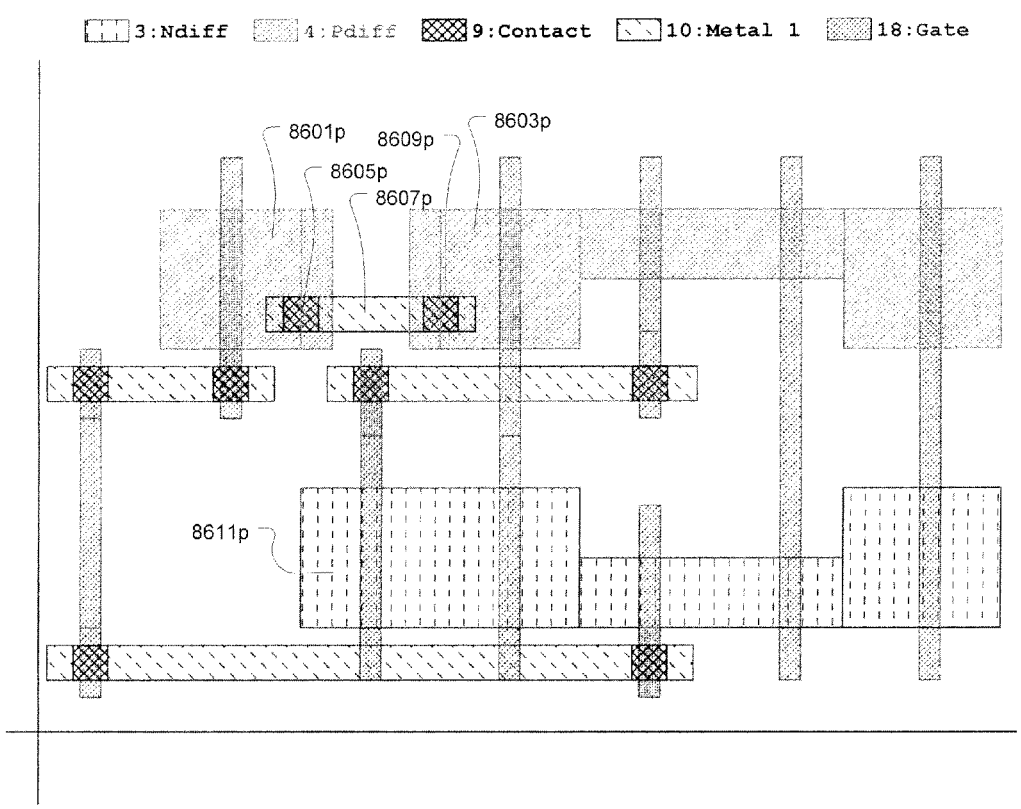
Figure 113:
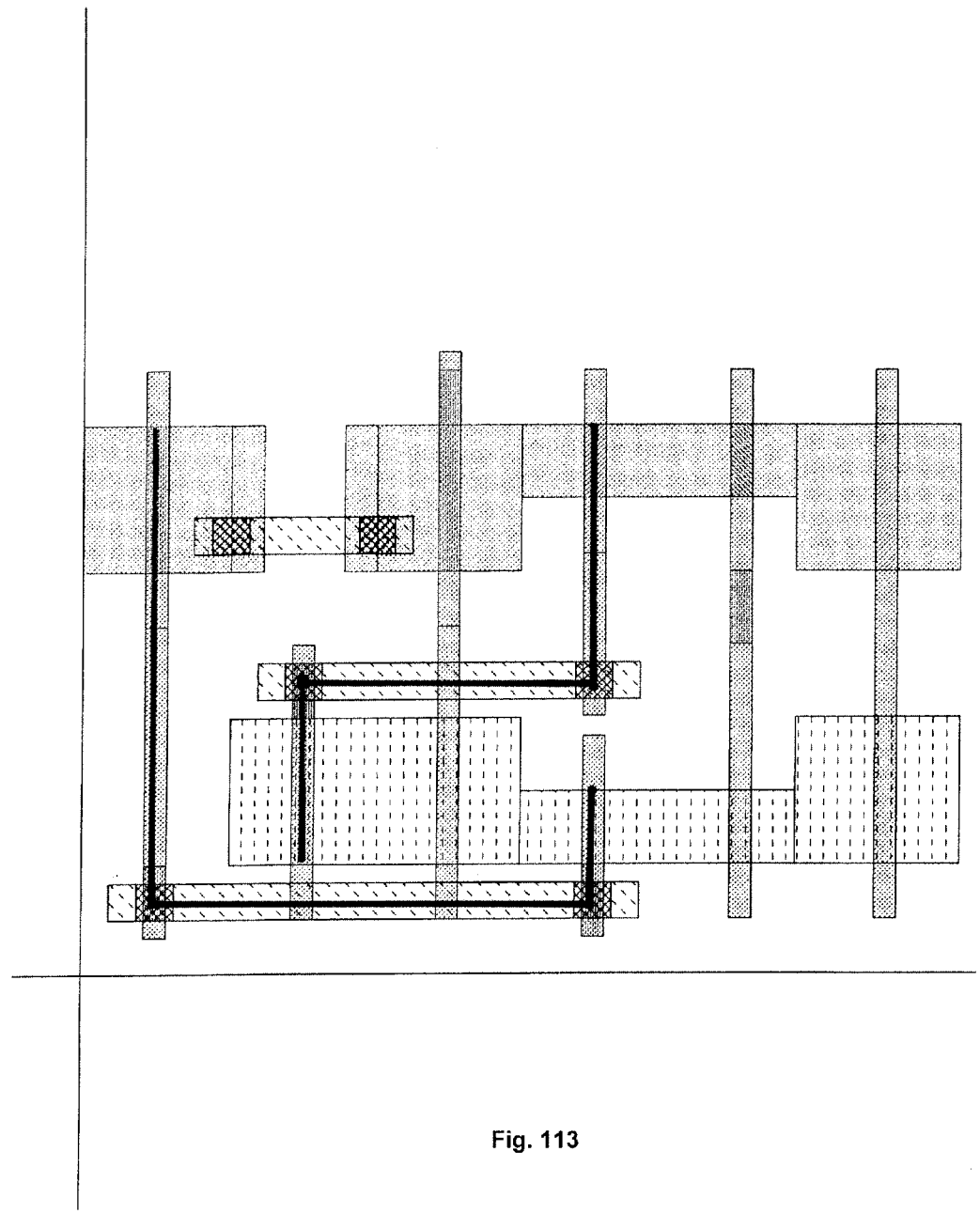
Figure 114:
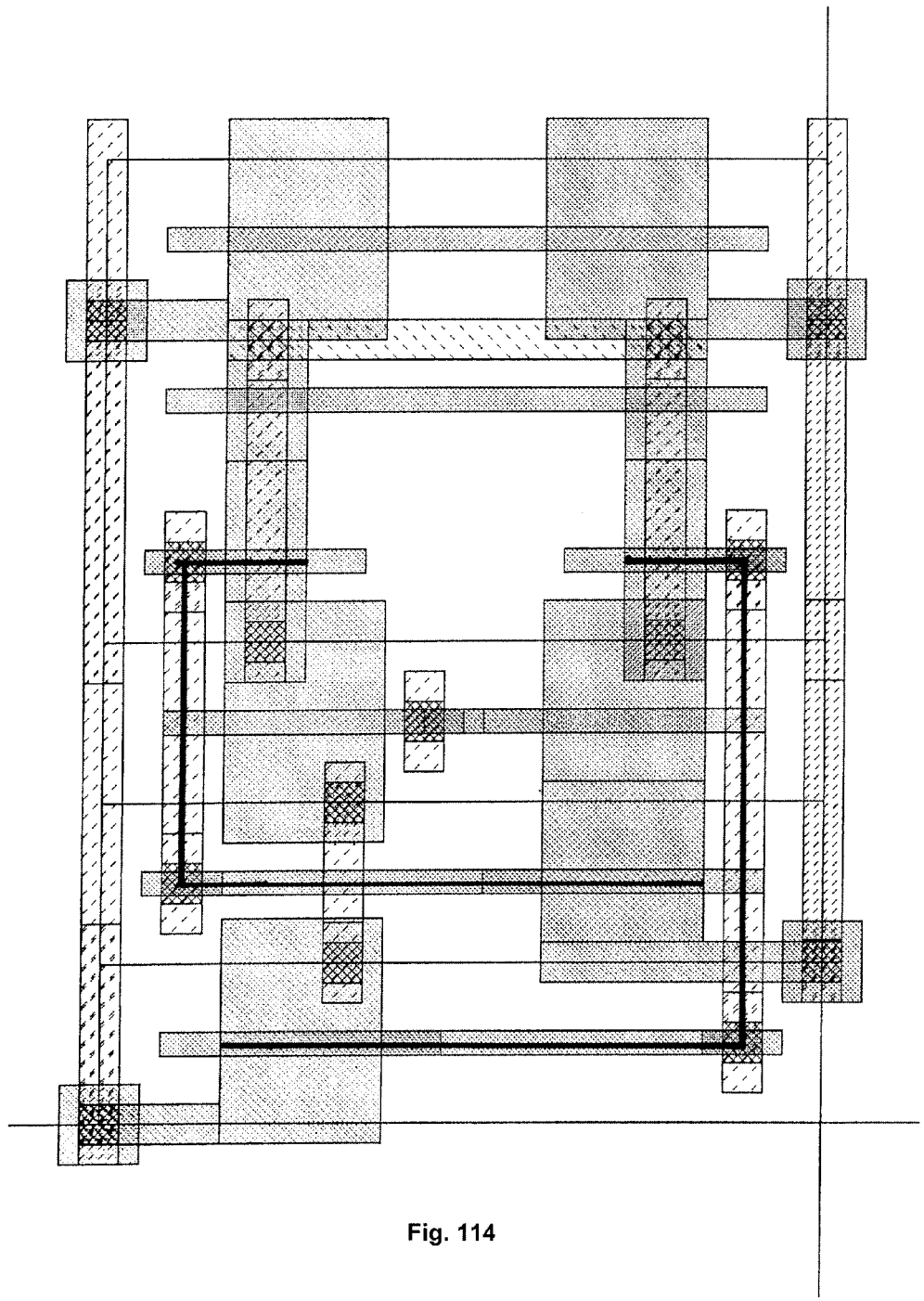
Figure 115:
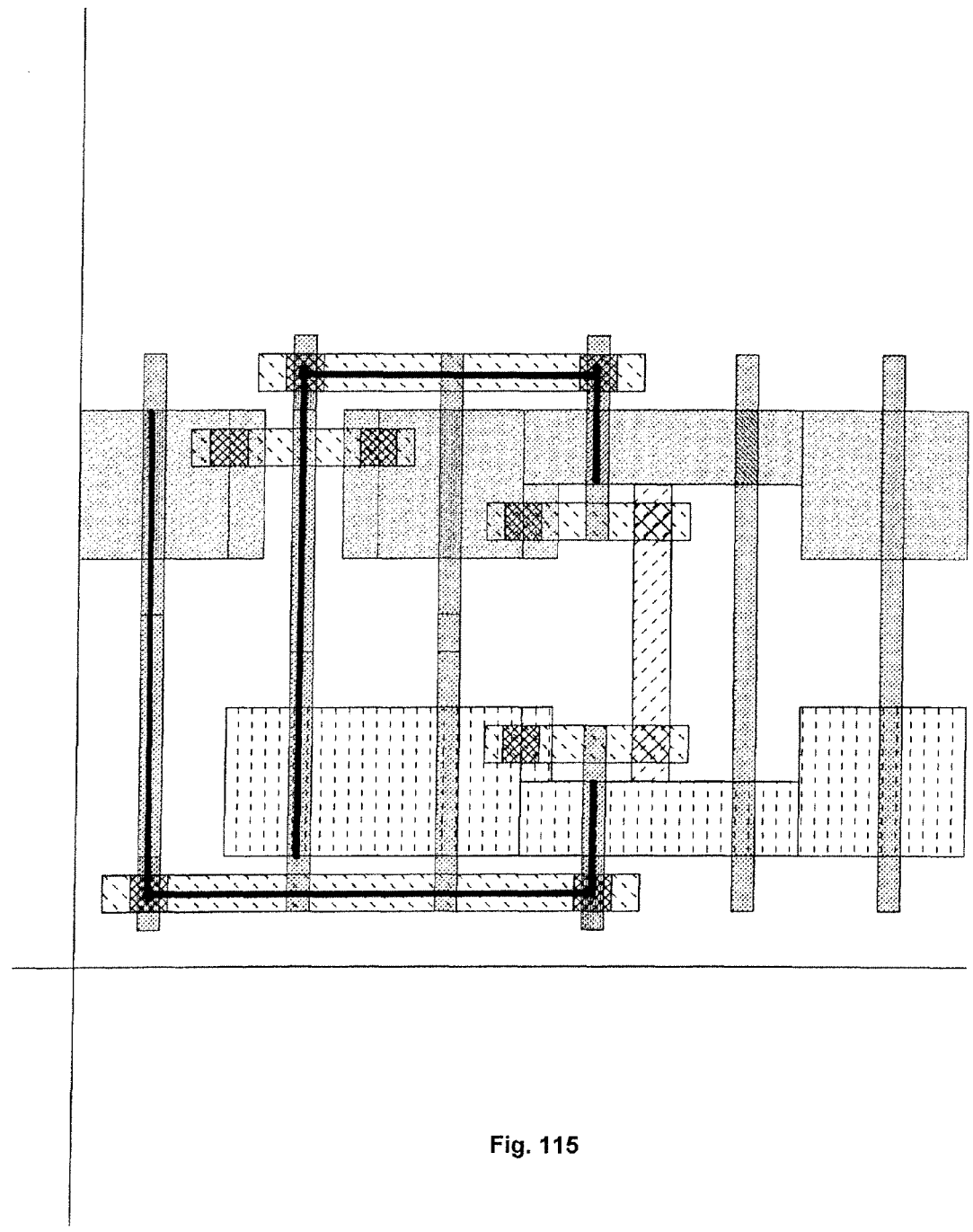
Figure 116:
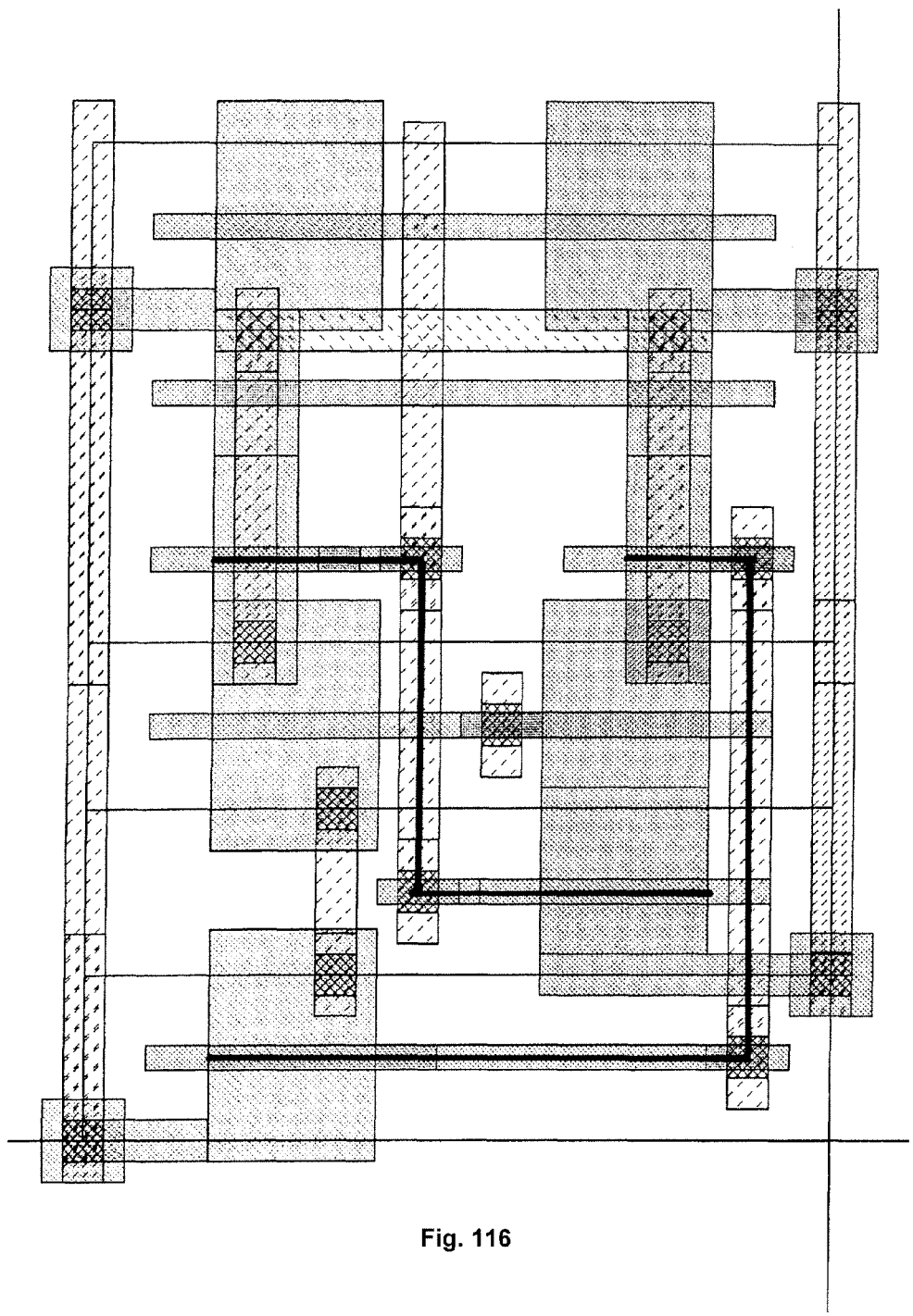
Figure 117:
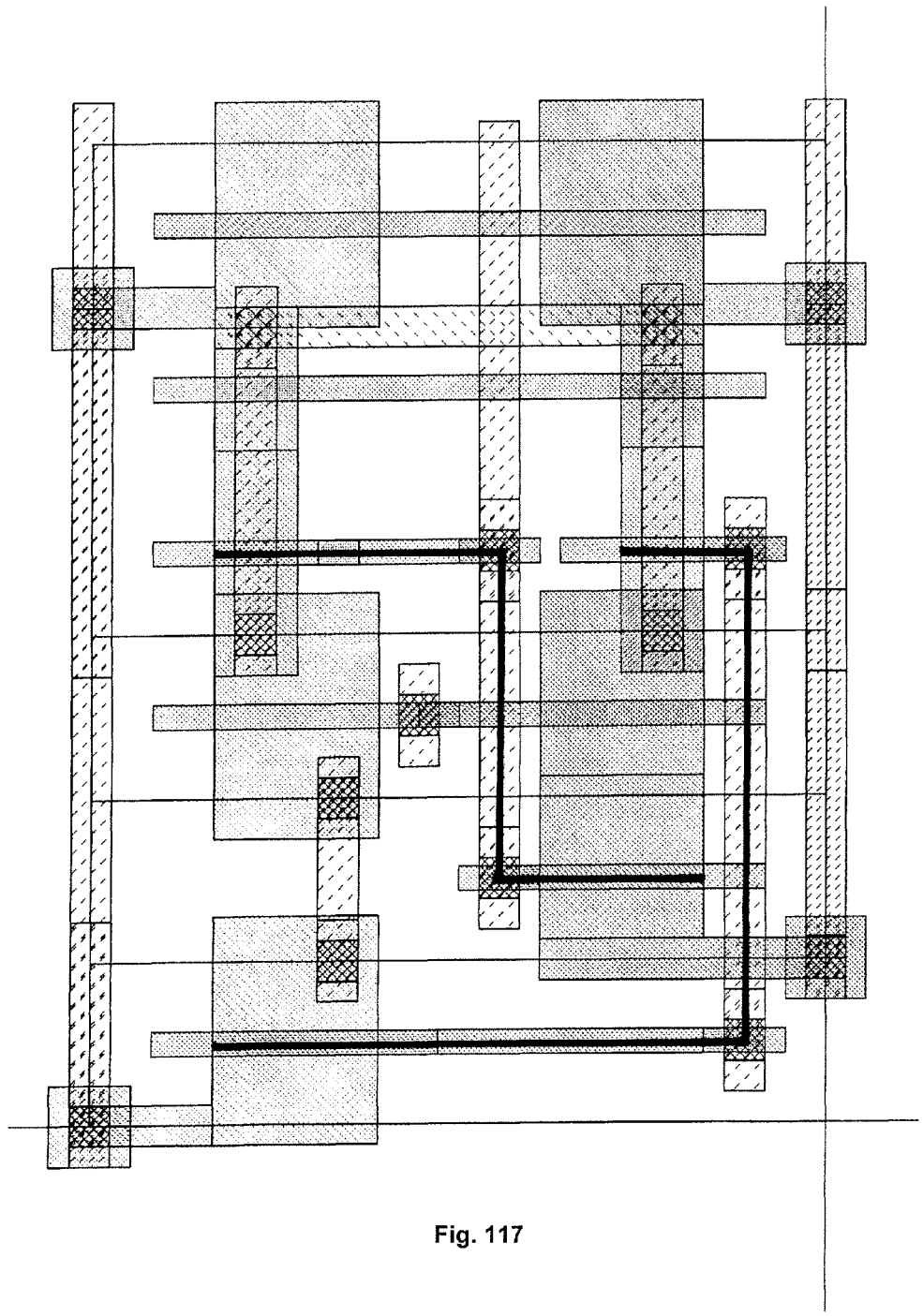
Figure 118:
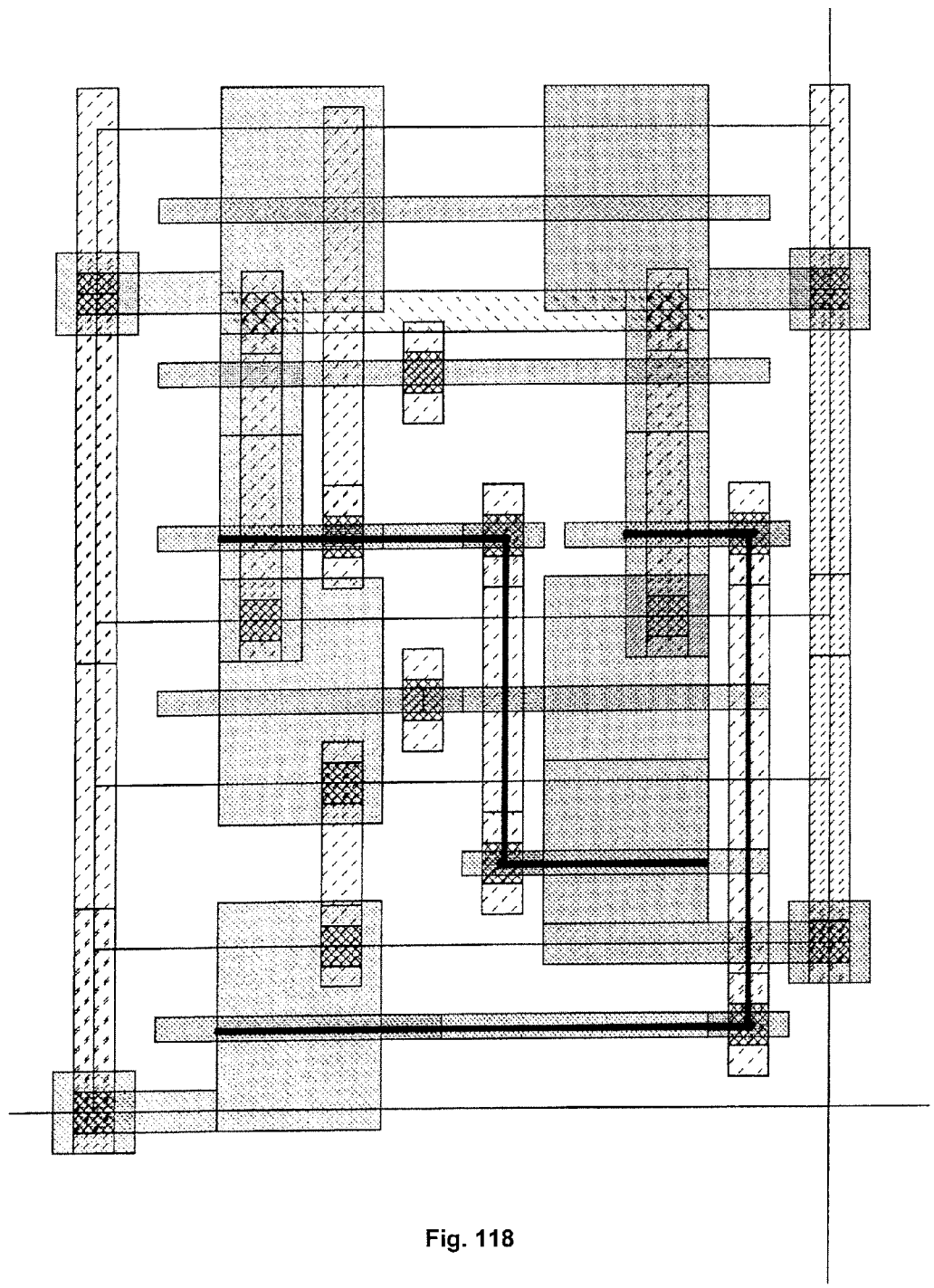
Figure 119:
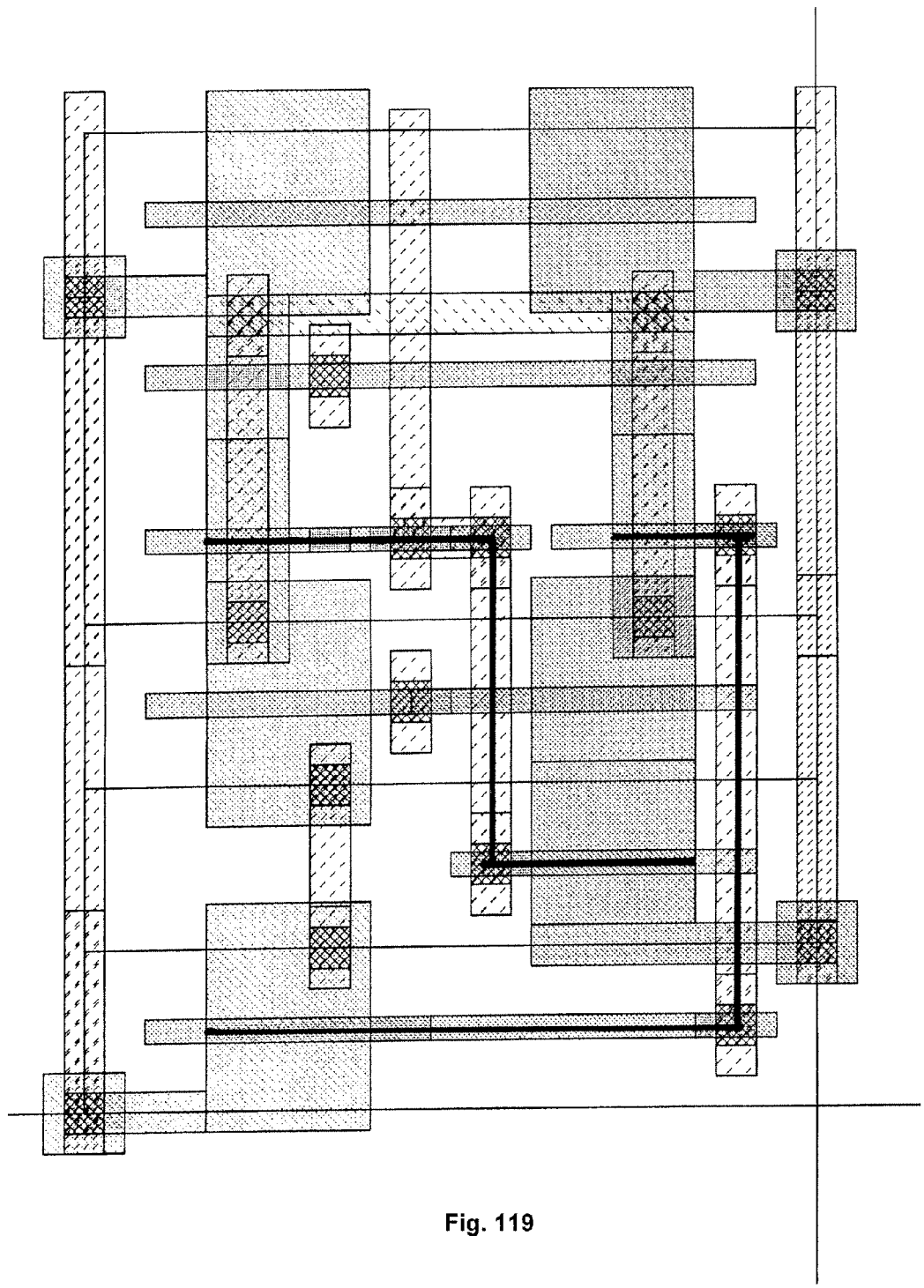
Figure 120:
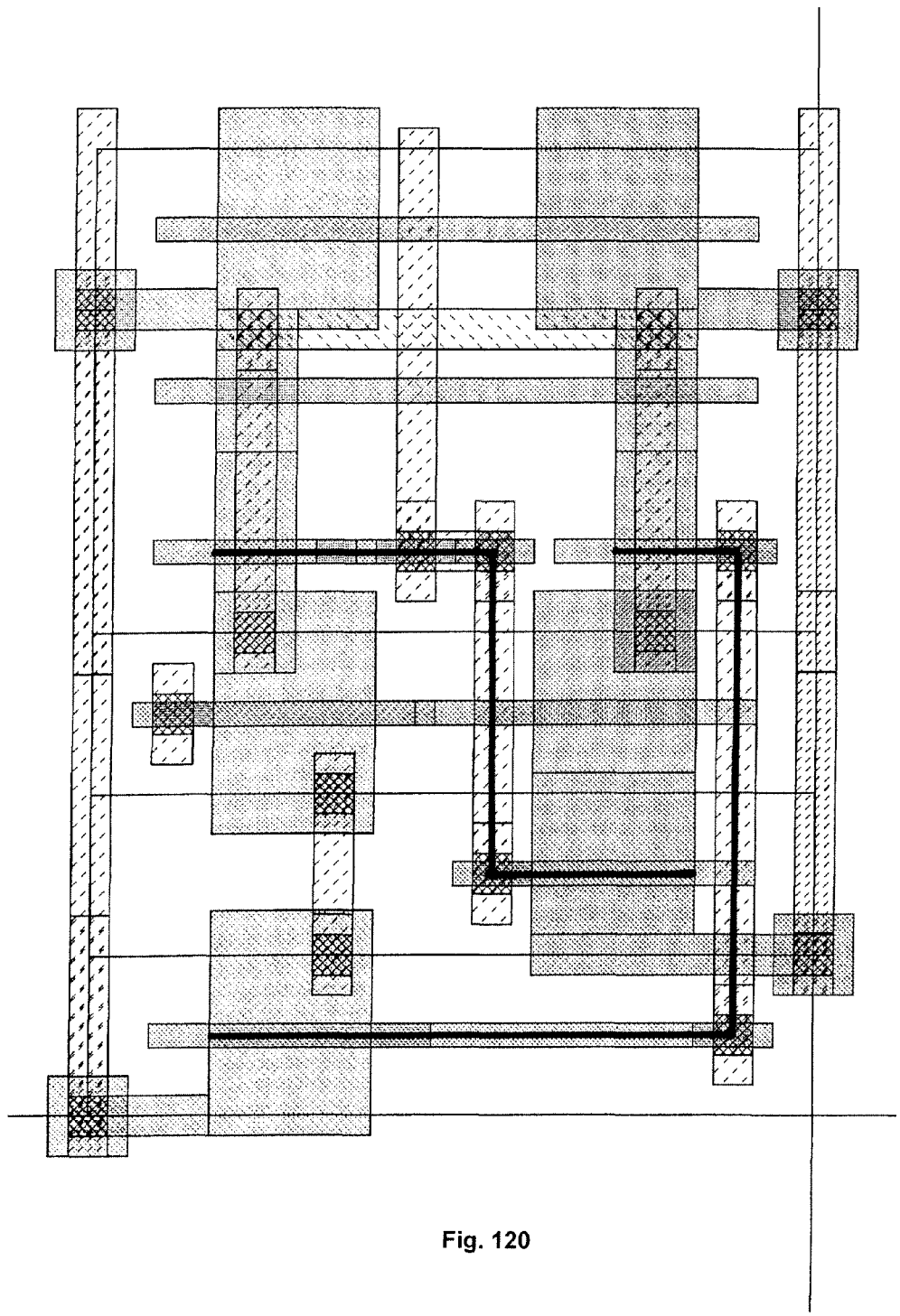
Figure 121:
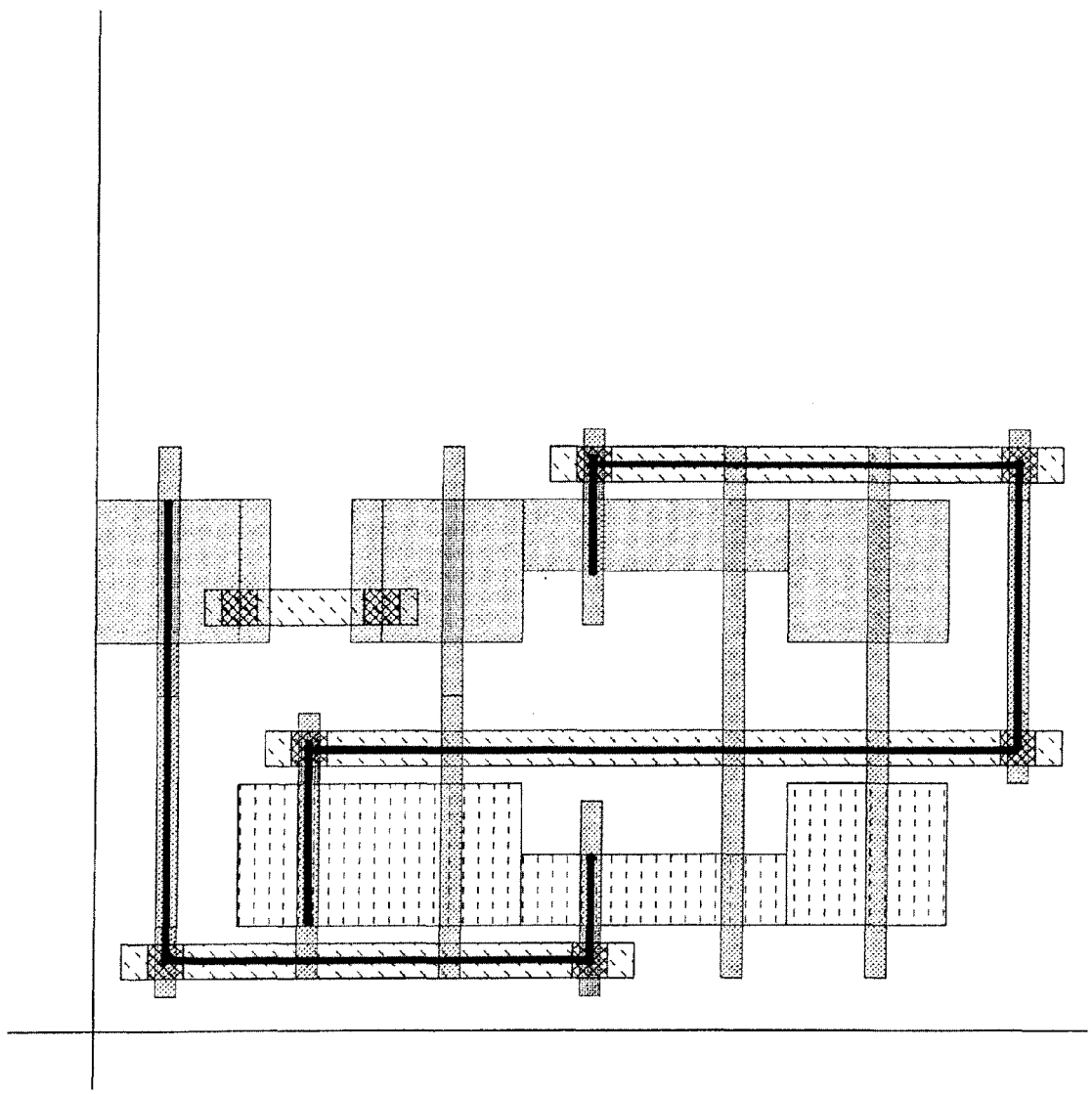
Figure 122:
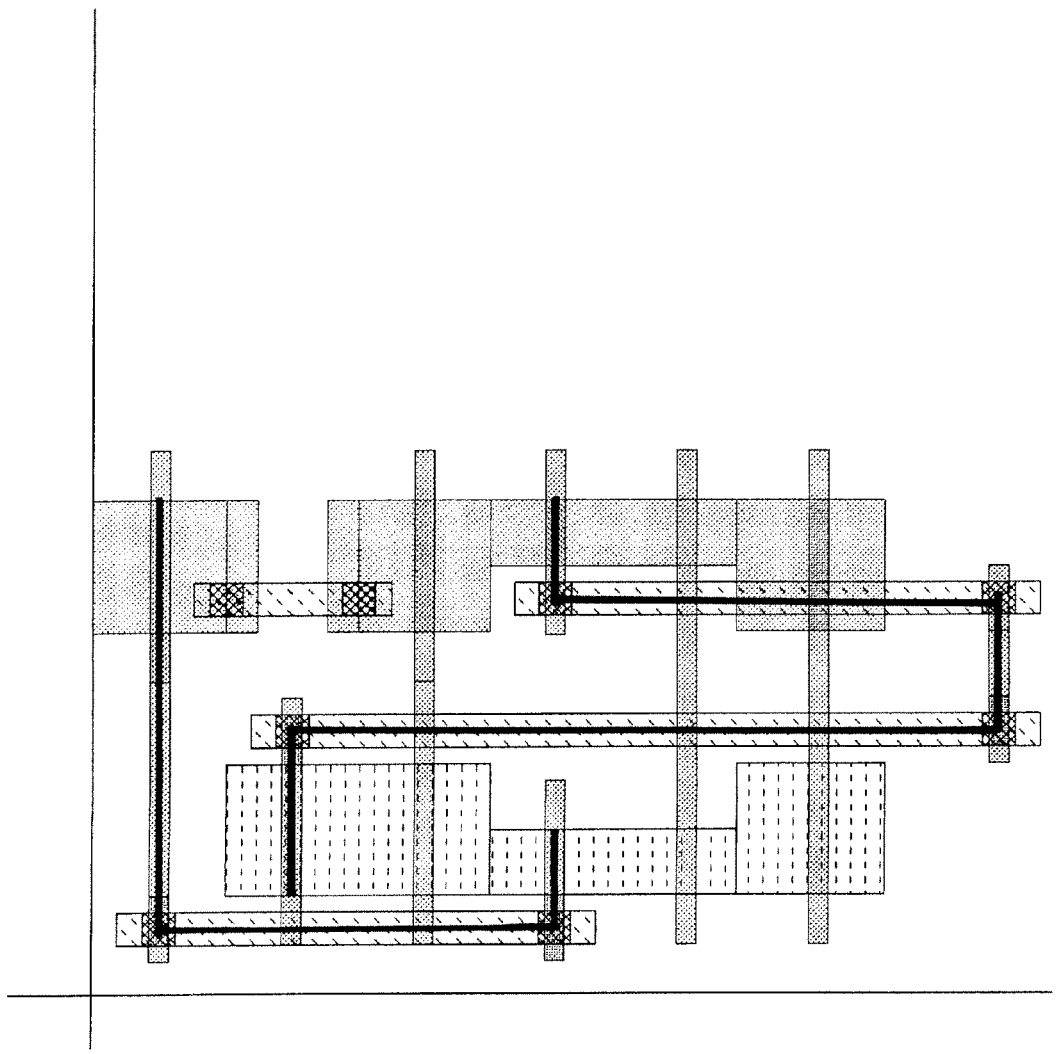
Figure 123:
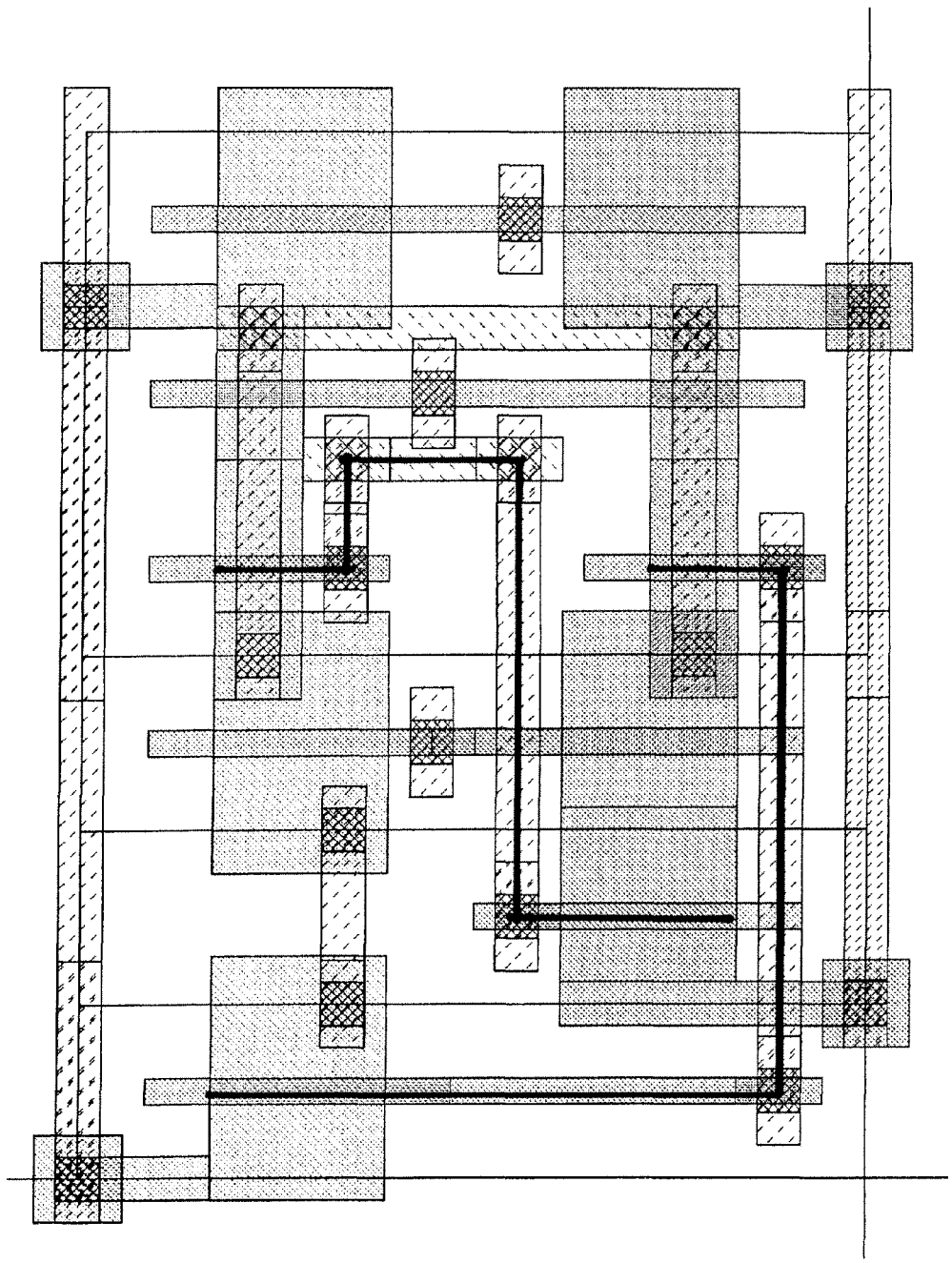
Figure 124:
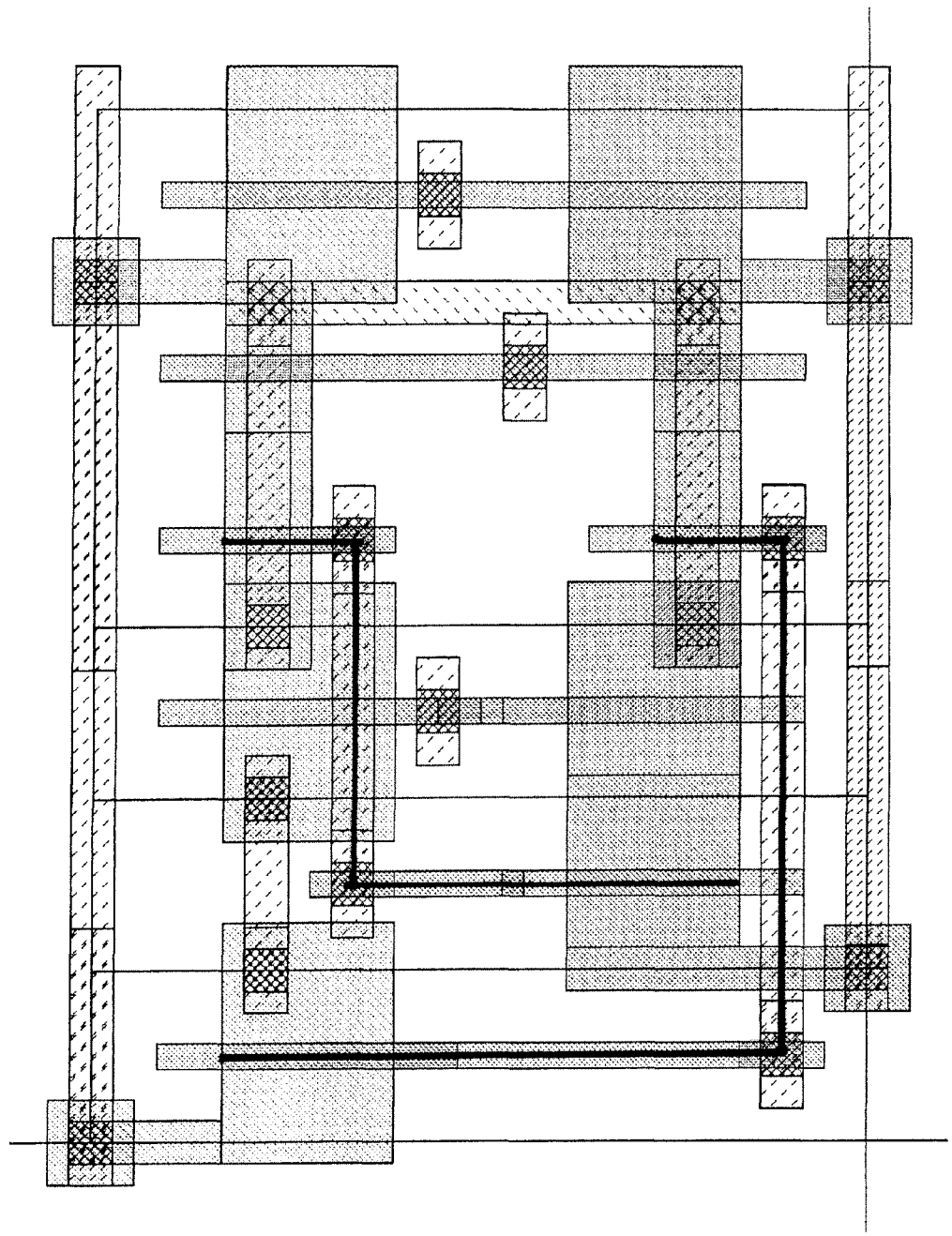
Figure 125:
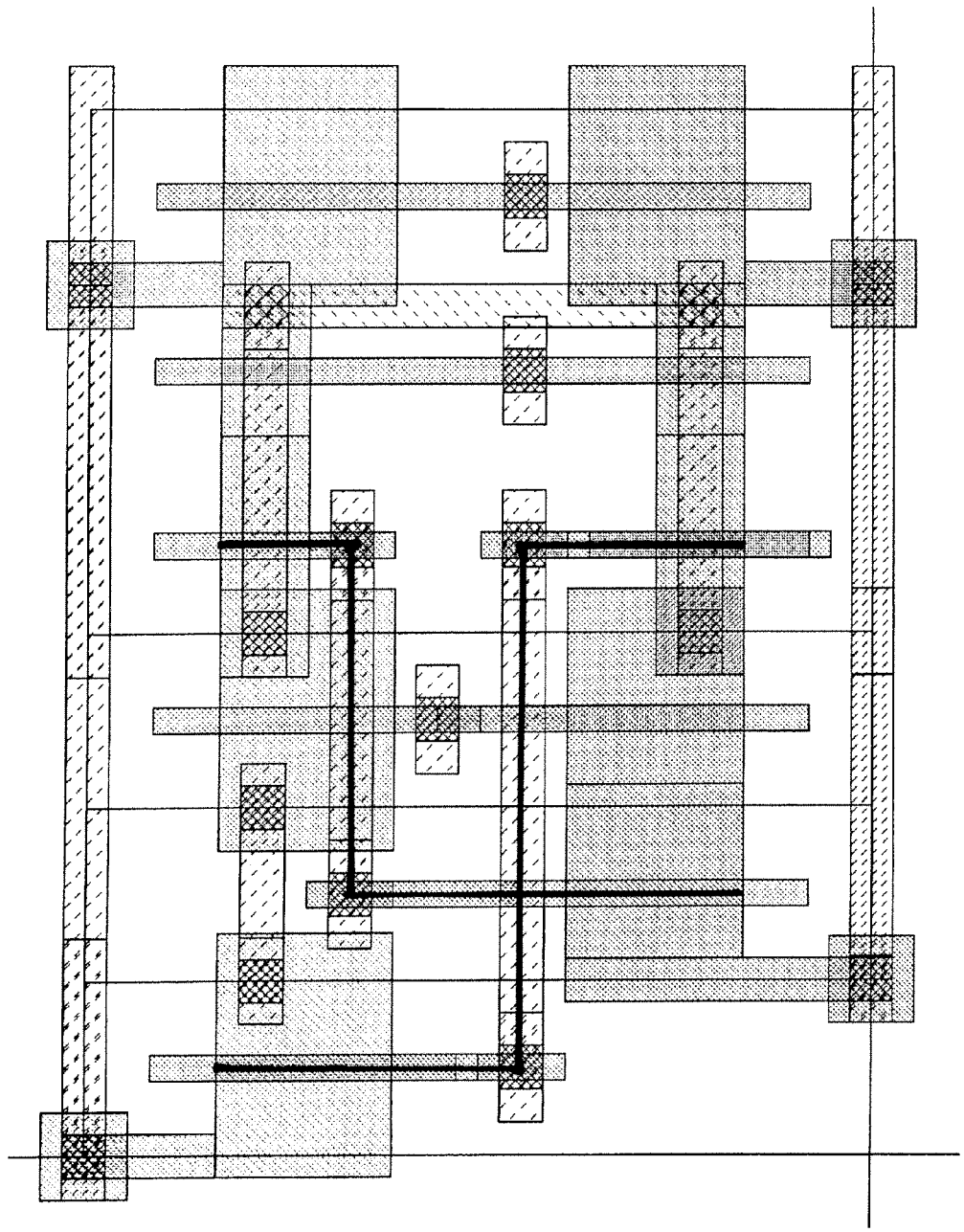
Figure 126:
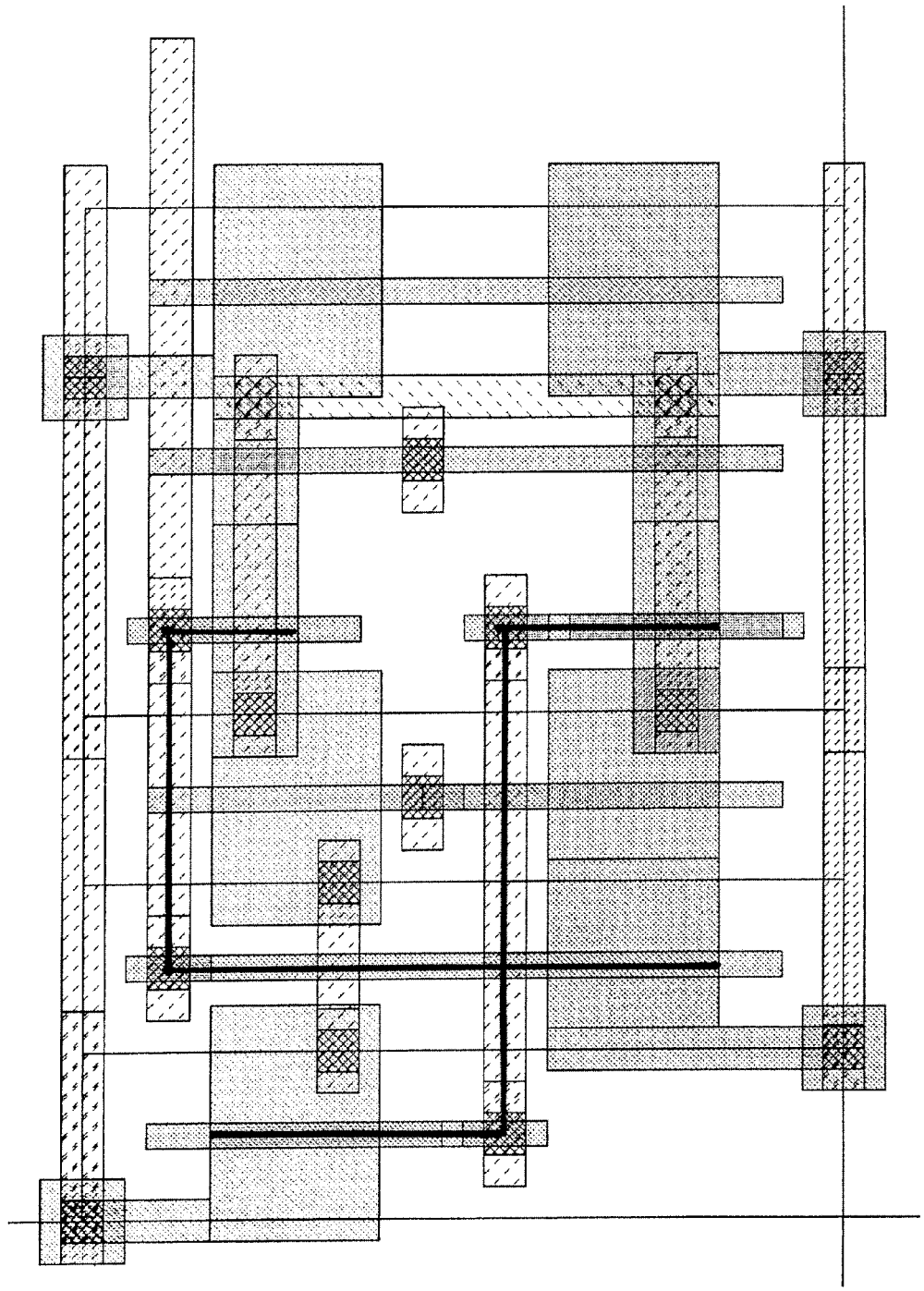
Figure 127:
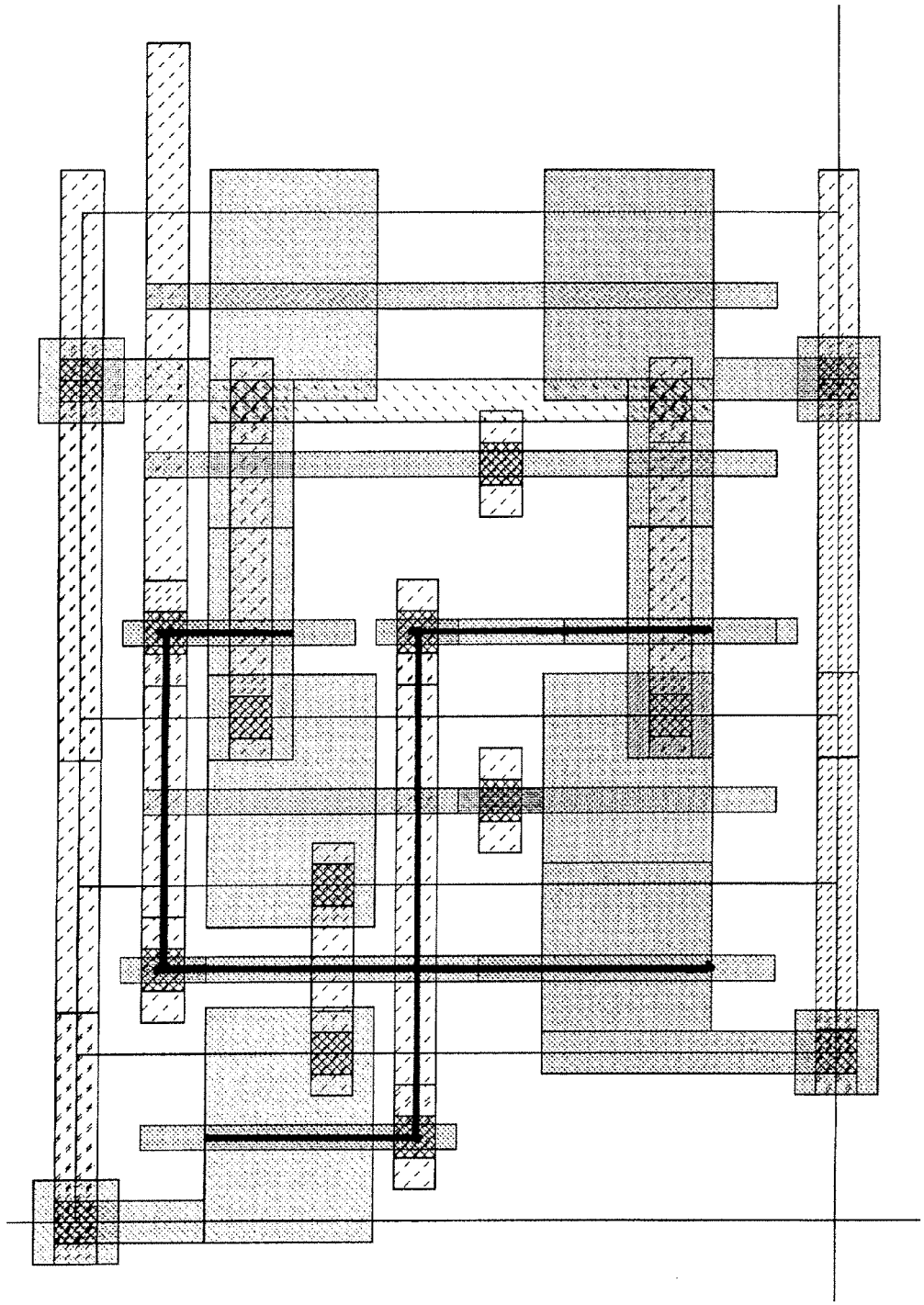
Figure 128:
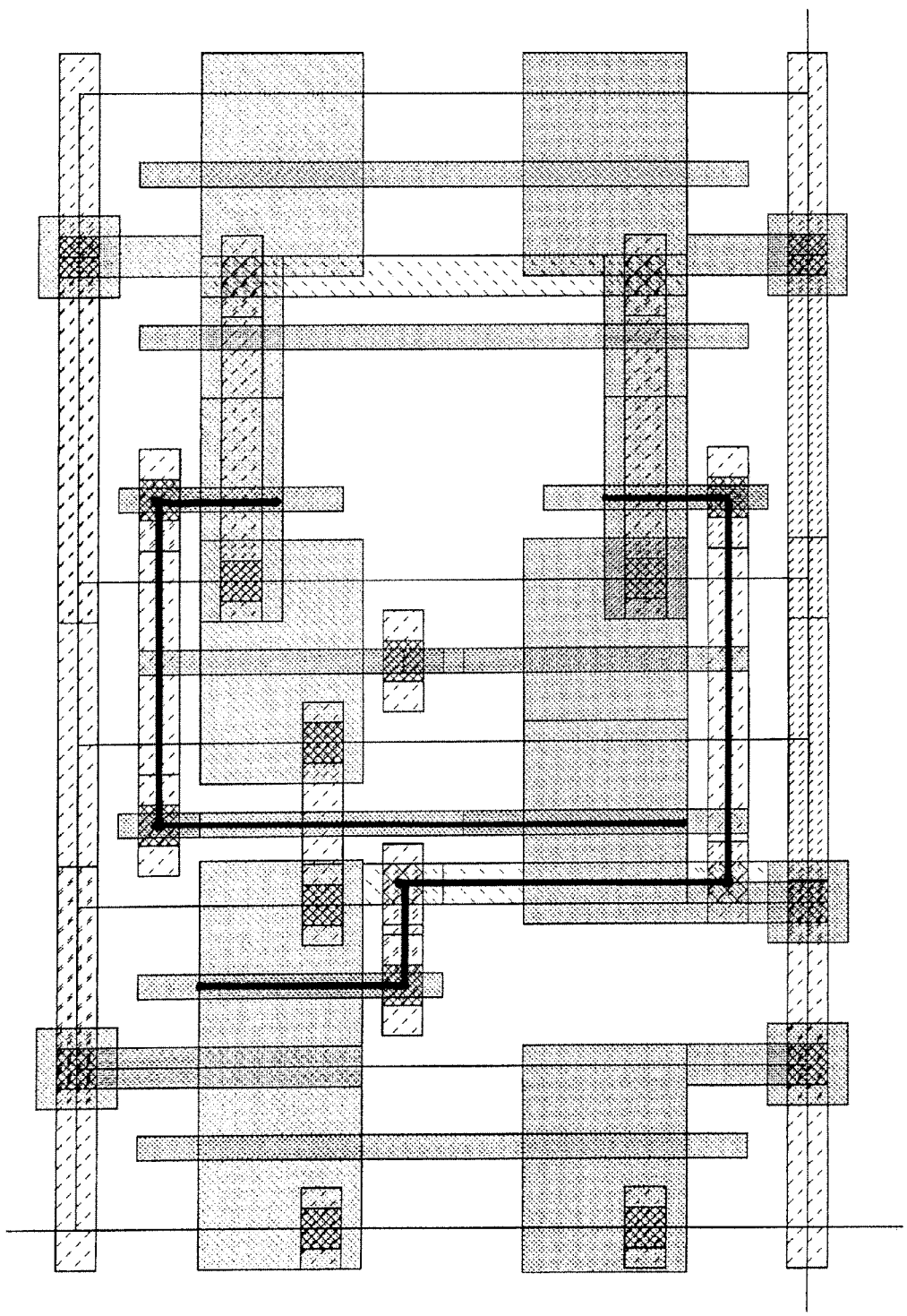
Figure 129:
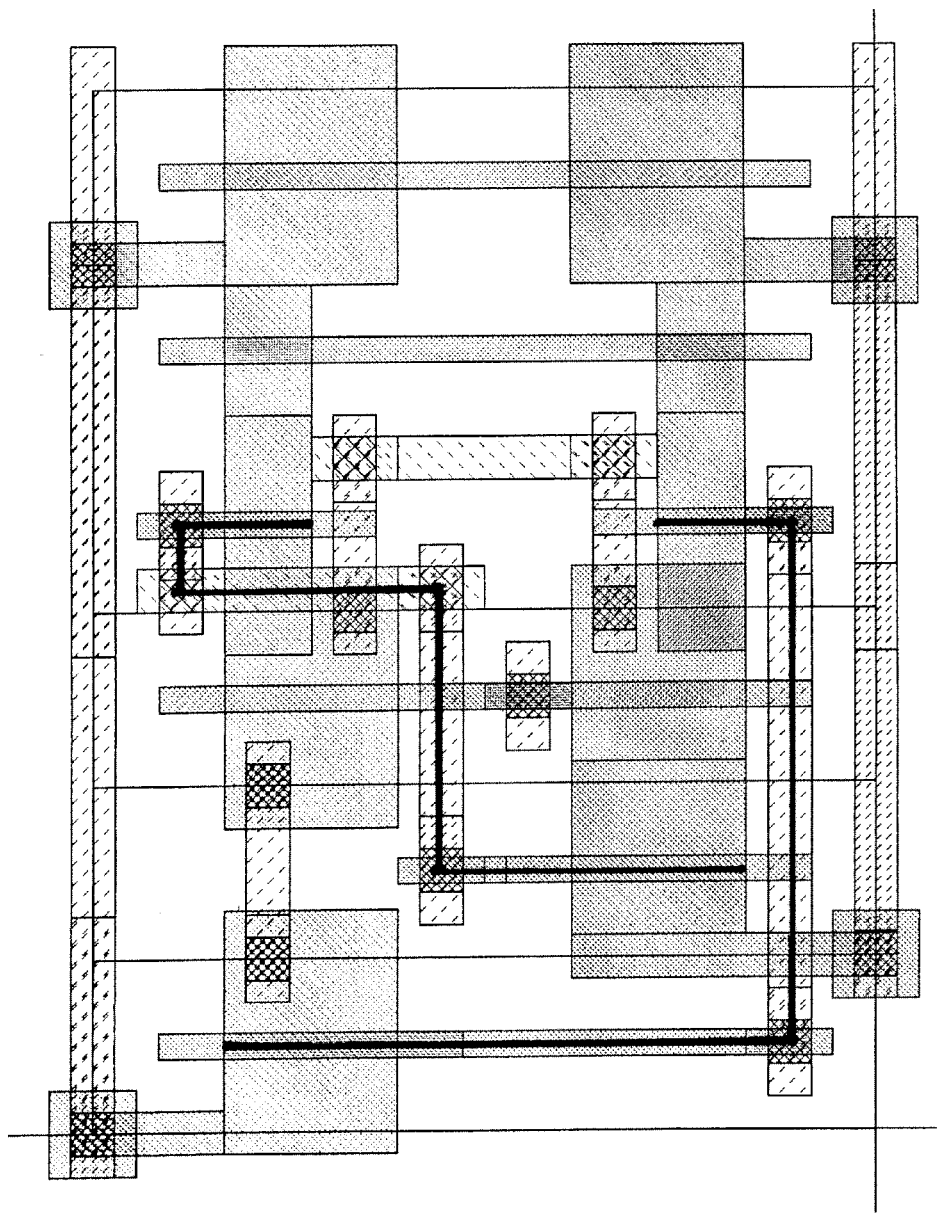
Figure 130:
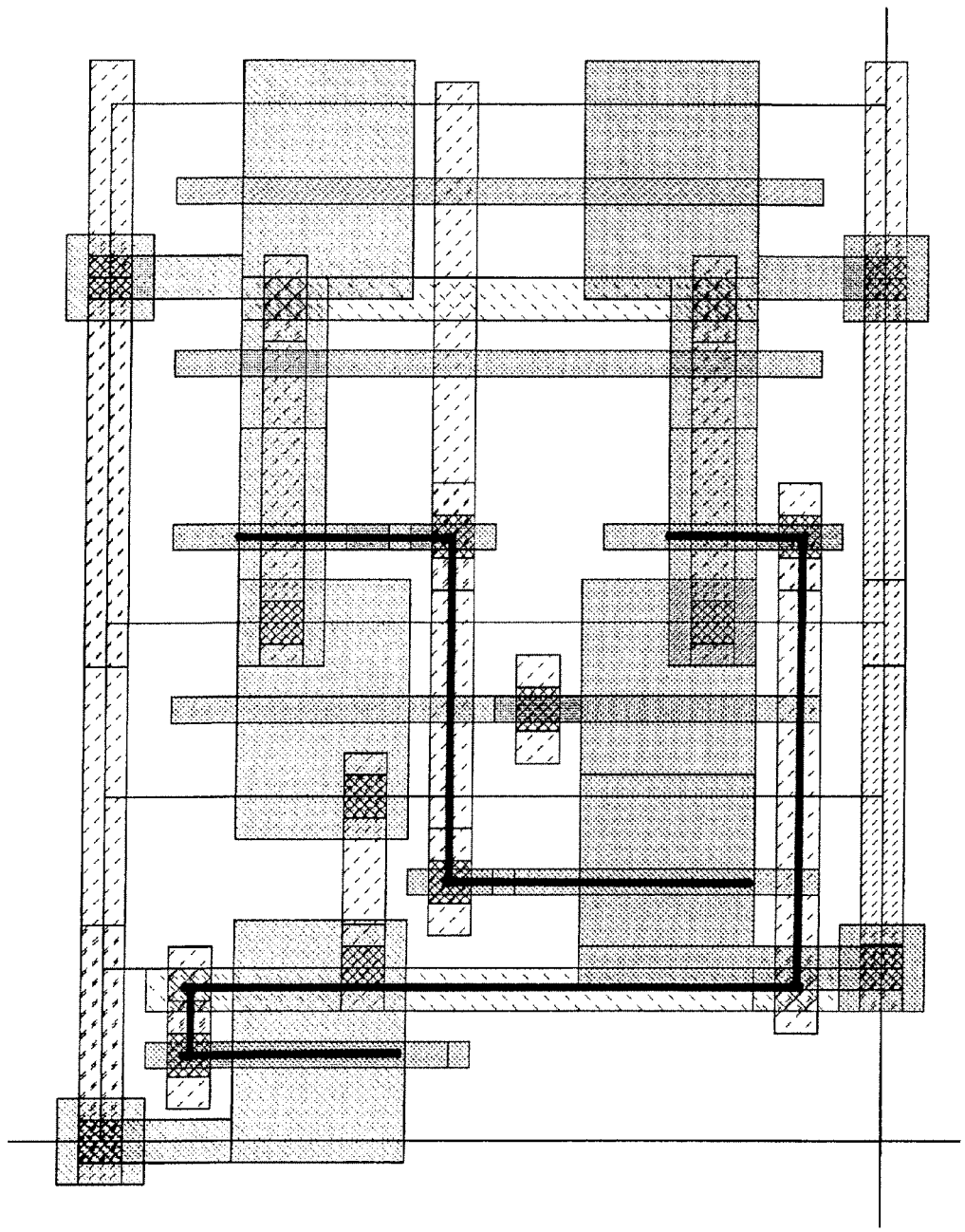
Figure 131:
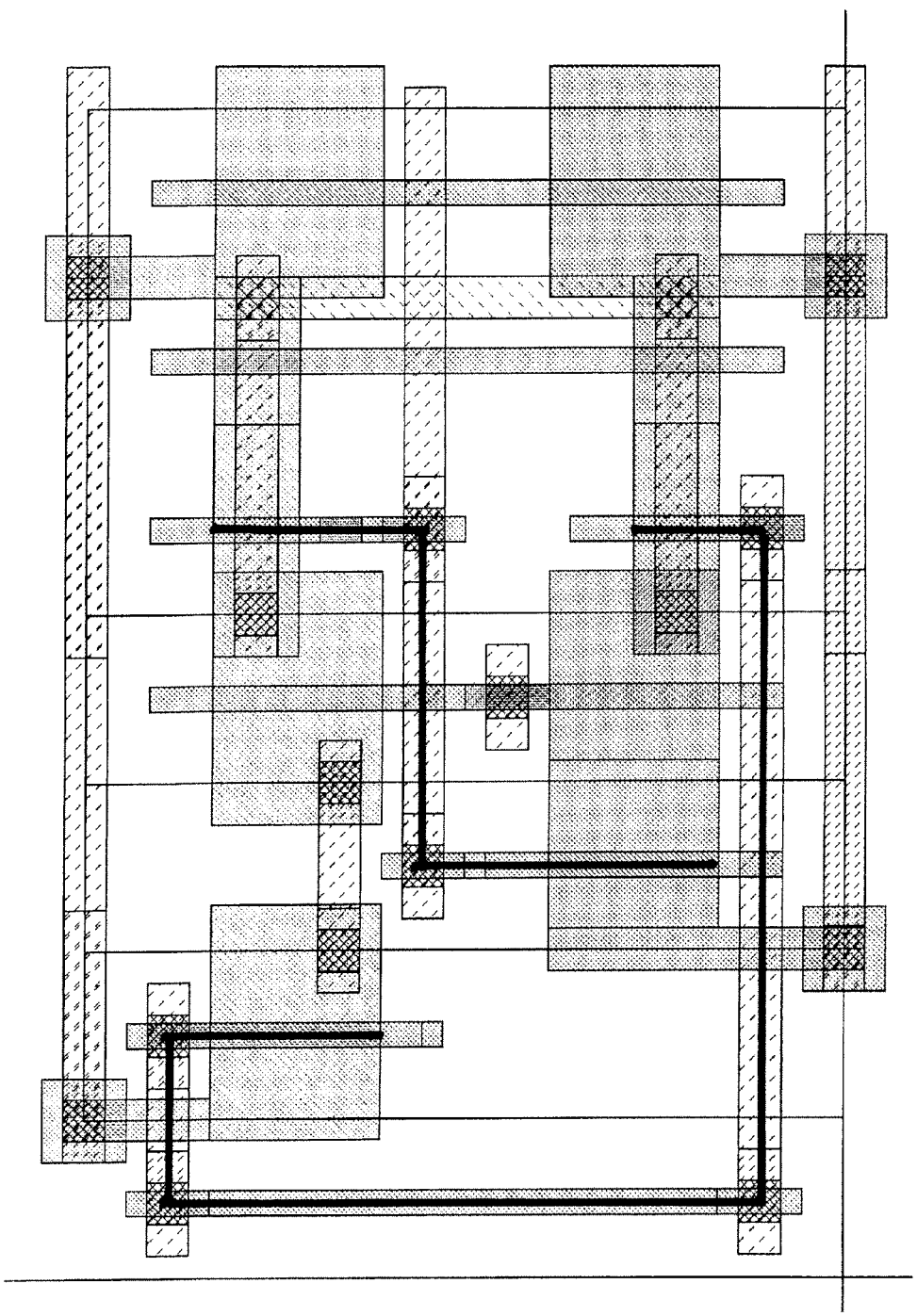
Figure 132:
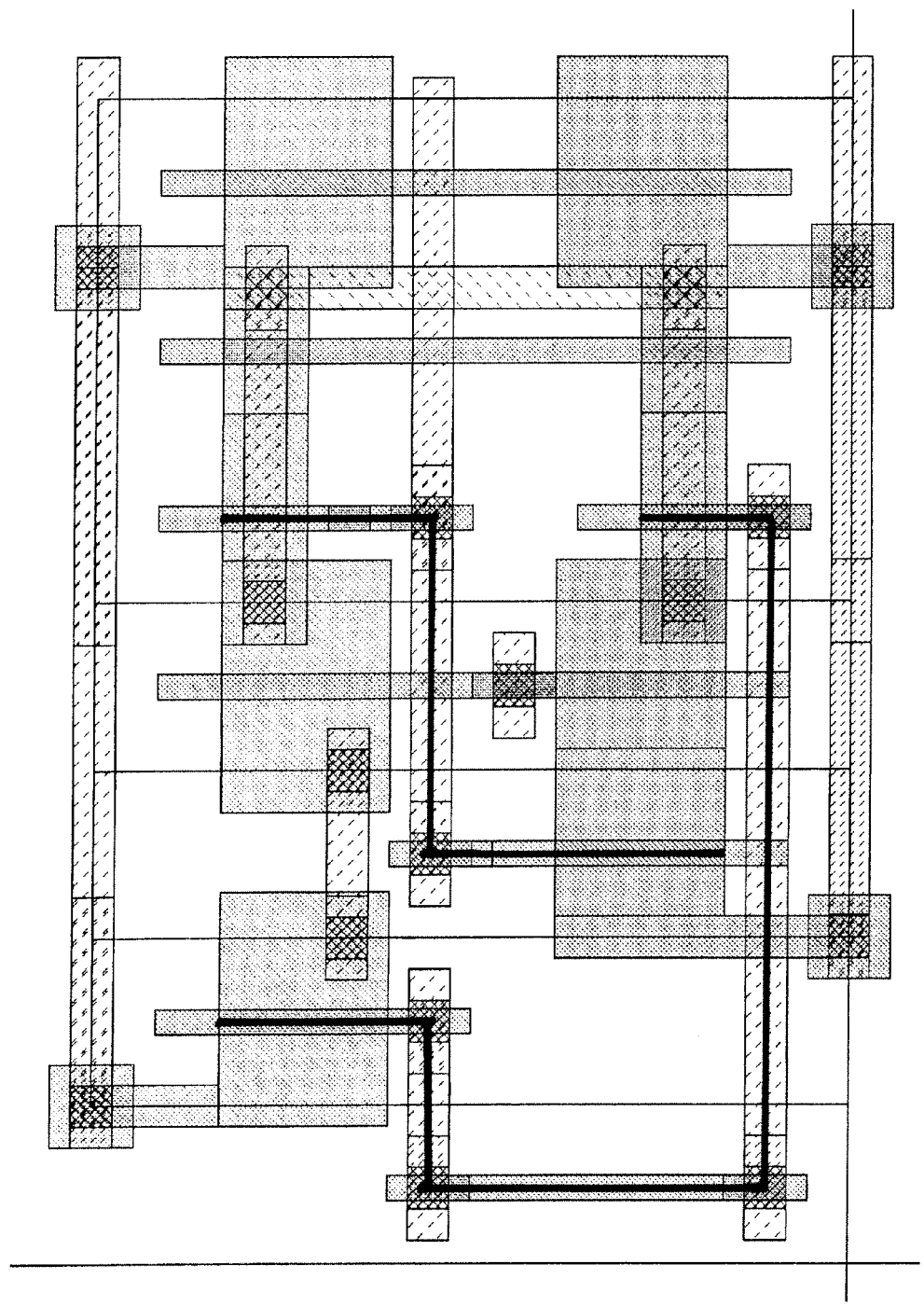
Figure 133:
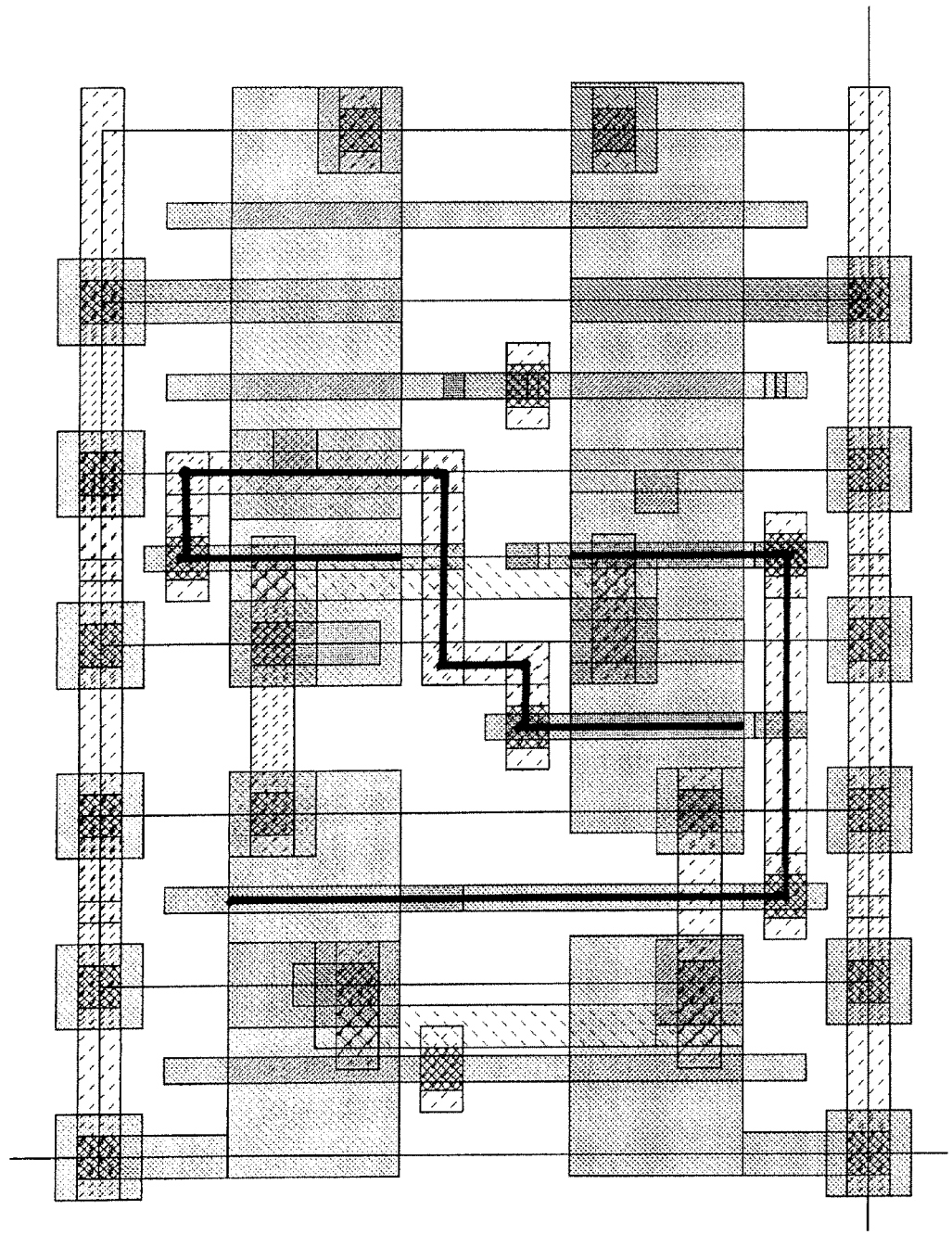
Figure 134:
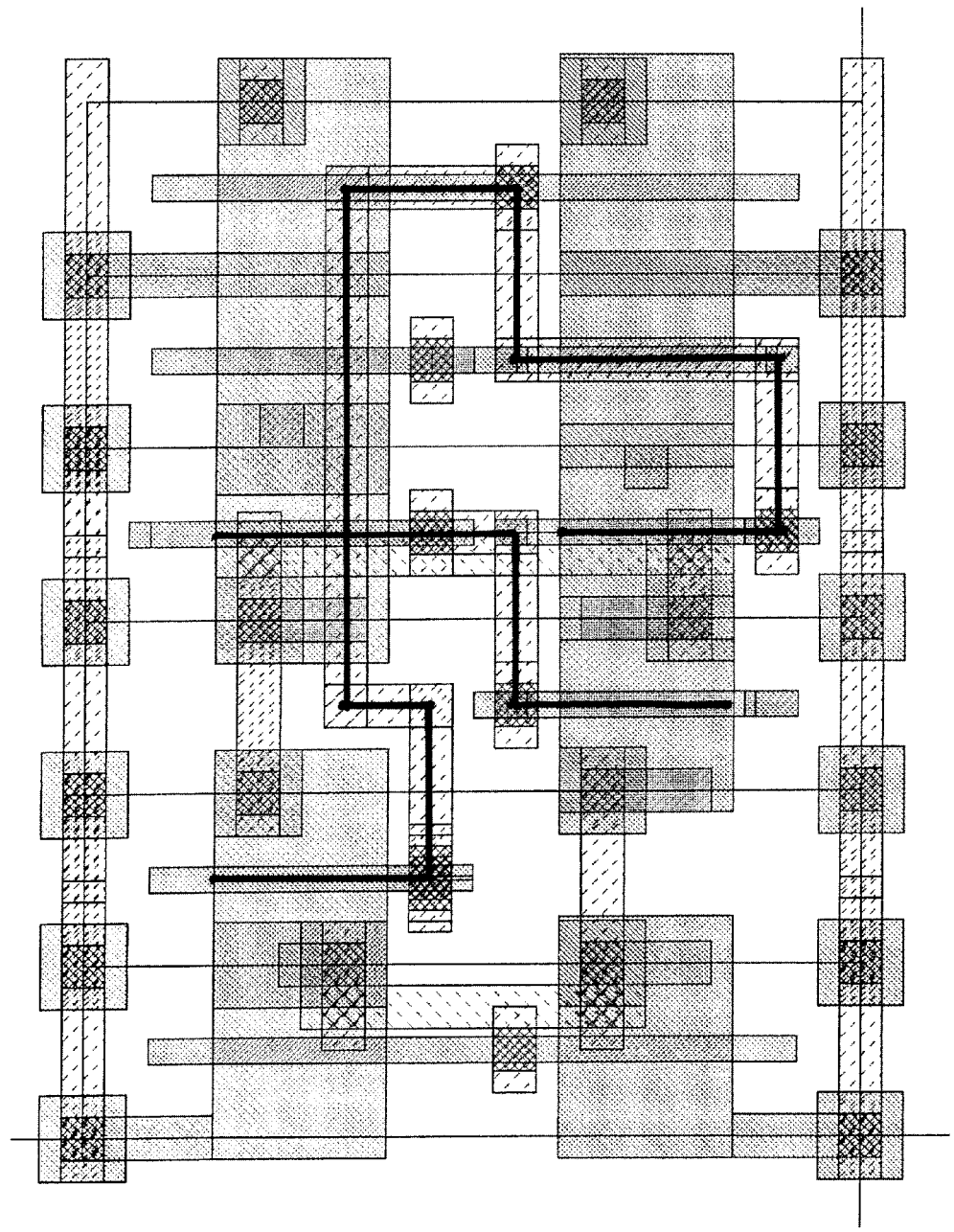
Figure 135:
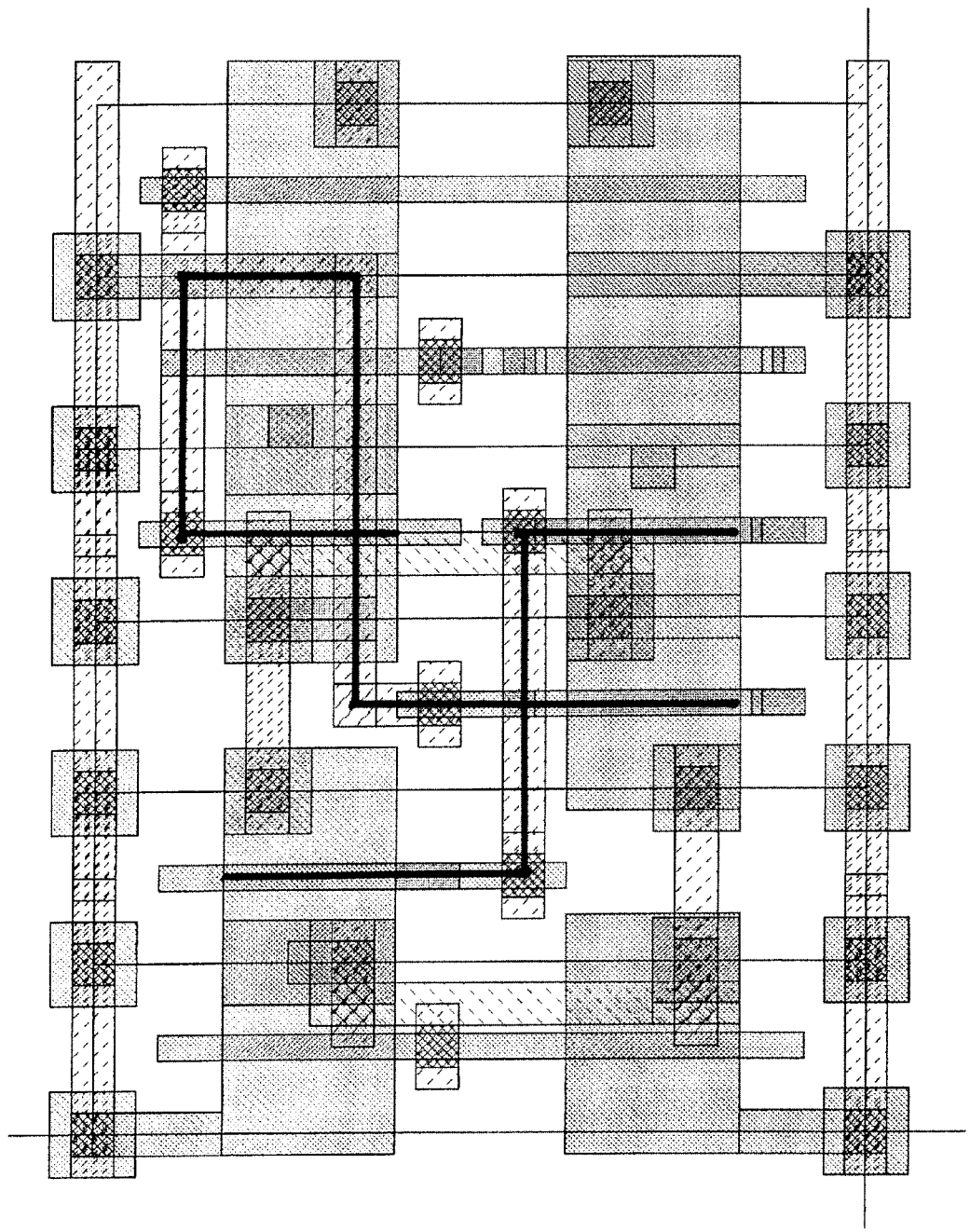
Figure 136:
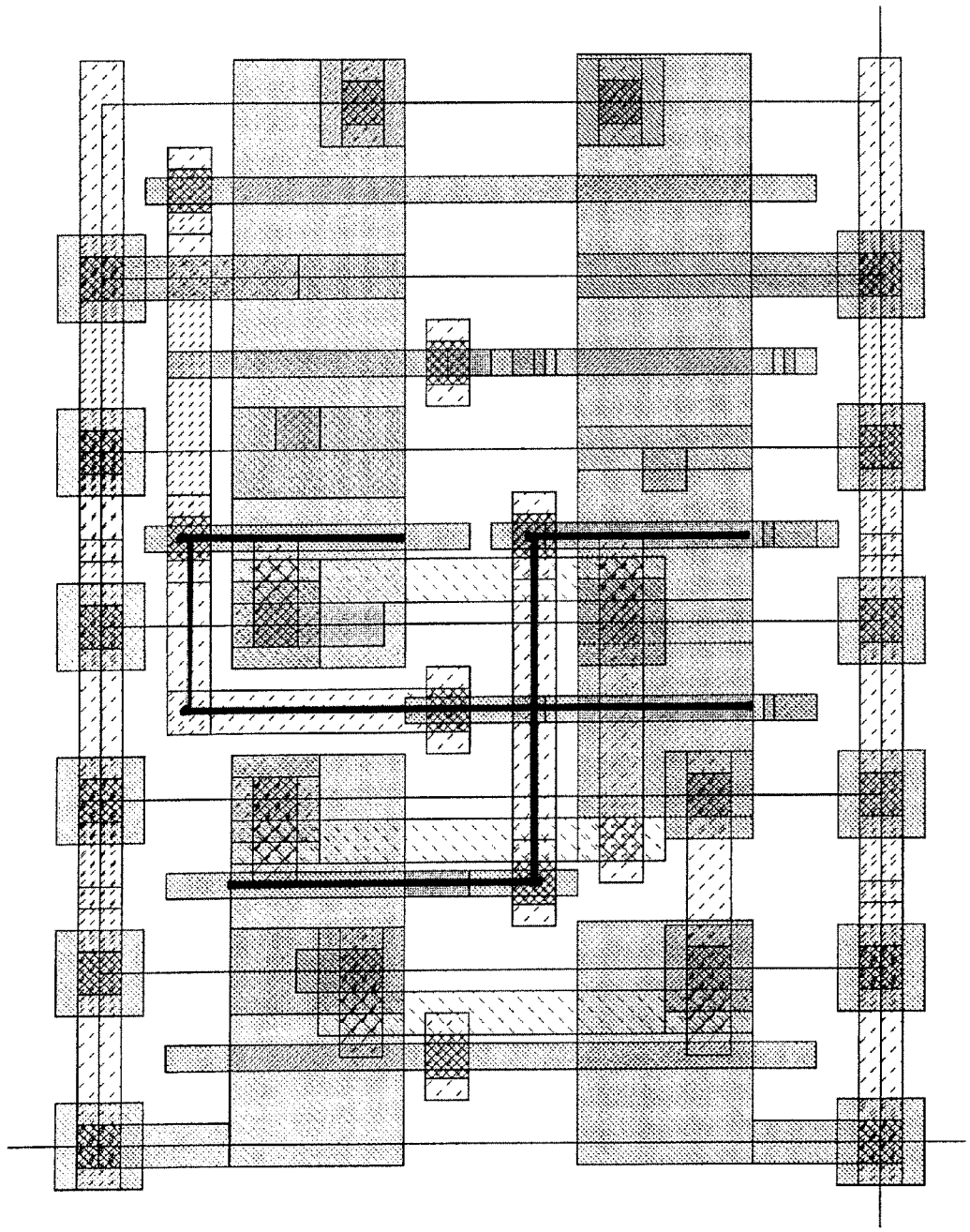
Figure 137:
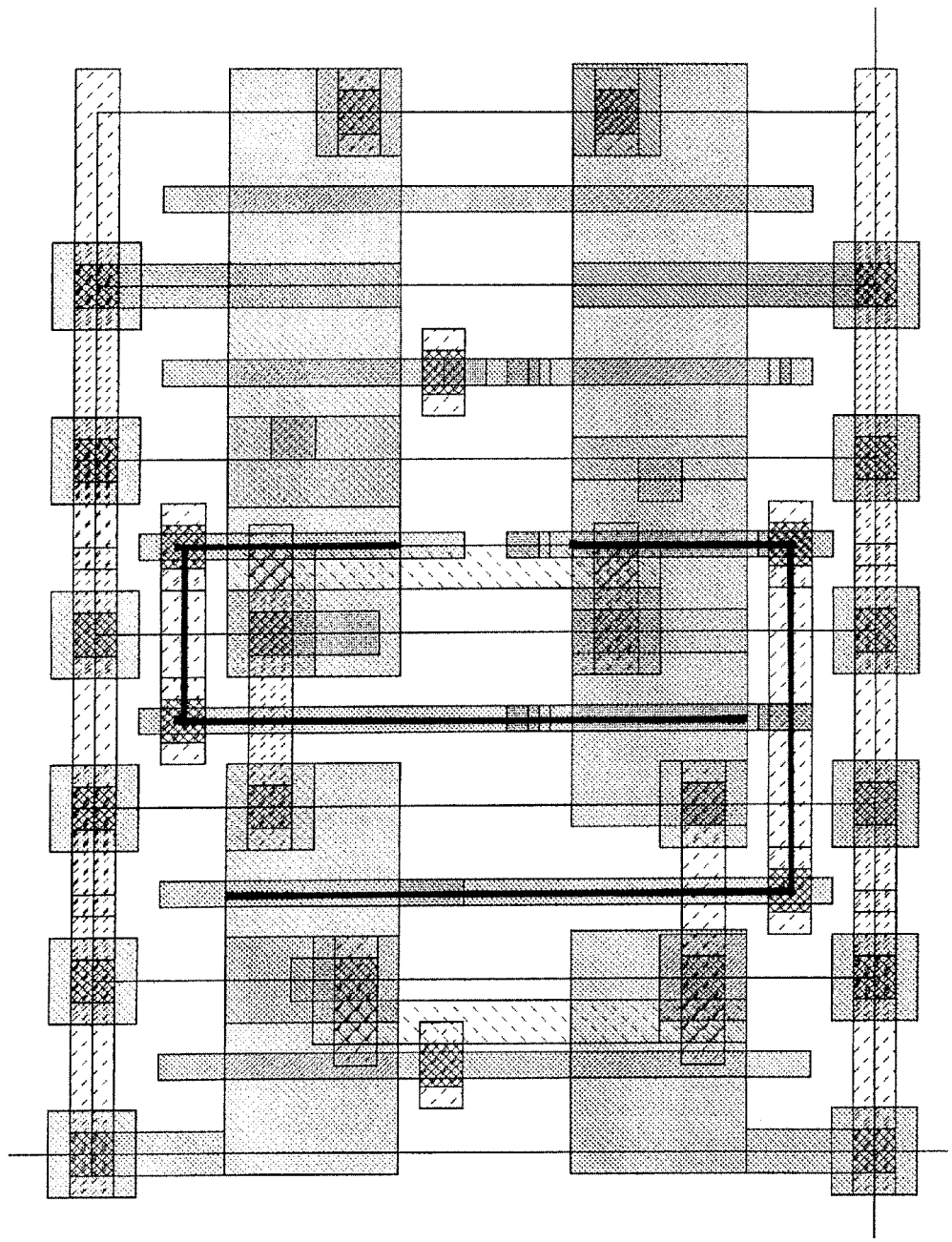
Figure 138:
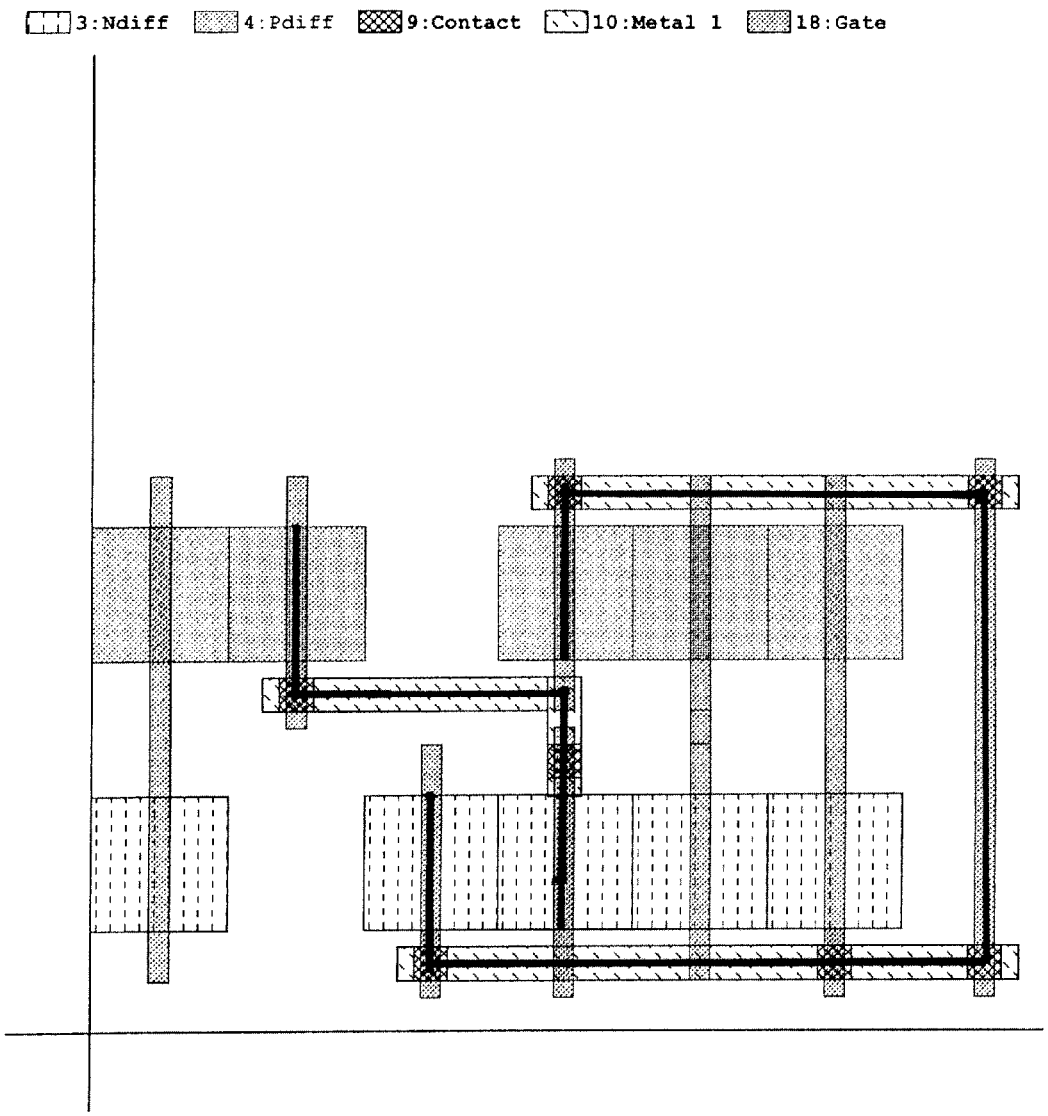
Figure 139:
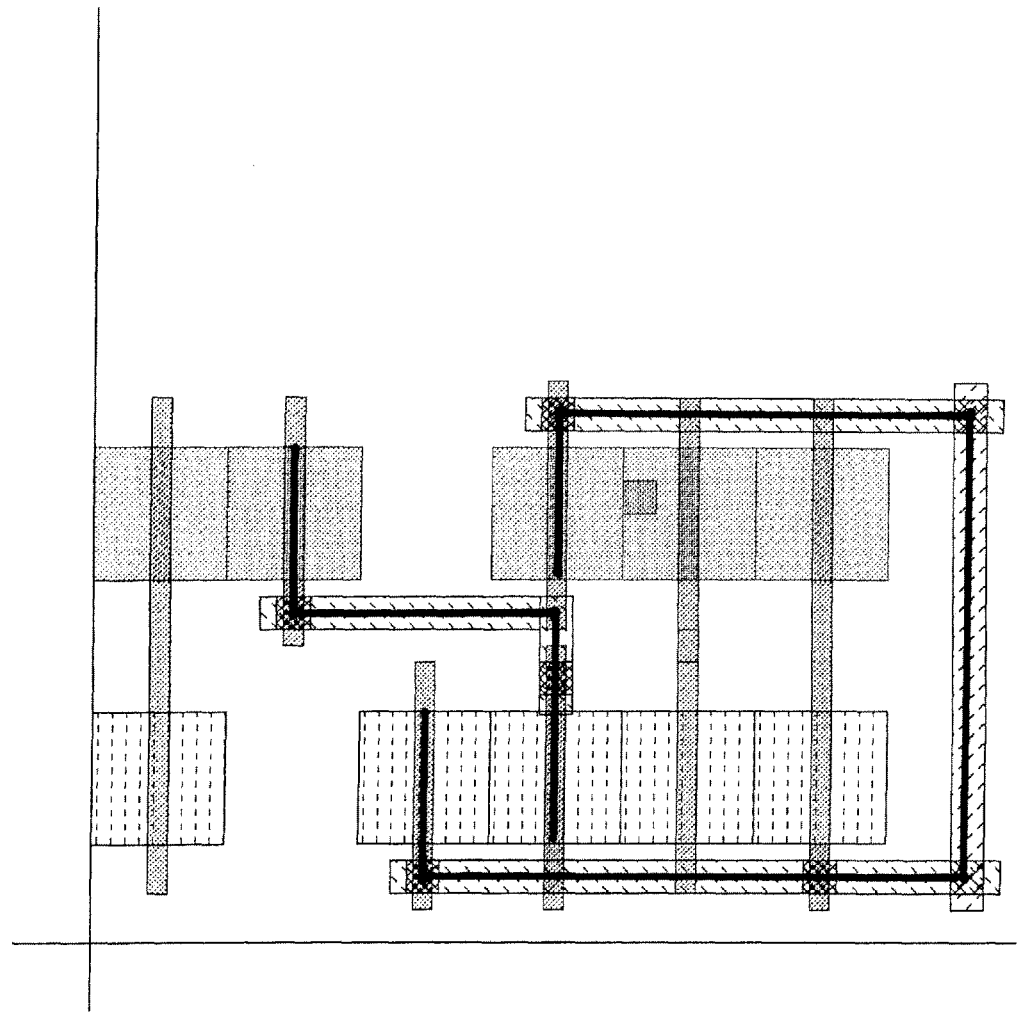
Figure 140:
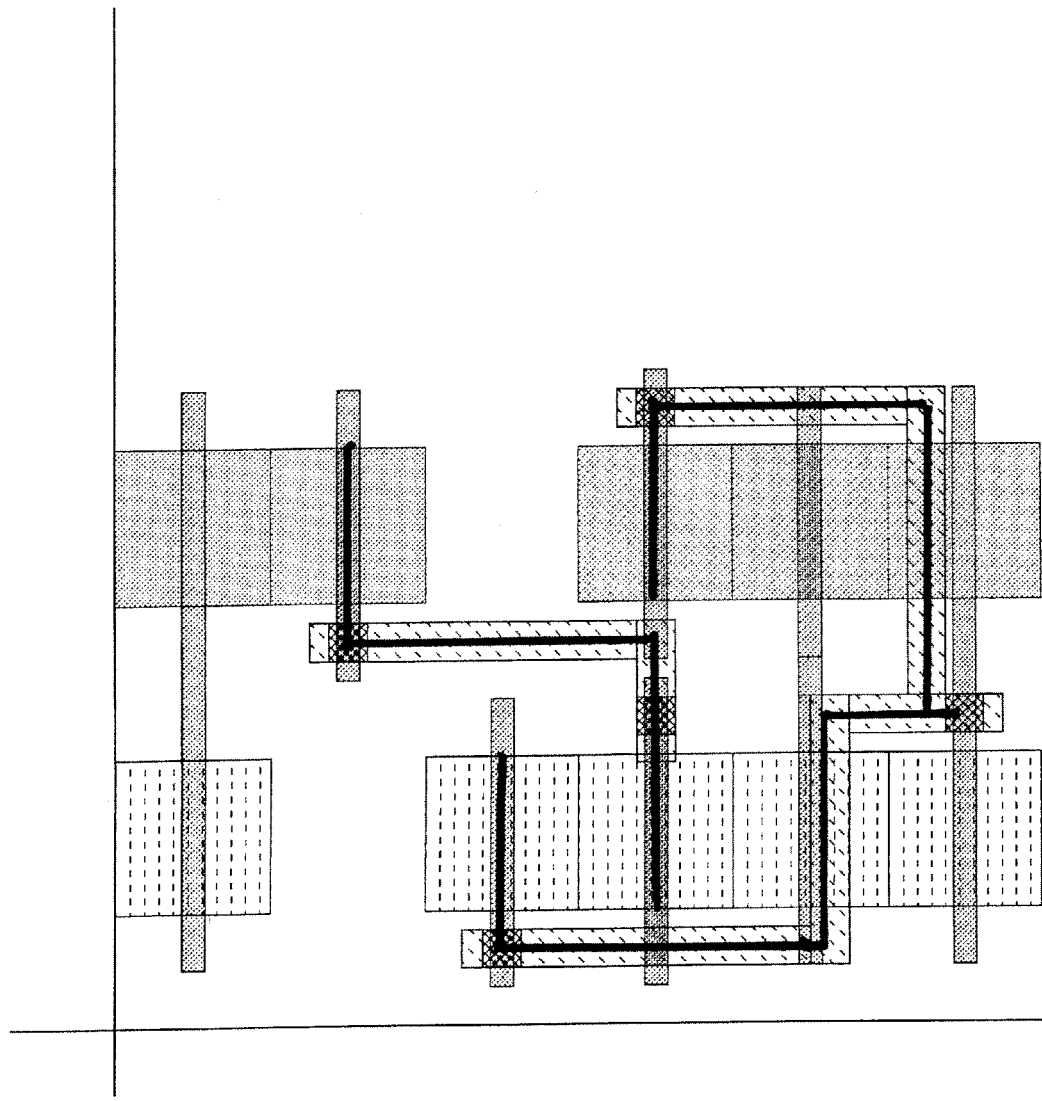
Figure 141:
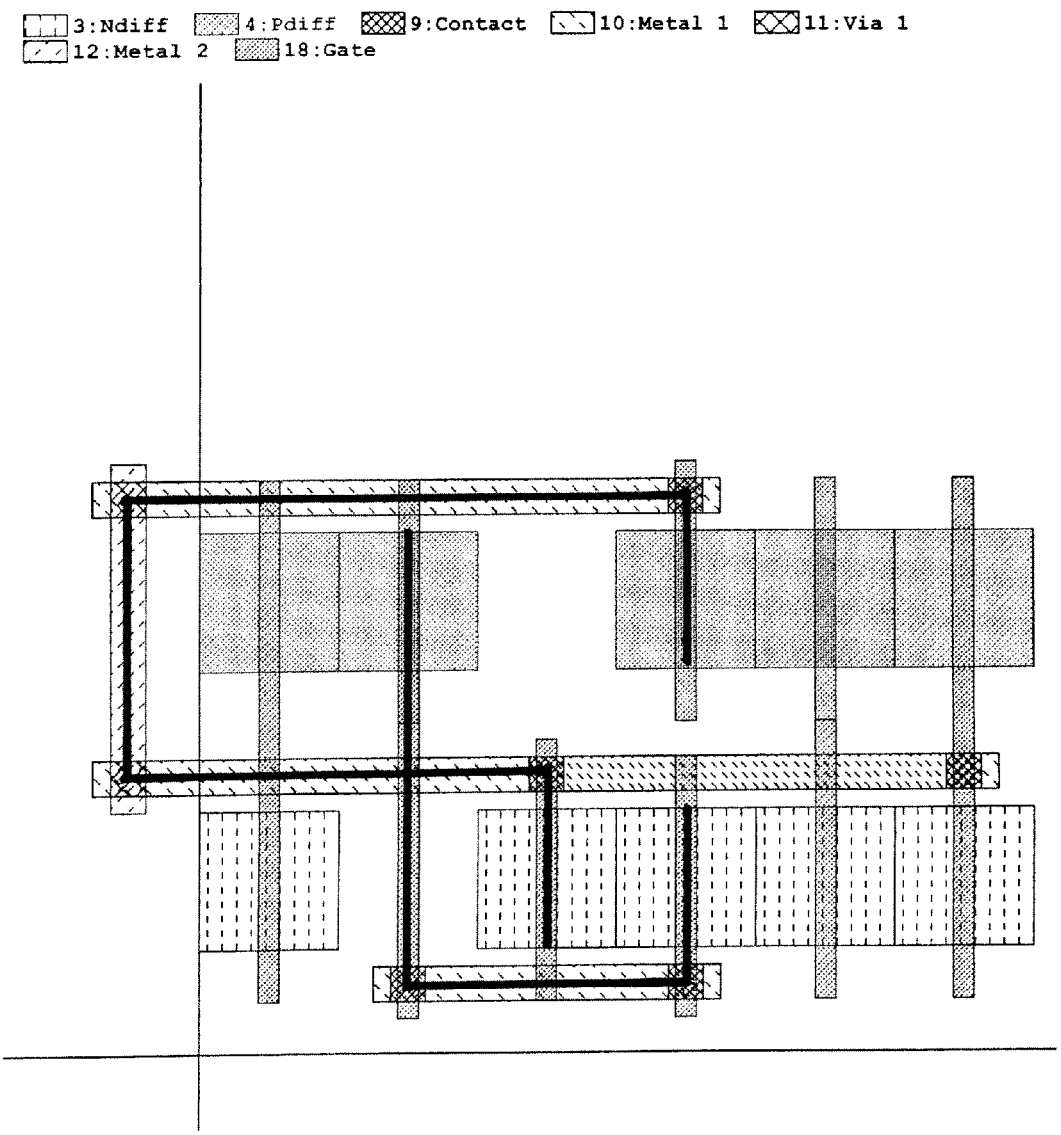
Figure 142:
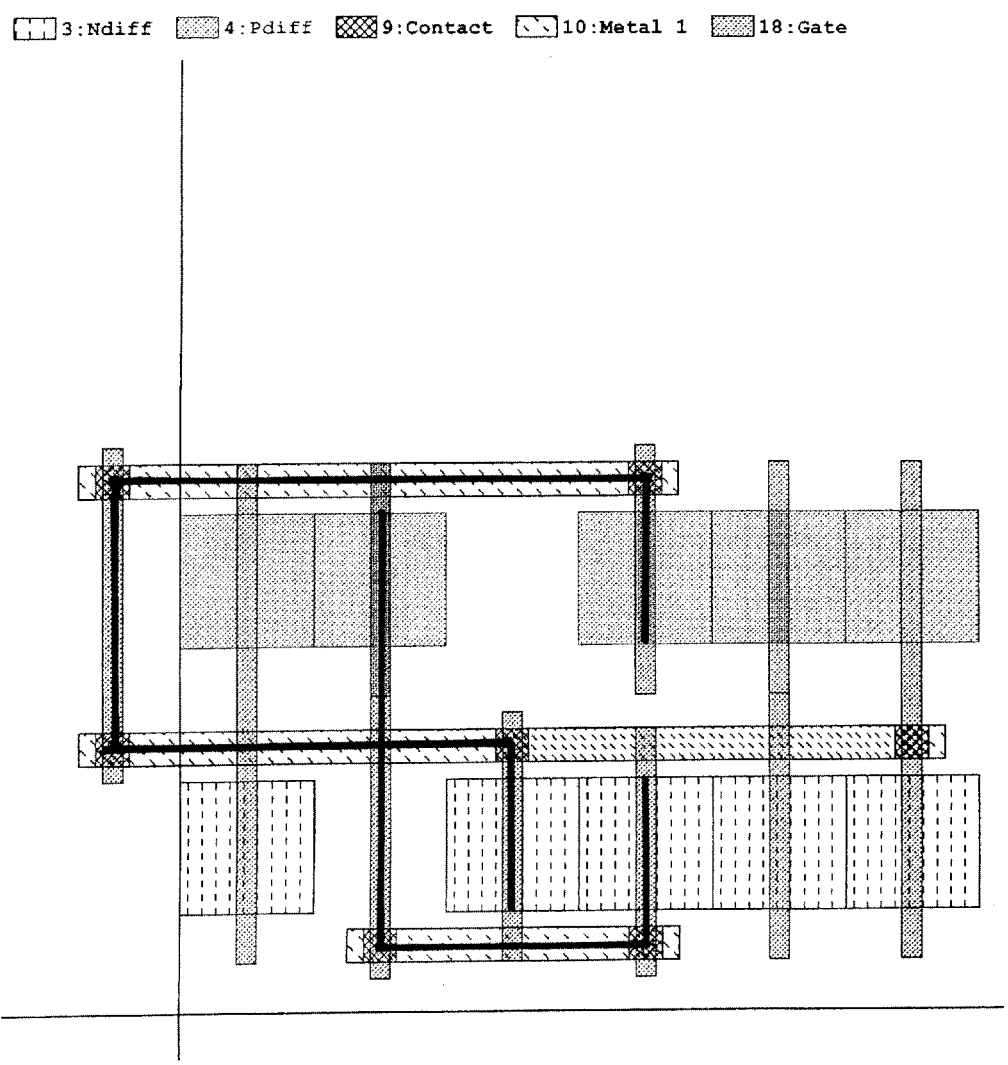
Figure 143:
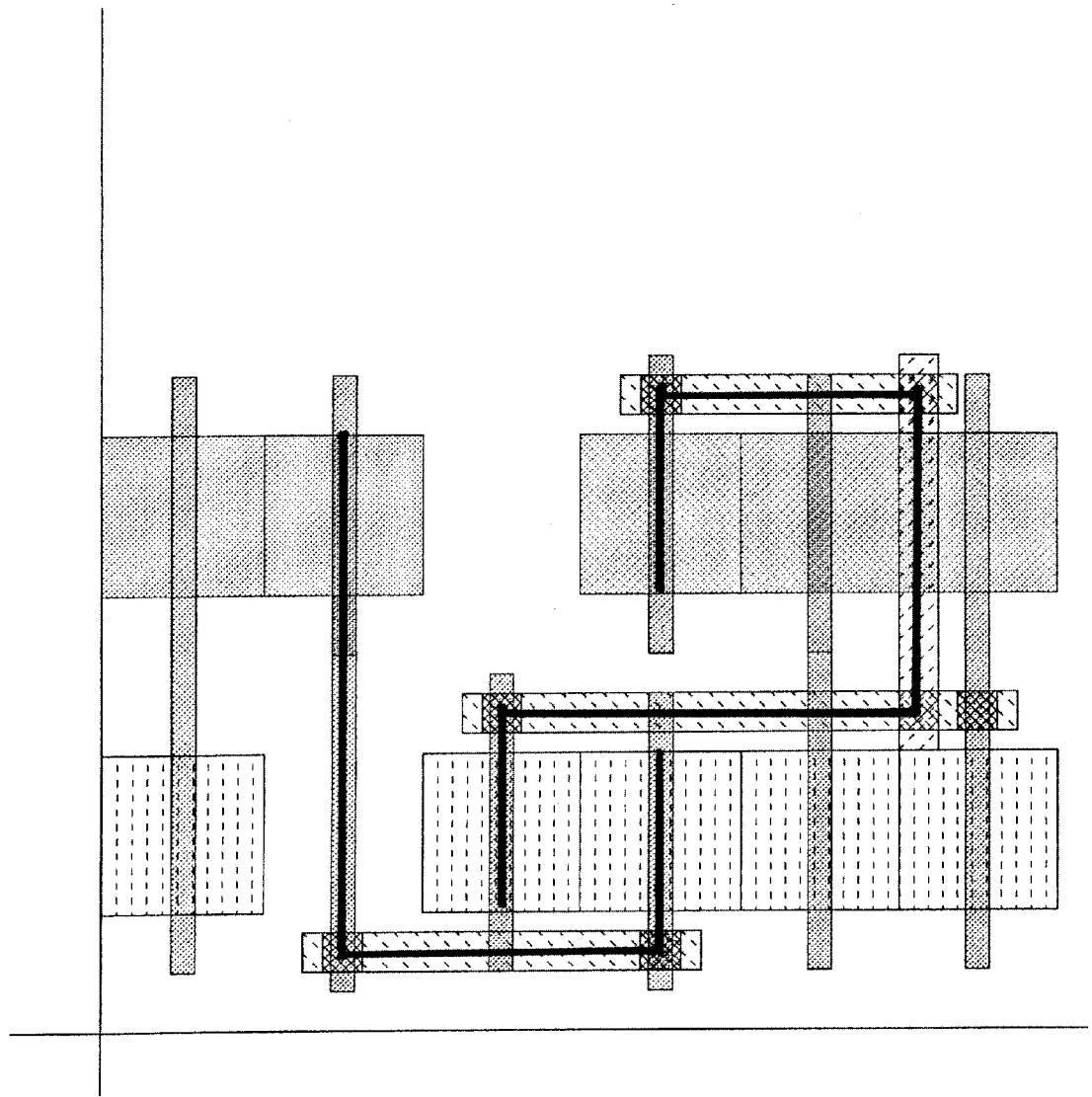
Figure 144:
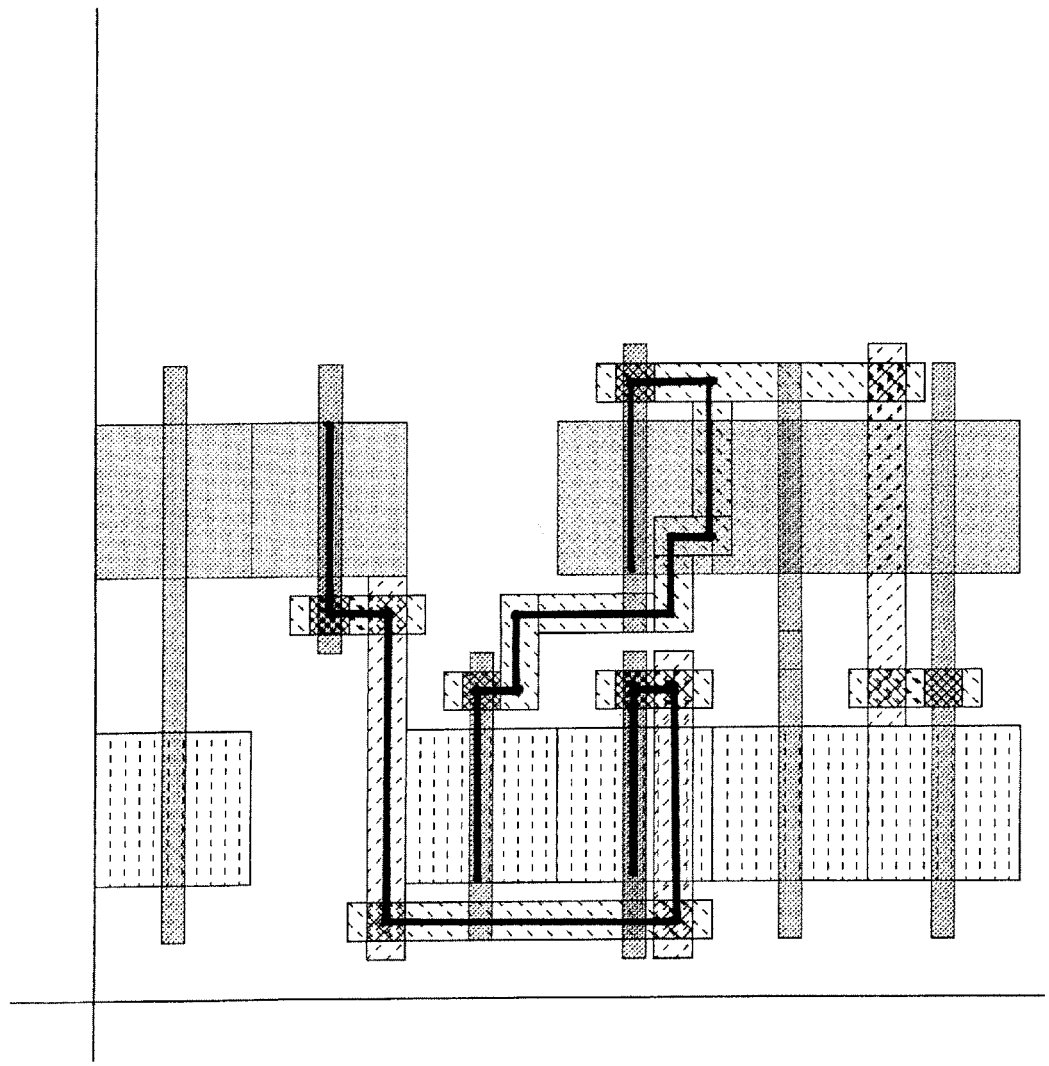
Figure 145:
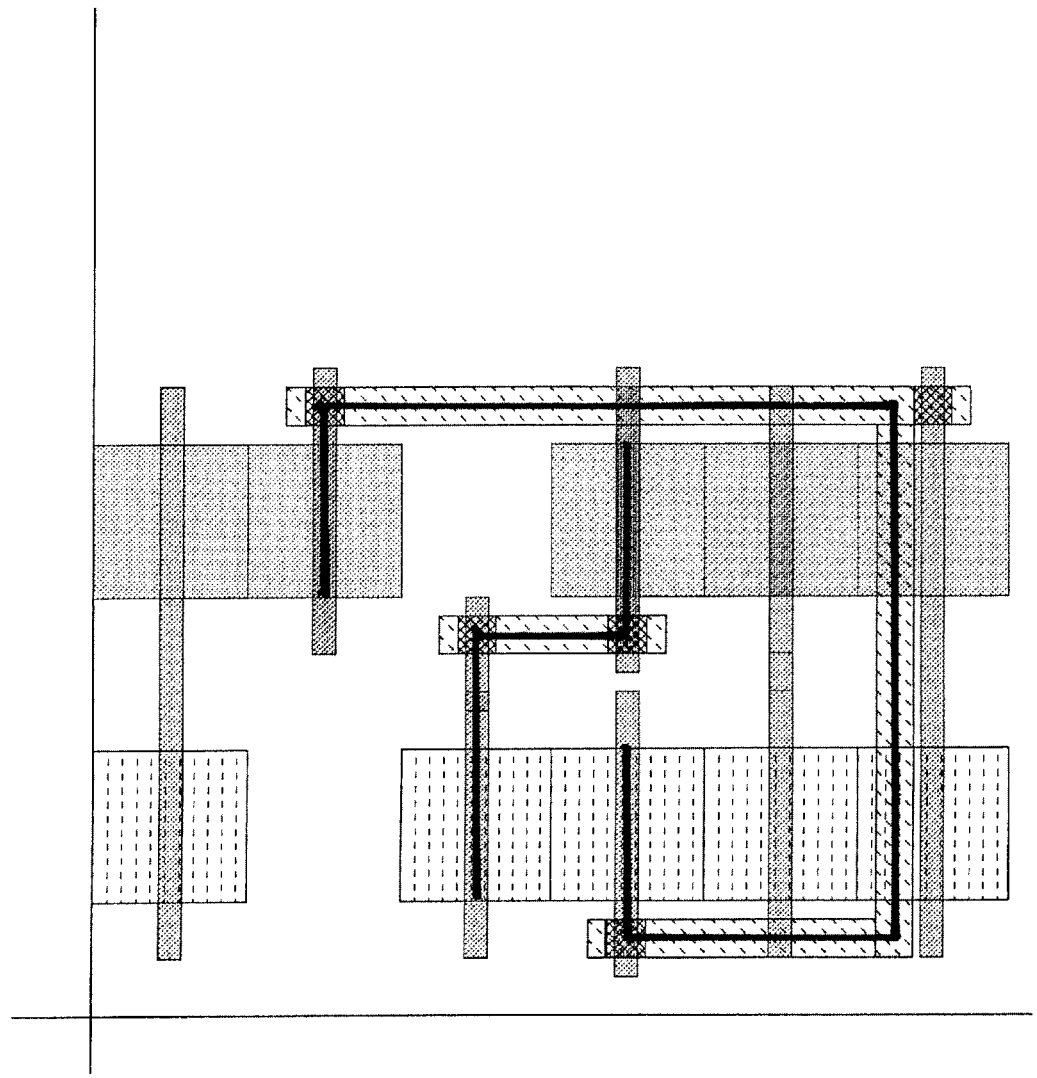
Figure 146:
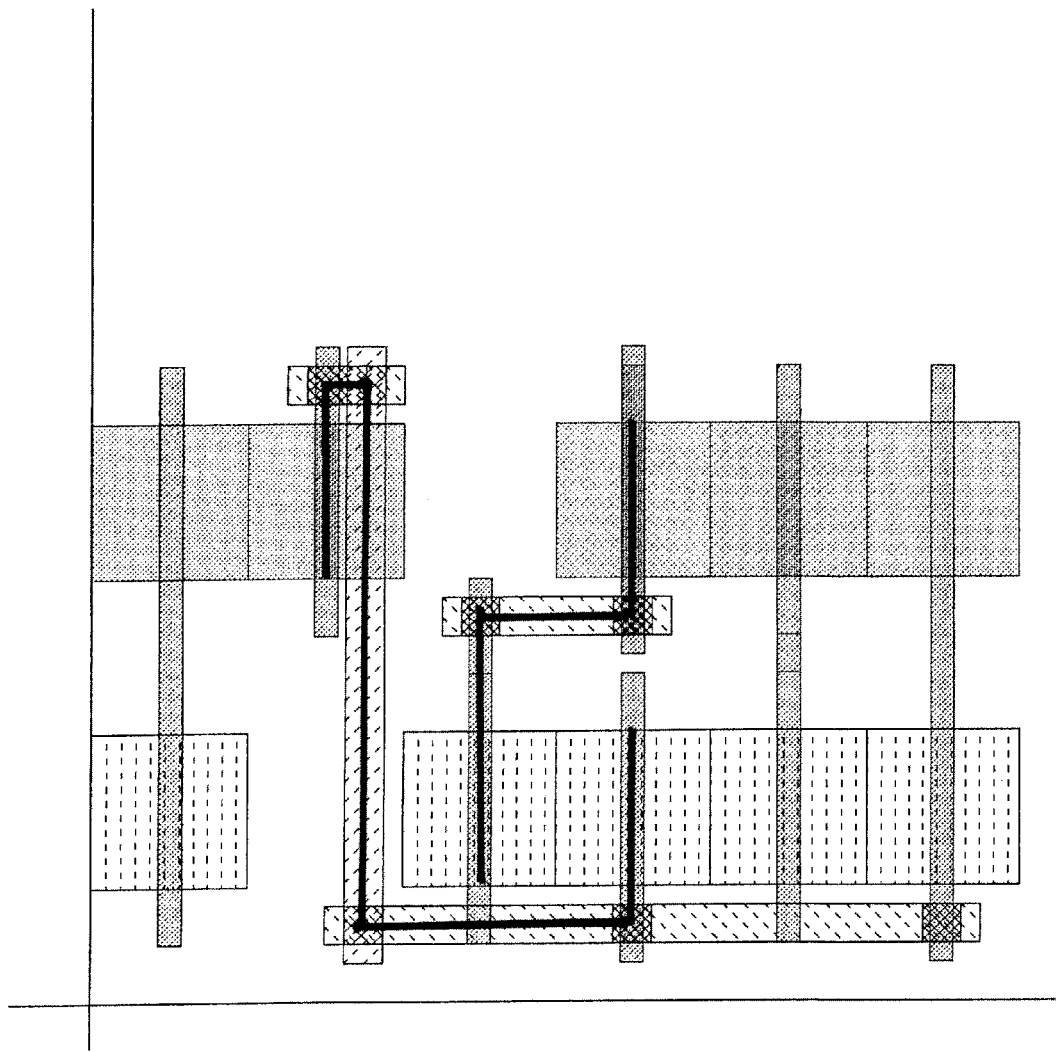
Figure 147:
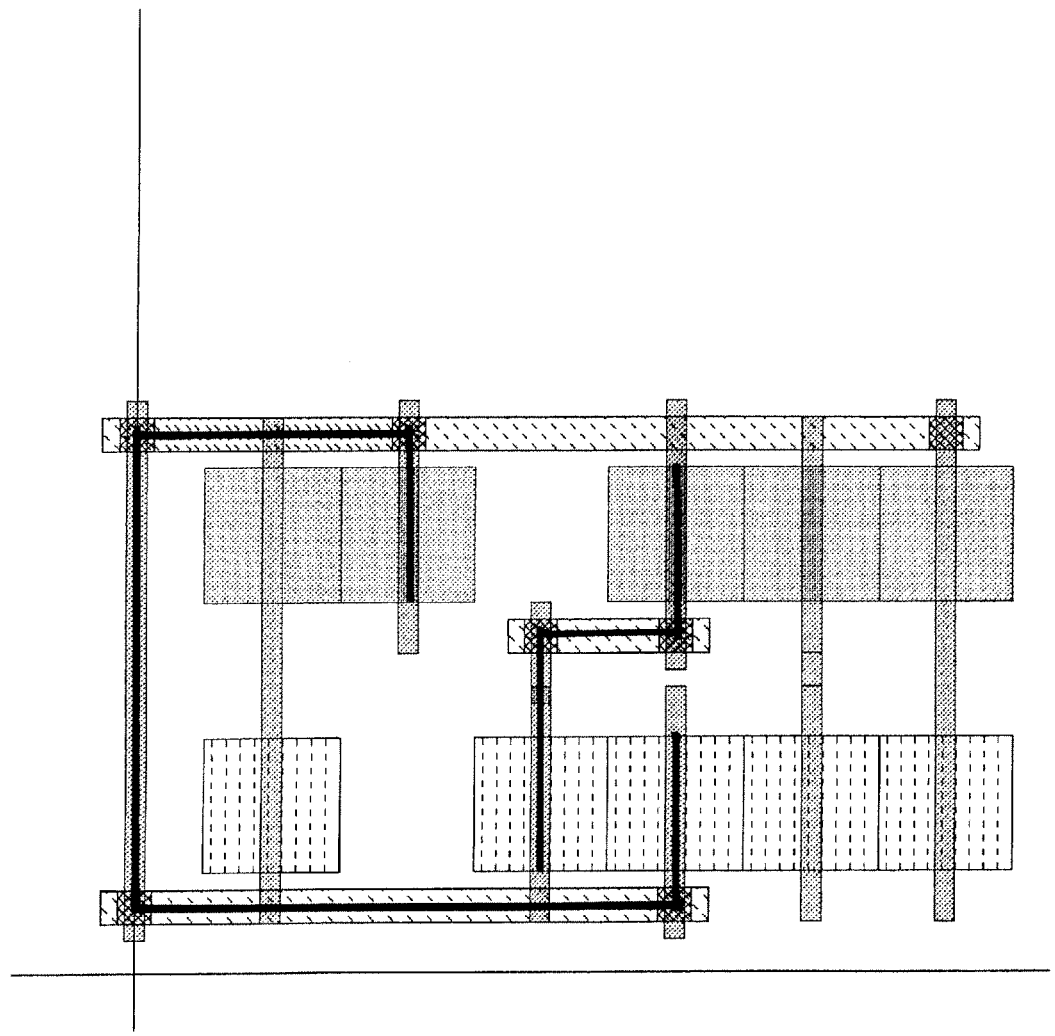
Figure 148:
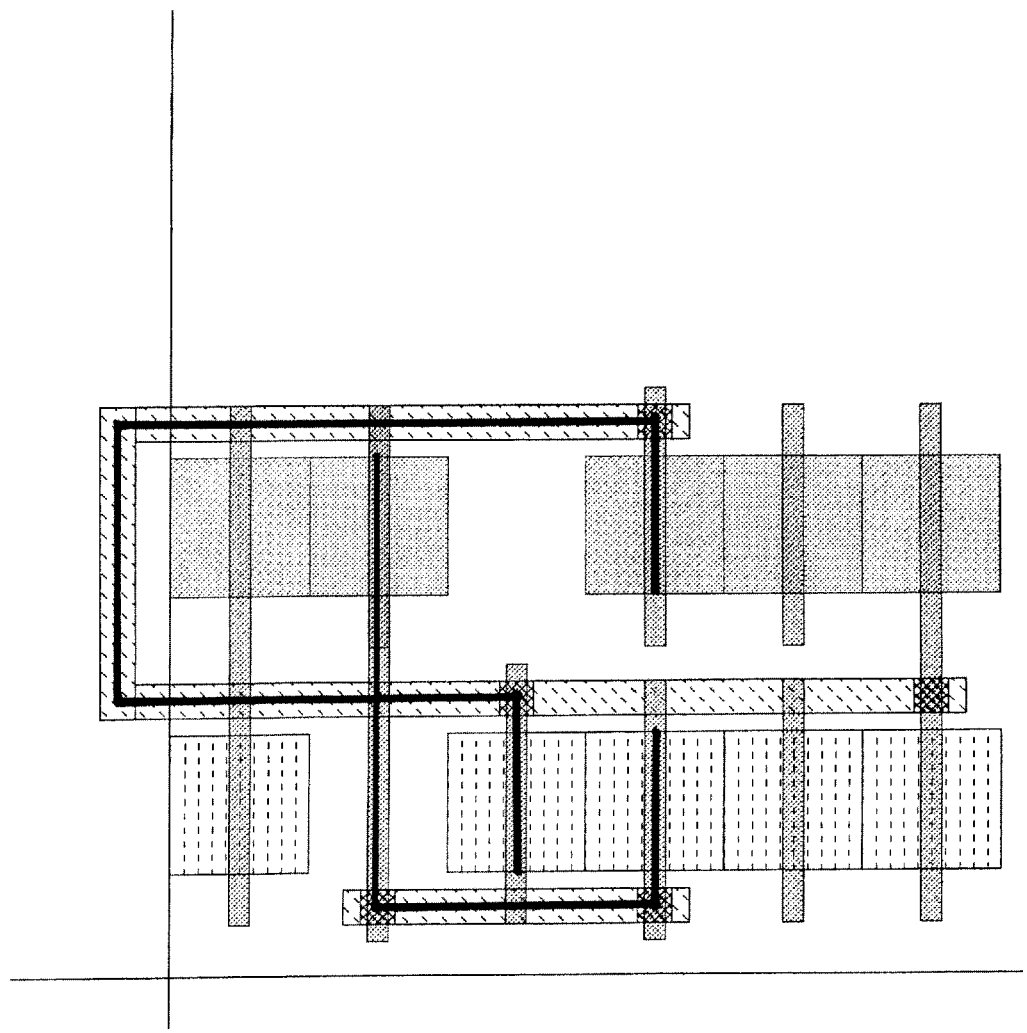

In another embodiment, two PMOS transistors of the cross-coupled transistors are disposed over a common p-type diffusion region, two NMOS transistors of the cross-coupled transistors are respectively disposed over physically separated n-type diffusion regions, and the p-type and n-type diffusion regions associated with the cross-coupled transistors are electrically connected to a common node. FIG. 100 as shown and each of FIGS. 103, 105, 112-149, 167, 184, and 186 with the p-type and n-type diffusion regions reversed to n-type and p-type, respectively, illustrate various cross-coupled transistor layout embodiments in which two PMOS transistors of the cross-coupled transistors are disposed over a common p-type diffusion region, two NMOS transistors of the cross-coupled transistors are respectively disposed over physically separated n-type diffusion regions, and the p-type and n-type diffusion regions associated with the cross-coupled transistors are electrically connected to a common node.

In yet another embodiment, two PMOS transistors of the cross-coupled transistors are respectively disposed over physically separated p-type diffusion regions, two NMOS transistors of the cross-coupled transistors are respectively disposed over physically separated n-type diffusion regions, and the p-type and n-type diffusion regions associated with the cross-coupled transistors are electrically connected to a common node. FIGS. 158-166, 173-183, 185, and 187-191 illustrate various cross-coupled transistor layout embodiments in which two PMOS transistors of the cross-coupled transistors are respectively disposed over physically separated p-type diffusion regions, two NMOS transistors of the cross-coupled transistors are respectively disposed over physically separated n-type diffusion regions, and the p-type and n-type diffusion regions associated with the cross-coupled transistors are electrically connected to a common node.

It should be understood that the electrical connection of the various p-type and n-type diffusion regions associated with the cross-coupled transistors to the common node can be made using electrical conductors defined within any level of the chip and within any number of levels of the chip, by way of contact and/or vias, so as to accommodate essentially any cross-coupled layout configuration defined in accordance with the linear gate level restrictions. In one embodiment, electrical connection of the diffusion regions of the cross-coupled transistors to the common node can be made using one or more local interconnect conductors defined within the gate level itself. This embodiment may also combine local interconnect conductors with conductors in higher levels (above the linear gate level) by way of contacts and/or vias to make the electrical connection of the diffusion regions of the cross-coupled transistors to the common node. Additionally, in various embodiments, conductive paths used to electrically connect the diffusion regions of the cross-coupled transistors to the common node can be defined to traverse over essentially any area of the chip as required to accommodate a routing solution for the chip.

Also, it should be appreciated that because the n-type and p-type diffusion regions are physically separate, and because the p-type diffusion regions for the two PMOS transistors of the cross-coupled transistors can be physically separate, and because the n-type diffusion regions for the two NMOS transistors of the cross-coupled transistors can be physically separate, it is possible in various embodiments to have each of the four cross-coupled transistors disposed at arbitrary locations in the layout relative to each other. Therefore, unless necessitated by electrical performance or other layout influencing conditions, it is not required that the four cross-coupled transistors be located within a prescribed proximity to each other in the layout. Although, location of the cross-coupled transistors within a prescribed proximity to each other is not precluded, and may be desirable in certain circuit layouts.

Figure 26:
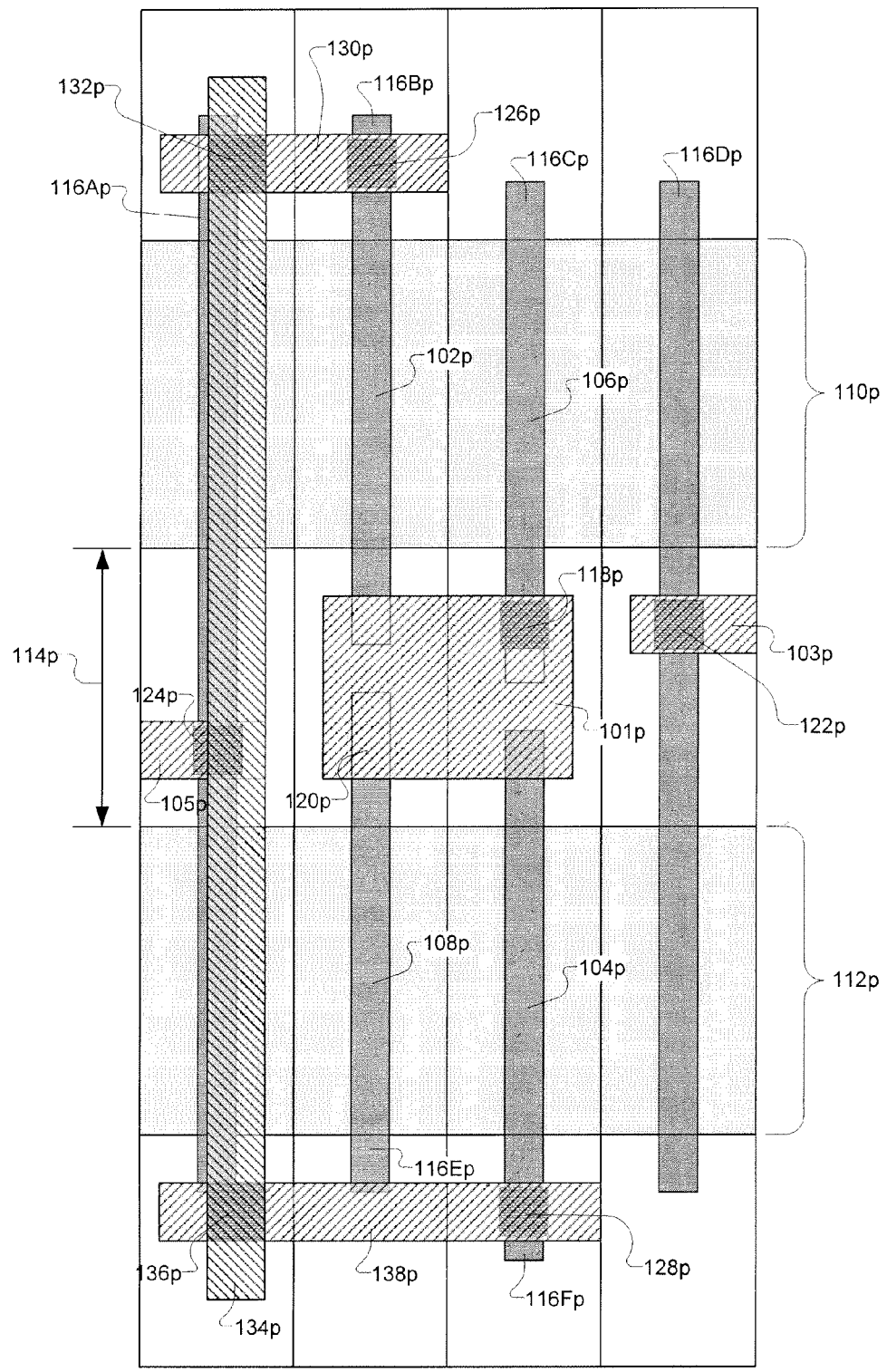
FIGS. 26-99, 150-157, and 168-172 illustrate various cross-coupled transistor layout embodiments in which two PMOS transistors of the cross-coupled transistors are disposed over a common p-type diffusion region, two NMOS transistors of the cross-coupled transistors are disposed over a common n-type diffusion region, and the p-type and n-type diffusion regions associated with the cross-coupled transistors are electrically connected to a common node.

FIG. 26 is an illustration showing an exemplary cross-coupled transistor layout, in accordance with one embodiment of the present invention. The cross-couple layout includes four transistors 102*p*, 104*p*, 106*p*, 108*p*. Transistors 102*p*, 106*p* are defined over a first diffusion region 110*p*. Transistors 108*p*, 104*p* are defined over a second diffusion region 112*p*. In one embodiment, the first diffusion region 110*p* is defined such that transistors 102*p* and 106*p* are NMOS transistors, and the second diffusion region 112*p* is defined such that transistors 104*p* and 108*p* are PMOS transistors. In another embodiment, the first diffusion region 110*p* is defined such that transistors 102*p* and 106*p* are PMOS transistors, and the second diffusion region 112*p* is defined such that transistors 104*p* and 108*p* are NMOS transistors. Additionally, the separation distance 114*p* between the first and second diffusion regions 110*p*, 112*p* can vary depending on the requirements of the layout and the area required for connection of the cross-coupled transistors between the first and second diffusion regions 110*p*, 112*p*.

In the exemplary embodiments disclosed herein, it should be understood that diffusion regions are not restricted in size. In other words, any given diffusion region can be sized in an arbitrary manner as required to satisfy electrical and/or layout requirements. Additionally, any given diffusion region can be shaped in an arbitrary manner as required to satisfy electrical and/or layout requirements. Additionally, as discussed above, in various embodiments a cross-coupled transistor configuration can utilize physically separate n-channel diffusion regions and/or physically separate p-channel diffusion regions. More specifically, the two N-MOS transistors of the cross-coupled transistor configuration can utilize physically separate n-channel diffusion regions, and/or the two P-MOS transistors of the cross-coupled transistor configuration can utilize physically separate p-channel diffusion regions.

Also, it should be understood that the four transistors of the cross-coupled transistor configuration, as defined in accordance with the linear gate level, are not required to be the same size. In different embodiments, the four transistors of the cross-coupled transistor configuration can either vary in size (transistor width or transistor gate length) or have the same size, depending on the applicable electrical and/or layout requirements. Additionally, it should be understood that the four transistors of the cross-coupled transistor configuration are not required to be placed in close proximity to each, although they may be closely placed in some embodiments. More specifically, because connections between the transistors of the cross-coupled transistor configuration can be made by routing through as least one higher interconnect level, there is freedom in placement of the four transistors of the cross-coupled transistor configuration relative to each other. Although, it should be understood that a proximity of the four transistors of the cross-coupled transistor configuration may be governed in certain embodiments by electrical and/or layout optimization requirements.

The layout of FIG. 26 utilizes a linear gate level as described above. Specifically, each of linear gate level features 116Ap-116Fp, regardless of function, is defined to extend across the gate level in a common direction and to be devoid of a substantial change in direction along its length. Linear gate level features 116Bp, 116Fp, 116Cp, and 116Ep form the gate electrodes of transistors 102p, 104p, 106p, and 108p, respectively. The gate electrodes of transistors 106p and 108p are connected through gate contacts 118p and 120p and through a higher interconnect level feature 101p. In one embodiment, the interconnect level feature 101p is a first interconnect level feature, i.e., Metal-1 level feature. However, in other embodiments, the interconnect level feature 101p can be a higher interconnect level feature, such as a Metal-2 level feature, or Metal-3 level feature.

In the illustrated embodiment, to facilitate fabrication (e.g., lithographic resolution) of the interconnect level feature 101p, edges of the interconnect level feature 101p are substantially aligned with edges of neighboring interconnect level features 103p, 105p. However, it should be understood that other embodiments may have interconnect level features placed without regard to interconnect level feature alignment or an interconnect level grid. Additionally, in the illustrated embodiment, to facilitate fabrication (e.g., lithographic resolution), the gate contacts 118p and 120p are substantially aligned with neighboring contact features 122p and 124p, respectively, such that the gate contacts are placed according to a gate contact grid. However, it should be understood that other embodiments may have gate contacts placed without regard to gate contact alignment or gate contact grid.

The gate electrode of transistor 102p is connected to the gate electrode of transistor 104p through gate contact 126p, through interconnect level (e.g., Metal-1 level) feature 130p, through via 132p, through higher interconnect level (e.g., Metal-2 level) feature 134p, through via 136p, through interconnect level (e.g., Metal-1 level) feature 138p, and through gate contacts 128p. Although the illustrated embodiment of FIG. 26 utilizes the Metal-1 and Metal-2 levels to connect the gate electrodes of transistors 102p and 104p, it should be appreciated that in various embodiment, essentially any combination of interconnect levels can be used to make the connection between the gate electrodes of transistors 102p and 104p.

It should be appreciated that the cross-coupled transistor layout of FIG. 26 is defined using four transistors (102p, 104p, 106p, 108p) and four gate contacts (126p, 128p, 118p, 120p). Also, the layout embodiment of FIG. 26 can be characterized in that two of the four gate contacts are placed between the NMOS and PMOS transistors of the cross-coupled transistors, one of the four gate contacts is placed outside of the NMOS transistors, and one of the four gate contacts is placed outside of the PMOS transistors. The two gate contacts placed between the NMOS and PMOS transistors are referred to as "inner gate contacts." The two gate contacts placed outside of the NMOS and PMOS transistors are referred to as "outer gate contacts."

In describing the cross-coupled layout embodiments illustrated in the various Figures herein, including that of FIG. 26, the direction in which the linear gate level features extend across the layout is referred to as a "vertical direction." Correspondingly, the direction that is perpendicular to the direction in which the linear gate level features extend across the layout is referred to as a "horizontal direction." With this in mind, in the cross-coupled layout of FIG. 26, it can be seen that the transistors 102p and 104p having the outer gate contacts 126p and 128p, respectively, are connected by using two horizontal interconnect level features 130p and 138p, and by using one vertical interconnect level feature 134p. It should be understood that the horizontal and vertical interconnect level features 130p, 134p, 138p used to connect the outer gate contacts 126p, 128p can be placed essentially anywhere in the layout, i.e., can be horizontally shifted in either direction away from the cross-coupled transistors 102p, 104p, 106p, 108p, as necessary to satisfy particular layout/routing requirements.

Figure 27:
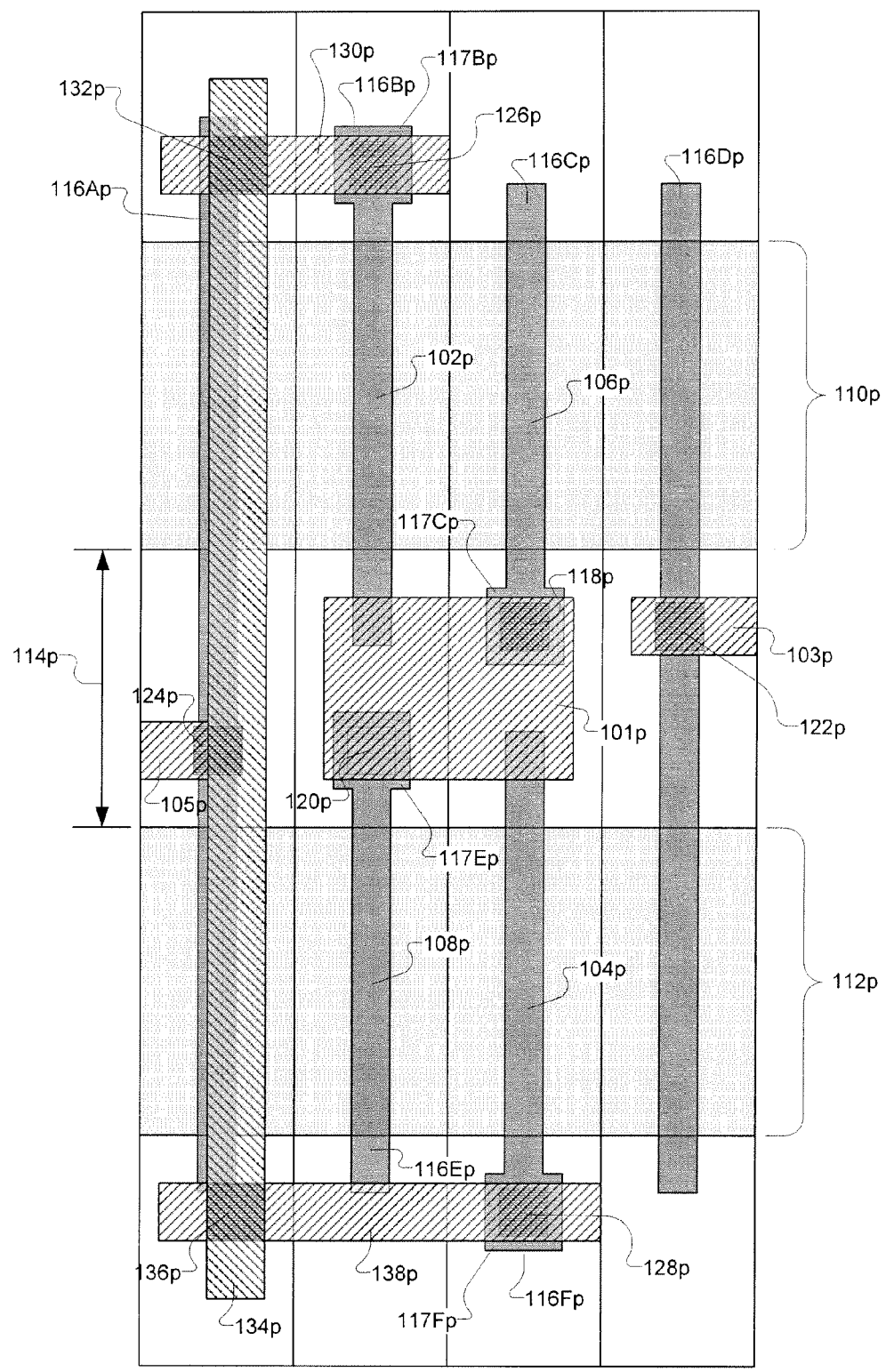

FIG. 27 is an illustration showing the exemplary layout of FIG. 26, with the linear gate electrode features 116Bp, 116Cp, 116Ep, and 116Fp defined to include contact head portions 117Bp, 117Cp, 117Ep, and 117Fp, respectively. As previously discussed, a linear gate electrode feature is allowed to have one or more contact head portion(s) along its line of extent, so long as the linear gate electrode feature does not connect directly within the gate level to another linear gate electrode feature having a different, yet parallel, line of extent.

Figure 28:
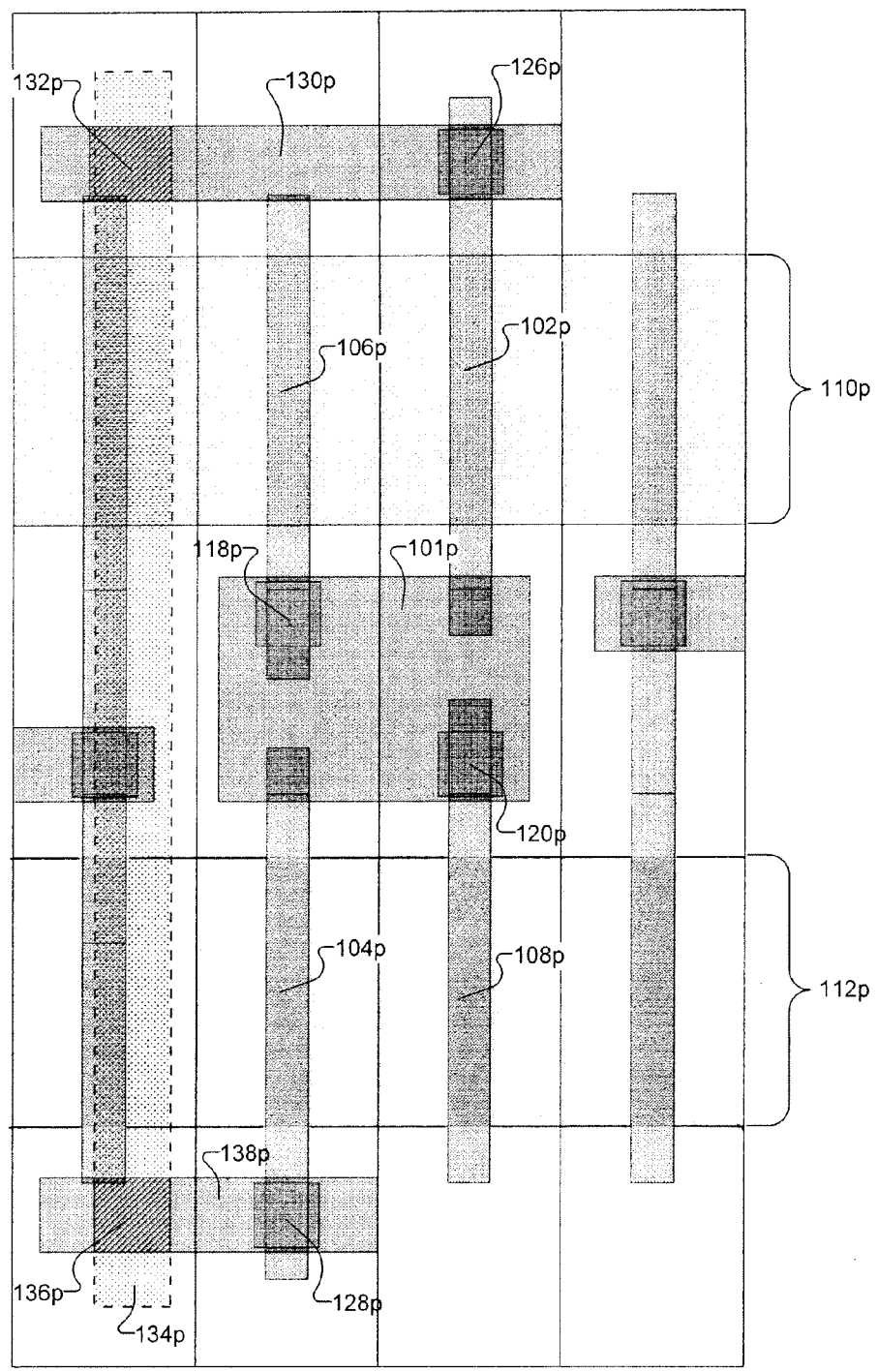

FIG. 28 is an illustration showing the cross-coupled transistor layout of FIG. 26, with the horizontal positions of the inner gate contacts 118p, 120p and outer gate contacts 126p, 128p respectively reversed, in accordance with one embodiment of the present invention. It should be understood that essentially any cross-coupled transistor configuration layout defined in accordance with a linear gate level can be represented in an alternate manner by horizontally and/or vertically reversing placement of the gate contacts that are used to connect one or both pairs of the four transistors of the cross-coupled transistor configuration. Also, it should be understood that essentially any cross-coupled transistor configuration layout defined in accordance with a linear gate level can be represented in an alternate manner by maintaining gate contact placements and by modifying each routing path used to connect one or both pairs of the four transistors of the cross-coupled transistor configuration.

Figure 29:
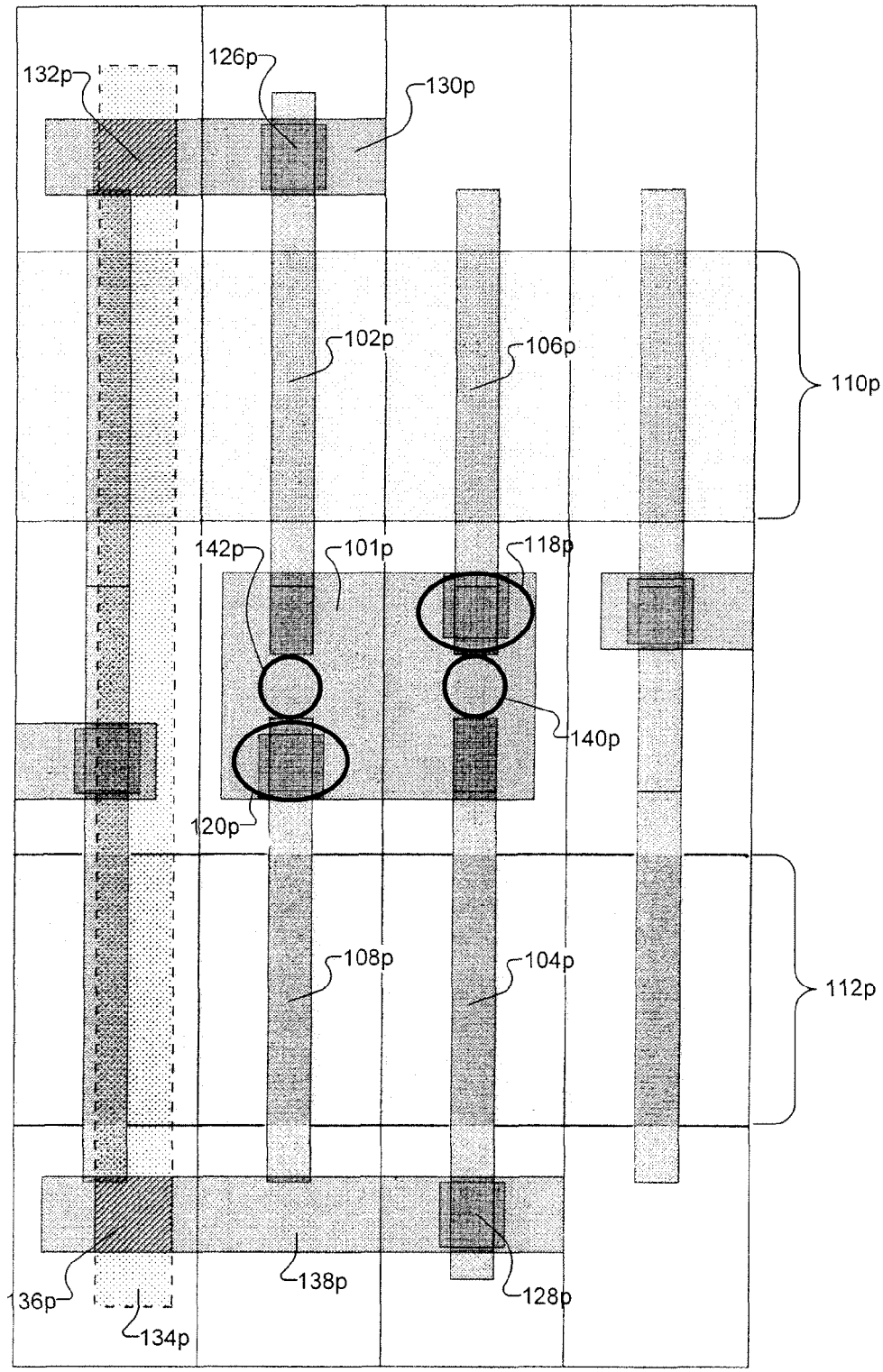

FIG. 29 is an illustration showing the cross-coupled transistor layout of FIG. 26, with the vertical positions of the inner gate contacts 118p and 120p adjusted to enable alignment of the line end spacings between co-linearly aligned gate level features, in accordance with one embodiment of the present invention. Specifically, gate contact 118p is adjusted vertically upward, and gate contact 120p is adjusted vertically downward. The linear gate level features 116Bp and 116Ep are then adjusted such that the line end spacing 142p therebetween is substantially vertically centered within area shadowed by the interconnect level feature 101p. Similarly, the linear gate level features 116Cp and 116Fp are then adjusted such that the line end spacing 140p therebetween is substantially vertically centered within area shadowed by the interconnect level feature 101p. Therefore, the line end spacing 142p is substantially vertically aligned with the line end spacing 140p. This vertical alignment of the line end spacings 142p and 140p allows for use of a cut mask to define the line end spacings 142p and 140p. In other words, linear gate level features 116Bp and 116Ep are initially defined as a single continuous linear gate level feature, and linear gate level features 116Cp and 116Fp are initially defined as a single continuous linear gate level feature. Then, a cut mask is used to remove a portion of each of the single continuous linear gate level features so as to form the line end spacings 142*p* and 140*p*. It should be understood that although the example layout of FIG. 29 lends itself to fabrication through use of a cut mask, the layout of FIG. 29 may also be fabricated without using a cut mask. Additionally, it should be understood that each embodiment disclosed herein as being suitable for fabrication through use of a cut mask may also be fabricated without using a cut mask.

In one embodiment, the gate contacts 118*p* and 120*p* are adjusted vertically so as to be edge-aligned with the interconnect level feature 101*p*. However, such edge alignment between gate contact and interconnect level feature is not required in all embodiments. For example, so long as the gate contacts 118*p* and 120*p* are placed to enable substantial vertical alignment of the line end spacings 142*p* and 140*p*, the gate contacts 118*p* and 120*p* may not be edge-aligned with the interconnect level feature 101*p*, although they could be if so desired. The above-discussed flexibility with regard to gate contact placement in the direction of extent of the linear gate electrode features is further exemplified in the embodiments of FIGS. 30 and 54-60.

Figure 30:
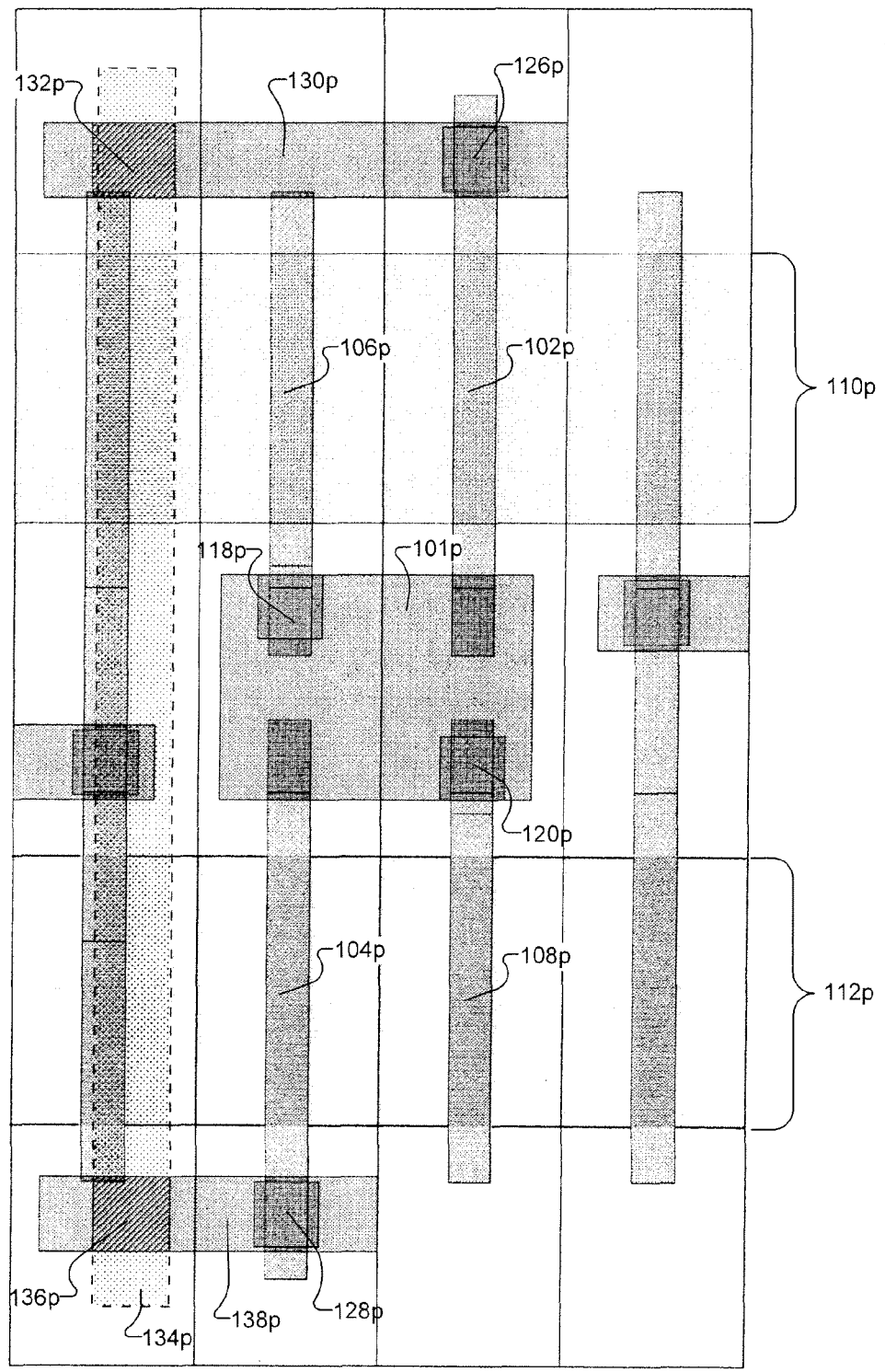

FIG. 30 is an illustration showing the cross-coupled transistor layout of FIG. 29, with the horizontal positions of the inner gate contacts 118*p*, 120*p* and outer gate contacts 126*p*, 128*p* respectively reversed, in accordance with one embodiment of the present invention.

Figure 31:
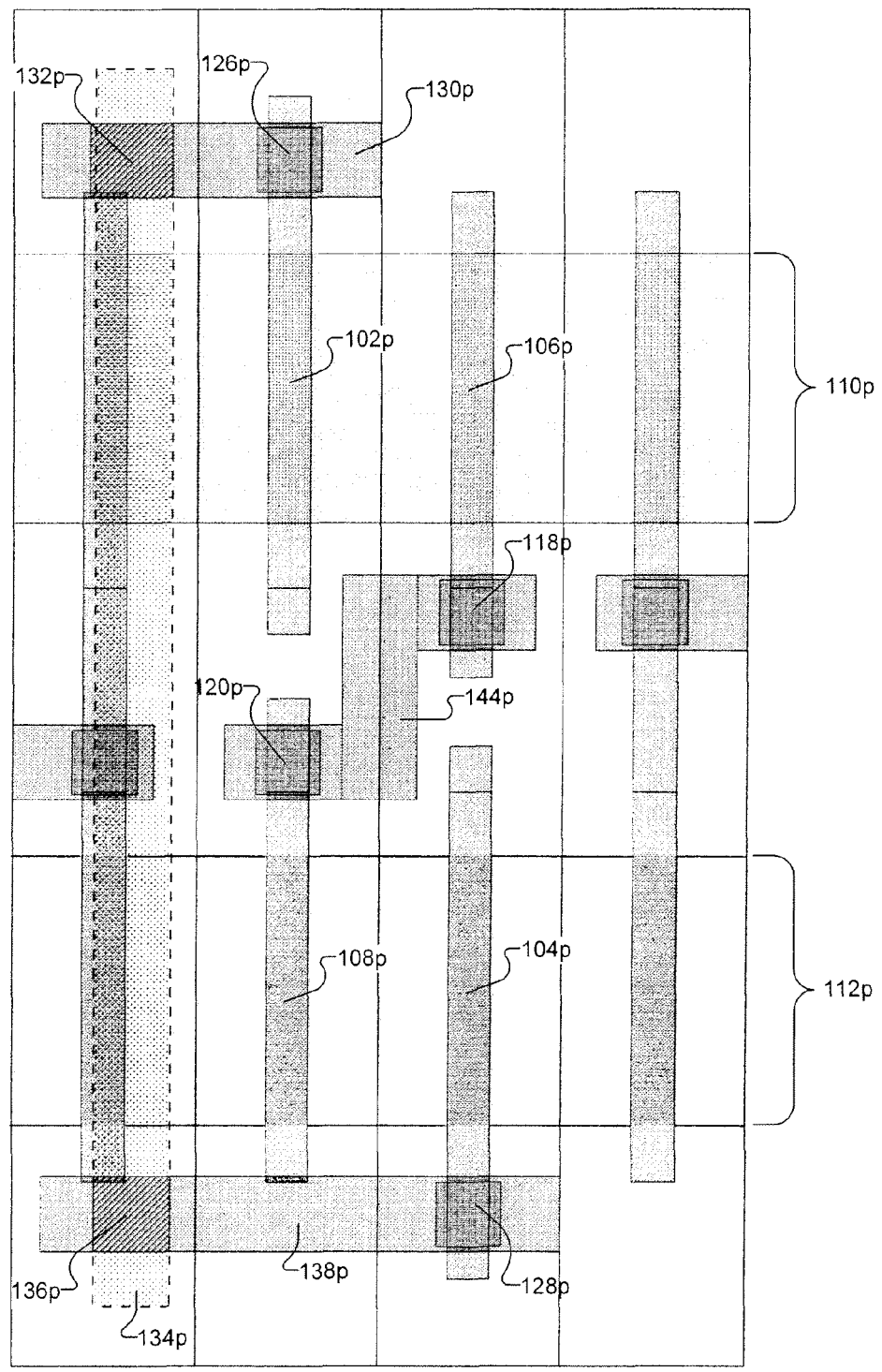

FIG. 31 is an illustration showing the cross-coupled transistor layout of FIG. 26, with the rectangular-shaped interconnect level feature 101*p* replaced by an S-shaped interconnect level feature 144*p*, in accordance with one embodiment of the present invention. As with the illustrated embodiment of FIG. 26, the S-shaped interconnect level feature 144*p* can be defined as a first interconnect level feature, i.e., as a Metal-1 level feature. However, in other embodiments, the S-shaped interconnect level feature 144*p* may be defined within an interconnect level other than the Metal-1 level.

Figure 32:
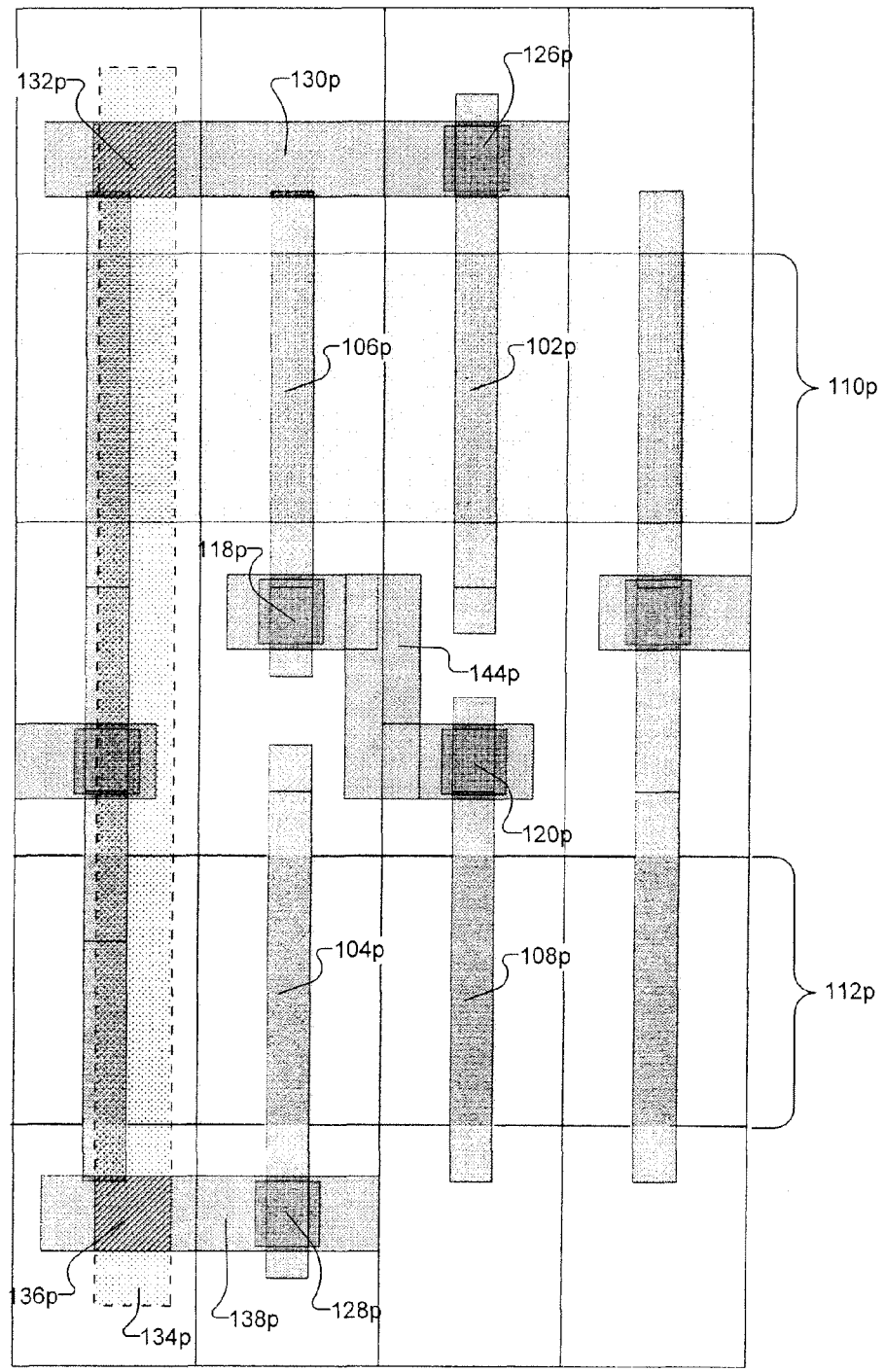

FIG. 32 is an illustration showing the cross-coupled transistor layout of FIG. 31, with the horizontal positions of the inner gate contacts 118*p*, 120*p* and outer gate contacts 126*p*, 128*p* respectively reversed, in accordance with one embodiment of the present invention. It should be appreciated that the S-shaped interconnect level feature 144*p* is flipped horizontally relative to the embodiment of FIG. 31 to enable connection of the inner contacts 120*p* and 118*p*.

Figure 33:
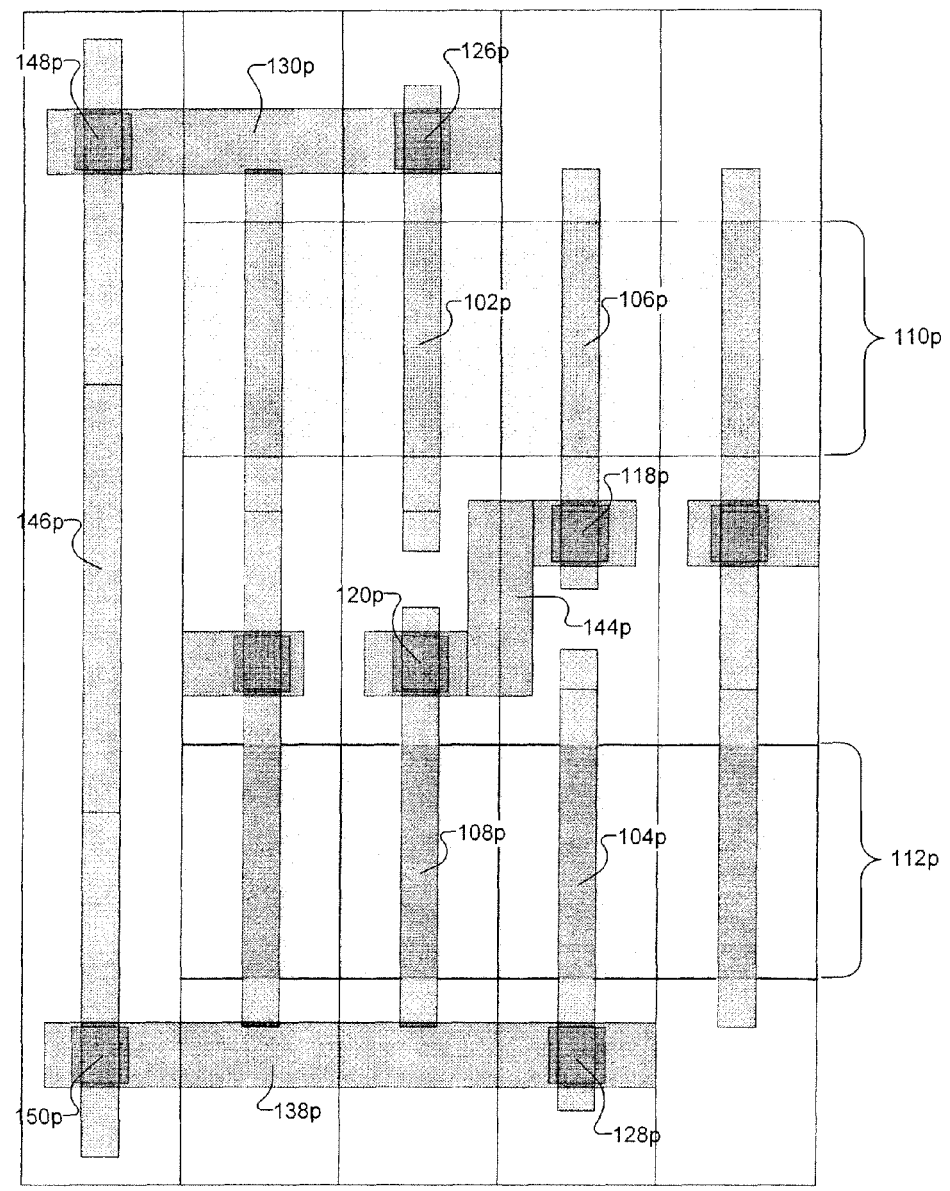

FIG. 33 is an illustration showing the cross-coupled transistor layout of FIG. 31, with a linear gate level feature 146*p* used to make the vertical portion of the connection between the outer contacts 126*p* and 128*p*, in accordance with one embodiment of the present invention. Thus, while the embodiment of FIG. 31 uses vias 132*p* and 136*p*, and the higher level interconnect feature 134*p* to make the vertical portion of the connection between the outer contacts 126*p* and 128*p*, the embodiment of FIG. 33 uses gate contacts 148*p* and 150*p*, and the linear gate level feature 146*p* to make the vertical portion of the connection between the outer contacts 126*p* and 128*p*. In the embodiment of FIG. 33, the linear gate level feature 146*p* serves as a conductor, and is not used to define a gate electrode of a transistor. It should be understood that the linear gate level feature 146*p*, used to connect the outer gate contacts 126*p* and 128*p*, can be placed essentially anywhere in the layout, i.e., can be horizontally shifted in either direction away from the cross-coupled transistors 102*p*, 104*p*, 106*p*, 108*p*, as necessary to satisfy particular layout requirements.

Figure 34:
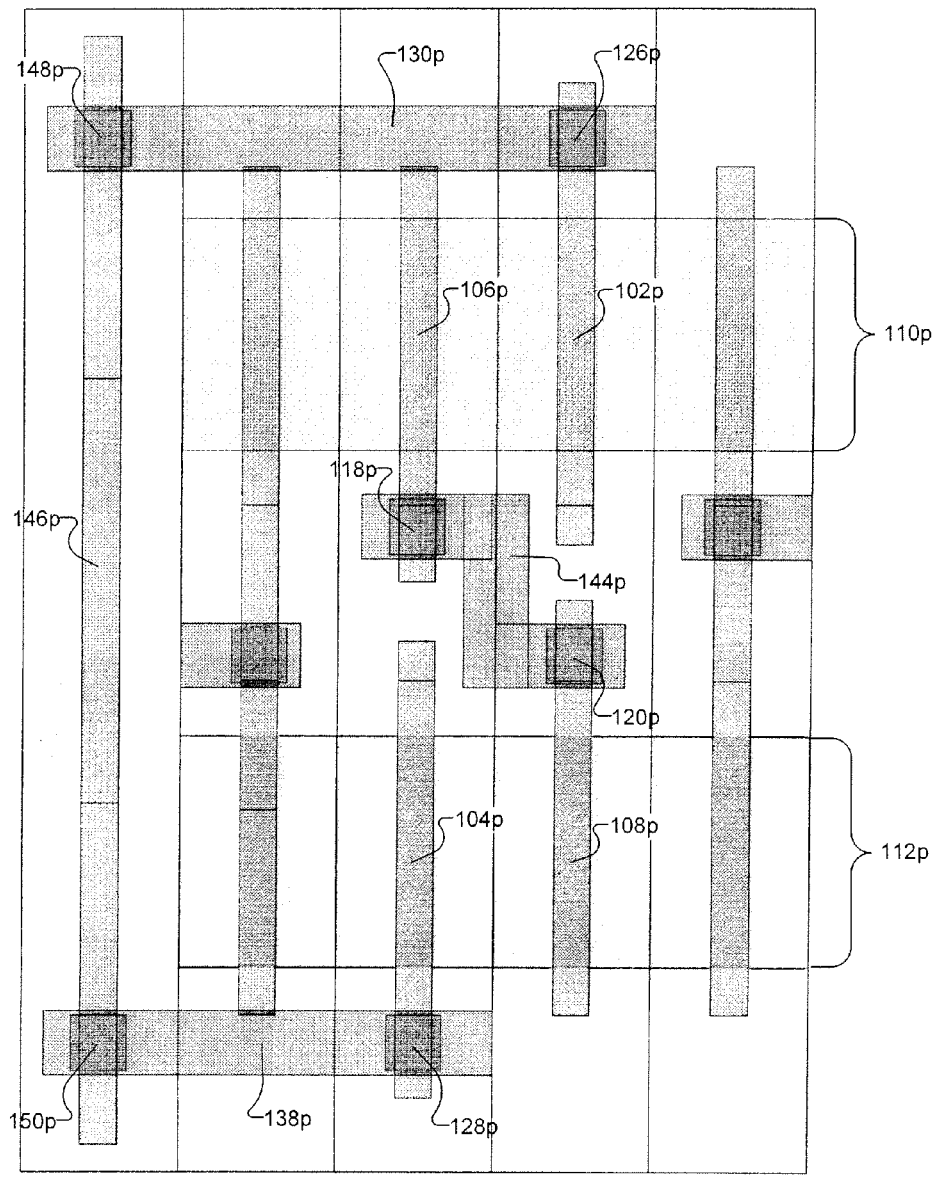

FIG. 34 is an illustration showing the cross-coupled transistor layout of FIG. 33, with the horizontal positions of the inner gate contacts 118*p*, 120*p* and outer gate contacts 126*p*, 128*p* respectively reversed, in accordance with one embodiment of the present invention.

Figure 35:
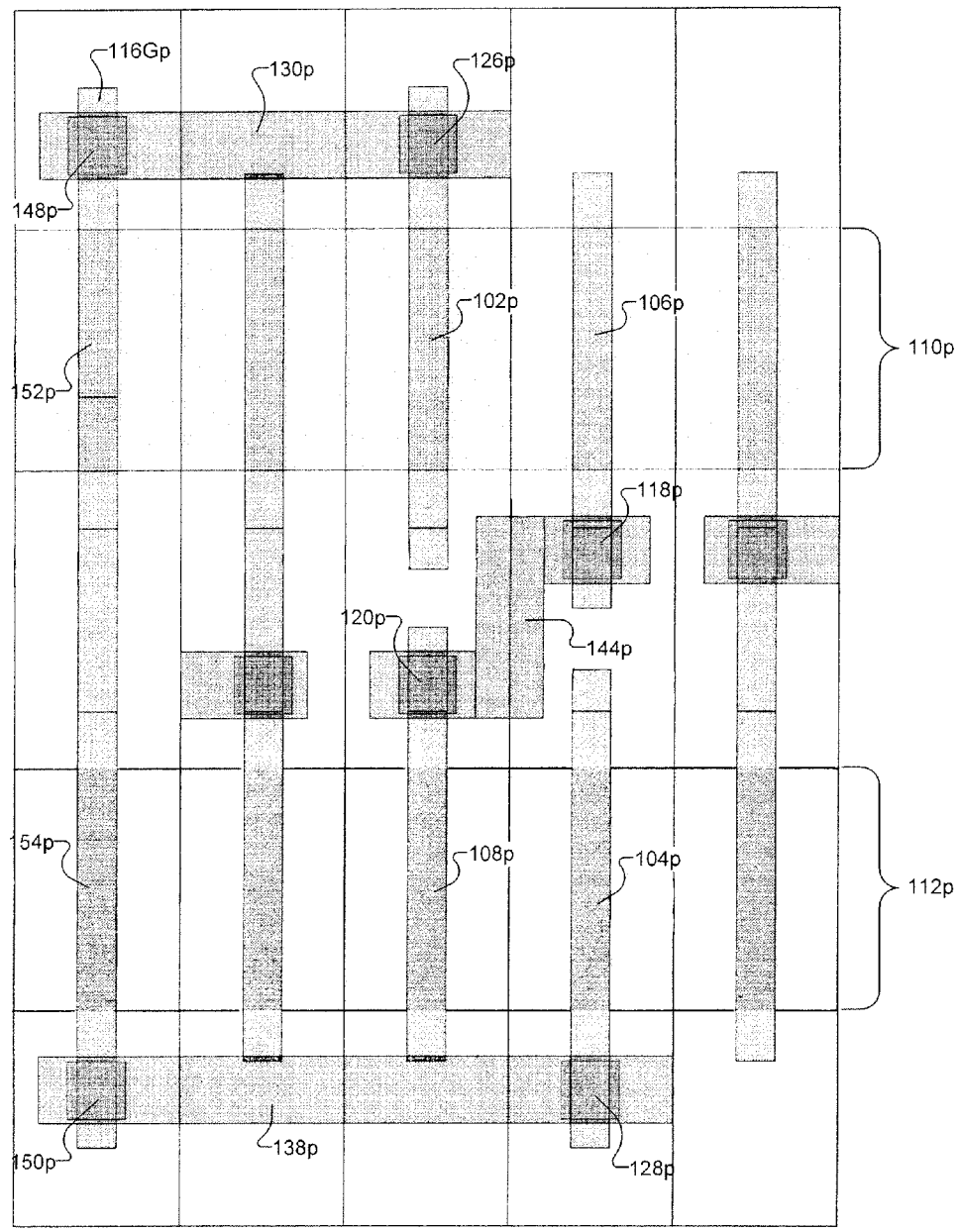

FIG. 35 is an illustration showing the cross-coupled transistor layout of FIG. 33 defined in connection with a multiplexer (MUX), in accordance with one embodiment of the present invention. In contrast to the embodiment of FIG. 33 which utilizes a non-transistor linear gate level feature 146*p* to make the vertical portion of the connection between the outer contacts 126*p* and 128*p*, the embodiment of FIG. 35 utilizes a select inverter of the MUX to make the vertical portion of the connection between the outer contacts 126*p* and 128*p*, wherein the select inverter of the MUX is defined by transistors 152*p* and 154*p*. More specifically, transistor 102*p* of the cross-coupled transistors is driven through transistor 152*p* of the select inverter. Similarly, transistor 104*p* of the cross-coupled transistors is driven through transistor 154*p* of the select inverter. It should be understood that the linear gate level feature 116Gp, used to define the transistors 152*p* and 154*p* of the select inverter and used to connect the outer gate contacts 126*p* and 128*p*, can be placed essentially anywhere in the layout, i.e., can be horizontally shifted in either direction away from the cross-coupled transistors 102*p*, 104*p*, 106*p*, 108*p*, as necessary to satisfy particular layout requirements.

Figure 36:
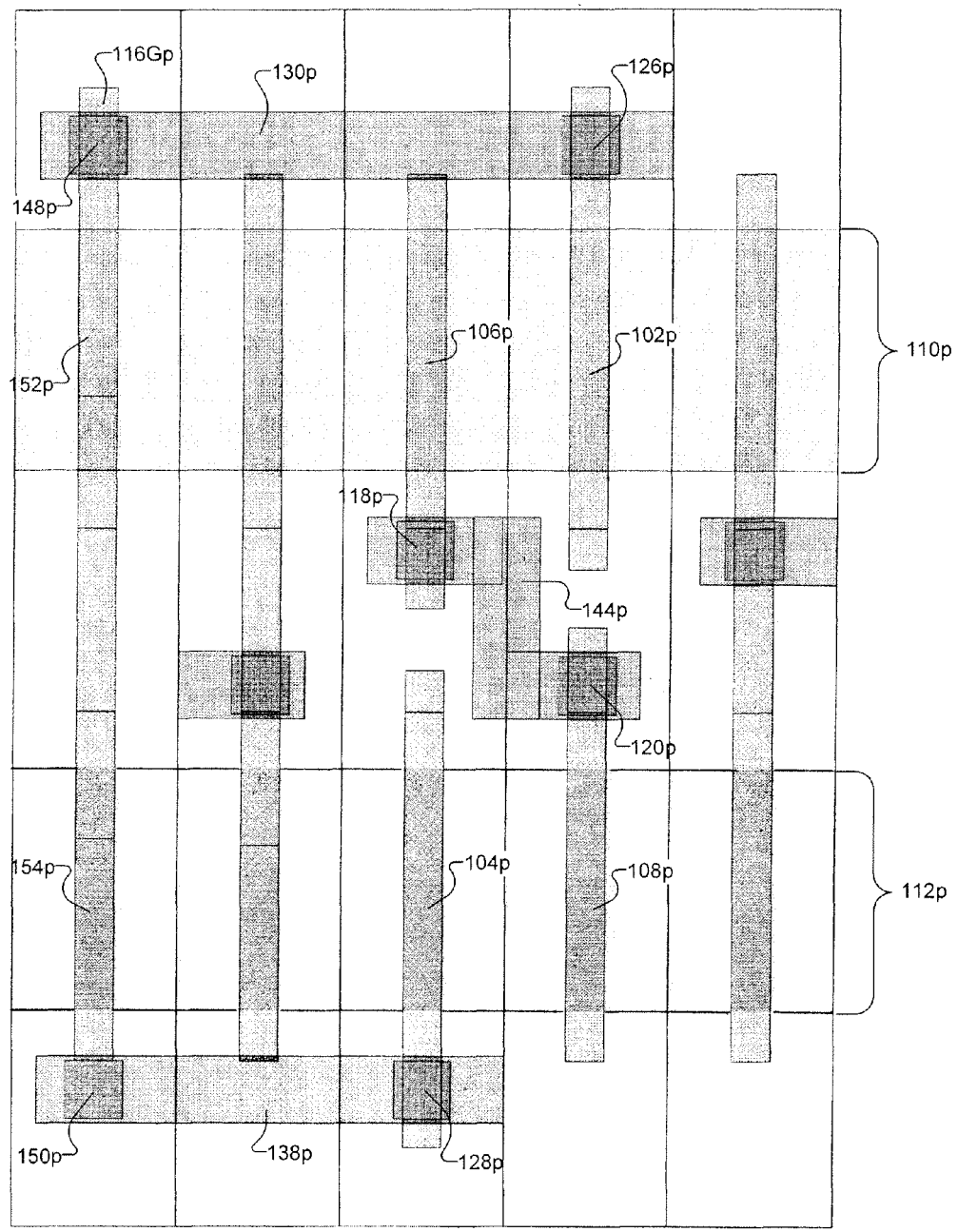

FIG. 36 is an illustration showing the cross-coupled transistor layout of FIG. 35, with the horizontal positions of the inner gate contacts 118*p*, 120*p* and outer gate contacts 126*p*, 128*p* respectively reversed, in accordance with one embodiment of the present invention.

Figure 37:
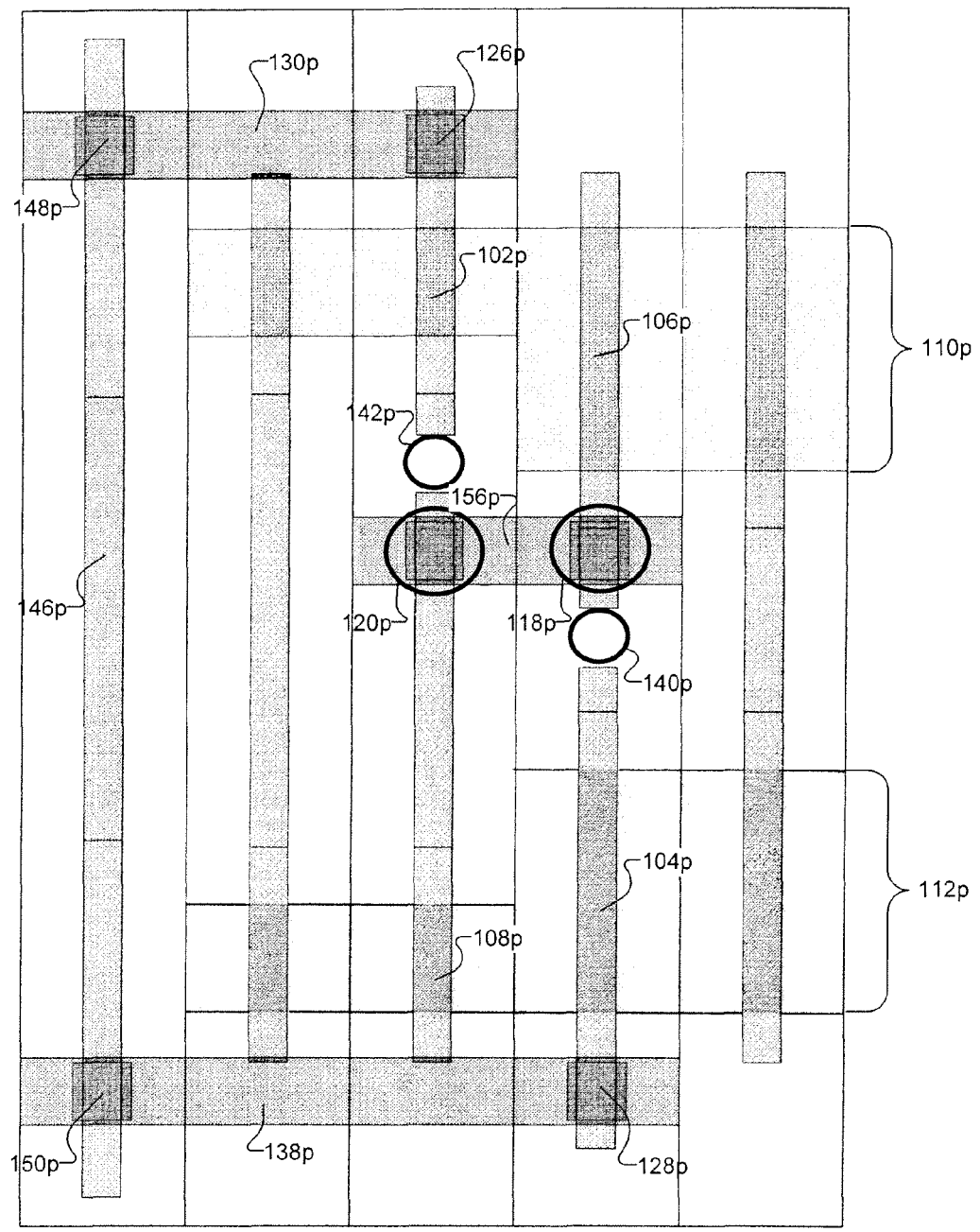

FIG. 37 is an illustration showing a latch-type cross-coupled transistor layout, in accordance with one embodiment of the present invention. The latch-type cross-coupled transistor layout of FIG. 37 is similar to that of FIG. 33, with the exception that the gate widths of transistors 102*p* and 108*p* are reduced relative to the gate widths of transistors 106*p* and 104*p*. Because transistors 102*p* and 108*p* perform a signal keeping function as opposed to a signal driving function, the gate widths of transistors 102*p* and 108*p* can be reduced. As with the embodiment of FIG. 33, the outer gate contact 126*p* is connected to the outer gate contact 128*p* by way of the interconnect level feature 130*p*, the gate contact 148*p*, the linear gate level feature 146*p*, the gate contact 150*p*, and the interconnect level feature 138*p*.

Also, because of the reduced size of the diffusion regions 110*p* and 112*p* for the keeping transistors 102*p* and 108*p*, the inner gate contacts 120*p* and 118*p* can be vertically aligned. Vertical alignment of the inner gate contacts 120*p* and 118*p* may facilitate contact fabrication, e.g., contact lithographic resolution. Also, vertical alignment of the inner gate contacts 120*p* and 118*p* allows for use of simple linear-shaped interconnect level feature 156*p* to connect the inner gate contacts 120*p* and 118*p*. Also, vertical alignment of the inner gate contacts 120*p* and 118*p* allows for increased vertical separation of the line end spacings 142*p* and 140*p*, which may facilitate creation of the line end spacings 142*p* and 140*p* when formed using separate cut shapes in a cut mask.

Figure 38:
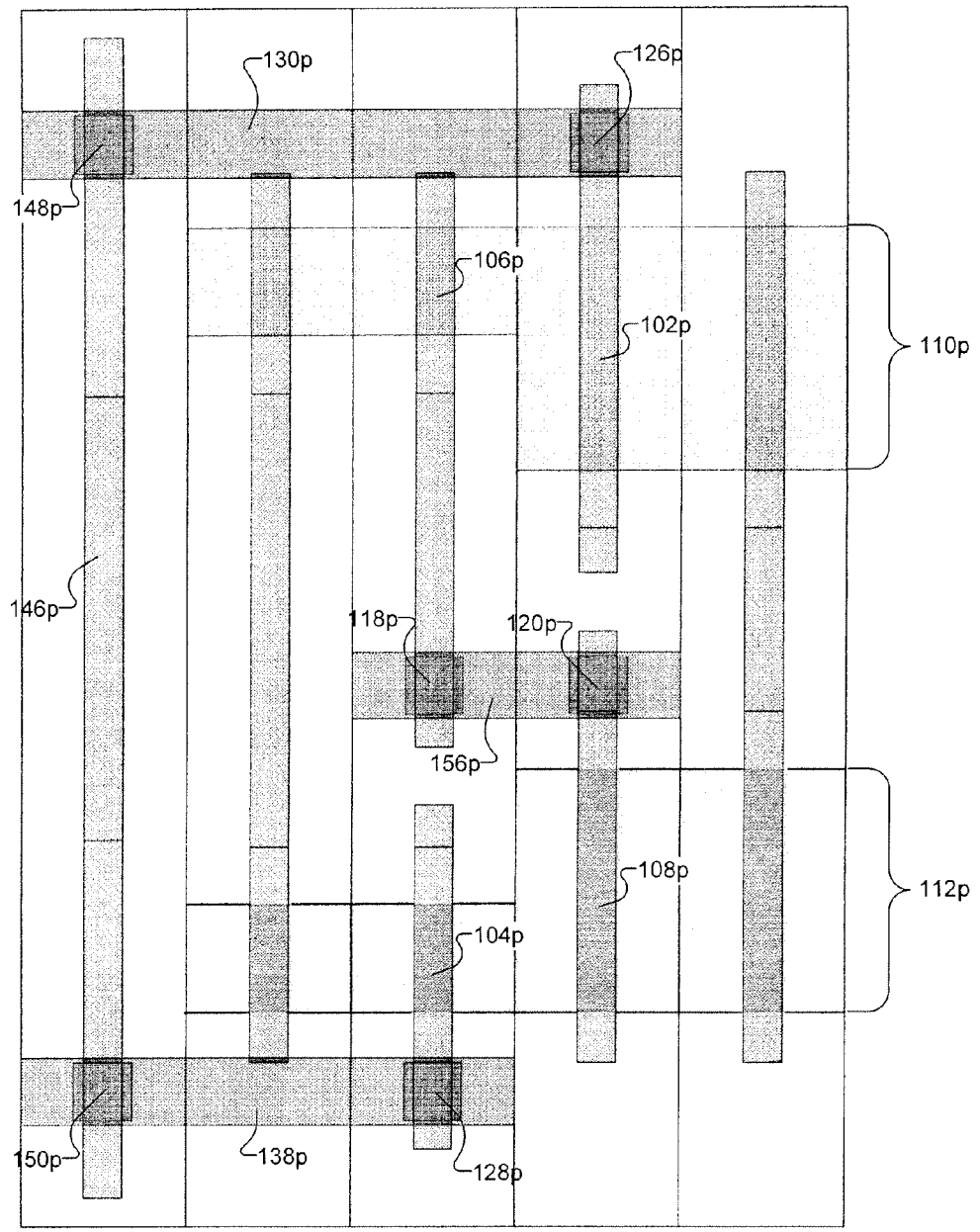

FIG. 38 is an illustration showing the cross-coupled transistor layout of FIG. 37, with the horizontal positions of the inner gate contacts 120*p*, 118*p* and outer gate contacts 126*p*, 128*p* respectively reversed, in accordance with one embodiment of the present invention.

Figure 39:
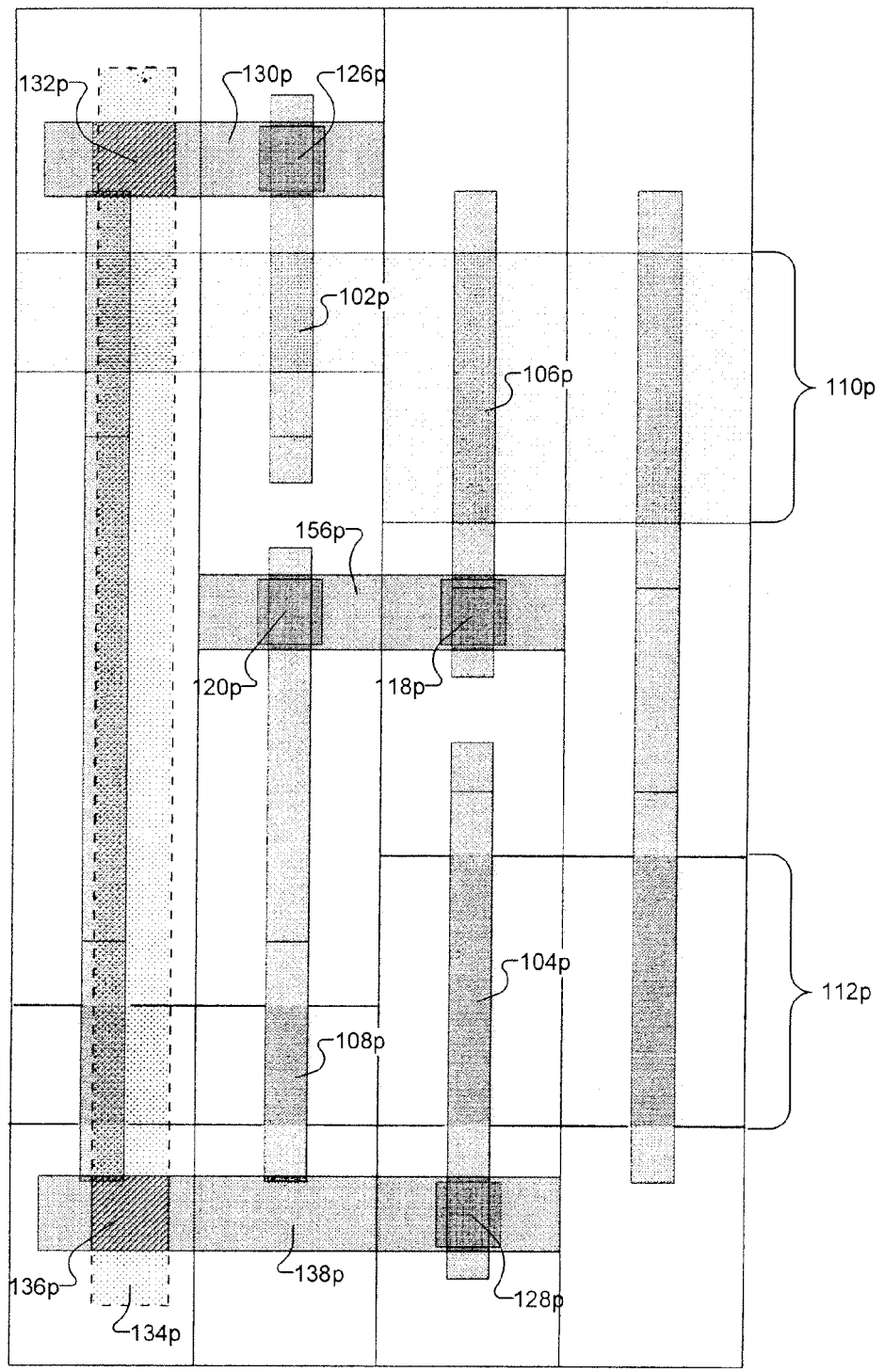

FIG. 39 is an illustration showing the cross-coupled transistor layout of FIG. 37, with the interconnect level feature 134*p* used to make the vertical portion of the connection between the outer contacts 126*p* and 128*p*, in accordance with one embodiment of the present invention. Thus, while the embodiment of FIG. 37 uses gate contacts 148p and 150p, and the linear gate level feature 146p to make the vertical portion of the connection between the outer contacts 126p and 128p, the embodiment of FIG. 39 uses vias 132p and 136p, and the interconnect level feature 134p to make the vertical portion of the connection between the outer contacts 126p and 128p. In one embodiment of FIG. 39, the interconnect level feature 134p is defined as second interconnect level feature, i.e., Metal-2 level feature. However, in other embodiments, the interconnect level feature 134p can be defined within an interconnect level other than the second interconnect level. It should be understood that the interconnect level feature 134p, used to connect the outer gate contacts 126p and 128p, can be placed essentially anywhere in the layout, i.e., can be horizontally shifted in either direction away from the cross-coupled transistors 102p, 104p, 106p, 108p, as necessary to satisfy layout requirements.

Figure 40:
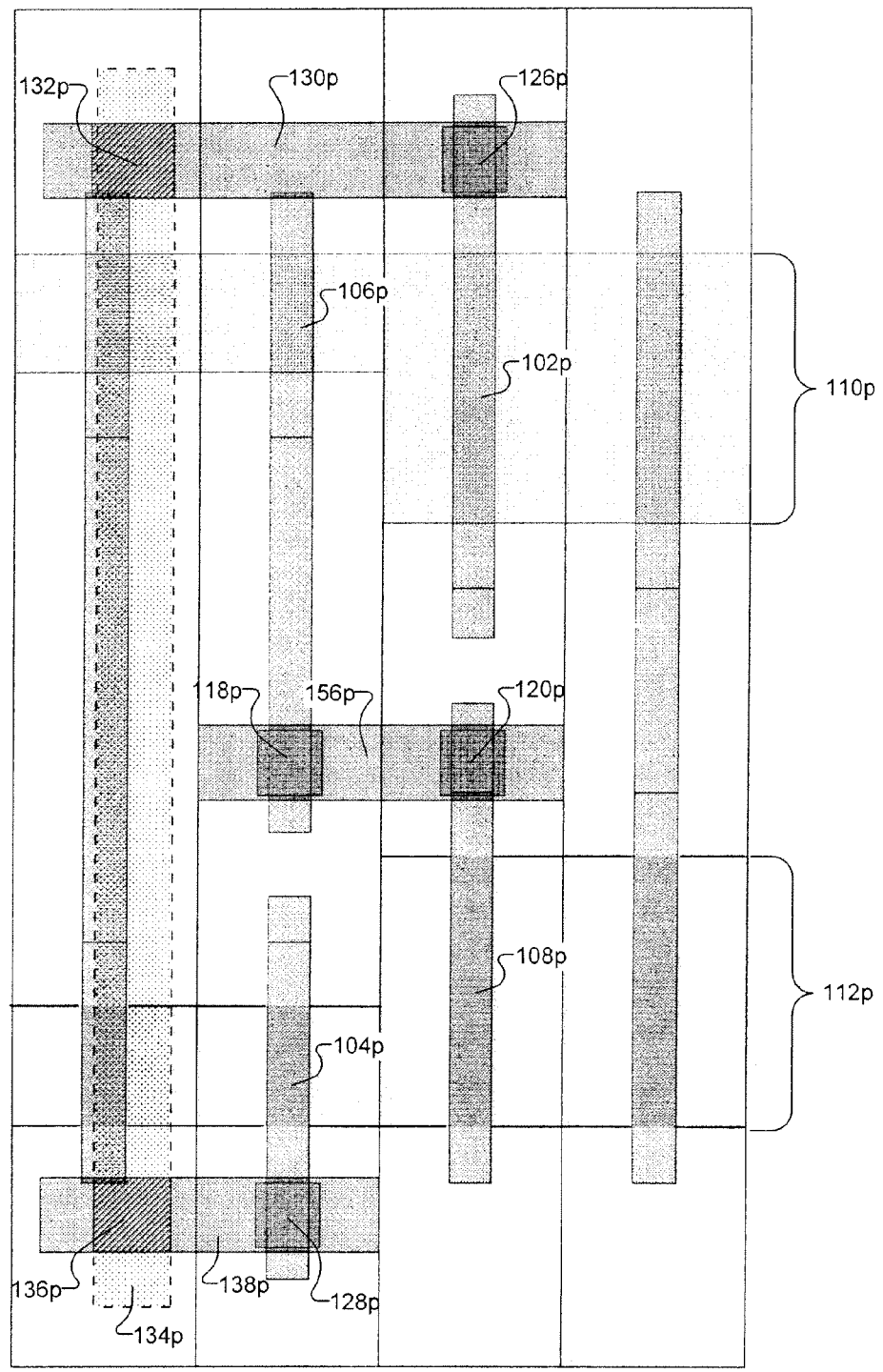

FIG. 40 is an illustration showing the cross-coupled transistor layout of FIG. 39, with the horizontal positions of the inner gate contacts 120p, 118p and outer gate contacts 126p, 128p respectively reversed, in accordance with one embodiment of the present invention.

Figure 41:
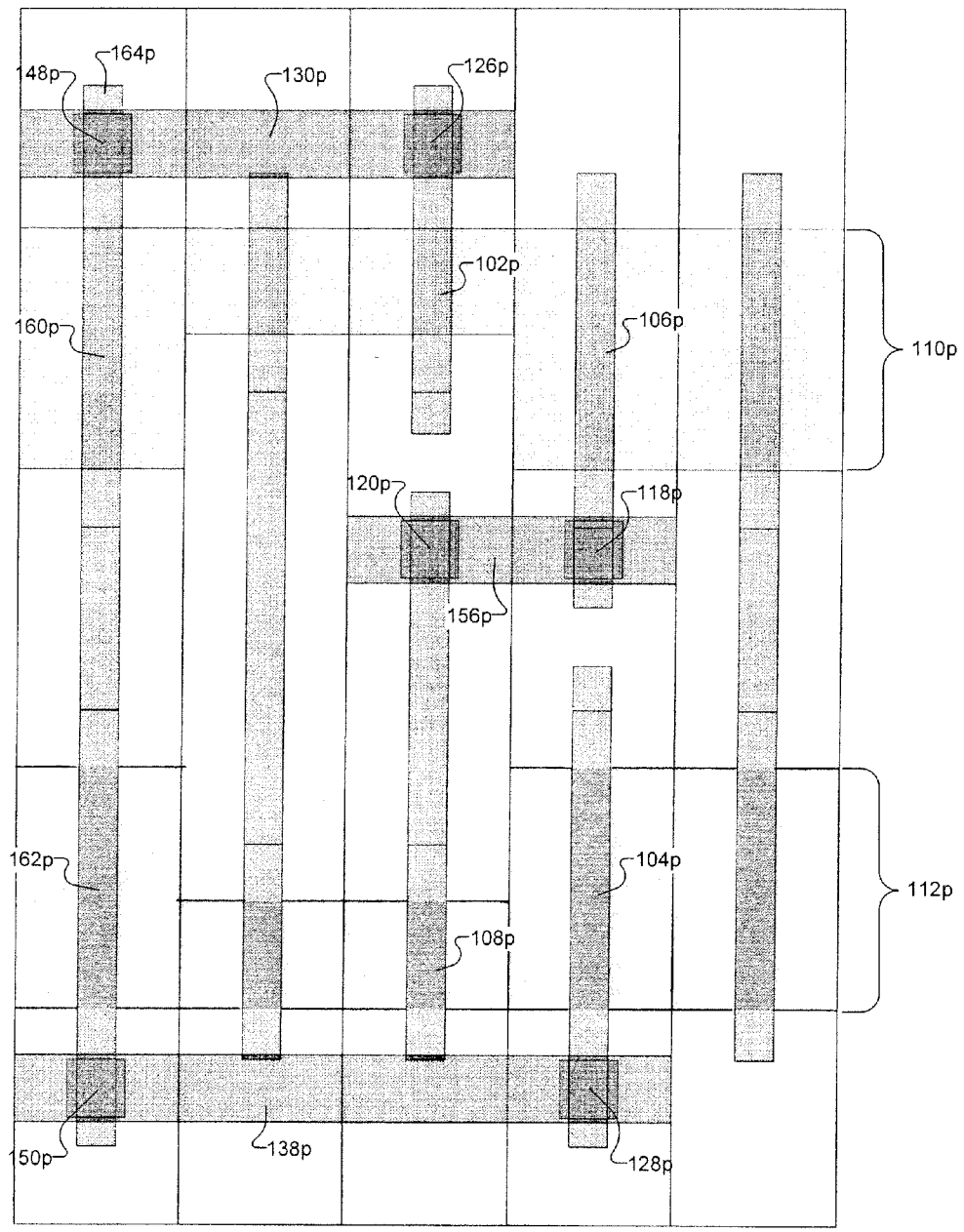

FIG. 41 is an illustration showing the latch-type cross-coupled transistor layout of FIG. 37, defined in connection with a MUX/latch, in accordance with one embodiment of the present invention. In contrast to the embodiment of FIG. 37 which utilizes a non-transistor linear gate level feature 146p to make the vertical portion of the connection between the outer contacts 126p and 128p, the embodiment of FIG. 41 utilizes a select/clock inverter of the MUX/latch to make the vertical portion of the connection between the outer contacts 126p and 128p, wherein the select/clock inverter of the MUX/latch is defined by transistors 160p and 162p. More specifically, transistor 102p of the cross-coupled transistors is driven through transistor 160p of the select/clock inverter. Similarly, transistor 104p of the cross-coupled transistors is driven through transistor 162p of the select/clock inverter. It should be understood that the linear gate level feature 164p, used to define the transistors 160p and 162p of the select/clock inverter and used to connect the outer gate contacts 126p and 128p, can be placed essentially anywhere in the layout, i.e., can be horizontally shifted in either direction away from the cross-coupled transistors 102p, 104p, 106p, 108p, as necessary to satisfy particular layout requirements.

Figure 42:
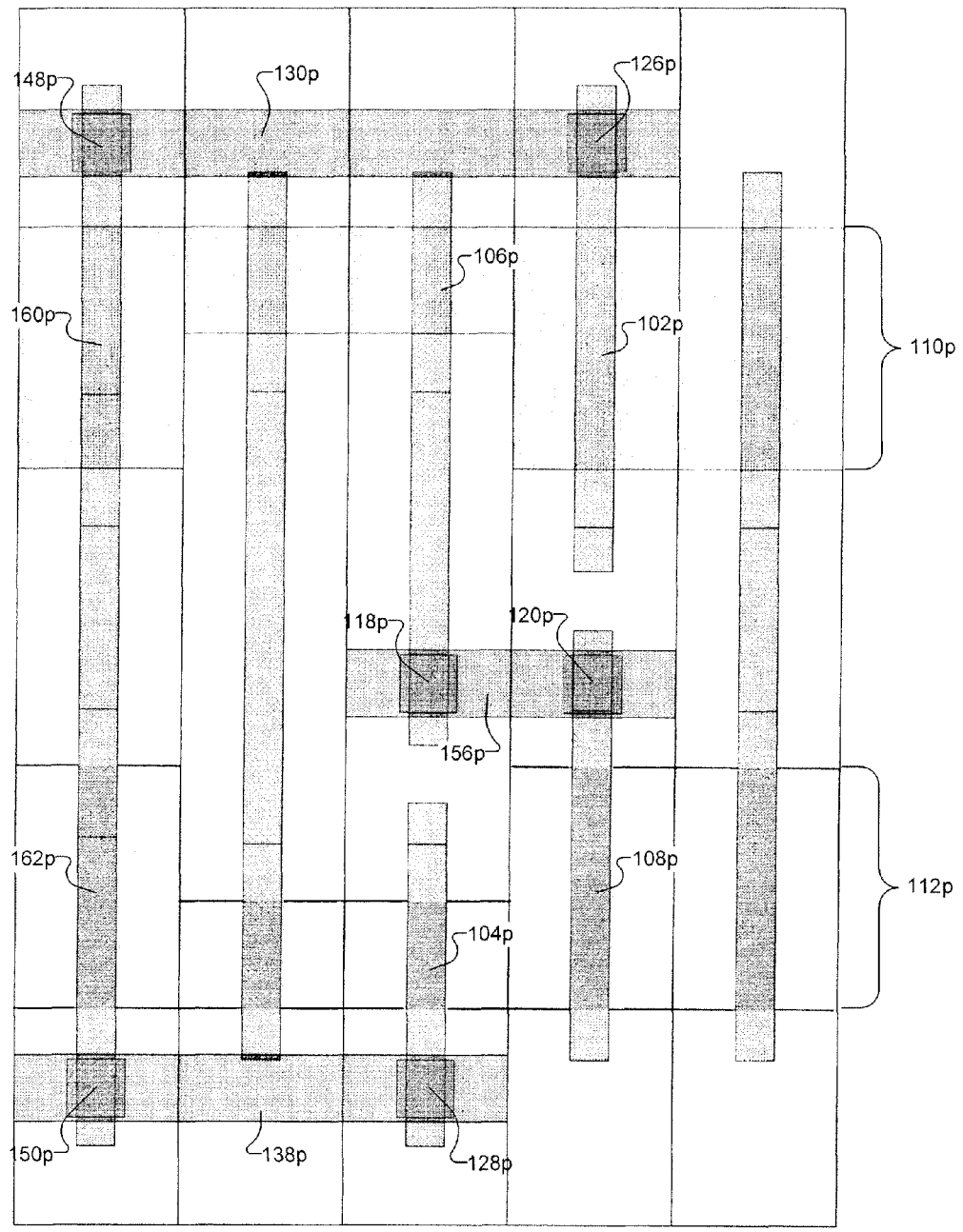

FIG. 42 is an illustration showing the cross-coupled transistor layout of FIG. 41, with the horizontal positions of the inner gate contacts 118p, 120p and outer gate contacts 126p, 128p respectively reversed, in accordance with one embodiment of the present invention.

Figure 43:
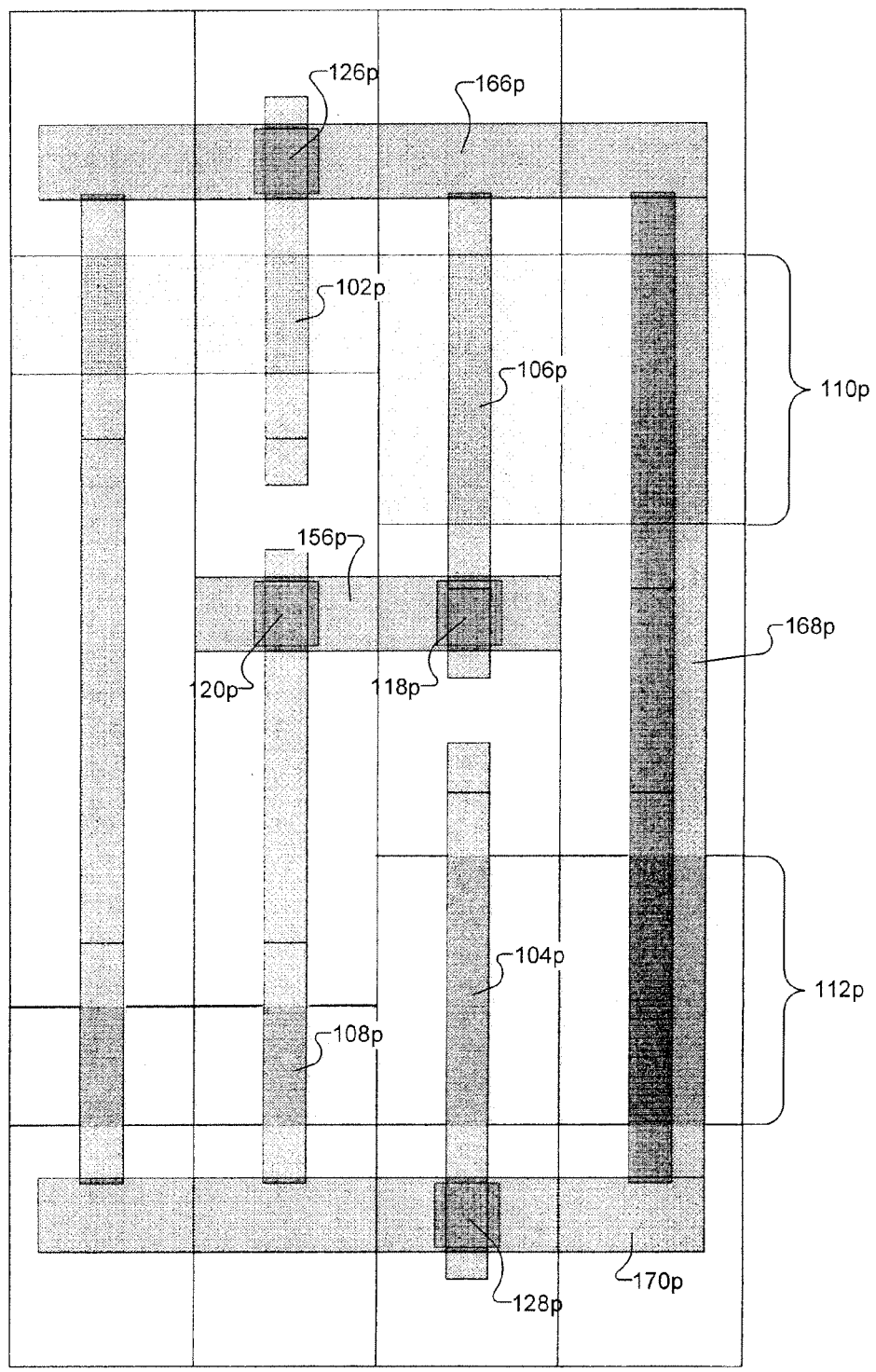

FIG. 43 is an illustration showing the latch-type cross-coupled transistor layout of FIG. 37, defined to have the outer gate contacts 126p and 128p connected using a single interconnect level, in accordance with one embodiment of the present invention. In contrast to the embodiment of FIG. 37 which utilizes a non-transistor linear gate level feature 146p to make the vertical portion of the connection between the outer contacts 126p and 128p, the embodiment of FIG. 43 uses a single interconnect level to make the horizontal and vertical portions of the connection between the outer contacts 126p and 128p. The gate electrode of transistor 102p is connected to the gate electrode of transistor 104p through gate contact 126p, through horizontal interconnect level feature 166p, through vertical interconnect level feature 168p, through horizontal interconnect level feature 170p, and through gate contact 128p. In one embodiment, the interconnect level features 166p, 168p, and 170p are first interconnect level features (Metal-1 features). However, in other embodiments, the interconnect level features 166p, 168p, and 170p can be defined collectively within any other interconnect level.

Figure 44:
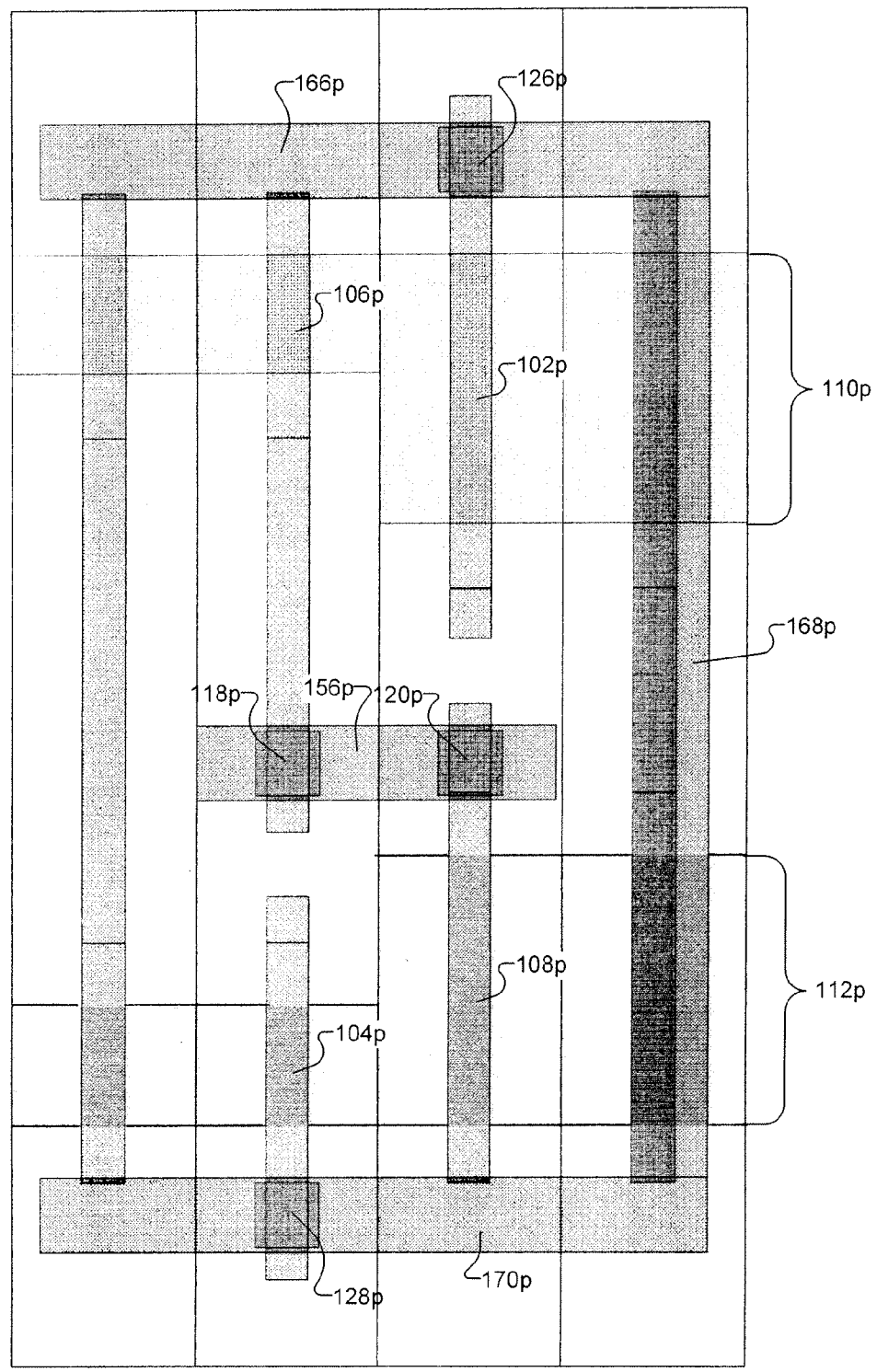

FIG. 44 is an illustration showing the cross-coupled transistor layout of FIG. 43, with the horizontal positions of the inner gate contacts 118p, 120p and outer gate contacts 126p, 128p respectively reversed, in accordance with one embodiment of the present invention.

Figure 45:
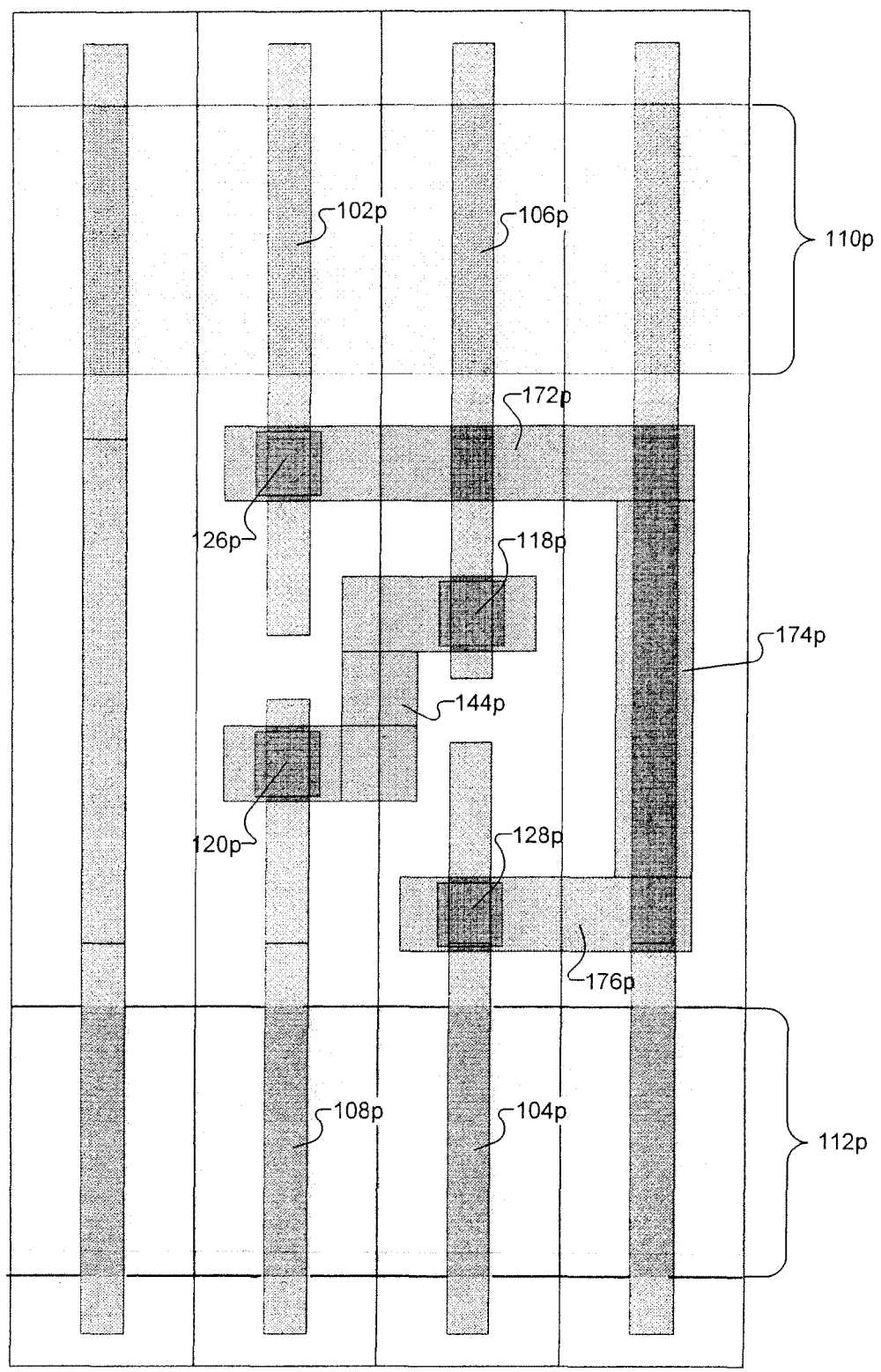

FIG. 45 is an illustration showing a cross-coupled transistor layout in which all four gate contacts 126p, 128p, 118p, and 120p of the cross-coupled coupled transistors are placed therebetween, in accordance with one embodiment of the present invention. Specifically, the gate contacts 126p, 128p, 118p, and 120p of the cross-coupled coupled transistors are placed vertically between the diffusion regions 110p and 112p that define the cross-coupled coupled transistors. The gate electrode of transistor 102p is connected to the gate electrode of transistor 104p through gate contact 126p, through horizontal interconnect level feature 172p, through vertical interconnect level feature 174p, through horizontal interconnect level feature 176p, and through gate contact 128p. In one embodiment, the interconnect level features 172p, 174p, and 176p are first interconnect level features (Metal-1 features). However, in other embodiments, the interconnect level features 172p, 174p, and 176p can be defined collectively within any other interconnect level. The gate electrode of transistor 108p is connected to the gate electrode of transistor 106p through gate contact 120p, through S-shaped interconnect level feature 144p, and through gate contact 118p. The S-shaped interconnect level feature 144p can be defined within any interconnect level. In one embodiment, the S-shaped interconnect level feature is defined within the first interconnect level (Metal-1 level).

Figure 46:
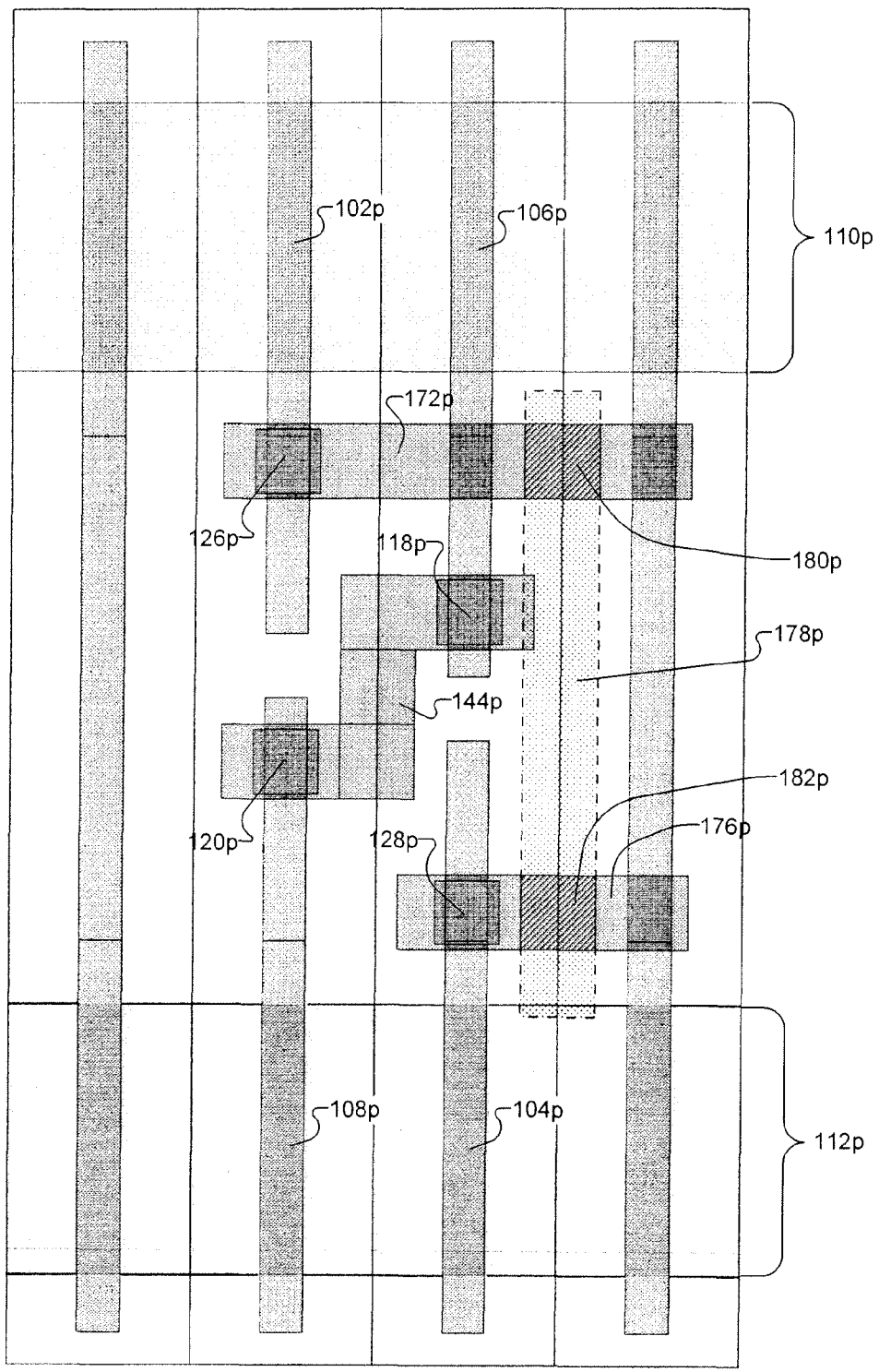

FIG. 46 is an illustration showing the cross-coupled transistor layout of FIG. 45, with multiple interconnect levels used to connect the gate contacts 126p and 128p, in accordance with one embodiment of the present invention. The gate electrode of transistor 102p is connected to the gate electrode of transistor 104p through gate contact 126p, through horizontal interconnect level feature 172p, through via 180p, through vertical interconnect level feature 178p, through via 182p, through horizontal interconnect level feature 176p, and through gate contact 128p. In one embodiment, the horizontal interconnect level features 172p and 176p are defined within the same interconnect level, e.g., Metal-1 level, and the vertical interconnect level feature 178p is defined within a higher interconnect level, e.g., Metal-2 level. It should be understood, however, that in other embodiments each of interconnect level features 172p, 178p, and 176p can be defined in separate interconnect levels.

Figure 47:
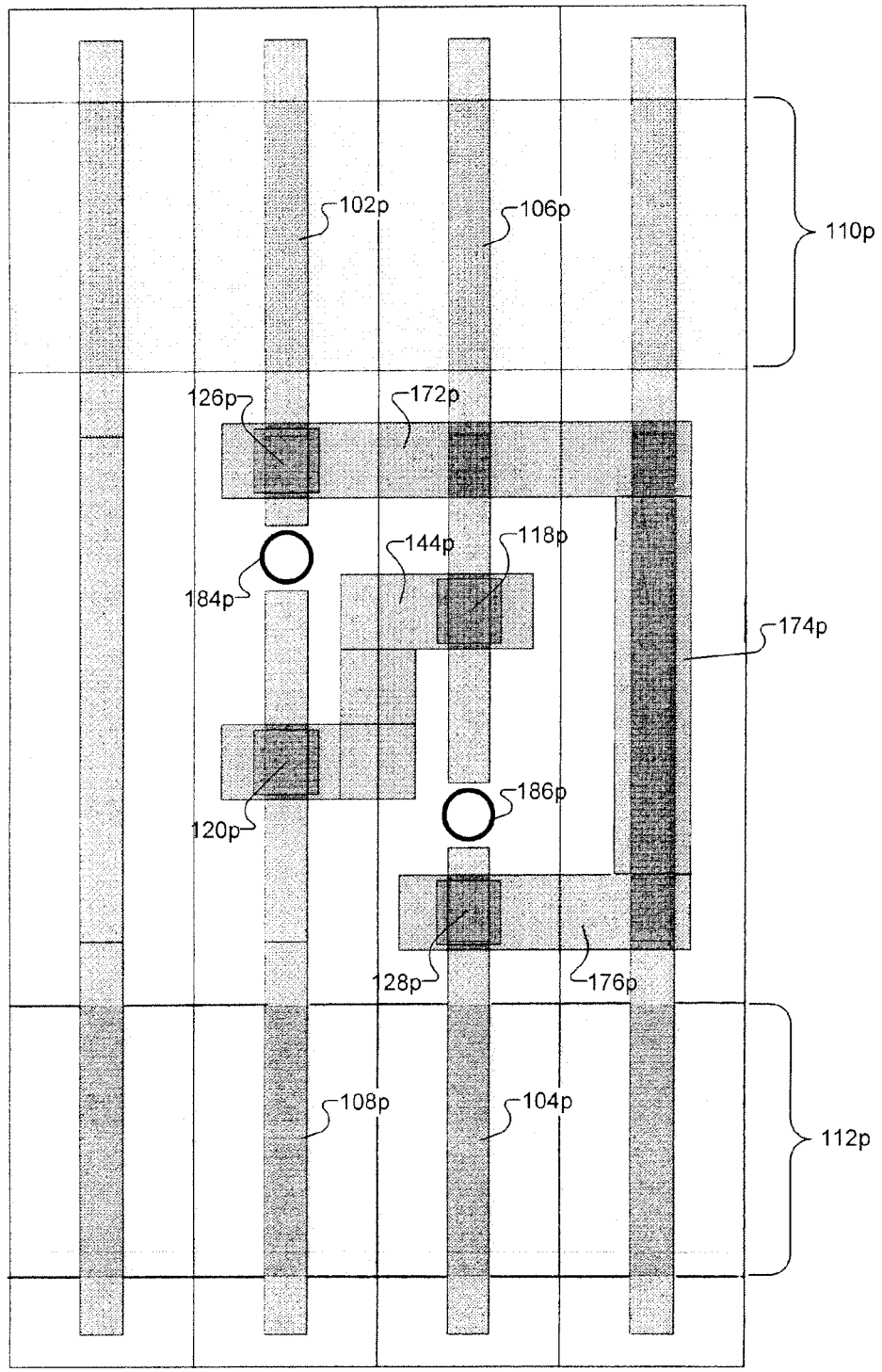

FIG. 47 is an illustration showing the cross-coupled transistor layout of FIG. 45, with increased vertical separation between line end spacings 184p and 186p, in accordance with one embodiment of the present invention. The increased vertical separation between line end spacings 184p and 186p can facilitate creation of the line end spacings 184p and 186p when formed using separate cut shapes in a cut mask.

Figure 48:
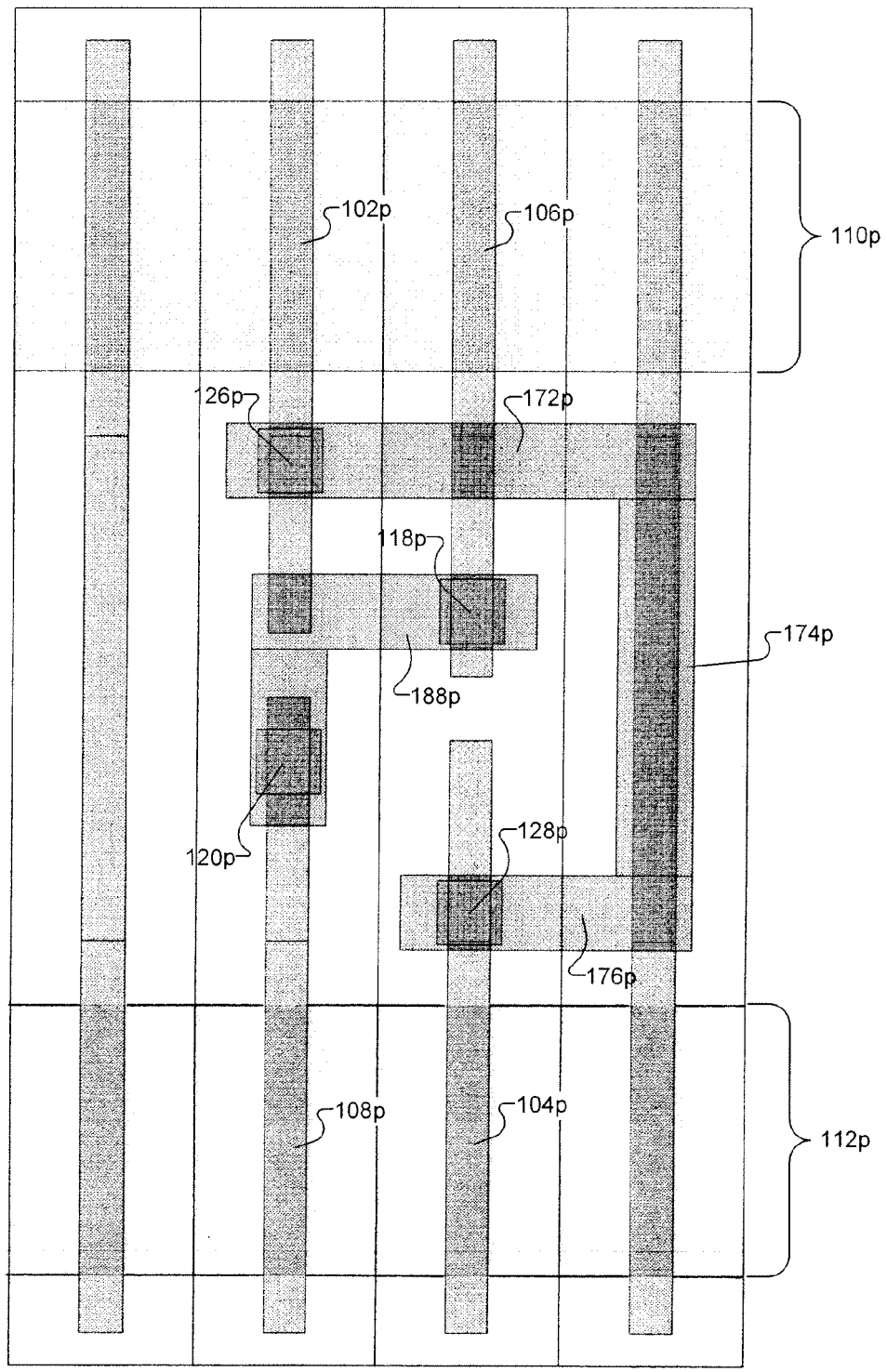

FIG. 48 is an illustration showing the cross-coupled transistor layout of FIG. 45, using an L-shaped interconnect level feature 188p to connect the gate contacts 120p and 118p, in accordance with one embodiment of the present invention.

Figure 49:
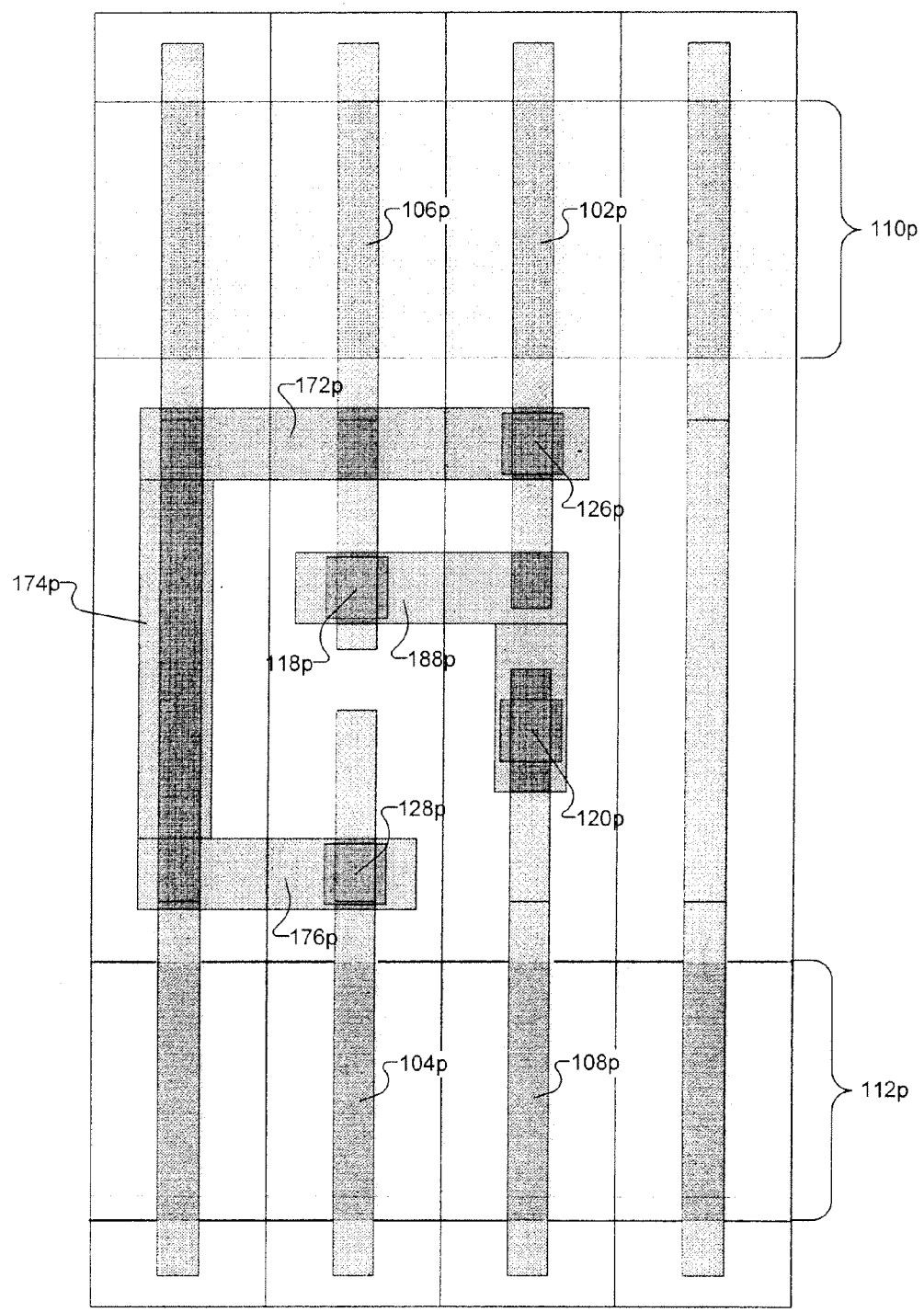

FIG. 49 is an illustration showing the cross-coupled transistor layout of FIG. 48, with the horizontal position of gate contacts 126p and 118p reversed, and with the horizontal position of gate contacts 120p and 128p reversed, in accordance with one embodiment of the present invention.

Figure 50:
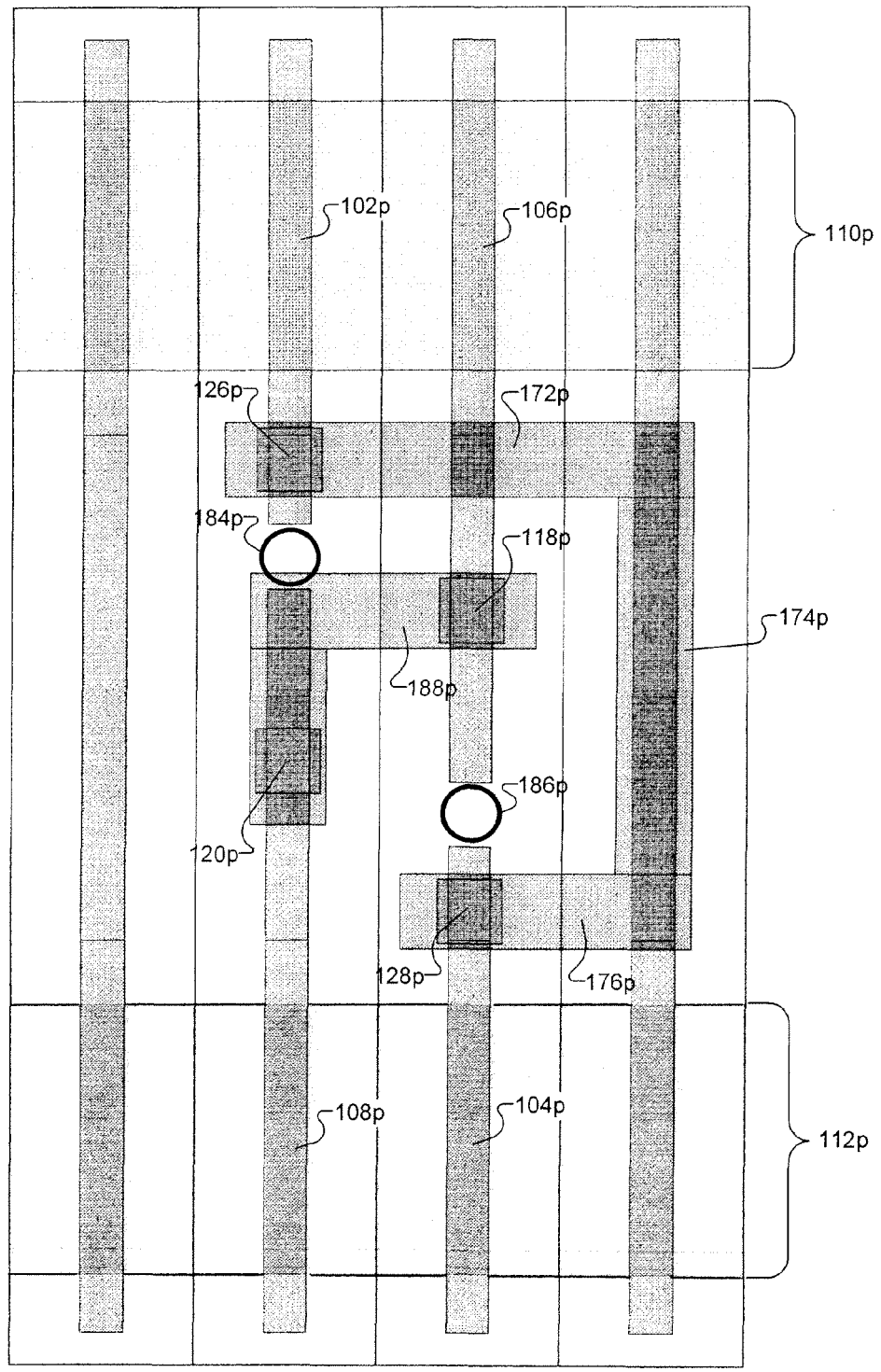

FIG. 50 is an illustration showing the cross-coupled transistor layout of FIG. 48, with increased vertical separation between line end spacings 184p and 186p, in accordance with one embodiment of the present invention. The increased vertical separation between line end spacings 184p and 186p can facilitate creation of the line end spacings 184p and 186p when formed using separate cut shapes in a cut mask.

Figure 51:
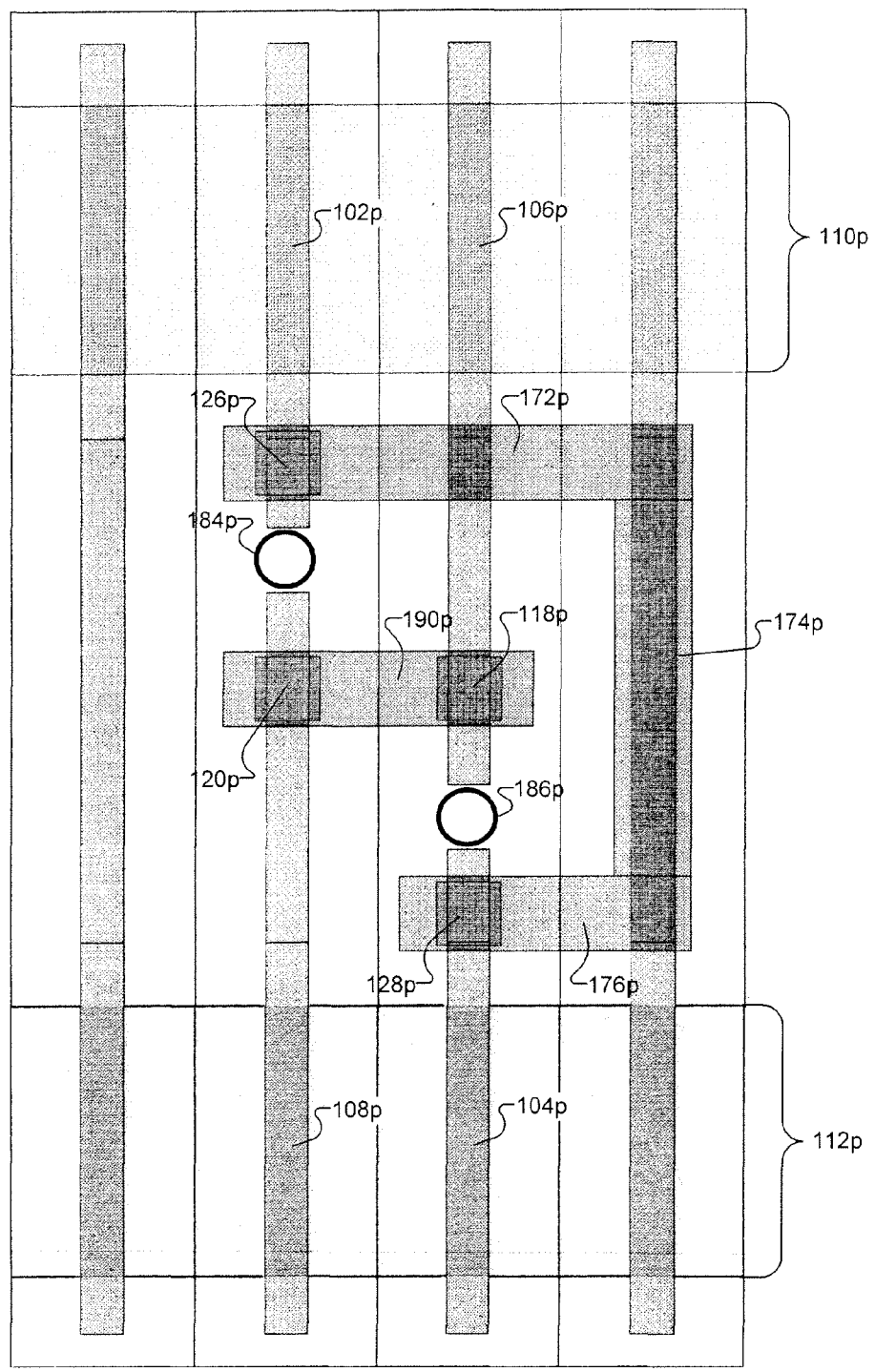

FIG. 51 is an illustration showing the cross-coupled transistor layout of FIG. 45, in which gate contacts 120p and 118p are vertically aligned, in accordance with one embodiment of the present invention. A linear-shaped interconnect level feature 190p is used to connect the vertically aligned gate contacts 120p and 118p. Also, in the embodiment of FIG. 51, an increased vertical separation between line end spacings 184p and 186p is provided to facilitate creation of the line end spacings 184p and 186p when formed using separate cut shapes in a cut mask, although use of a cut mask to fabricate the layout of FIG. 51 is not specifically required.

Figure 52:
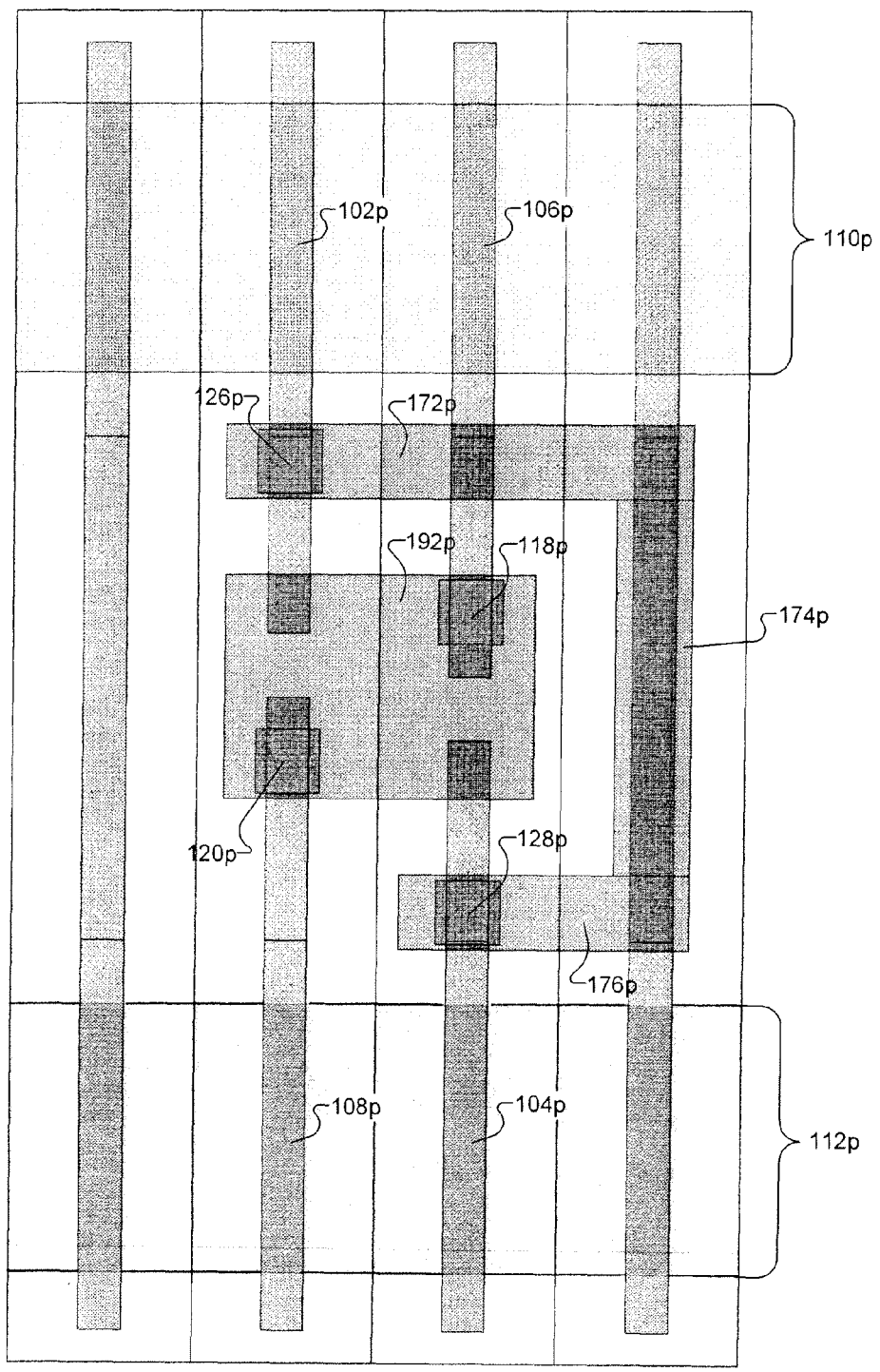

FIG. 52 is an illustration showing the cross-coupled transistor layout of FIG. 45, in which a linear-shaped interconnect level feature 192p is used to connect the non-vertically-aligned gate contacts 120p and 118p, in accordance with one embodiment of the present invention. It should be appreciated that the linear-shaped interconnect level feature 192p is stretched vertically to cover both of the gate contacts 120p and 118p.

Figure 53:
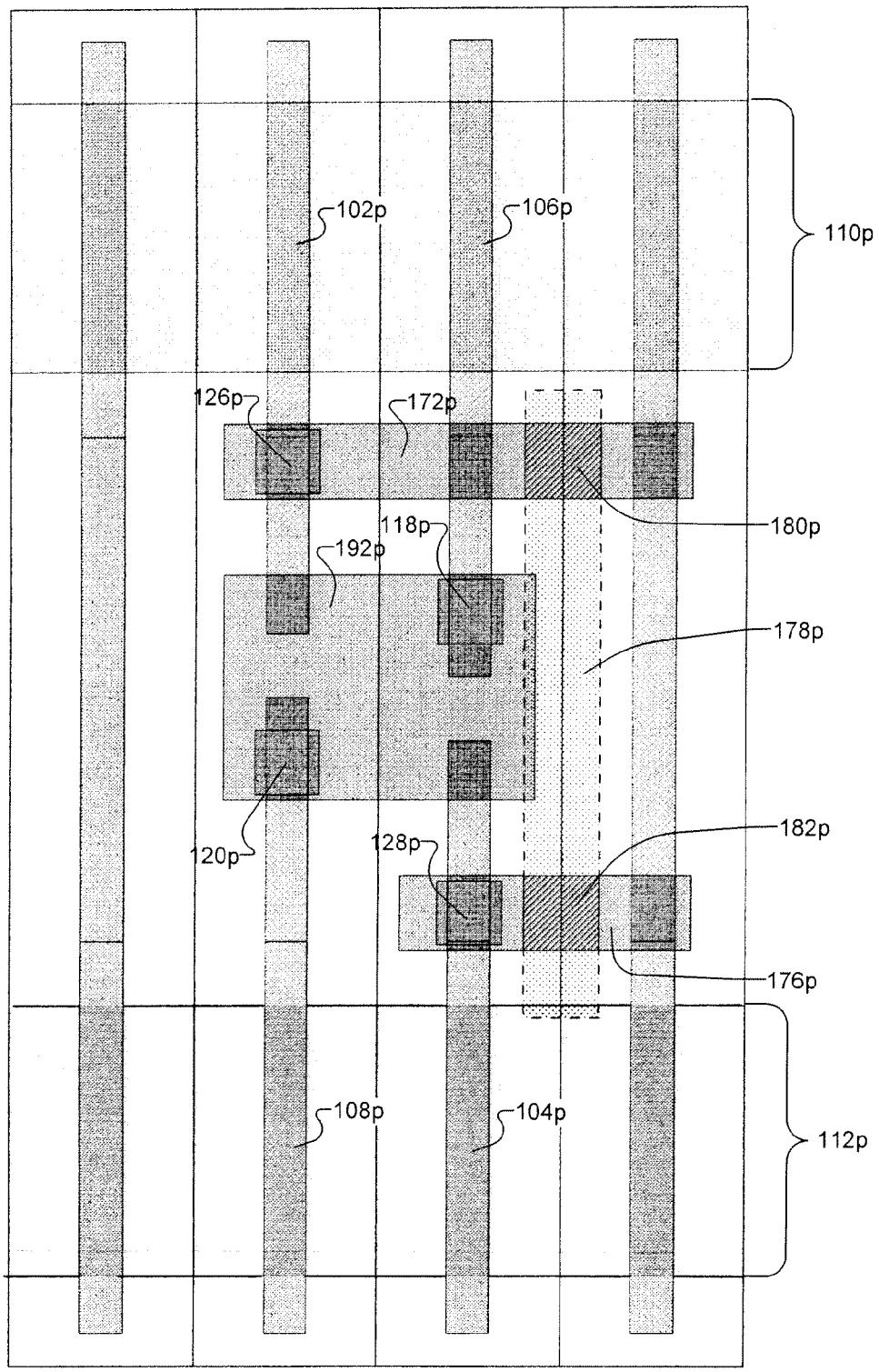

FIG. 53 is an illustration showing the cross-coupled transistor layout of FIG. 52, with multiple interconnect levels used to connect the gate contacts 126p and 128p, in accordance with one embodiment of the present invention. The gate electrode of transistor 102p is connected to the gate electrode of transistor 104p through gate contact 126p, through horizontal interconnect level feature 172p, through via 180p, through vertical interconnect level feature 178p, through via 182p, through horizontal interconnect level feature 176p, and through gate contact 128p. In one embodiment, the horizontal interconnect level features 172p and 176p are defined within the same interconnect level, e.g., Metal-1 level, and the vertical interconnect level feature 178p is defined within a higher interconnect level, e.g., Metal-2 level. It should be understood, however, that in other embodiments each of interconnect level features 172p, 178p, and 176p can be defined in separate interconnect levels.

Figure 54:
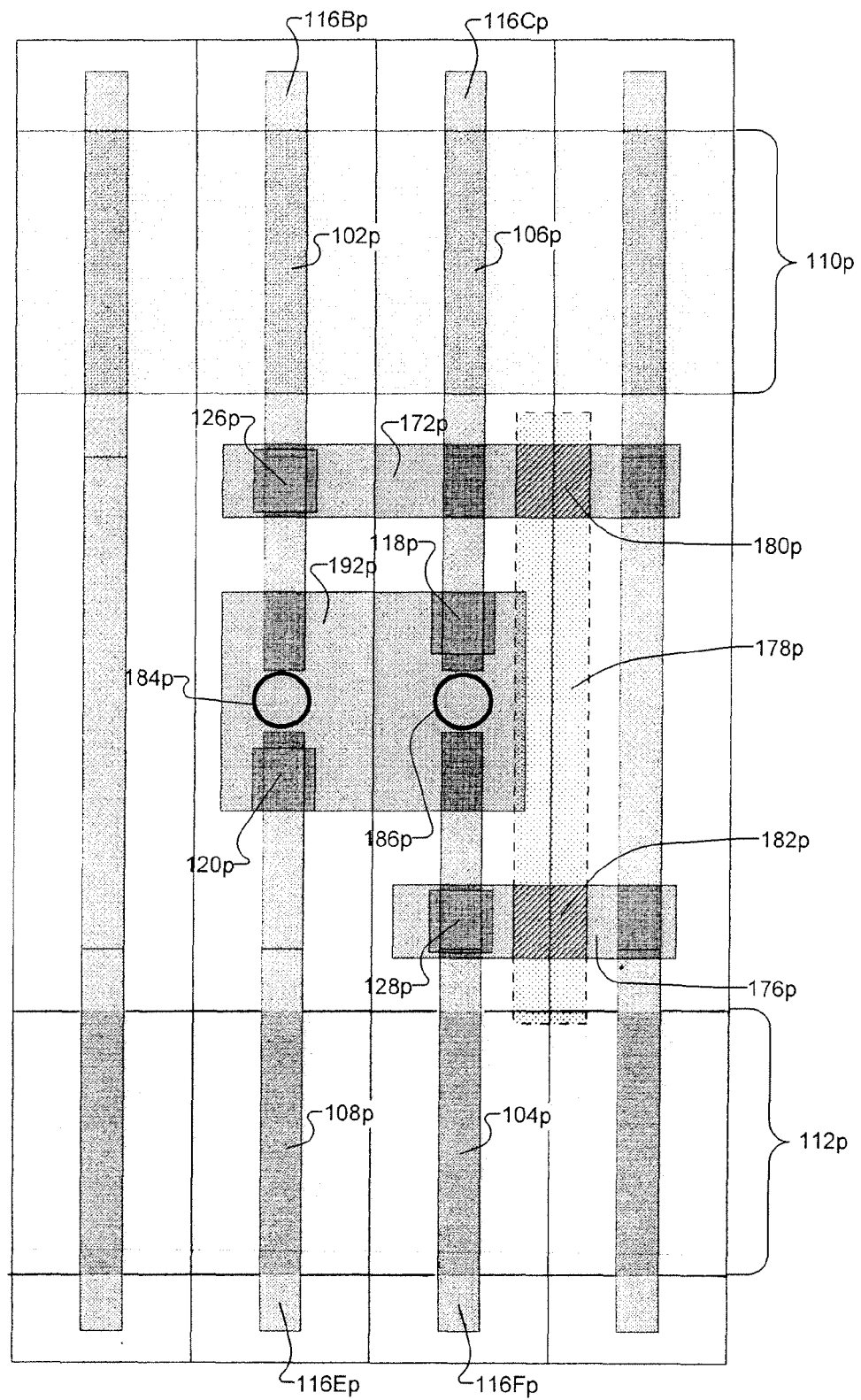

FIG. 54 is an illustration showing the cross-coupled transistor layout of FIG. 53, with the vertical positions of gate contacts 118p and 120p adjusted to enable alignment of the line end spacings between co-linearly aligned gate level features, in accordance with one embodiment of the present invention. Specifically, gate contact 118p is adjusted vertically upward, and gate contact 120p is adjusted vertically downward. The linear gate level features 116Bp and 116Ep are then adjusted such that the line end spacing 184p therebetween is substantially vertically centered within area shadowed by the interconnect level feature 192p. Similarly, the linear gate level features 116Cp and 116Fp are then adjusted such that the line end spacing 186p therebetween is substantially vertically centered within area shadowed by the interconnect level feature 192p. Therefore the line end spacing 184p is substantially vertically aligned with the line end spacing 186p. This vertical alignment of the line end spacings 184p and 186p allows for use of a cut mask to define the line end spacings 184p and 186p. In other words, linear gate level features 116Bp and 116Ep are initially defined as a single continuous linear gate level feature, and linear gate level features 116Cp and 116Fp are initially defined as a single continuous linear gate level feature. Then, a cut mask is used to remove a portion of each of the single continuous linear gate level features so as to form the line end spacings 184p and 186p. As previously discussed with regard to FIG. 29, although edge-alignment between the gate contacts 118p, 120p and the interconnect level feature 192p can be utilized in one embodiment, it should be understood that such edge-alignment between gate contact and interconnect level feature is not required in all embodiments.

Figure 55:
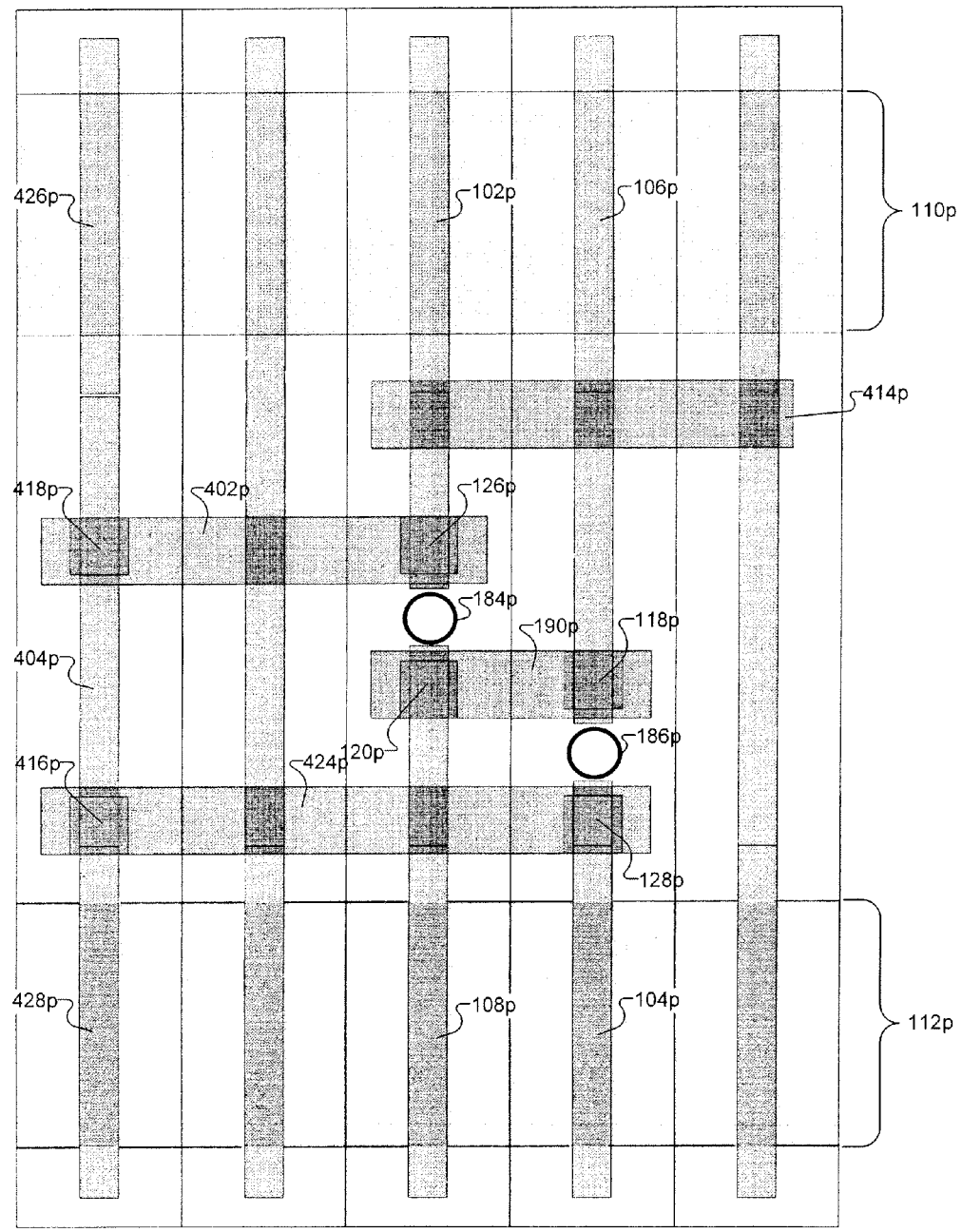

FIG. 55 is an illustration showing a cross-coupled transistor layout in which the four gate contacts 126p, 128p, 120p, and 118p are placed within three consecutive horizontal tracks of an interconnect level, in accordance with one embodiment of the present invention. The gate electrode of transistor 102p is connected to the gate electrode of transistor 104p through gate contact 126p, through horizontal interconnect level feature 402p, through gate contact 418p, through vertical gate level feature 404p, through gate contact 416p, through horizontal interconnect level feature 424p, and through gate contact 128p. The vertical gate level feature 404p represents a common node to which the gate electrodes of transistors 426p and 428p are connected. It should be understood that the vertical gate level feature 404p can be shifted left or right relative to the cross-coupled transistors 102p, 104p, 106p, 108p, as necessary for layout purposes. Also, the gate electrode of transistor 106p is connected to the gate electrode of transistor 108p through gate contact 118p, through horizontal interconnect level feature 190p, and through gate contact 120p.

It should be appreciated that placement of gate contacts 126p, 128p, 120p, and 118p within three consecutive horizontal interconnect level tracks allows for an interconnect level track 414p to pass through the cross-coupled transistor layout. Also, it should be understood that the interconnect level features 402p, 424p, and 190p can be defined in the same interconnect level or in different interconnect levels. In one embodiment, each of the interconnect level features 402p, 424p, and 190p is defined in a first interconnect level (Metal-1 level).

Figure 56:
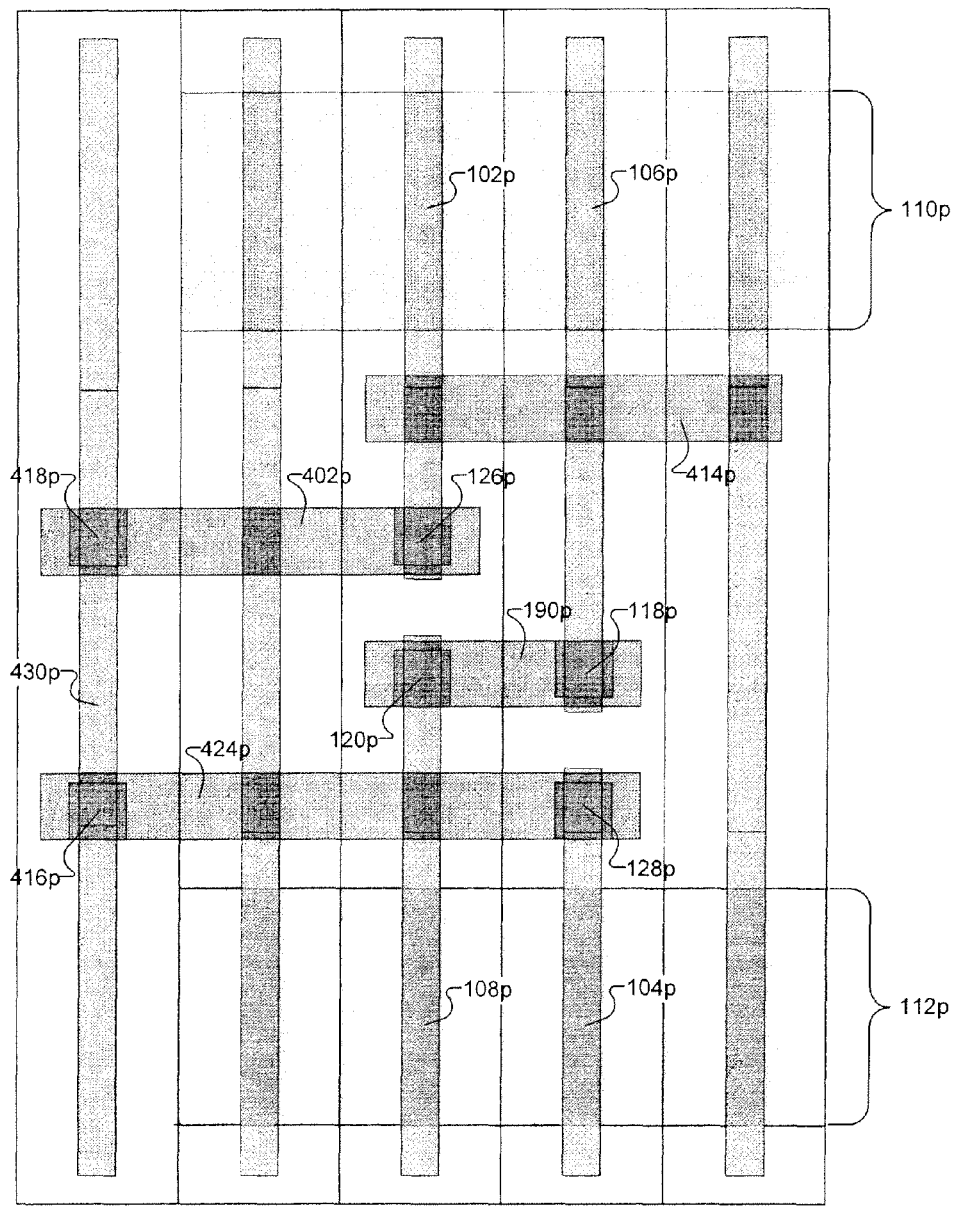

FIG. 56 is an illustration showing the cross-coupled transistor layout of FIG. 55, in which a non-transistor gate level feature 430p is used to make the vertical portion of the connection between gate contacts 126p and 126p, in accordance with one embodiment of the present invention. The gate electrode of transistor 102p is connected to the gate electrode of transistor 104p through gate contact 126p, through horizontal interconnected level feature 402p, through gate contact 418p, through vertical non-transistor gate level feature 430p, through gate contact 416p, through horizontal interconnect level feature 424p, and through gate contact 128p.

Figure 57:
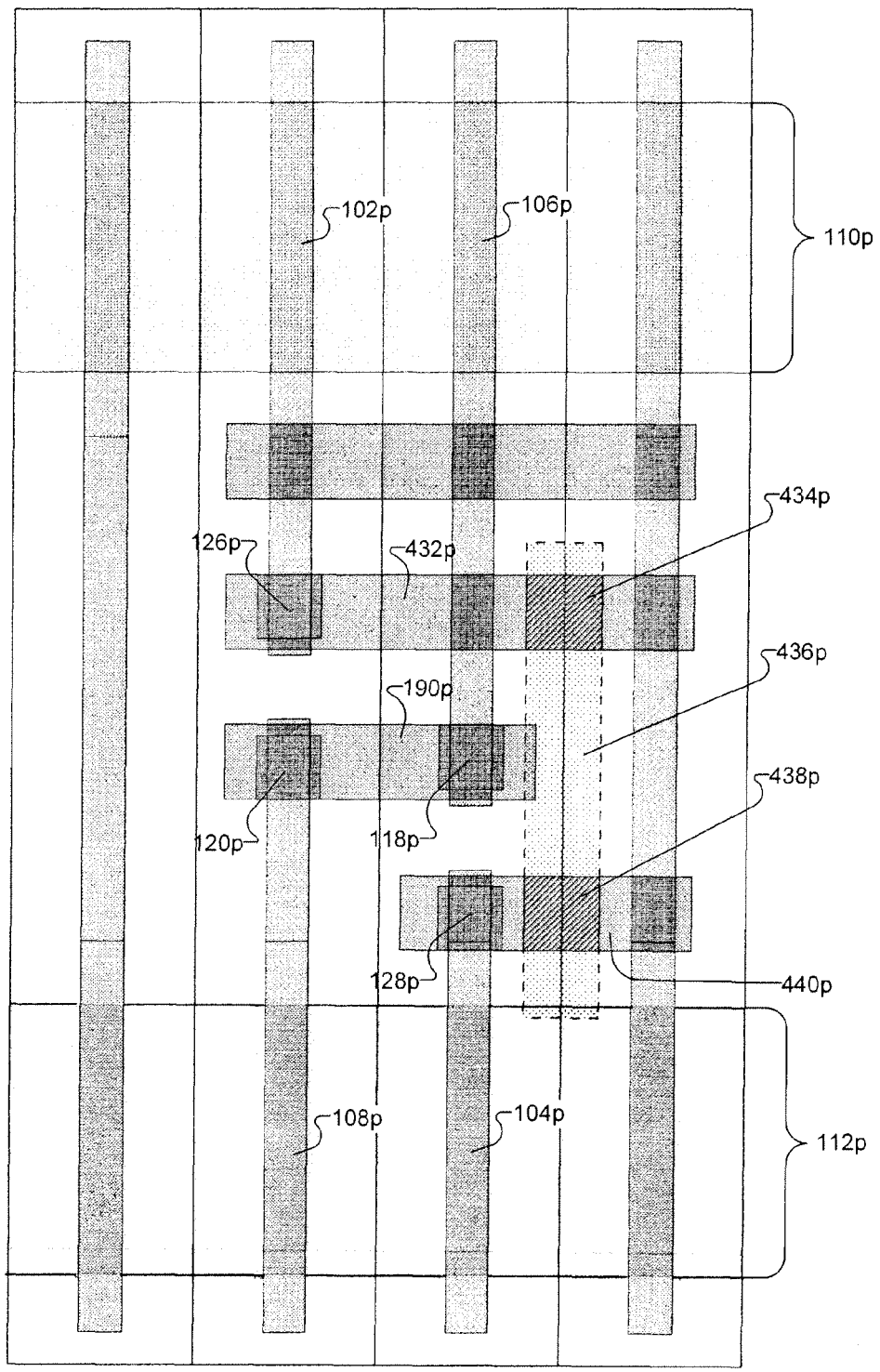

FIG. 57 is an illustration showing a cross-coupled transistor layout in which the four gate contacts 126p, 128p, 120p, and 118p are placed within three consecutive horizontal tracks of an interconnect level, and in which multiple interconnect levels are used to connect the gate contacts 126p and 128p, in accordance with one embodiment of the present invention. The gate electrode of transistor 102p is connected to the gate electrode of transistor 104p through gate contact 126p, through horizontal interconnect level feature 432p, through via 434p, through vertical interconnect level feature 436p, through via 438p, through horizontal interconnect level feature 440p, and through gate contact 128p. The vertical interconnect level feature 436p is defined within an interconnect level different from the interconnect level in which the horizontal interconnect level features 432p and 440p are defined. In one embodiment, the horizontal interconnect level features 432p and 440p are defined within a first interconnect level (Metal-1 level), and the vertical interconnect level feature 436p is defined within a second interconnect level (Metal-2 level). It should be understood that the vertical interconnect level feature 436p can be shifted left or right relative to the cross-coupled transistors 102p, 104p, 106p, 108p, as necessary for layout purposes. Also, the gate electrode of transistor 106p is connected to the gate electrode of transistor 108p through gate contact 118p, through horizontal interconnect level feature 190p, and through gate contact 120p.

Figure 58:
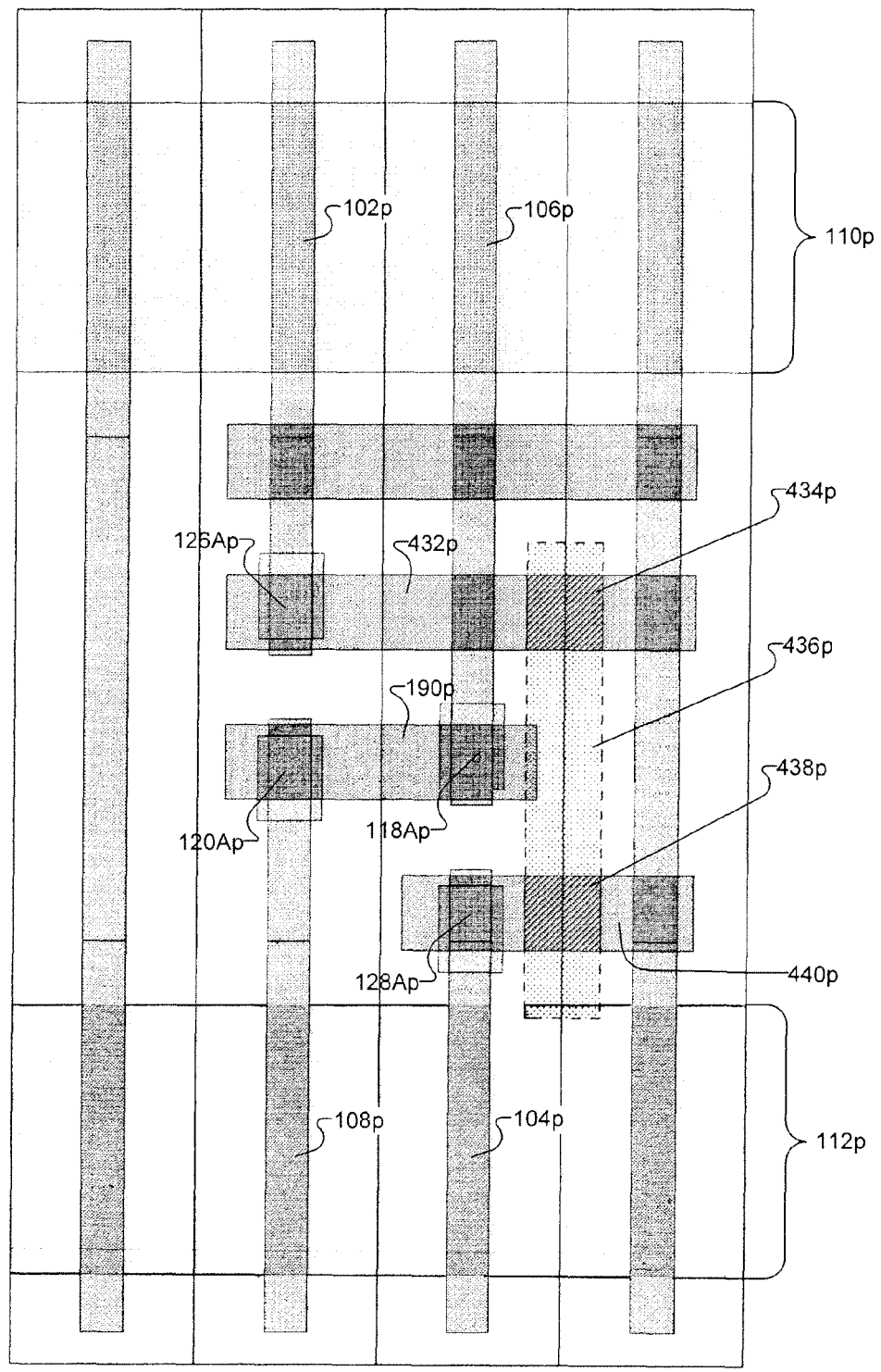

FIG. 58 is an illustration showing the cross-coupled transistor layout of FIG. 57, in which the gate contacts 126Ap, 118Ap, 120Ap, and 128Ap are extended in the vertical direction to provided additional overlap with their respective underlying gate level feature, in accordance with one embodiment of the present invention. The additional overlap of the gate level features by the gate contacts 126Ap, 118Ap, 120Ap, and 128Ap may be provided to satisfy design rules.

Figure 59:
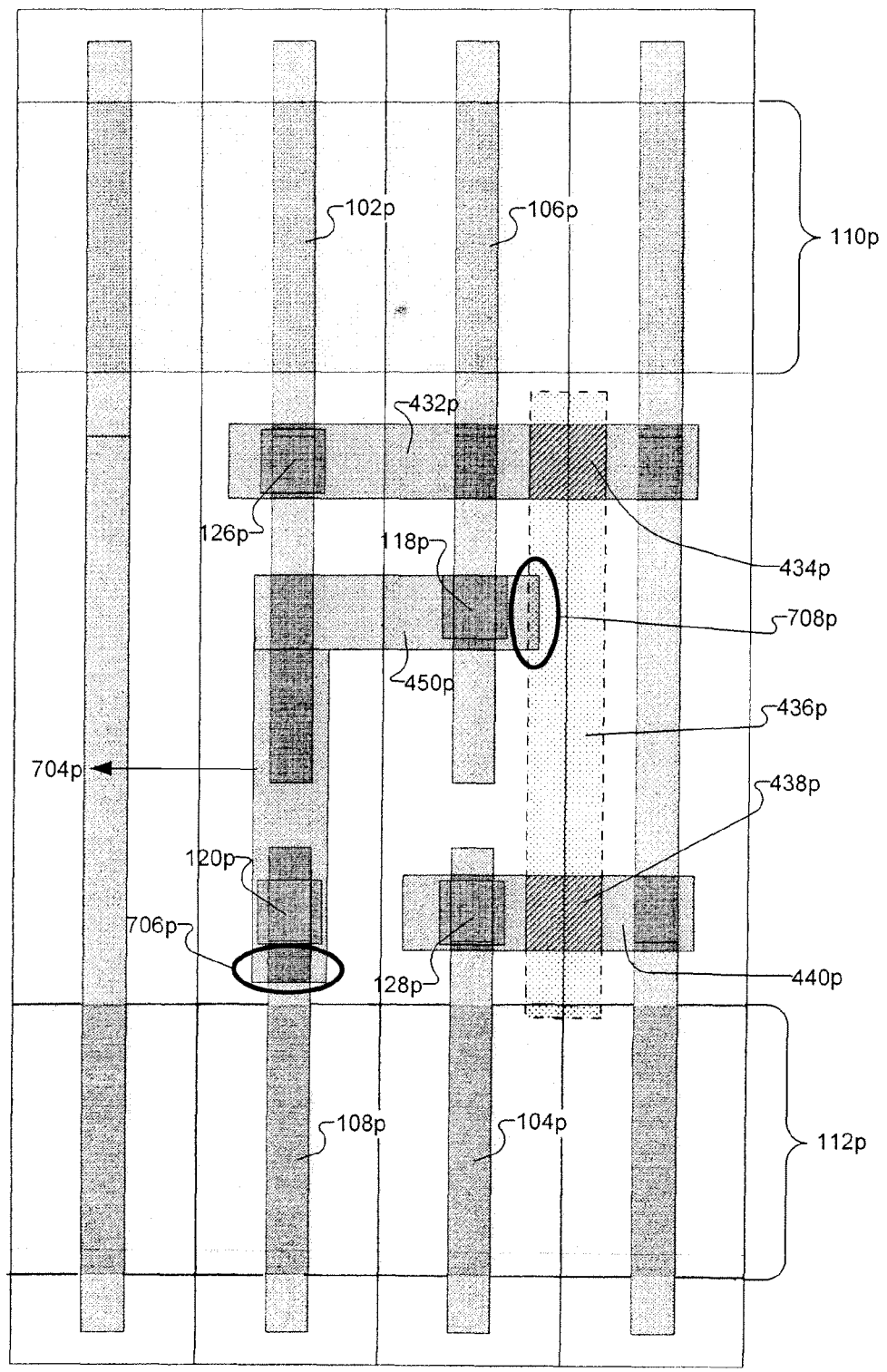

FIG. 59 is an illustration showing the cross-coupled transistor layout of FIG. 57, in which the gate contacts 126p, 118p, 120p, and 128p are placed within four consecutive interconnect level tracks with an intervening vacant interconnect level track 704p, in accordance with one embodiment of the present invention. The gate electrode of transistor 102p is connected to the gate electrode of transistor 104p through gate contact 126p, through horizontal interconnect level feature 432p, through via 434p, through vertical interconnect level feature 436p, through via 438p, through horizontal interconnect level feature 440p, and through gate contact 128p. The gate electrode of transistor 106p is connected to the gate electrode of transistor 108p through gate contact 118p, through L-shaped interconnect level feature 450p, and through gate contact 120p. As shown at locations 706p and 708p, the L-shaped interconnect level feature 450p can be extended beyond the gate contacts 120p and 118p to provide sufficient overlap of the gate contacts by the L-shaped interconnect level feature 450p, as needed to satisfy design rules.

Figure 60:
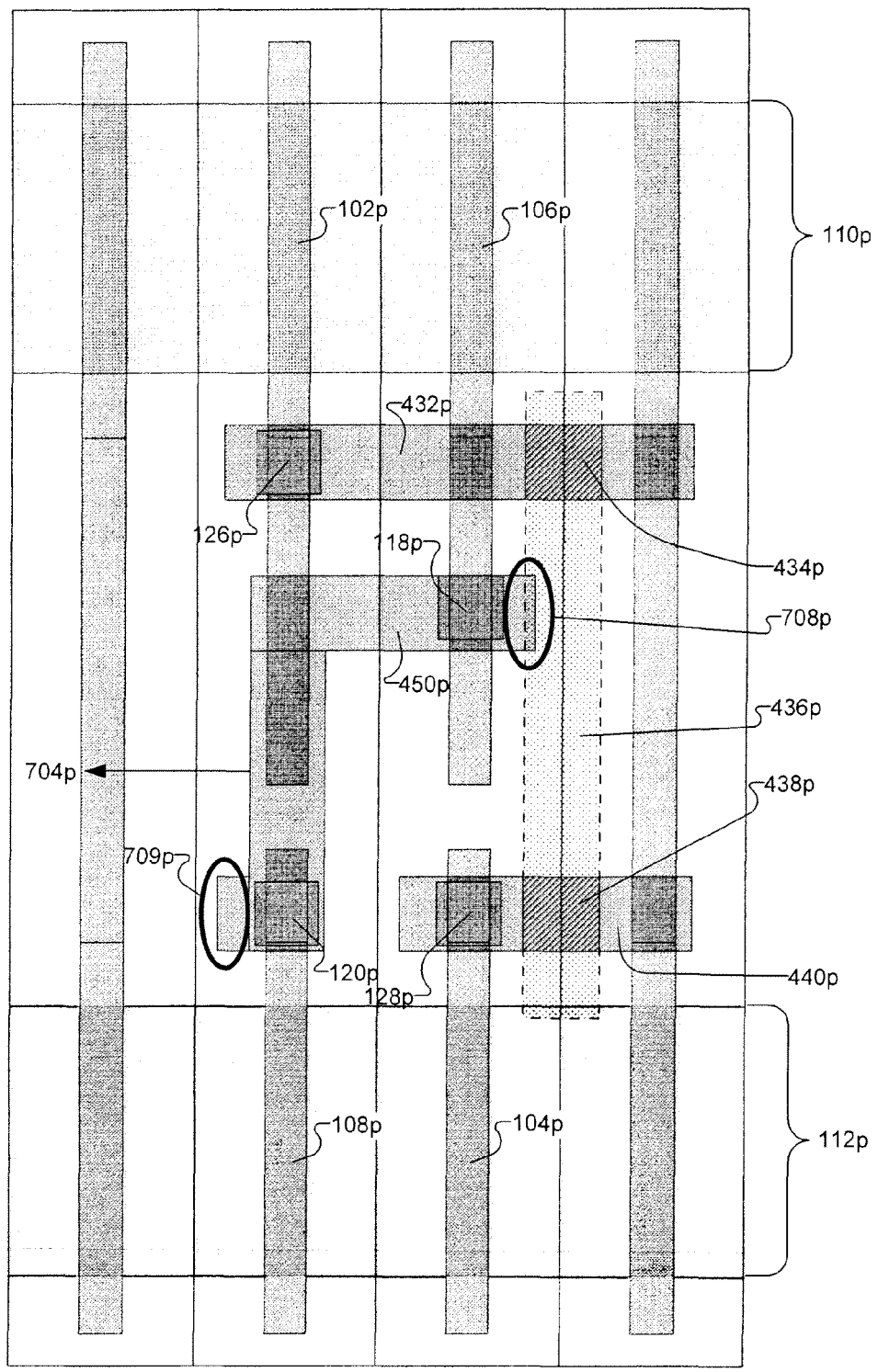
Figure 61:
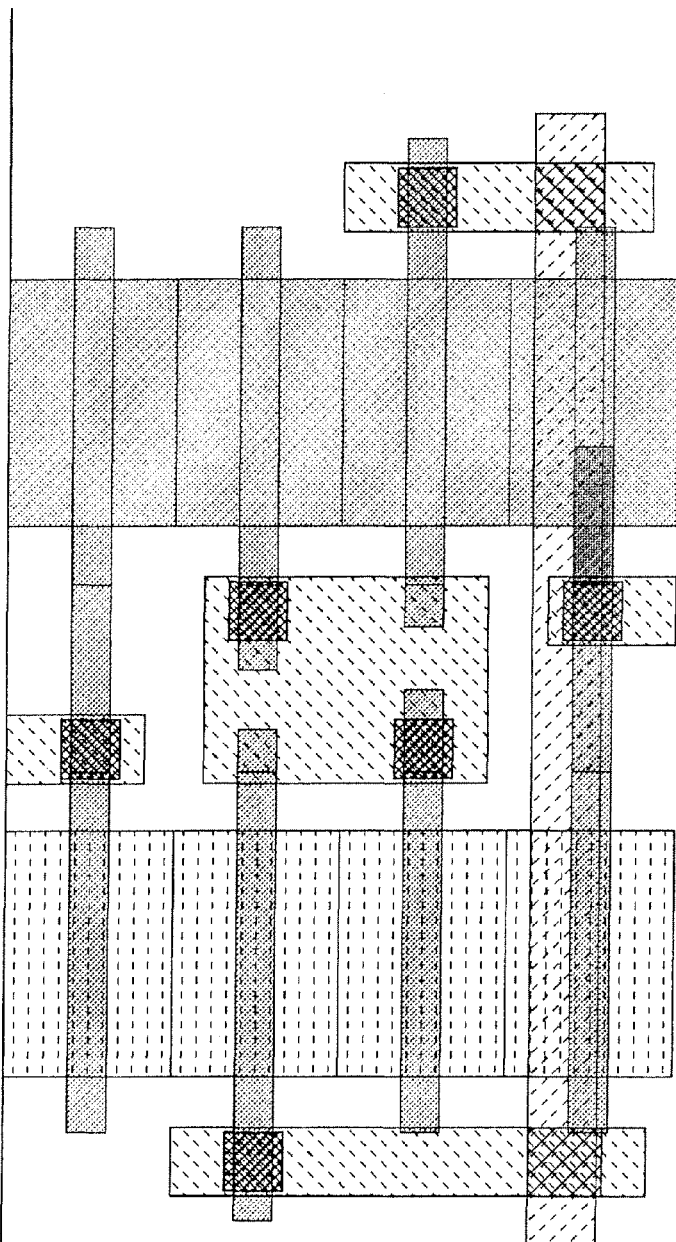
Figure 62:
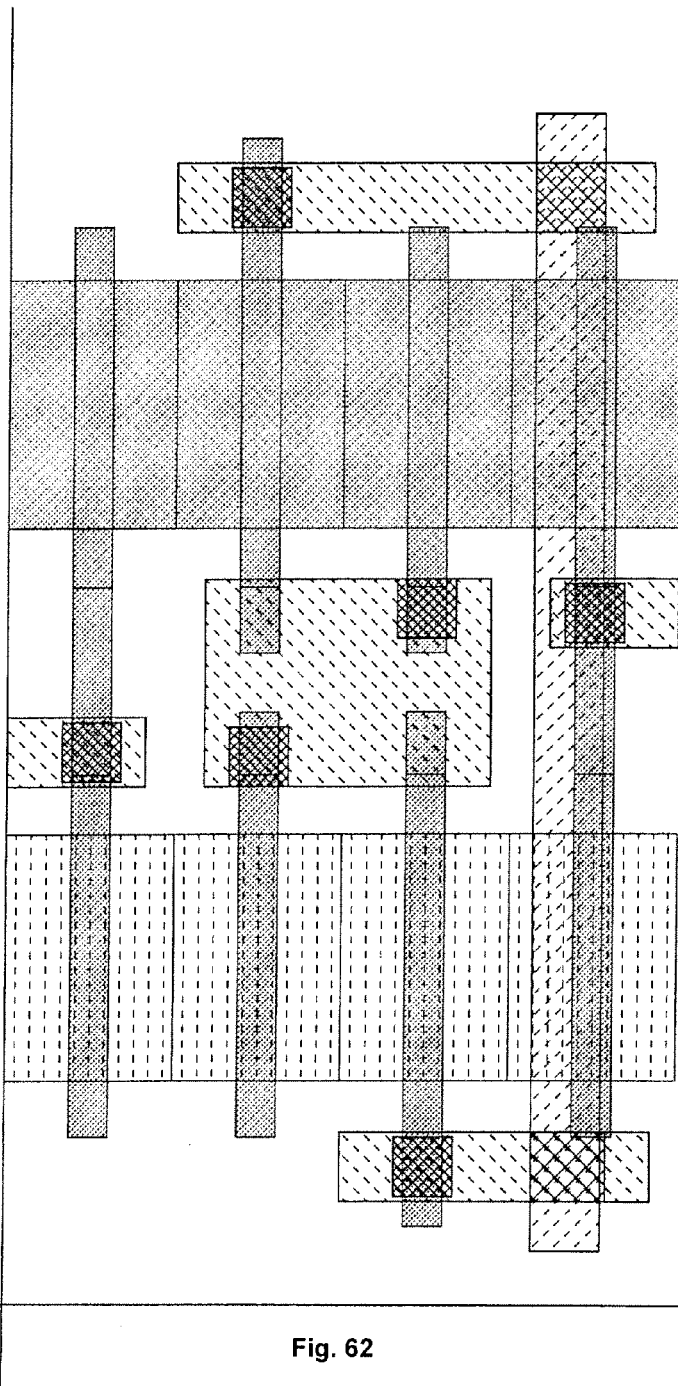
Figure 63:
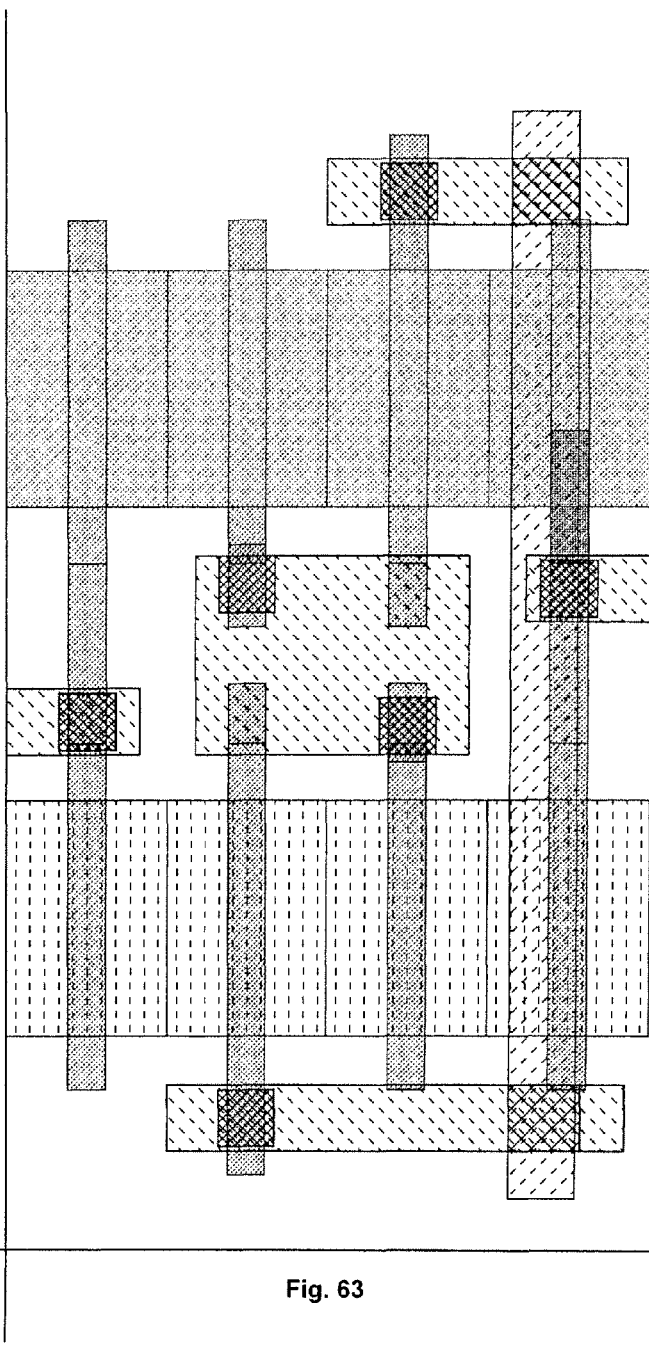
Figure 64:
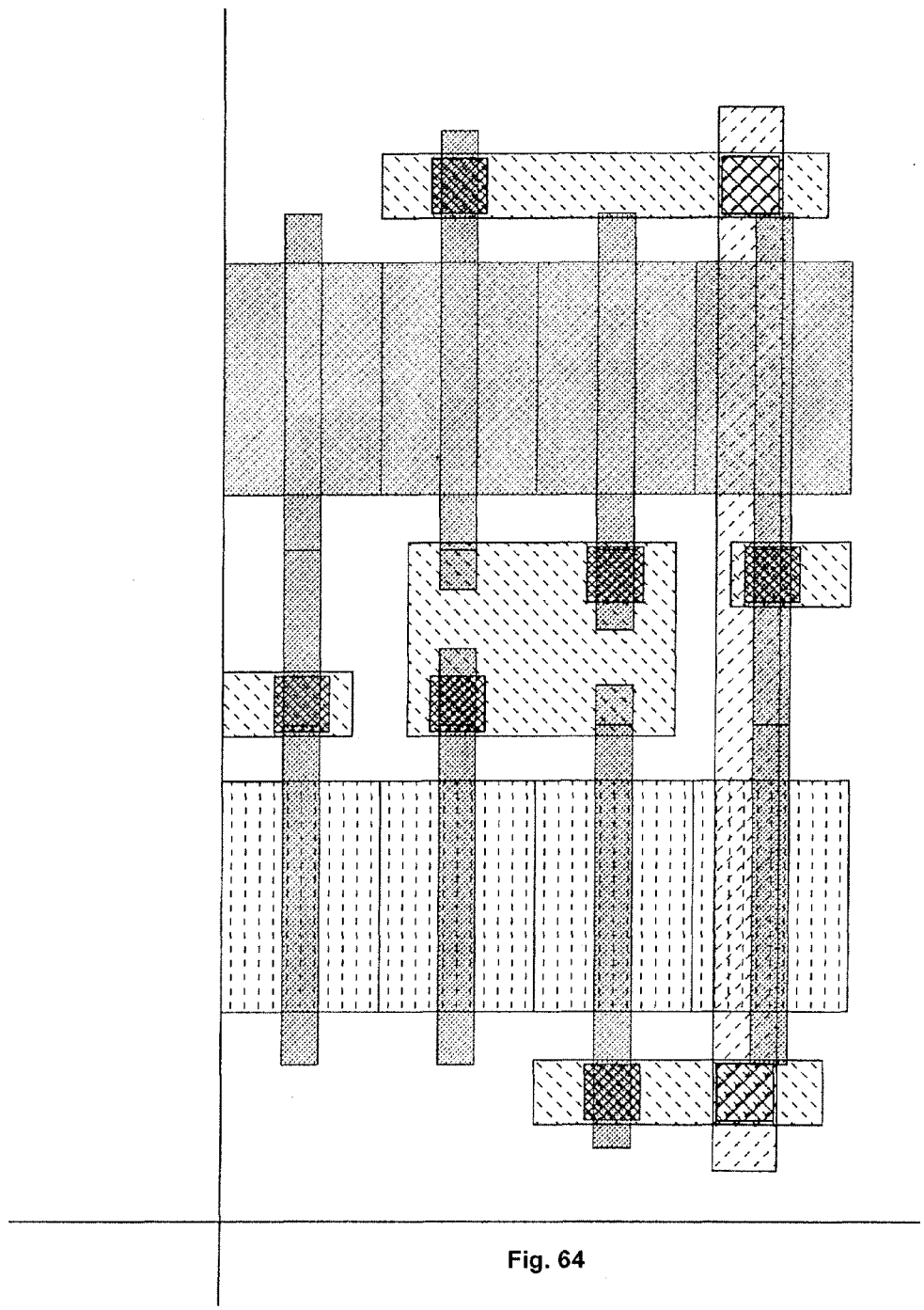
Figure 65:
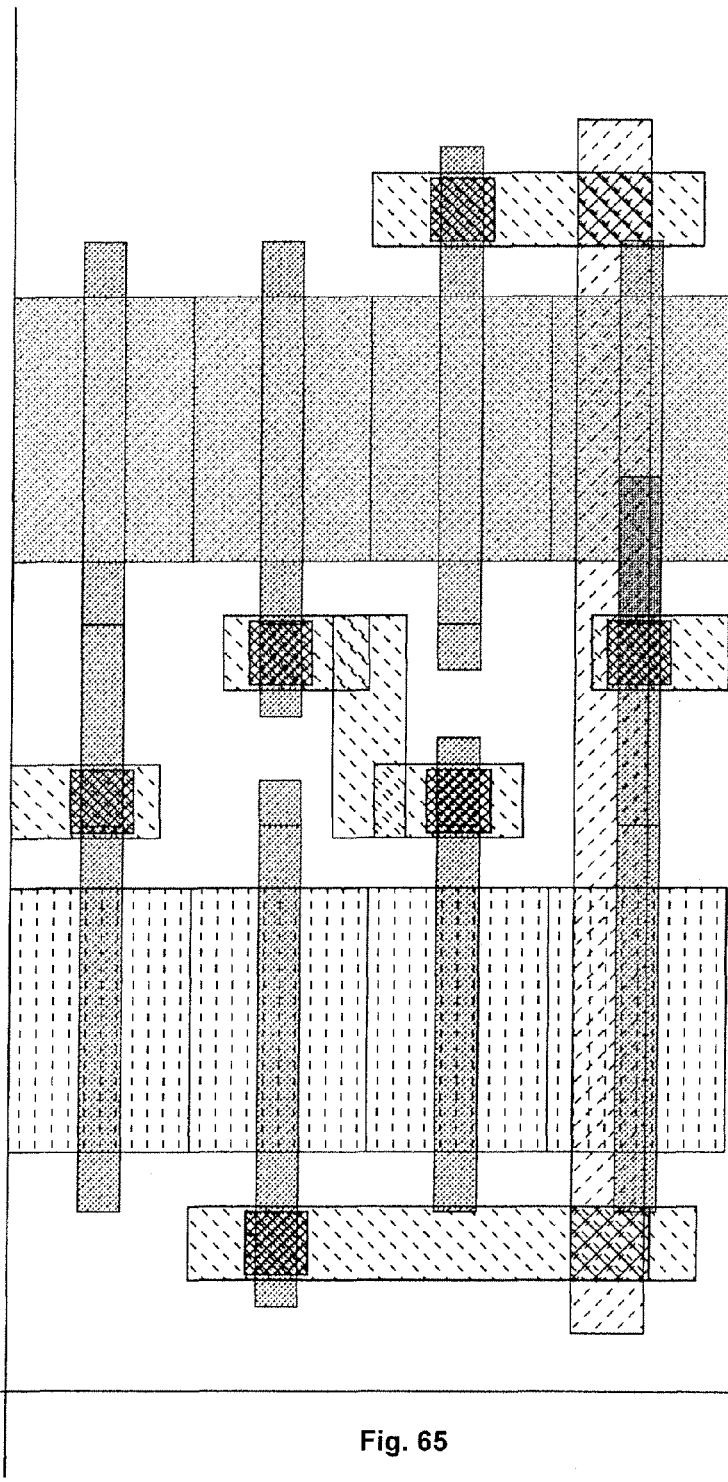
Figure 66:
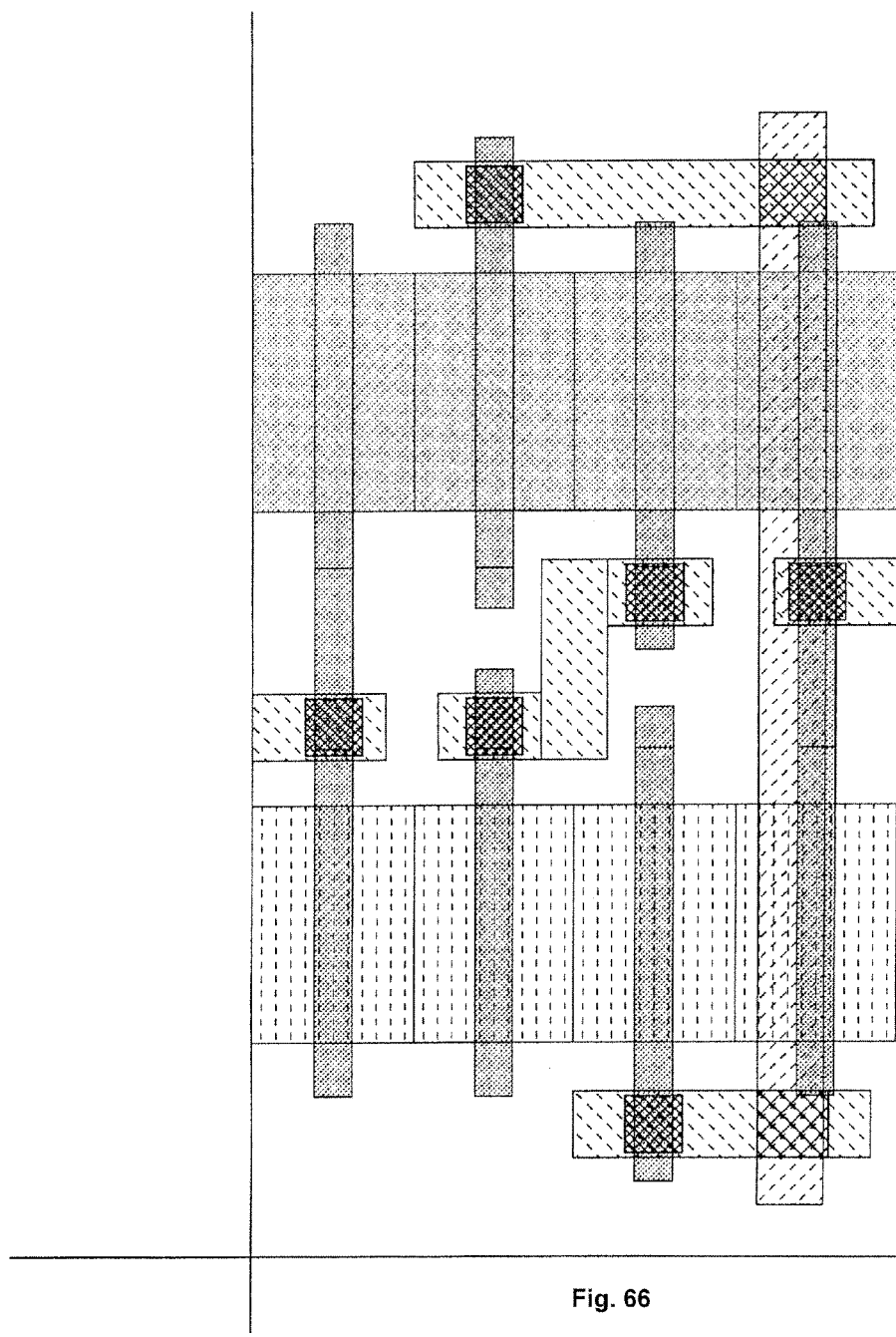
Figure 67:
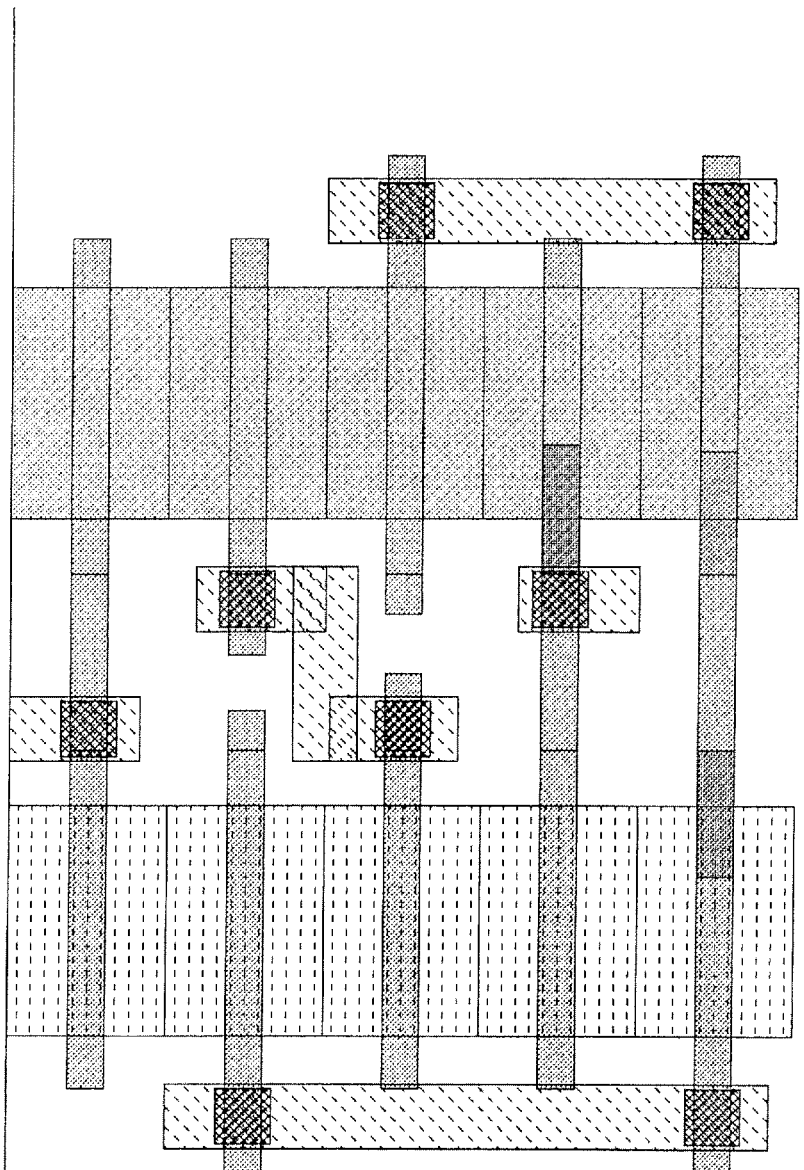
Figure 68:
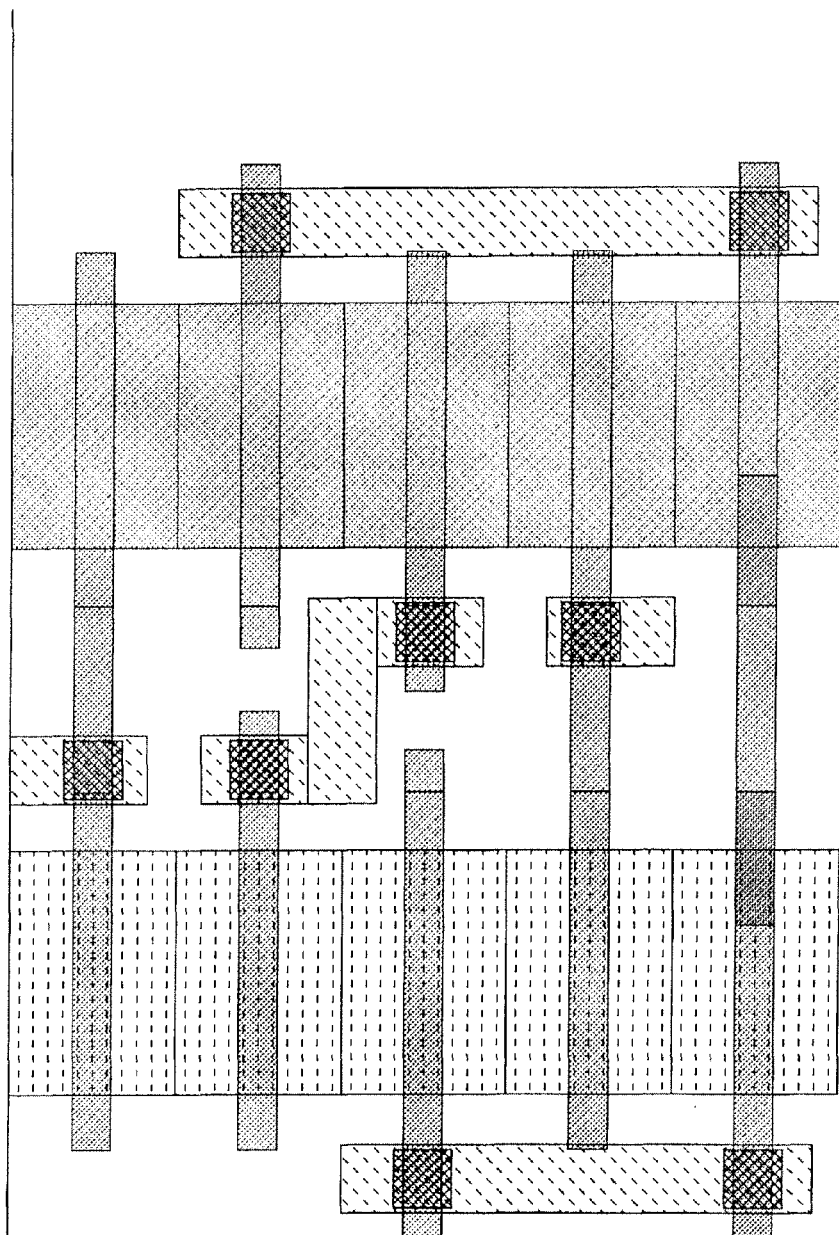
Figure 69:
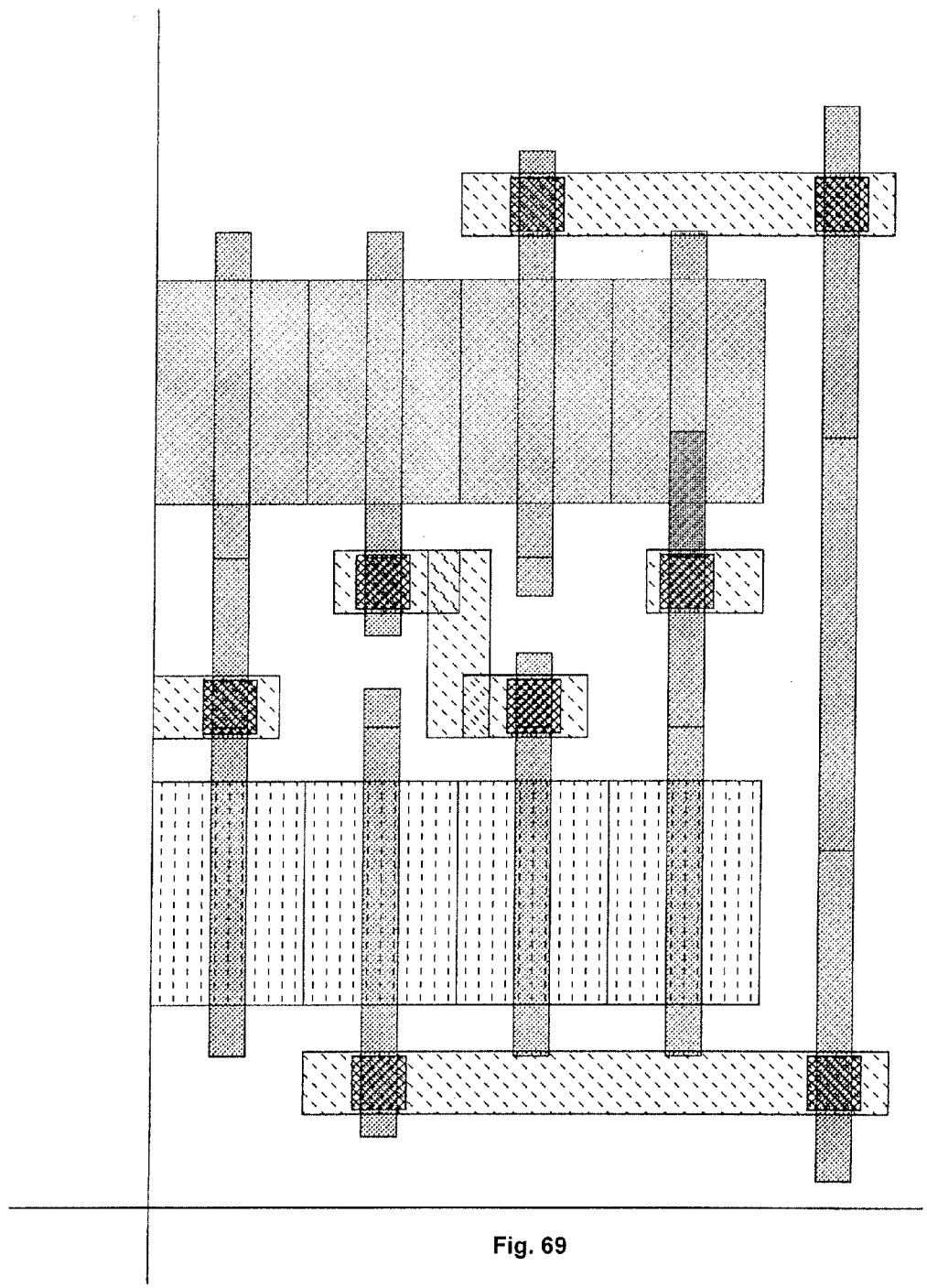
Figure 70:
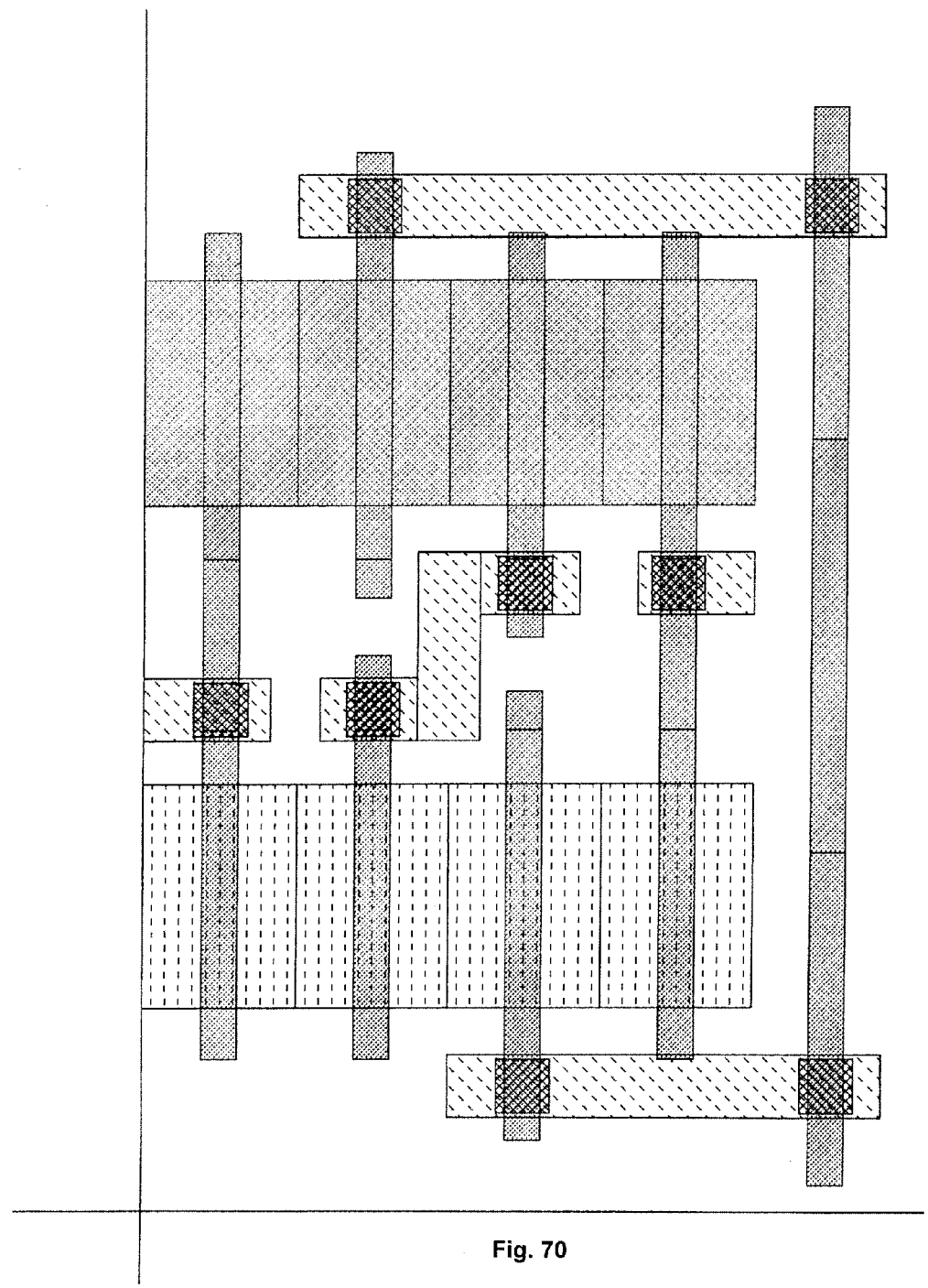
Figure 71:
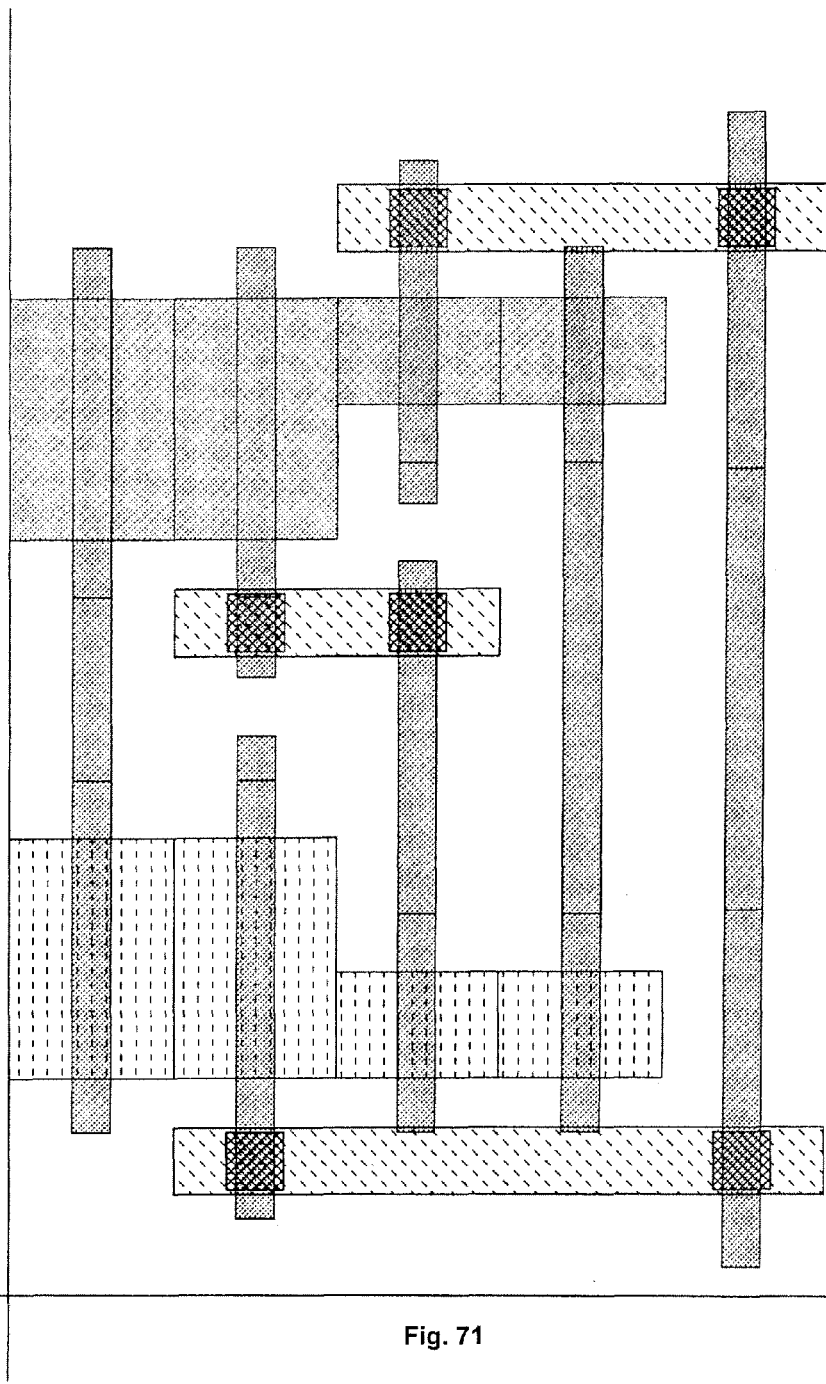
Figure 72:
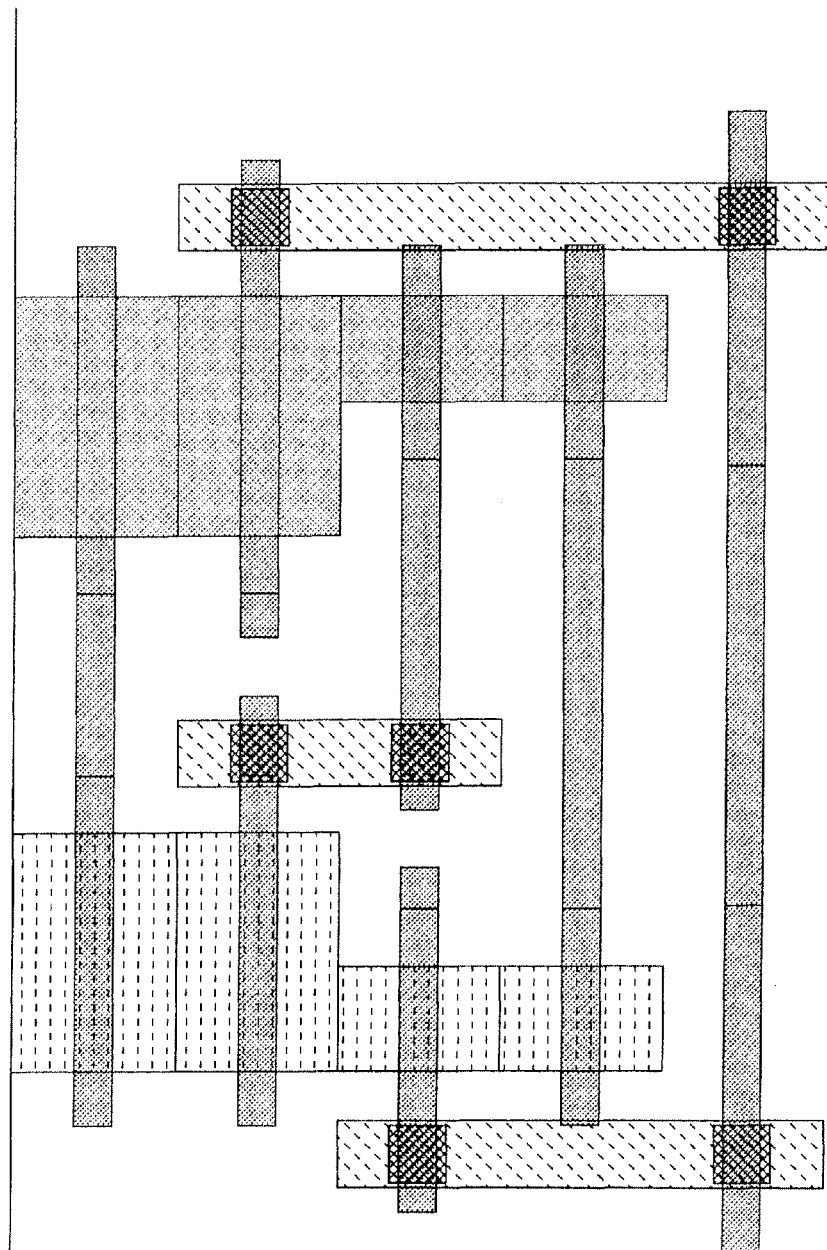
Figure 73:
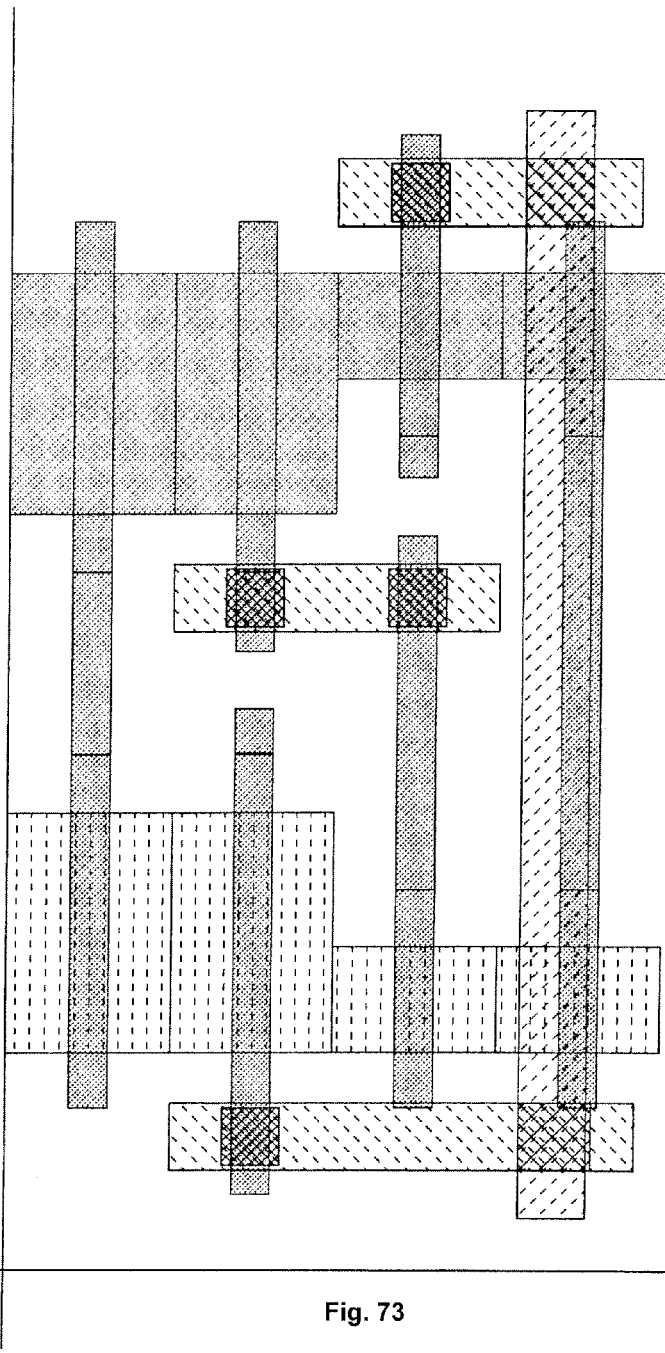
Figure 74:
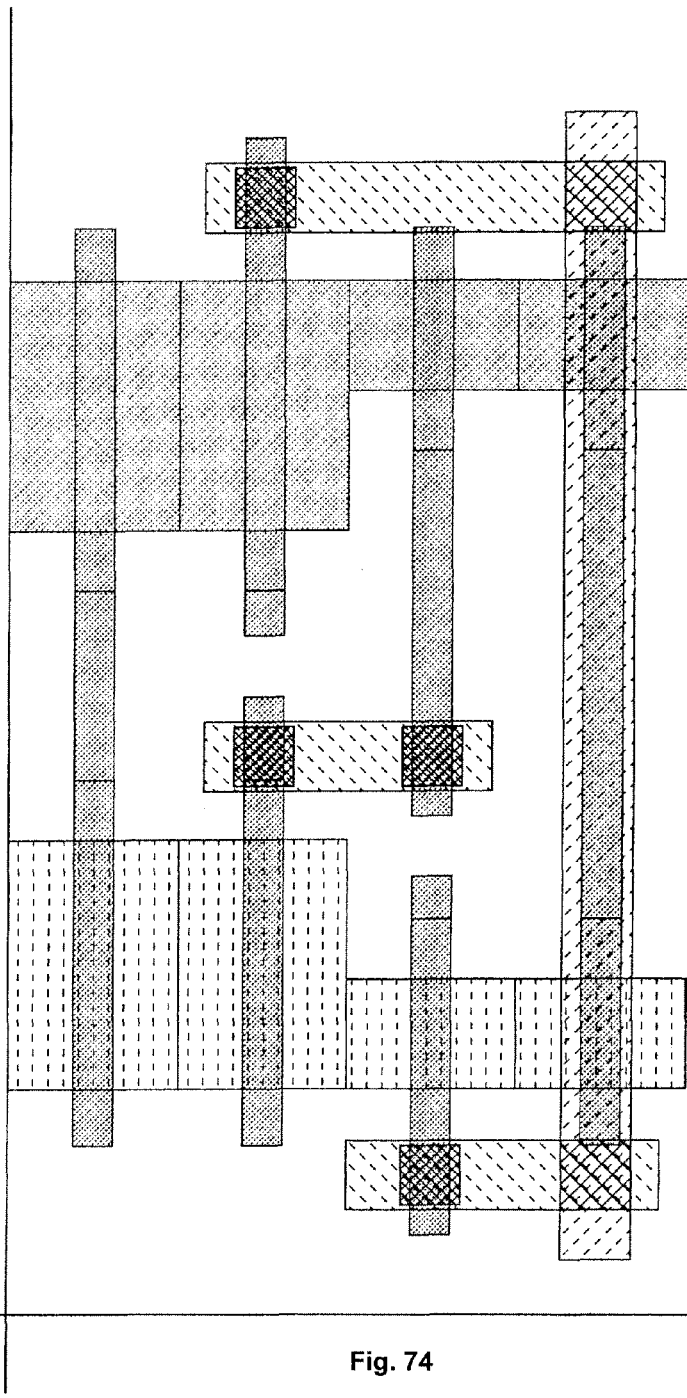
Figure 75:
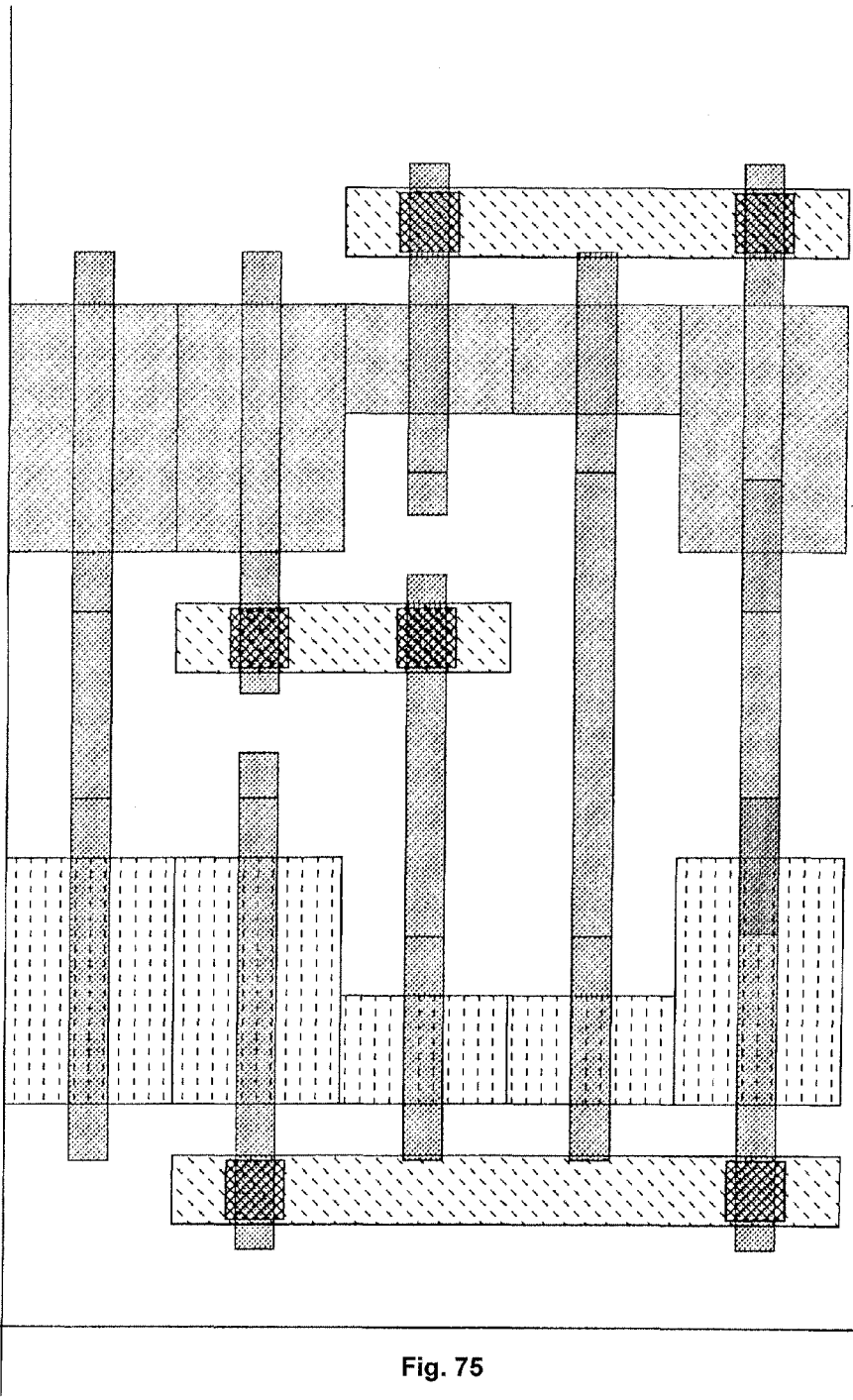
Figure 76:
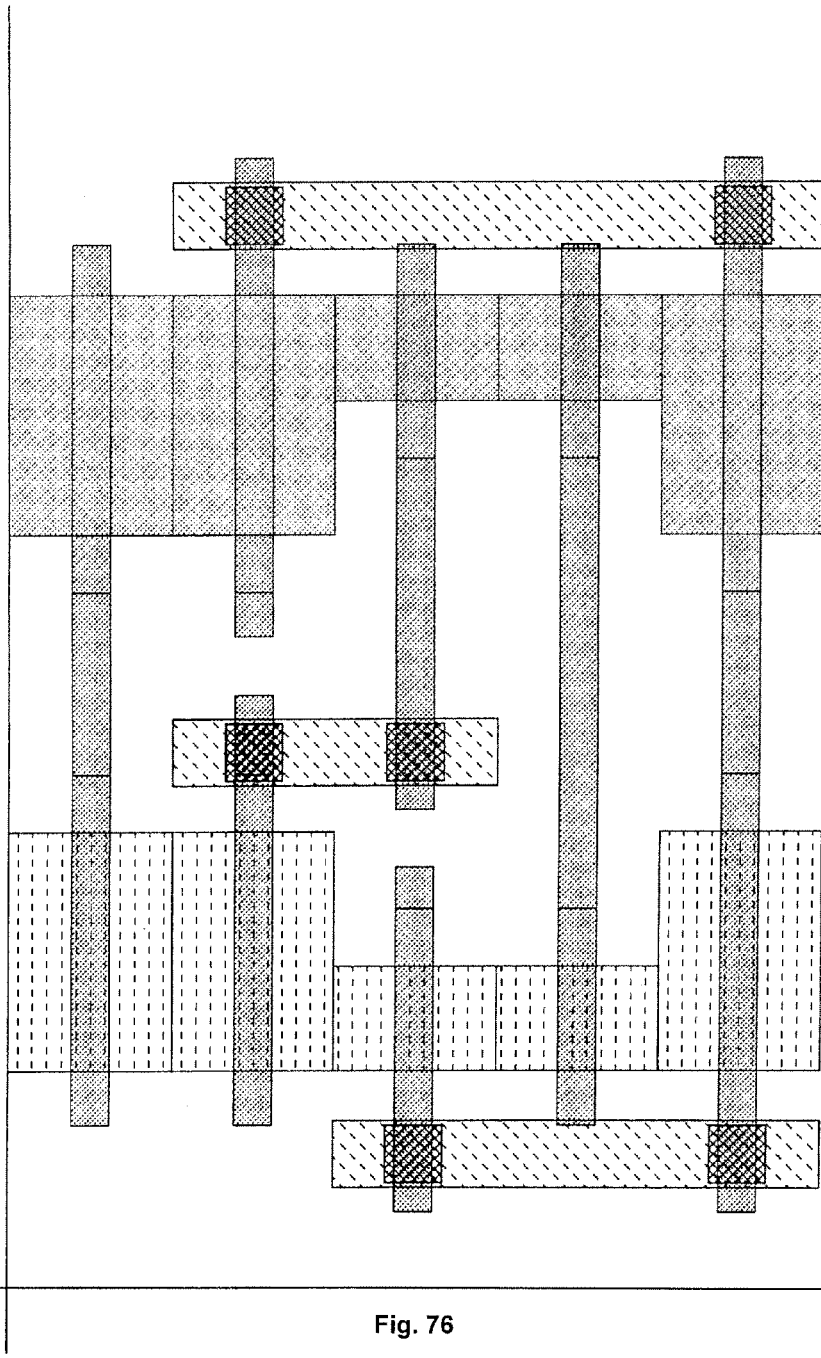
Figure 77:
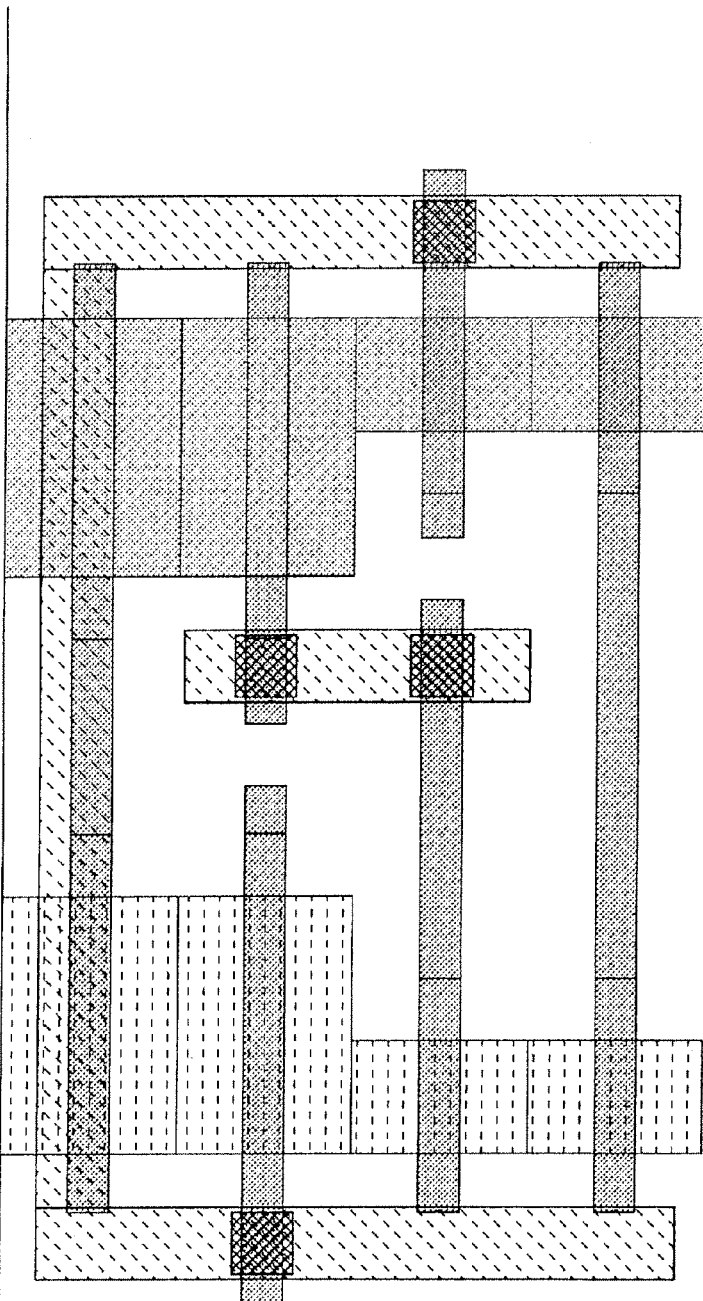
Figure 78:
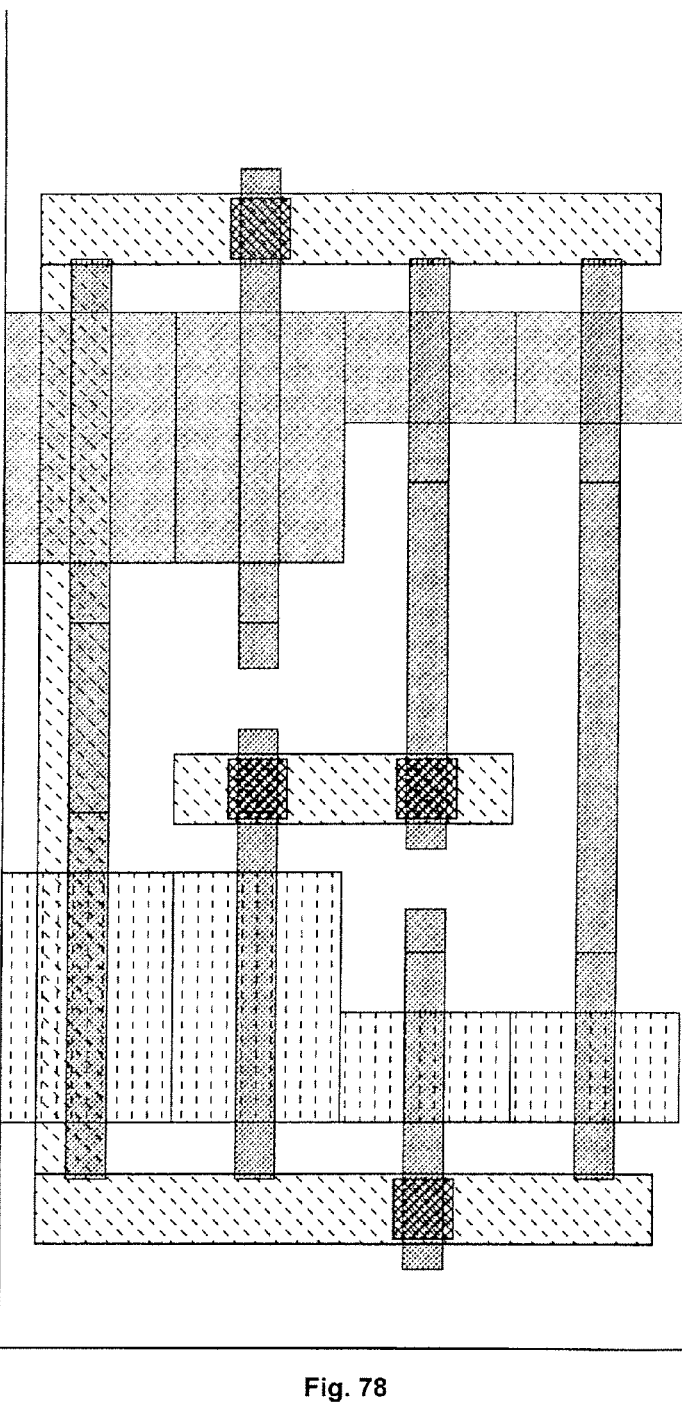
Figure 79:
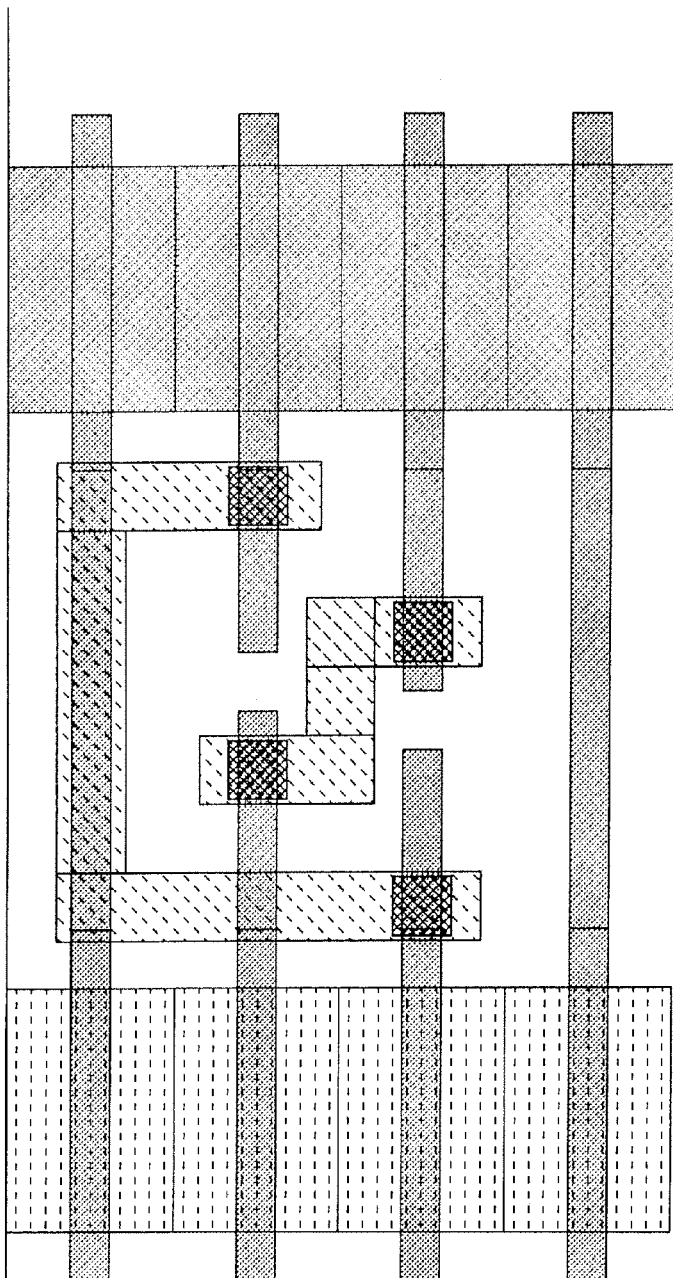
Figure 80:
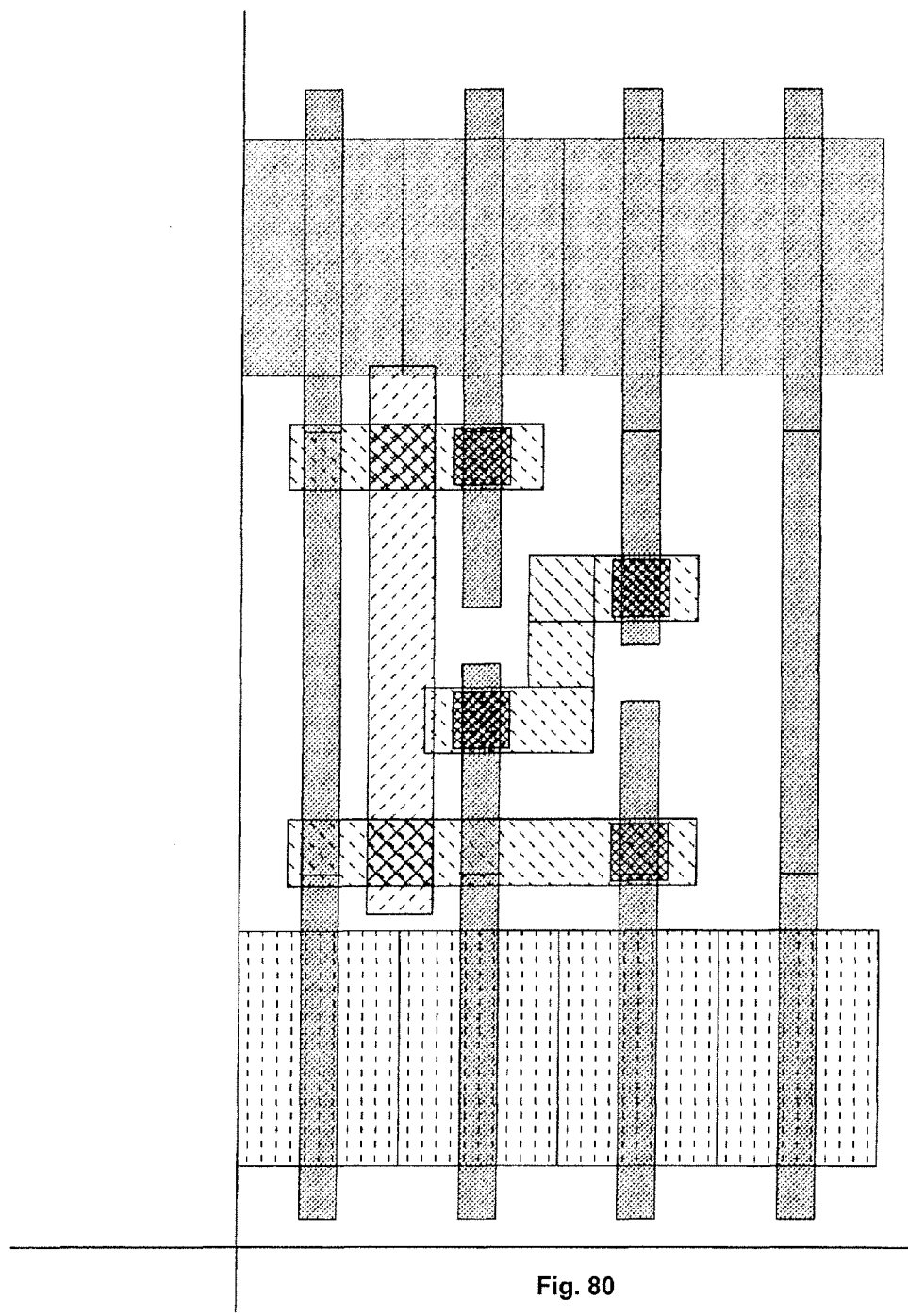
Figure 81:
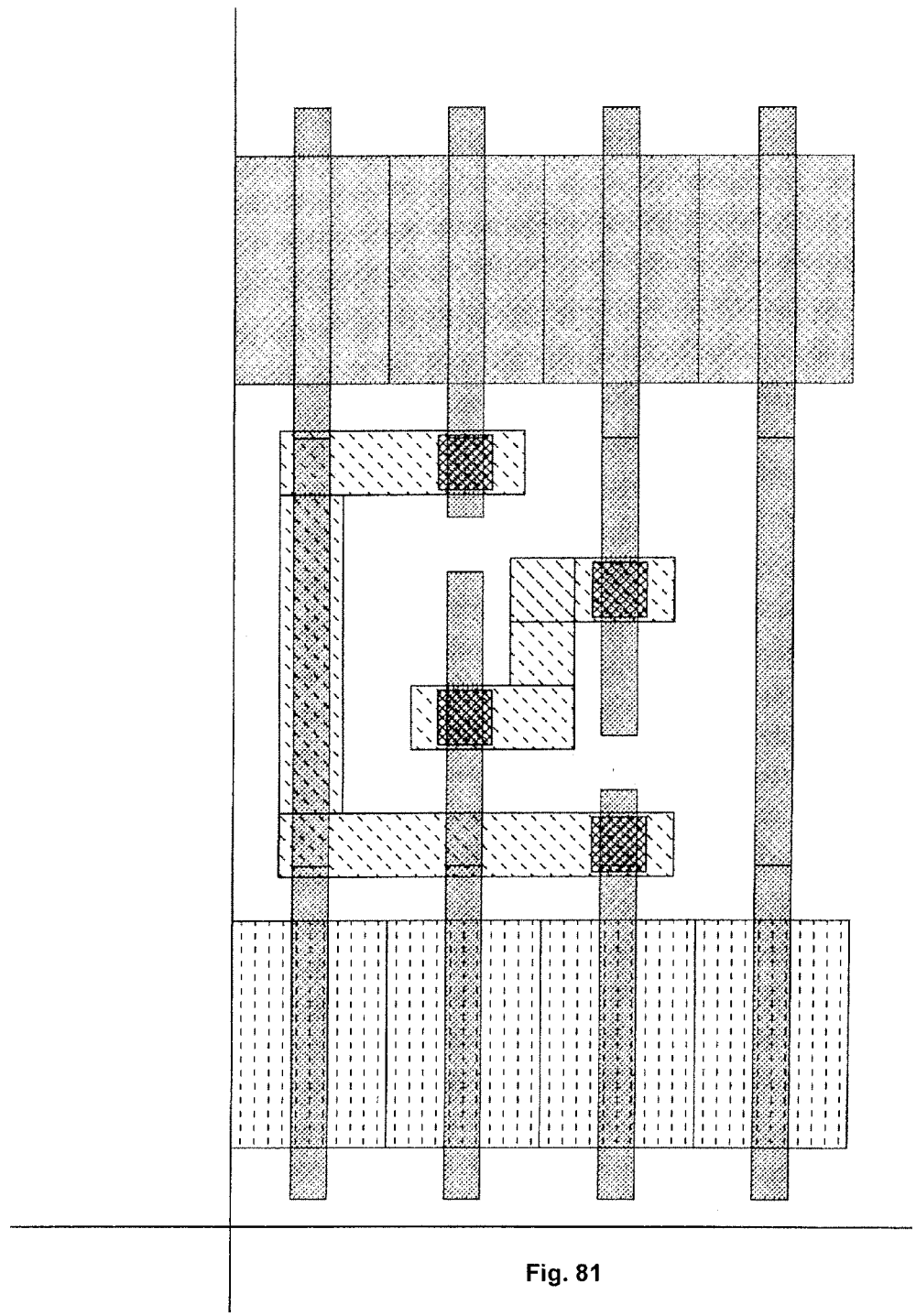
Figure 82:
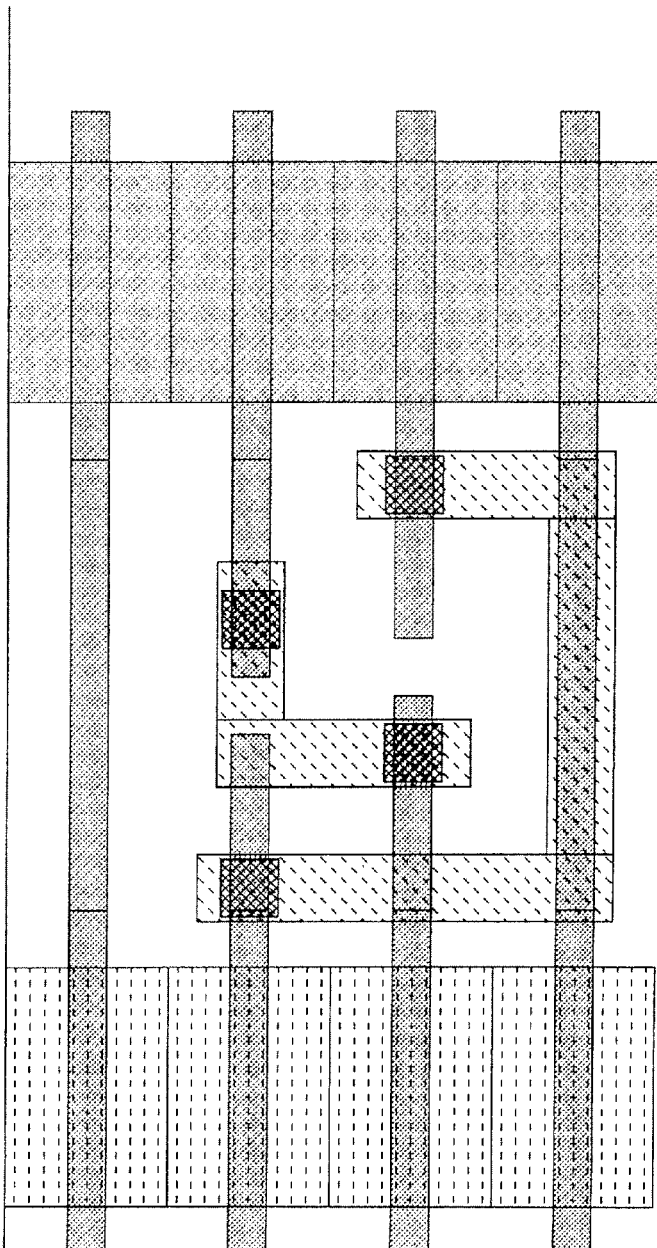
Figure 83:
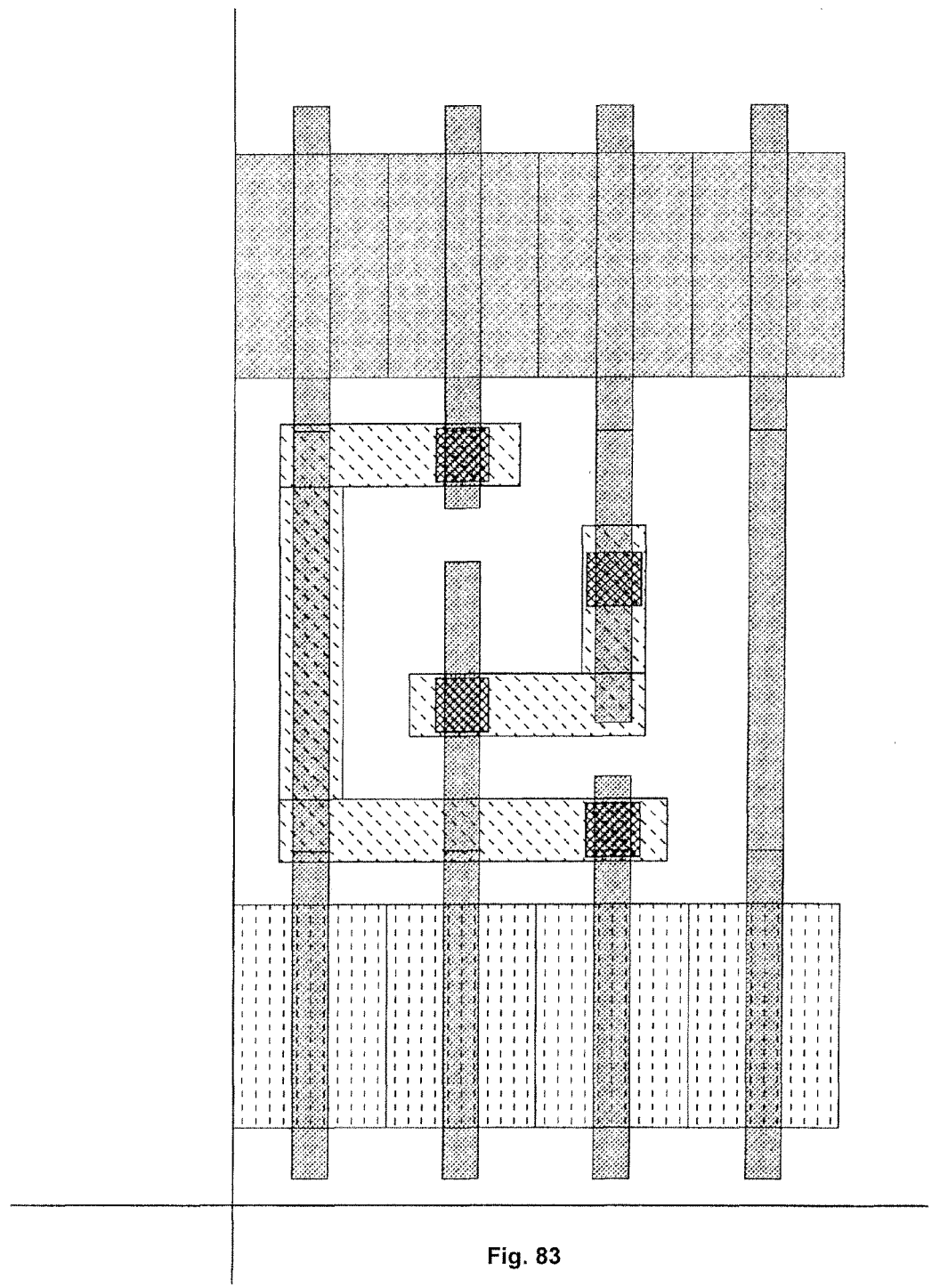
Figure 84:
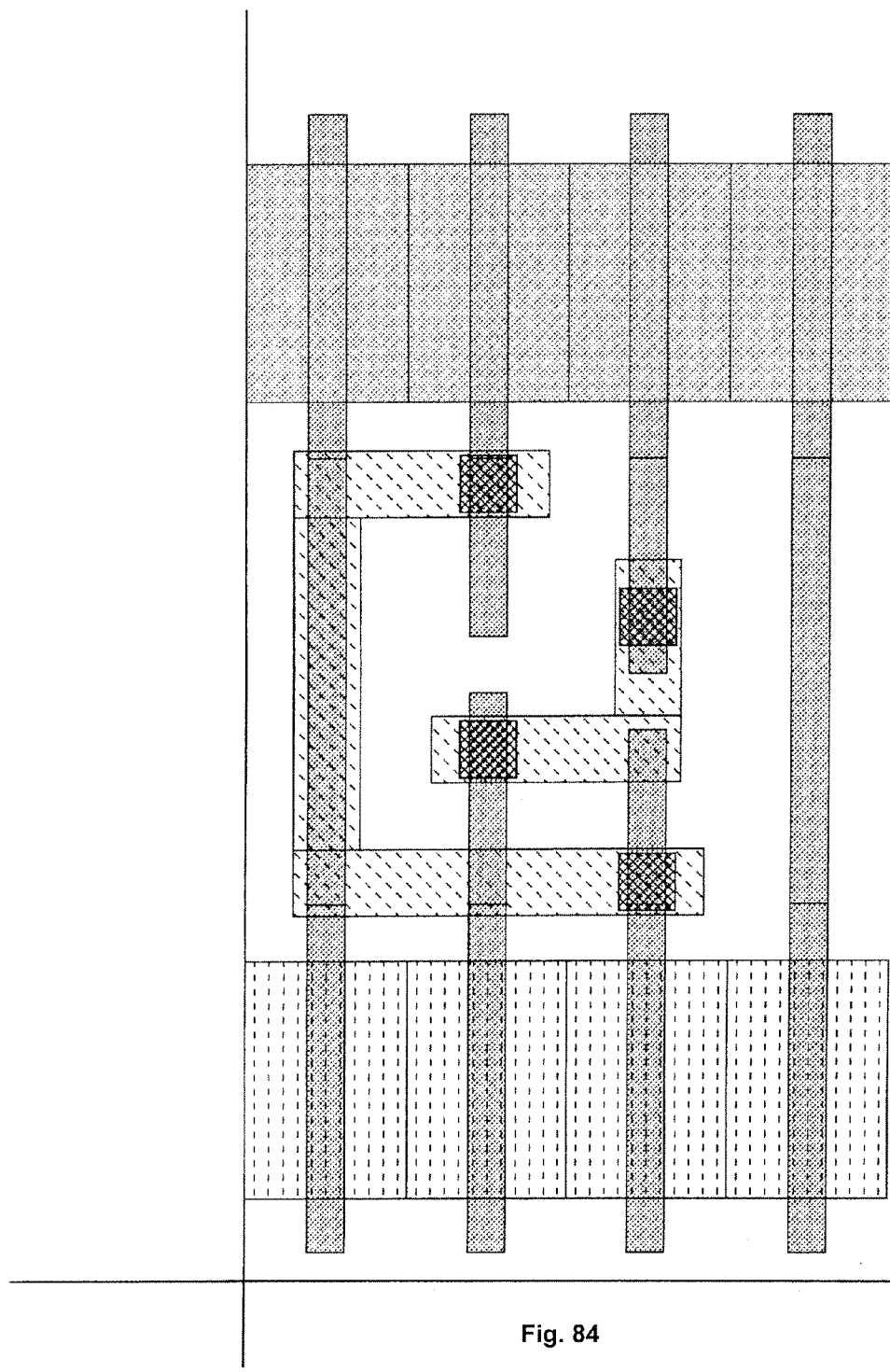
Figure 85:
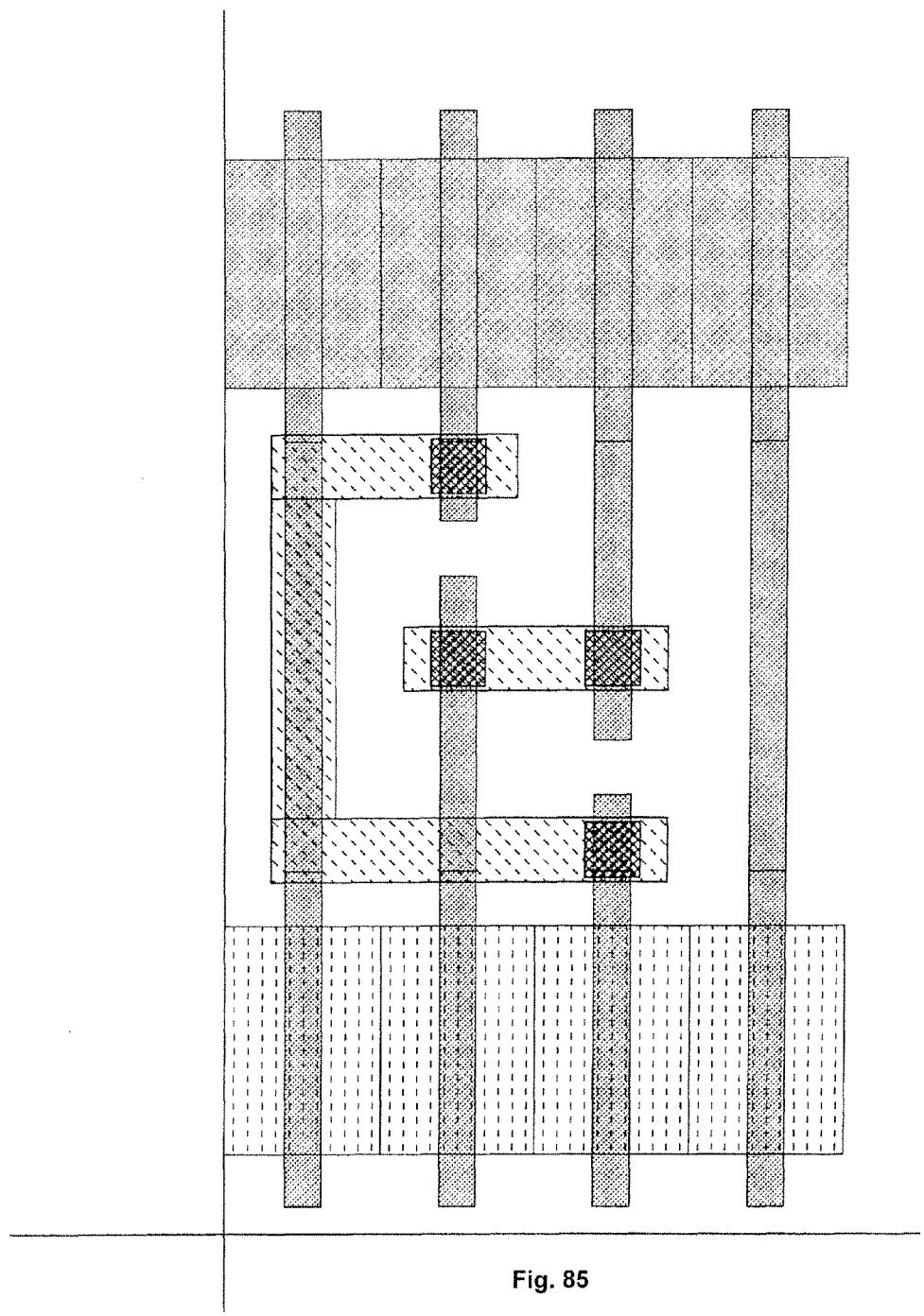
Figure 86:
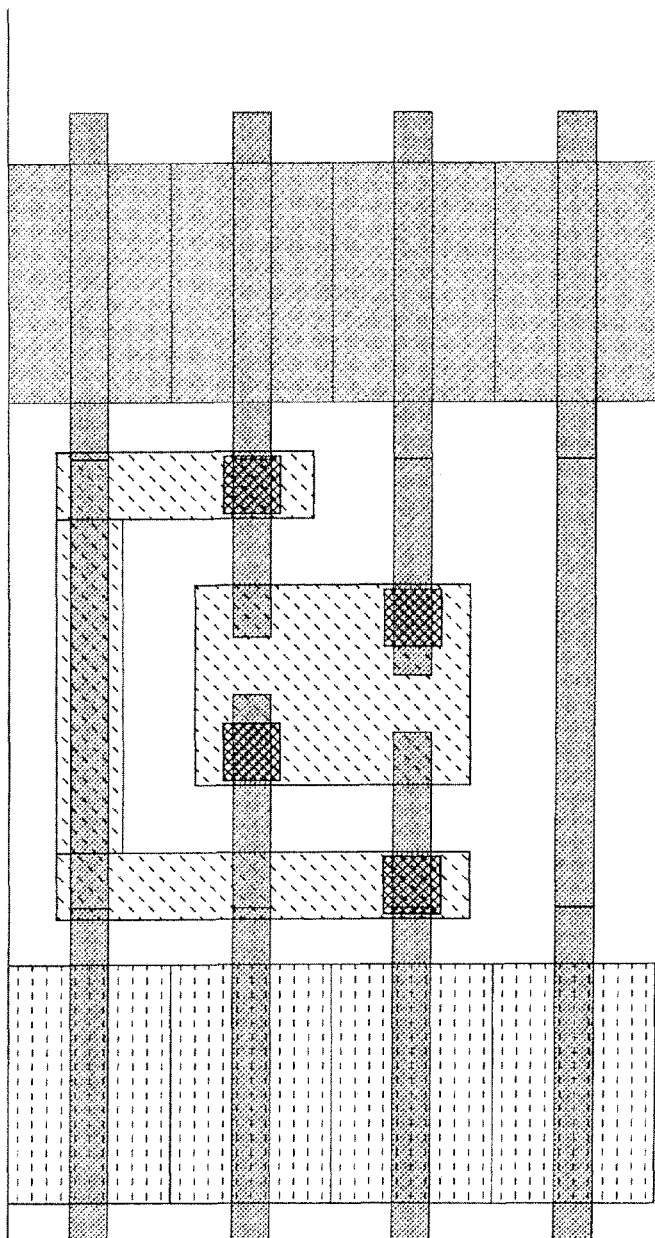
Figure 87:
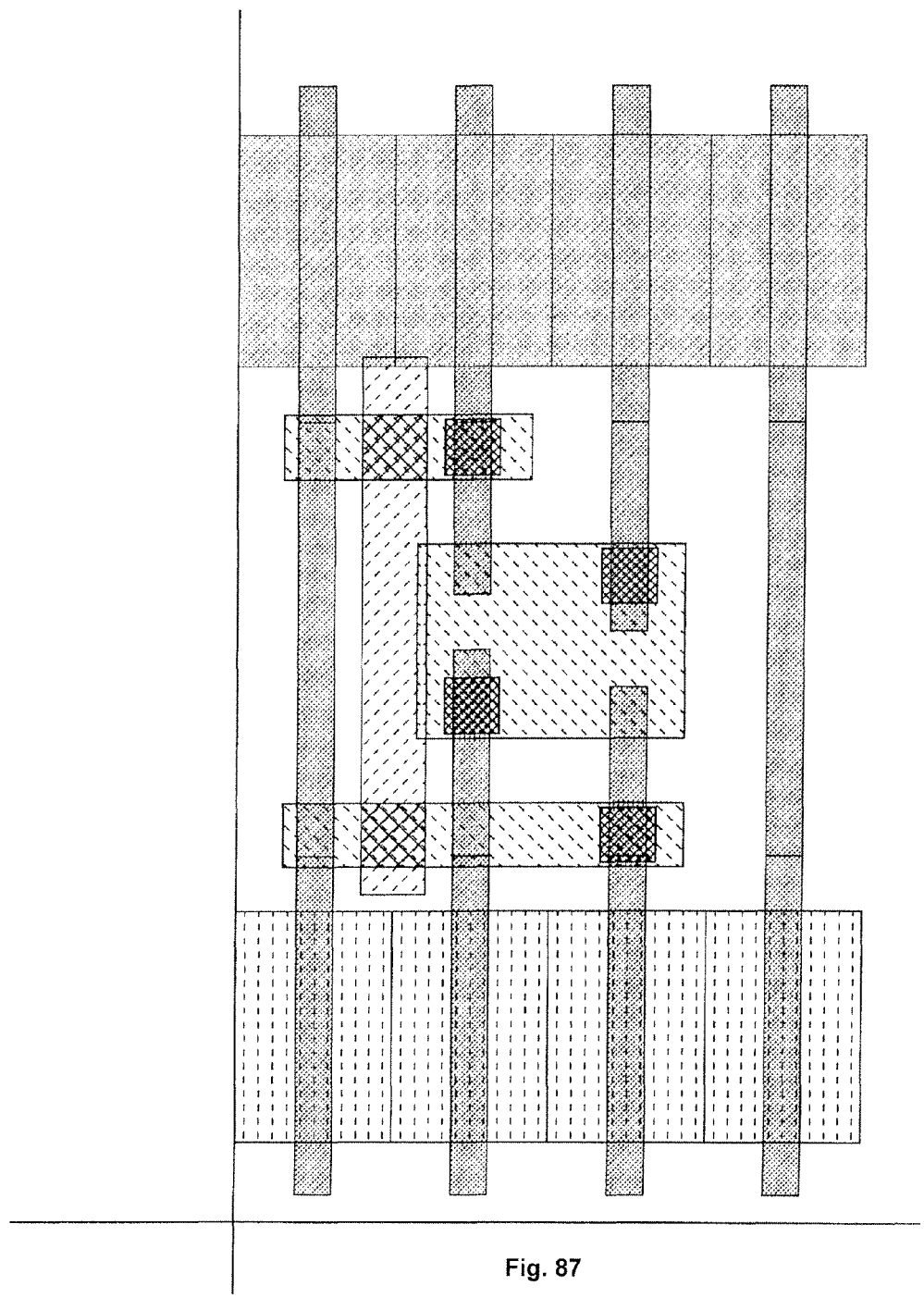
Figure 88:
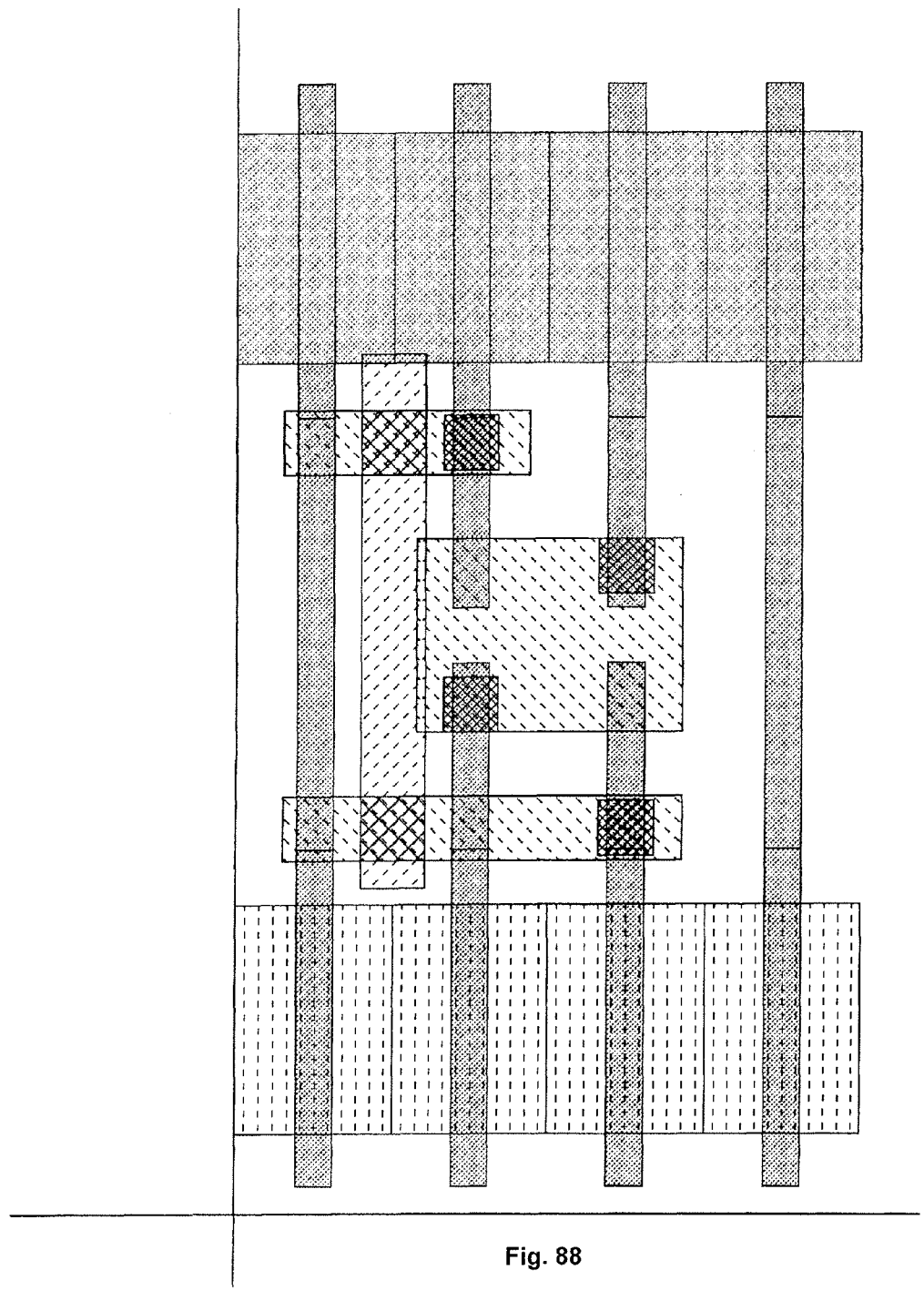
Figure 89:
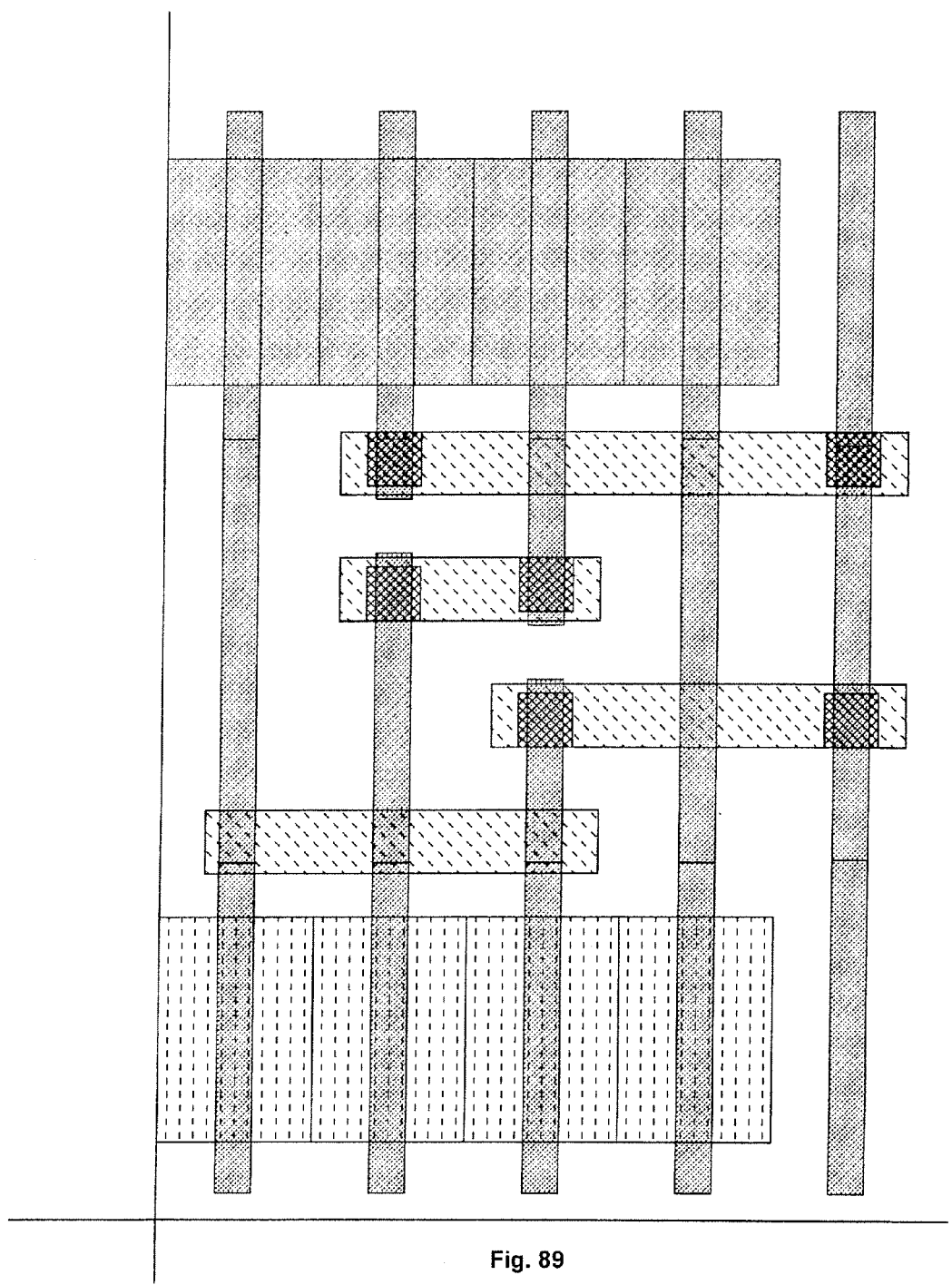
Figure 90:
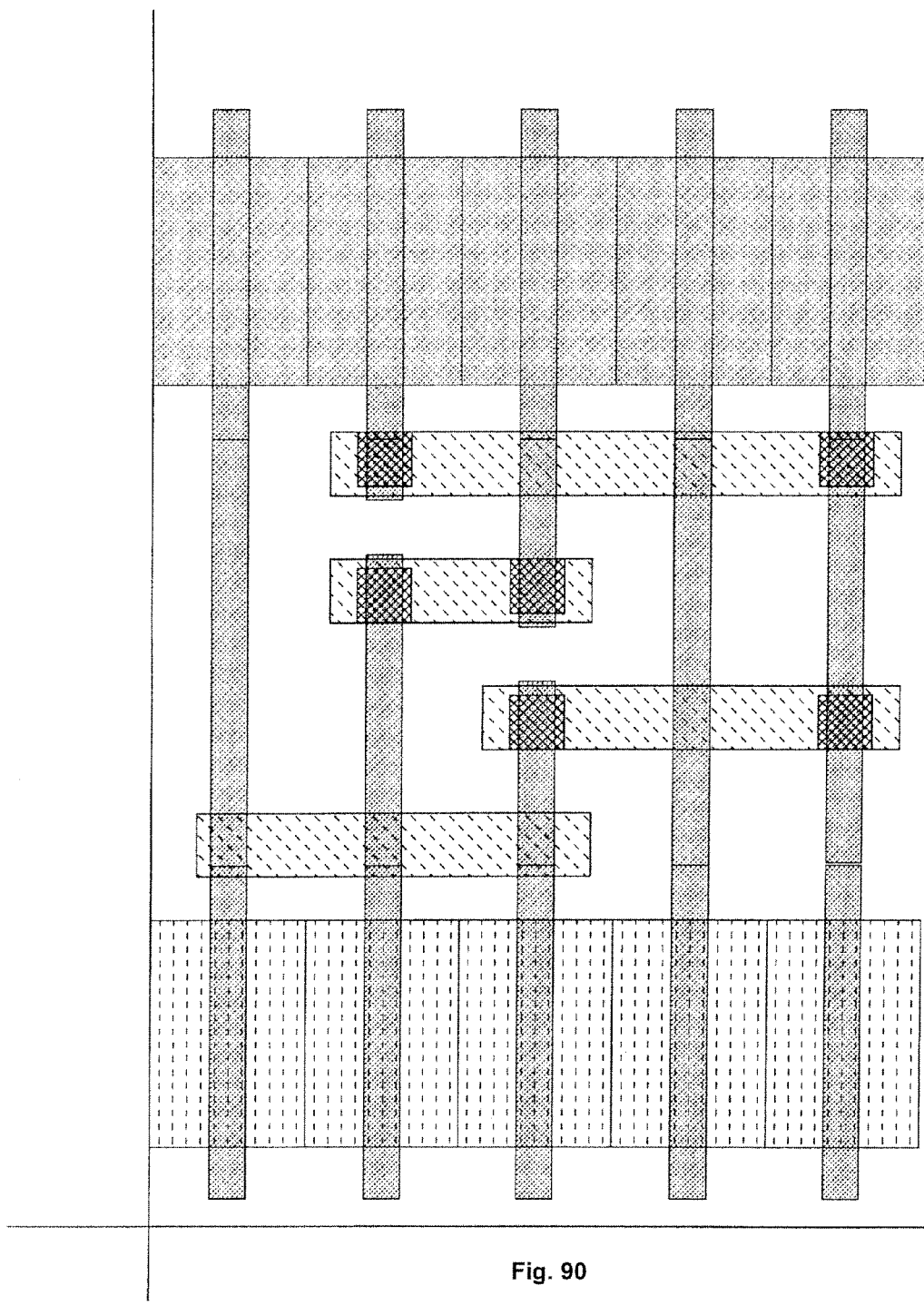
Figure 91:
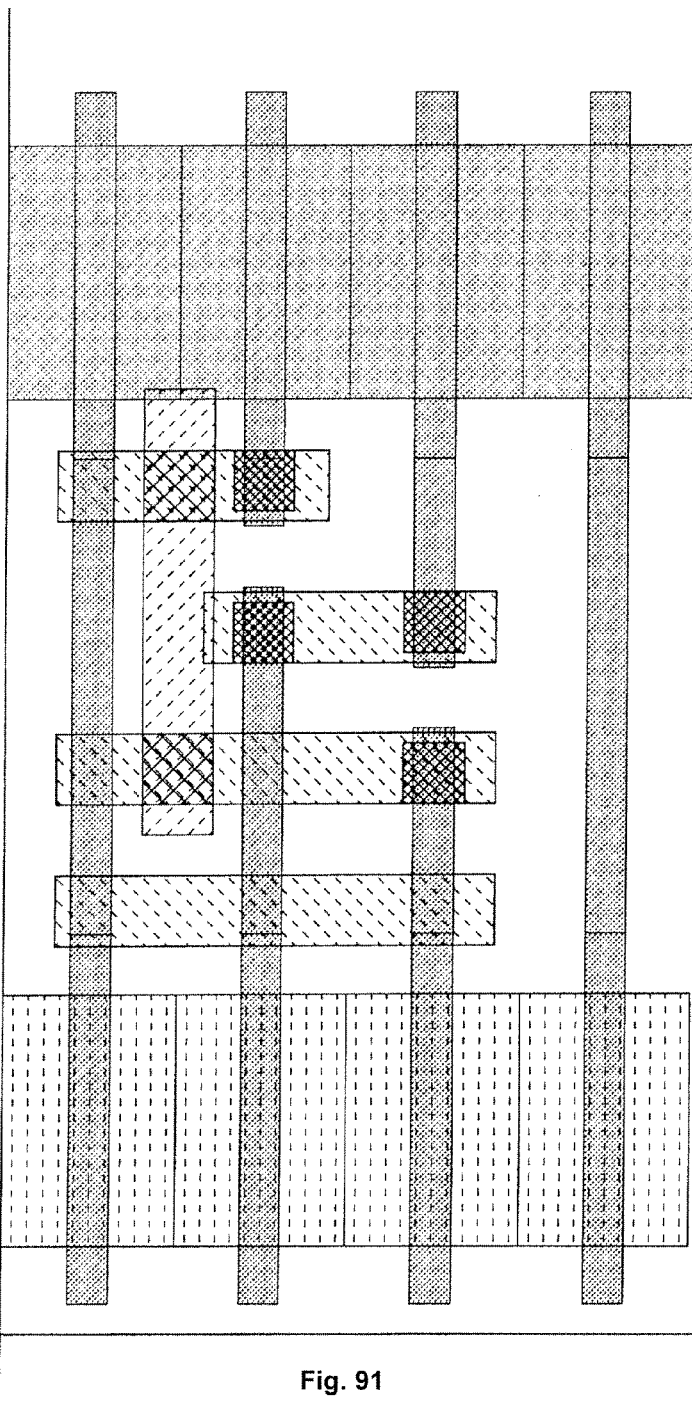
Figure 92:
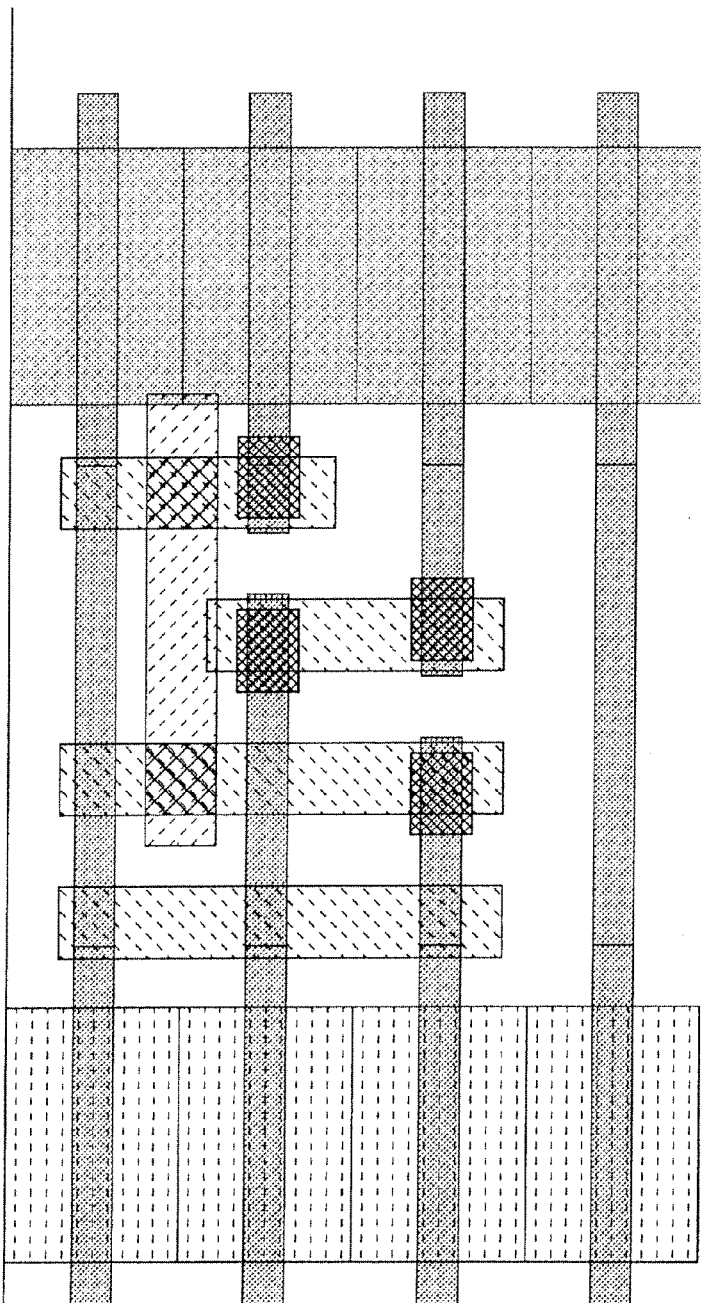
Figure 93:
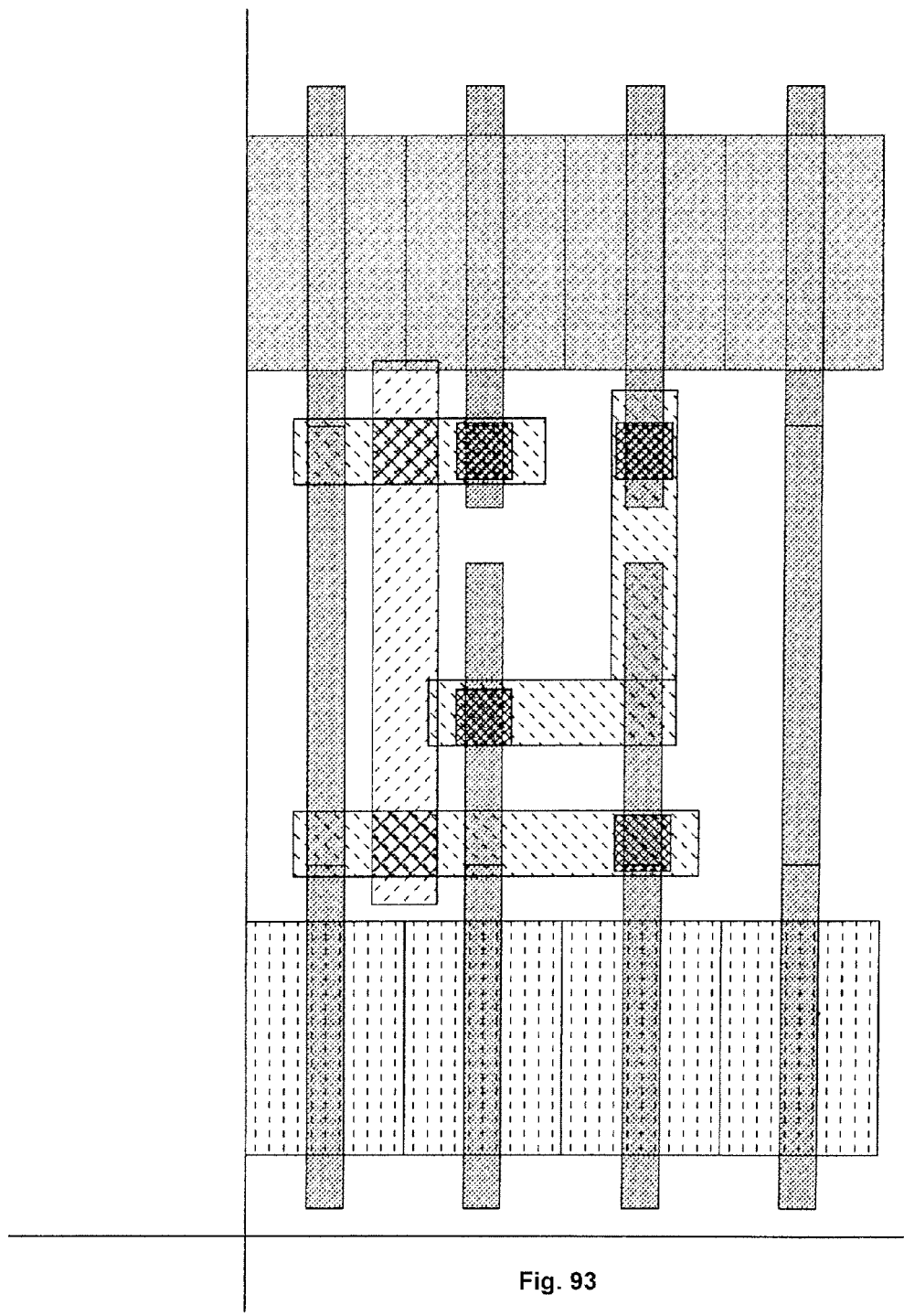
Figure 94:
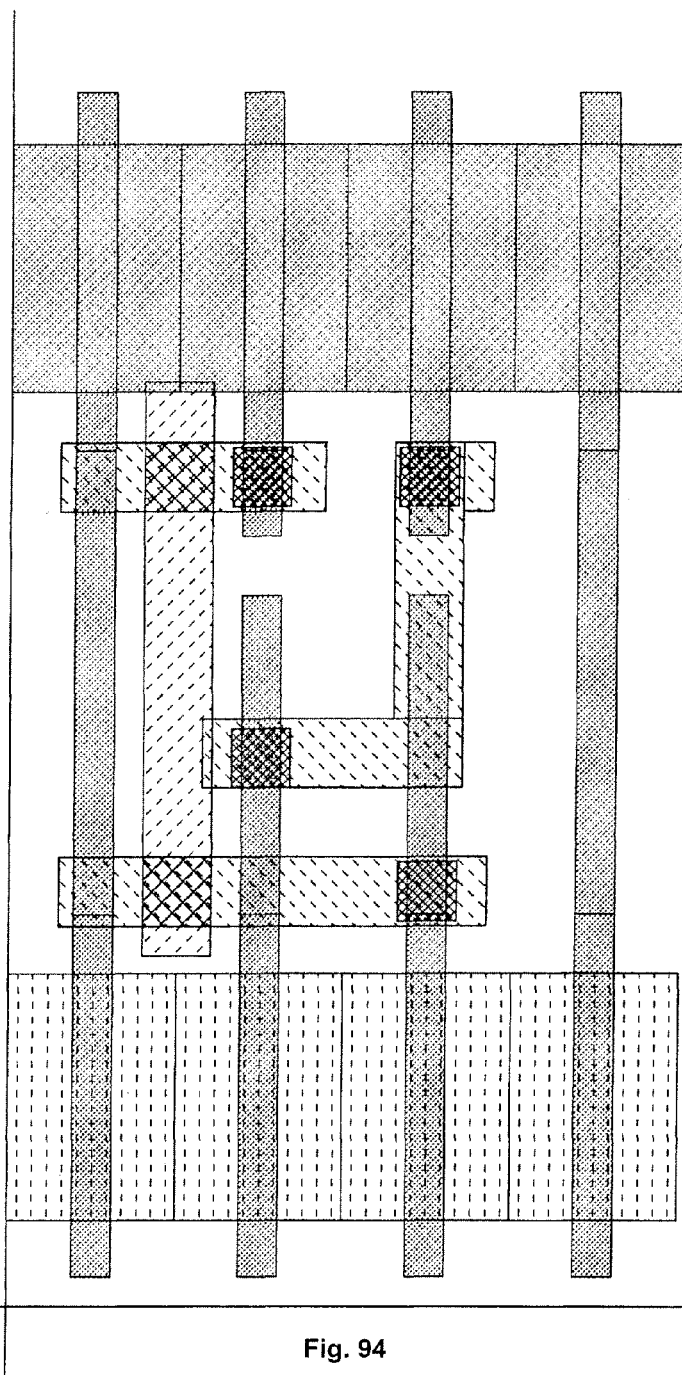

FIG. 60 is an illustration showing the cross-coupled transistor layout of FIG. 59, with a variation in the overlap of the gate contact 120p by the L-shaped interconnect level feature 450p, in accordance with one embodiment of the present invention. The overlap region 709p is turned horizontally so as to align with the horizontal interconnect level feature 440p.

FIGS. 61-94 are illustrations showing variants of the cross-coupled transistor layouts of FIGS. 26 and 28-60, respectively. As previously mentioned, essentially any cross-coupled transistor layout defined in accordance with a linear gate level can be represented in an alternate manner by horizontally and/or vertically reversing placement of the gate contacts that are used to connect one or both pairs of the four transistors of the cross-coupled transistor configuration. Also, essentially any cross-coupled transistor layout defined in accordance with a linear gate level can be represented in an alternate manner by maintaining gate contact placements and by modifying each routing path used to connect one or both pairs of the four transistors of the cross-coupled transistor configuration.

FIGS. 95-99 show exemplary cross-coupled transistor layouts defined in accordance with the linear gate level, in which a folded transistor layout technique is implemented. A folded transistor is defined as a plurality of transistors whose gate electrodes share an identical electrical connectivity configuration. In other words, each individual transistor of a given folded transistor has its gate electrode connected to a common node and is defined to electrically interface with a common diffusion region. It should be understood that although each individual transistor of a given folded transistor has its gate electrode connected to a common diffusion region, it is not required that the common diffusion region be continuous, i.e., monolithic. For example, diffusion regions that are of the same type but are physically separated from each other, and have an electrical connection to a common output node, and share a common source/drain, satisfy the common diffusion region characteristic of the folded transistor.

Figure 95:
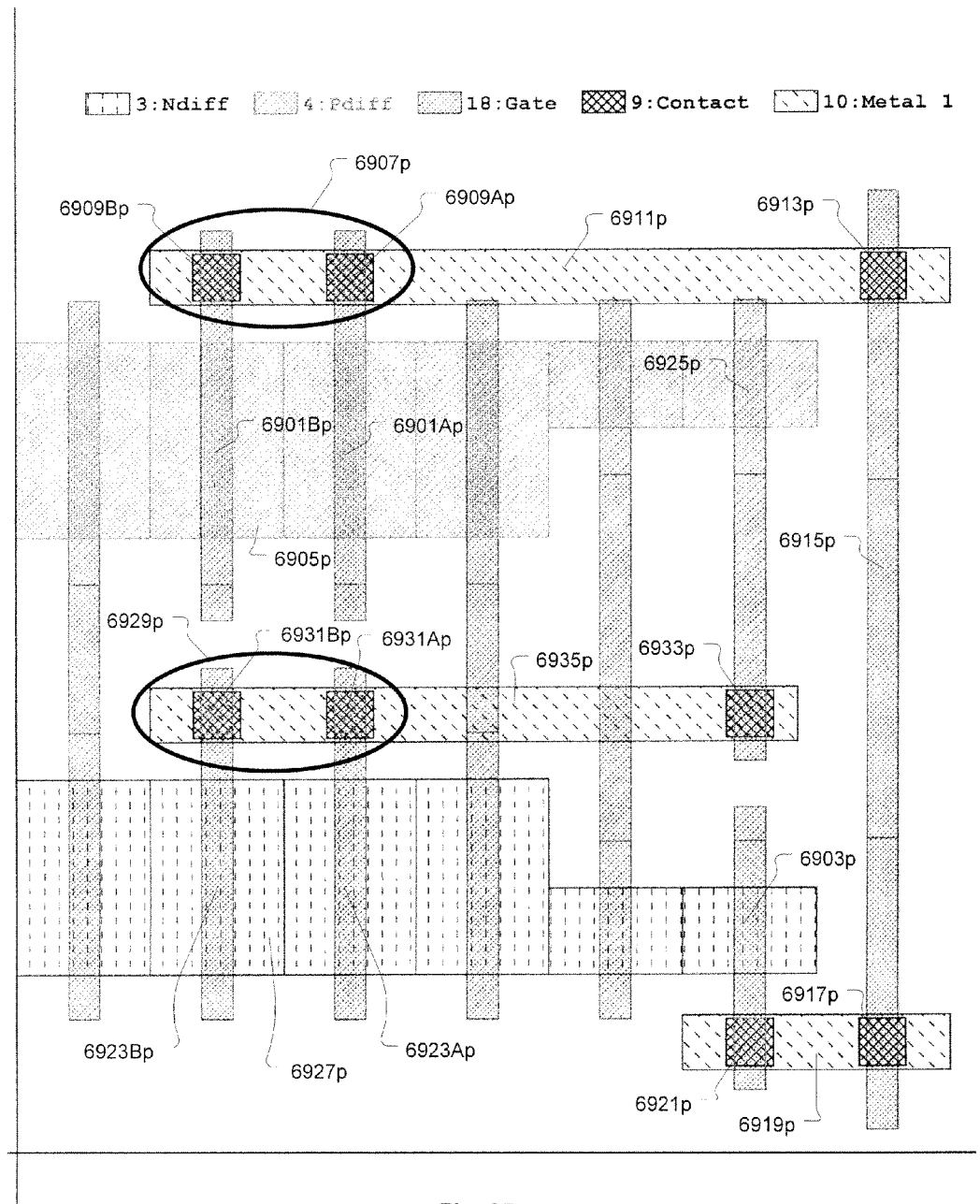

In the example layout of FIG. 95, a first pair of the cross-coupled transistors is defined by a folded transistor 6901Ap/6901Bp and by a transistor 6903p. Each of the individual transistors 6901Ap and 6901Bp that form the folded transistor is connected to a common diffusion region 6905p and has its gate electrode connected to a common node 6907p through respective gate contacts 6909Ap and 6909Bp. The gate contacts 6909Ap and 6909Bp are connected to a gate contact 6921p of transistor 6903p by way of a metal 1 interconnect level feature 6911p, a contact 6913p, a gate level feature 6915p, a contact 6917p, and a metal 1 interconnect level feature 6919p. A second pair of the cross-coupled transistors is defined by a folded transistor 6923Ap/6923Bp and by a transistor 6925p. Each of the individual transistors 6923Ap and 6923Bp that form the folded transistor is connected to a common diffusion region 6927p and has its gate electrode connected to a common node 6929p through respective gate contacts 6931Ap and 6931Bp. The gate contacts 6931Ap and 6931Bp are connected to a gate contact 6933p of transistor 6925p by way of a metal 1 interconnect level feature 6935p. Transistors 6901Ap, 6901Bp, and 6925p are electrically interfaced with the diffusion region 6905p. Also, transistors 6923Ap, 6923Bp, and 6903p are electrically interfaced with the diffusion region 6927p. Additionally, although not explicitly shown, diffusion regions 6905p and 6927p are connected to a common output node.

Figure 96:
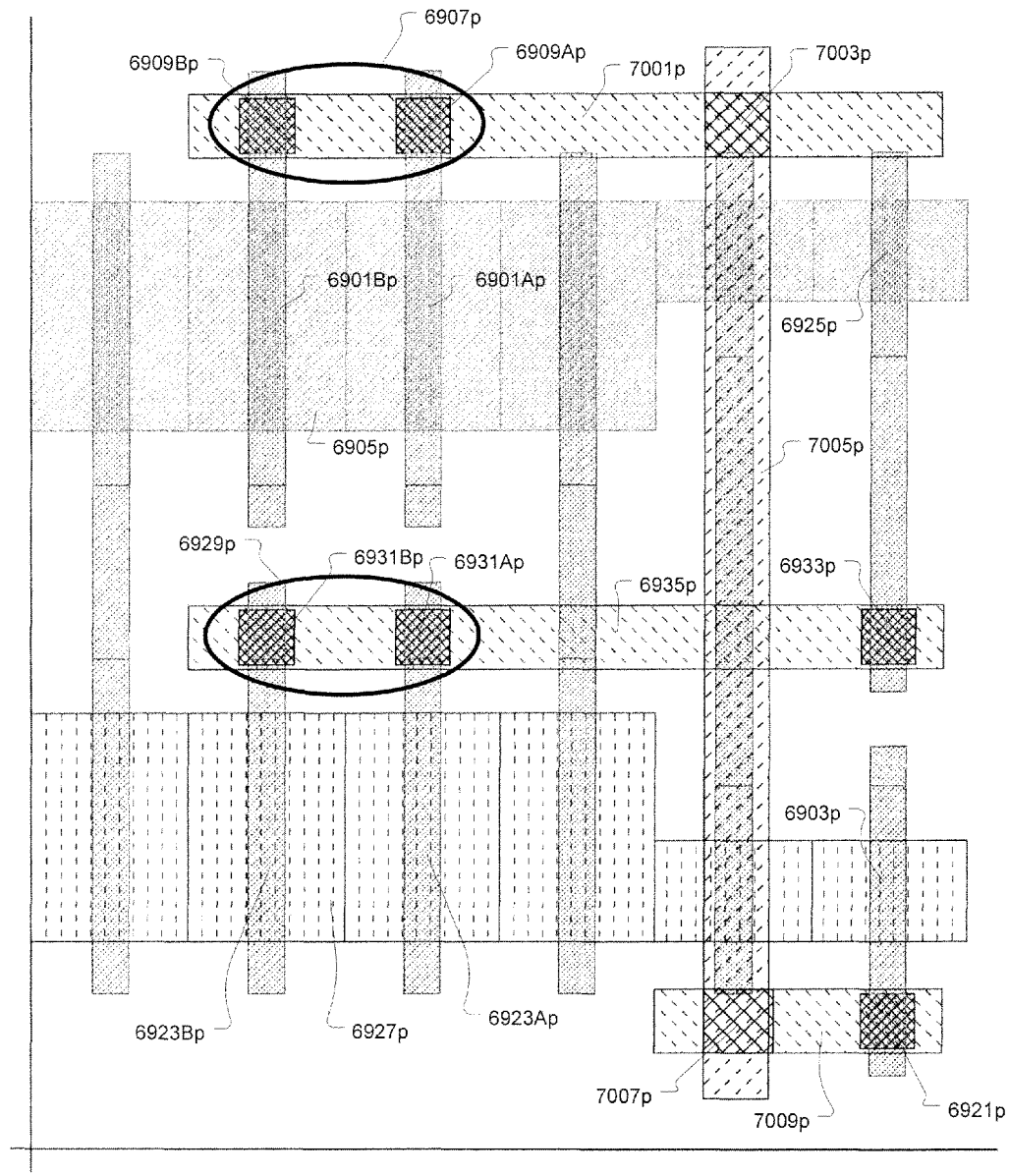

FIG. 96 shows a variant of the cross-coupled transistor layout of FIG. 95, in which the connection between the folded transistor 6901Ap/6901Bp and the transistor 6903p is made using an alternate conductive path through the chip. Specifically, the gate contacts 6909Ap and 6909Bp are connected to the gate contact 6921p of transistor 6903p by way of a metal 1 interconnect level feature 7001p, a via 7003p, a metal 2 interconnect level feature 7005p, a via 7007p, and a metal 1 interconnect level feature 7009p.

Figure 97:
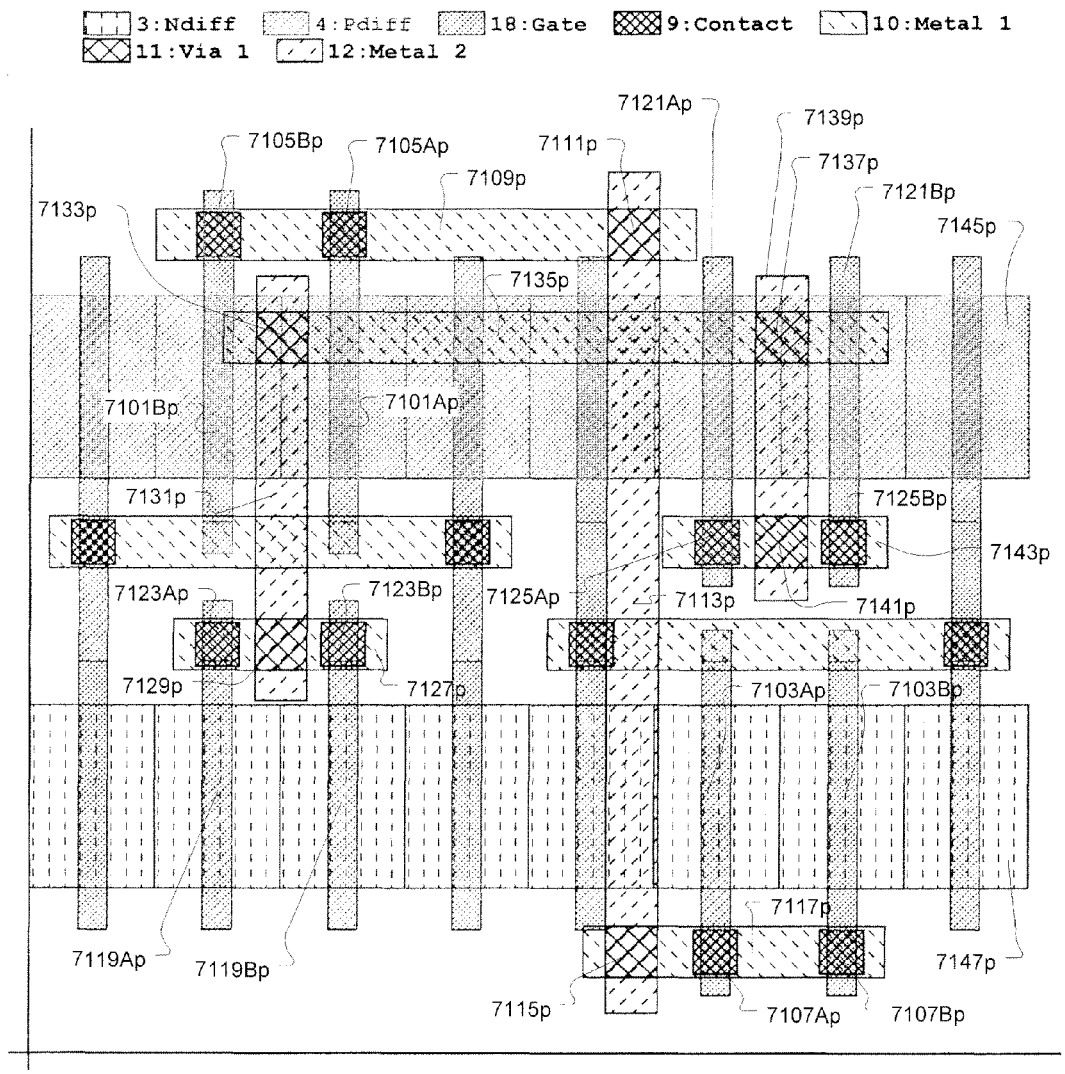

In the example layout of FIG. 97, a first pair of the cross-coupled transistors is defined by a folded transistor 7101Ap/7101Bp and by a folded transistor 7103Ap/7103Bp. Gate contacts 7105Ap and 7105Bp are connected to gate contacts 7107Ap and 7107Bp by way of a metal 1 interconnect level feature 7109p, a via 7111p, a metal 2 interconnect level feature 7113p, a via 7115p, and a metal 1 interconnect level feature 7117p. A second pair of the cross-coupled transistors is defined by a folded transistor 7119Ap/7119Bp and by a folded transistor 7121Ap/7121Bp. Gate contacts 7123Ap and 7123Bp are connected to gate contacts 7125Ap and 7125Bp by way of a metal 1 interconnect level feature 7127p, a via 7129p, a metal 2 interconnect level feature 7131p, a via 7133p, a metal 1 interconnect level feature 7135p, a via 7137p, a metal 2 interconnect level feature 7139p, a via 7141p, and a metal 1 interconnect level feature 7143p. Transistors 7101Ap, 7101Bp, 7121Ap, and 7121Bp are electrically interfaced with diffusion region 7145p. Also, transistors 7119Ap, 7119Bp, 7103Ap, and 7103Bp are electrically interfaced with diffusion region 7147p. Additionally, although not explicitly shown, portions of diffusion regions 7145p and 7147p which are electrically interfaced with the transistors 7101Ap, 7101Bp, 7103Ap, 7103Bp, 7119Ap, 7119Bp, 7121Ap, and 7121Bp are connected to a common output node.

Figure 98:
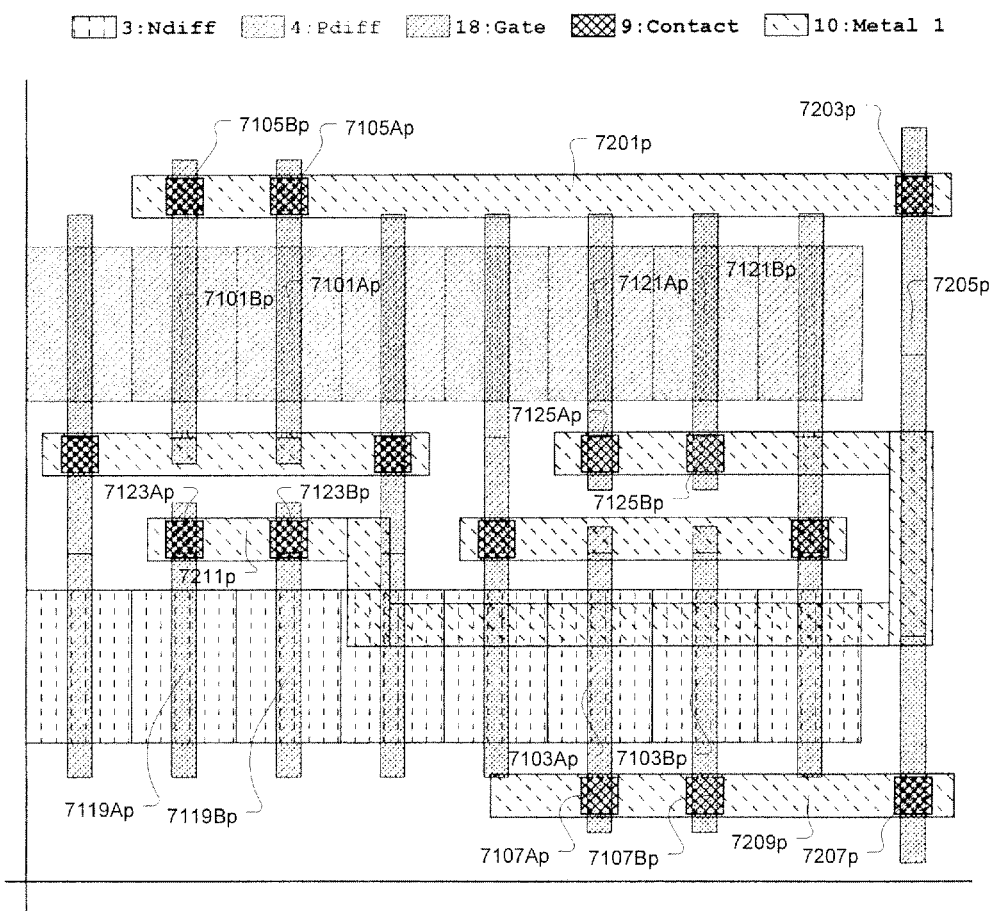

FIG. 98 shows a variant of the cross-coupled transistor layout of FIG. 97, in which the electrical connections between the cross-coupled transistors are made using an alternate conductive paths through the chip. Specifically, the gate contacts 7105Ap and 7105Bp are connected to the gate contacts 7107Ap and 7107Bp by way of a metal 1 interconnect level feature 7201p, a contact 7203p, a gate level feature 7205p, a contact 7207p, and a metal 1 interconnect level feature 7209p. Also, the gate contacts 7123Ap and 7123Bp are connected to the gate contacts 7125Ap and 7125Bp by way of a metal 1 interconnect level feature 7211p. In this embodiment, the metal 1 interconnect level in unrestricted with regard to bends in conductive features. Therefore, the metal 1 interconnect level feature 7211p can be defined to "snake" through the metal 1 interconnect level to make the required cross-coupled transistor connections, as permitted by surrounding layout features.

Figure 99:
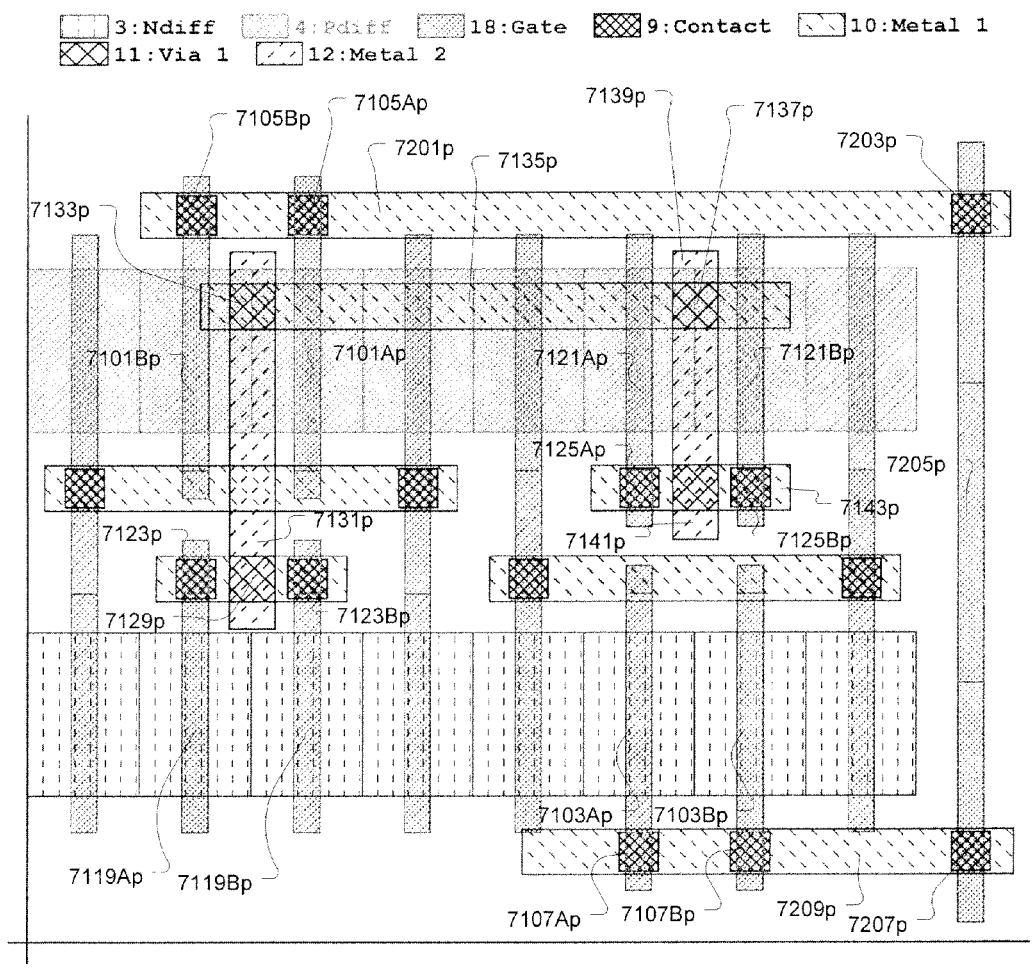

FIG. 99 shows a variant of the cross-coupled transistor layout of FIG. 97, in which the connection between the folded transistor 7101Ap/7101Bp and the folded transistor 7103Ap/7103Bp is made using an alternate conductive path through the chip. Specifically, the gate contacts 7105Ap and 7105Bp are connected to the gate contacts 7107Ap and 7107Bp by way of the metal 1 interconnect level feature 7201p, the contact 7203p, the gate level feature 7205p, the contact 7207p, and the metal 1 interconnect level feature 7209p. It should be understood that the cross-coupled transistor layouts utilizing folded transistors as shown in FIGS. 95-99 are provided by way of example, and should not be construed as fully inclusive.

In each FIGS. 26-99, the cross-coupled transistor connections have been described by tracing through the various conductive features of each conductive path used to connect each pair of transistors in the cross-coupled layout. It should be appreciated that the conductive path used to connect each pair of transistors in a given cross-coupled layout can traverse through conductive features any number of levels of the chip, utilizing any number of contacts and vias as necessary. For ease of description with regard to FIGS. 100 through 192, the conductive paths used to connect the various NMOS/PMOS transistor pairs in each cross-coupled transistor layout are identified by heavy black lines drawn over the corresponding layout features.

As previously mentioned, FIGS. 26-99 do not explicitly show connection of the diffusion regions of the cross-coupled transistors to a common node, although this connection is present. FIGS. 100-111 show exemplary cross-coupled transistor layouts in which the n-type and p-type diffusion regions of the cross-coupled transistors are shown to be electrically connected to a common node. The conductive path used to connect the diffusion regions of the cross-coupled transistors to the common node in each of FIGS. 100-111 is identified by a heavy black dashed line drawn over the corresponding layout features. For ease of description, FIGS. 112-148 do not show the heavy black dashed line corresponding to the conductive path used to connect the diffusion regions of the cross-coupled transistors to the common node. However, some of FIGS. 112-148 do show the layout features associated with the conductive path, or a portion thereof, used to connect the diffusion regions of the cross-coupled transistors to the common node. Again, although not explicitly shown in each of FIGS. 26-148, it should be understood that each of the exemplary cross-coupled transistor layout includes a conductive path that connects the diffusion regions of the cross-coupled transistors to a common output node.

FIGS. 112-148 show a number of exemplary cross-coupled transistor layouts in which the p-type diffusion regions that are electrically interfaced with the cross-coupled transistors are physically separated from each other. For example, with regard to FIG. 112, the p-type diffusion region 8601p is physically separated from the p-type diffusion region 8603p. However, the p-type diffusion regions 8601p and 8603p are electrically connected to each other by way of contact 8605p, metal 1 interconnect level feature 8607p, and contact 8609p. Although not shown, the diffusion regions 8601p and 8603p are also electrically connected to diffusion region 8611p. It should be understood that a variant of each cross-coupled transistor layout as shown in each of FIGS. 112-148, can be defined by changing the p-type diffusion regions as shown to n-type diffusion regions, and by also changing the n-type diffusion regions as shown to p-type diffusions regions. Therefore, such variants of FIGS. 112-148 illustrate a number of exemplary cross-coupled transistor layouts in which the n-type diffusion regions that are electrically interfaced with the cross-coupled transistors are physically separated from each other.

FIGS. 149-175 show a number of exemplary cross-coupled transistor layouts defined using two gate contacts to connect one pair of complementary (i.e., NMOS/PMOS) transistors in the cross-coupled transistor layout to each other, and using no gate contact to connect the other pair of complementary transistors in the cross-coupled transistor layout to each other. It should be understood that two gate electrodes of each pair of cross-coupled transistors, when considered as a single node, are electrically connected through at least one gate contact to circuitry external to the cross-coupled transistor portion of the layout. Therefore, it should be understood that the gate electrodes mentioned above, or absence thereof, with regard to connecting each pair of complementary transistors in the cross-coupled transistor layout, refer to gate electrodes defined within the cross-coupled transistor portion of the layout.

Figure 149:
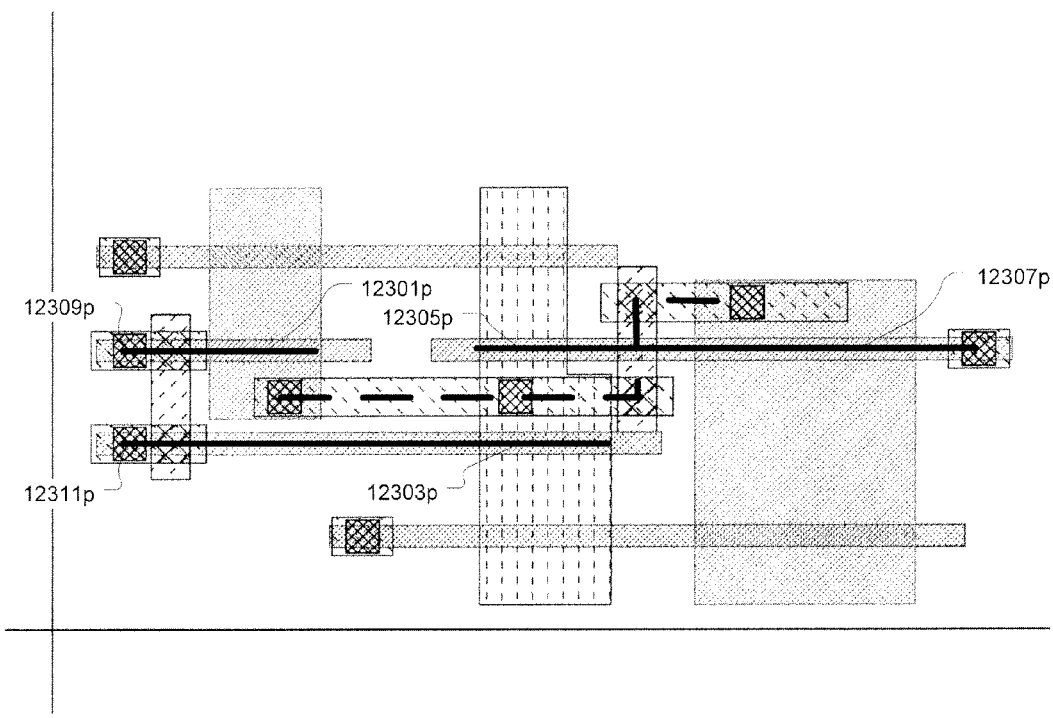
Figure 150:
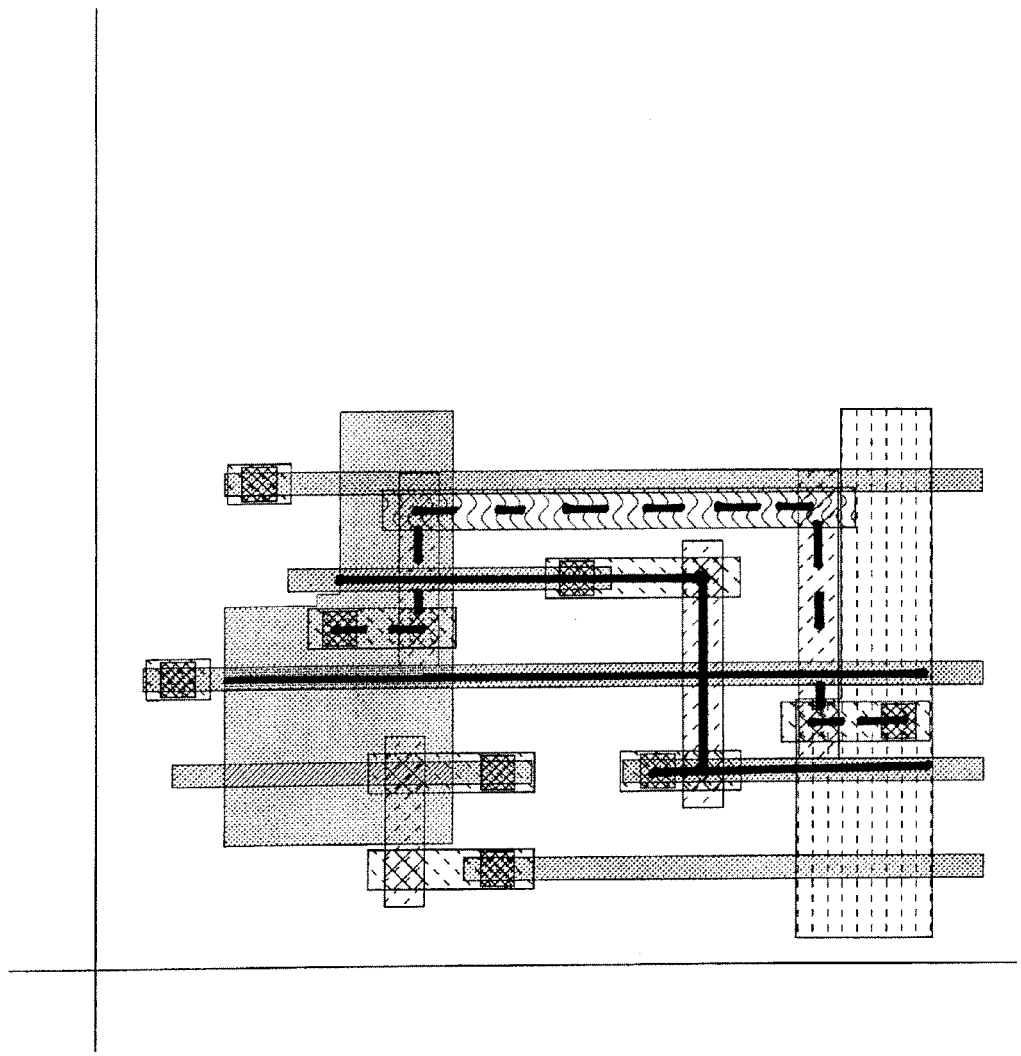
Figure 151:
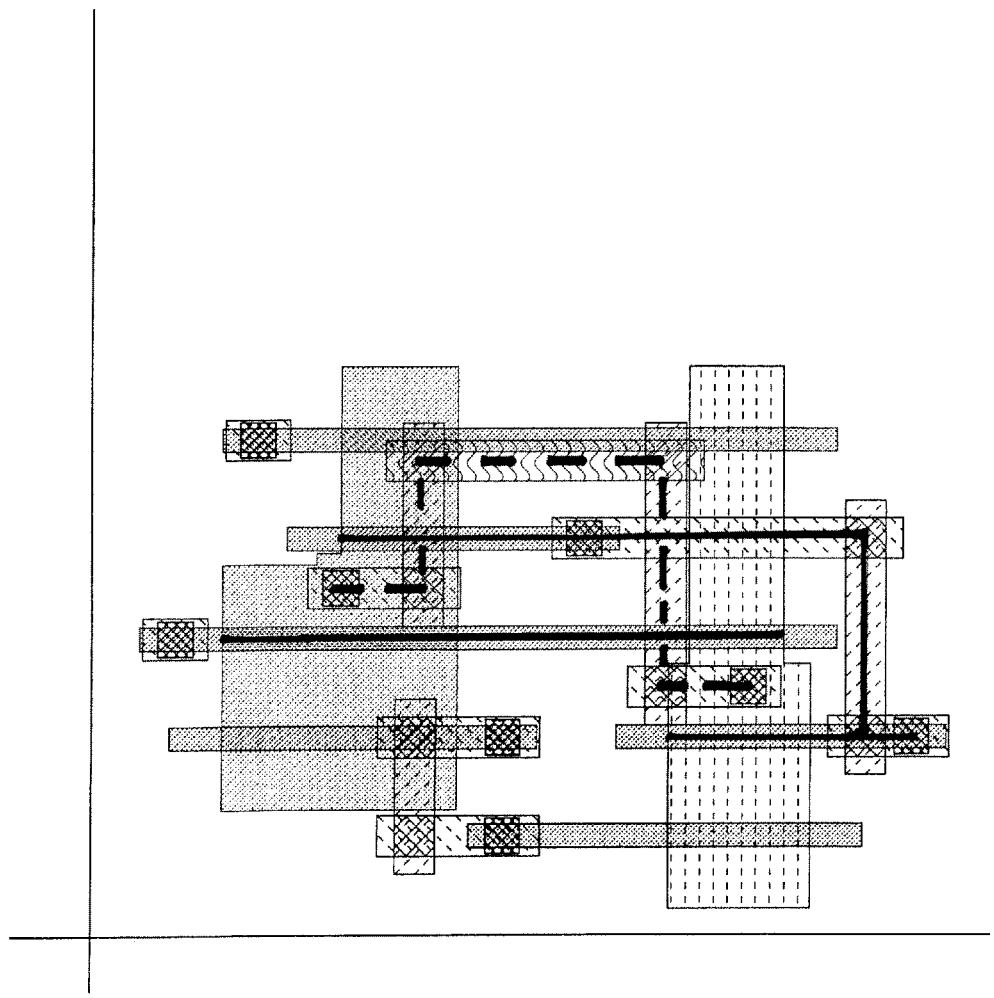
Figure 152:
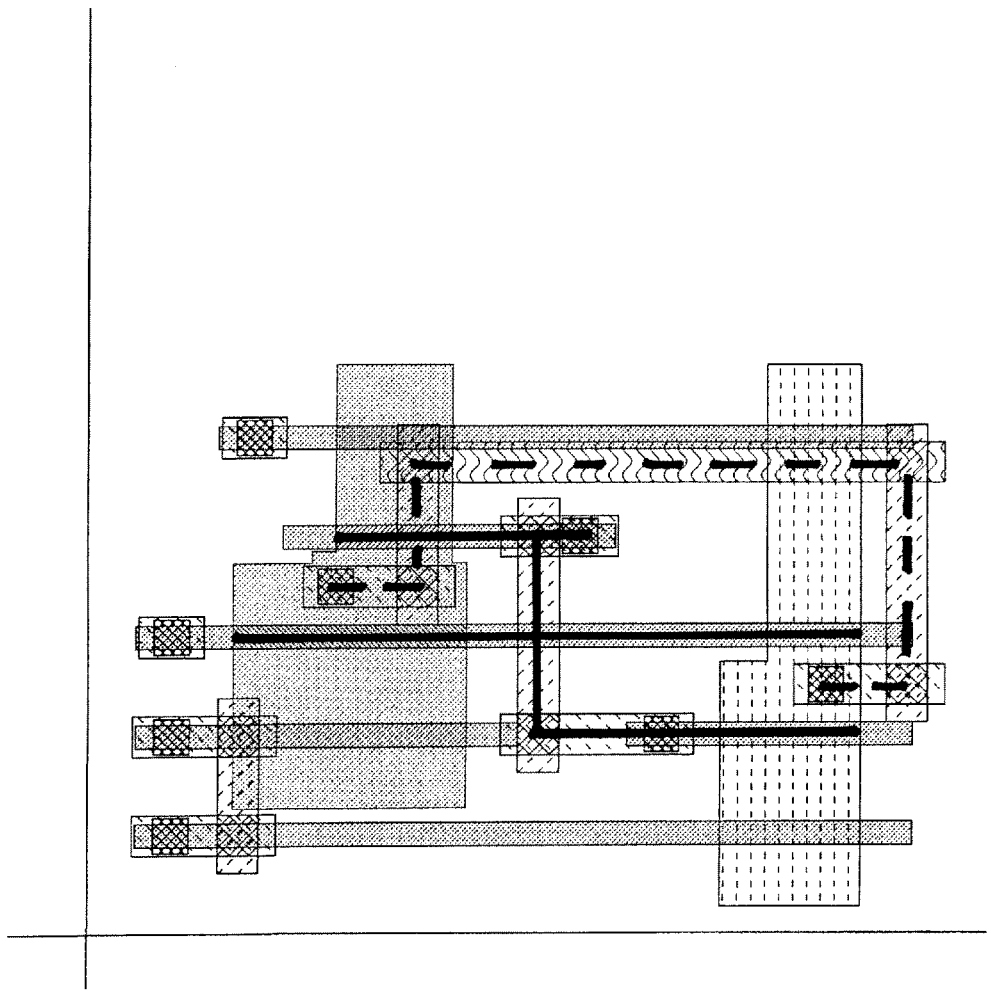
Figure 153:
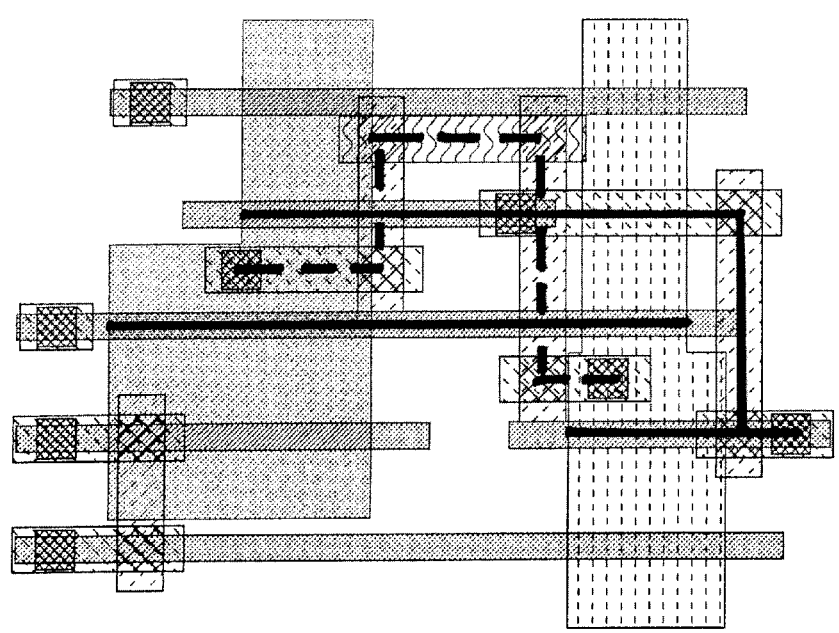
Figure 154:
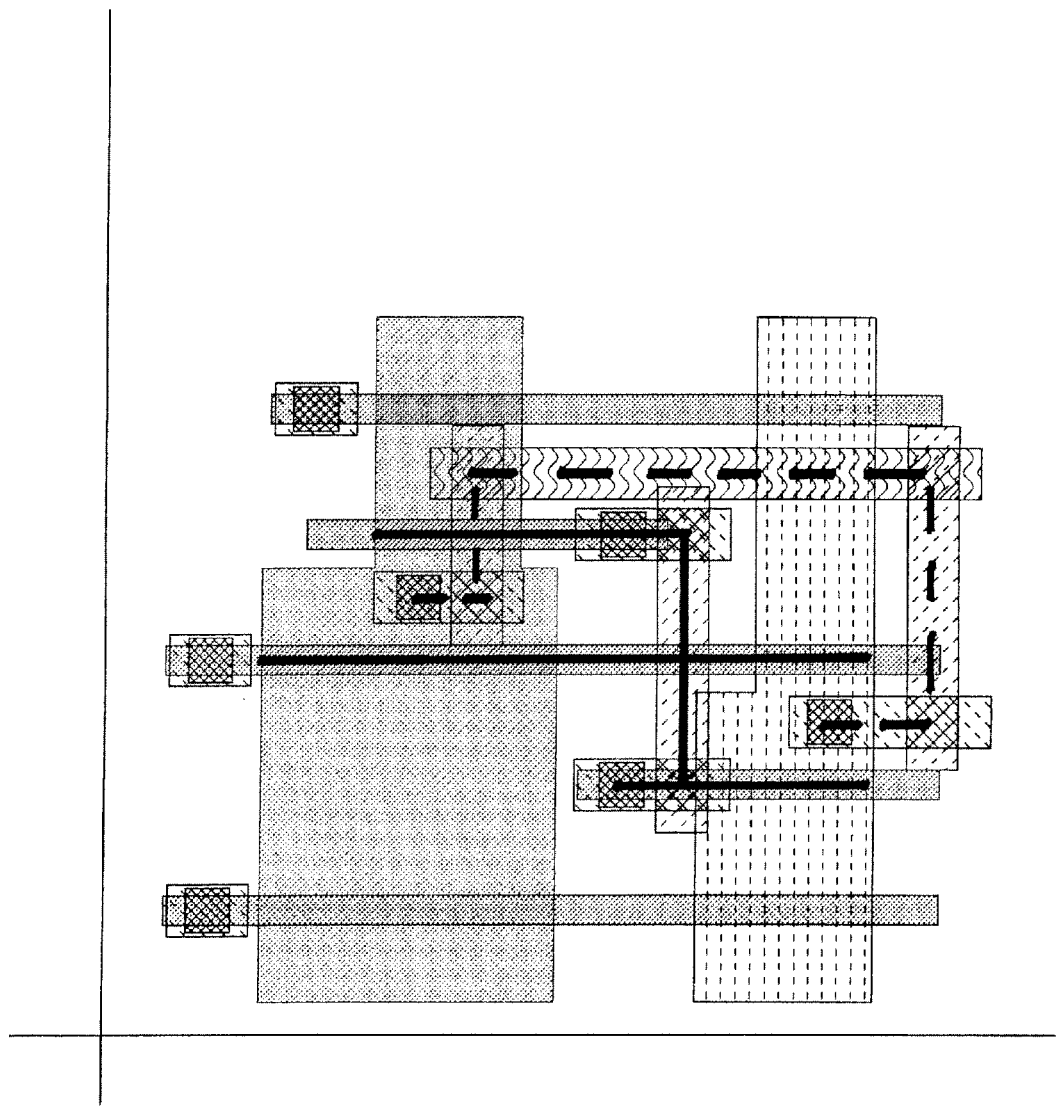
Figure 155:
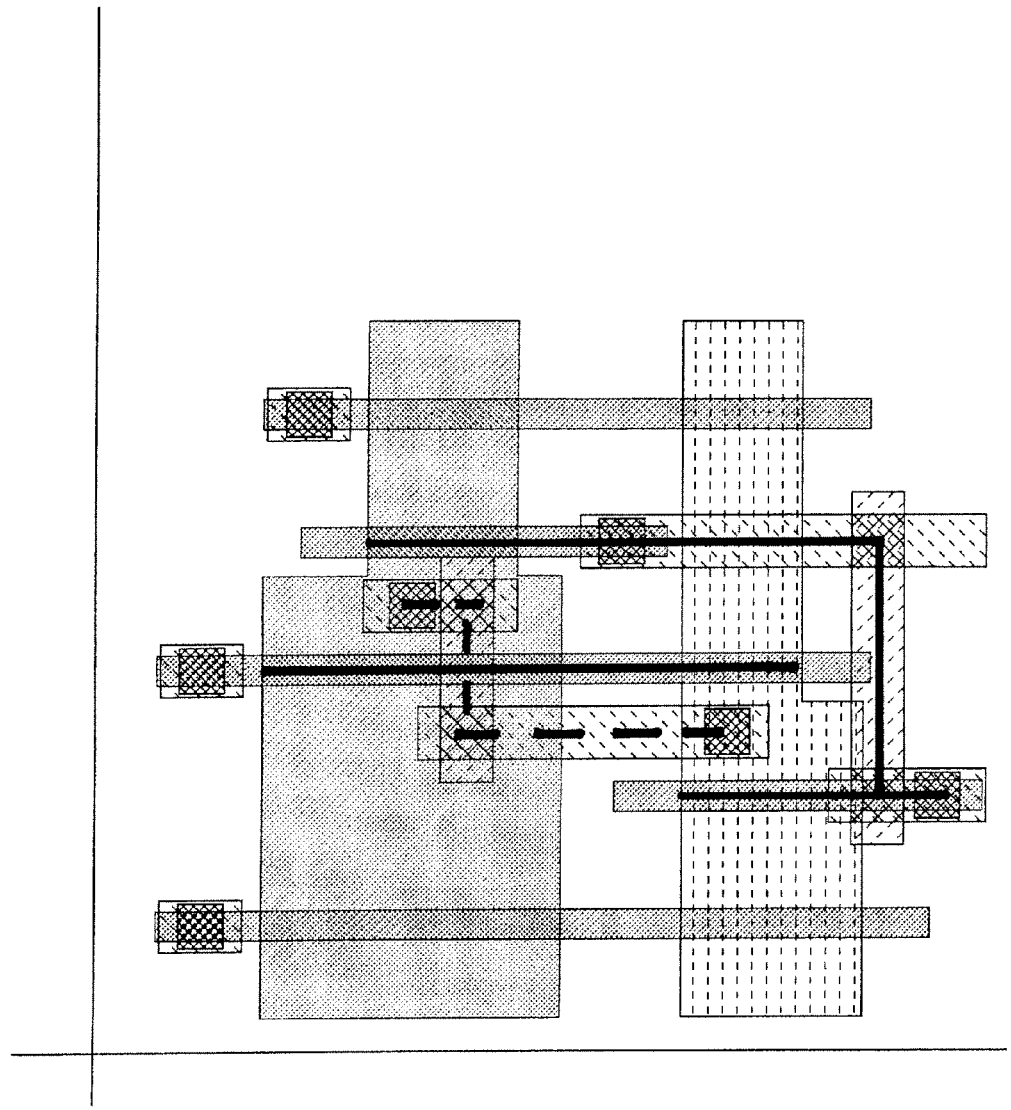
Figure 156:
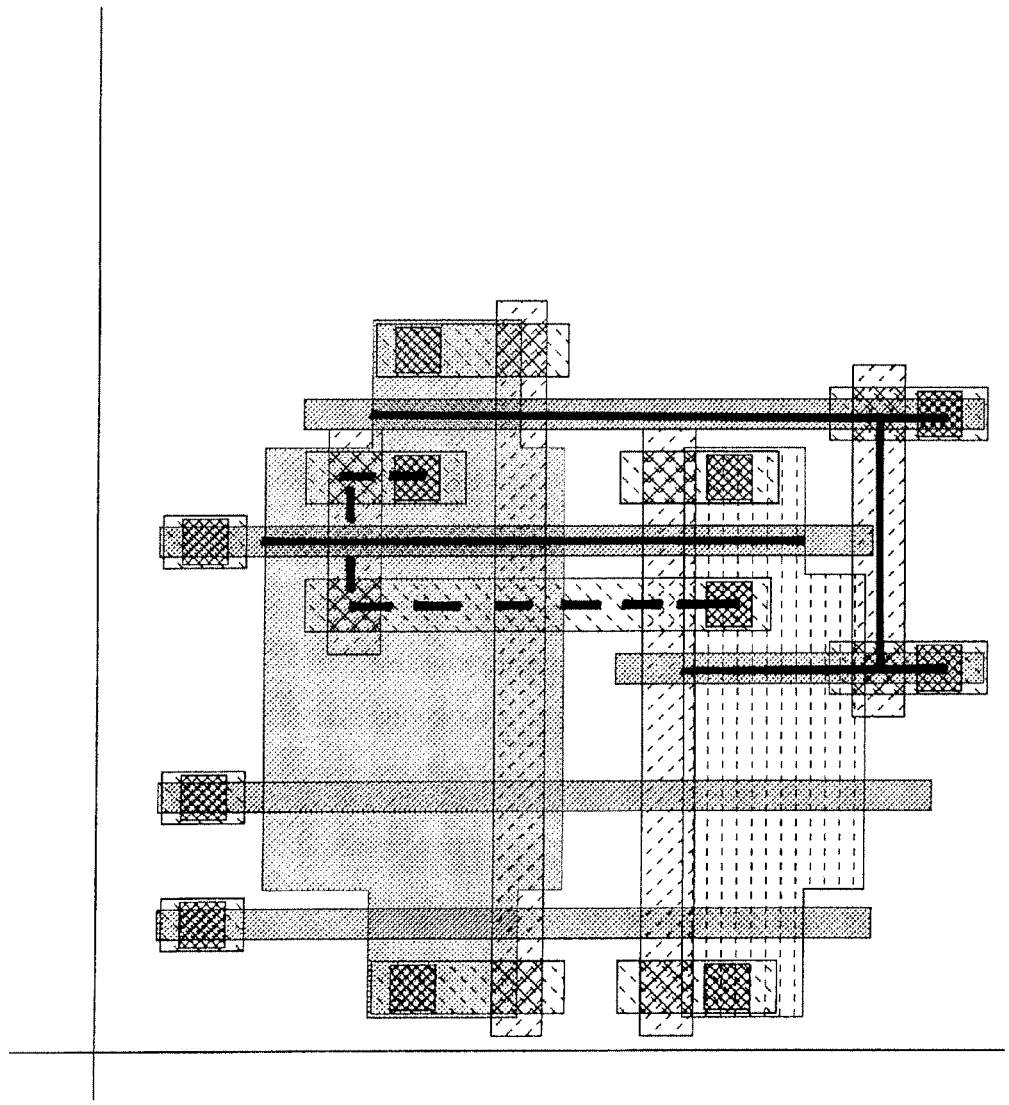
Figure 157:
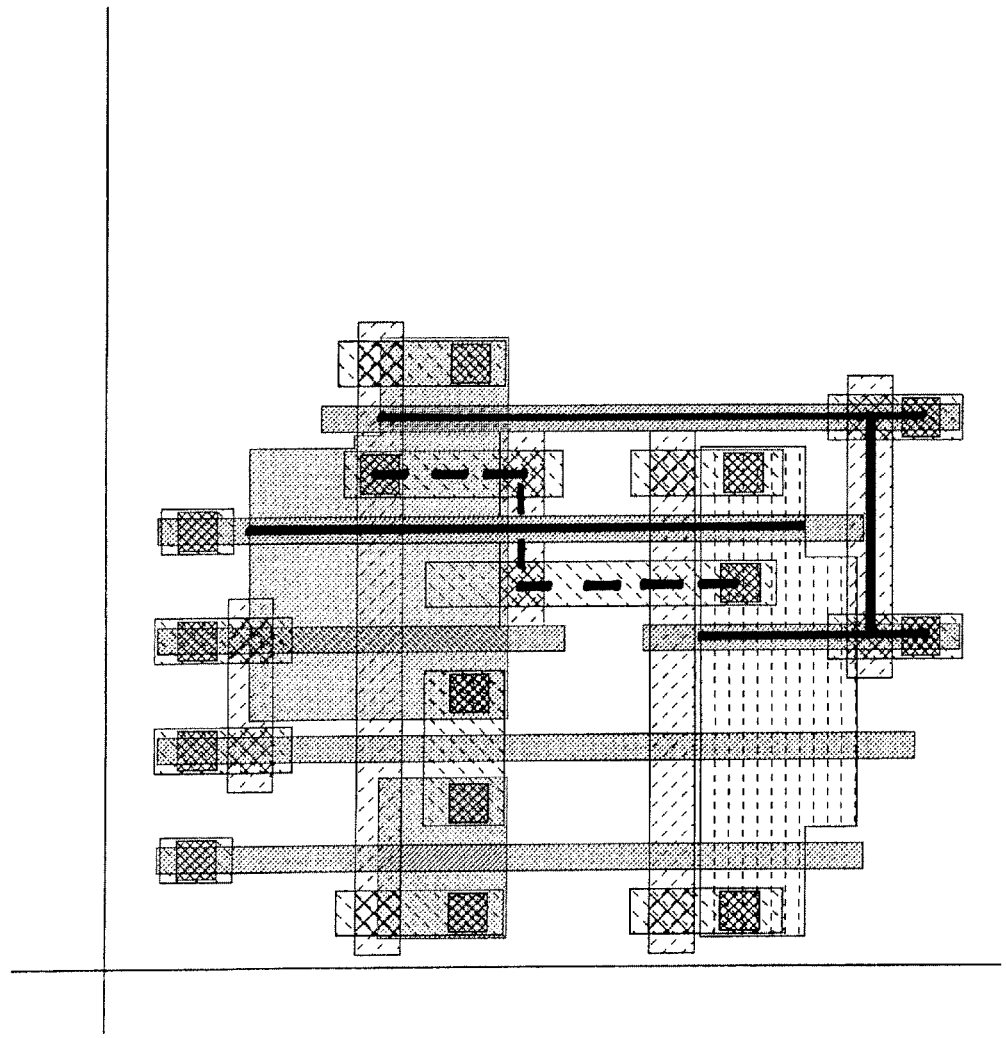
Figure 158:
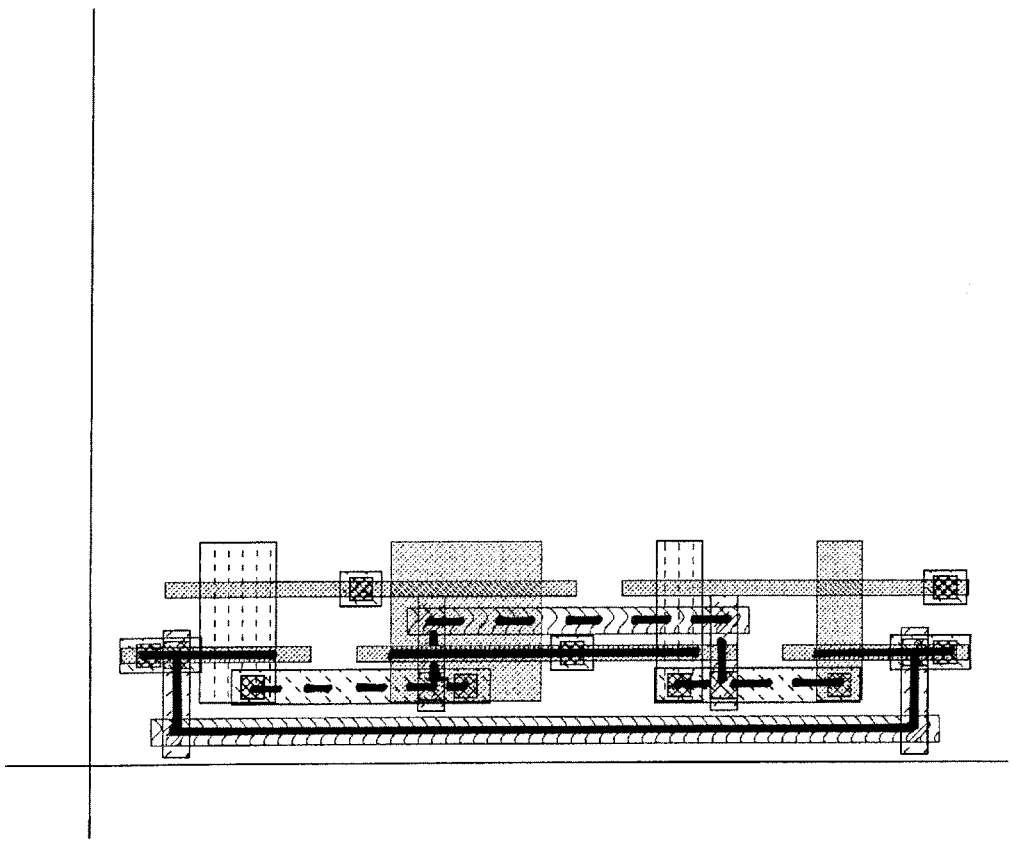
FIGS. 158-166, 173-183, 185, and 187-191 illustrate various cross-coupled transistor layout embodiments in which two PMOS transistors of the cross-coupled transistors are respectively disposed over physically separated p-type diffusion regions, two NMOS transistors of the cross-coupled transistors are respectively disposed over physically separated n-type diffusion regions, and the p-type and n-type diffusion regions associated with the cross-coupled transistors are electrically connected to a common node.
Figure 159:
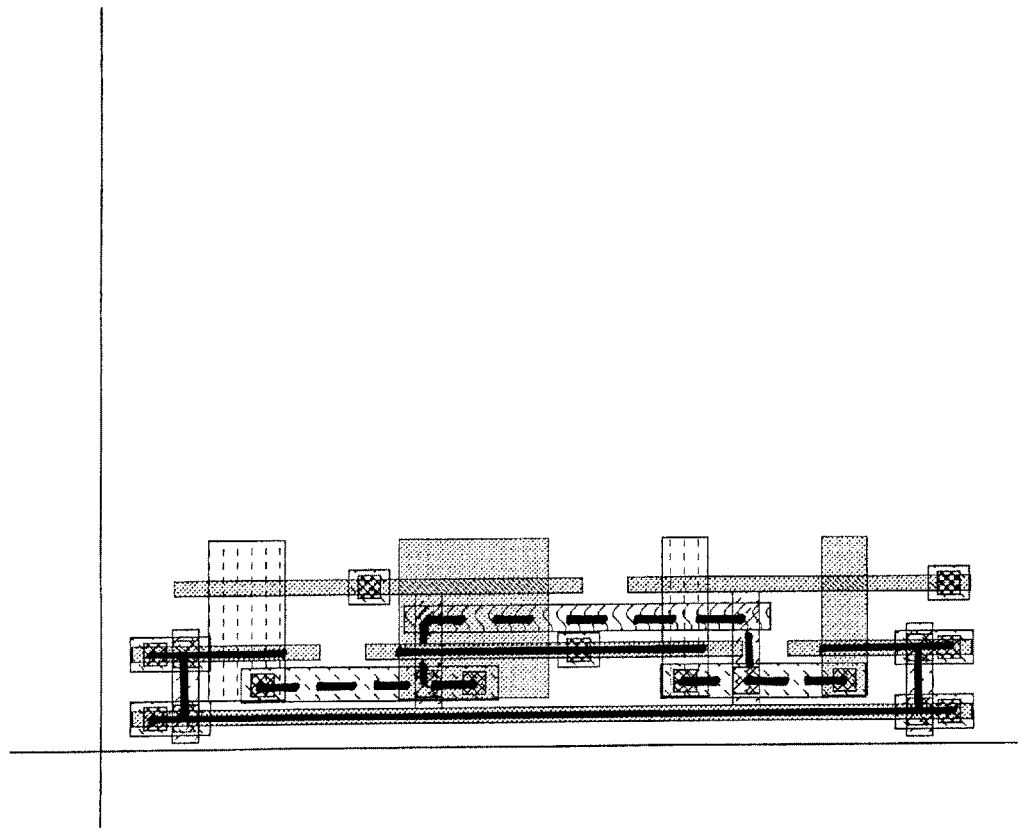
Figure 160:
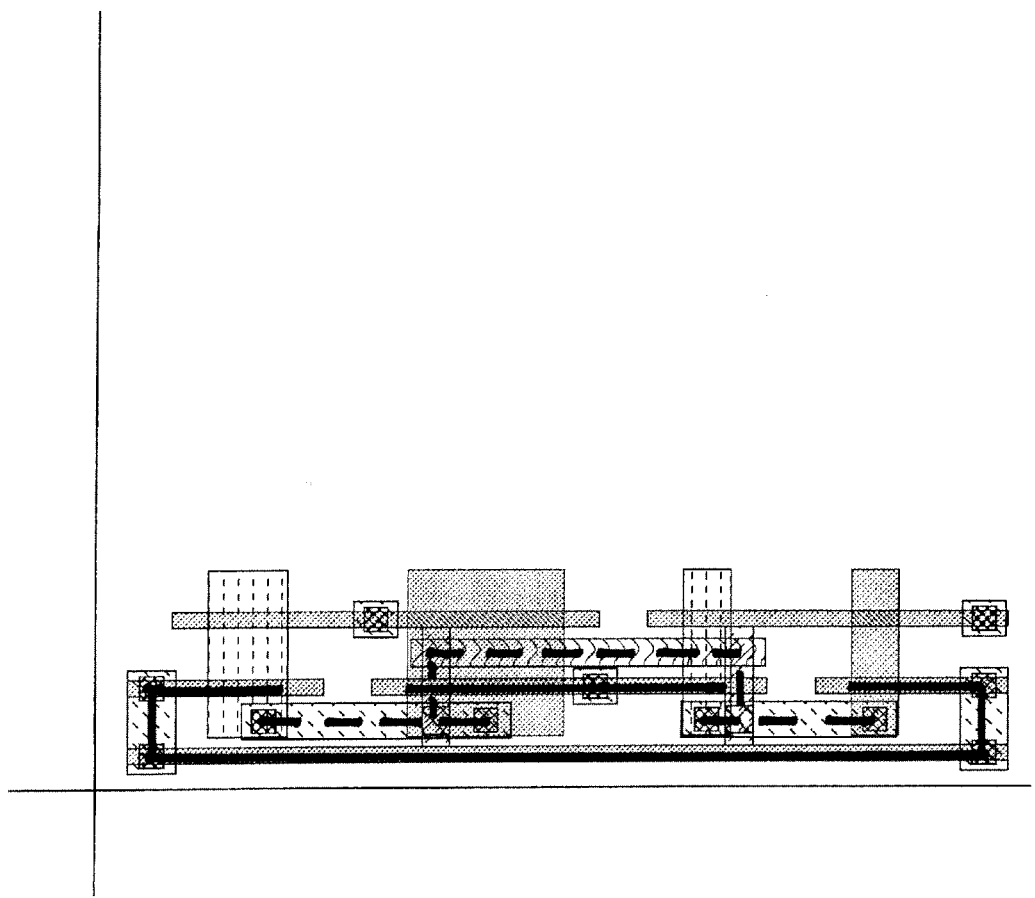
Figure 161:
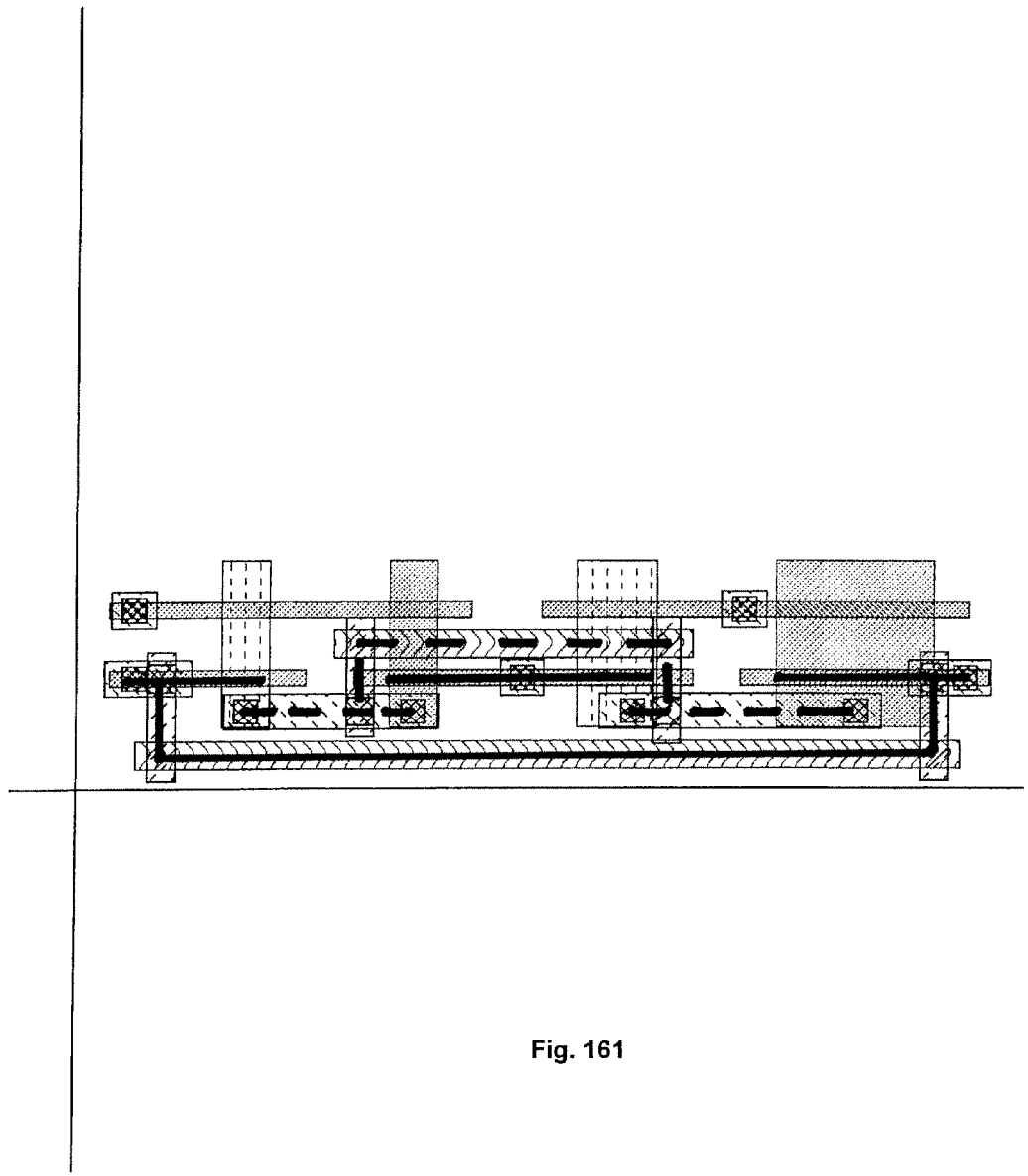
Figure 162:
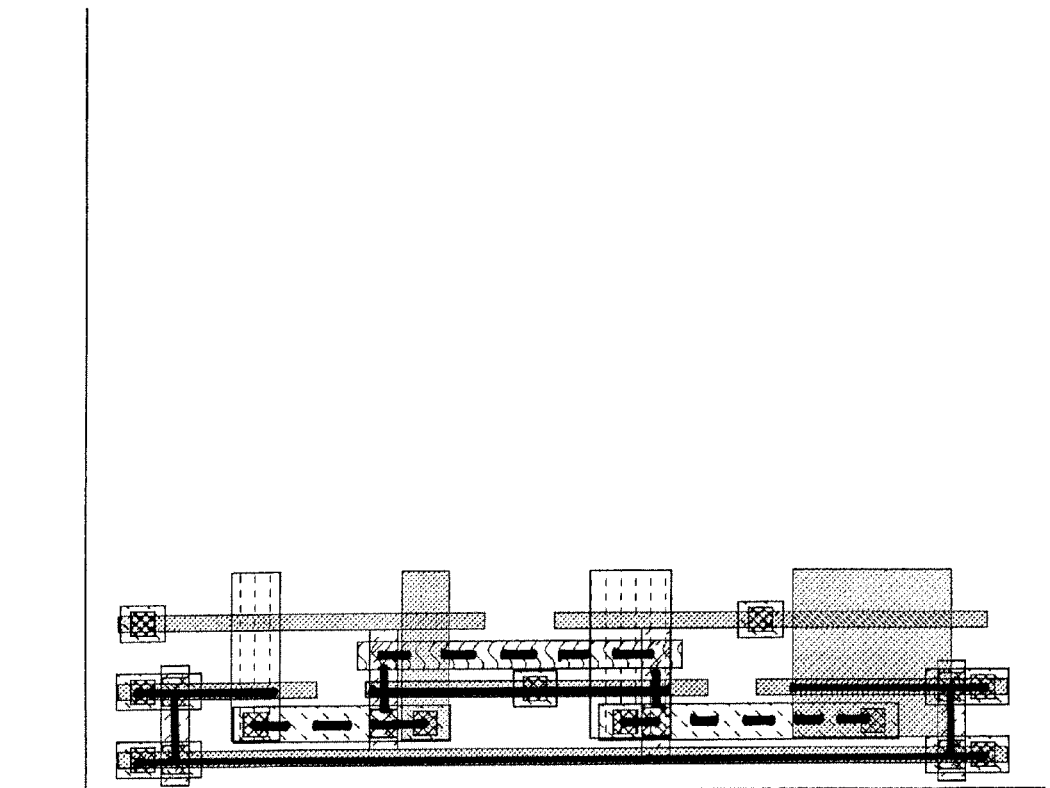
Figure 163:
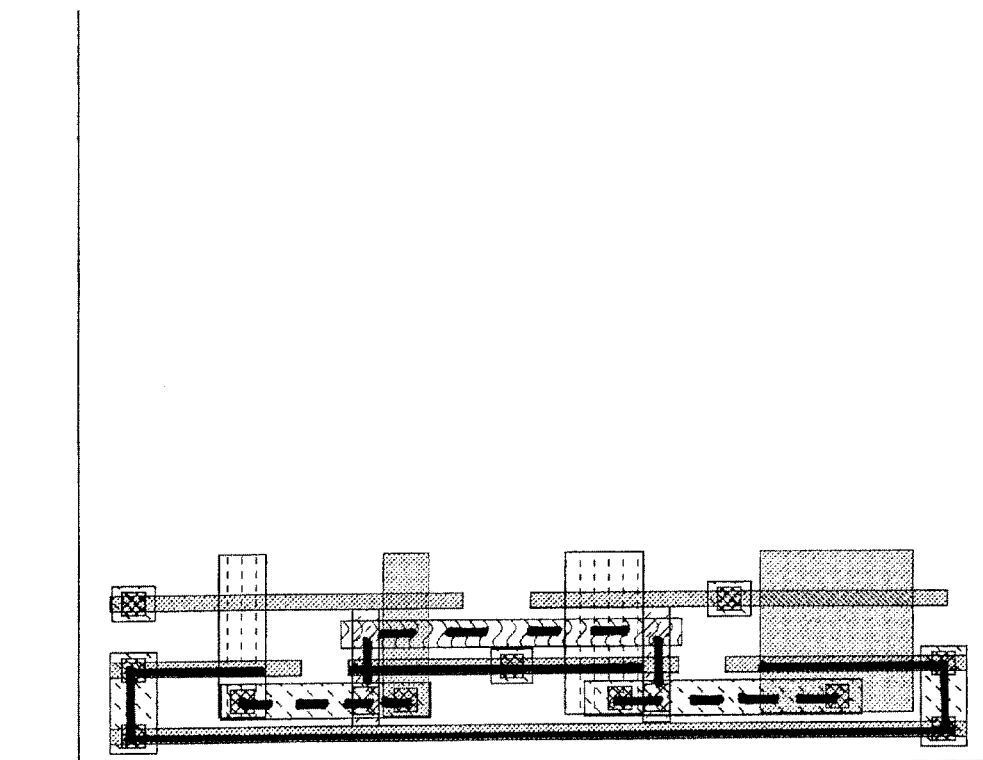
Figure 164:
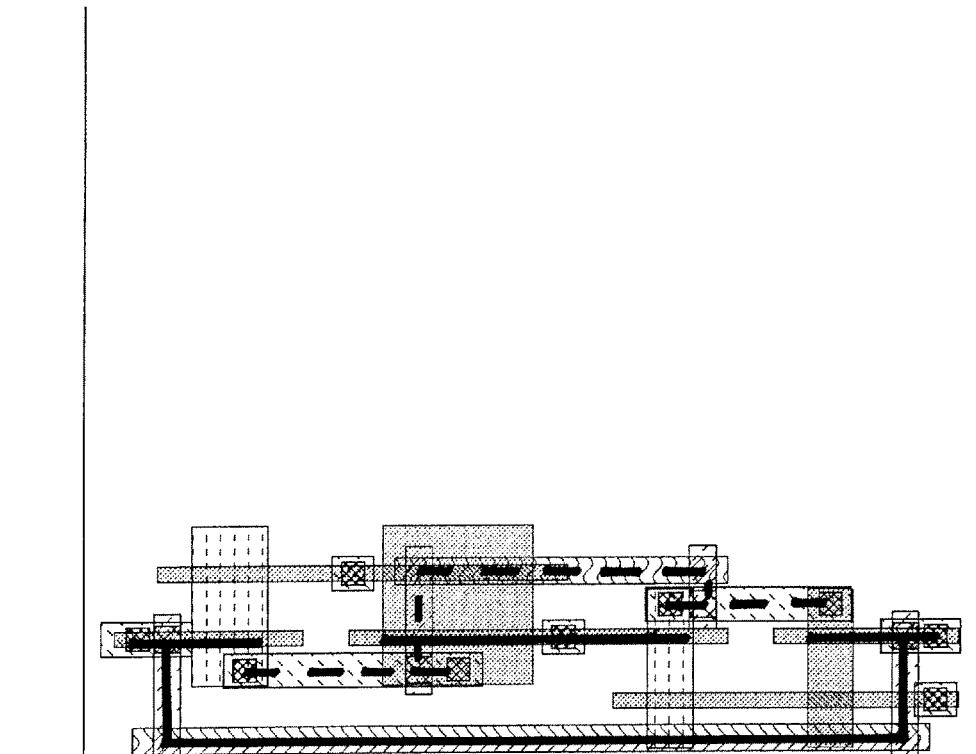
Figure 165:
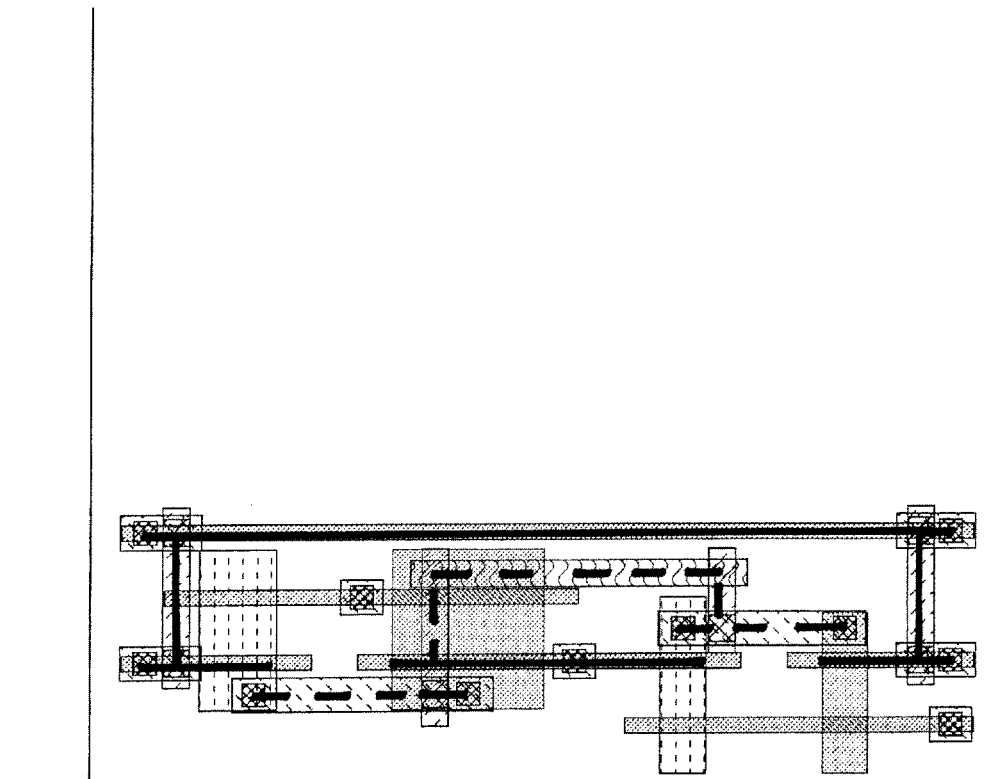
Figure 166:
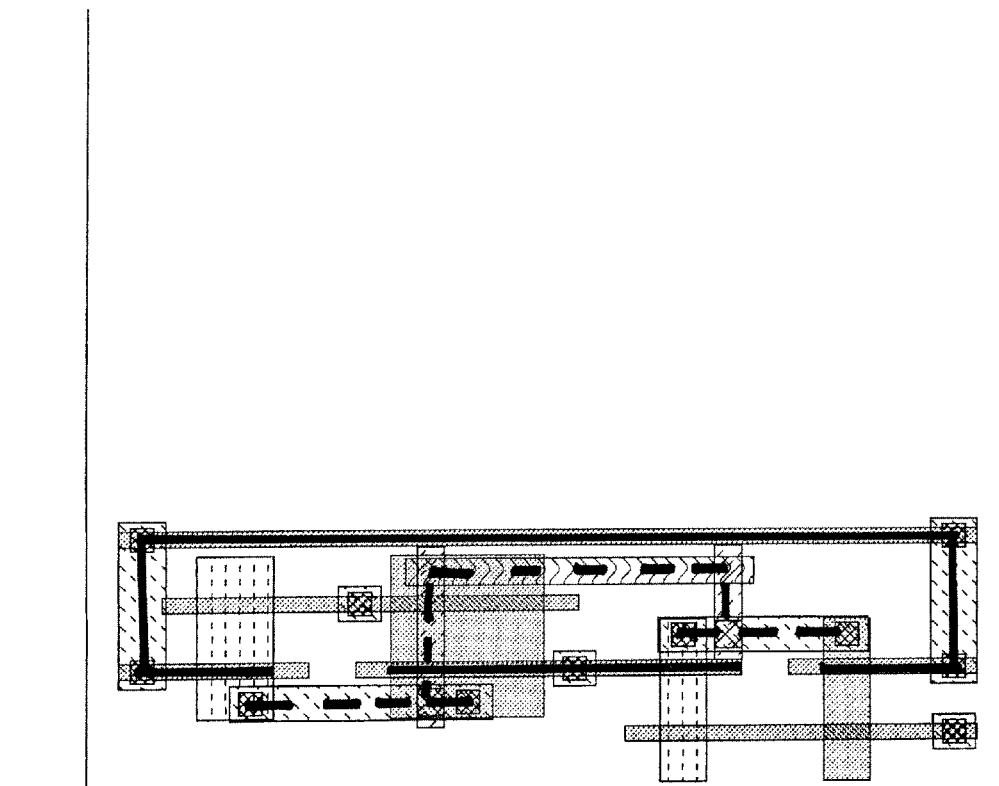
Figure 167:
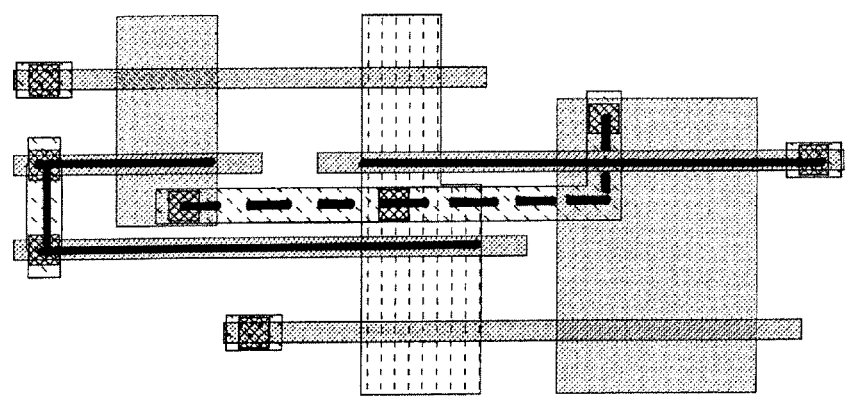
Figure 168:
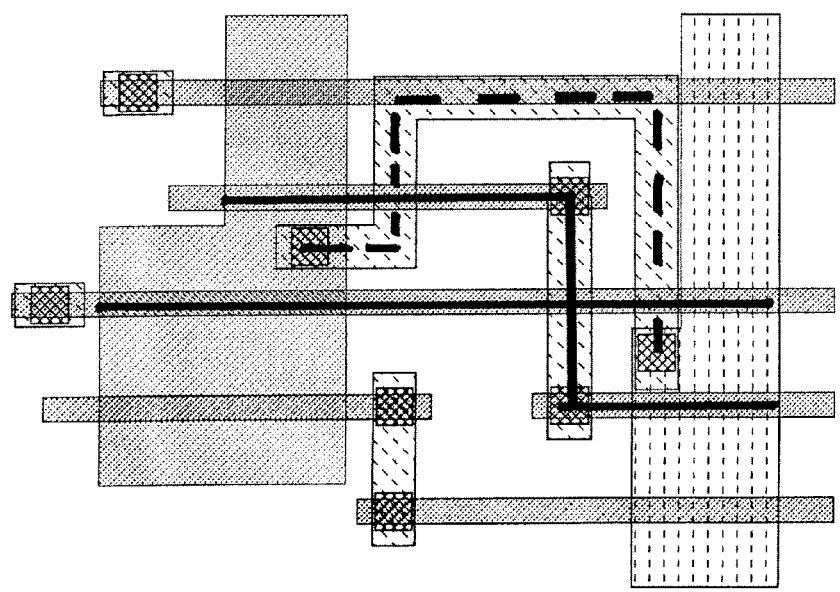
Figure 169:
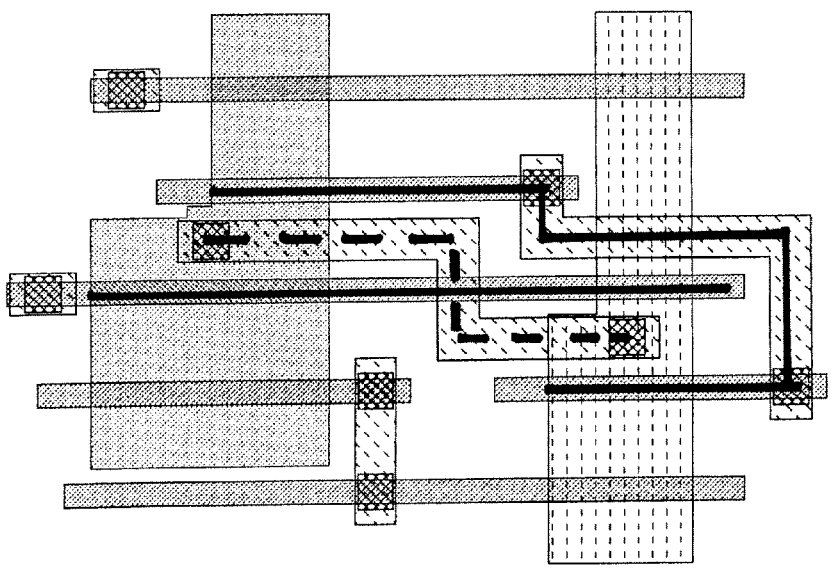
Figure 170:
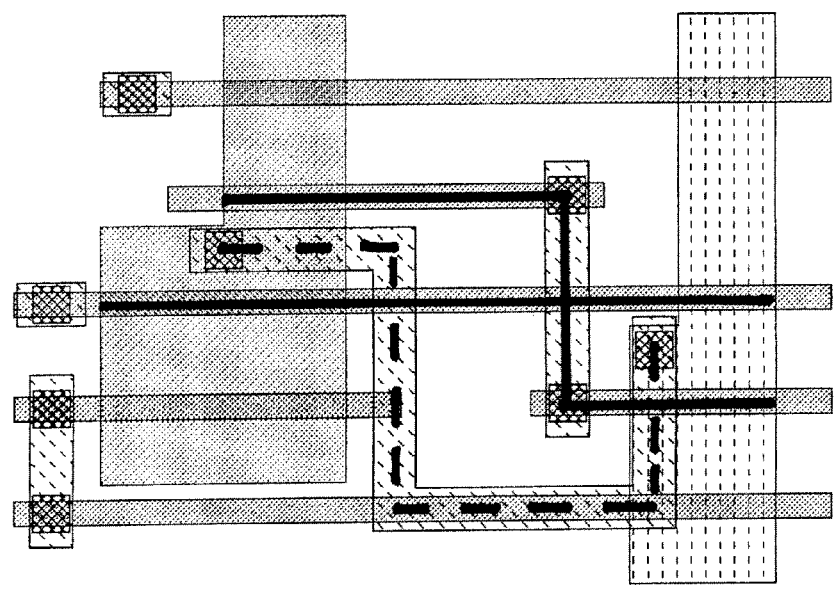
Figure 171:
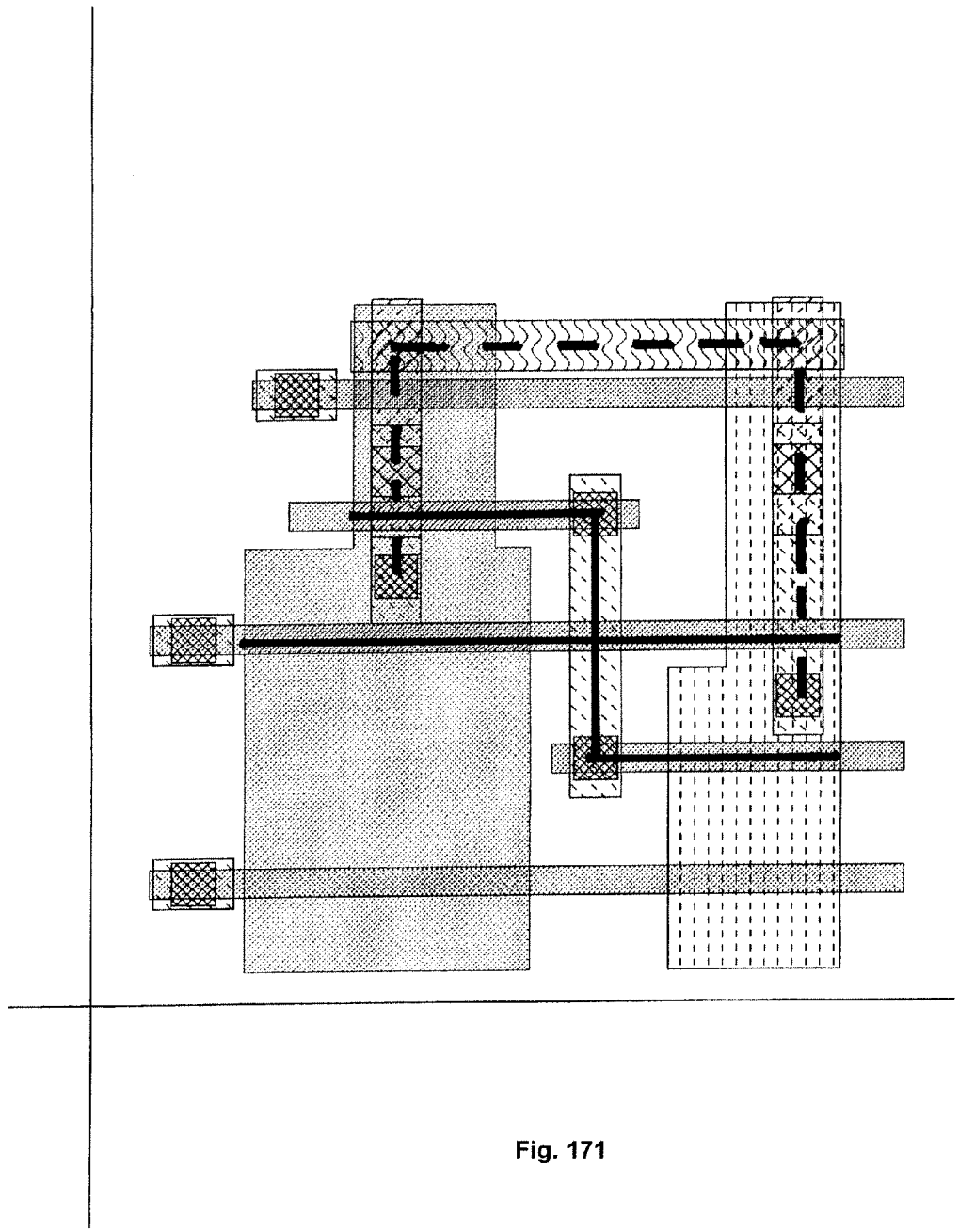
Figure 172:
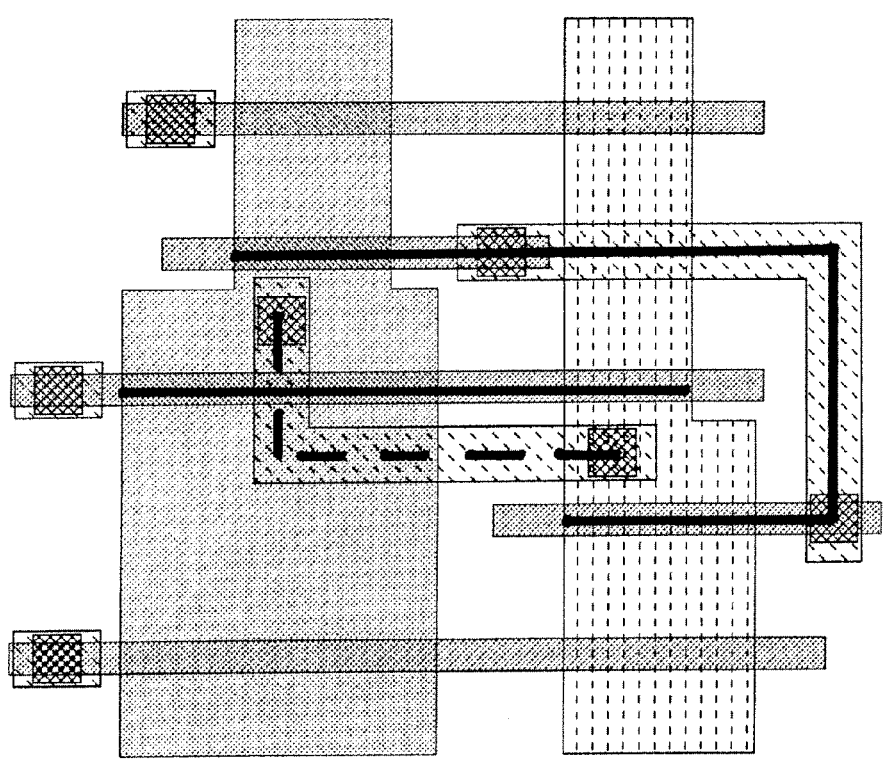
Figure 173:
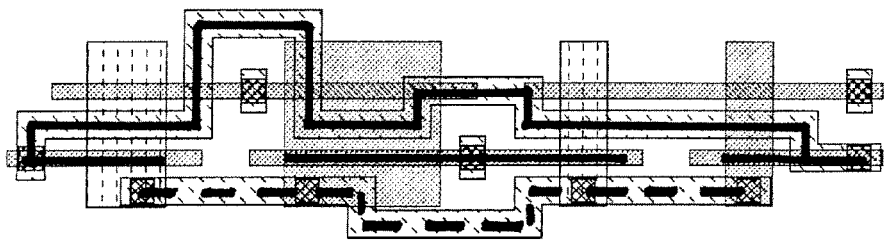
Figure 174:
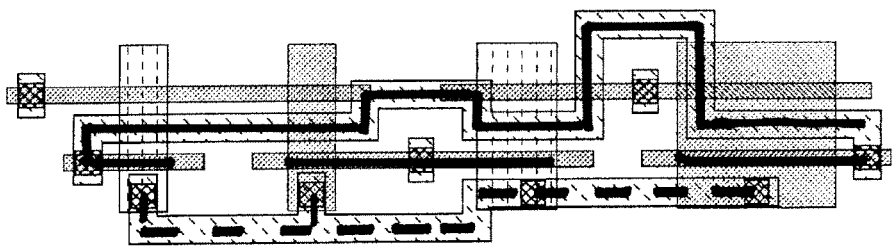
Figure 175:
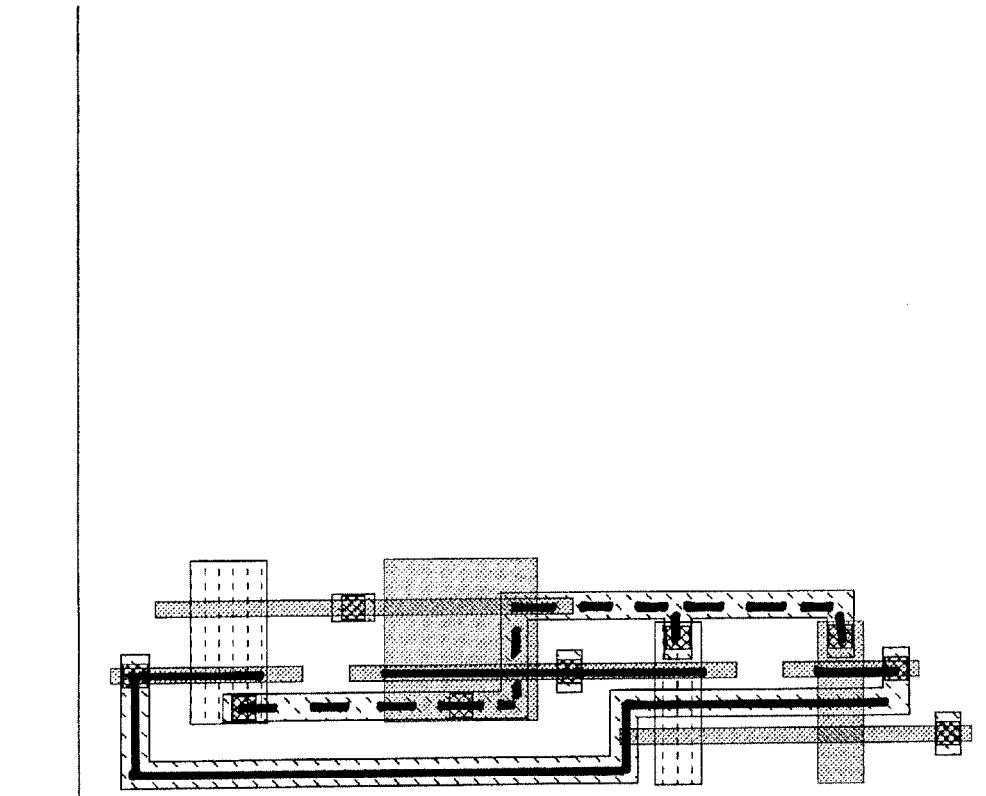

For example, FIG. 149 shows a cross-coupled transistor layout in which a gate electrode of transistor 12301p is electrically connected to a gate electrode of transistor 12303p by way of two gate contacts 12309p and 12311p in combination with other conductive features. Also, the gate electrodes of transistors 12305p and 12307p are defined as a single, continuous linear conductive feature within the gate level. Therefore, a gate contact is not required to electrically connect the gate electrodes of transistors 12305p and 12307p. The conductive path used to connect the diffusion regions of the cross-coupled transistors to the common output node in each of FIGS. 149-175 is identified by a heavy black dashed line drawn over the corresponding layout features.

It should be appreciated that the cross-coupled transistor layout defined using two gate contacts to connect one pair of complementary transistors and no gate contact to connect the other pair of complementary transistors can be implemented in as few as two gate electrode tracks, wherein a gate electrode track is defined as a virtual line extending across the gate level in a parallel relationship to its neighboring gate electrode tracks. These two gate electrode tracks can be located essentially anywhere in the layout with regard to each other. In other words, these two gate electrode tracks are not required to be located adjacent to each other, although such an arrangement is permitted, and in some embodiments may be desirable. The cross-coupled transistor layout embodiments of FIGS. 149-175 can be characterized in that two gate electrodes of one pair of connected complementary transistors in the cross-coupled layout are defined from a single, continuous linear conductive feature defined in the gate level.

FIGS. 176-191 show a number of exemplary cross-coupled transistor layouts defined using no gate contacts to connect each pair of complementary transistors in the cross-coupled transistor layout. Again, it should be understood that two gate electrodes of each pair of cross-coupled transistors, when considered as a single node, are electrically connected through at least one gate contact to circuitry external to the cross-coupled transistor portion of the layout. Therefore, it should be understood that the absence of gate electrodes with regard to connecting each pair of complementary transistors in the cross-coupled transistor layout refers to an absence of gate electrodes defined within the cross-coupled transistor portion of the layout.

Figure 176:
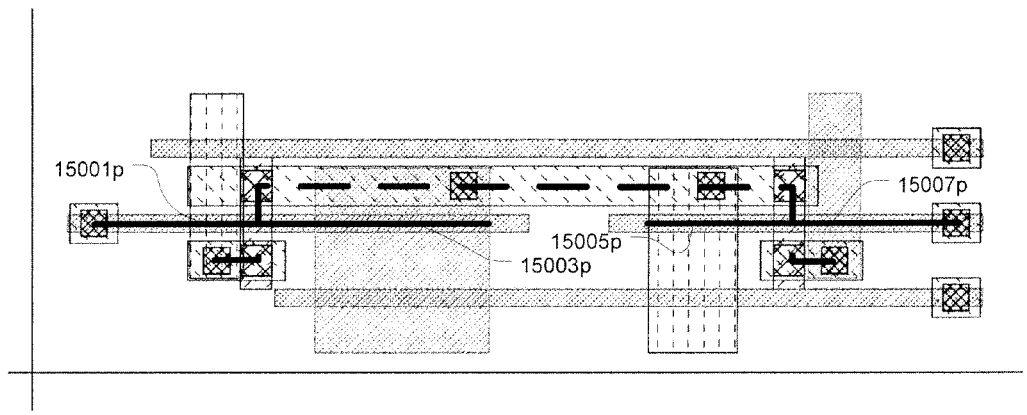
Figure 177:
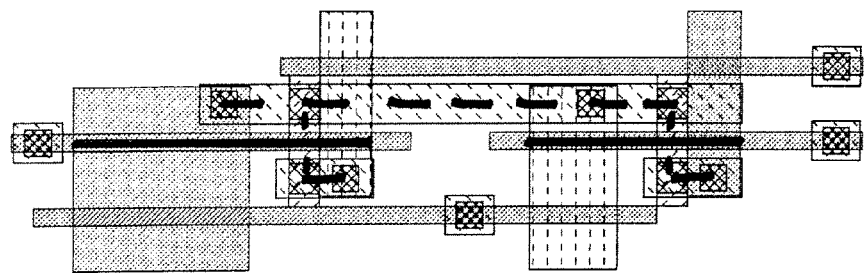
Figure 178:
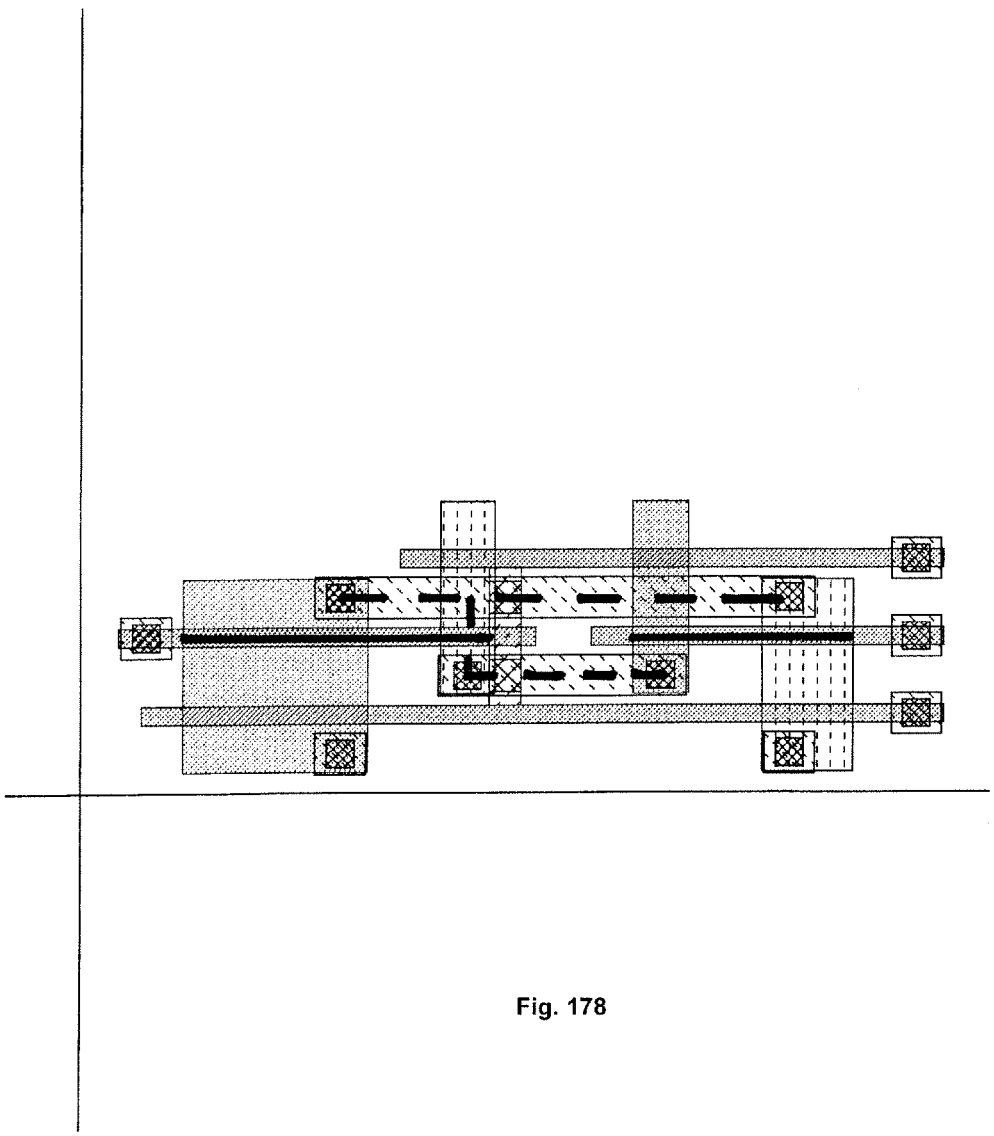
Figure 179:
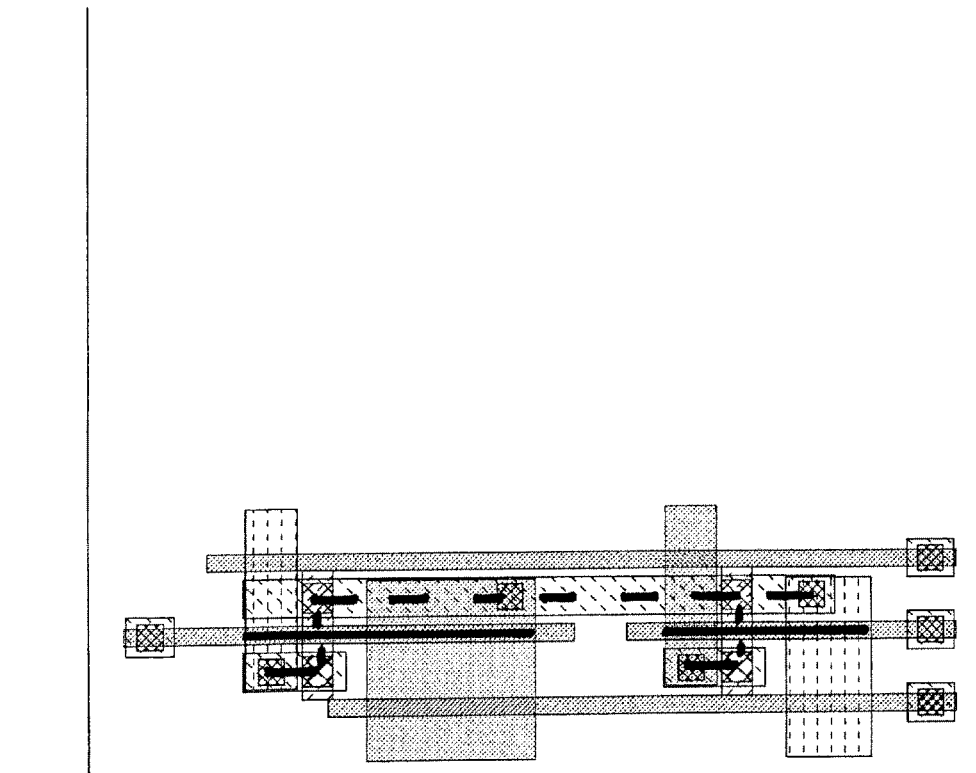
Figure 180:
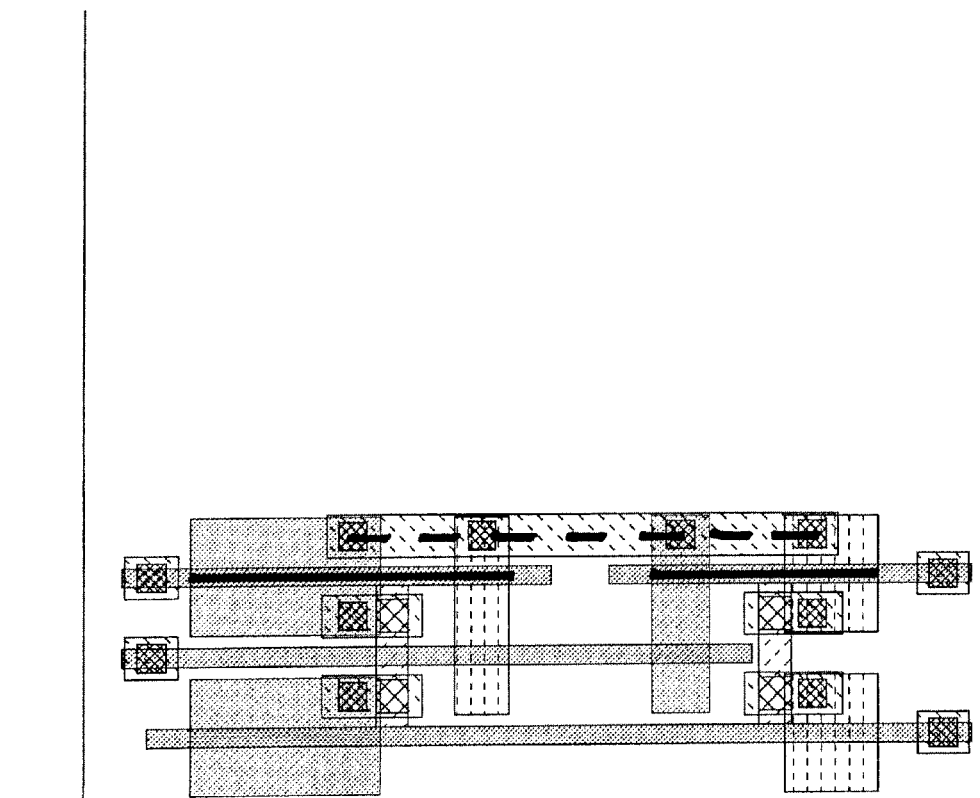
Figure 181:
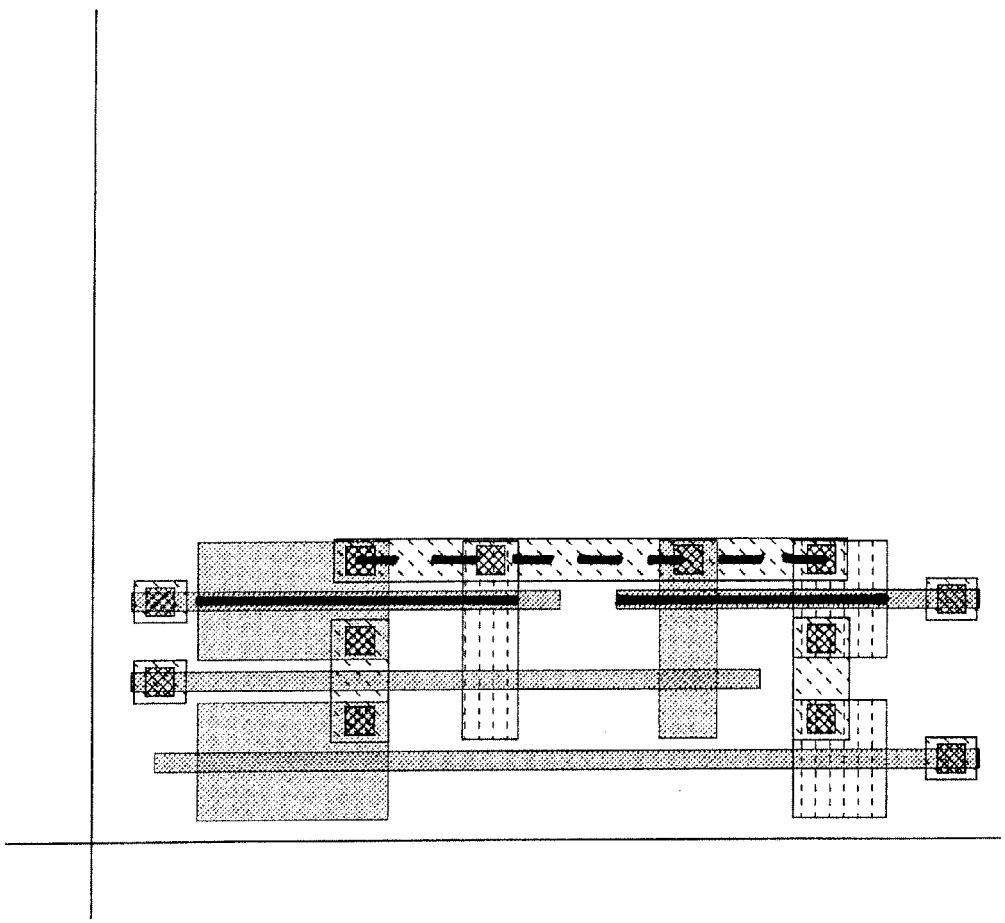
Figure 182:
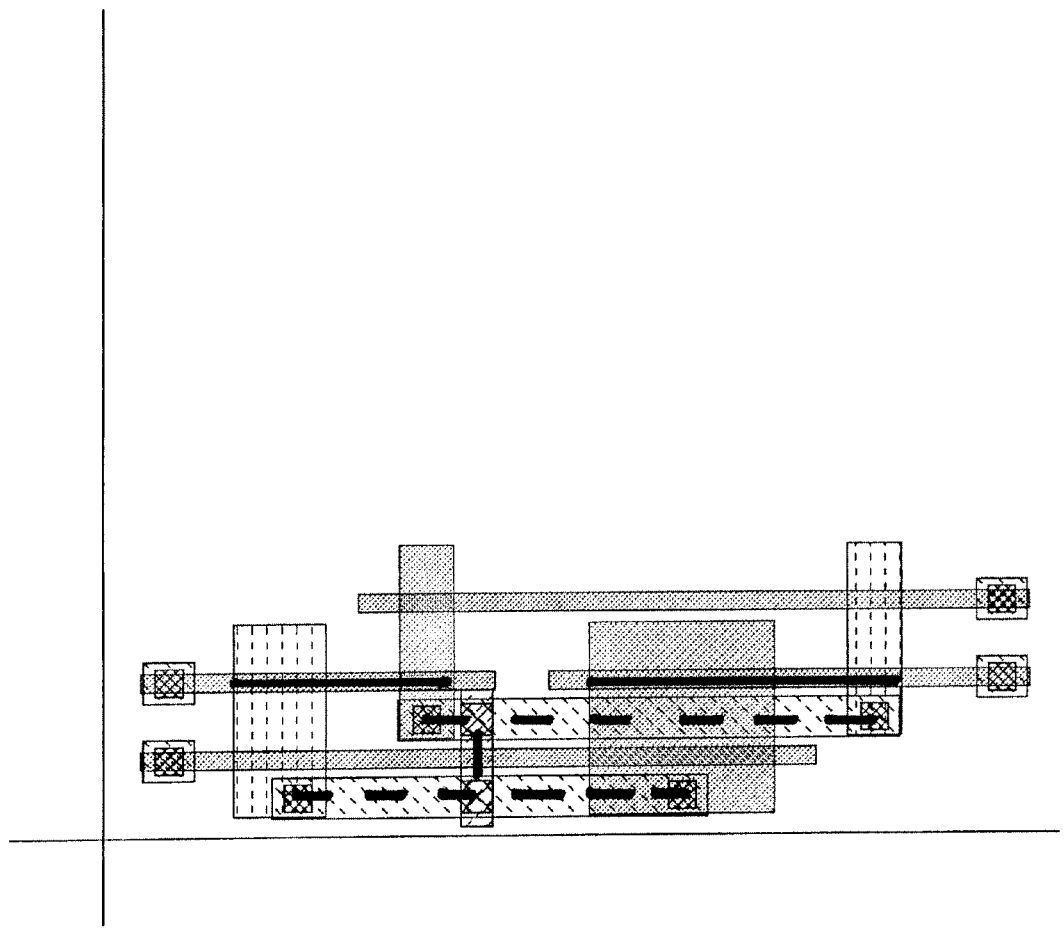
Figure 183:
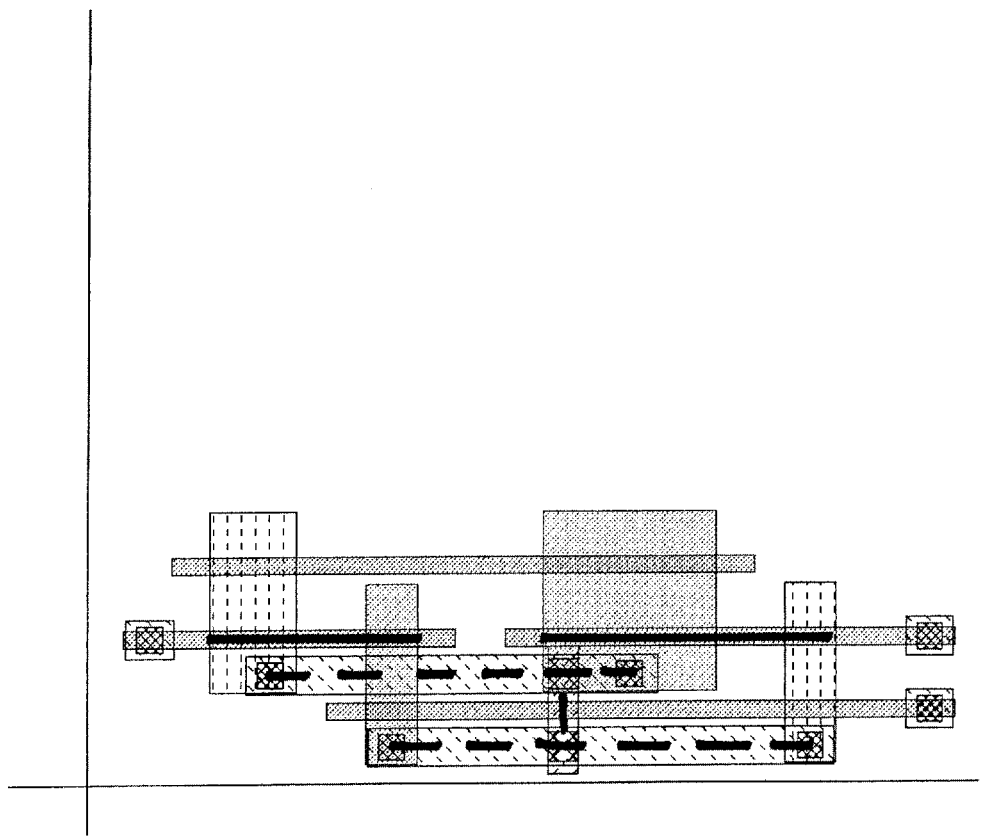
Figure 184:
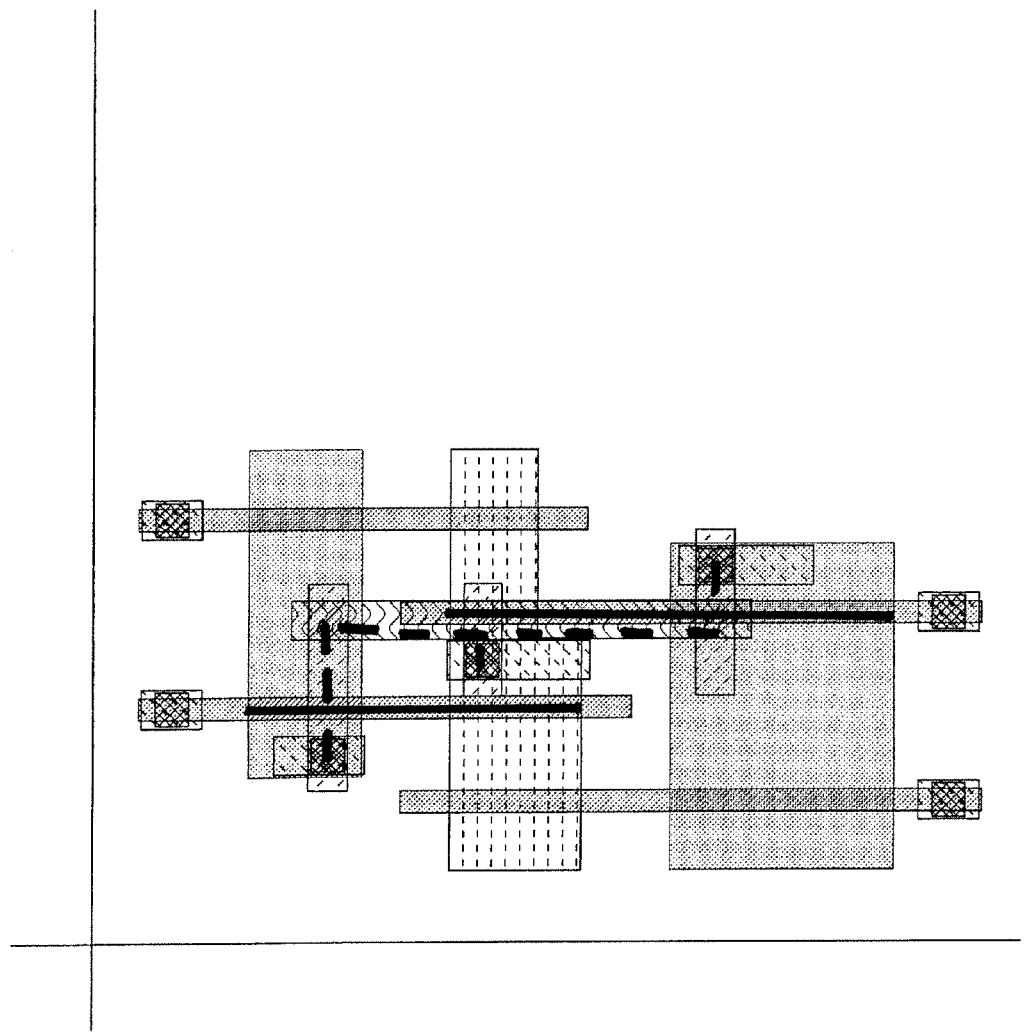
Figure 185:
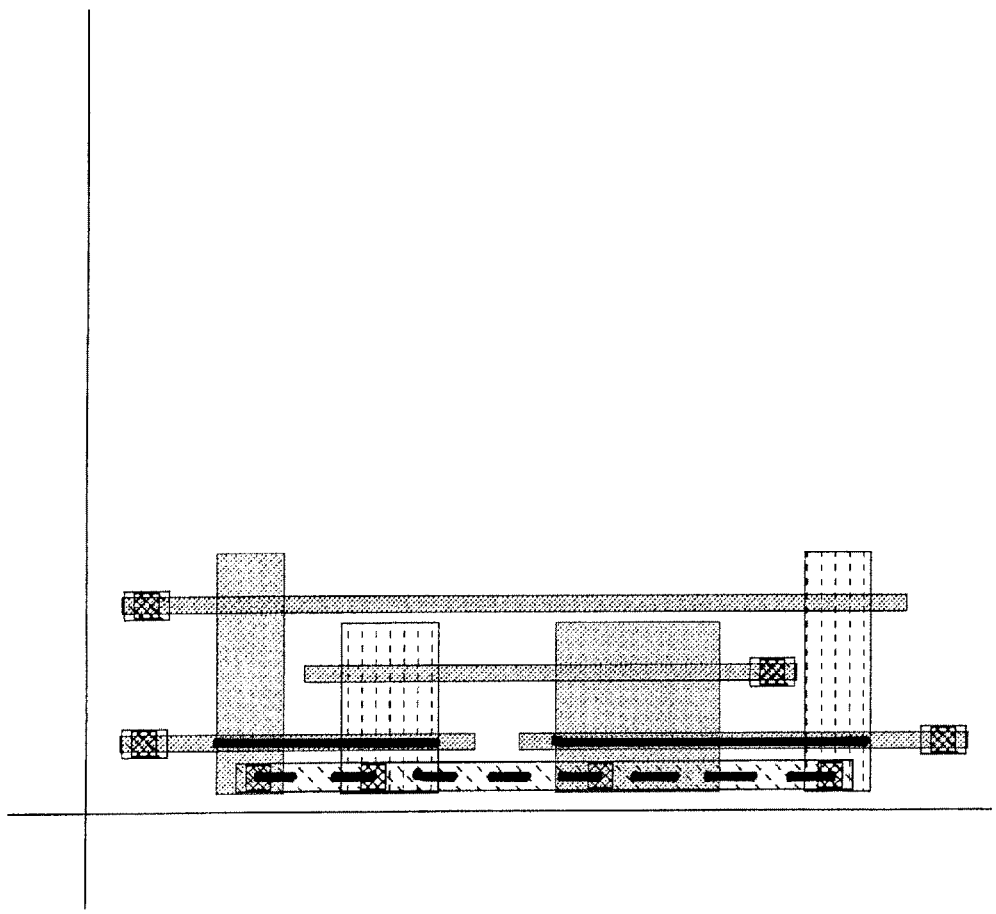
Figure 186:
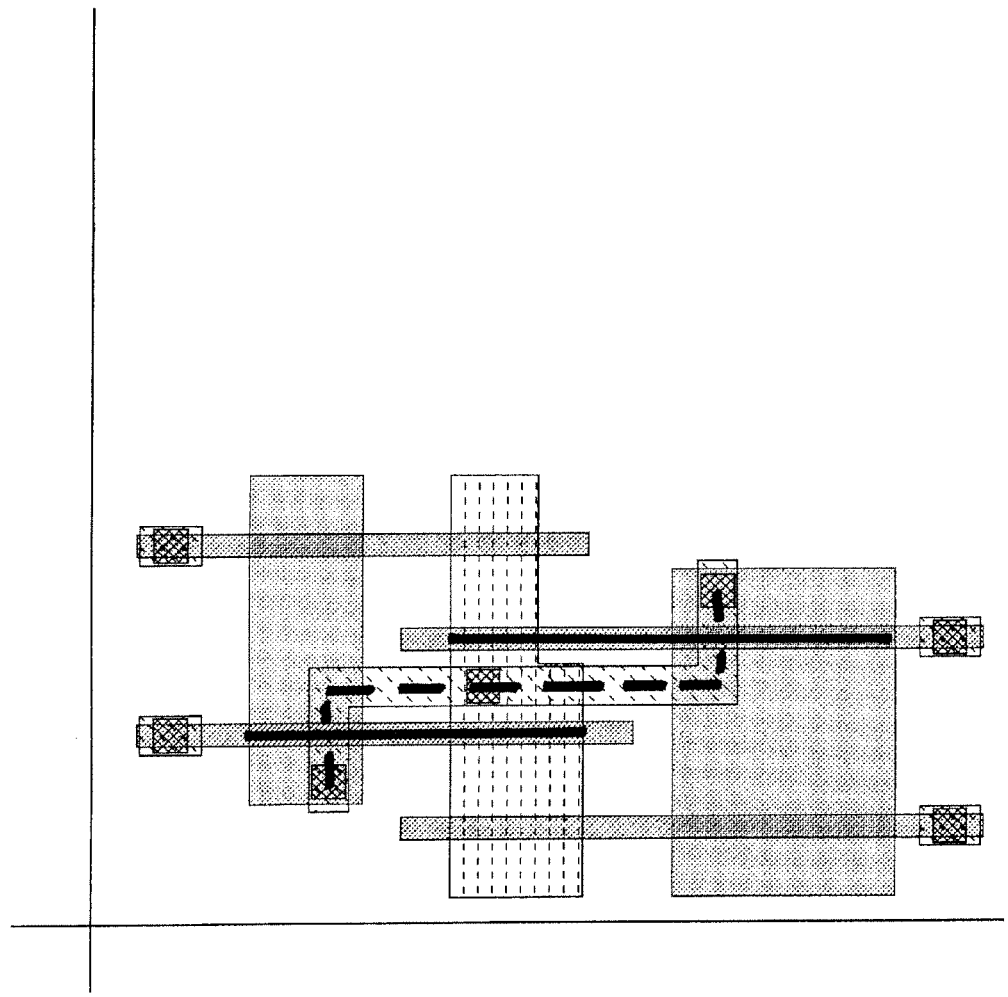
Figure 187:
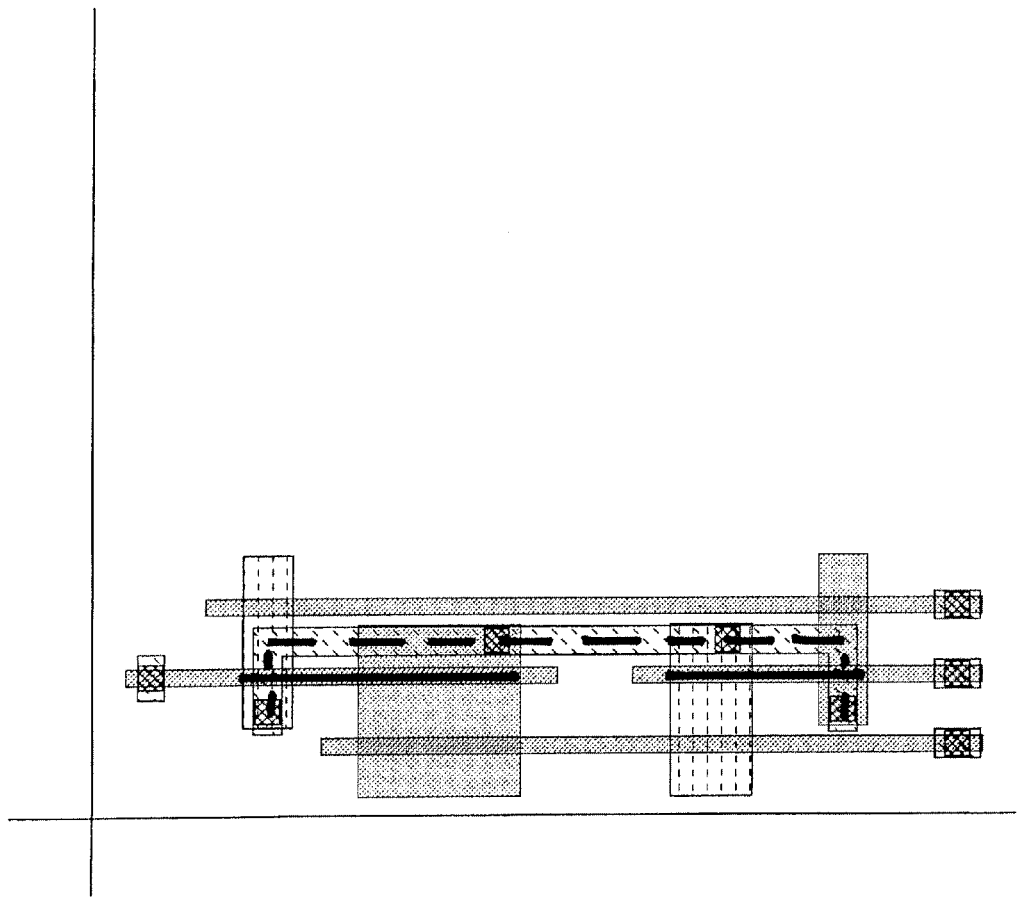
Figure 188:
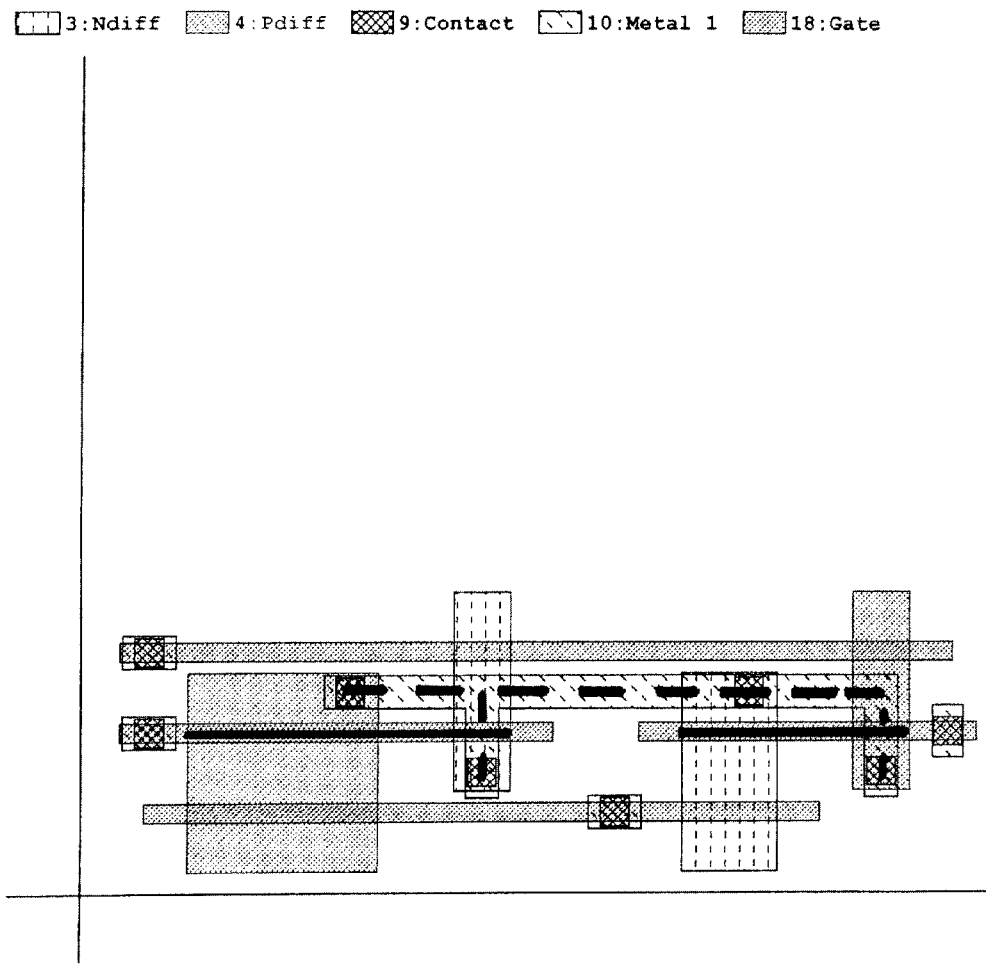
Figure 189:
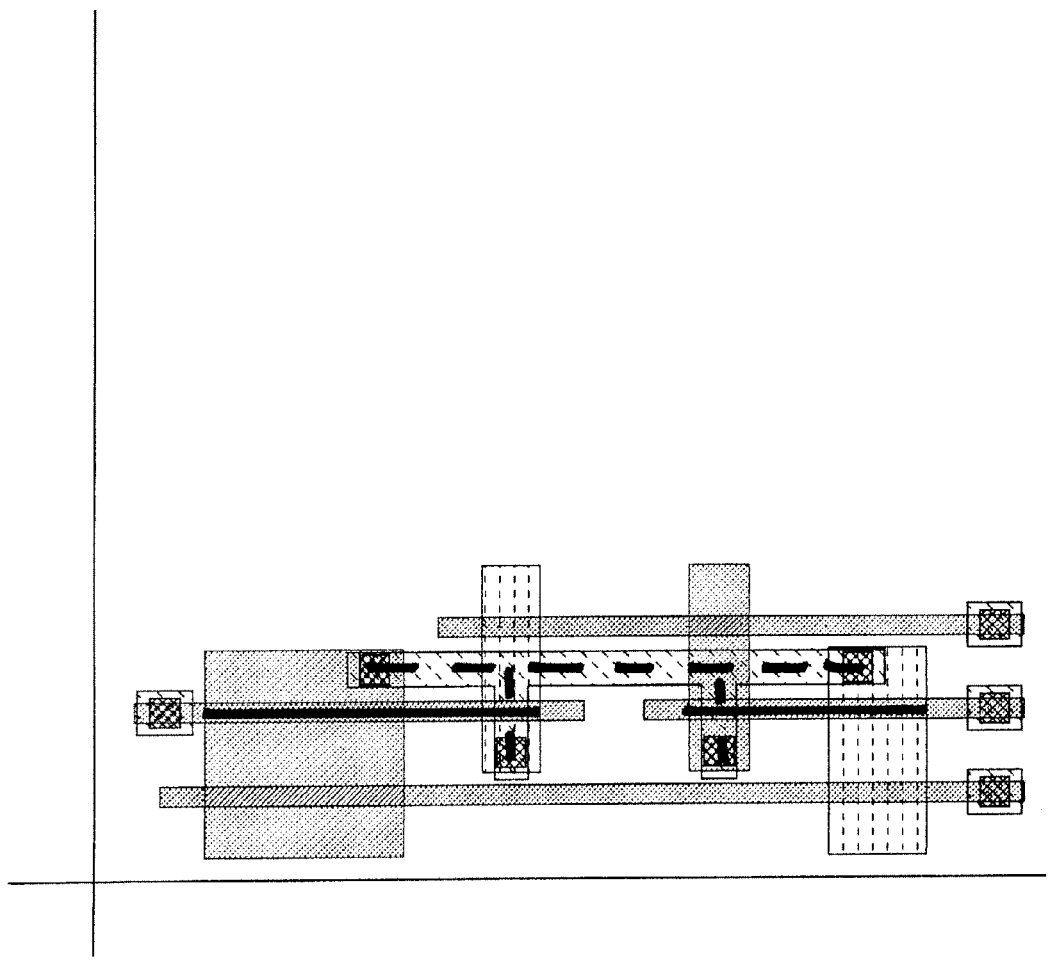
Figure 190:
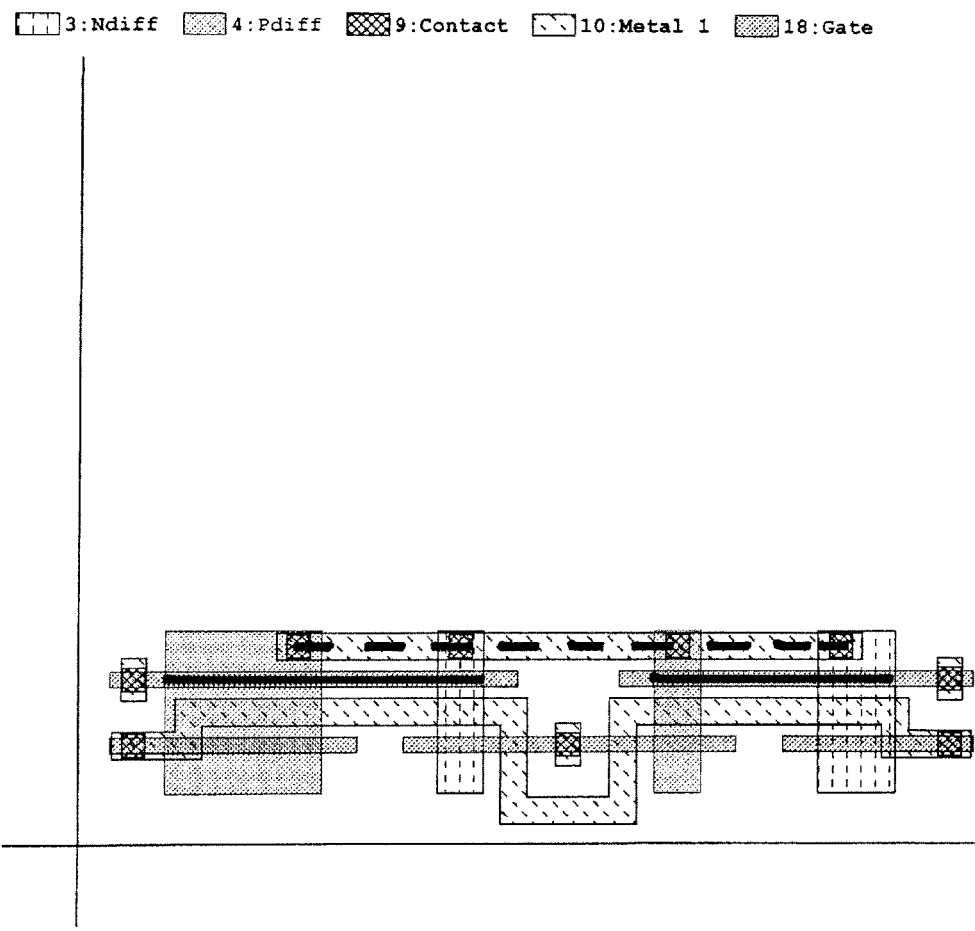
Figure 191:
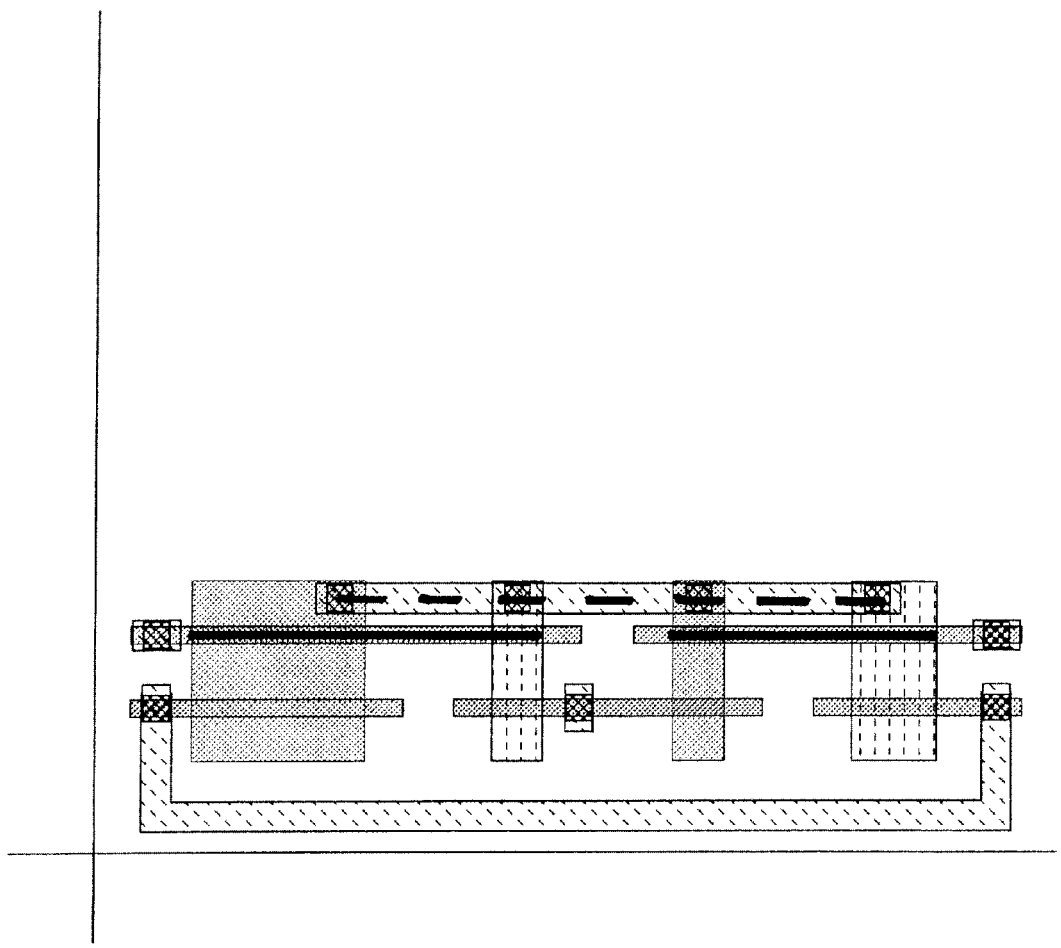

For example, FIG. 176 shows a cross-coupled transistor layout in which gate electrodes of transistors 15001p and 15003p are defined as a single, continuous linear conductive feature within the gate level. Therefore, a gate contact is not required to electrically connect the gate electrodes of transistors 15001p and 15003p. Also, gate electrodes of transistors 15005p and 15007p are defined as a single, continuous linear conductive feature within the gate level. Therefore, a gate contact is not required to electrically connect the gate electrodes of transistors 15005p and 15007p. The conductive path used to connect the diffusion regions of the cross-coupled transistors to the common output node in each of FIGS. 176-191 is identified by a heavy black dashed line drawn over the corresponding layout features. It should be appreciated that the cross-coupled transistor layout defined using no gate contact to connect each pair of complementary transistors can be implemented in as few as one gate electrode track. The cross-coupled transistor layout embodiments of FIGS. 176-191 can be characterized in that each pair of connected complementary transistors in the cross-coupled layout has its gate electrodes defined from a single, continuous linear conductive feature defined in the gate level.

Figure 192:
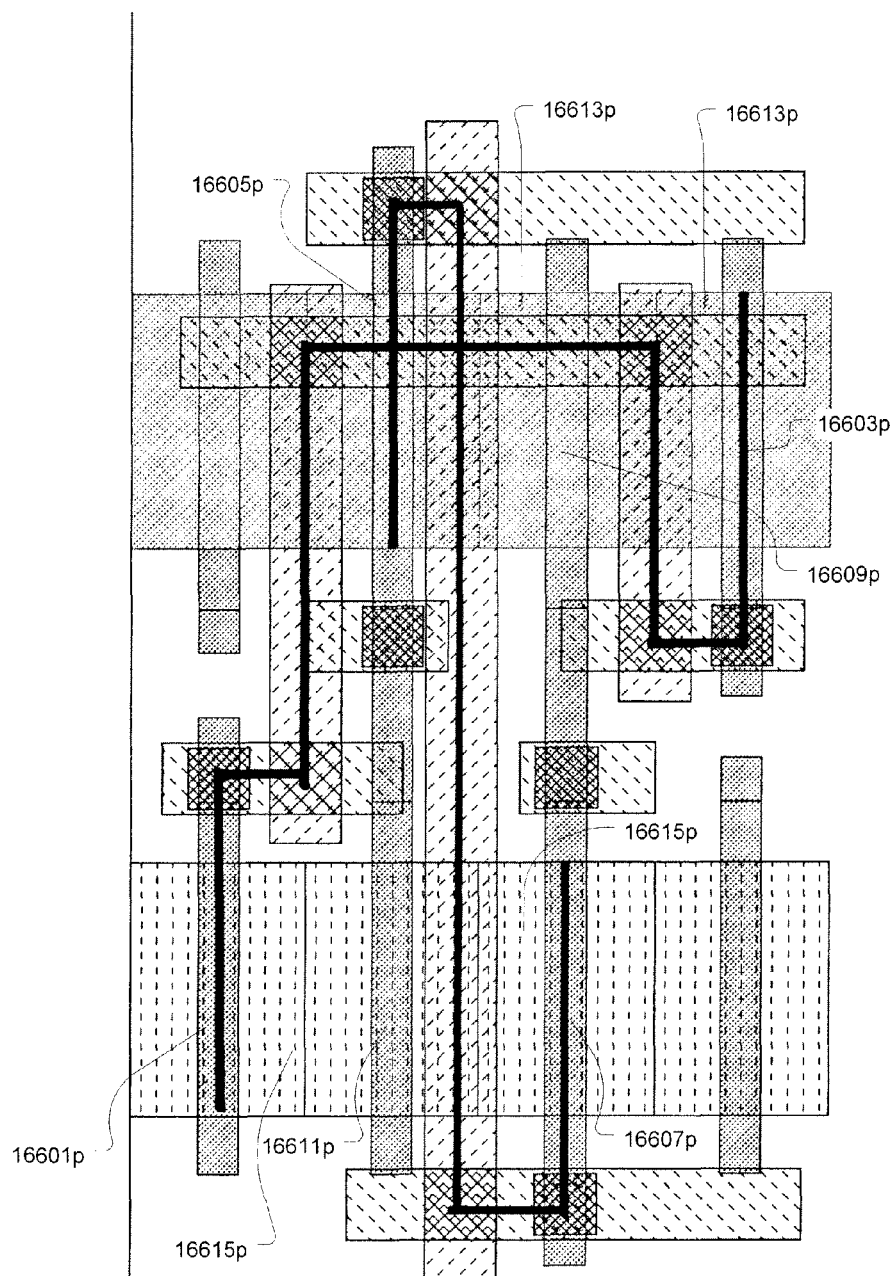
FIG. 192 shows another exemplary cross-couple transistor layout in which the common diffusion node shared between the cross-coupled transistors 16601*p*, 16603*p*, 16605*p*, and 16607*p* has one or more transistors defined thereover.

FIG. 192 shows another exemplary cross-couple transistor layout in which the common diffusion node shared between the cross-coupled transistors 16601p, 16603p, 16605p, and 16607p has one or more transistors defined thereover. Specifically, FIG. 192 shows that transistors 16609Ap and 16609Bp are defined over the diffusion region 16613p between transistors 16605p and 16603p. Also, FIG. 192 shows that transistors 16611Ap and 16611Bp are defined over the diffusion region 16615p between transistors 16601p and 16607p. It should be understood that diffusion regions 16613p and 16615p define the common diffusion node to which each of the cross-coupled transistors 16601p, 16603p, 16605p, and 16607p is electrically interfaced. It should be appreciated that with this type of cross-coupled transistor layout, driver transistors, such as transistors 16609Ap, 16609Bp, 16611Ap, and 16611Bp, can be disposed over the common diffusion node of the cross-coupled transistors. Hence, the cross-coupled transistors can be considered as being placed "outside" of the driver transistors.

As illustrated in FIGS. 26-192, the cross-coupled transistor layout using a linear gate level can be defined in a number of different ways. A number of observations associated with the cross-coupled transistor layout defined using the linear gate level are as follows:

In one embodiment, an interconnect level parallel to the gate level is used to connect the two "outside" transistors, i.e., to connect the two outer gate contacts.

In one embodiment, the end gaps, i.e., line end spacings, between co-aligned gate electrode features in the area between the n and p diffusion regions can be substantially vertically aligned to enable line end cutting.

In one embodiment, the end gaps, i.e., line end spacings, between gate electrode features in the area between the n and p diffusion regions can be separated as much as possible to allow for separation of cut shapes, or to prevent alignment of gate electrode feature line ends.

In one embodiment, the interconnect levels can be configured so that contacts can be placed on a grid to enhance contact printing.

In one embodiment, the contacts can be placed so that a minimal number of first interconnect level (Metal-1 level) tracks are occupied by the cross-couple connection.

In one embodiment, the contacts can be placed to maximize the available diffusion area for device size, e.g., transistor width.

In one embodiment, the contacts can be shifted toward the edges of the interconnect level features to which they connect to allow for better alignment of gate electrode feature line ends.

In pertinent embodiments, it should be noted that the vertical connection between the outside transistors of the cross-coupled transistor layout can be shifted left or right depending on the specific layout requirements.

There is no distance requirement between the n and p diffusion regions. If there are more interconnect level tracks available between the n and p diffusion region, the available interconnect level tracks can be allocated as necessary/appropriate for the layout.

The four transistors of the cross-coupled transistor configuration, as defined in accordance with the linear gate level, can be separated from each other within the layout by arbitrary distances in various embodiments.

In one embodiment, the linear gate electrode features are placed according to a virtual grid or virtual grate. However, it should be understood that in other embodiments the linear gate electrode features, although oriented to have a common direction of extent, are placed without regard to a virtual grid or virtual grate.

Each linear gate electrode feature is allowed to have one or more contact head portion(s) along its line of extent, so long as the linear gate electrode feature does not connect directly within the gate level to another linear gate electrode feature having a different, yet parallel, line of extent.

Diffusion regions associated with the cross-coupled transistor configuration, as defined in accordance with the linear gate level, are not restricted in size or shape.

The four transistors of the cross-coupled transistor configuration, as defined in accordance with the linear gate level, may vary in size as required to satisfy electrical requirements.

Essentially any cross-coupled transistor configuration layout defined in accordance with a linear gate level can be represented in an alternate manner by horizontally and/or vertically reversing placement of the gate contacts that are used to connect one or both pairs of the four transistors of the cross-coupled transistor configuration.

Essentially any cross-coupled transistor configuration layout defined in accordance with a linear gate level can be represented in an alternate manner by maintaining gate contact placements and by modifying each routing path used to connect one or both pairs of the four transistors of the cross-coupled transistor configuration.

A cross-coupled transistor configuration layout defined in accordance with a linear gate level can be optimized for a fabrication process that utilizes a cut mask.

In various embodiments, connections between gates of cross-coupled transistors can be made in essentially any manner by utilizing any level within the chip, any number of levels in the chip, any number of contacts, and/or any number of vias.

It should be appreciated that in the embodiments of FIGS. 26-192, a number of features and connections are not shown in order to avoid unnecessarily obscuring the cross-couple transistors in the various layouts. For example, in the embodiments of FIGS. 26-60, connections to source and drains are not shown. Also, it should be understood that in the exemplary embodiments of FIGS. 26-192, some features and connections that are not directly associated with the four cross-coupled transistors are displayed for exemplary purposes and are not intended to represent any restriction on the correspondingly displayed cross-coupled transistor layout.

Based on the foregoing, a cross-coupled transistor layout using commonly oriented linear gate level features and transistors having physically separate gate electrodes can be defined according to either of the following embodiments, among others:

all four gate contacts used to connect each pair of complementary transistors in the cross-coupled transistor layout are placed between the diffusion regions associated with the cross-coupled transistor layout, two gate contacts used to connect one pair of complementary transistors placed between the diffusion regions associated with the cross-coupled transistor layout, and two gate contacts used to connect another pair of complementary transistors placed outside the diffusion regions with one of these two gate contacts placed outside of each diffusion region, all four gate contacts used to connect each pair of complementary transistors placed outside the diffusion regions associated with the cross-coupled transistor layout, three gate contacts placed outside the diffusion regions associated with the cross-coupled transistor layout, and one gate contact placed between the diffusion regions associated with the cross-coupled transistor layout, and three gate contacts placed between the diffusion regions associated with the cross-coupled transistor layout, and one gate contact placed outside one of the diffusion regions associated with the cross-coupled transistor layout.

It should be understood that the cross-coupled transistor layouts implemented within the restricted gate level layout architecture as disclosed herein can be stored in a tangible form, such as in a digital format on a computer readable medium. Also, the invention described herein can be embodied as computer readable code on a computer readable medium. The computer readable medium is any data storage device that can store data which can thereafter be read by a computer system. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network of coupled computer systems so that the computer readable code is stored and executed in a distributed fashion.

Any of the operations described herein that form part of the invention are useful machine operations. The invention also relates to a device or an apparatus for performing these operations. The apparatus may be specially constructed for the required purpose, such as a special purpose computer. When defined as a special purpose computer, the computer can also perform other processing, program execution or routines that are not part of the special purpose, while still being capable of operating for the special purpose. Alternatively, the operations may be processed by a general purpose computer selectively activated or configured by one or more computer programs stored in the computer memory, cache, or obtained over a network. When data is obtained over a network the data maybe processed by other computers on the network, e.g., a cloud of computing resources.

The embodiments of the present invention can also be defined as a machine that transforms data from one state to another state. The data may represent an article, that cang be represented as an electronic signal and electronically manipulate data. The transformed data can, in some cases, be visually depicted on a display, representing the physical object that results from the transformation of data. The transformed data can be saved to storage generally, or in particular formats that enable the construction or depiction of a physical and tangible object. In some embodiments, the manipulation can be performed by a processor. In such an example, the processor thus transforms the data from one thing to another. Still further, the methods can be processed by one or more machines or processors that can be connected over a network. Each machine can transform data from one state or thing to another, and can also process data, save data to storage, transmit data over a network, display the result, or communicate the result to another machine.

While this invention has been described in terms of several embodiments, it will be appreciated that those skilled in the art upon reading the preceding specifications and studying the drawings will realize various alterations, additions, permutations and equivalents thereof. Therefore, it is intended that the present invention includes all such alterations, additions, permutations, and equivalents as fall within the true spirit and scope of the invention.

What is claimed is:

1. An integrated circuit, comprising:

a gate electrode level region having a number of adjacently positioned gate electrode feature channels, each gate electrode feature channel extending lengthwise in a first direction and widthwise in a second direction perpendicular to the first direction, wherein each of the number of adjacently positioned gate electrode feature channels includes at least one gate level feature, each gate level feature having a first end located adjacent to a first line end spacing and a second end located adjacent to a second line end spacing, each gate level feature forming an electrically conductive path extending between its first and second ends, wherein the gate electrode level region includes a first gate level feature that forms a gate electrode of a first transistor of a first transistor type and a gate electrode of a first transistor of a second transistor type, wherein the gate electrode of the first transistor of the first transistor type is substantially co-aligned with the gate electrode of the first transistor of the second transistor type along a first common line of extent in the first direction, wherein the gate electrode level region includes a second gate level feature that forms a gate electrode of only one transistor that is a second transistor of the first transistor type, wherein the gate electrode level region includes a third gate level feature that forms a gate electrode of only one transistor that is a second transistor of the second transistor type, wherein the first gate level feature is positioned between the second and third gate level features in the second direction, wherein the first and second transistors of the first transistor type are collectively separated from the first and second transistors of the second transistor type, wherein the first and second transistors of the first transistor type share a first diffusion region of a first diffusion type, wherein the first and second transistors of the second transistor type share a first diffusion region of a second diffusion type, and wherein the first diffusion region of the first diffusion type and the first diffusion region of the second diffusion type are respectively formed at opposite sides of the first gate level feature.

2. An integrated circuit as recited in claim 1, wherein each gate level feature that forms a transistor has a substantially linear shape within the gate electrode level region.

3. An integrated circuit as recited in claim 2, wherein two of the first, second, and third gate level features has a substantially equal length as measured in the first direction.

4. An integrated circuit as recited in claim 3, wherein the gate electrode level region includes a non-transistor gate level feature that does not form a gate electrode of a transistor and that is positioned between two other gate level features in the second direction.

5. An integrated circuit as recited in claim 4, wherein the non-transistor gate level feature has a length as measured in the first direction substantially equal to a length of a gate level feature that forms gate electrodes of both a transistor of the first transistor type and a transistor of the second transistor type.

6. An integrated circuit as recited in claim 1, wherein the gate electrodes of the first and second transistors of the first transistor type are positioned according to a gate pitch defined as an equal center-to-center spacing measured in the second direction between adjacent gate electrodes, and wherein the gate electrodes of the first and second transistors of the second transistor type are positioned according to the gate pitch.

7. An integrated circuit as recited in claim 6, wherein each gate level feature that forms a transistor has a substantially linear shape within the gate electrode level region.

8. An integrated circuit as recited in claim 7, wherein the first diffusion region of the first diffusion type is electrically connected to the first diffusion region of the second diffusion type.

9. An integrated circuit as recited in claim 8, wherein two of the first, second, and third gate level features has a substantially equal length as measured in the first direction.

10. An integrated circuit as recited in claim 8, wherein the second gate level feature is electrically connected to the third gate level feature through a first electrical connection that extends in part through a single interconnect level formed above the gate electrode level region.

11. An integrated circuit as recited in claim 8, wherein the first diffusion region of the first diffusion type is electrically connected to the first diffusion region of the second diffusion type through at least two interconnect levels formed above the gate electrode level region.

12. An integrated circuit as recited in claim 11, wherein two of the first, second, and third gate level features has a substantially equal length as measured in the first direction.

13. An integrated circuit as recited in claim 1, further comprising:
a first gate contact defined to physically contact the first gate level feature;
a second gate contact defined to physically contact the second gate level feature; and
a third gate contact defined to physically contact the third gate level feature, wherein a position of the first gate contact is offset in the first direction from either a position of the second gate contact or a position of the third gate contact.

14. An integrated circuit as recited in claim 13, wherein the first diffusion region of the first diffusion type is electrically connected to the first diffusion region of the second diffusion type through at least two interconnect levels formed above the gate electrode level region.

15. An integrated circuit as recited in claim 14, wherein each gate level feature within the gate electrode level region has a substantially linear shape, and wherein each gate level feature within the gate electrode level region is positioned according to a gate pitch defined as an equal center-to-center spacing measured in the second direction between adjacent gate level features.

16. An integrated circuit as recited in claim 15, wherein the gate electrode level region includes a non-transistor gate level feature that does not form a gate electrode of a transistor and that is positioned between two other gate level features in the second direction.

17. An integrated circuit as recited in claim 13, wherein the first diffusion region of the first diffusion type is electrically connected to the first diffusion region of the second diffusion type through a single interconnect level formed above the gate electrode level region.

18. An integrated circuit as recited in claim 17, wherein each gate level feature within the gate electrode level region has a substantially linear shape, and wherein each gate level feature within the gate electrode level region is positioned according to a gate pitch defined as an equal center-to-center spacing measured in the second direction between adjacent gate level features.

19. An integrated circuit as recited in claim 18, wherein the gate electrode level region includes a non-transistor gate level feature that does not form a gate electrode of a transistor and that is positioned between two other gate level features in the second direction.

20. An integrated circuit as recited in claim 19, wherein the non-transistor gate level feature has a length as measured in the first direction substantially equal to a length of a gate level feature that forms gate electrodes of both a transistor of the first transistor type and a transistor of the second transistor type.

21. An integrated circuit as recited in claim 1, further comprising:
a first gate contact defined to physically contact the first gate level feature;
a second gate contact defined to physically contact the second gate level feature; and
a third gate contact defined to physically contact the third gate level feature,
wherein a position of the first gate contact is offset in the first direction from both the position of the second gate contact and the position of the third gate contact.

22. An integrated circuit as recited in claim 21, wherein each gate level feature within the gate electrode level region has a substantially linear shape, and wherein each gate level feature within the gate electrode level region is positioned according to a gate pitch defined as an equal center-to-center spacing measured in the second direction between adjacent gate level features.

23. An integrated circuit as recited in claim 22, wherein the gate electrode level region includes a non-transistor gate level feature that does not form a gate electrode of a transistor and that is positioned between two other gate level features in the second direction.

24. An integrated circuit as recited in claim 23, wherein the first diffusion region of the first diffusion type is electrically connected to the first diffusion region of the second diffusion type through a single interconnect level formed above the gate electrode level region.

25. A method for creating a layout of an integrated circuit, comprising:

operating a computer to define a gate electrode level region having a number of adjacently positioned gate electrode feature channels, each gate electrode feature channel extending lengthwise in a first direction and widthwise in a second direction perpendicular to the first direction, wherein each of the number of adjacently positioned gate electrode feature channels includes at least one gate level feature, each gate level feature having a first end located adjacent to a first line end spacing and a second end located adjacent to a second line end spacing, each gate level feature forming an electrically conductive path extending between its first and second ends, wherein the gate electrode level region includes a first gate level feature that forms a gate electrode of a first transistor of a first transistor type and a gate electrode of a first transistor of a second transistor type, wherein the gate electrode of the first transistor of the first transistor type is substantially co-aligned with the gate electrode of the first transistor of the second transistor type along a first common line of extent in the first direction, wherein the gate electrode level region includes a second gate level feature that forms a gate electrode of only one transistor that is a second transistor of the first transistor type, wherein the gate electrode level region includes a third gate level feature that forms a gate electrode of only one transistor that is a second transistor of the second transistor type, wherein the first gate level feature is positioned between the second and third gate level features in the second direction, wherein the first and second transistors of the first transistor type are collectively separated from the first and second transistors of the second transistor type, wherein the first and second transistors of the first transistor type share a first diffusion region of a first diffusion type, wherein the first and second transistors of the second transistor type share a first diffusion region of a second diffusion type, and wherein the first diffusion region of the first diffusion type and the first diffusion region of the second diffusion type are respectively formed at opposite sides of the first gate level feature.

26. A data storage device having program instructions stored thereon for generating a layout of an integrated circuit, comprising:

program instructions for defining a gate electrode level region having a number of adjacently positioned gate electrode feature channels, each gate electrode feature channel extending lengthwise in a first direction and widthwise in a second direction perpendicular to the first direction, wherein each of the number of adjacently positioned gate electrode feature channels includes at least one gate level feature, each gate level feature having a first end located adjacent to a first line end spacing and a second end located adjacent to a second line end spacing, each gate level feature forming an electrically conductive path extending between its first and second ends, wherein the gate electrode level region includes a first gate level feature that forms a gate electrode of a first transistor of a first transistor type and a gate electrode of a first transistor of a second transistor type, wherein the gate electrode of the first transistor of the first transistor type is substantially co-aligned with the gate electrode of the first transistor of the second transistor type along a first common line of extent in the first direction, wherein the gate electrode level region includes a second gate level feature that forms a gate electrode of only one transistor that is a second transistor of the first transistor type, wherein the gate electrode level region includes a third gate level feature that forms a gate electrode of only one transistor that is a second transistor of the second transistor type, wherein the first gate level feature is positioned between the second and third gate level features in the second direction, wherein the first and second transistors of the first transistor type are collectively separated from the first and second transistors of the second transistor type, wherein the first and second transistors of the first transistor type share a first diffusion region of a first diffusion type, wherein the first and second transistors of the second transistor type share a first diffusion region of a second diffusion type, and wherein the first diffusion region of the first diffusion type and the first diffusion region of the second diffusion type are respectively formed at opposite sides of the first gate level feature.

* * * * *